(12) United States Patent
Iwasaki et al.

(10) Patent No.: US 11,586,223 B2
(45) Date of Patent: Feb. 21, 2023

(54) VEHICLE AND SERVICE MANAGEMENT DEVICE

(71) Applicant: HONDA MOTOR CO., LTD., Tokyo (JP)

(72) Inventors: Shun Iwasaki, Wako (JP); Hisao Asaumi, Wako (JP); Kentaro Ishisaka, Wako (JP); Izumi Kondo, Wako (JP); Satoshi Koike, Wako (JP); Tomohisa Manabe, Wako (JP); Yo Ito, Tokyo (JP); Yuki Hayashi, Tokyo (JP); Yuji Yasui, Wako (JP); Shion Tokunaga, Wako (JP); Nobuyuki Watanabe, Wako (JP); Kazuki Nishioka, Wako (JP); Yudai Hirohata, Wako (JP); Hisakazu Yamane, Tokyo (JP); Takayuki Shimoyamada, Tokyo (JP); Kovi Ahego, Wako (JP); Liyan Liu, Tokyo (JP); Hirotaka Uchitomi, Tokyo (JP); Masashi Yuki, Wako (JP); Takafumi Hirose, Wako (JP); Jun Ito, Wako (JP); Rie Fukushima, Wako (JP); Masaaki Onoda, Tokyo (JP); Christopher Lang, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 361 days.

(21) Appl. No.: 16/622,026

(22) PCT Filed: Jun. 15, 2018

(86) PCT No.: PCT/JP2018/023043
§ 371 (c)(1),
(2) Date: Dec. 12, 2019

(87) PCT Pub. No.: WO2018/230738
PCT Pub. Date: Dec. 20, 2018

(65) Prior Publication Data
US 2020/0159251 A1    May 21, 2020

(30) Foreign Application Priority Data

Jun. 16, 2017 (JP) .............................. JP2017-118689
Jun. 16, 2017 (JP) .............................. JP2017-118691
(Continued)

(51) Int. Cl.
*G05D 1/00*  (2006.01)
*G05D 1/02*  (2020.01)
(Continued)

(52) U.S. Cl.
CPC ......... *G05D 1/0297* (2013.01); *G05D 1/0016* (2013.01); *G06Q 10/20* (2013.01); *G08G 1/096894* (2013.01)

(58) Field of Classification Search
CPC .... G05D 1/0297; G05D 1/0016; G06Q 10/20; G06Q 10/0631; G08G 1/096894
(Continued)

(56) References Cited

U.S. PATENT DOCUMENTS 6,060,993 A   5/2000 Cohen
6,236,330 B1  5/2001 Cohen
(Continued)

FOREIGN PATENT DOCUMENTS

JP   33-044800   4/1991
JP   09-153098   6/1997
(Continued)

OTHER PUBLICATIONS

Non-Final Office Action for U.S. Appl. No. 16/622,336 dated Oct. 14, 2021.
(Continued)

*Primary Examiner* — Dalena Tran
(74) *Attorney, Agent, or Firm* — Amin, Turocy & Watson, LLP

(57) ABSTRACT

A vehicle includes a communicator configured to receive driving information from a management server, a controller
(Continued)

configured to drive the vehicle on the basis of the driving information from the communicator, a manager configured to manage a compartment of the vehicle in which a service user receives a service from a service provider, and an interface set up in association with service-related information provided by the service provider and the compartment.

13 Claims, 146 Drawing Sheets

(30) Foreign Application Priority Data

| Jun. 16, 2017 | (JP) | ............................ JP2017-118698 |
|---|---|---|
| Jun. 16, 2017 | (JP) | ............................ JP2017-118699 |
| Jun. 16, 2017 | (JP) | ............................ JP2017-118719 |
| Jun. 16, 2017 | (JP) | ............................ JP2017-118745 |
| Jun. 16, 2017 | (JP) | ............................ JP2017-118915 |
| Jun. 16, 2017 | (JP) | ............................ JP2017-119025 |
| Jun. 16, 2017 | (JP) | ............................ JP2017-119131 |

(51) Int. Cl.
  *G06Q 10/20* (2023.01)
  *G08G 1/0968* (2006.01)

(58) Field of Classification Search
  USPC ........ 701/2, 33.4, 23–25, 400, 408; 340/436
  See application file for complete search history.

(56) References Cited

U.S. PATENT DOCUMENTS

| 6,545,596 | B1 | 4/2003 | Moon |
|---|---|---|---|
| 6,857,889 | B1 | 2/2005 | Vitale |
| 6,898,517 | B1 | 5/2005 | Froeberg |
| 7,154,383 | B2 | 12/2006 | Berquist |
| 8,024,111 | B1 | 9/2011 | Meadows et al. |
| 8,958,943 | B2* | 2/2015 | Bertosa ................ G07C 5/0808 |
| | | | 701/469 |
| 9,216,745 | B2 | 12/2015 | Beardsley et al. |
| 9,791,861 | B2 | 10/2017 | Keohane et al. |
| 11,049,208 | B2 | 6/2021 | Petroff |
| 11,364,447 | B2 | 6/2022 | Allmendinger et al. |
| 2002/0198747 | A1 | 12/2002 | Boyer et al. |
| 2005/0022134 | A1 | 1/2005 | Tokashiki |
| 2005/0096974 | A1 | 5/2005 | Chagoly et al. |
| 2008/0143141 | A1 | 6/2008 | Ruslanov et al. |
| 2009/0303079 | A1 | 12/2009 | Khim |
| 2010/0036717 | A1 | 2/2010 | Trest |
| 2010/0292886 | A1 | 11/2010 | Szczerba et al. |
| 2011/0101646 | A1 | 5/2011 | Sakita |
| 2012/0013179 | A1 | 1/2012 | Muto et al. |
| 2012/0120930 | A1 | 5/2012 | Ji et al. |
| 2012/0142415 | A1 | 6/2012 | Lindsay |
| 2013/0113936 | A1 | 5/2013 | Cohen et al. |
| 2013/0162639 | A1 | 6/2013 | Muench et al. |
| 2014/0081764 | A1 | 3/2014 | James |
| 2014/0095234 | A1 | 4/2014 | Johnson |
| 2014/0121883 | A1 | 5/2014 | Shen et al. |
| 2014/0365250 | A1 | 12/2014 | Ikeda et al. |
| 2015/0046187 | A1 | 2/2015 | Johnson et al. |
| 2015/0051778 | A1* | 2/2015 | Mueller ................ B60W 10/06 |
| | | | 701/29.2 |
| 2015/0062469 | A1* | 3/2015 | Fleury ...................... B60J 3/04 |
| | | | 349/14 |
| 2015/0066282 | A1* | 3/2015 | Yopp ..................... G05D 1/0061 |
| | | | 701/24 |
| 2015/0112800 | A1 | 4/2015 | Binion et al. |
| 2015/0161526 | A1 | 6/2015 | Yalcin et al. |
| 2015/0220991 | A1 | 8/2015 | Butts et al. |
| 2015/0227888 | A1 | 8/2015 | Levanon et al. |
| 2015/0271532 | A1 | 9/2015 | Igarashi |
| 2015/0293509 | A1 | 10/2015 | Bankowski et al. |
| 2015/0345814 | A1 | 12/2015 | Nakano et al. |
| 2016/0063862 | A1 | 3/2016 | Rosen |
| 2016/0082839 | A1 | 3/2016 | Ricci |
| 2016/0089610 | A1 | 3/2016 | Boyle et al. |
| 2016/0121907 | A1 | 5/2016 | Otake |
| 2017/0061561 | A1 | 3/2017 | Cha |
| 2017/0075366 | A1 | 3/2017 | Esselink et al. |
| 2017/0109805 | A1 | 4/2017 | Eisen |
| 2018/0060827 | A1 | 3/2018 | Abbas et al. |
| 2018/0102964 | A1* | 4/2018 | Kao ........................ H04L 67/12 |
| 2018/0182055 | A1 | 6/2018 | Jepson et al. |
| 2018/0224844 | A1* | 8/2018 | Zhang .................. H04L 67/125 |
| 2018/0275661 | A1 | 9/2018 | Glaser |
| 2020/0189466 | A1 | 6/2020 | Askeland |
| 2020/0398915 | A1 | 12/2020 | Birnschein et al. |

FOREIGN PATENT DOCUMENTS

| JP | 10-254946 | 9/1998 |
|---|---|---|
| JP | 11-231935 | 8/1999 |
| JP | 2000-035337 | 2/2000 |
| JP | 2001-154733 | 6/2001 |
| JP | 2002-099961 | 4/2002 |
| JP | 2002-186055 | 6/2002 |
| JP | 2002-187577 | 7/2002 |
| JP | 2002-288521 | 10/2002 |
| JP | 2003-063301 | 3/2003 |
| JP | 2003-199083 | 7/2003 |
| JP | 2003-259354 | 9/2003 |
| JP | 2003-308265 | 10/2003 |
| JP | 2004-061285 | 2/2004 |
| JP | 2004-192366 | 7/2004 |
| JP | 2004-194007 | 7/2004 |
| JP | 2004-234469 | 8/2004 |
| JP | 2004-362064 | 12/2004 |
| JP | 2005-004407 | 1/2005 |
| JP | 2005-032066 | 2/2005 |
| JP | 2005-056134 | 3/2005 |
| JP | 2005-066745 | 3/2005 |
| JP | 2006-018570 | 1/2006 |
| JP | 2007-080060 | 3/2007 |
| JP | 2007-172378 | 7/2007 |
| JP | 2007-228551 | 9/2007 |
| JP | 2008-103828 | 5/2008 |
| JP | 2008-534372 | 8/2008 |
| JP | 2008-280813 | 11/2008 |
| JP | 2009-015760 | 1/2009 |
| JP | 2009-105787 | 5/2009 |
| JP | 2010-204708 | 9/2010 |
| JP | 2010-237411 | 10/2010 |
| JP | 2011-162273 | 8/2011 |
| JP | 2012-108599 | 6/2012 |
| JP | 2013-109469 | 6/2013 |
| JP | 2013-210713 | 10/2013 |
| JP | 2013-214167 | 10/2013 |
| JP | 2014-006890 | 1/2014 |
| JP | 2014-238831 | 12/2014 |
| JP | 2015-085807 | 5/2015 |
| JP | 2015-090676 | 5/2015 |
| JP | 2015-092327 | 5/2015 |
| JP | 2015-093078 | 5/2015 |
| JP | 2015-179414 | 10/2015 |
| JP | 2015-184710 | 10/2015 |
| JP | 2015-184885 | 10/2015 |
| JP | 2015-191264 | 11/2015 |
| JP | 2015-206655 | 11/2015 |
| JP | 2016-040151 | 3/2016 |
| JP | 2016-065938 | 4/2016 |
| JP | 2016-090274 | 5/2016 |
| JP | 2016-206715 | 12/2016 |
| JP | 2017-033480 | 2/2017 |
| JP | 2017-061168 | 3/2017 |
| JP | 2017-083446 | 5/2017 |
| JP | 2017-191371 | 10/2017 |
| JP | 2018-008688 | 1/2018 |
| WO | 2017/033172 | 3/2017 |

(56) References Cited

OTHER PUBLICATIONS

Non-Final Office Action for U.S. Appl. No. 16/621,458 dated Nov. 8, 2021.
Non-Final Office Action for U.S. Appl. No. 16/622,012 dated Aug. 30, 2021.
Non-Final Office Action for U.S. Appl. No. 16/622,335 dated Apr. 26, 2022.
Final Office Action for U.S. Appl. No. 16/621,458 dated May 2, 2022.
Non-Final Office Action for U.S. Appl. No. 16/622,008 dated Oct. 27, 2020.
International Search Report and Written Opinion for International Application Serial No. PCT/JP2018/023043 dated Sep. 18, 2018, 8 pages.
International Search Report for International Application Serial No. PCT/JP2018/022825 dated Sep. 18, 2018, 2 pages.
International Search Report for International Application Serial No. PCT/JP2018/023043 dated Sep. 18, 2018, 4 pages.
International Search Report for International Application Serial No. PCT/JP2018/022929 dated Jul. 17, 2018, 4 pages.
International Search Report for International Application Serial No. PCT/JP2018/022829 dated Aug. 21, 2018, 2 pages.
International Search Report for International Application Serial No. PCT/JP2018/022919 dated Sep. 18, 2018, 4 pages.
International Search Report for International Application Serial No. PCT/JP2018/022875 dated Sep. 11, 2018, 4 pages.
International Search Report for International Application Serial No. PCT/JP2018/022852 dated Sep. 18, 2018, 2 pages.
International Search Report for International Application Serial No. PCT/JP2018/022826 dated Sep. 18, 2018, 8 pages.
International Search Report for International Application Serial No. PCT/JP2018/022991 dated Aug. 21, 2018, 3 pages.
International Search Report for International Application Serial No. PCT/JP2018/022845 dated Sep. 18, 2018, 4 pages.
Carcade In-Car Gaming, Oh Gizmo!, Oct. 8, 2008, search date Sep. 4, 2018, internet<URL: https://www.gizmodo.jp/2008/10/carcadear.html>.
Gizmodo, AR world (video clip) of "Carcade" in which the scenery of the car window becomes arcade game, Oct. 10, 2008, search date Sep. 4, 2018, internet<URL: https://www.gizmodo.jp/2008/10/carcadear.html>.
Final Office Action for U.S. Appl. No. 16/622,336 dated Mar. 3, 2022.
Non-Final Office Action for U.S. Appl. No. 16/621,456 dated Mar. 22, 2022.
Daily, et al. "WebOn World: Geo-coded Video and Spatial Audio in Vehicles," 2007 IEEE Aerospace Conference, 2007, pp. 1-13.
Kabir, et al. "SocioTelematics: Leveraging Interaction-Relationships in Developing Telematics Systems to Support Cooperative Convoys," 2012 9th International Conference on Ubiquitous Intelligence and Computing and 9th International Conference on Autonomic and Trusted Computing.
V. Cichella, T. Marinho, D. Stipanovic, N. Hovakimyan, I. Kaminer and A. Trujillo, "Collision avoidance based on line-of-sight angle,", 2015 54th IEEE Conference on Decision and Control (CDC), 2015, pp. 6779-6784.
Non-Final Office Action for U.S. Appl. No. 16/621,456 dated Jul. 14, 2022.
Japanese Office Action for Japanese Patent Application No. 2020-006723 dated Jun. 28, 2022.
Japanese Office Action for Japanese Patent Application No. 2020-006009 dated Jul. 5, 2022.
Japanese Office Action for JP Patent Application No. 2020-006390 dated Jul. 19, 2022.
Non-Final Office Action for U.S. Appl. No. 16/622,007 dated May 31, 2022.
Japanese Office Action for Japanese Patent Application No. 2020-006721 dated Jun. 7, 2022.
Non-Final Office Action for U.S. Appl. No. 16/621,071 dated Nov. 9, 2022.
Japanese Notice of Allowance for Japanese Patent Application No. 2020-006009 dated Oct. 4, 2022.
Japanese Office Action for Japanese Patent Application No. 2020-006808 dated Aug. 23, 2022.
Final Office Action for U.S. Appl. No. 16/622,335 dated Sep. 29, 2022.
Final Office Action for U.S. Appl. No. 16/622,077 dated Dec. 13, 2022.
MobilityWorks, "Assisted Living Resident Transportation: Beyond the Occasional Doctor's Appointment", May 10, 2014.
On Time Ambulance, "10 Ways to Transport a Senior to the Doctor or Other Appointments", On Time Medical Transportation, Jul. 28, 2016.

* cited by examiner

FIG. 27 a384

| APPLICANT ID | NUMBER OF SERVICE USERS | DESIRED POINT OF BOARDING | DESTINATION | DESIRED TIME OF BOARDING | PLAN DECIDED FLAG |
|---|---|---|---|---|---|
| 0001 | ONE | (,) | (,) | 2017/04/30/10:20 | 1 |
| 0002 | ONE | (,) | (,) | 2017/05/2/15:00 | 0 |
| ... | ... | ... | ... | ... | ... |

FIG. 28
a386

| SERVICE PROVIDER ID | SERVICE PROVIDABLE DAY | SERVICE PROVIDABLE TIME SLOT | SERVICE PROVIDABLE AREA |
|---|---|---|---|
| A | WEEKDAY | 09:00~17:00 | IN ○○ CITY |
| B | MONDAY, WEDNESDAY, FRIDAY, SATURDAY | 10:00~21:00 | ×× CITY, ▽ CITY |
| ... | ... | ... | ... |

FIG. 30
a388

| VEHICLE ID | STOP POINT | | (1) | (2) | (3) | (4) | ... |
|---|---|---|---|---|---|---|---|
| | COORDINATE (NODE) | ... | (,) | (,) | (,) | (,) | ... |
| M-1 | ARRIVAL TIME | ... | 2017/04/30/8:00 | 2017/04/30/8:30 | 2017/04/30/8:50 | 2017/04/30/9:15 | ... |
| | ID OF SERVICE APPLICANT, BOARDING AND EXITING | ... | — | 0001, BOARDING | 0001, EXITING | — | ... |
| | ID OF SERVICE PROVIDER, BOARDING AND EXITING | ... | A, BOARDING | — | — | A, EXITING | ... |
| ... | | | | | | | |

FIG. 32 a388

| VEHICLE ID | STOP POINT | ... | (1) | (2) | (3) | (3) | (4) | ... |
|---|---|---|---|---|---|---|---|---|
| | COORDINATE (NODE) | ... | (, ) | (, ) | (, ) | (, ) | (, ) | ... |
| | ARRIVAL TIME | ... | 2017/04/30/8:00 | 2017/04/30/8:30 | 2017/04/30/8:40 | 2017/04/30/8:50 | 2017/04/30/9:15 | ... |
| M-1 | ID OF SERVICE APPLICANT, BOARDING AND EXITING | ... | — | 0001, BOARDING | — | 0001, EXITING | — | ... |
| | ID OF SERVICE APPLICANT, BOARDING AND EXITING | ... | — | — | 0002, BOARDING | 0002, EXITING | — | ... |
| | ID OF SERVICE PROVIDER, BOARDING AND EXITING | ... | A, BOARDING | — | — | — | A, BOARDING | ... |
| ... | | | | | | | | |

FIG. 36
a388

| VEHICLE ID | STOP POINT | | ... | (1) | (2) | (3) | (4) | ... |
|---|---|---|---|---|---|---|---|---|
| M-1 | COORDINATE (NODE) | | ... | (,) | (,) | (,) | (,) | ... |
| | ARRIVAL TIME | | ... | 2017/04/30/8:00 | 2017/04/30/8:30 | 2017/04/30/8:50 | 2017/04/30/9:15 | ... |
| | ID OF SERVICE APPLICANT, BOARDING AND EXITING | | ... | 0001, BOARDING | - | 0001, EXITING | - | ... |
| | ID OF SERVICE PROVIDER, BOARDING AND EXITING | | ... | - | A, BOARDING | - | A, EXITING | ... |
| ... | | | | | | | | |

FIG. 38 a388

| VEHICLE ID | STOP POINT | | (1) | (2) | (3) | ... |
|---|---|---|---|---|---|---|
| | COORDINATE (NODE) | ... | (,) | (,) | (,) | ... |
| M-1 | ARRIVAL TIME | ... | 2017/04/30/8:00 | 2017/04/30/8:30 | 2017/04/30/8:50 | ... |
| | ID OF SERVICE APPLICANT, BOARDING AND EXITING | ... | 0001, BOARDING | — | 0001, EXITING | ... |
| | ID OF SERVICE PROVIDER, BOARDING AND EXITING | ... | — | A, BOARDING | A, EXITING | ... |
| ... | | | | | | |

FIG. 39 a384A

| APPLICANT ID | SERVICE TYPE | NECESSITY OF POST-EXIT SERVICE | NUMBER SERVICE USERS | DESIRED POINT OF BOARDING | DESTINATION | DESIRED TIME OF BOARDING | PLAN DECIDED FLAG |
|---|---|---|---|---|---|---|---|
| 0001 | INFANT TRANSPORTATION | NO | ONE | (,) | (,) | 2017/04/30/10:20 | 1 |
| 0002 | ENGLISH CONVERSATION EDUCATION | NO | TWO | (,) | (,) | 2017/05/2/15:00 | 0 |
| 0003 | REAL ESTATE PROCEDURE ASSISTANCE | YES | TWO | (,) | (,) | 2017/05/2/15:00 | 0 |
| ... | ... | ... | ... | ... | ... | ... | ... |

FIG. 40 a386A

| SERVICE PROVIDER ID | SERVICE TYPE | SERVICE PROVIDABLE DAY | SERVICE PROVIDABLE TIME SLOT | SERVICE PROVIDABLE AREA |
|---|---|---|---|---|
| A | INFANT TRANSPORTATION | WEEKDAY | 09:00~17:00 | IN ○○ CITY |
| B | MASSAGE | MONDAY, WEDNESDAY, FRIDAY, SATURDAY | 10:00~21:00 | ×× CITY, ▽ CITY |
| ... | ... | ... | ... | ... | b200 b300

FIG. 54 b421

| RESERVATION MANAGEMENT KEY | USER MANAGEMENT KEY | FACILITY MANAGEMENT KEY | FACILITY RESERVATION CONTENT | OPTIONAL SERVICE INFORMATION | RESERVATION STATUS | ... |
|---|---|---|---|---|---|---|
| 00001 | U001 | H005 | 5/1-3 LODGING | PICK-UP/DROP-OFF OPTIONS (ROUND TRIP, ○○ AIRPORT) | RESERVATION COMPLETION | ... |
| ... | ... | ... | ... | ... | ... | ... |
| ... | ... | ... | ... | ... | ... | ... |
| ... | ... | ... | ... | ... | ... | ... |

FIG. 55 b422

| RESERVATION MANAGEMENT KEY | USER MANAGEMENT KEY | VEHICLE ID | PICK-UP/DROP-OFF SCHEDULE | RESERVATION STATUS | ... |
|---|---|---|---|---|---|
| 00001 | U001 | C007 | 5/1 10:30-11:00 | RESERVATION COMPLETION | ... |
| ... | ... | ... | ... | ... | ... |
| ... | ... | ... | ... | ... | ... |
| ... | ... | ... | ... | ... | ... |

FIG. 56 b423

| VEHICLE ID | USE DATE AND TIME | NUMBER OF USERS | PICK-UP POSITION AND ARRIVAL TIME | DESTINATION AND ARRIVAL TIME | VEHICLE ALLOCATION STATUS | ... |
|---|---|---|---|---|---|---|
| C001 | 5/1 10:30-11:00 | 3 | ○○ AIRPORT | △△ HOTEL 11:00 | NOT ALLOCATED | ... |
| C002 | ... | ... | ... | ... | ... | ... |
| C003 | ... | ... | ... | ... | ... | ... |
| ... | ... | ... | ... | ... | ... | ... | d172

| EVENT ID | EVENT CONTENT |
|---|---|
| I001 | MUSIC FESTIVAL |
| I002 | FOOD FESTIVAL |
| I003 | CHERRY BLOSSOM VIEWING |
| I004 | SEA BATHING |
| I005 | AUTUMN TINT |
| I005 | SKIING |
| ... | ... |

FIG. 82 d173

| AREA ID | EVENT ID | VEHICLE ATTRIBUTE ID | NUMBER OF VEHICLES |
|---|---|---|---|
| A001 | I001 | T004 | 20 |
| | I002 | T001 | 10 |
| | | T002 | 10 |
| | ... | ... | ... |
| ... | ... | ... | ... |

FIG. 83 d174

| VEHICLE ATTRIBUTE ID | ATTRIBUTE CONTENT |
|---|---|
| T001 | FOOD (CURRY) |
| T002 | FOOD (RAMEN NOODLES) |
| T003 | CONVENIENCE STORE |
| T004 | LODGING |
| T111 | ELECTRICITY OR FUEL |
| ... | ... |

IM2
EVENT VEHICLE DISPATCH SETTING SCREEN

- EVENT SITE (AREA): A001
- EVENT: FOOD FESTIVAL
- EVENT PERIOD: 2017/7/15~2017/7/17

- DISPATCHED VEHICLES
  FOOD (CURRY)          10 UNITS
  FOOD (RAMEN NOODLES)  10 UNITS

DO YOU WANT VEHICLE DISPATCH IN THIS CONTENT ?

[ OK ]  [ CANCEL ]  ---d420 d175

| VEHICLE ATTRIBUTE ID | VEHICLE ID | VEHICLE COMMUNICATION ADDRESS | OWNER ADDRESS | POSITIONAL INFORMATION |
|---|---|---|---|---|
| T001 | C001 | * * * | * * * | (*,*) |
| | C002 | * * * | * * * | (*,*) |
| | C003 | * * * | * * * | (*,*) |
| | ... | ... | ... | (*,*) |
| T002 | C011 | * * * | * * * | (*,*) |
| ... | ... | ... | ... | ... |

FIG. 86 d176

| VEHICLE ID | NOTIFICATION FLAG | PARTICIPATION FLAG |
|---|---|---|
| C001 | 1 | 1 |
| C002 | 1 | 0 |
| C003 | 1 | 1 |
| C004 | 0 | 0 |
| ... | ... | ... |

FIG. 91 d177

| VEHICLE ID | PARKING POSITION |
|---|---|
| C001 | X1 |
| C003 | X2 |
| C202 | Y1 |
| C204 | X3 |
| ... | ... |

FIG. 96 d178

| USER ID | USER ADDRESS | VEHICLE DISPATCH FLAG | VEHICLE ID | PICK-UP PLACE ARRIVAL DATE | PICK-UP PLACE |
|---|---|---|---|---|---|
| U001 | *** | 1 | C001 | 2017/7/15 10:30 | EAST ENTRANCE OF ○○ STATION |
| U002 | *** | 1 | | | |
| U003 | *** | 0 | | | |
| U004 | *** | 1 | C001 | 2017/7/15 10:40 | FRONT OF △△ HOTEL |
| U005 | *** | 1 | C002 | 2017/7/16 13:30 | NORTH ENTRANCE OF ○○ STATION |
| ... | ... | ... | ... | ... | ... |

FIG. 116 e500-2; HISTORY INFORMATION

| OCCUPANT ID | POINTING DATE AND TIME | TARGET | SERVICE PROVIDER |
|---|---|---|---|
| 001 (Mr. A) | YYYY/MM/DD HH:MM | SIGNBOARD OF ○ STORE | XX CONVENIENCE STORE |
| | YYYY/MM/DD HH:MM | SIGNBOARD OF △ STORE | XX CONVENIENCE STORE |
| | YYYY/MM/DD HH:MM | ○ AFFILIATED STORE | XX BANK |

FOR EACH OCCUPANT ID

⋮

FIG. 117 e500-3; SERVICE PROVIDER INFORMATION

| SERVICE PROVIDER NAME | NOTIFICATION DESTINATION |
|---|---|
| XX CONVENIENCE STORE | TERMINAL DEVICE TM1 OF XX CONVENIENCE STORE |
| XX BANK | TERMINAL DEVICE TM2 OF XX BANK |

⋮ f342

| KEYWORD | VEHICLE ID | CONTENT DATA |
|---|---|---|
| CHARACTER A | Va001 | C001, C002 |
| | Vb001 | C003 |
| | ... | ... |
| CHARACTER B | Va001 | C111 |
| | Vb001 | C112 |
| | ... | ... |
| ... | ... | ... |

FIG. 122 f344

| VEHICLE TYPE IDENTIFICATION INFORMATION | ADVERTISEMENT INFORMATION |
|---|---|
| Va | A001、A002 |
| Vb | B001、B002、B003 |
| ... | ... |

FIG. 123 f346

| VEHICLE ID | PROVISION DATE AND TIME | CONTENT DATA | ADVERTISEMENT INFORMATION |
|---|---|---|---|
| Va001 | 2017/6/14 10:30 | C001、C002 | |
| | 2017/6/20 15:00 | C003 | A001 |
| | ... | ... | ... |
| Vb001 | 2017/6/20 19:00 | C112 | A002、A003 |
| ... | ... | ... | ... |

FIG. 125 f278A

| VEHICLE ENVIRONMENT ID | VEHICLE ENVIRONMENT DETAILS | CONTENT DISPLAY FLAG | CONTENT IDENTIFICATION ID | ADVERTISEMENT DISPLAY FLAG | ADVERTISEMENT IDENTIFICATION ID |
|---|---|---|---|---|---|
| E001 | TRAVEL NEAR HOUSE | 0 | | 0 | |
| E002 | TRAVEL NEAR STATION A | 1 | C001 | 0 | |
| E003 | TRAVEL NEAR STATION B | 1 | C001 | 1 | A001 |
| E004 | NUMBER OF PERSONS PAYING ATTENTION ON VEHICLE IS 1 OR MORE | 1 | C003 | 0 | |
| E005 | NUMBER OF PERSONS PAYING ATTENTION ON VEHICLE IS 3 OR MORE | 1 | C003 | 1 | A002 |
| E006 | TRAVEL ON HIGHWAY | 0 | | 0 | |
| ... | ... | ... | ... | ... | ... |

FIG. 134 f839

USER 001

| VEHICLE ENVIRONMENT ID | VEHICLE ENVIRONMENT DETAILS | CONTENT IDENTIFICATION ID | PERMISSION/ NO-PERMISSION OF USE |
|---|---|---|---|
| E001 | TRAVEL NEAR HOUSE | C010 (PRIORITY 1)<br>C015 (PRIORITY 2) | PERMISSION OF USE |
| E001 | TRAVEL NEAR STATION A | C011 (PRIORITY 1)<br>C016 (PRIORITY 2) | PERMISSION OF USE |
| E001 | TRAVEL NEAR STATION B | C012 | NO-PERMISSION OF USE |
| ⋮ | ⋮ | ⋮ | ⋮ |

FIG. 135

USER 001

| VEHICLE ENVIRONMENT ID | DEGREE OF ATTENTION | DATE AND TIME |
|---|---|---|
| E001 | HIGH | ... |
| E001 | HIGH | ... |
| E001 | HIGH | ... |
| ⋮ | ⋮ | ⋮ | f839

USER 001

CHANGE C015 TO PRIORITY 1

| VEHICLE ENVIRONMENT ID | VEHICLE ENVIRONMENT DETAILS | CONTENT IDENTIFICATION ID | PERMISSION/ NO-PERMISSION OF USE |
|---|---|---|---|
| E001 | TRAVEL NEAR HOUSE | C015 (PRIORITY 1)<br>C010 (PRIORITY 2) | PERMISSION OF USE |
| E001 | TRAVEL NEAR STATION A | C011 (PRIORITY 1)<br>C016 (PRIORITY 2) | PERMISSION OF USE |
| E001 | TRAVEL NEAR STATION B | C012 | NO-PERMISSION OF USE |
| ⋮ | ⋮ | ⋮ | ⋮ |

FIG. 149 g322

| INTERFACE ID | OPERATION INTERFACE ID | TYPE | EXTERNAL EQUIPMENT ID | EXTERNAL EQUIPMENT INTERFACE ID | EXAMPLE |
|---|---|---|---|---|---|
| I001 | V001 | On/Off | D011 | D011A | ON/OFF OF POWER SUPPLY OF EXTERNAL EQUIPMENT |
| I002 | V002 | On/Off | D012 | D012A | ON/OFF OF POWER SUPPLY OF EXTERNAL EQUIPMENT |
| I003 | V003 | Volume | D012 | D012B | ADJUSTMENT OF EQUIPMENT LEVEL |
| I004 | V004 | Custom | D011 | D011B | DEFINITION OF INTERFACE DEDICATED TO EXTERNAL EQUIPMENT |
| ... | ... | ... | ... | ... | ... |

FIG. 161 h351

| USER ID | PASSWORD | TIME OF USE | | TIME OF USE | USE SECTION | |
|---|---|---|---|---|---|---|
| | | DAY OF WEEK | TIME SLOT | | BOARDING POINT | DESTINATION |
| 0001 | *** | MONDAY, TUESDAY, WEDNESDAY, THURSDAY, FRIDAY | 8:00~8:30 | | (x1, y1) | (x2, y2) |
| 0002 | *** | SATURDAY | 12:00~13:00 | | (x3, y3) | (x4, y4) |
| 0003 | *** | MONDAY, WEDNESDAY, FRIDAY | 8:00~8:30 | | (x5, y5) | (x2, y2) |
| ... | ... | ... | ... | | ... | ... | h353

| VEHICLE ID | TIME SLOT | DISTRICT ID | PERIODIC ROUTE ID | ON-DEMAND ROUTE ID |
|---|---|---|---|---|
| M-1 | 08:00~9:00 | 001 | 001 | |
| | 9:00~12:00 | 001 | 002 | |
| | 12:00~15:00 | 001 | 003 | |
| | 15:00~18:00 | 001 | 001 | |
| | ... | ... | ... | ... |
| M-2 | 8:00~9:00 | 001 | 004 | |
| | 9:00~12:00 | 001 | 005 | |
| | 12:00~15:00 | | | 00A |
| | 15:00~18:00 | 001 | 006 | |
| | ... | ... | ... | ... |
| ... | ... | ... | ... | ... |

FIG. 174
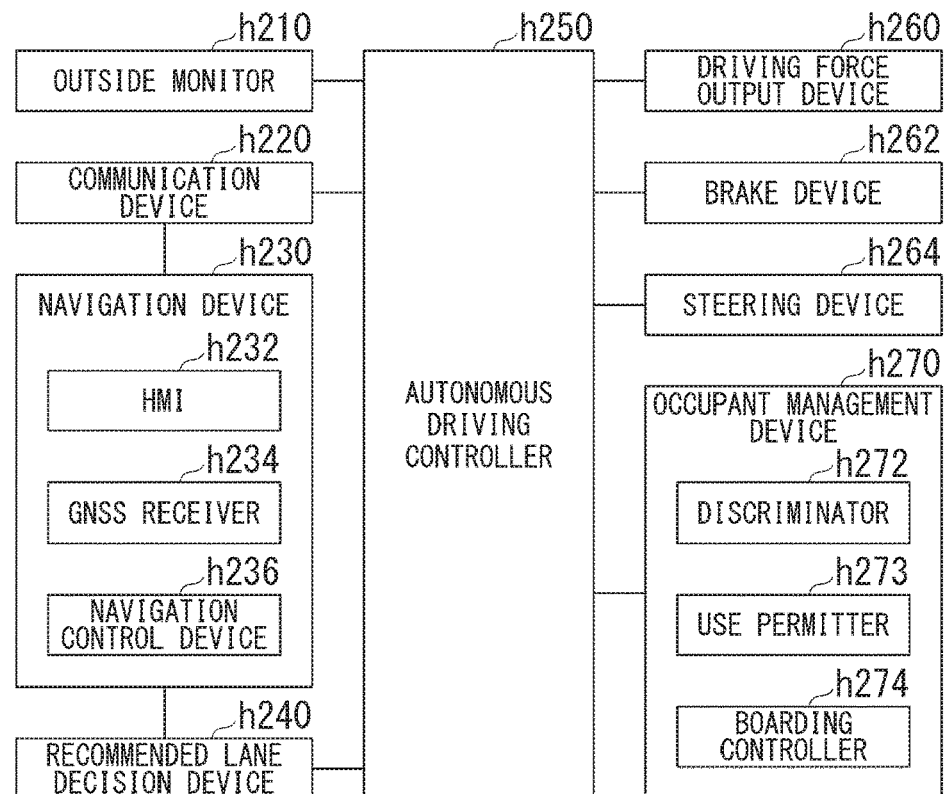
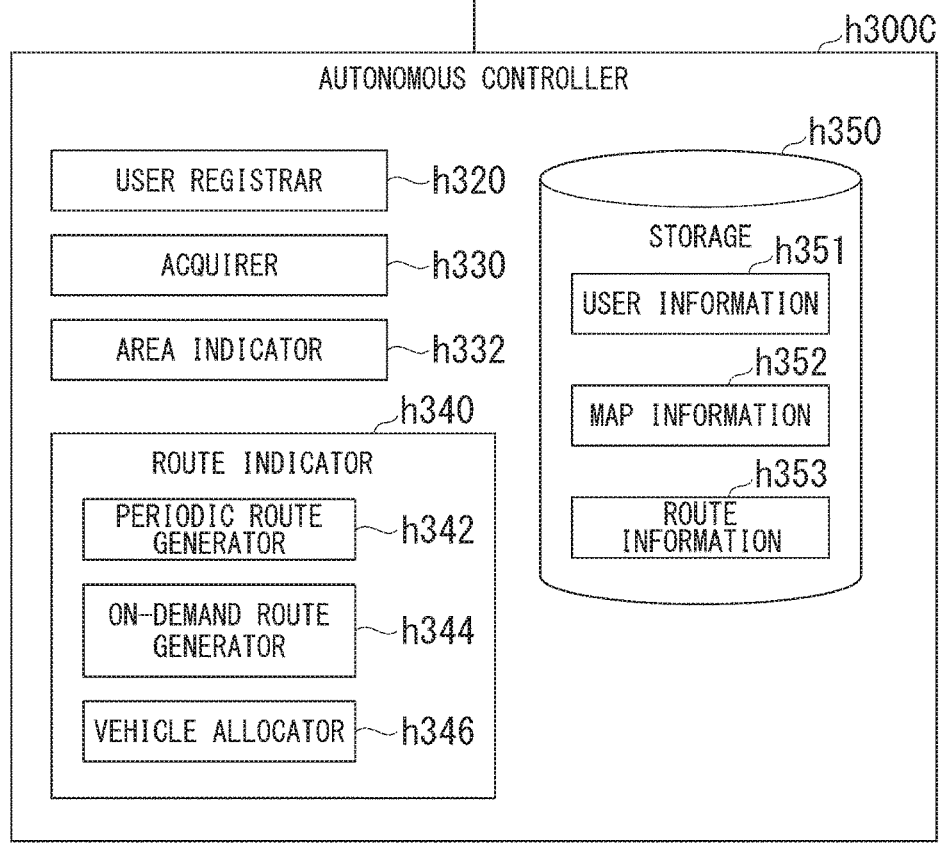

VEHICLE AND SERVICE MANAGEMENT DEVICE

TECHNICAL FIELD

The present invention relates to a management system, a management device, a management method, and a program.

Priority is claimed on Japanese Patent Application No. 2017-119131, filed Jun. 16, 2017, the content of which is incorporated herein by reference.

Priority is claimed on Japanese Patent Application No. 2017-118691, filed Jun. 16, 2017, the content of which is incorporated herein by reference.

Priority is claimed on Japanese Patent Application No. 2017-118698, filed Jun. 16, 2017, the content of which is incorporated herein by reference.

Priority is claimed on Japanese Patent Application No. 2017-118699, filed Jun. 16, 2017, the content of which is incorporated herein by reference.

Priority is claimed on Japanese Patent Application No. 2017-118745, filed Jun. 16, 2017, the content of which is incorporated herein by reference.

Priority is claimed on Japanese Patent Application No. 2017-119025, filed Jun. 16, 2017, the content of which is incorporated herein by reference.

Priority is claimed on Japanese Patent Application No. 2017-118719, filed Jun. 16, 2017, the content of which is incorporated herein by reference.

Priority is claimed on Japanese Patent Application No. 2017-118689, filed Jun. 16, 2017, the content of which is incorporated herein by reference.

Priority is claimed on Japanese Patent Application No. 2017-118915, filed Jun. 16, 2017, the content of which is incorporated herein by reference.

BACKGROUND ART

In recent years, automated driving technology for causing a vehicle to travel according to automated driving along a route to a destination has been developed (see Patent Literature 1).

CITATION LIST

Patent Literature

[Patent Literature 1]
Japanese Unexamined Patent Application, First Publication No. 2017-83446

SUMMARY OF INVENTION

Technical Problem

Incidentally, it may be preferable that an automated driving vehicle can be used for a plurality of purposes.

The present invention has been made in consideration of such circumstances and an objective of the invention is to provide a vehicle and a service management device for implementing more flexible use of vehicles.

Solution to Problem

A vehicle and a service management device according to the present invention adopt the following configurations.

(1): According to an aspect of the present invention, there is provided a vehicle including: a communicator configured to receive driving information from a management server; a controller configured to drive the vehicle on the basis of the driving information from the communicator; a manager configured to manage a compartment of the vehicle in which a service user receives a service from a service provider; and an interface set up in association with service-related information provided by the service provider and the compartment.

(2): In the above-described aspect (1), the communicator transmits a control signal for controlling the interface to the management server or the service provider using an access state of the service user for the vehicle as a trigger.

(3): In the above-described aspect (2), the interface includes an external display, and the vehicle further includes a display controller configured to execute a display form specified by the service provider in the external display with respect to the control signal.

(4): In the above-described aspect (1), the vehicle further includes a usage situation detector configured to detect a usage situation of the compartment of the vehicle, wherein the communicator transmits a detection signal of the usage situation detector to the service provider.

(5): In the above-described aspect (1), the vehicle includes an external environment detector configured to detect the surroundings of the compartment, wherein the communicator transmits a detection signal of the external environment detector to the service provider.

(6): In the above-described aspect (1), the communicator receives a service signal transmitted from the service provider, and the vehicle further includes: a compartment control signal generator configured to generate a control signal corresponding to the received service signal and transmit the control signal to equipment arranged in the compartment; and a driving control signal generator configured to transmit a control signal corresponding to the service signal to the controller.

(7): In the above-described aspect (1), the vehicle includes an attribute sharer configured to share an attribute of the compartment with the management server or the service provider, wherein the interface is set up in correspondence with the attribute.

(8): In the above-described aspect (1), the interface executes an operation on an external facility via the service provider.

(9): In the above-described aspect (1), the interface makes a route change to a specific destination provided by the service provider.

(10): In the above-described aspect (1), the interface further includes a display configured to display content provided by the service provider; and an operation information transmitter configured to transmit operation information to the service provider via the communicator.

(11): In the above-described aspect (1), the controller includes an automated driving controller configured to perform automated driving on the basis of an external environment detection sensor and a position information sensor, and the interface permits the service user to use information when the automated driving is being executed and the service user is in the vehicle.

(12): In the above-described aspect (1), the interface provides information to the service user before or after the service user gets into the compartment.

(13): In the above-described aspect (3), the vehicle further includes a storage configured to store external display content, wherein the display controller downloads the content from an external device and updates the content stored in the storage.

(14): In the above-described aspect (1), the vehicle further includes a traveling device that does not have any compartment and a first connector provided on the traveling device and connected to a superstructure so that the superstructure is removable from the traveling device, wherein the manager acquires traveling device information including version information of the traveling device from the management server and causes the superstructure having a version matching the acquired traveling device information to be connected by the first connector.

(15): According to an aspect of the present invention, there is provided a service management device including an identifier configured to identify a vehicle used by a service provider and a vehicle information provider configured to transmit information about the vehicle corresponding to the vehicle identified by the identifier to the service provider, the service management device including: a service information input configured to input service information of the service provider; and an interface controller configured to control information delivery between the vehicle and the service provider by transmitting a control signal to the vehicle on the basis of the service information.

(16): In the above-described aspect (15), the interface controller allows the vehicle information provider to transmit information of a section where a service of the service provider is received to the service provider while a service user gets into the vehicle.

(17): In the above-described aspect (15), the interface controller includes a route updater configured to allow a route or a destination of the vehicle to be updated according to a control signal from the service provider.

(18): In the above-described aspect (15), the interface controller further includes an external display controller configured to control an external display of the vehicle according to a control signal from the service provider.

(19): In the above-described aspect (15), the interface controller includes a service operation controller configured to execute transmission of information about the vehicle to the service provider according to a control signal from the vehicle.

(20): In the above-described aspect (15), the identifier identifies the vehicle from vehicles within a specific area.

(21): In the above-described aspect (15), the identifier identifies the vehicle on the basis of position information provided by the service provider and getting-into/out position information provided by either the service provider or a service user.

(22): In the above-described aspect (21), the identifier identifies a plurality of vehicles with respect to the service provider on the basis of the position information and the getting-into/out position information.

(23): In the above-described aspect (15), the service management device further includes a vehicle position manager configured to detect positions of a plurality of vehicles; and a service position manager configured to associate the service information corresponding to the plurality of vehicles, wherein the interface controller provides the plurality of vehicles, a service user, or the service provider with environment information on the basis of position information and service information acquired from the plurality of vehicles.

(24): In the above-described aspect (23), the interface controller determines a service execution situation of an area as the environment information on the basis of the position information acquired from the plurality of vehicles and service attribute information corresponding to the plurality of vehicles.

(25): In the above-described aspect (15), the service management device further includes a storage configured to store a display form of the vehicle for the service information, wherein the interface controller enables content data stored in the storage to be selectively used in the vehicle on the basis of the service information.

Advantageous Effects of Invention

According to (1), it is possible to implement more flexible use of vehicles.

BRIEF DESCRIPTION OF DRAWINGS

FIG. 27 is a diagram showing an example of details of a fellow passenger request list a384.

FIG. 28 is a diagram showing an example of details of available service provision range information a386.

FIG. 30 is a diagram showing an example of details of driving schedule information a388 reflecting the fellow passenger plan shown in FIG. 29.

FIG. 32 is a diagram showing an example of details of driving schedule information a388 reflecting the fellow passenger plan shown in FIG. 31.

FIG. 36 is a diagram showing an example of details of driving schedule information a388 reflecting the fellow passenger plan shown in FIG. 35.

FIG. 38 is a diagram showing an example of details of driving schedule information a388 reflecting the fellow passenger plan shown in FIG. 37.

FIG. 39 is a diagram showing an example of details of a fellow passenger request list a384A according to a third modified example of the second embodiment.

FIG. 40 is a diagram showing an example of details of available service range information a386A according to a third modified example of the second embodiment.

FIG. 54 is a diagram showing an example of facility reservation information b421.

FIG. 55 is a diagram showing an example of vehicle dispatch reservation information b422.

FIG. 56 is a diagram showing an example of vehicle dispatch status information b423.

FIG. 82 is a diagram showing an example of details of a vehicle dispatch table d173.

FIG. 83 is a diagram showing an example of details of a vehicle attribute table d174.

FIG. 86 is a diagram showing an example of details of notification result management information d176.

FIG. 91 is a diagram showing an example of details of parking position management information d177.

FIG. 96 is a diagram showing an example of details of user management information d178.

FIG. 116 is a diagram showing an example of details of history information e500-2.

FIG. 117 is a diagram showing an example of details of service provider information e500-3.

FIG. 120 is a diagram showing an example of a content acquisition request screen IM1.

FIG. 121 is a diagram showing an example of details of vehicle-specific content data f342.

FIG. 122 is a diagram showing an example of details of vehicle model-based advertisement information f344.

FIG. 123 is a diagram showing an example of details of user information f346.

FIG. 124 is a diagram showing an example of a content acquisition result screen IM2.

FIG. 125 is a diagram showing an example of details of display condition data f278A.

FIG. 126 is an explanatory diagram showing a state in which content is displayed on a vehicle exterior display f272.

FIG. 127 is an explanatory diagram showing the speed control of a vehicle f200.

FIG. 128 is an explanatory diagram showing display control of advertisement information.

FIG. 129 is a flowchart showing an example of a flow of a process to be executed by the vehicle f200.

FIG. 130 is a configuration diagram of a service providing system f2 including a vehicle f200 according to a first modified example of the seventh embodiment.

FIG. 131 is a diagram showing an example of a configuration of a vehicle management device f210A mounted on the vehicle f200.

Figure 132:
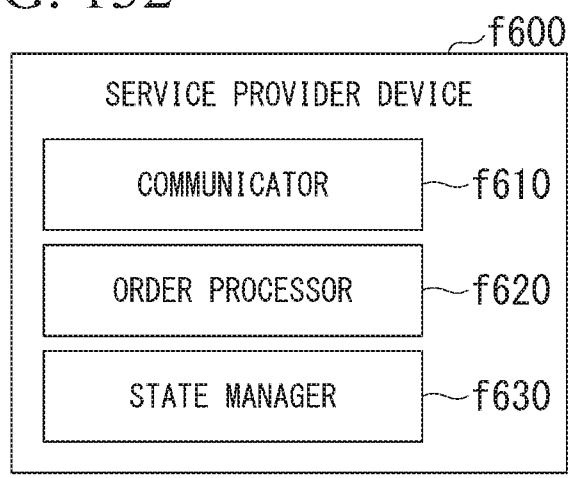

FIG. 132 is a diagram showing an example of a configuration of a service provider device f600.

Figure 133:
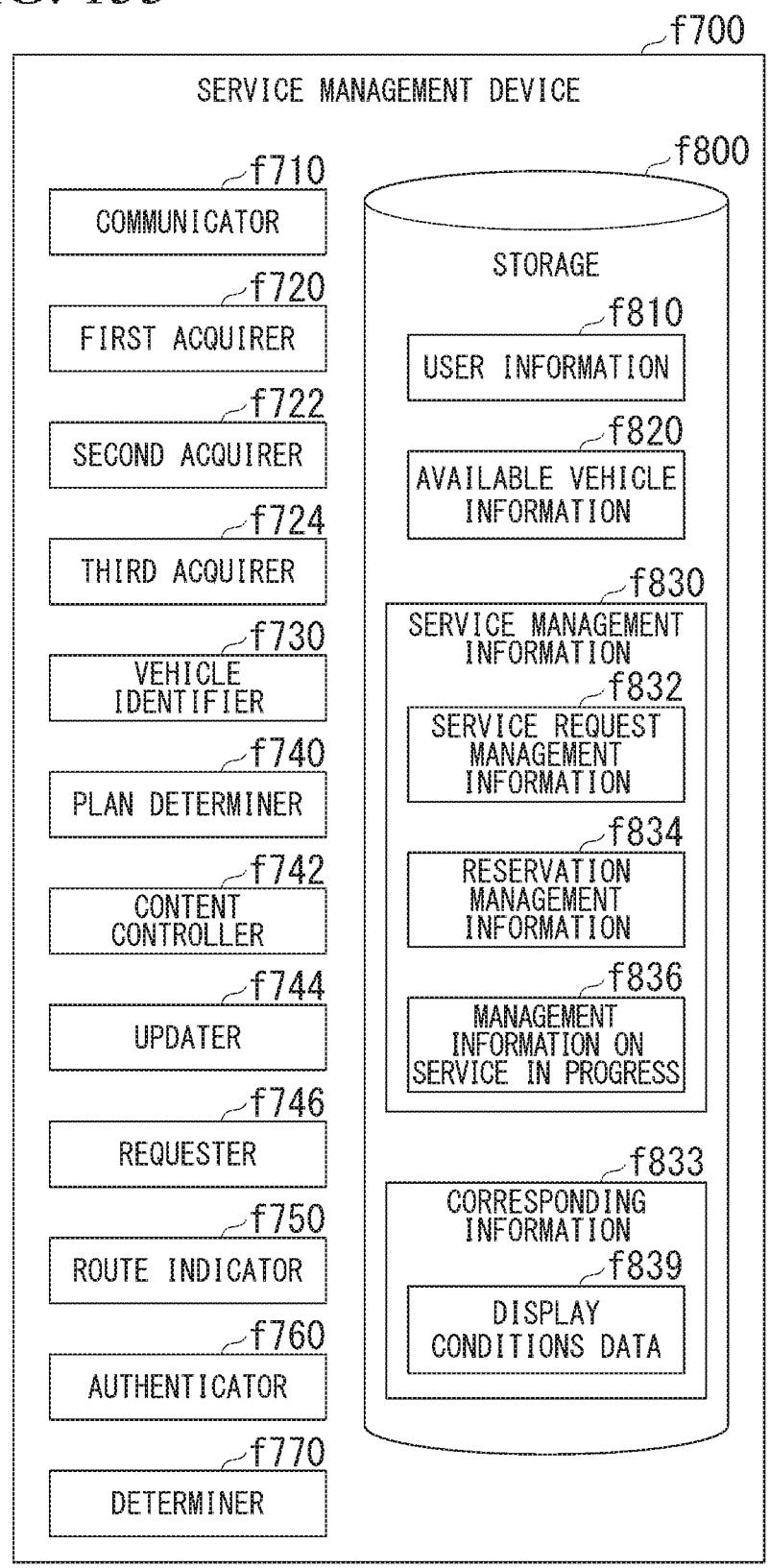

FIG. 133 is a diagram showing an example of a configuration of a service management device f700.

FIG. 134 is a diagram showing an example of details of display condition data f139.

FIG. 135 is an explanatory diagram showing a process of an updater 744.

Figure 136:
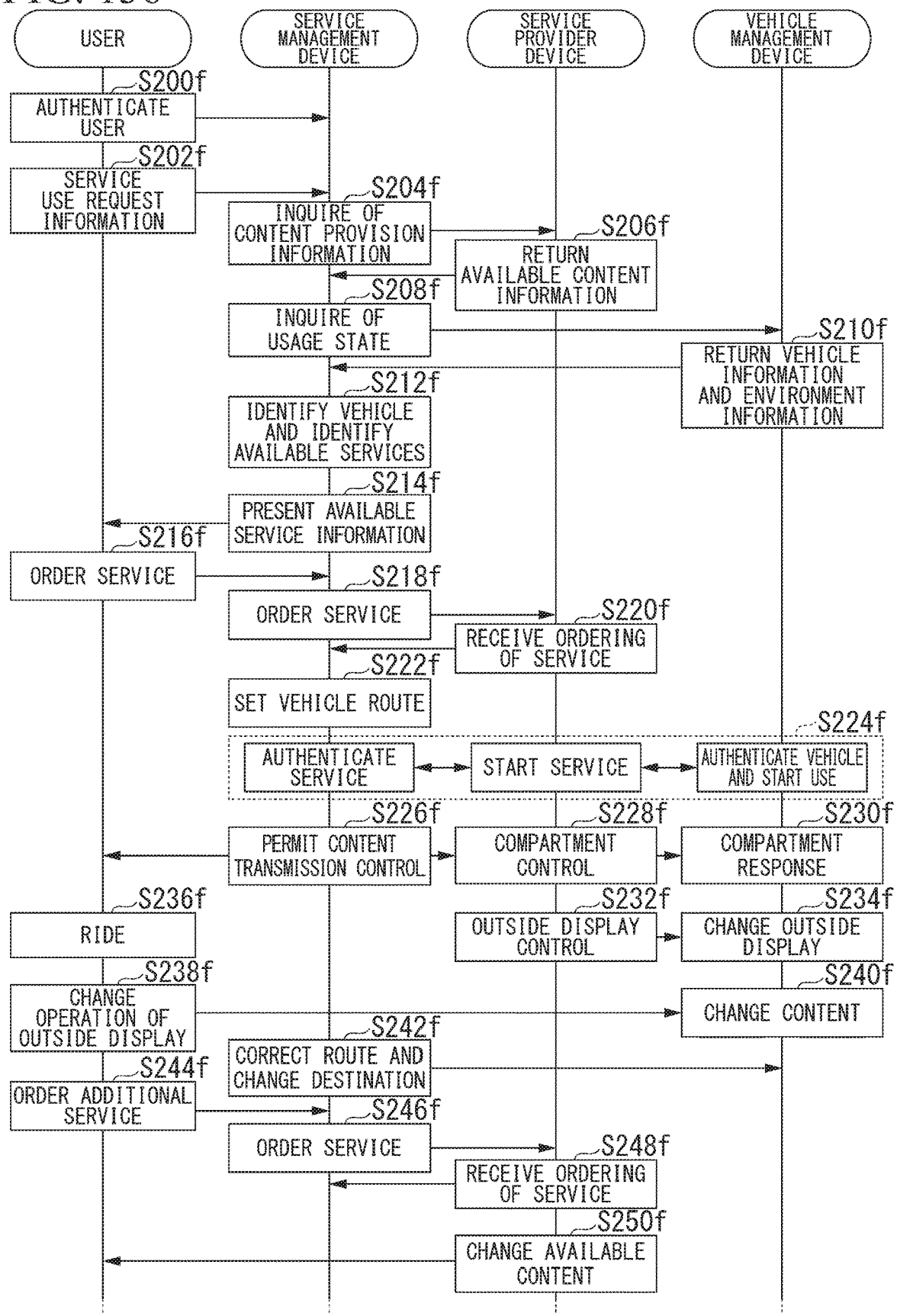

FIG. 136 is a flowchart showing an example of a flow of a process to be executed in the service providing system f2.

Figure 137:
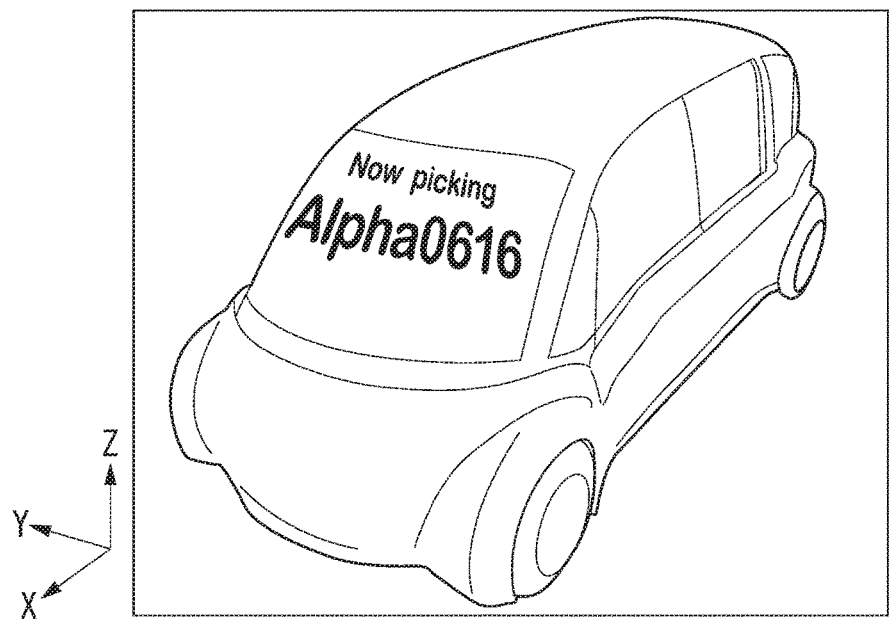

FIG. 137 is a perspective view of a vehicle f200 having the vehicle exterior display f272 on which information of a user making a reservation is displayed.

Figure 138:
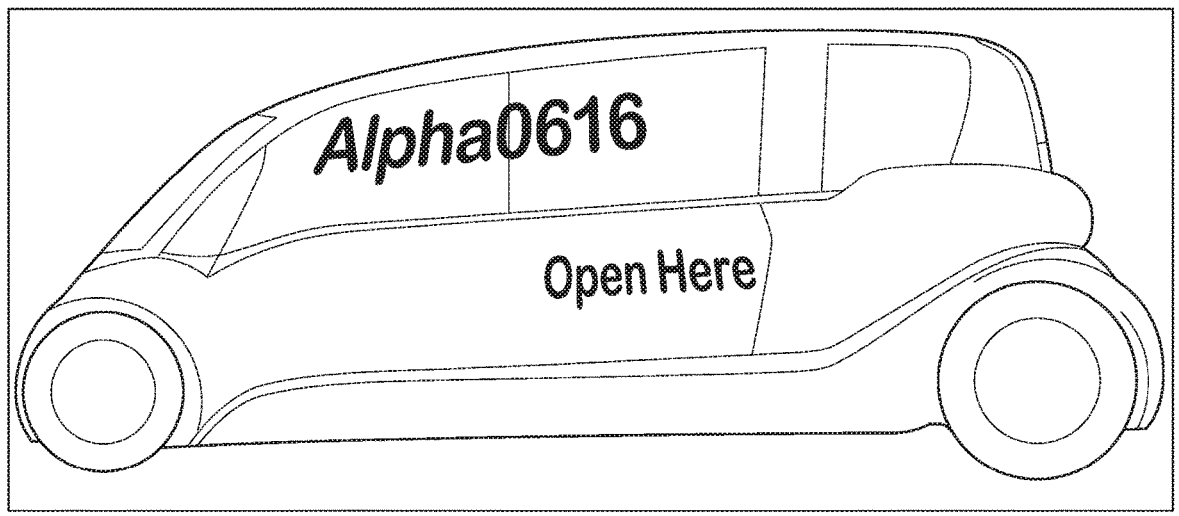

FIG. 138 is a view of the vehicle f200 having the vehicle exterior display f272 on which the information of the user making the reservation is displayed viewed in a lateral direction.

Figure 139:
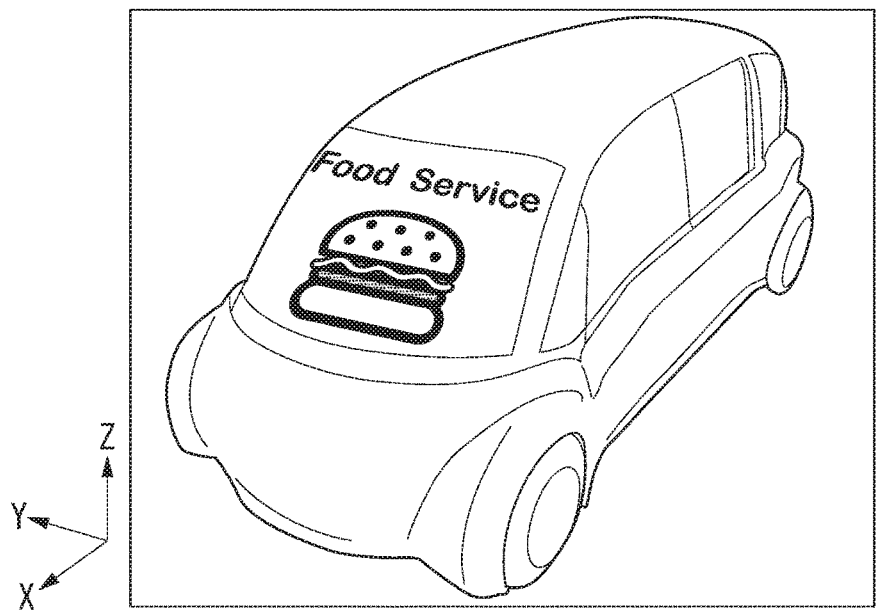

FIG. 139 is a perspective view of the vehicle f200 having the vehicle exterior display f272 on which a service attribute is displayed.

Figure 140:
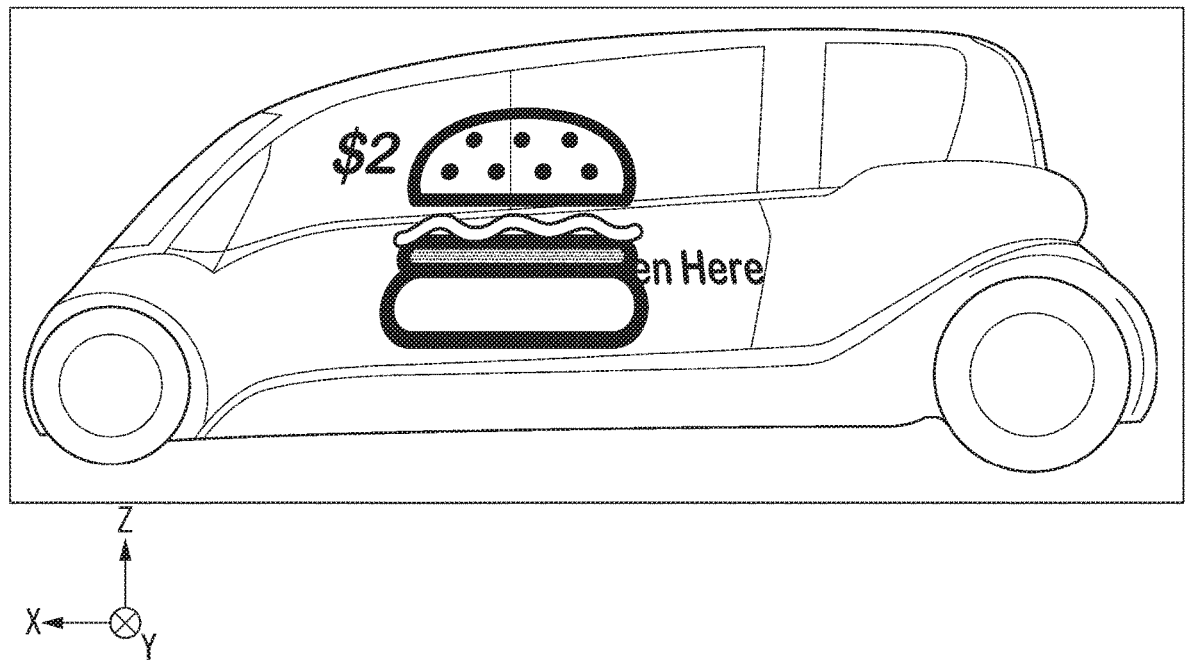

FIG. 140 is a view of the vehicle f200 having the vehicle exterior display f272 on which service attribute information is displayed viewed in a lateral direction.

Figure 141:
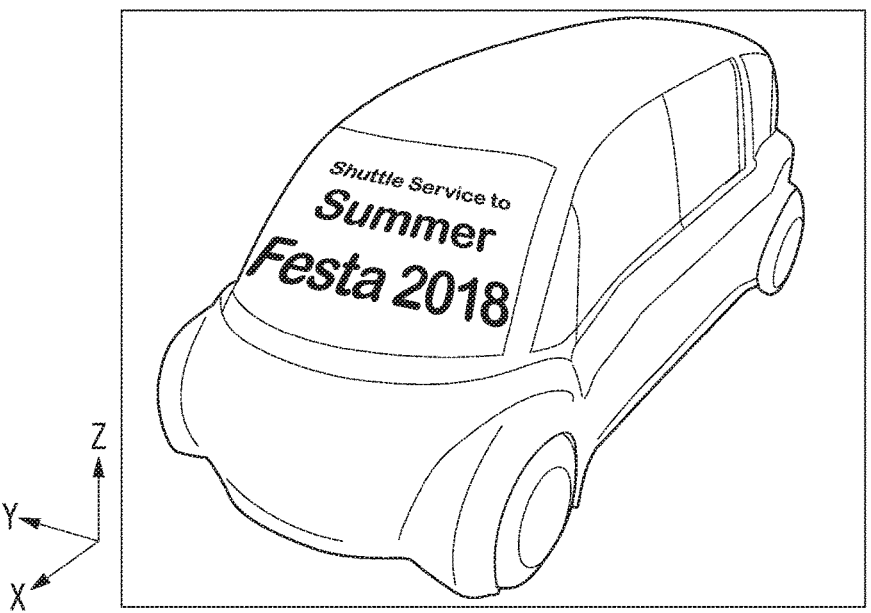

FIG. 141 is a perspective view of the vehicle f200 having the vehicle exterior display f272 on which information about an event is displayed.

Figure 142:

FIG. 142 is a view of the vehicle f200 having the vehicle exterior display f272 on which the information about the event is displayed viewed in a lateral direction.

Figure 143:
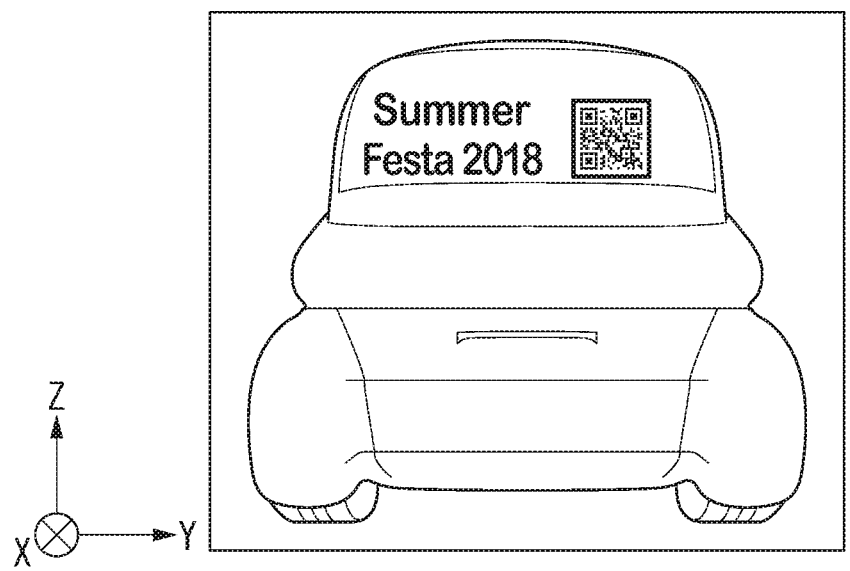

FIG. 143 is a view of the vehicle viewed from behind.

Figure 144:
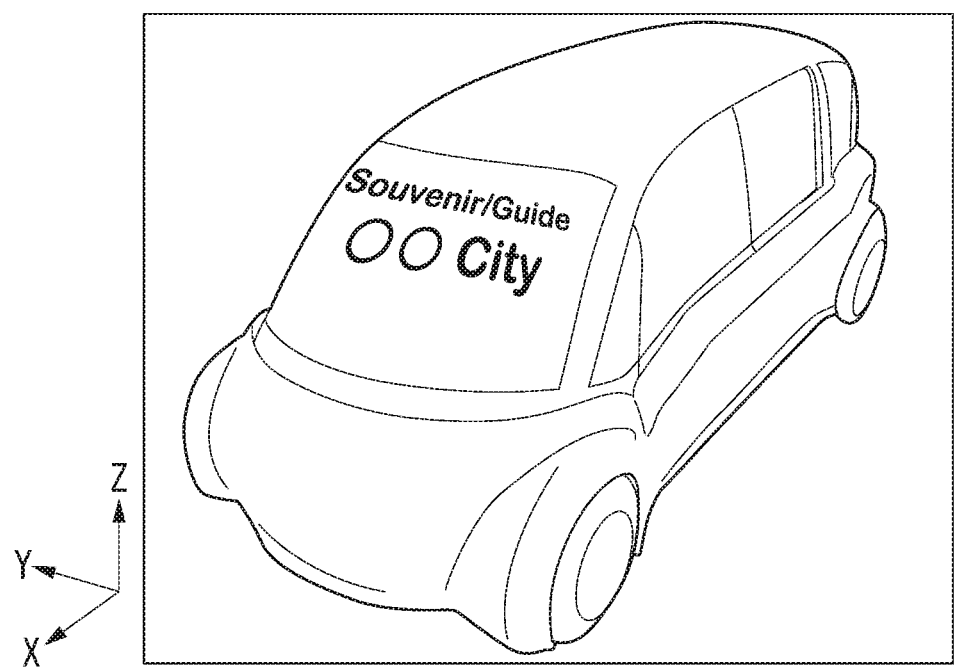

FIG. 144 is a perspective view of a vehicle f200 having the vehicle exterior display f272 on which information indicating a local circular sampler vehicle is displayed.

Figure 145:
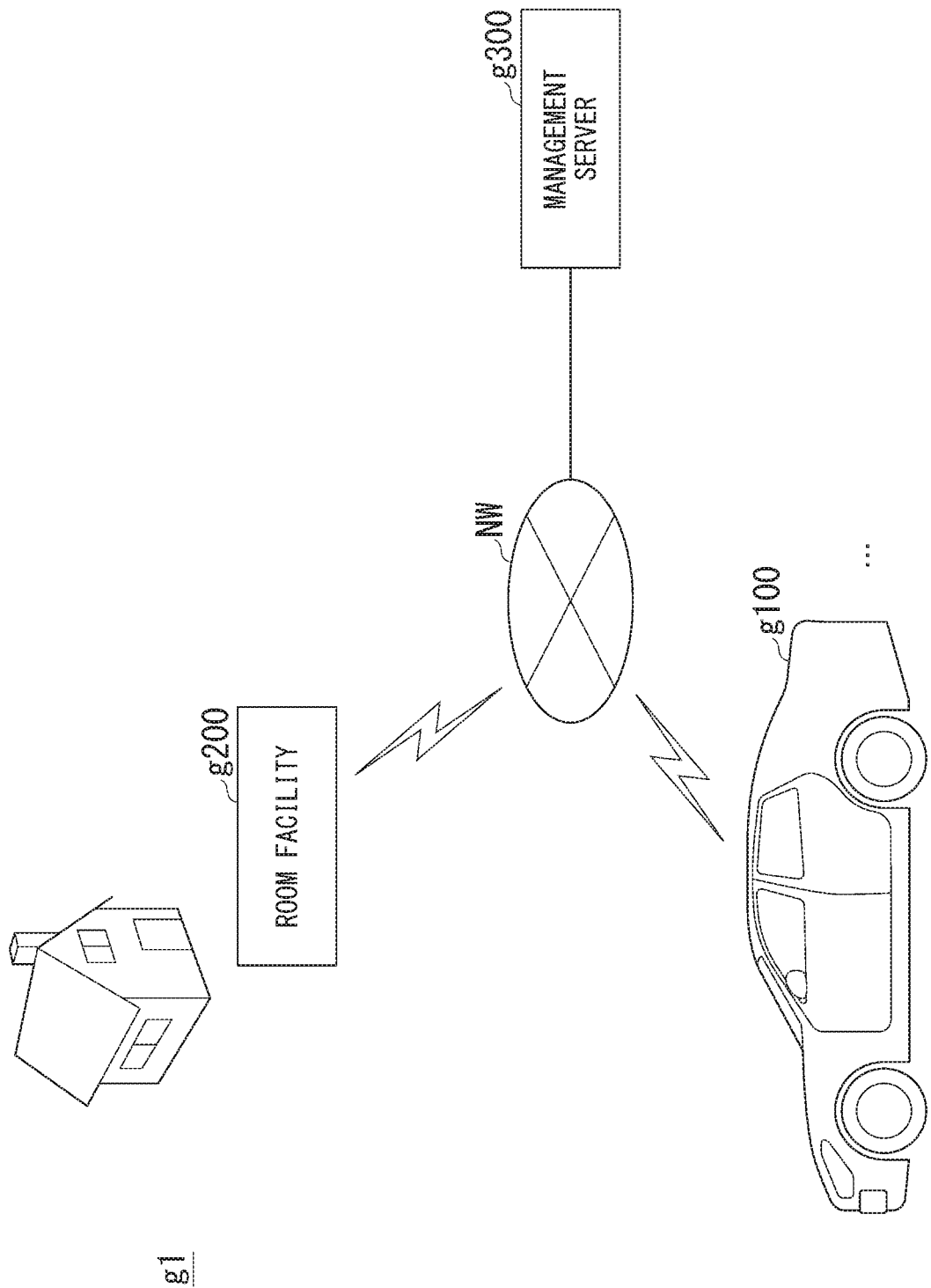

FIG. 145 is a configuration diagram of a vehicle system g1.

Figure 146:
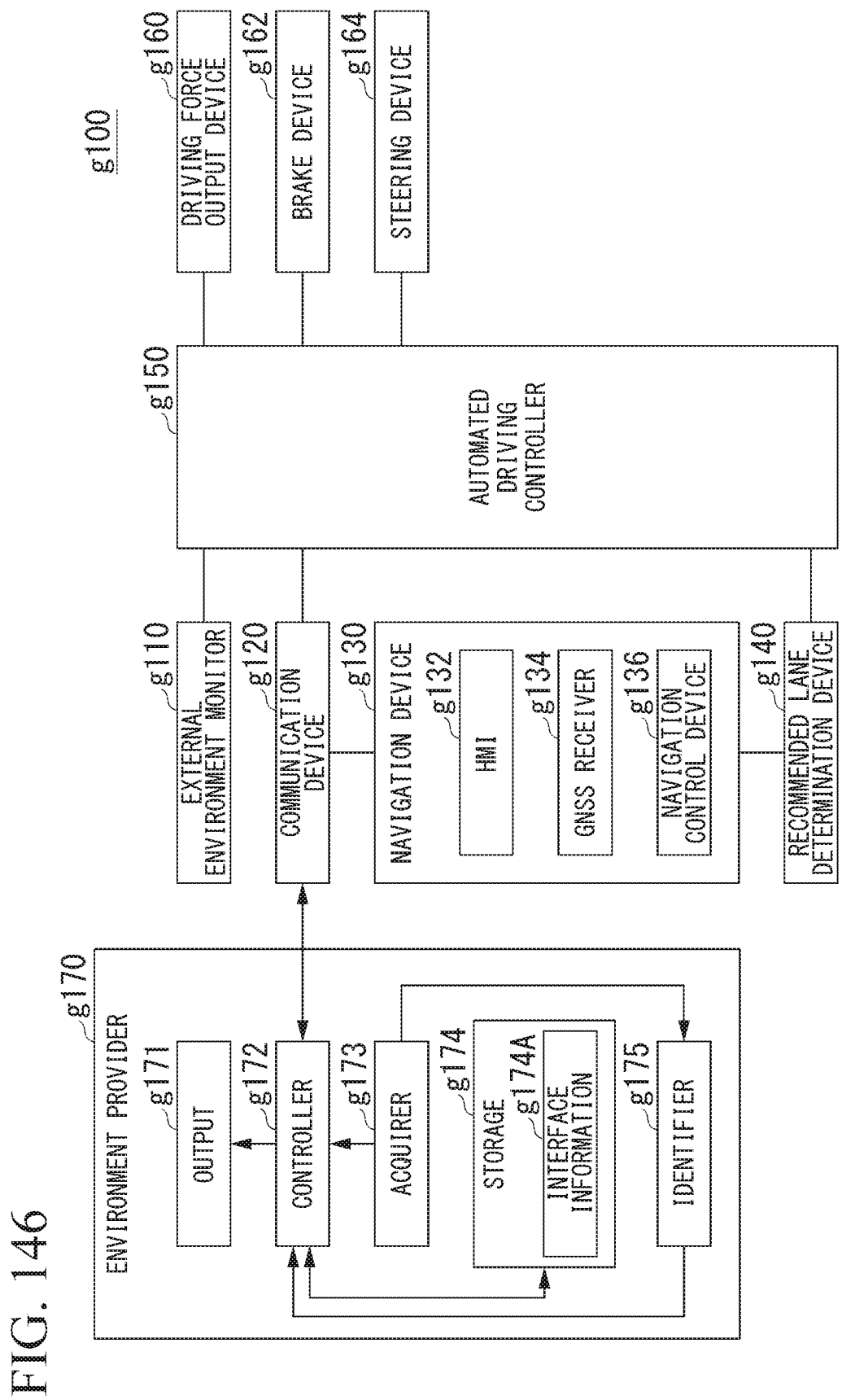

FIG. 146 is a configuration diagram of a vehicle g100.

Figure 147:
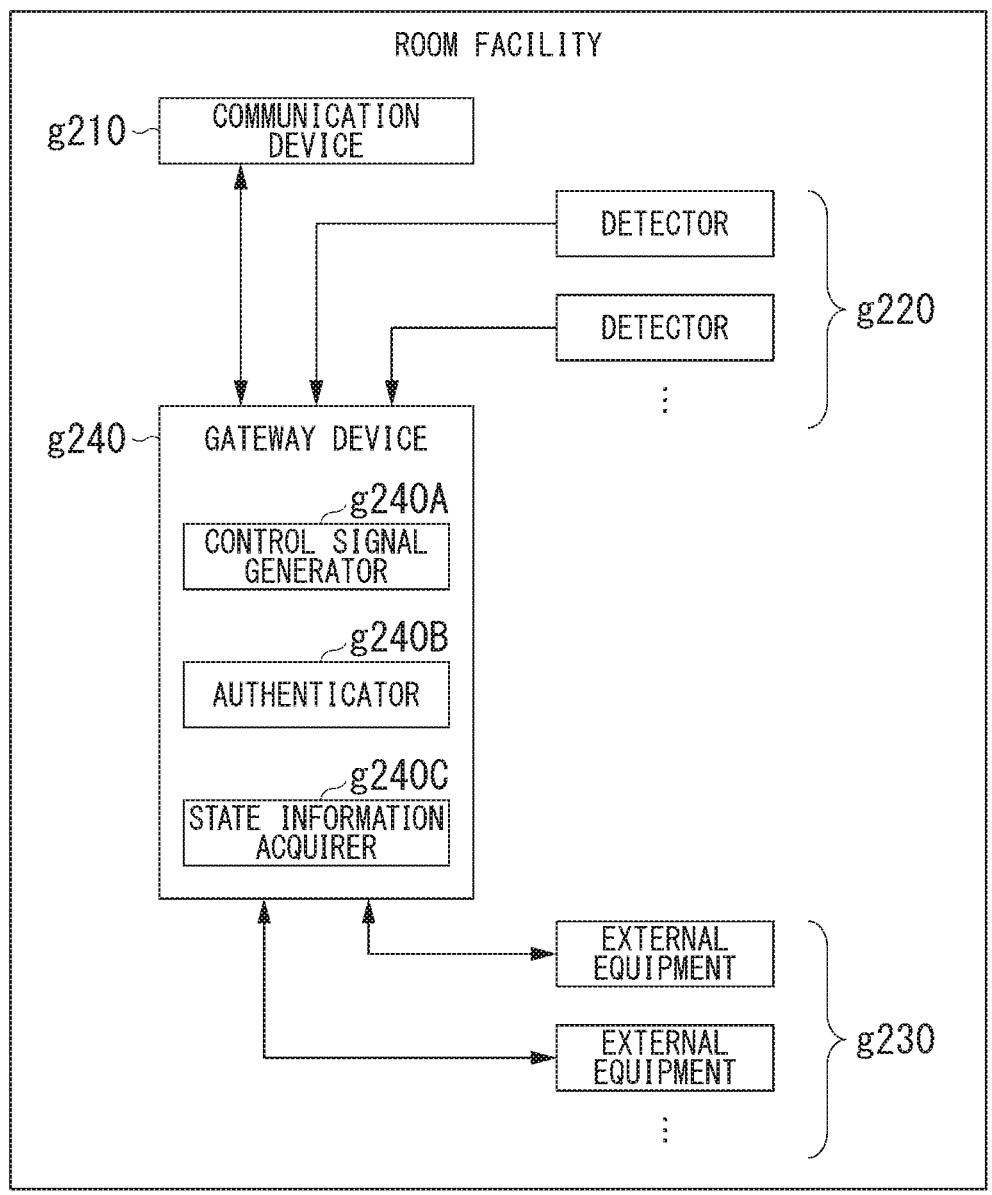

FIG. 147 is a functional configuration diagram of a room facility g200.

Figure 148:
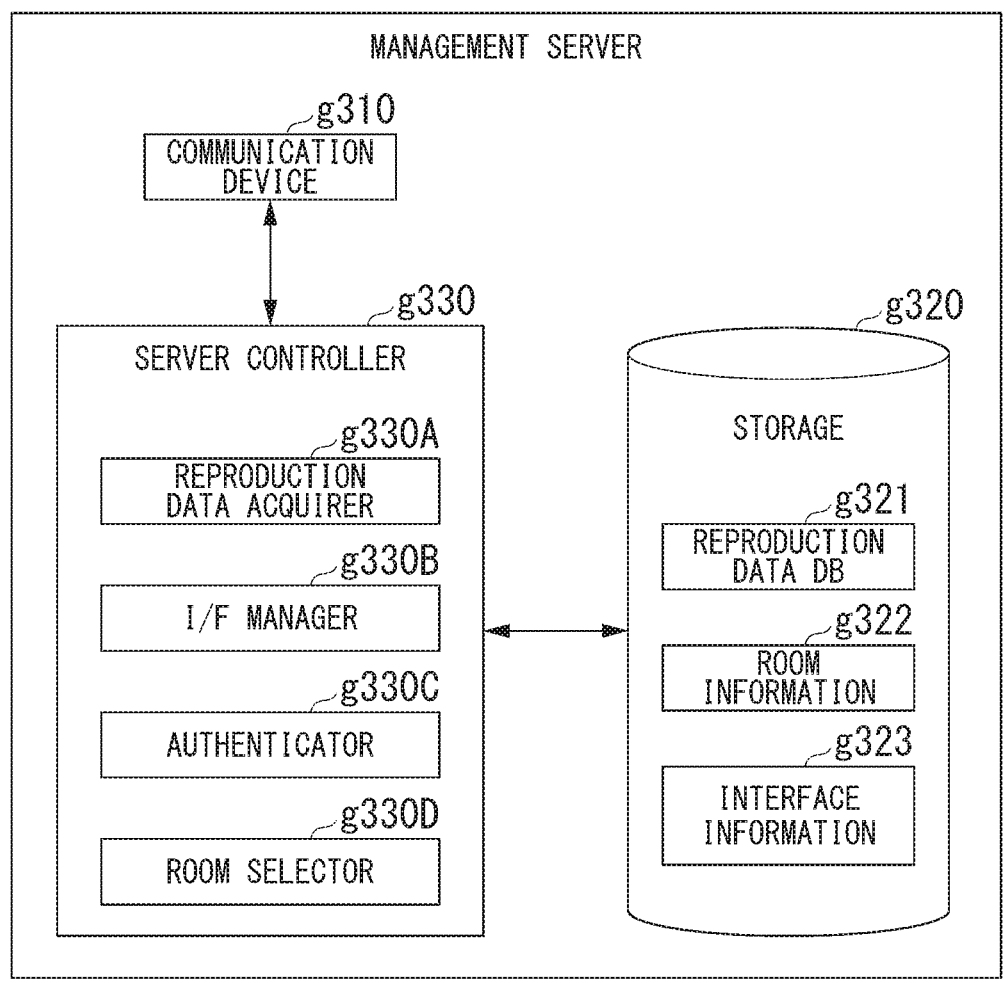

FIG. 148 is a functional configuration diagram of a management server g300.

FIG. 149 is a diagram showing an example of details of interface information g323.

Figure 150:
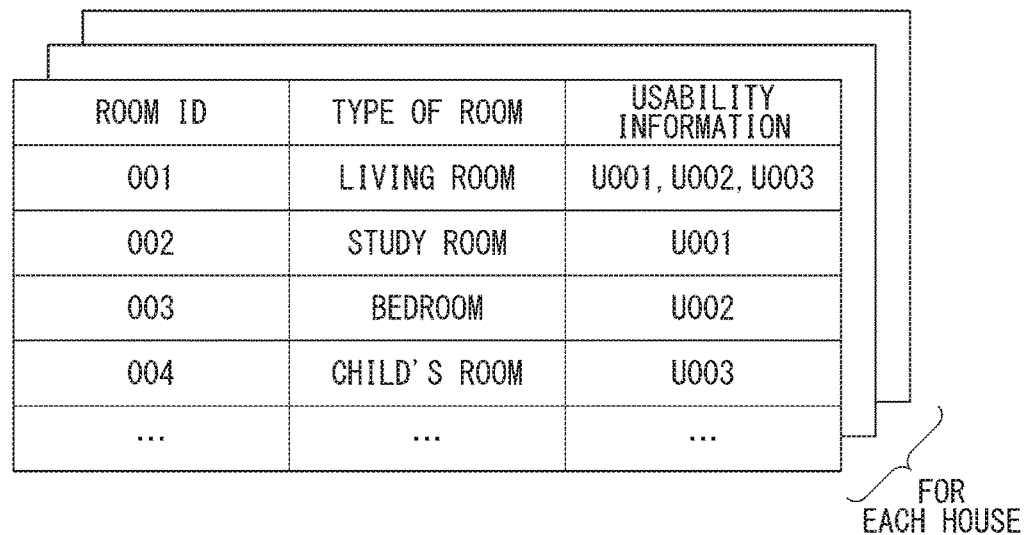

FIG. 150 is a diagram showing an example of room information g322.

Figure 151:
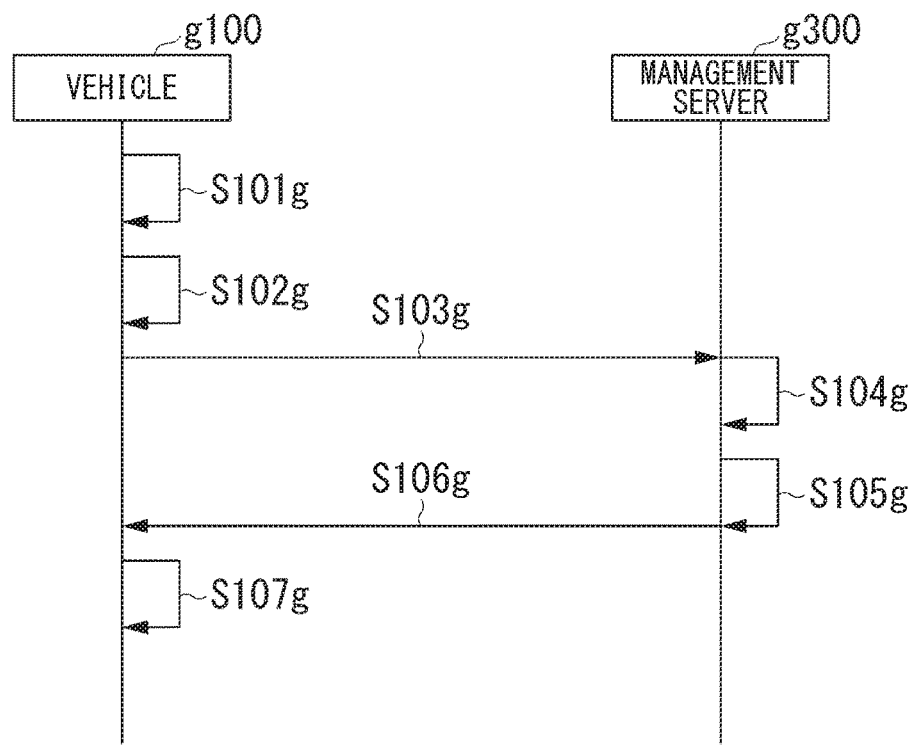

FIG. 151 is a sequence diagram showing an example of a process of the vehicle system g1.

Figure 152:
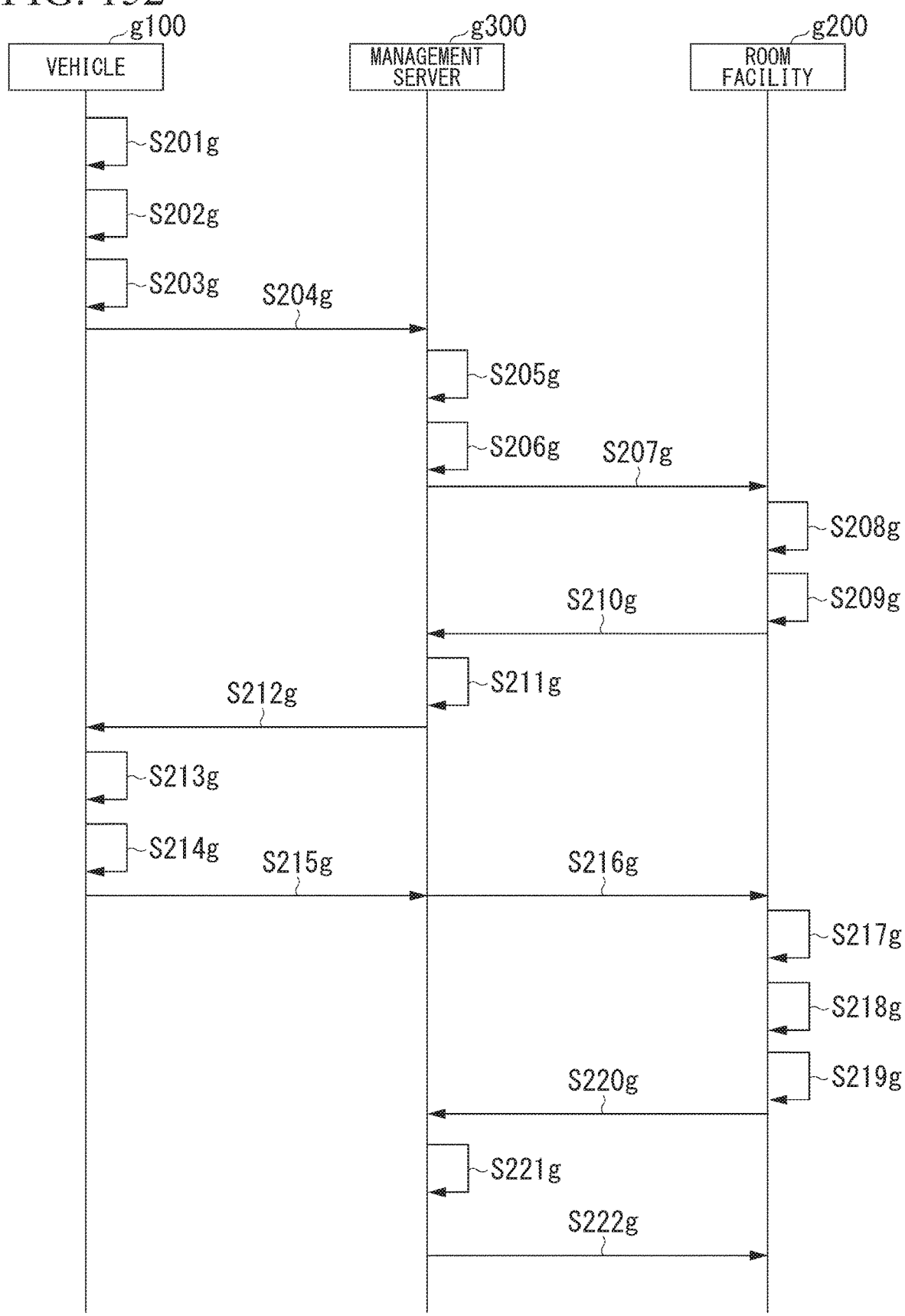

FIG. 152 is a sequence diagram showing an example of a process of the vehicle system g1.

Figure 153:
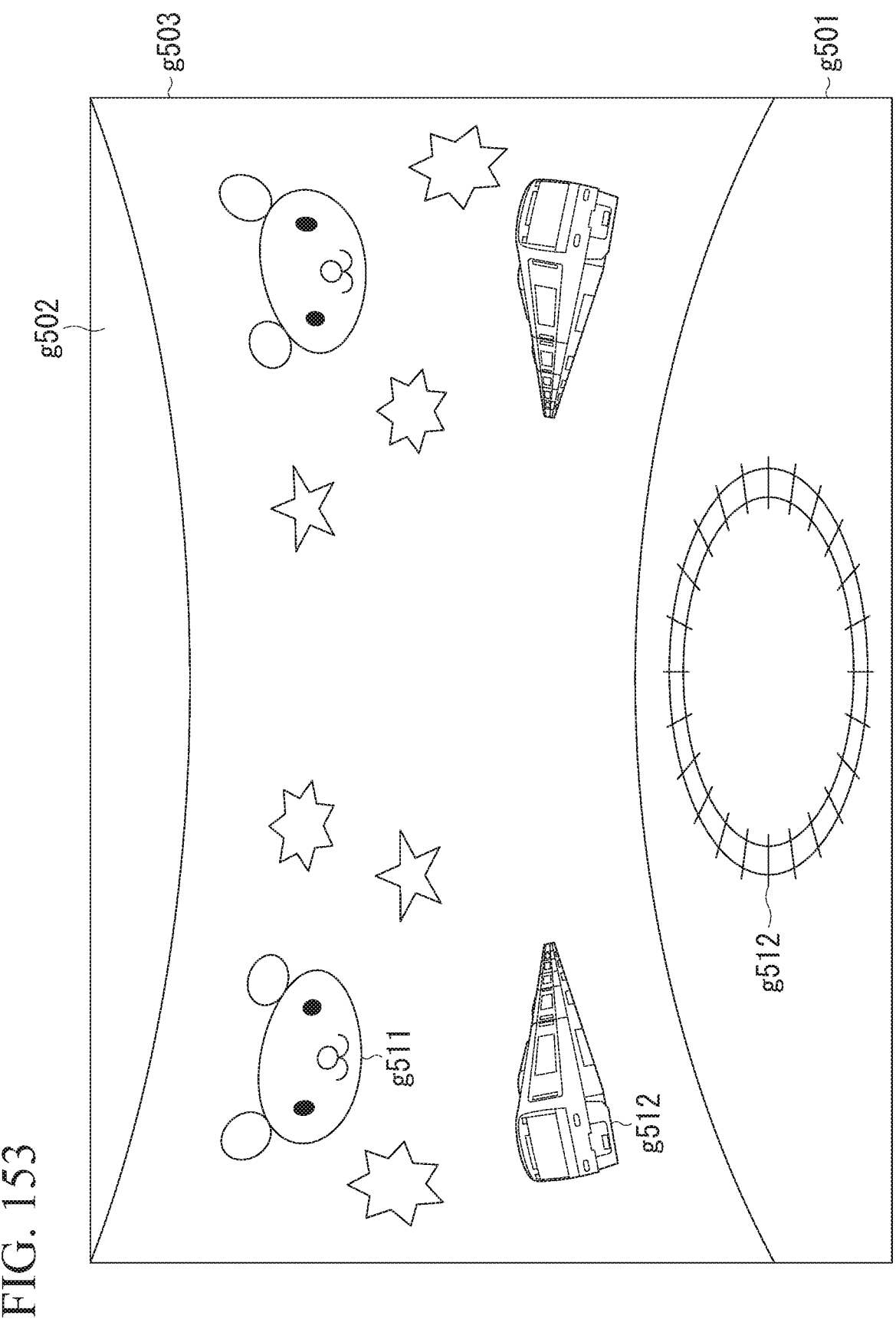

FIG. 153 is a diagram showing an example of a child's room reproduced within the vehicle g100.

Figure 154:
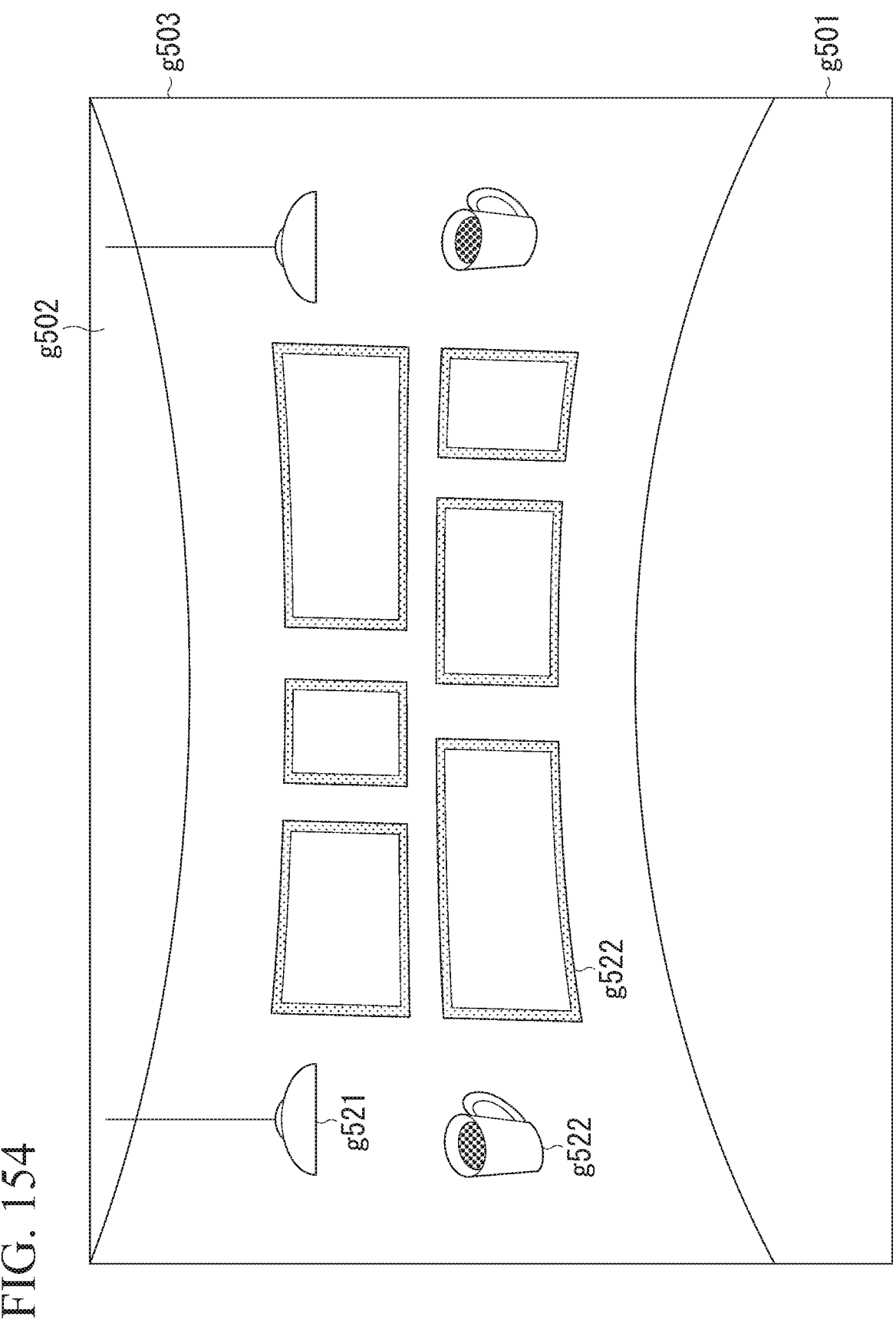

FIG. 154 is a diagram showing an example of a cafe-like room reproduced within the vehicle g100.

Figure 155:
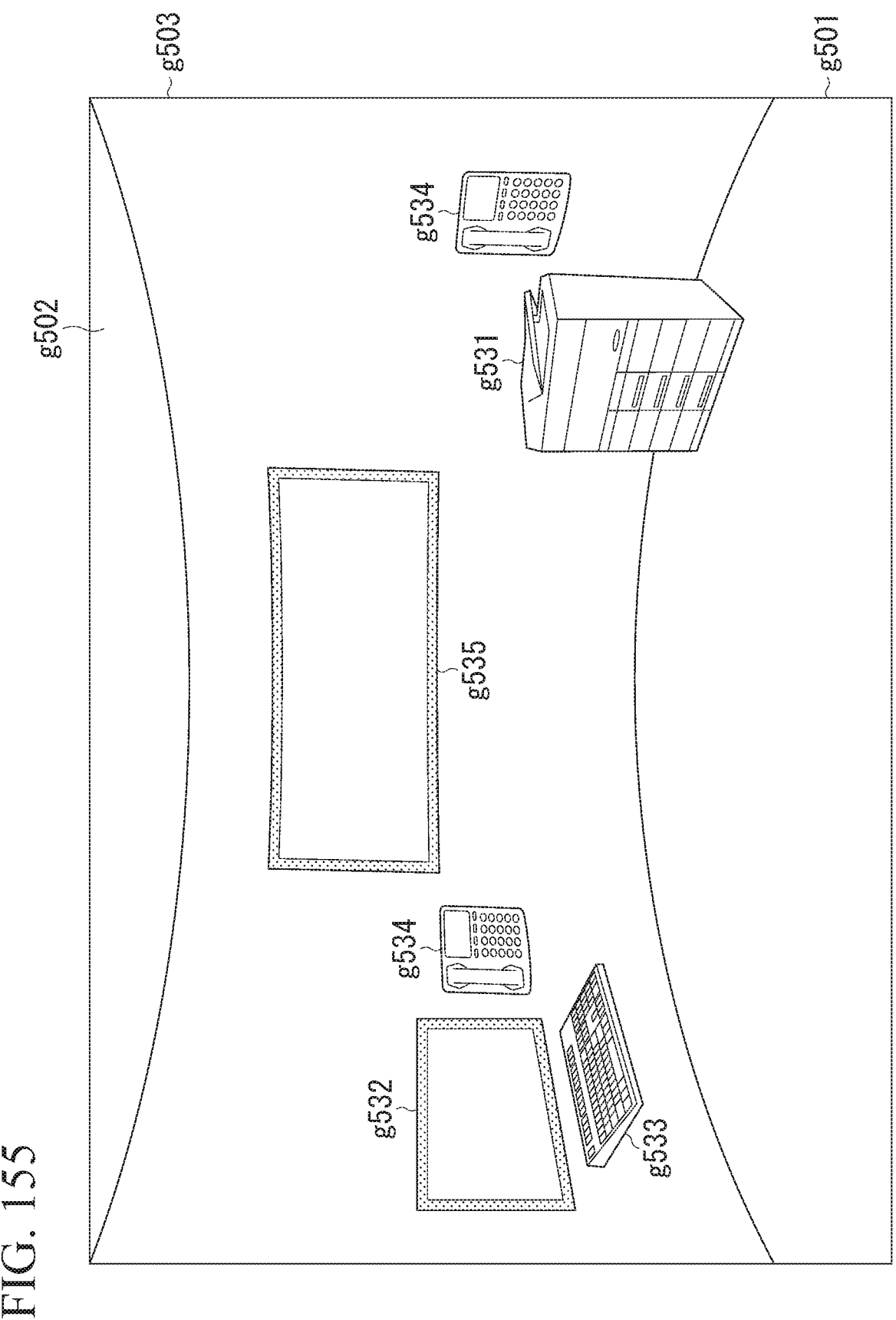

FIG. 155 is a diagram showing an example of a work room reproduced within the vehicle g100.

Figure 156:
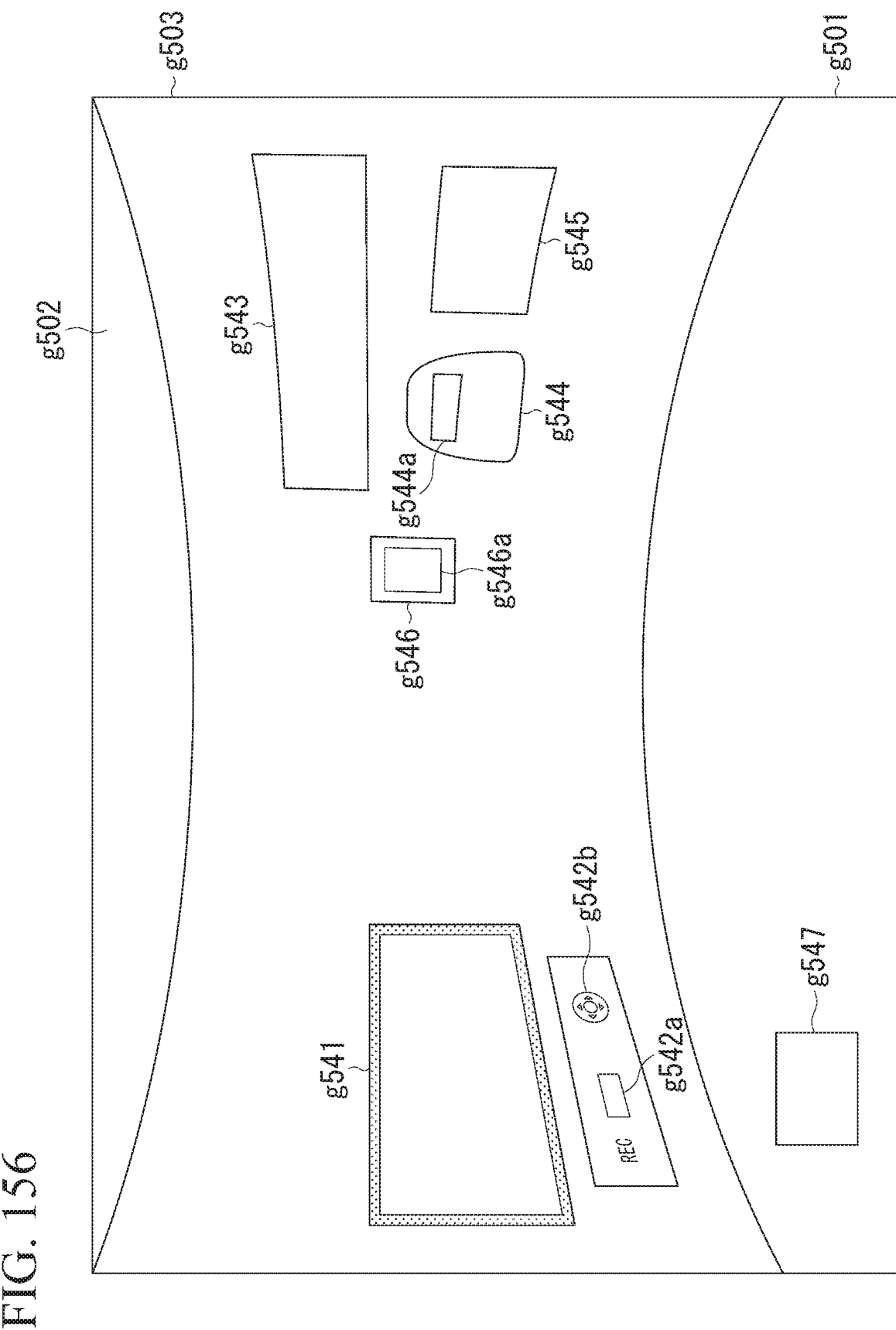

FIG. 156 is a diagram showing an example of a living room of a user's home reproduced within the vehicle g100.

Figure 157:
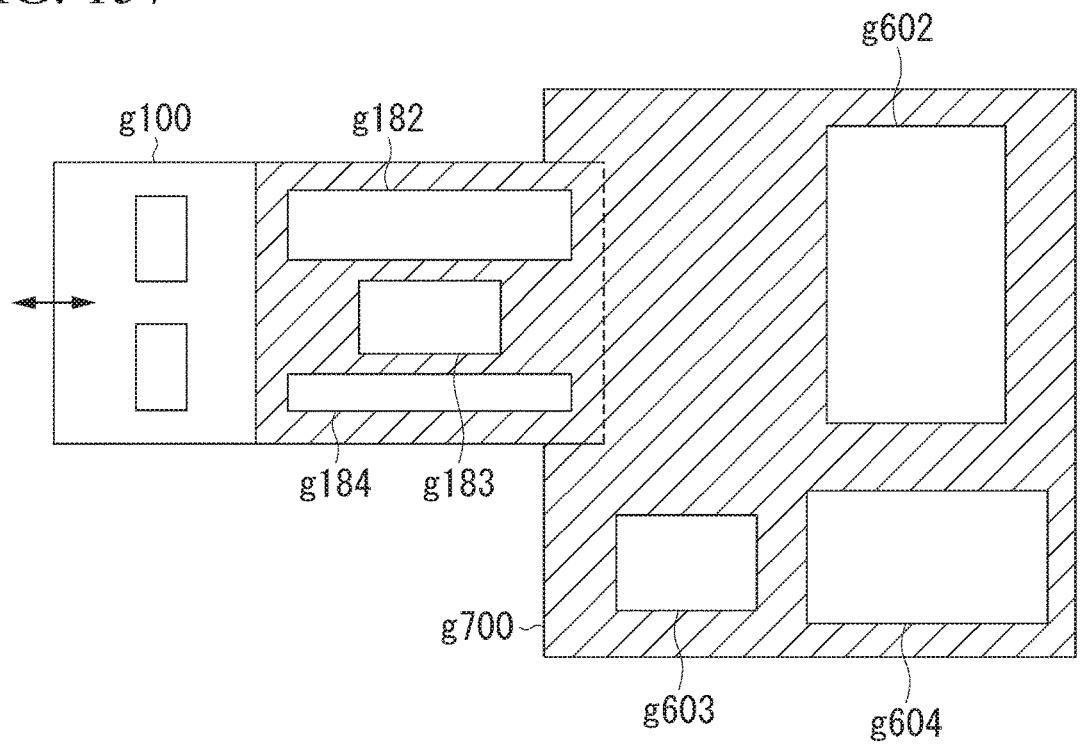

FIG. 157 is a view of a state in which a combination room region g700 appears by combining the vehicle g100 and a room g600 viewed from above.

Figure 158:
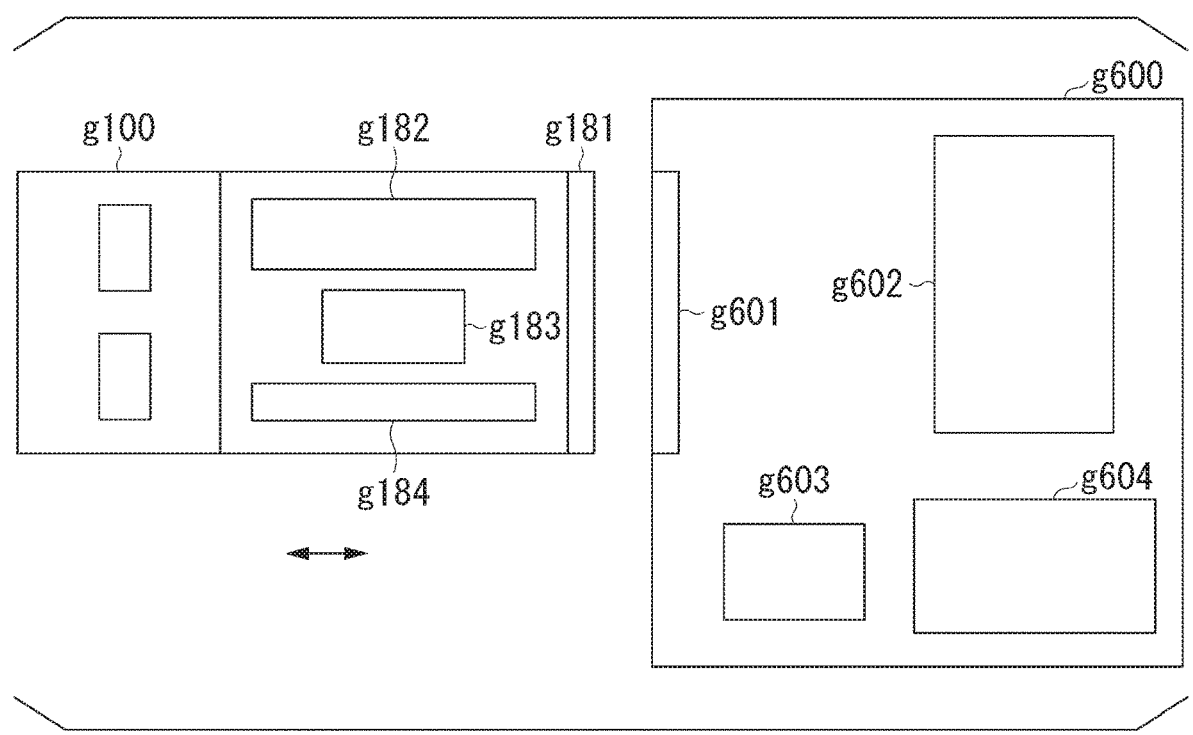

FIG. 158 is a view of a state in which the vehicle g100 and the room g600 are separated viewed from above.

Figure 159:
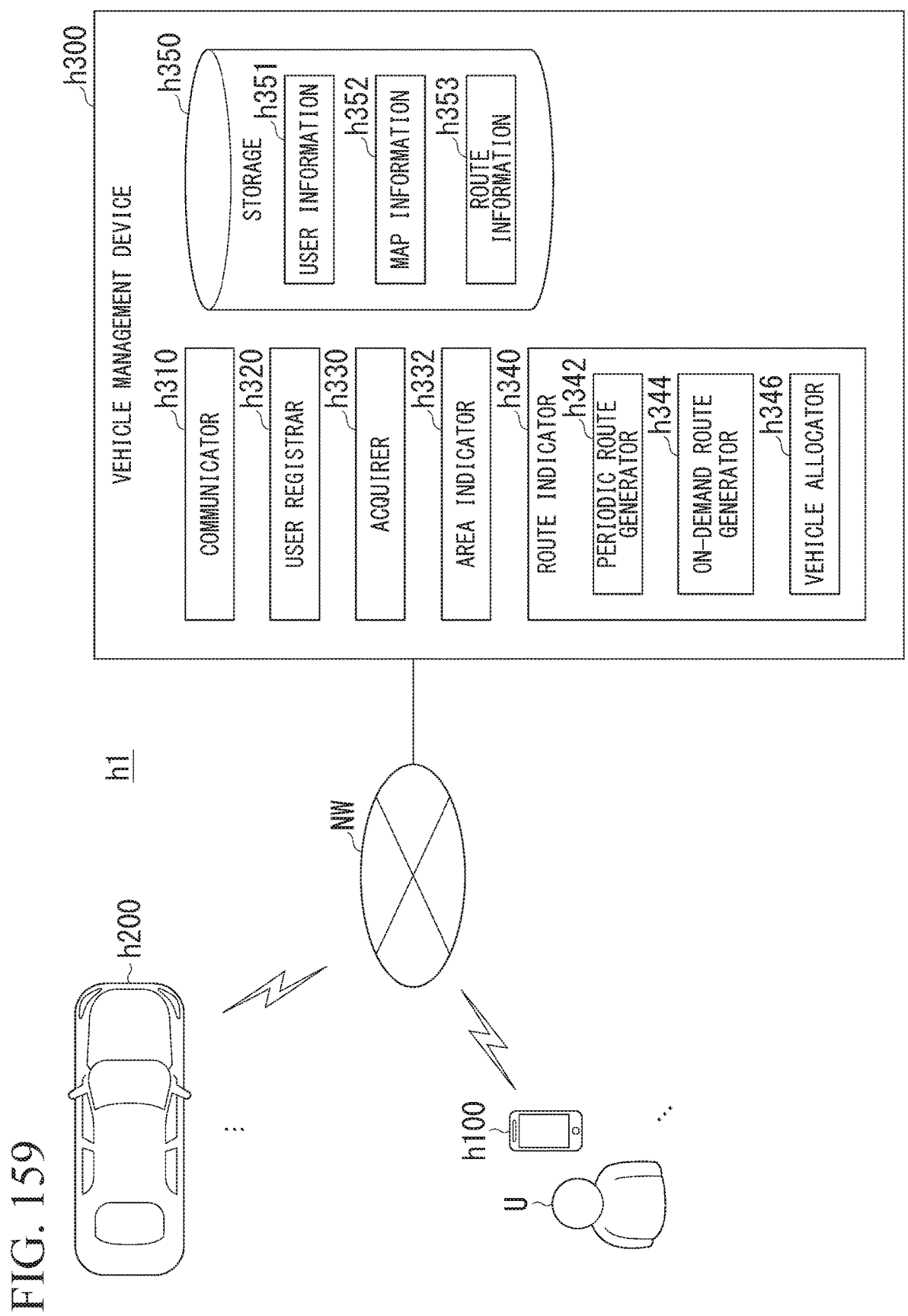

FIG. 159 is a configuration diagram of a vehicle system h1 according to a ninth embodiment.

Figure 160:
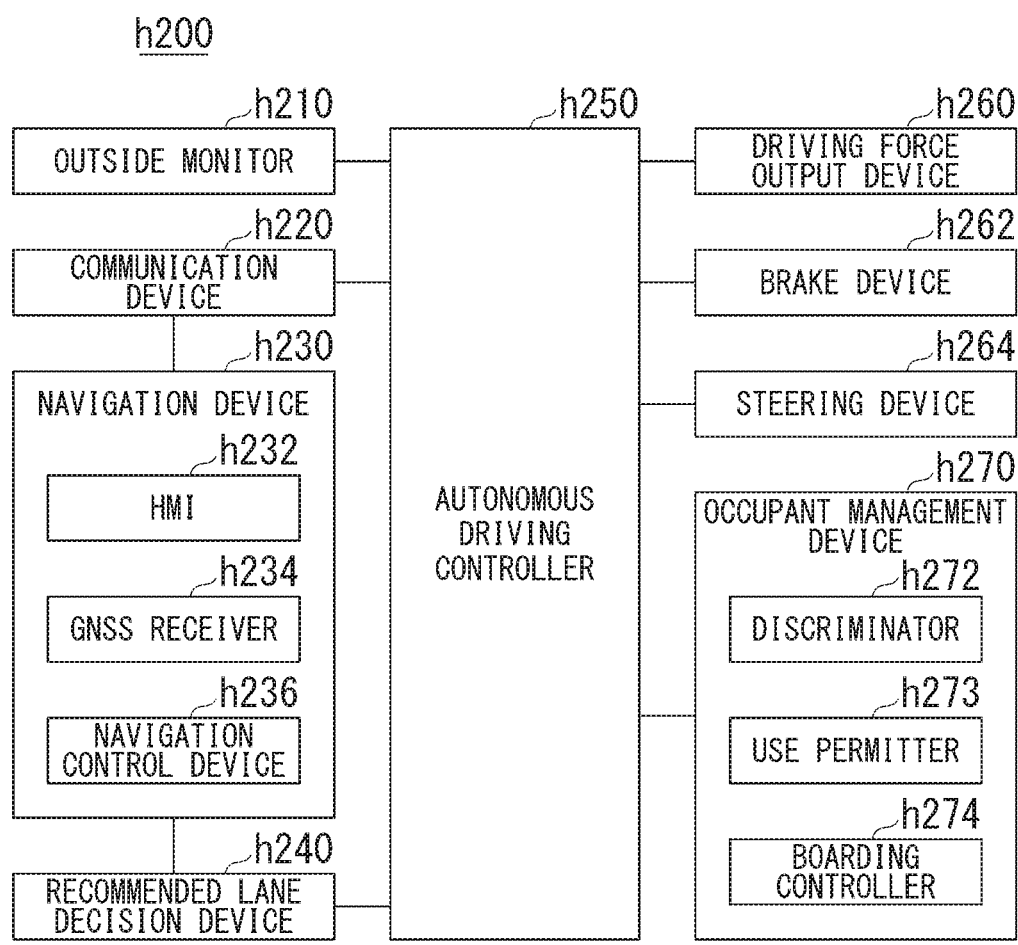

FIG. 160 is a configuration diagram of a vehicle h200 according to the ninth embodiment.

FIG. 161 is a diagram showing an example of details of user information h351.

Figure 162:
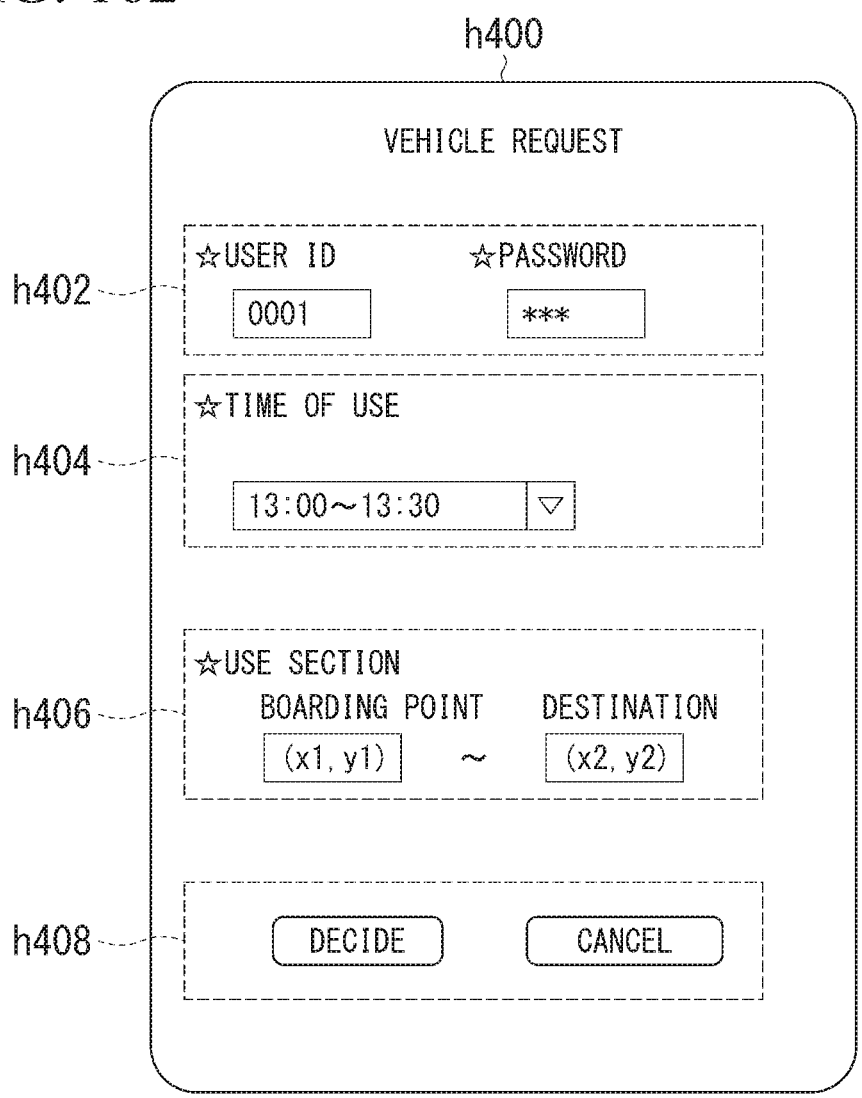

FIG. 162 is a diagram showing an example of a getting-into request screen h400 displayed on a display of the terminal device h100.

Figures 163, 164:
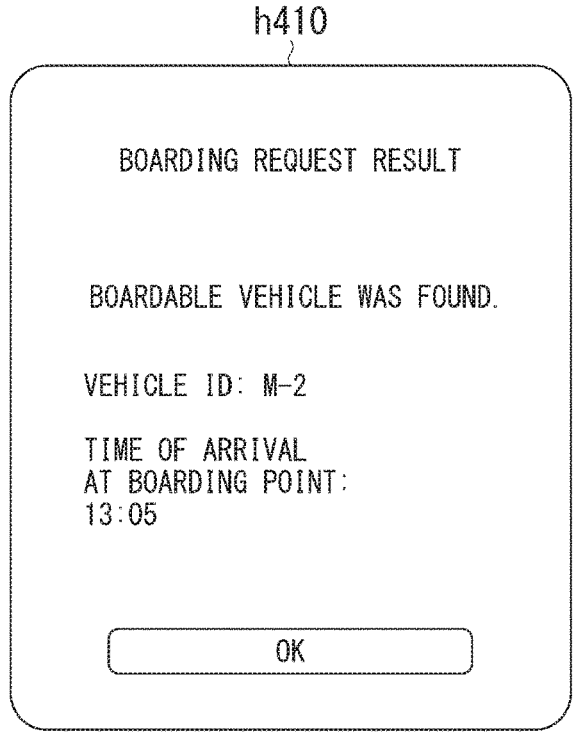

FIG. 163 is a diagram showing an example of a getting-into request result screen h410 displayed on the terminal device h100.

FIG. 164 is a diagram showing an example of details of route information h353.

Figure 165:
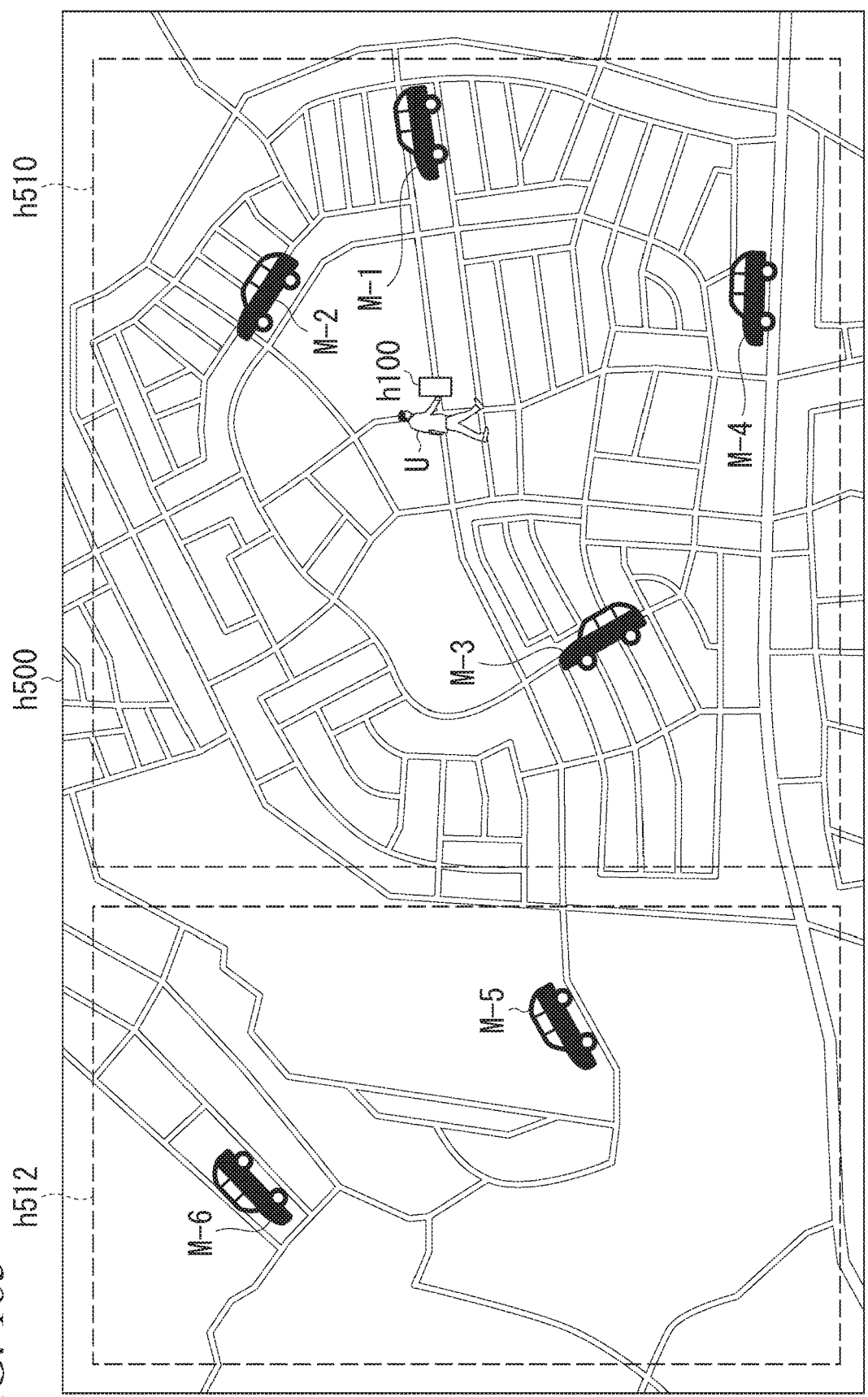

FIG. 165 is an explanatory diagram showing a state in which the vehicle h200 circularly travels in a driving area.

Figure 166:
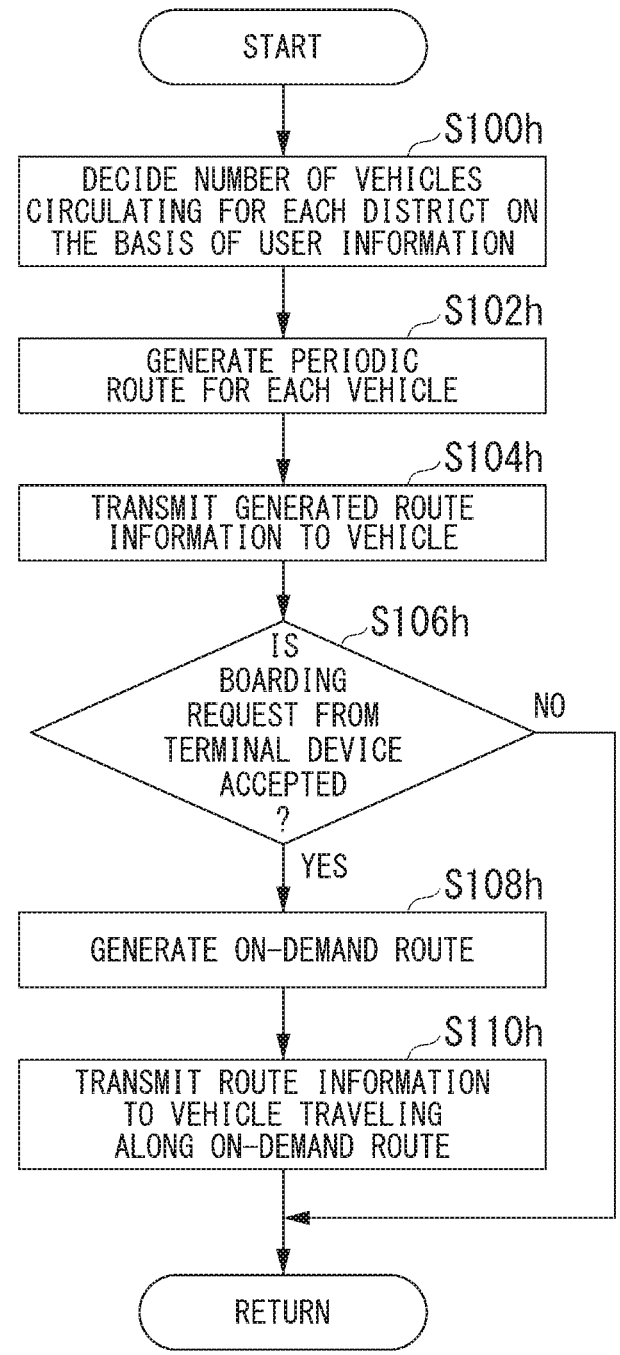

FIG. 166 is a flowchart showing an example of a flow of a process to be executed by a vehicle management device h300.

Figure 167:
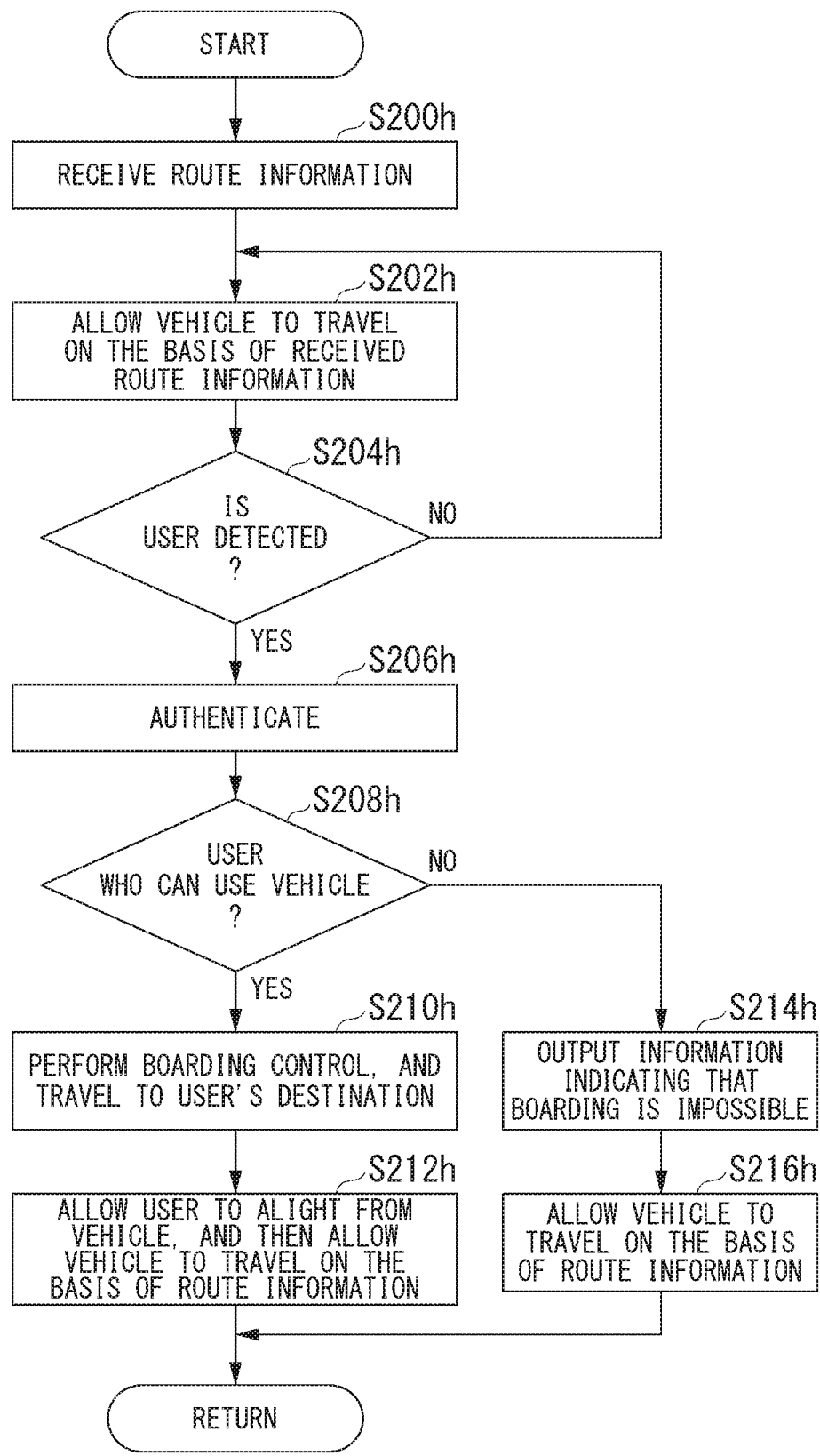

FIG. 167 is a flowchart showing an example of a flow of a process to be executed by the vehicle h200.

Figure 168:
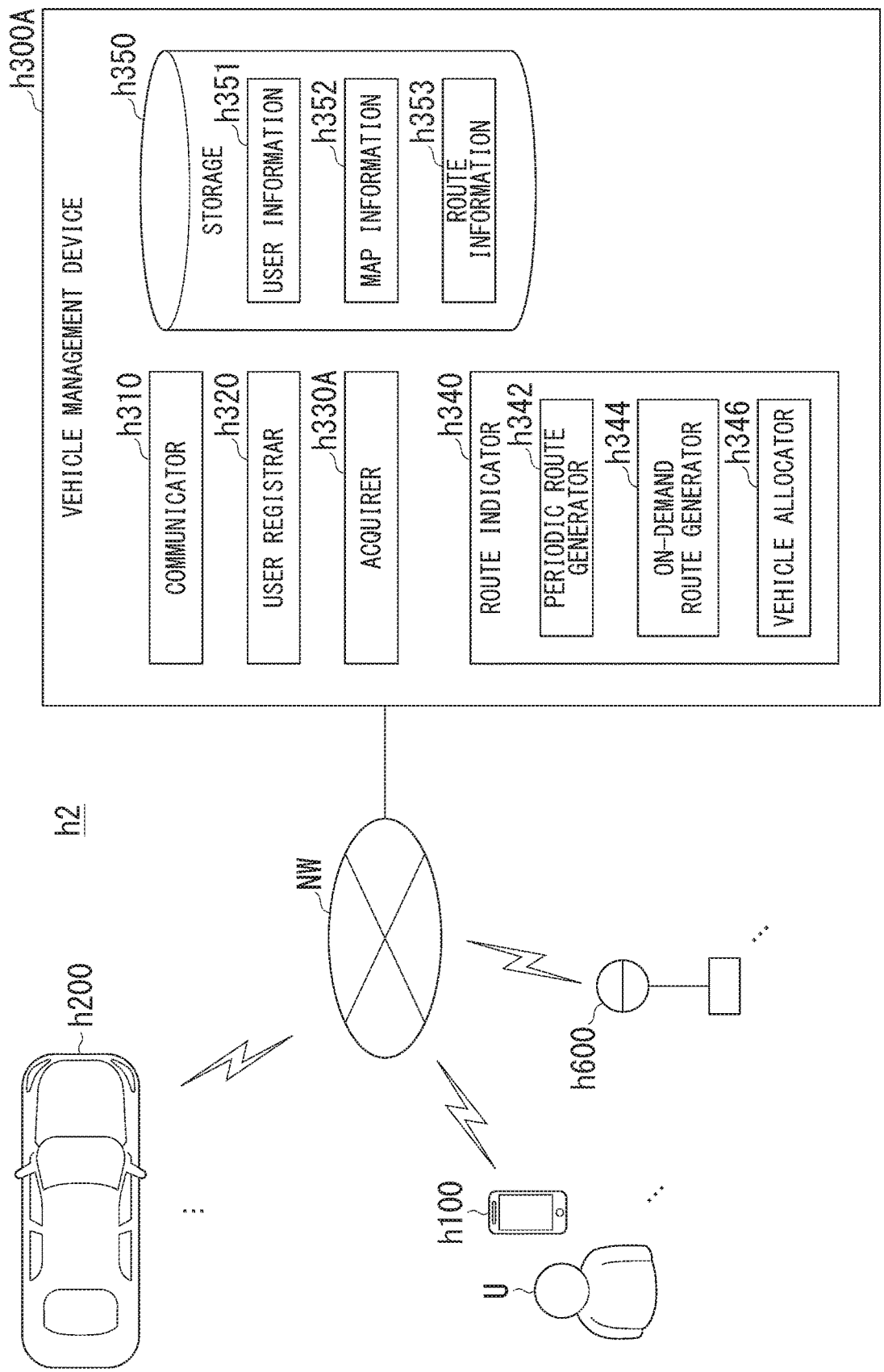

FIG. 168 is a configuration diagram of a vehicle system h2 according to a first modified example of the ninth embodiment.

Figure 169:
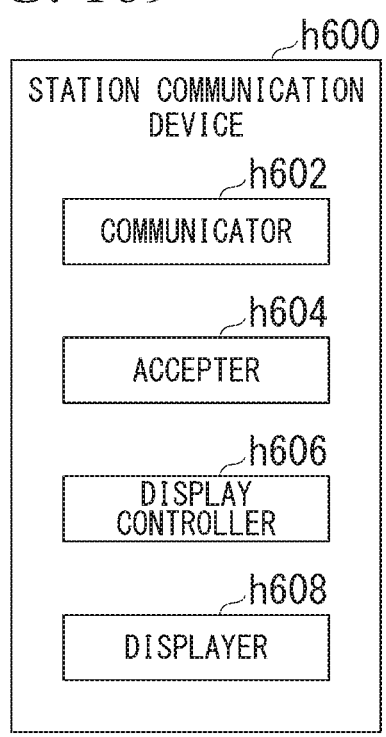

FIG. 169 is a configuration diagram of a stop communication device h600.

Figure 170:
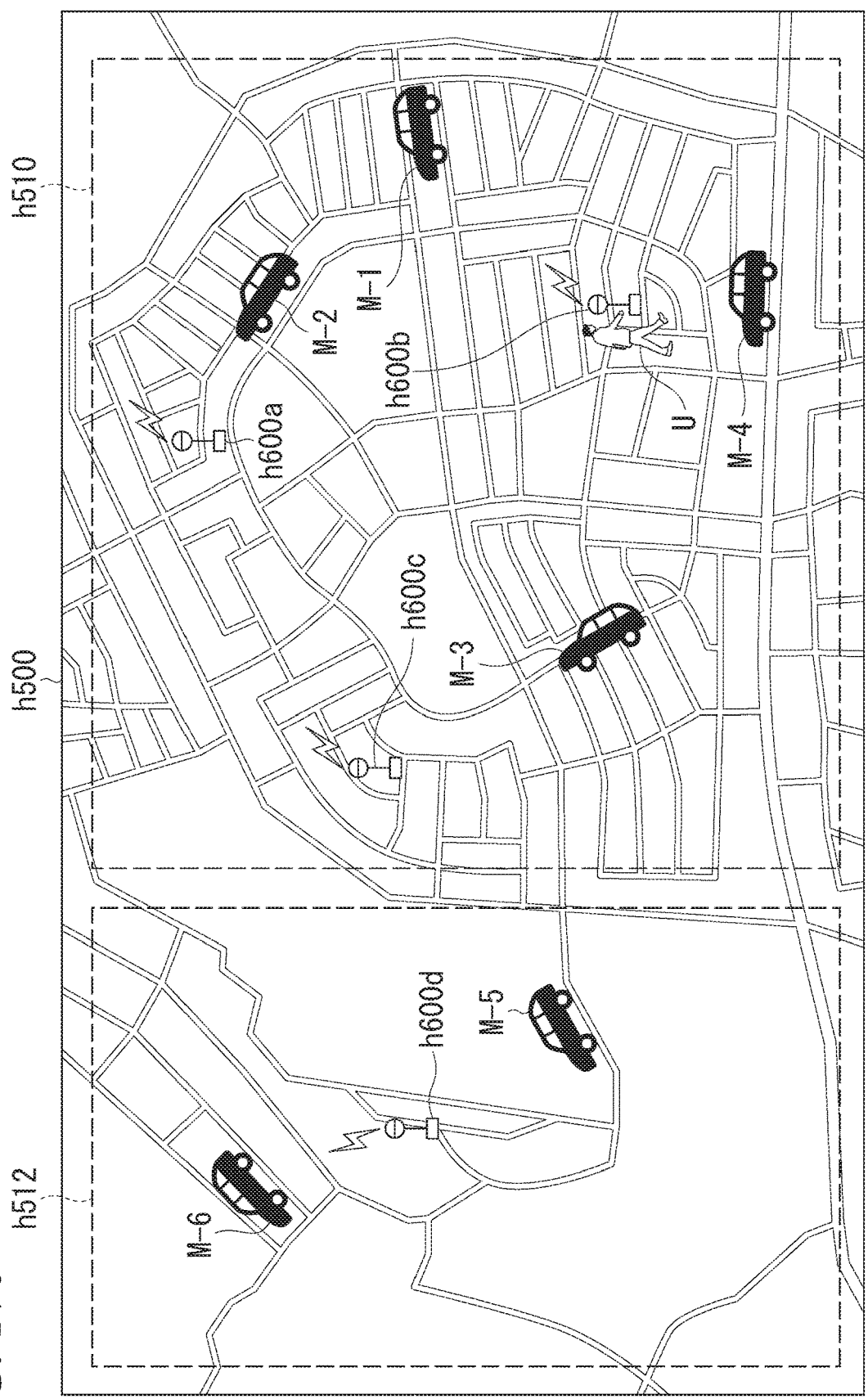

FIG. 170 is an explanatory diagram showing a state in which the user U makes a getting-into request from the stop communication device h600.

Figure 171:
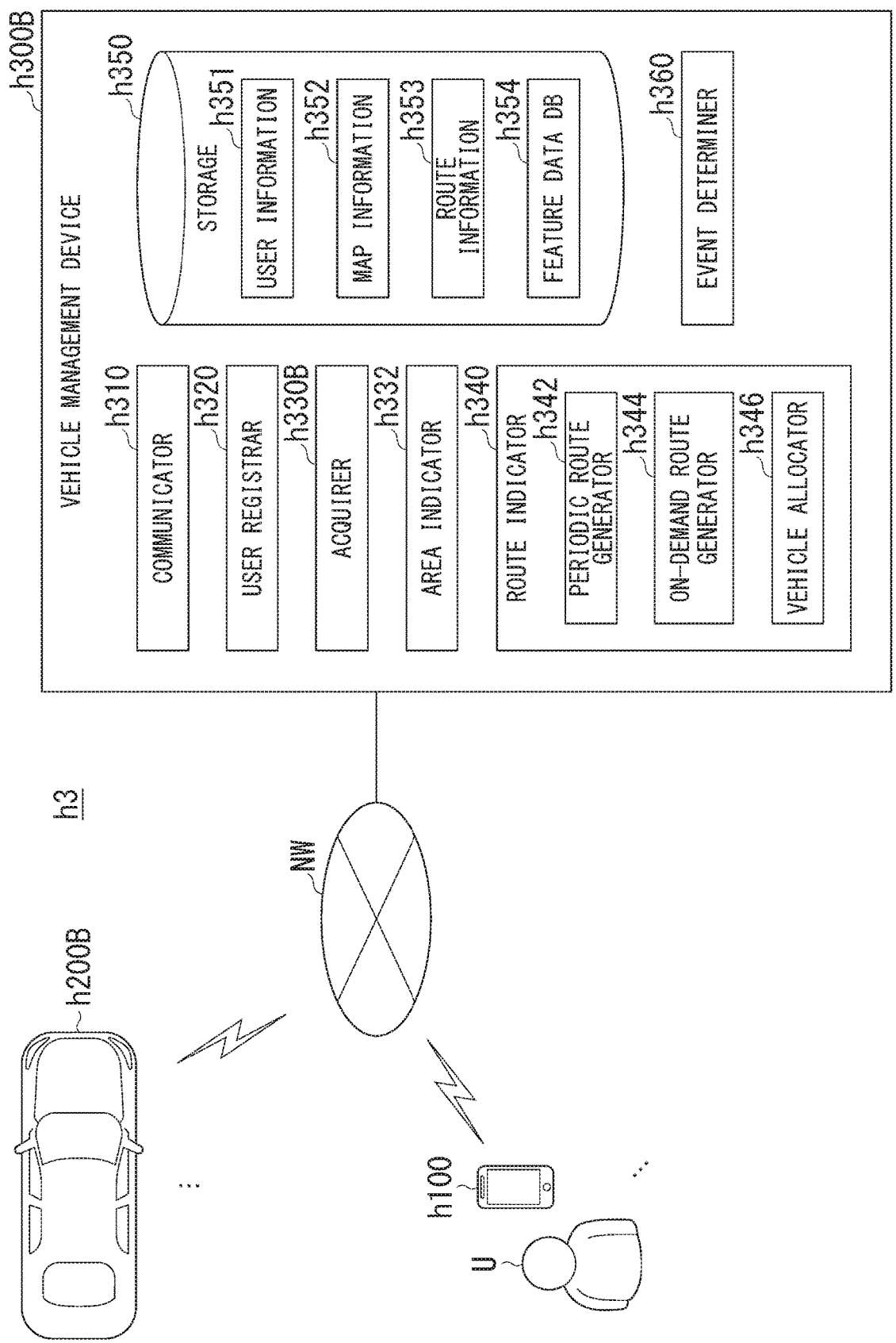

FIG. 171 is a configuration diagram of a vehicle system h3 according to a second modified example of the ninth embodiment.

Figure 172:
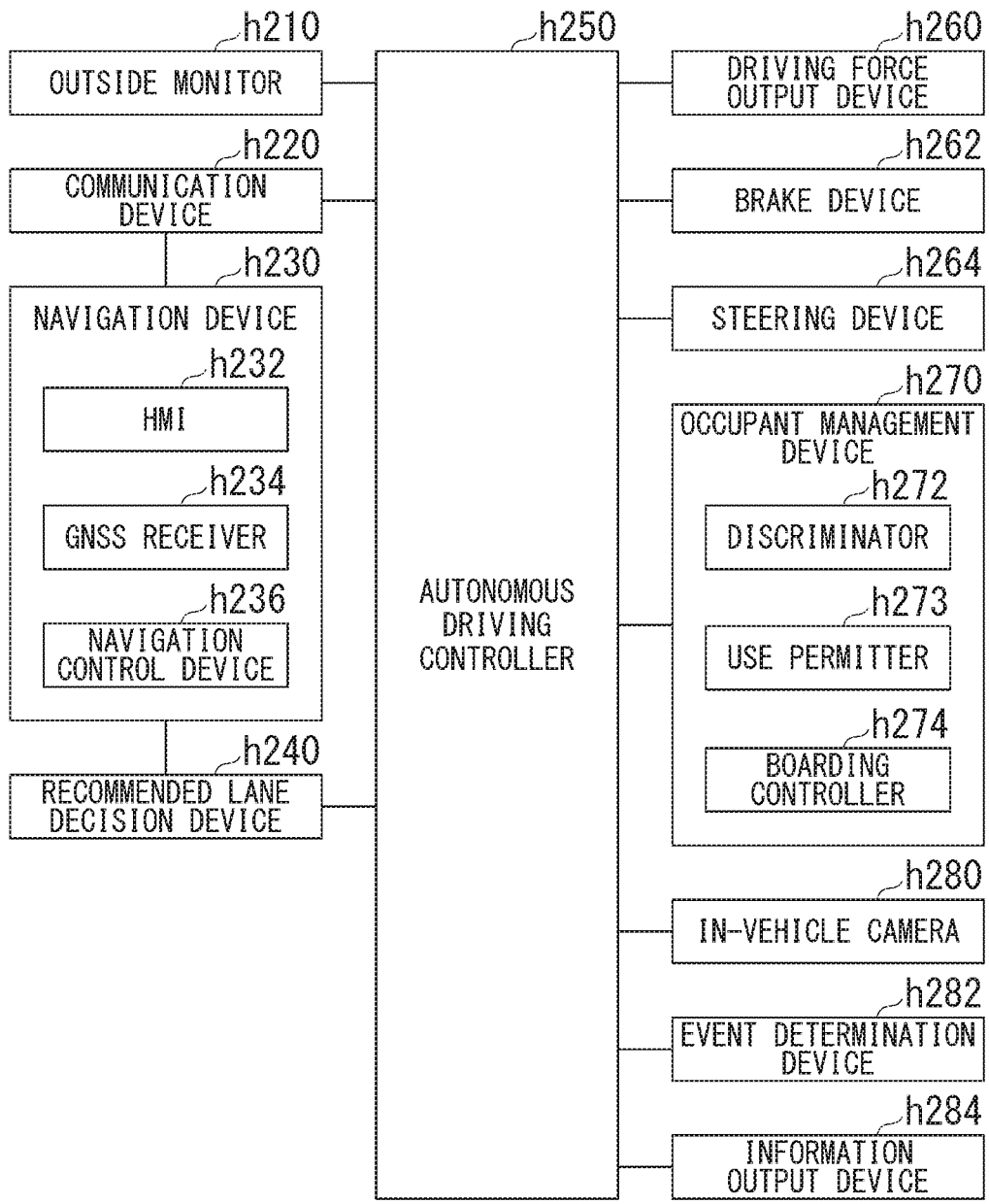

FIG. 172 is a configuration diagram of a vehicle h200B according to the second modified example of the ninth embodiment.

Figure 173:
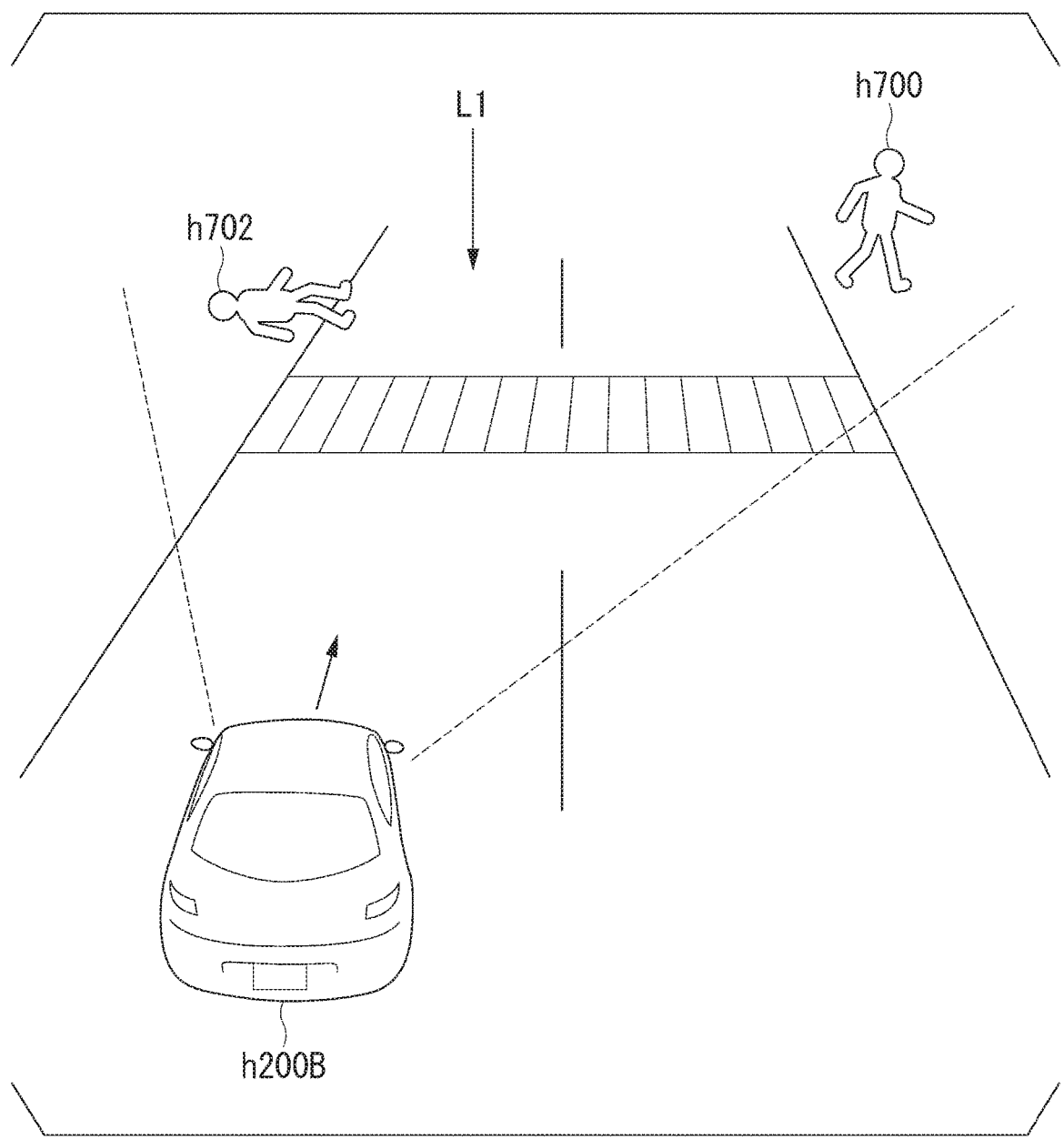

FIG. 173 is an explanatory diagram showing a process of determining an event.

FIG. 174 is a configuration diagram of a vehicle h200C according to a third modified example of the ninth embodiment.

Figure 175:
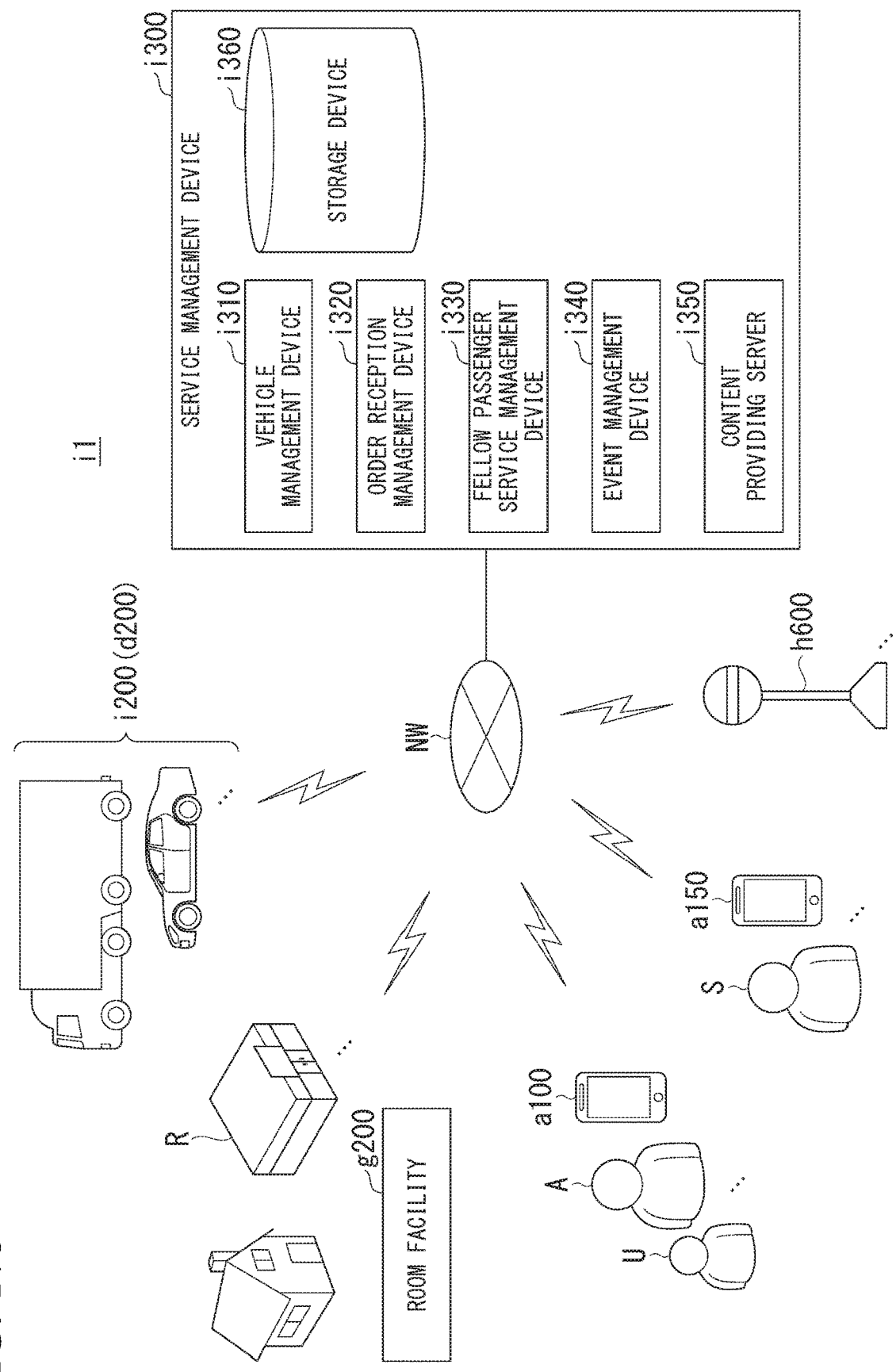

FIG. 175 is a configuration diagram of a service management system i1 according to a tenth embodiment.

Figure 176:
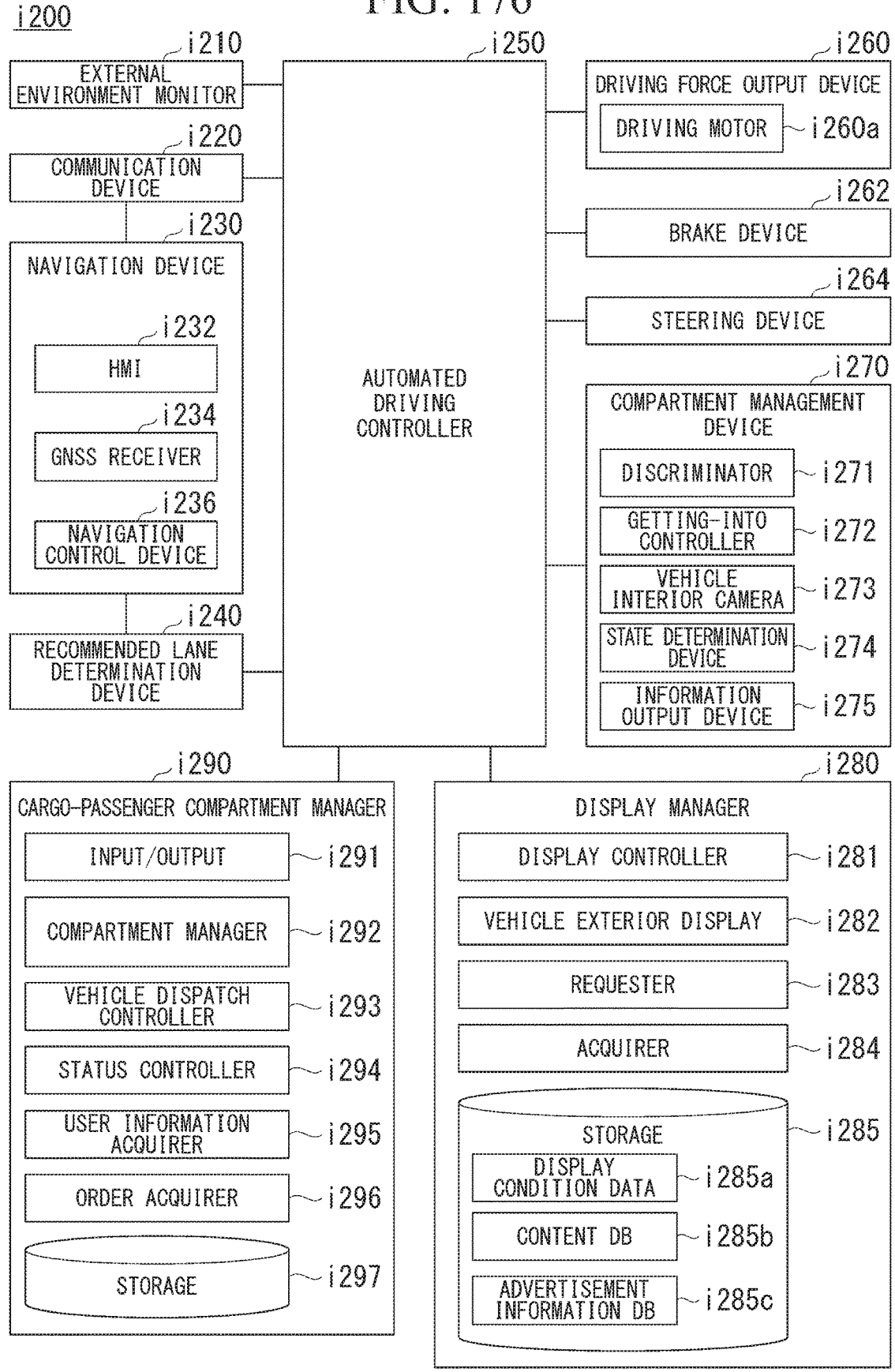

FIG. 176 is a configuration diagram of a vehicle i200.

DESCRIPTION OF EMBODIMENTS

Hereinafter, a vehicle and a service management device of the present invention will be described with reference to the drawings. For example, an automated driving vehicle of the present invention is a vehicle which can maximize a degree of freedom of a superstructure provided in the vehicle, can provide versatility, and can be utilized for various purposes by providing an automated driving function in the form of a carriage. In the embodiment described below, at least one of a shape and a function of the superstructure of the automated driving vehicle can be changed in accordance with a purpose, for example, by exchanging the superstructure. The "automated driving vehicle" is, for example, an automated driving vehicle that basically does not require a driving operation.

In the following description, the same reference signs are given to components having the same or similar functions. Redundant description of such components may be omitted. The term "based on XX" indicates "based on at least XX" and also includes cases based on another element in addition to XX. The term "based on XX" is not limited to a case in which XX is used directly, and also may include a case based on a result of performing calculation or processing on XX. "XX" is any element (for example, any information).

First Embodiment

[Overall Configuration of Automated Driving Vehicle]

Figure 1:
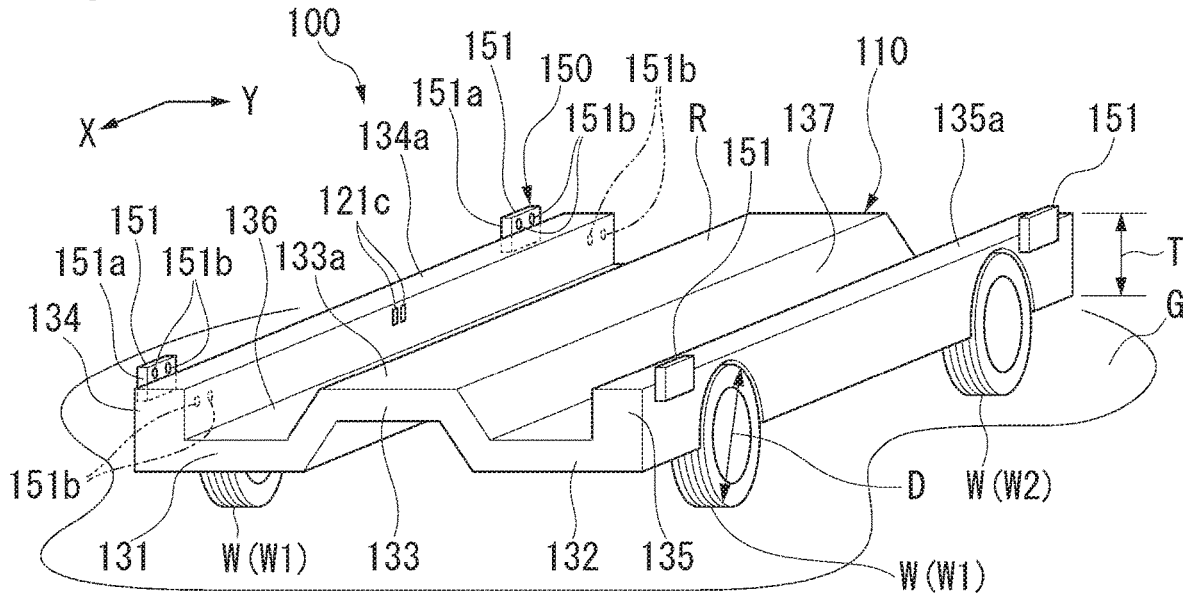
FIG. 1 is a perspective view showing an automated driving vehicle 100.

Hereinafter, a first embodiment will be described. FIG. 1 is a perspective view illustrating an automated driving vehicle 100 of the first embodiment. In the first embodiment, a unit that does not include an upper structure 200 to be described later will be referred to as an "automated driving vehicle 100". On the other hand, a unit in which the automated driving vehicle 100 and the upper structure 200 are combined will be referred to as a "traveling object M" or a "mobile object M".

The automated driving vehicle 100 has a plate shape which does not have a passenger compartment, a seat, and the like. The "plate-shape" means a flat shape in a broad sense and is not limited to the meaning of a flat plate shape or a solid shape. For example, the "plate shape" also includes a case in which the shape has a bent or curved portion, a case in which the shape has a concave portion or a convex portion, and a case in which the shape has a hollow portion. The "plate shape" may be replaced with a "planar shape".

In the present embodiment, the automated driving vehicle 100 has a plate shape in which a largest height of the automated driving vehicle 100 from a ground surface G is equal to or smaller than 1.5 times a diameter D of a wheel W to be described later. In another viewpoint, the automated driving vehicle 100 has a plate shape in which a largest thickness (in the present embodiment, the same as a largest thickness of a traveling device 110 to be described later) in a height direction of the automated driving vehicle 100 excluding the wheel W is equal to or smaller than the diameter D of the wheel W. Hereinafter, a configuration of such an automated driving vehicle 100 will be described in detail. In the following description, the automated driving vehicle 100 will be referred to simply as a "vehicle 100". The vehicle 100 has the traveling device 110 and a connecting mechanism 150, for example.

[Traveling Device]

The traveling device 110 is a plate-shaped traveling device having an automated driving function and forms a main part of the vehicle 100. The traveling device 110 has a plate shape which does not have a passenger compartment, a seat, and the like. For example, the traveling device 110 has a plate shape in which a largest thickness T in the height direction of the traveling device 110 excluding the wheel W is equal to or smaller than the diameter D of the wheel W. The traveling device 110 is configured such that an upper structure 200 (see FIGS. 5 and 7 to 12) can be detachably attached thereto. The "attaching" means that the upper structure 200 is loaded on the traveling device 110, for example, and includes a state in which the upper structure 200 is not fixed to the traveling device 110.

As illustrated in FIG. 1, the traveling device 110 has an attachment region R to which the upper structure 200 is detachably attached and a plurality of wheels W. The "attachment region R" will be described. The plurality of wheels W include a driving wheel driven by a drive force output device 116 to be described later. The traveling device 110 is a traveling device having four or more wheels W, for example, and may be a traveling device having two or three wheels W like a motorcycle or other vehicles. The plurality of wheels W include a first wheel W1 and a second wheel W2. The second wheel W2 is positioned closer to a rear side than the first wheel W1 in a vehicle traveling direction X.

Figure 2:
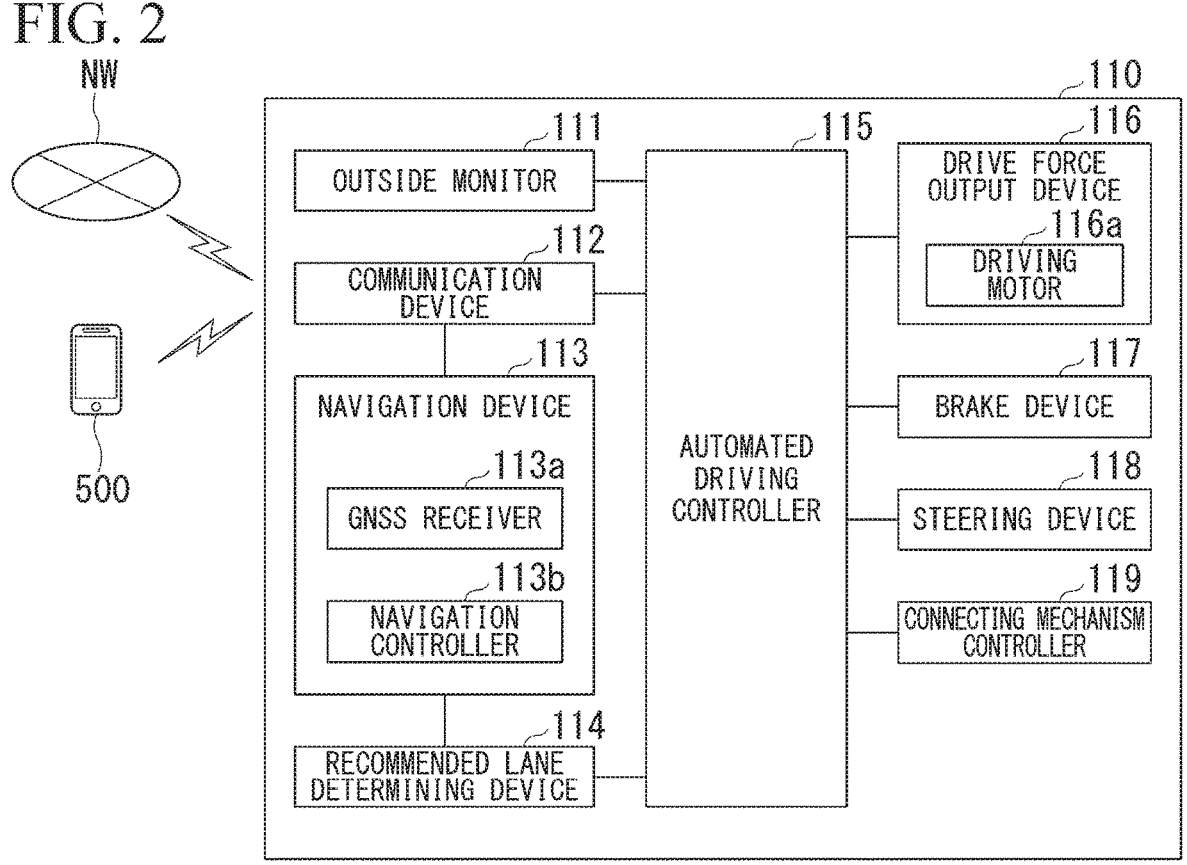
FIG. 2 is a configuration diagram showing a traveling device 110.

FIG. 2 is a block diagram illustrating the traveling device 110. The traveling device 110 includes, for example, an outside monitor 111, a communication device 112, a navigation device 113, a recommended lane determining device 114, an automated driving controller 115, a drive force output device 116, a brake device 117, a steering device 118, a connecting mechanism controller 119, a power module 120 (see FIG. 6), an interface 121 (see FIG. 6), and a storage 122. In the following description, the vehicle 100 is sometimes referred to as a "host vehicle 100". The connecting mechanism controller 119 will be described later.

All or some of a navigation controller 113b of the navigation device 113, the recommended lane determining device 114, the automated driving controller 115, and the connecting mechanism controller 119 may be realized when a processor such as a central processor (CPU) or the like executes a program (software) stored in a memory. All or some of the components may be realized by hardware such as a large scale integration (LSI), an application specific integrated circuit (ASIC), a field-programmable gate array (FPGA), or a graphics processor (GPU) and may be realized by the cooperation of software and hardware. The program may be stored in advance in a storage device such as a hard disk drive (HDD) or a flash memory and may be stored in a removable storage medium such as DVD or CD-ROM and be installed on a storage device when the storage medium is mounted on a drive device.

The outside monitor 111 includes, for example, a camera, a radar, a light detection and ranging (LIDAR), and an object recognition device or the like that performs sensor fusion processing on the basis of the output of the camera, the radar, and the LIDAR. The outside monitor 111 estimates the type (particularly, a vehicle, a pedestrian, and a bicycle) of an object present around the vehicle 100 and outputs the estimated type of the object to the automated driving controller 115 together with the information of the position and the speed thereof.

The communication device (a wireless communicator) 112 is a wireless communication module for connecting to a network NW, communicating directly with a terminal device 500 of the user of the vehicle 100, and communicating directly with a terminal device or the like of an other vehicle or a pedestrian. The communication device 112 may communicate directly with a human machine interface (HMI) 202 (see FIG. 6) provided in the upper structure 200 via the communication device 201 of the upper structure 200 when a communication connector 121a and a gateway device 121b to be described later are not provided, for example. That is, the communication device 112 may acquire information (for example, information indicating an input operation on a driving operator 202a) input to the HMI 202 by wirelessly communicating with the communication device 201 of the upper structure 200. The communication device 112 performs wireless communication on the basis of Wi-Fi, dedicated short range communications (DSRC), Bluetooth (registered trademark, the same hereinbelow), and other communication standards. A plurality of communication devices corresponding to the uses may be prepared as the communication device 112. For example, the communication device 112 acquires an instruction (for example, an instruction related to a destination) related to travel the host vehicle 100 from the terminal device 500 (or the HMI 202 operated by a user) of the user. The communication device 112 is an example of an "acquirer". For example, the communication device 112 acquires information related to a destination of the host vehicle 100. The communication device 112 outputs the acquired information to the navigation device 113 and the automated driving controller 115. The network NW includes the Internet, a wide area network (WAN), a local area network (LAN), a public line, a provider device, a dedicated line, a wireless base station, and the like. The terminal device 500 of the user is a smartphone, a tablet terminal, a personal computer, and the like, for example.

The navigation device 113 includes a global navigation satellite system (GNSS) receiver 113a, and a navigation controller 113b. The GNSS receiver 113a measures the position of a host device (the position of the host vehicle 100) on the basis of electric waves arriving from a GNSS satellite (for example, a GPS satellite). The navigation controller 113b includes a CPU and various storage devices, for example, and controls the entire navigation device 113. Map information (navigation map) is stored in the storage device. The navigation map is a map (map information including road information) that represents a road using a node and a link. The navigation controller 113b determines a route (a driving plan) from the position of the host vehicle 100 measured by the GNSS receiver 113a to a destination of the vehicle 100 acquired by the communication device 112 by referring to the navigation map. The navigation controller 113b is an example of a "driving plan generator". The navigation controller 113b may transmit the position and the destination of the host vehicle 100 to a navigation server (not illustrated) using the communication device 112 and acquire a route sent from the navigation server. The navigation controller 113b outputs information on the route determined or specified by any one of the above-described methods to the recommended lane determining device 114.

The recommended lane determining device 114 includes a micro processor (MPU) and various storage devices. High-accuracy map information more detail than the navigation map is stored in the storage device. The high-accuracy map information includes information such as a road width, a gradient, and a curvature of each lane and the positions of signals. The recommended lane determining device 114 determines a preferred recommended lane for traveling along a route input from the navigation device 113 and outputs the recommended lane to the automated driving controller 115.

The automated driving controller 115 includes one or more processors such as a CPU or an MPU and various storage devices. The automated driving controller 115 is an example of an "automated driving controller". In the present embodiment, the automated driving controller 115 also serves as a controller that controls the entire traveling device 110. The automated driving controller 115 allows the traveling device 110 to travel automatically so as to avoid contact with an object of which the position and the speed are input from the outside monitor 111 basically while traveling along the recommended lane determined by the recommended lane determining device 114 basically. The automated driving controller 115 executes events sequentially, for example. Examples of the event include a constant speed travel event in which a vehicle travels in the same traveling lane at a constant speed, a trailing travel event in which a vehicle follows a preceding vehicle, a lane changing event, a merging event, a diverging event, an emergency stop event, a toll booth event for passing through a toll booth and a handover event for ending automated driving and switching to manual driving. Moreover, during execution of these events, an avoidance action may be planned on the basis of a surrounding situation (the presence of a neighboring vehicle or a pedestrian or narrowing of lanes due to road construction) of the host vehicle 100.

The automated driving controller 115 generates a target trajectory along which the host vehicle 100 will travel in the future. The target trajectory includes, for example, a speed element. For example, the target trajectory is represented by arranging positions (trajectory points) that the host vehicle 100 has to reach. The trajectory point is a position that the host vehicle 100 has to reach every predetermined traveling distance, and in addition to this, a target speed and a target acceleration every predetermined sampling period (for example, approximately every 0.x [sec]) are generated as a part of the target trajectory. The trajectory point may be a position that the host vehicle 100 has to reach at a predetermined sampling period. In this case, the information of the target speed and the target acceleration is represented by the interval of trajectory points.

Figure 3:
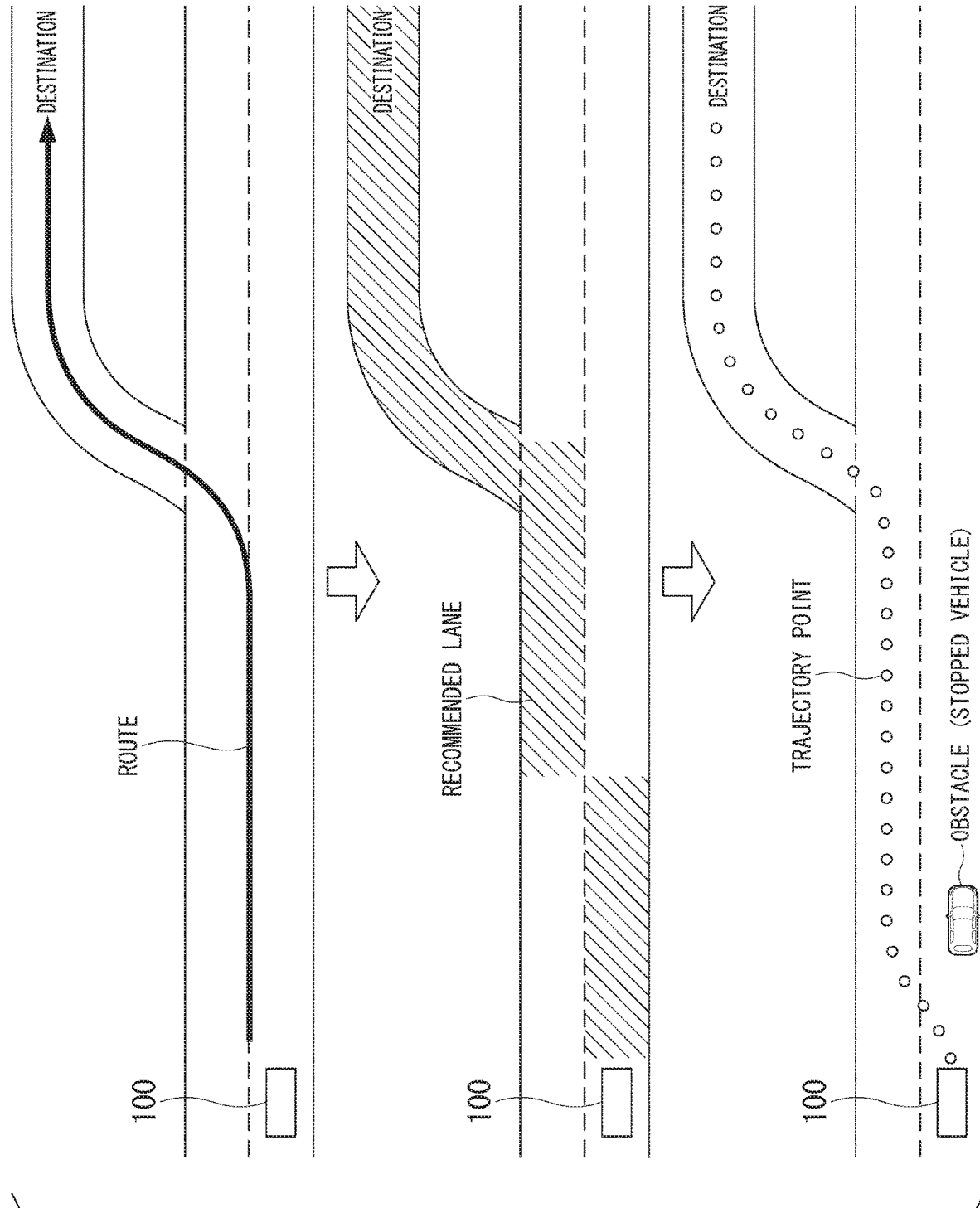
FIG. 3 is an explanatory diagram showing a process of processing automated driving.

FIG. 3 is a diagram for describing a processing process of automated driving. First, as illustrated in the top drawing, a route is determined or specified by the navigation device 113. This route is a rough route in which lanes are not distinguished from each other, for example. Next, as illustrated in the middle drawing, the recommended lane determining device 114 determines a recommended lane in which the vehicle can easily travel along a route. As illustrated in the bottom drawing, the automated driving controller 115 generates a trajectory point for traveling along a recommended lane as much as possible while performing obstacle avoidance or the like and controls some or all of the drive force output device 116, the brake device 117, and the steering device 118 so as to travel along the trajectory point (and an associated speed profile). Such role sharing is an example only, and the automated driving controller 115 may perform processing in a unified manner, for example.

The drive force output device 116 outputs a traveling drive force (torque) for allowing the traveling device 110 to travel to the wheel W. The drive force output device 116 is an example of a "driving source". The drive force output device 116 includes a combination of an internal combustion engine, an electric motor, and a transmission, and a power ECU that controls these components. In the present embodiment, the drive force output device 116 includes a driving motor 116a. The power ECU controls the above-described components according to information input from the automated driving controller 115.

The brake device 117 includes, for example, a brake caliper, a cylinder that delivers hydraulic pressure to the brake caliper, an electric motor that generates hydraulic pressure in the cylinder, and a brake ECU. The brake ECU controls the electric motor according to the information input from the automated driving controller 115 so that brake torque corresponding to a braking operation is output to each wheel. The brake device 117 may include a backup mechanism that delivers hydraulic pressure generated by an operation of a brake pedal included in a driving operator (for example, the driving operator 202a of the upper structure 200 to be described later) to a cylinder via a master cylinder. The brake device 117 is not limited to the above-described configuration but may be an electrically-controlled hydraulic-pressure brake device that controls an actuator according to the information input from the automated driving controller 115 and delivers hydraulic pressure of the master cylinder to a cylinder.

The steering device 118 includes, for example, a steering ECU and an electric motor. The electric motor, for example, applies a force to a rack-and-pinion mechanism to change the direction of a steering wheel. The steering ECU drives an electric motor according to the information input from the automated driving controller 115 or the information input from the driving operator to change the direction of the steering wheel.

Figure 6:
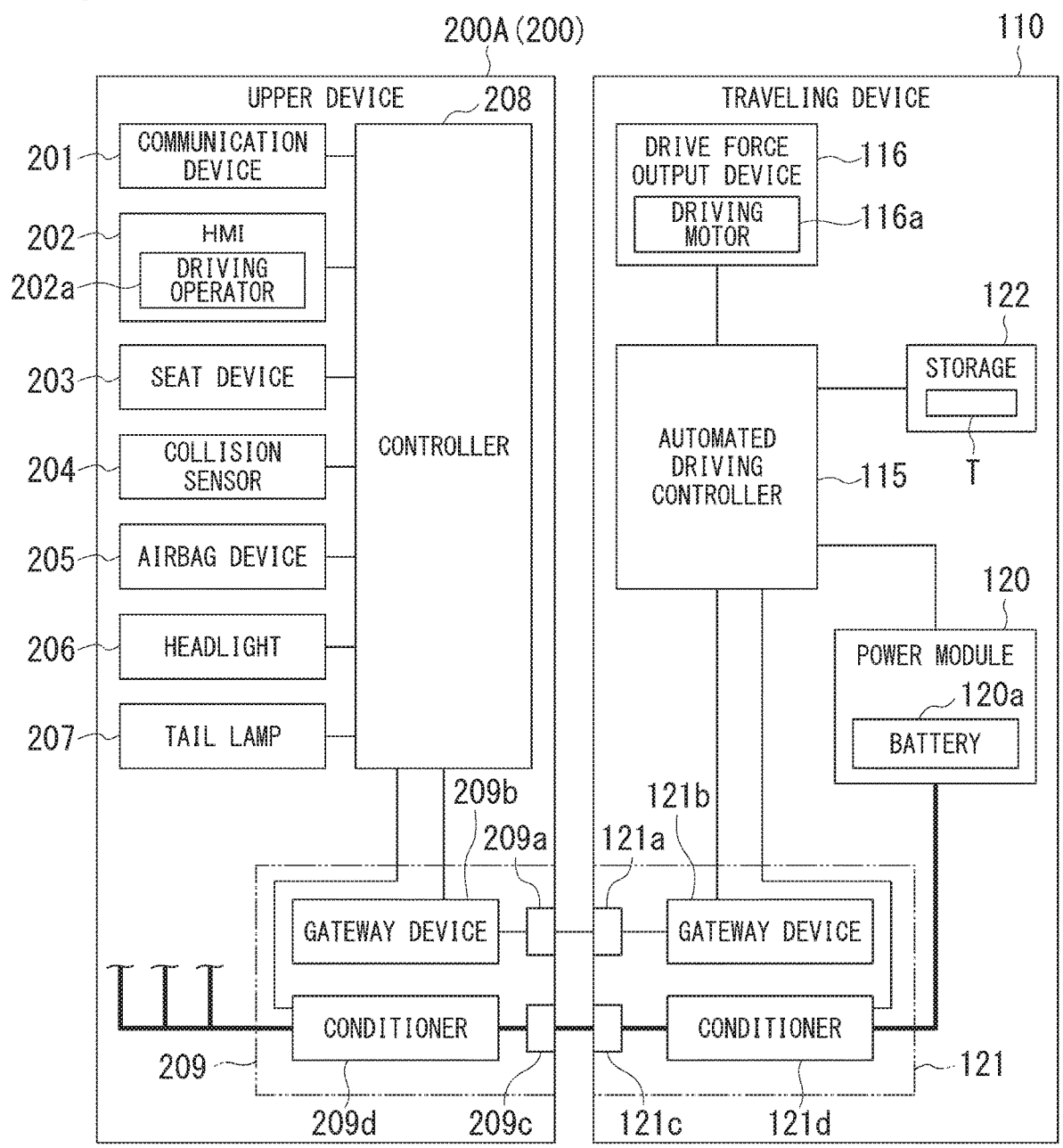
FIG. 6 is a configuration diagram showing the first upper device 200A and the traveling device 110.

As illustrated in FIG. 6, the power module 120 includes a battery 120a and a battery management device (not illustrated) that controls the battery 120a. The power module 120 supplies electric power required for respective devices (the outside monitor 111, the communication device 112, the navigation device 113, the recommended lane determining device 114, the automated driving controller 115, the drive force output device 116, the brake device 117, the steering device 118, the connecting mechanism controller 119, and the like) of the traveling device 110 from the battery 120a. That is, the respective devices of the traveling device 110 operate by sharing part of the electric power supplied to the upper device to be described later. The power module 120 supplies the electric power required for each device of the upper device from the battery 120a via a power feeding connector 121c and a conditioner 121d of an interface 121 to be described later.

The interface 121 includes, for example, a communication connector 121a, a gateway device 121b, a power feeding connector 121c, and a conditioner (a power converter) 121d.

The power feeding connector 121c and the conditioner 121d of the interface 121 are examples of a "power supply interface" and the communication connector 121a and the gateway device 121b of the interface 121 are examples of a "first communication interface". Moreover, the communication connector 121a is an example of a "communication interface". The communication connector 121a is electrically connected to the gateway device 121b. The communication connector 121a is exposed to the outside of the traveling device 110 and the communication connector 209a of the upper structure 200 can be physically and electrically connected thereto.

The gateway device 121b is an example of a "communication controller". The gateway device 121b can communicate with the upper structure 200 via the communication connector 121a. For example, the gateway device 121b communicates with the gateway device 209b of the upper structure 200. For example, the gateway device 121b performs collation and authentication between the upper structure 200 and the traveling device 110 (for example, collation and authentication between the gateway device 121b and the gateway device 209b) on the basis of the control of at least one of the automated driving controller 115 and the controller of the upper structure 200. Collation and authentication include, for example, a process of collating an ID (a transmission ID) allocated to a frame transmitted from one of the gateway device 121b and the gateway device 209b with information (for example, the information stored in the storage 122) stored in advance by the other one of the gateway device 121b and the gateway device 209b to thereby authenticate that a counterpart who transmitted the frame is an authorized counterpart. Collation and authentication include, for example, a process of the gateway device 121b collating an ID (a transmission ID) allocated to a frame transmitted from the gateway device 209b with information (for example, the information stored in the storage 122) stored in advance to thereby authenticate that the upper structure 200 having transmitted the frame is an authorized upper structure 200. The "authorized" means, for example, that the vehicle 100 and the upper structure 200 can be combined with each other (for example, the standards or the like match each other) or that the upper structure 200 belongs to a reliable owner (the upper structure 200 belongs to an owner registered in advance in a registration list).

For example, the gateway device 121b detects the type of the upper structure 200 connected to the interface 121 by the collation and authentication. The "type" includes a "format". For example, the gateway device 121b detects the type of the upper structure 200 connected to the interface 121 on the basis of the ID (transmission ID) allocated to the frame transmitted from the gateway device 209b and a correlation table T (a table in which a plurality of IDs and a plurality of upper structures 200 are correlated with each other) stored in the storage 122. The automated driving controller 115 recognizes the function, the power consumption, and the like of the upper structure 200 on the basis of the content (for example, the type of the upper structure 200) authenticated by the gateway device 121b. Information indicating the functions, the power consumption, and the like of various upper structures 200 is stored in the storage 122 as a part of the table T, for example. The automated driving controller 115 recognizes the function, the power consumption, and the like corresponding to the detected type of the upper structure 200 on the basis of the table T and the type of the upper structure 200, for example.

The gateway device 121b can acquire various pieces of information from the communication device 201, the HMI 202, a seat device 203, a collision sensor 204, an airbag device 205, and the controller of the upper structure 200 via the gateway device 209b of the upper structure 200. The gateway device 121b is another example of an "acquirer". For example, the gateway device 121b acquires information indicating an operation input to the driving operator 202a of the HMI 202 from the HMI 202 via the gateway device 209b of the upper structure 200. The gateway device 121b outputs the information acquired from the HMI 202 to the automated driving controller 115. In this way, the automated driving controller 115 can control the travel of the vehicle 100 on the basis of the information indicating the operation input to the driving operator 202a of the HMI 202.

The power feeding connector 121c is electrically connected to the battery 120a of the power module 120 via the conditioner 121d. The power feeding connector 121c is exposed to the outside of the traveling device 110 and the power feeding connector 209c of the upper structure 200 can be physically and electrically connected thereto.

The conditioner 121d adjusts a power supply amount (for example, a voltage) to be output to the upper structure 200 through the power feeding connector 121c. The conditioner 209d is an inverter, for example, and may convert regenerative power output from a driving motor 116a to DC power, for example. For example, the conditioner 121d adjusts the power output from the power module 120 to power corresponding to the function, the power consumption, or the like of the upper structure 200 on the basis of the control of the automated driving controller 115 and supplies the adjusted power to the upper structure 200.

The traveling device 110 includes one or more interfaces 121 having the above-described function. For example, the traveling device 110 includes a plurality of interfaces 121 having the above-described function. The plurality of interfaces 121 are divided and disposed in a plurality of locations of the traveling device 110. According to such a configuration, the degree of freedom of the location or the like of a connector of the upper structure 200 is improved. Therefore, the versatility of the vehicle 100 is enhanced further.

The storage 122 is realized, for example, by a random access memory (RAM), a read only memory (ROM), a hard disk drive (HDD), a flash memory, or a hybrid storage device in which a plurality of these storages are combined.

Next, returning to FIG. 1, the attachment region R of the traveling device 110 will be described. The attachment region R is a region to which the upper structure 200 can be attached (for example, mounted) and is a region in which the upper structure 200 can be supported from the lower side. In the present embodiment, the attachment region R is formed in a planar form extending approximately horizontally. The attachment region R forms a portion of the upper surface of the traveling device 110. For example, the attachment region R forms the uppermost surface of the traveling device 110. For example, the attachment region R is at a height position which is 1.5 times or smaller than the diameter D of the wheel W with respect to the ground surface G with which the wheel W makes contact.

In the present embodiment, the attachment region R has at least a size extending from approximately the same position as the first wheel W1 to approximately the same position as the second wheel W2 in the vehicle traveling direction X. For example, the attachment region R extends from a front-side position of the first wheel W1 to a rear-side position of the second wheel W2 in the vehicle traveling direction. In the present embodiment, the attachment region R extends over the entire length of the traveling device 110 in the vehicle traveling direction X.

As illustrated in FIG. 1, in the present embodiment, the traveling device 110 has a first base portion 131, a second base portion 132, a bulging portion 133, a first erection portion 134, and a second erection portion 135. The first base portion 131 and the second base portion 132 are disposed to be separated in a vehicle width direction Y with respect to the center of the vehicle 100. The bulging portion 133 is disposed between the first base portion 131 and the second base portion 132 and is positioned at an approximately central portion of the vehicle 100 in the vehicle width direction Y. The bulging portion 133 bulges upward in relation to the first base portion 131 and the second base portion 132.

The first erection portion 134 is positioned on the opposite side from the bulging portion 133 in relation to the first base portion 131. The first erection portion 134 is erected upward from an end of the first base portion 131. Due to this, a first concave portion 136 defined by the first erection portion 134, the first base portion 131, and the bulging portion 133 is formed between the first erection portion 134 and the bulging portion 133. Similarly, the second erection portion 135 is positioned on the opposite side from the bulging portion 133 in relation to the second base portion 132. The second erection portion 135 is erected upward from an end of the second base portion 132. Due to this, a second concave portion 137 defined by the second erection portion 135, the second base portion 132, and the bulging portion 133 is formed between the second erection portion 135 and the bulging portion 133.

In the present embodiment, the bulging portion 133 has a first flat surface 133a extending over an entire length of the traveling device 110 in the vehicle traveling direction X. The first erection portion 134 has a second flat surface 134a extending over an entire length of the traveling device 110 in the vehicle traveling direction X. The second erection portion 135 has a third flat surface 135a extending over an entire length of the traveling device 110 in the vehicle traveling direction X. In the present embodiment, the first to third flat surfaces 133a, 134a, and 135a form the attachment region R.

[Connecting Mechanism]

Next, the connecting mechanism 150 will be described. The connecting mechanism 150 has one or more (for example, a plurality of) connectors 151. The plurality of connectors 151 are divided and disposed at a plurality of positions in the vehicle front-rear direction X and the vehicle width direction Y. Each connector 151 is connected to the upper structure 200 detachably attached to the traveling device 110 and fixes the upper structure 200 to the traveling device 110. The connectors 151 are an example of a "first connector."

Figure 4:
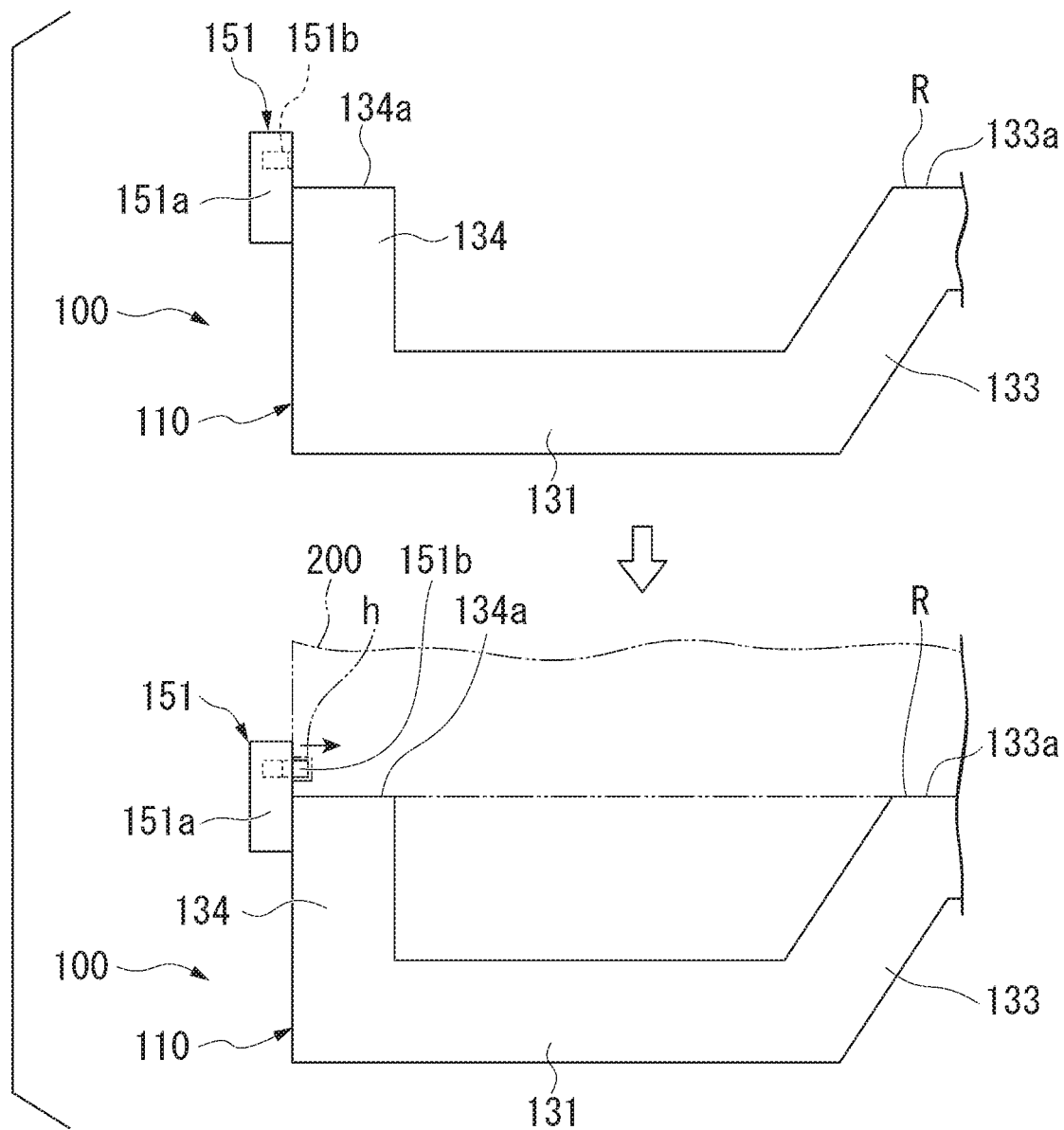
FIG. 4 is a front view showing an example of a connector 151.

FIG. 4 is a front view illustrating an example of one of the connectors 151. As illustrated in FIG. 4, the example of the connector 151 has a base 151a fixed to the traveling device 110 and an engagement portion (movable portion) 151b that can move toward and away from the base 151a. The engagement portion 151b can move between a first position at which the engagement portion 151b enters the inner side of an engagement hole h formed in the upper structure 200 and engages with the engagement hole h and a second position at which the engagement portion 151b comes out of the engagement hole h. The connector 151 fixes the upper structure 200 to the traveling device 110 when the engagement portion 151b moves to the first position. On the other hand, the connector 151 releases the fixed state of the upper structure 200 when the engagement portion 151b moves to the second position. The upper structure 200 can be detached from the traveling device 110 in a state in which the fixing by the connector 151 is released. The connector 151 may have the engagement portion 151b only without the base 151a. In this case, the engagement portion 151b may be provided in the first erection portion 134 and the second erection portion 135 of the traveling device 110 (see a two-dot chain line in FIG. 1). The connector 151 is not limited to the above-described example. The connector 151 is not limited to a specific structure as long as the connector 151 has a structure connected to the upper structure 200.

The connecting mechanism controller 119 operates the connector 151 on the basis of the control of the automated driving controller 115, for example. That is, the connecting mechanism controller 119 switches the state of the vehicle 100 between a state in which the upper structure 200 is fixed to the traveling device 110 and a state in which the upper structure 200 is detached from the traveling device 110 by controlling the connector 151.

[Upper Structure]

Figure 5:
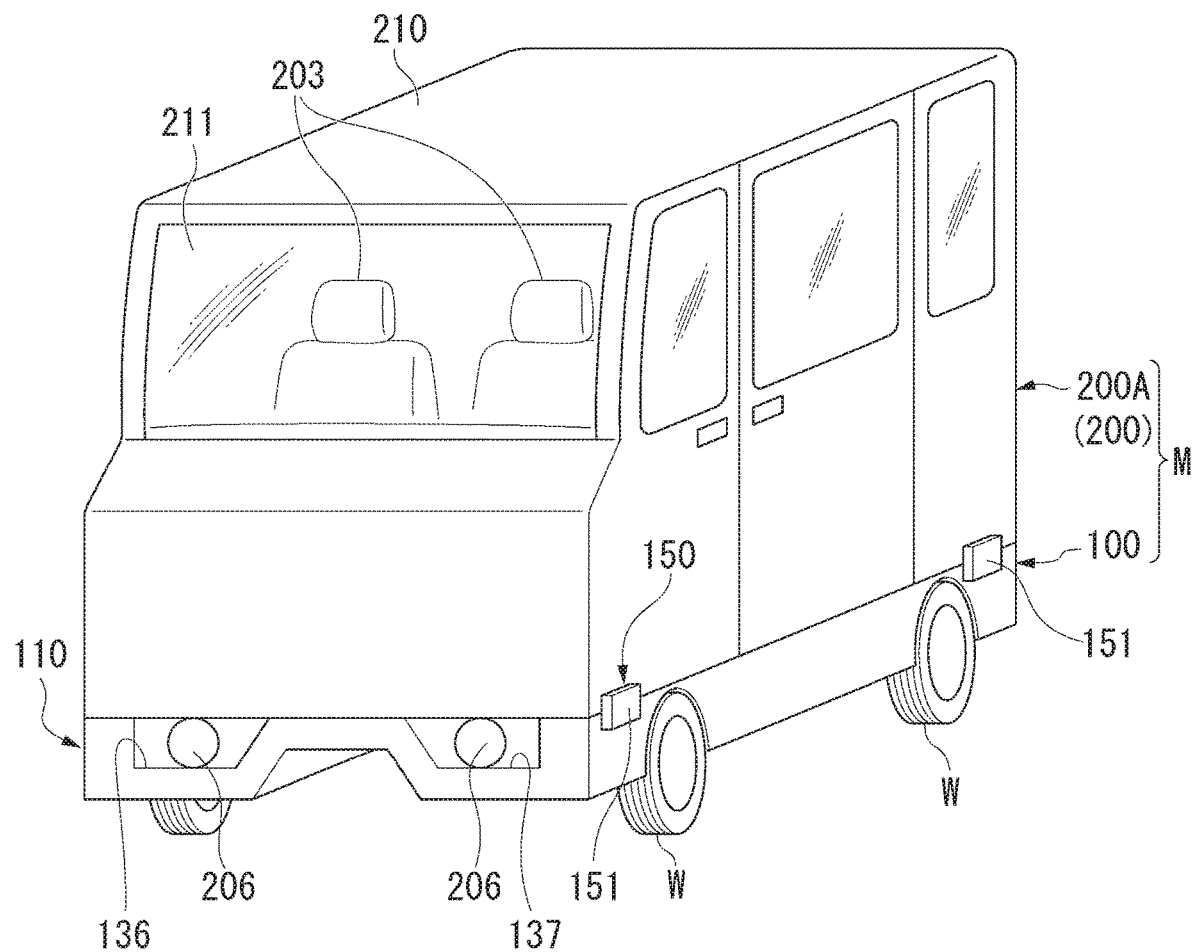
FIG. 5 is a perspective view showing a traveling body M including a first upper device 200A.

Next, a first upper device 200A which is an example of the upper structure 200 will be described. FIG. 5 is a perspective view illustrating a traveling object M including the first upper device 200A. The first upper device 200A is a unit which can provide functions similar to an ordinary passenger car to the vehicle 100. For example, the first upper device 200A has a body 210 having a passenger compartment 211. The passenger compartment 211 is an example of a "room which an occupant can enter." The upper structure 200 has a size that covers the entire attachment region R of the traveling device 110, for example.

FIG. 6 is a block diagram illustrating the first upper device 200A and the traveling device 110. In FIG. 6, only some functions of the traveling device 110 are illustrated. As illustrated in FIG. 6, the first upper device 200A has a communication device 201, an HMI 202, a seat device 203, a collision sensor 204, an airbag device 205, a headlight 206, a tail lamp 207, a controller, and an interface 209.

The communication device (wireless communicator) 201 is a wireless communication module for connecting to the network NW (see FIG. 2) and directly communicating with the communication device 112 of the vehicle 100, for example. The communication device 201 performs wireless communication on the basis of Wi-Fi, dedicated short range communications (DSRC), Bluetooth, or another communication standard. A plurality of communication devices corresponding to the uses may be prepared as the communication device 201.

The HMI 202 includes, for example, a driving operator (an operating device) 202a such as a steering wheel, an acceleration pad, and a brake pad for performing operations related to traveling of the vehicle 100 (for example, an auxiliary operation or an operation in a manual driving mode), a touch panel display device, a speaker, a microphone, and the like. Information (for example, information indicating an input operation on the driving operator 202a) input to the HMI 202 is transmitted via the gateway device 209b (or the communication device 201) and is acquired (received) by the gateway device 121b (or the communication device 112) of the vehicle 100.

The seat device 203 is provided in the passenger compartment 211 and an occupant can sit on the seat device 203. The collision sensor 204 is provided in the body 210 and detects a collision input to the body 210. The airbag device 205 operates on the basis of the detection result obtained by the collision sensor 204. The headlight 206 and the tail lamp 207 are accommodated in the first concave portion 136 and the second concave portion 137 of the traveling device 110, for example. The headlight 206 and the tail lamp 207 may be provided as a part of the traveling device 110 instead of being provided as a part of the upper structure 200. The communication device 201, the HMI 202, the seat device 203, the collision sensor 204, the airbag device 205, the headlight 206, and the tail lamp 207 are supplied with electric power from the battery 120a of the power module 120 of the traveling device 110 when the power feeding connector 209c of the first upper device 200A is connected to the power feeding connector 121c provided in the traveling device 110.

The body 210, the communication device 201, the HMI 202, the seat device 203, the collision sensor 204, the airbag device 205, the headlight 206, and the tail lamp 207 are provided as modules, for example. These modules can be disposed at positions or in combinations desired by a user himself or herself, for example. One or more of these modules may be provided appropriately in second to sixth upper devices 200B to 200F to be described later.

The controller controls the communication device 201, the HMI 202, the seat device 203, the collision sensor 204, the airbag device 205, the headlight 206, the tail lamp 207, and the interface 209. The controller may be realized by a processor such as a CPU executing a program (software) stored in a memory, may be realized by hardware such as an LSI, an ASIC, an FPGA, or a GPU, or may be realized by software and hardware in cooperation. The program may be stored in advance in a storage device such as an HDD or a flash memory and may be stored in a removable storage medium such as a DVD or CD-ROM and installed on a storage device when the storage medium is mounted in a drive device.

The interface 209 has, for example, a communication connector 209a, a gateway device 209b, a power feeding connector 209c, and a conditioner (power converter) 209d.

The communication connector 209a is an example of a "communication interface." The communication connector 209a is electrically connected to the gateway device 209b. The communication connector 209a can be physically and electrically connected to a communication connector 121a of the traveling device 110 when the first upper device 200A is attached to the traveling device 110. That is, when the first upper device 200A is attached to the traveling device 110, the respective devices of the traveling device 110 share part of the details of communication of the respective devices of the first upper device 200A.

The gateway device 209b is an example of a "communication controller." The gateway device 209b can communicate with the gateway device 121b of the traveling device 110 via the communication connector 209a. The gateway device 209b performs collation and authentication between the upper structure 200 and the traveling device 110 (for example, collation and authentication between the gateway device 121b and the gateway device 209b) on the basis of the control of at least one of the automated driving controller 115 and the controller of the upper structure 200. Collation and authentication include, for example, a process of the gateway device 209b collating an ID (a transmission ID) allocated to a frame transmitted from the gateway device 121b with information stored in advance to thereby authenticate that the vehicle 100 having transmitted the frame is an authorized vehicle 100. For example, the gateway device 209b detects the type of the traveling device 110 connected to the interface 209 by the collation and authentication. For example, the gateway device 209b detects the type of the traveling device 110 connected to the interface 209 on the basis of the ID (transmission ID) allocated to the frame transmitted from the gateway device 121b.

The power feeding connector 209c is electrically connected to various devices of the first upper device 200A via the conditioner 209d. The power feeding connector 209c is exposed to the outside of the first upper device 200A and the power feeding connector 121c of the traveling device 110 can be physically and electrically connected thereto.

The conditioner 209d adjusts the electric power supplied from the traveling device 110 through the power feeding connector 209c to a desired power supply amount (for example, a voltage) for various devices of the first upper device 200A. For example, the conditioner 209d adjusts the power supplied from the traveling device 110 to power corresponding to the function, the power consumption, or the like of various devices of the first upper device 200A on the basis of the control of the controller and supplies the adjusted power to various devices of the first upper device 200A. Any one of the conditioner 121d of the traveling device 110 and the conditioner 209d of the upper structure 200 may be omitted.

Here, one or more upper structures 200 can be switchably loaded on the traveling device 110 of the present embodiment instead of the first upper device 200A. Hereinafter, another example of the upper structure 200 attached to the traveling device 110 instead of the first upper device 200A will be described. However, the shape and the function of the upper structure 200 attachable to the traveling device 110 are not limited to the example to be described later.

Figure 7:
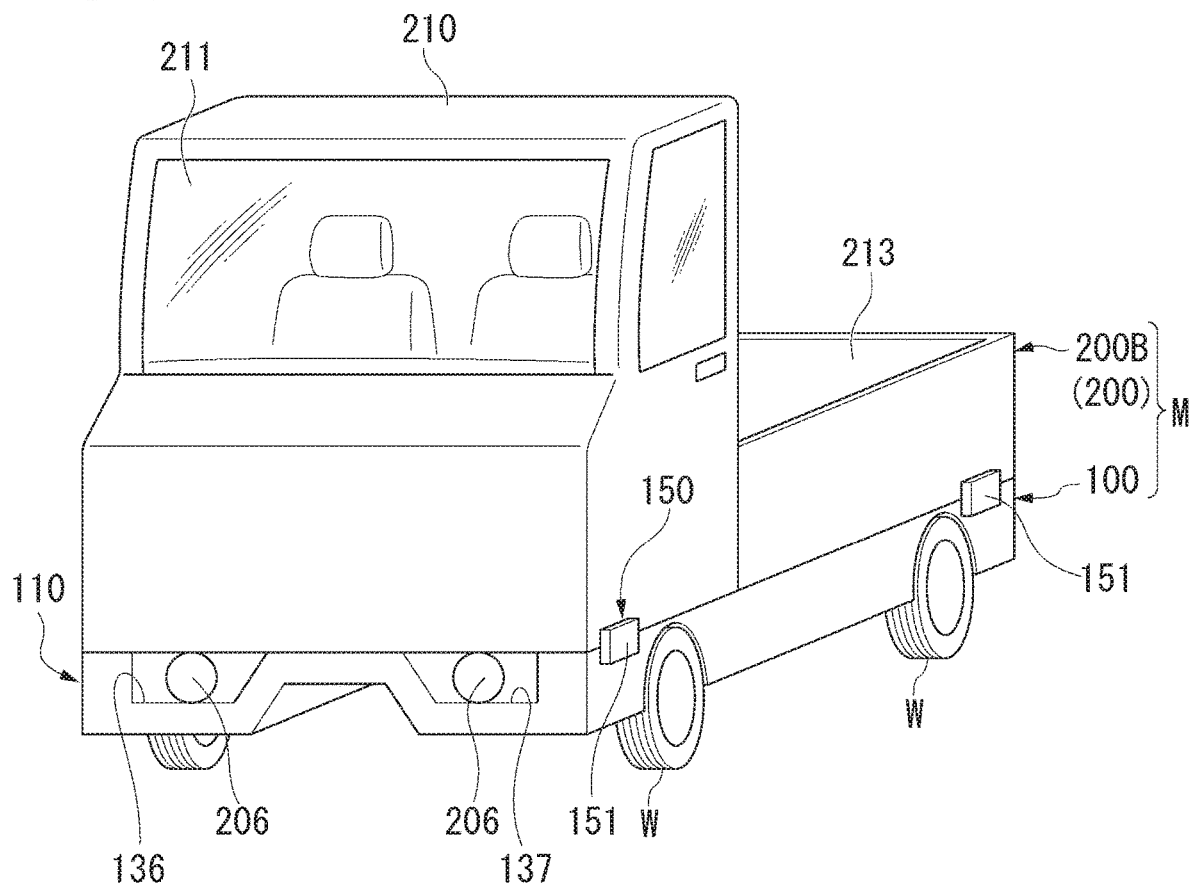
FIG. 7 is a perspective view showing the traveling body M including a second upper device 200B.

FIG. 7 is a perspective view illustrating a traveling object M including a second upper device 200B which is another example of the upper structure 200. The second upper device 200B is a unit which can provide functions similar to an ordinary truck to the vehicle 100. For example, the second upper device 200B has a body 210 having a passenger compartment 211 and a luggage compartment 213. The luggage compartment 213 is an example of a "luggage support capable of supporting luggage." Other configurations of the second upper device 200B are approximately the same as those of the first upper device 200A.

Figure 8:
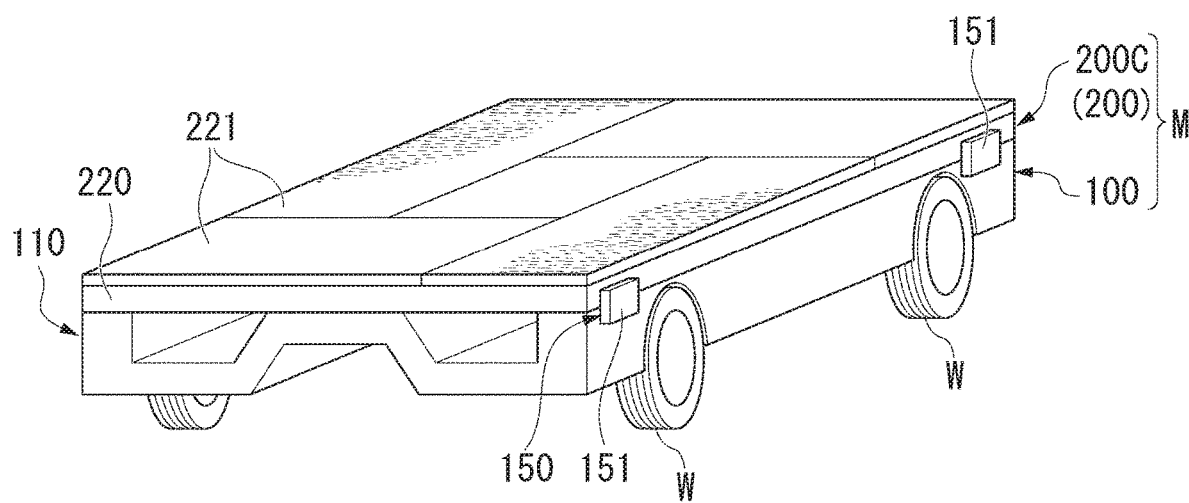
FIG. 8 is a perspective view showing the traveling body M including a third upper device 200C.

FIG. 8 is a perspective view illustrating a traveling object M including a third upper device 200C which is another example of the upper structure 200. The third upper device 200C is a unit which can provide a recreation function to the vehicle 100. For example, the third upper device 200C does not have a compartment, and the top and four sides are open. The third upper device 200C has a base 220 fixed to the traveling device 110 by the connecting mechanism 150 and a plurality of mats 221 attached to the base 220. The third upper device 200C travels on private land and private roads, for example. A user can enjoy cherry-blossom viewing or sightseeing using the third upper device 200C.

Figure 9:
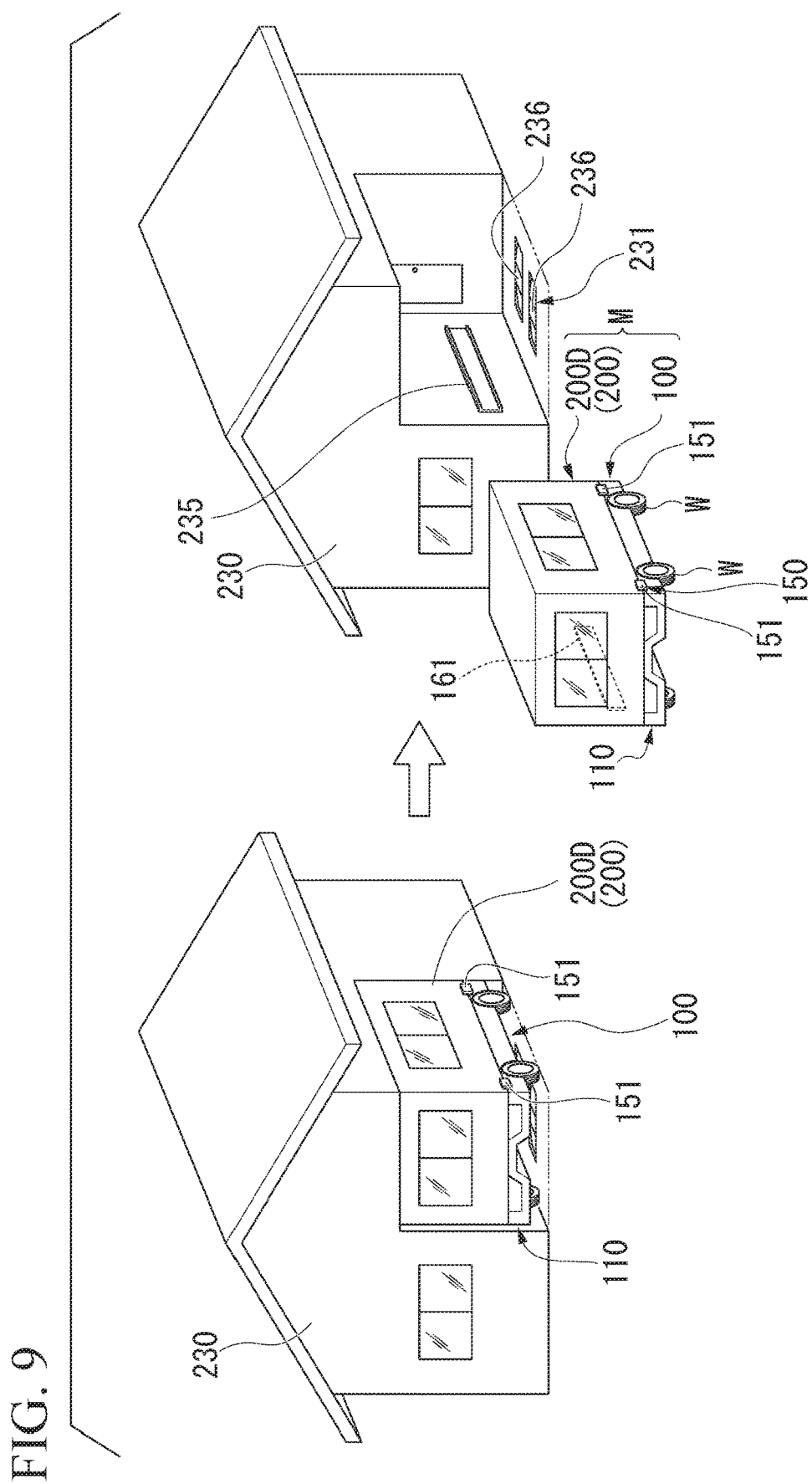
FIG. 9 is a perspective view showing the traveling body M including a fourth upper device 200D.
Figure 10:
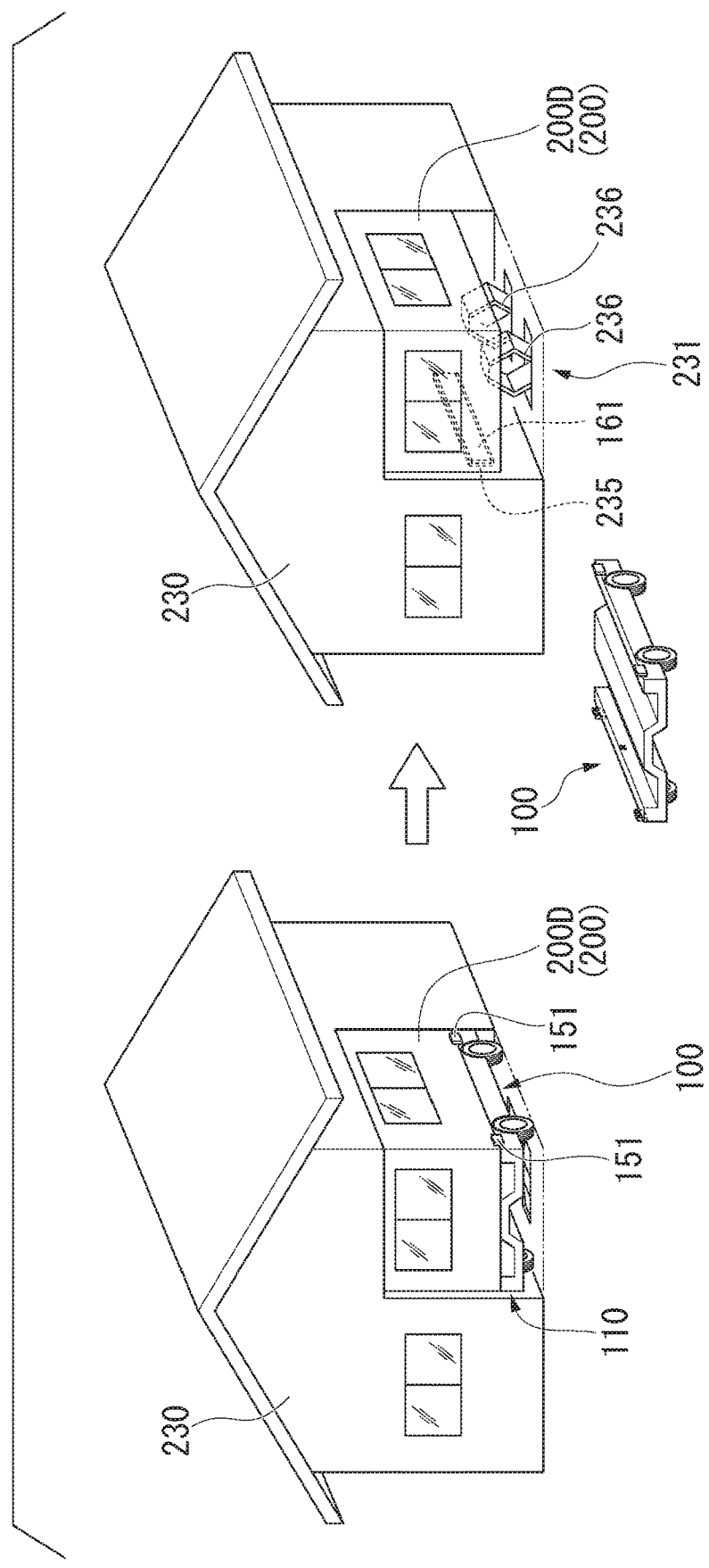
FIG. 10 is a perspective view showing the traveling body M including the fourth upper device 200D.

FIGS. 9 and 10 are perspective views illustrating a traveling object M including a fourth upper device 200D which is another example of the upper structure 200. The fourth upper device 200D is a unit which is a part of a structure 230 (a house, a building, or the like). In other words, the vehicle 100 provides a traveling function to a part of the structure 230 when a part of the structure 230 is connected thereto. A user can move to another place while living and working in the structure 230 using the fourth upper device 200D.

For example, as illustrated in FIG. 9, the fourth upper device 200D can move while connected to the vehicle 100 and loaded on the vehicle 100. On the other hand, as illustrated in FIG. 10, the fourth upper device 200D and the vehicle 100 can be separated from each other. In this case, the vehicle 100 can move while separated from the fourth upper device 200D in a state in which the fourth upper device 200D is left in the structure 230. The vehicle 100 can be connected to the fourth upper device 200D again by moving toward the lower side of the fourth upper device 200D from a state in which it is separated from the fourth upper device 200D.

In the present embodiment, the structure 230 includes a supporting structure 231 that supports the fourth upper device 200D left in the structure 230 from at least one of a lateral side and a lower side when the vehicle 100 moves with the fourth upper device 200D left in the structure 230. As illustrated in FIG. 9, the supporting structure 231 has a rail 235 and a support 236, for example.

The rail 235 is provided on a lateral surface of the structure 230. The fourth upper device 200D has an engagement member 161 supported by the rail 235 from a lateral side and a lower side. The engagement member 161 enters the inner side of the rail 235 and is supported by the rail 235, whereby the fourth upper device 200D is supported by the structure 230.

The support 236 is disposed in a region positioned on the lower side of the fourth upper device 200D when the fourth upper device 200D is connected to the structure 230. The support 236 supports the fourth upper device 200D from the lower side instead of the vehicle 100 when the vehicle 100 moves while separated from the fourth upper device 200D with the fourth upper device 200D left in the structure 230. For example, the support 236 is formed of a column or a jack of which the upper end supporting the fourth upper device 200D from the lower side can move in a height direction. For example, the support 236 is accommodated in an accommodation portion provided in the ground surface G, for example, so as not to make contact with the vehicle 100 when the vehicle 100 is positioned on the lower side of the fourth upper device 200D. On the other hand, the support 236 moves toward the upper side to make contact with the fourth upper device 200D and support the fourth upper device 200D from the lower side when the vehicle 100 moves with the fourth upper device 200D left in the structure 230.

Figure 11:
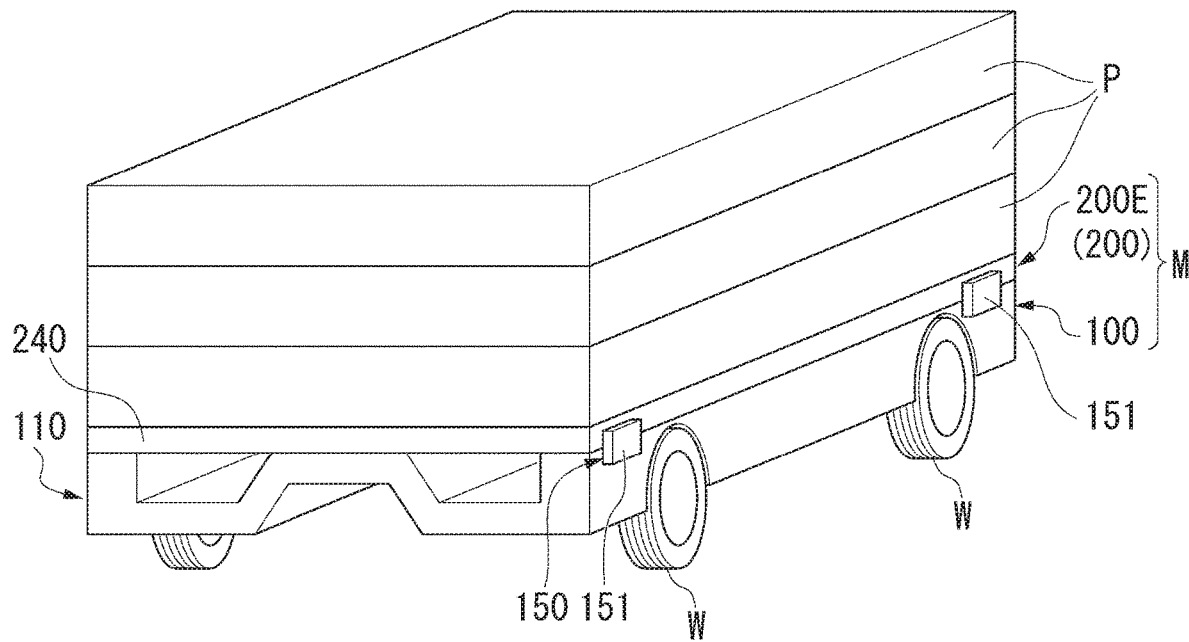
FIG. 11 is a perspective view showing the traveling body M including a fifth upper device 200E.

FIG. 11 is a perspective view illustrating a traveling object M including a fifth upper device 200E which is another example of the upper structure 200. The fifth upper device 200E is a unit which can provide function of a load carrying device to the vehicle 100. The fifth upper device 200E includes a palette 240 fixed to the traveling device 110 by the connecting mechanism 150. The palette 240 is another example of a "luggage support capable of supporting luggage." A plurality of loads P are loaded on the palette 240 and fixed to the palette 240 by a fixing member (not illustrated). A user can convey one or more loads P in a plant, a load collection place, and other workplaces using the fifth upper device 200E.

Figure 12:
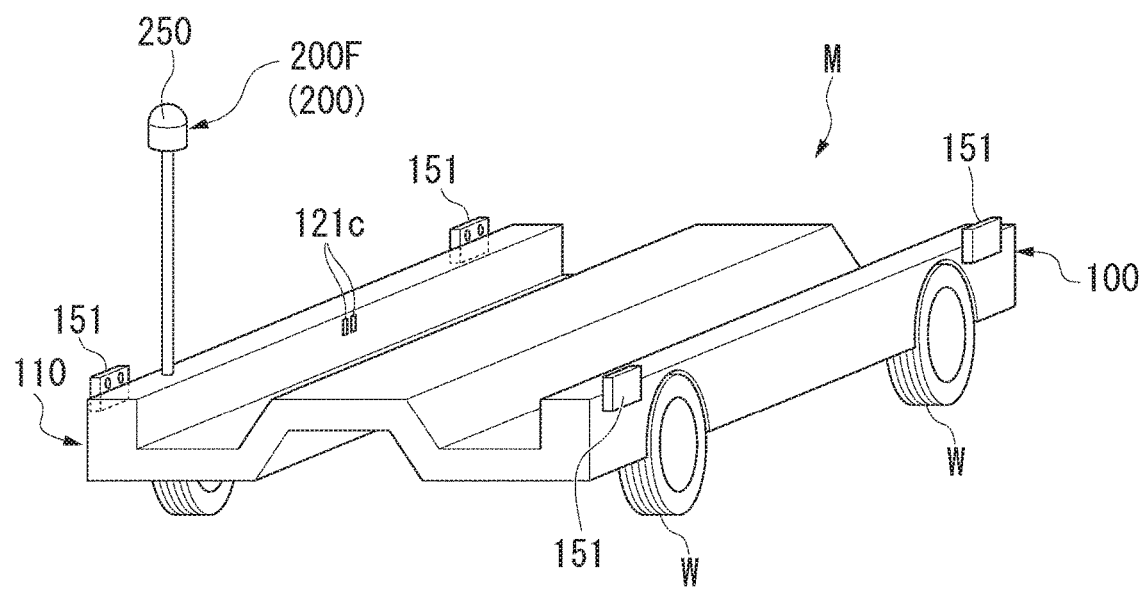
FIG. 12 is a perspective view showing a traveling body M including a sixth upper device 200F.

FIG. 12 is a perspective view illustrating a traveling object M including a sixth upper device 200F which is another example of the upper structure 200. The sixth upper device 200F is a unit which can provide functions of a surveillance device to the vehicle 100. The sixth upper device 200F includes a sensor 250 fixed to the traveling device 110. The sensor 250 includes a camera and a communication device capable of transmitting images and videos captured by the camera to a server or the like of a management center. The vehicle 100 can move along a designated route with the sensor 250 attached thereto. A user can patrol (detect abnormalities in) an arbitrary location using the sixth upper device 200F.

According to the configuration of the first embodiment described above, it is possible to provide the vehicle 100 which can be used for a plurality of uses. That is, in the present embodiment, the vehicle 100 to which an arbitrary upper structure 200 can be attached is provided. Due to this, independent development by many business operators can be allowed, and a broad and deep range of functions specialized for respective uses can be provided.

In the first embodiment, the traveling device 110 can customize the functions of the vehicle 100 by switchably mounting a plurality of upper structures 200. According to such a configuration, the vehicle 100 can function as a passenger car or a truck in a day-time period and can function as the traveling object M for another use such as a conveying palette having an automated driving function in a plant or the like in a night-time period (a resting period in a daytime use).

[First Modification of First Embodiment]

Figure 13:
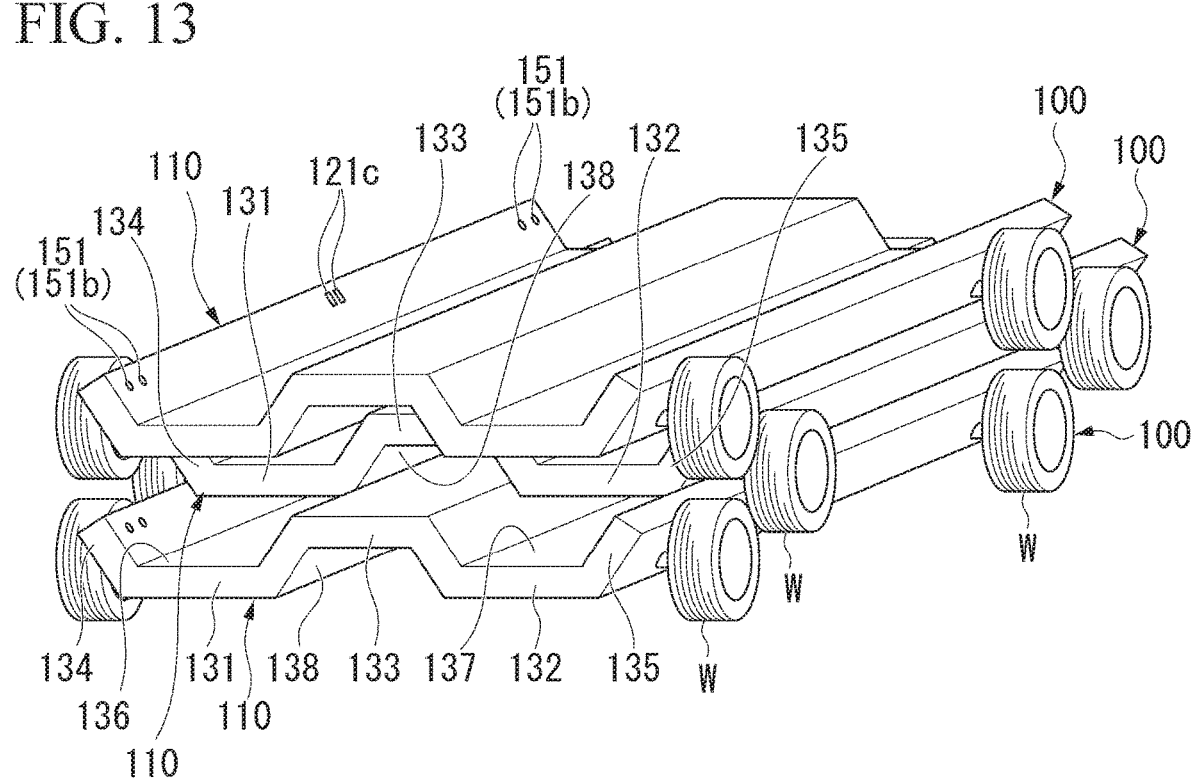
FIG. 13 is a perspective view showing a first modified example of the automated driving vehicle 100.

Next, a first modification of the first embodiment will be described. FIG. 13 is a perspective view illustrating a first modification of the first embodiment. As illustrated in FIG. 13, in the present modification, a vehicle 100 positioned on the lowermost side can travel in a state in which one or more other vehicles 100 are loaded on one vehicle 100 from an upper side.

In the first modification, the first erection portion 134 and the second erection portion 135 are inclined obliquely in a vertical direction so as to be positioned on the outer side in the vehicle width direction Y as the erection portions advance upward, for example. At least a portion of the first base portion 131 and the second base portion 132 of the traveling device 110 of a vehicle 100 immediately above the vehicle 100 on the lowermost side among the plurality of vehicles 100 overlapping in the height direction is accommodated in the first concave portion 136 and the second concave portion 137 of the traveling device 110 of the vehicle 100 on the lowermost side. The lower surface of the bulging portion 133 of each traveling device 110 forms a third concave portion 138 depressed toward the upper side. At least a portion of the bulging portion 133 of the traveling device 110 of the vehicle 100 on the lowermost side among the plurality of vehicles 100 overlapping in the height direction is accommodated in the third concave portion 138 formed by the bulging portion 133 of the traveling device 110 of the vehicle 100 immediately thereabove.

In this way, the overlapping thickness of the plurality of vehicles 100 is decreased.

From another viewpoint, the bulging portion 133 of the traveling device 110 of the vehicle 100 on the lowermost side supports the vehicle 100 immediately thereabove from the lower side by making contact with the traveling device 110 of the vehicle 100 immediately thereabove. The bulging portion 133 is an example of a "support" that supports the traveling device 110 of the vehicle 100 immediately thereabove. The inner surface (a surface forming a portion of the first concave portion 136 and the second concave portion 137) of the first erection portion 134 and the second erection portion 135 of the traveling device 110 of the vehicle 100 on the lowermost side supports the vehicle 100 immediately thereabove from the lower side by making contact with the traveling device 110 of the vehicle 100 immediately thereabove. Each of the first erection portion 134 and the second erection portion 135 is another example of a "support" that supports the traveling device 110 of the vehicle 100 immediately thereabove.

The traveling device 110 of the vehicle 100 on the lowermost side has the wheels W in contact with the ground surface G and can travel with a plurality of vehicles 100 loaded thereon. For example, the traveling device 110 of the vehicle 100 on the lowermost side is electrically connected to the battery 120a of the traveling device 110 of the vehicle 100 loaded thereon via the terminal 121 or the like. Due to this, the traveling device 110 of the vehicle 100 on the lowermost side can travel using the electric power supplied from the battery 120a of the traveling device 110 of one or more other overlapping vehicles 100.

The structure for overlapping the plurality of vehicles 100 is not limited to the above-described example. For example, the first erection portion 134 and the second erection portion 135 may be erected in a vertical direction. The plurality of vehicles 100 may be just stacked in the height direction.

[Second Modification of First Embodiment]

Figure 14:
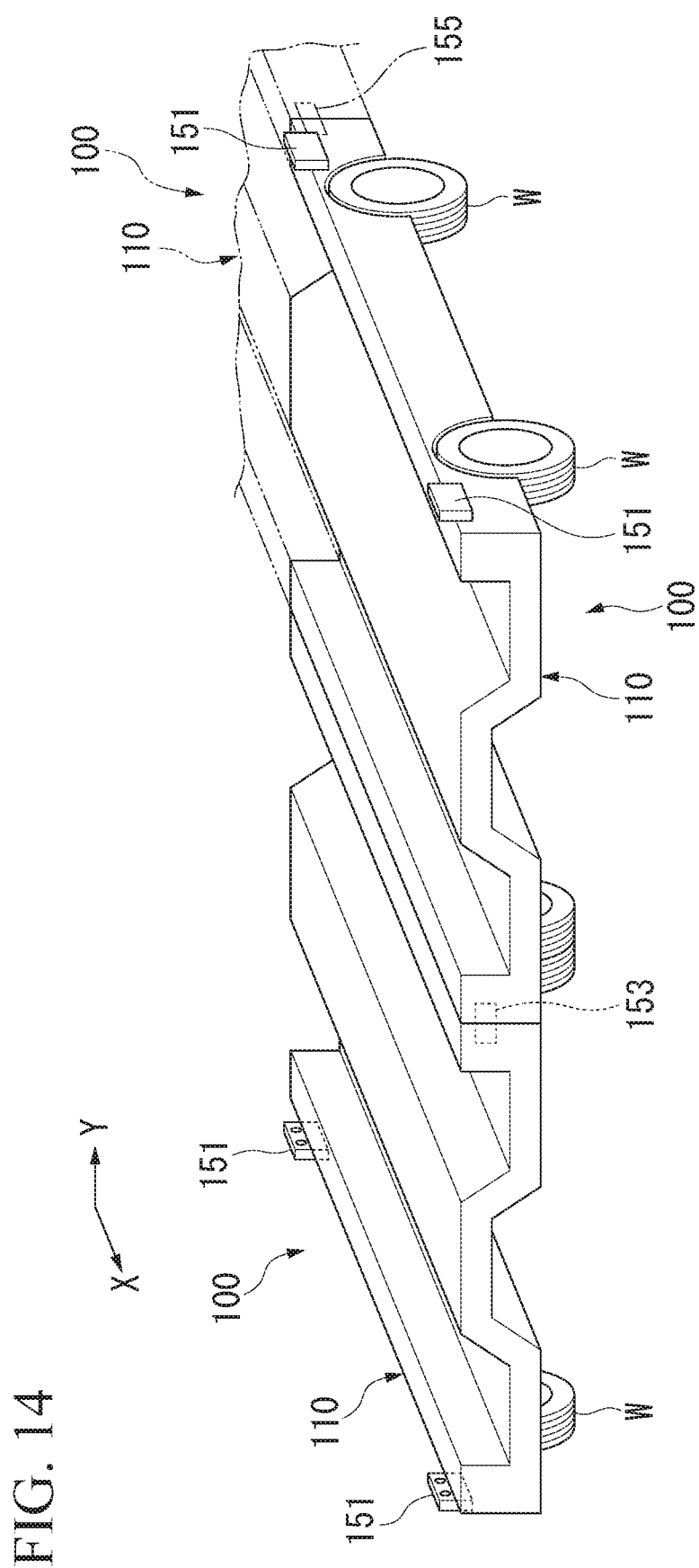
FIG. 14 is a perspective view showing a second modified example of the automated driving vehicle 100.

Next, a second modification of the first embodiment will be described. FIG. 14 is a perspective view illustrating a second modification of the first embodiment. As illustrated in FIG. 14, in the second modification, the traveling device 110 of the vehicle 100 has a connector 153 and a connector 155. The traveling device 110 may have only one of the connector 153 and the connector 155.

One connector 153 is a connector connected to the traveling device 110 of another vehicle 100 arranged in the vehicle width direction Y with respect to the traveling device 110. When the connector 153 is connected to the traveling device 110 of the other vehicle 100, the plurality of vehicles 100 are fixed together. In this way, the plurality of vehicles 100 can travel integrally. The connector 153 is an example of a "second connector". The traveling device 110 may be connected to the traveling device 110 of another vehicle 100 in a state in which one wheel W of the traveling device 110 is removed, and may be connected to the traveling device 110 of the other vehicle 100 in a state in which the wheel W of the traveling device 110 is not removed.

The other connector 155 is a connector connected to the traveling device 110 of another vehicle 100 arranged in the vehicle traveling direction X with respect to the traveling device 110. When the connector 155 is connected to the traveling device 110 of the other vehicle 100, a plurality of vehicles 100 are fixed together. In this way, the plurality of vehicles 100 can travel integrally. The connector 155 is another example of a "second connector".

According to the configuration of the first and second modifications of the first embodiment described above, the upper structure 200 has a size extending over a plurality of vehicles 100 connected to each other. That is, the plurality of vehicles 100 are connected by the connector 153 or the connector 155 whereby the upper structure 200 having a size which cannot be supported in one vehicle 100 can be supported. In this way, it is possible to further enhance the degree of freedom of the upper structure 200.

Figure 15:
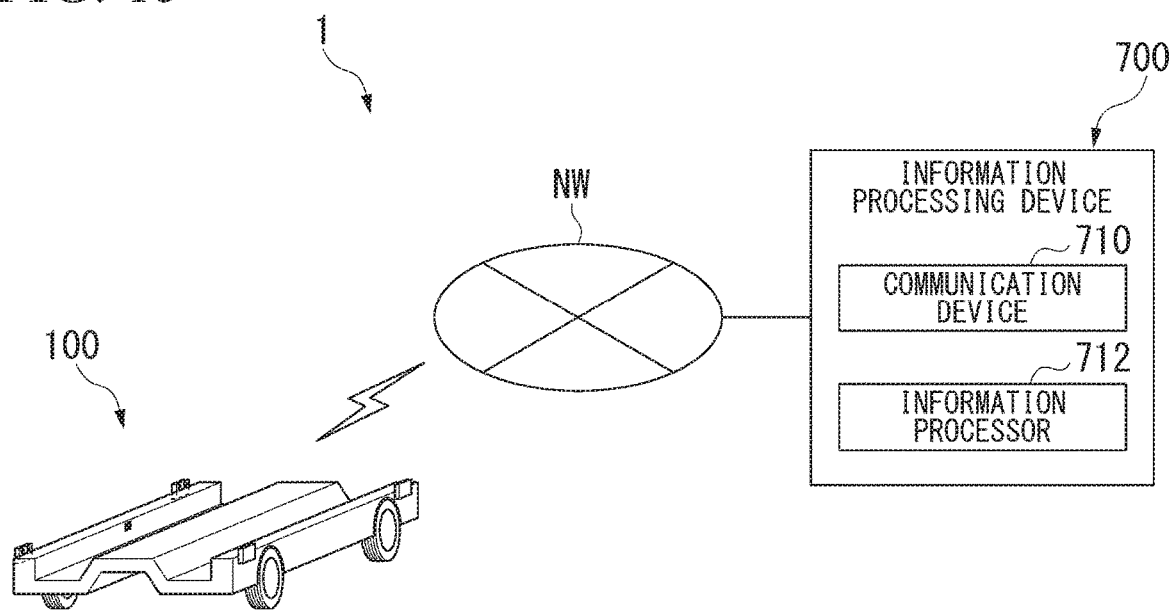
FIG. 15 is a configuration diagram showing an example of a vehicle use system 1.

While the first embodiment and a plurality of modifications of the first embodiment have been described, the configuration of the embodiment is not limited to the above-described examples. For example, the vehicle 100 may be used by such a vehicle use system 1 as illustrated in FIG. 15. That is, the vehicle use system 1 includes one or more information processing devices 700 disposed outside the vehicle 100. The information processing devices 700 has a communicator 710 that can communicate with the vehicle 100 and the terminal device 500 of a user via the network NW, for example, and an information processor 712. The information processor 712 may have some or all of the respective functional units (for example, the navigation controller 113b, the recommended lane determining device 114, and the automated driving controller 115) included in the traveling device 110 of the vehicle 100. The information processor 712 may be realized by a processor such as a CPU executing a program (software) stored in a memory, may be realized by hardware such as an LSI, an ASIC, an FPGA, or a GPU, and may be realized by cooperation of software and hardware.

In the first embodiment described above, a vehicle 100 having a size similar to an ordinary passenger car or truck has been described as the vehicle 100. However, the size of the vehicle 100 is not limited to the above example. The size of the vehicle 100 may be approximately the size of a bed, for example, and may be a size still smaller than the bed.

[Third Modification of First Embodiment]

Figure 16:
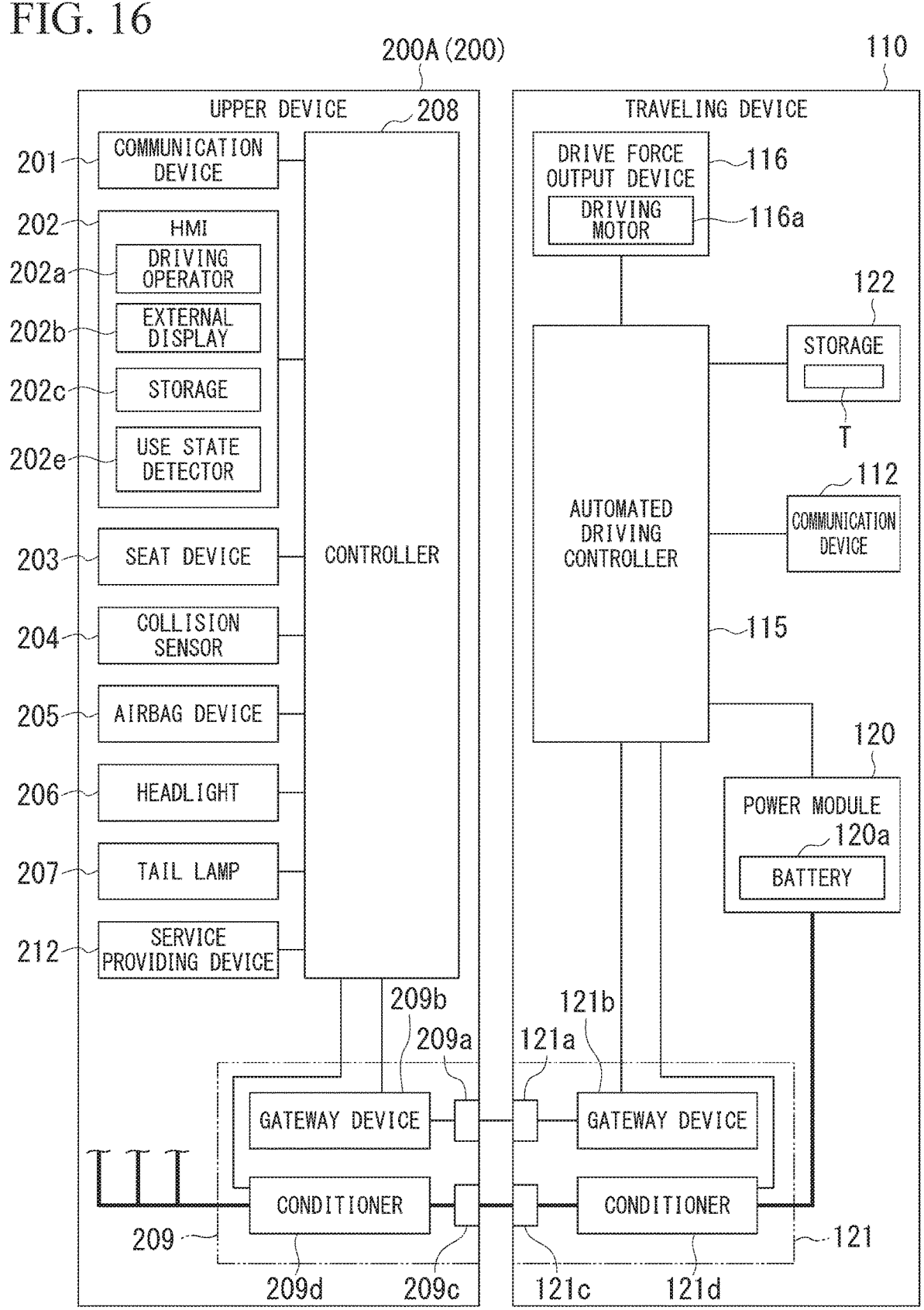
FIG. 16 is a configuration diagram showing a first upper device 200A and a traveling device 110 according to a second embodiment.

Next, a third embodiment of the first embodiment will be described. FIG. 16 is a block diagram illustrating a first upper device 200A and a traveling device 110 of the third modification of the first embodiment. As in the illustrated example, the HMI 202 of the first upper device 200A of the third modification of the first embodiment includes an external display 202b, a storage 202c, and a use state detector 202e in addition to the driving operator 202a. The first upper device 200A of the third modification of the first embodiment further includes a service providing device 212.

The external display 202b is an organic electro luminescence (EL) display attached to the surface of an outer body of the vehicle 100, for example. The external display 202b may be a liquid crystal display (LCD) fitted to the body and may be a display panel which forms a part or an entire part of the body. Moreover, the external display 202b may be a movable display device having a driving device. In this case, the external display 202b is accommodated in a position in which the display surface is not visible from the outside of the vehicle when the external display 202b does not display contents such as a still image or a moving image and is moved by the driving device to a position at which the display surface is visible from the outside of the vehicle when the external display 202b displays contents. Furthermore, the external display 202b may be a light-transmitting liquid crystal panel formed in at least a portion of a front windshield, a side windshield, or a rear windshield of the vehicle 100.

Figure 17:
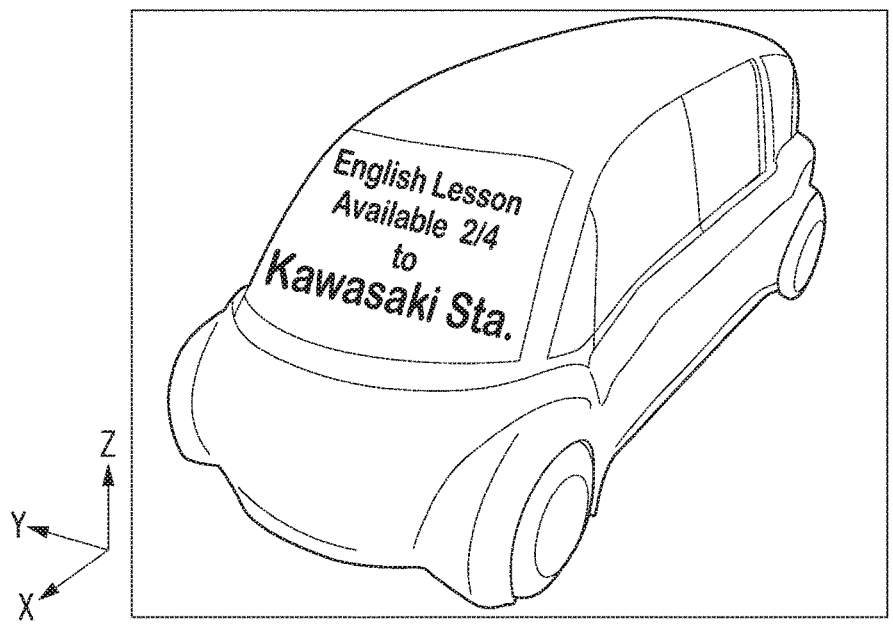
FIG. 17 is a diagram showing an example of an external display 202b.
Figure 18:
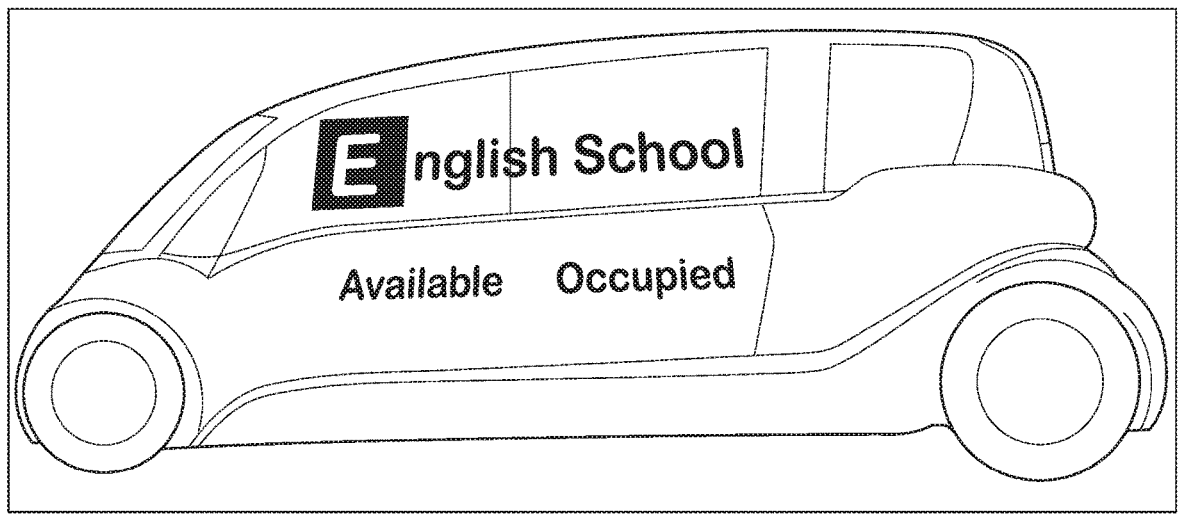
FIG. 18 is a diagram showing an example of the external display 202b.

FIGS. 17 and 18 are diagrams illustrating an example of the external display 202b. As illustrated in FIGS. 17 and 18, for example, a trademark or a logo indicating a service provided via the vehicle 100, the details (in the illustrated example, an English conversation school) of the service, a destination of the vehicle 100, and information (information indicating whether a user outside the vehicle can enter the vehicle 100 and can use the service) indicating an availability state of the service are displayed in the external display 202b.

Returning to FIG. 16, the storage 202c is realized by a storage device such as, for example, RAM, ROM, HDD, and a flash memory. Firmware (driver) and the like acquired from an external device (an application server or the like), for example, are stored in the storage 202c. The firmware is a program (software) for controlling respective devices connected to the controller such as the communication device 201, the HMI 202, the seat device 203, the collision sensor 204, the airbag device 205, and the service providing device 212 (hereinafter these devices will be referred to as accessories). The firmware is an example of "control information of accessories". The firmware stored in the storage 202c may be updated periodically or non-periodically. Moreover, identification information for identifying respective accessories may be stored in the storage 202c.

The use state detector 202e detects a use state of each compartment of the vehicle 100 on the basis of the presence or the position of a user boarding on the vehicle 100 or a load. A compartment is a space in the upper structure 200 of the vehicle 100 and is a space which a user can enter or in which a load can be loaded. The use state detector 202e may detect the use state of the compartment on the basis of the detection results obtained by a load sensor and an in-vehicle camera (which are not illustrated).

The service providing device 212 is a device provided by a service provider (a service owner) who uses the inside and the outside of the vehicle 100 for services. For example, the service providing device 212 outputs a video or a conversation voice of a third person, displays an advertisement on the external display 202b, and transmits information to a terminal device (for example, a smartphone or the like) of a user present in a compartment in order to provide the compartment of the vehicle 100 as a service providing place such as an English conversation classroom.

The controller transmits various pieces of information to the traveling device 110. For example, the controller controls the gateway device 209b to transmit information indicating the connection state of accessories connected thereto (the controller) to the gateway device 121b of the traveling device 110. The information indicating the connection state of the accessories may include information of the firmware and the identification information of accessories, for example. The gateway device 209b is an example of a "second communication interface".

The controller may control the communication device 201 to transmit the information indicating the connection state of accessories to the communication device 112 of the traveling device 110. The communication device 201 is another example of a "second communication interface".

When the terminal device 500 of a user is wirelessly connected to the service providing device 212 via Wi-Fi (registered trademark), Bluetooth, or the like, the controller may transmit the information indicating the connection state of accessories to the communication device 112 of the traveling device 110 via the terminal device 500 connected to the service providing device 212. The terminal device 500 connected to the service providing device 212 is another example of a "second communication interface".

When the information indicating the connection state of the accessories is transmitted to the traveling device 110 via wireless communication, an external server device may be provided between the first upper device 200A and the traveling device 110. The server device performs collation and authentication performed between the gateway device 121b and the gateway device 209b instead of the gateway device 121b and the gateway device 209b.

Upon receiving the information indicating the connection state of the accessories from the controller, the gateway device 121b or the communication device 112 of the traveling device 110 outputs the information to the automated driving controller 115. The automated driving controller 115 may authenticate that the upper structure 200 is an authorized upper structure 200 on the basis of the information indicating the connection state of the accessories output by the gateway device 121b or the communication device 112, for example.

When an external server device is provided between the first upper device 200A and the traveling device 110, the communication device 112 of the traveling device 110 may receive information indicating the results of collation and authentication performed by the server device. In this case, the automated driving controller 115 may authenticate that the upper structure 200 is an authorized upper structure 200 on the basis of the results of collation and authentication performed by the server device.

According to the configuration of the third modification of the first embodiment described above, similarly to the first embodiment, it is possible to provide the vehicle 100 which can be used in a plurality of uses. Due to this, independent development by many business operators can be allowed, and a broad and deep range of functions specialized for respective uses can be provided.

[Fourth Modification of First Embodiment]

Figure 19:
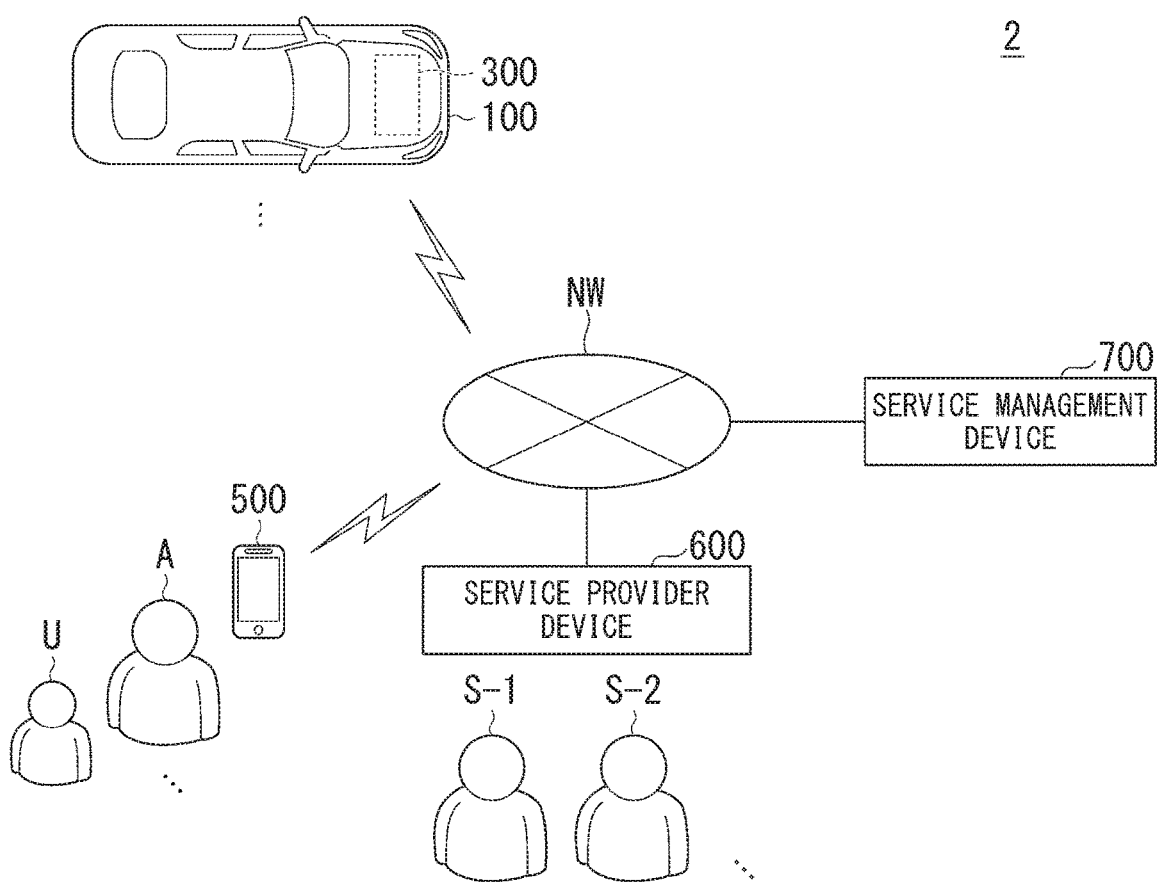
FIG. 19 is a configuration diagram of a service providing system 2 including a vehicle 100 (an automated driving vehicle 100) according to a third embodiment.

Next, a fourth modification of the first embodiment will be described. FIG. 19 is a block diagram of a service providing system 2 including the vehicle 100 (an automated driving vehicle 100) according to the fourth modification of the first embodiment. The service providing system 2 includes one or more vehicles 100, a plurality of terminal devices 500, a service provider device 600, and a service management device 700. The plurality of terminal devices 500 include a terminal device 500a used by a service provider S and a terminal device 500b used by a service applicant A. These components can communicate with each other via the network NW. The service of the service provider S is provided to a service user U. Although the service applicant A and the service user U are illustrated to be different persons in the drawing, the applicant and the user may be the same person. The term "used by the service applicant A" may include a situation in which a terminal device which can be used by many and unspecified persons such as a terminal device in an Internet café, for example, is temporarily used by the service applicant A.

Figure 20:
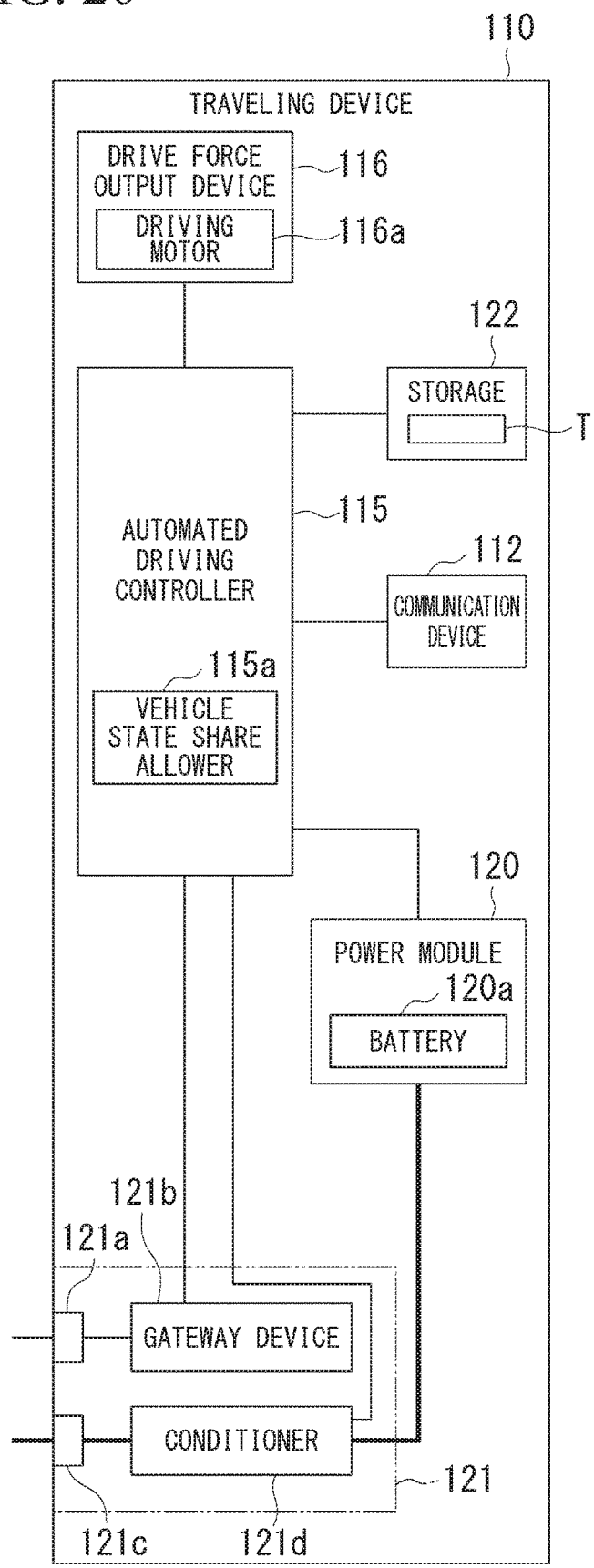
FIG. 20 is a diagram showing an example of a configuration of a traveling device 110 according to the third embodiment.

FIG. 20 is a diagram illustrating an example of a configuration of the traveling device 110 according to the third embodiment. The automated driving controller 115 of the traveling device 110 according to the third embodiment includes a vehicle state sharing allower 115a.

The vehicle state sharing allower 115a allows the information of the traveling device 200A to be shared with an accessory connected to the first upper device 200A or the terminal device 500 connected to the accessory (the service providing device 212 or the like) on the basis of the identification information of the accessory connected to the first upper device 200A and the firmware update information acquired from the service management device 700. The identification information of the accessory may be acquired by the communication device 112 of the traveling device 110 receiving the identification information stored in the storage 202c of the controller, for example. Moreover, the firmware update information may be acquired by the communication device 112 of the traveling device 110 receiving the identification information stored in the storage 800 of the service management device 700. Moreover, the vehicle state sharing allower 115a may allow the information of the traveling device 200A to be shared with the first upper device 200A or the terminal device 500 specified on the basis of the identification information (the upper device ID) of the first upper device 200A on the basis of the identification information of the accessory connected to the first upper device 200A and the firmware update information acquired from the service management device 700.

[Terminal Device]

The terminal device 500 is a smartphone, a tablet terminal, a personal computer, or the like, for example. The terminal device 500 is activated by an application program for using the service providing system 2, a browser, or the like to support services to be described later. In the following description, it is assumed that the terminal device 500 is a smartphone and an application program (a service applicant application) is activated. The service user application communicates with the service management device 700 according to an operation of the service applicant A to transmit a request from the service applicant A to the service management device 700 and send a push notification based on information received from the service management device 700. The service management device 700 is another example of an "information processing device" described in the first embodiment.

The terminal device 500 (500a and 500b) transmits service use request information including the following content to the service management device 700, for example. Position information is measured by a GPS receiver included in the terminal device 500, for example. The other information is basically based on the information input by the service applicant A or the service user U. Desired use service provider attribute information is information on the attribute of the service provider S desired by the service user U. The attribute may include an age, a gender, a personality (type), and the like in addition to the type of a service to be provided. With regard to the attribute, the service management device 700 may present attributes to the service user U to allow the service user U to select or determine the attributes rather than fixedly allocating a perfectly matching service provider S.

[Service Use Request Information]

User ID

Position information (longitude, latitude, and altitude)

Desired use space information (for example, represented by number of persons, number of seats, and the like)

Desired use service provider attribute information

Desired use service ID

Desired use segment information

Information on service use hours desired by service user

Payment authentication information

[Vehicle]

Figure 21:
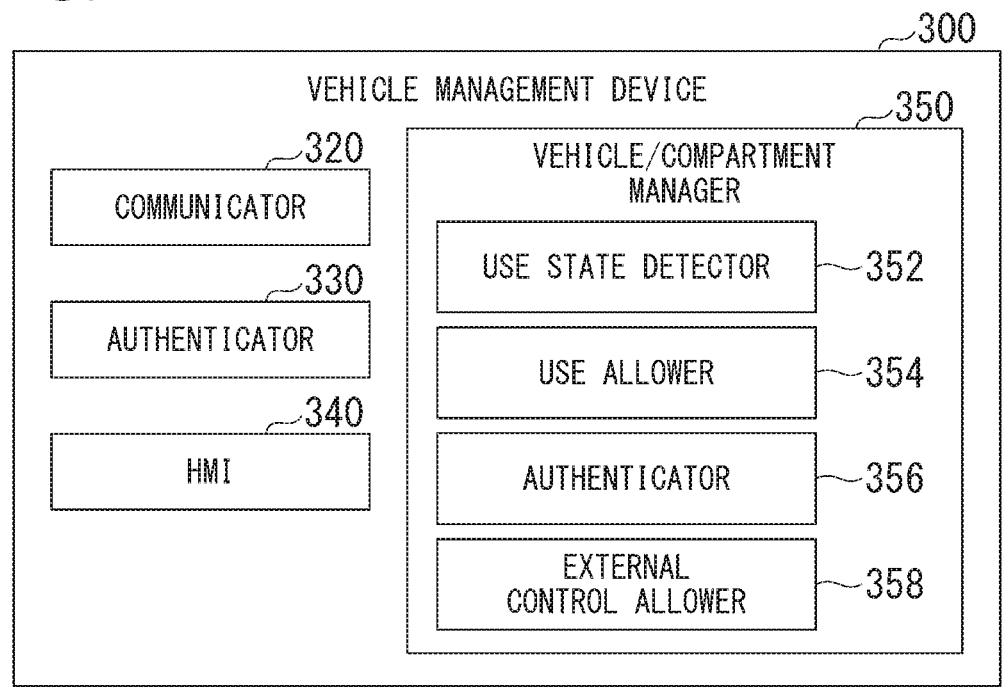
FIG. 21 is a diagram showing an example of a configuration of a vehicle management device 300 mounted on the vehicle 100.

A configuration (for example, a configuration related to automated driving) related to travel control of the vehicle 100 according to the fourth modification of the first embodiment is similar to the configuration of the vehicle 100 of the first embodiment and the first modification. That is, the vehicle 100 is an automated driving vehicle and is a vehicle having a wireless communication function as described later. FIG. 21 is a diagram illustrating an example of a configuration of a vehicle management device 300 mounted in the vehicle 100. The vehicle management device 300 is mounted in the first upper device 200A, for example. The vehicle management device 300 includes a communicator 320, an authenticator a330, an HMI 340, and a vehicle/compartment manager 350.

The communicator 320 is a wireless communication device. The communicator 320 communicates with the service management device 700 via the network NW. The authenticator a330 performs an authentication process for starting services according to an instruction of the service management device 700.

The HMI 340 receives an input operation on accessories and outputs information output from accessories as images or sound, for example. For example, the HMI 340 includes a touch panel display device, a speaker, a microphone, and the like.

The vehicle/compartment manager 350 includes, for example, a use state detector 352, a use allower 354, an authenticator 356, and an external control allower 358. One or more spaces (compartments) usable by the service user U and the service provider S are provided in the vehicle 100, and the use state detector 352 detects the use state of each compartment. For example, the use state detector 352 detects whether each compartment is being used. Although an ordinary passenger car is illustrated as the vehicle 100 in FIG. 21, the vehicle 100 may be a vehicle such as a trailer, a bus, or a microbus having such a size that one or more occupants can enter each of compartments that divide the inside of a passenger compartment. When the authentication by the authenticator 356 succeeds, for example, the use allower 354 allows the use of a predetermined compartment and unlocks a door, for example. The authenticator 356 performs authentication such as checking of the identity of the service user U or the service provider S who comes to board the vehicle.

The external control allower 358 determines whether the control of the traveling device 110 according to the operation of a user on accessories will be allowed on the basis of the identification information of the accessories connected to the first upper device 200A and the control information of the accessories acquired from the service management device 700. For example, the user riding on the compartment of the upper structure 200 may operate the terminal device 500 connected to the service providing device 212 to operate the traveling device 110. In this case, the external control allower 358 allows the user U to operate the traveling device 110 when it is authenticated that a combination of the target traveling device 110 operated by the user U and the first upper device 200A provided in the upper structure 200 on which the user U rides is an authorized combination on the basis of the identification information of accessories connected to the first upper device 200A and the control information of the accessories acquired from the service management device 700.

The communicator 320 of the vehicle management device 300 transmits vehicle information including the following content to the service management device 700, for example.

[Vehicle Information]

Traveling device ID for identifying the traveling device 110

Upper device ID for identifying the upper device 200A

Position information (longitude, latitude, and altitude)

Compartment use state (user ID of service user using compartment, available compartment information, and the like)

Traveling state (speed, acceleration, angular speed, in-vehicle device state, and the like)

Information on service provider S (ID of service provider, information on service being provided, elapsed time of service being provided, and the like)

Accessory information (identification information of accessory, encoded data of identification information of accessory, and the like)

Figure 22:
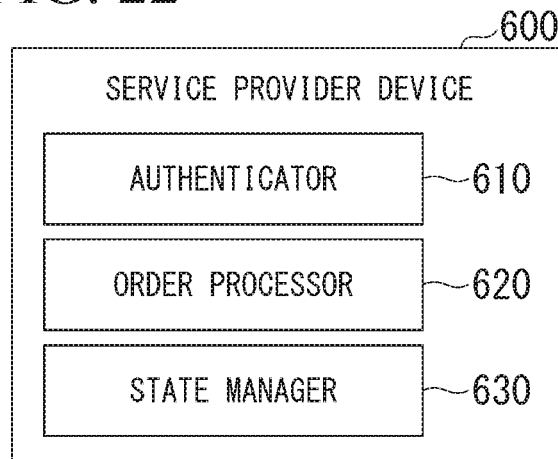
FIG. 22 is a diagram showing an example of a configuration of a service provider device 600.

FIG. 22 is a diagram illustrating an example of a configuration of the service provider device 600. The service provider device 600 is a device that can detect the states of a plurality of service providers and can automatically respond to an order from the service management device 700, for example. The service provider device 600 includes, for example, a communicator 610, an order processor 620, a state manager 630, and a storage 650.

The communicator 610 communicates with the service management device 700 and the like via the network NW. The order processor 620 receives a service order from the service management device 700. The order processor 620 determines whether the content of a service order is within the range of service providing information having been transmitted to the service management device 700 and performs an order receiving process when the content is determined to be within the range. The state manager 630 manages the state (a reservation state, an activation state, and the like) of the service provider S registered in the service provider device 600 and provides service providing information to the service management device 700.

The service provider device 600 transmits service providing information including the following content to the service management device 700, for example. The service providing information is information related to services for which the service provider S can accept an order.
[Service Providing Information]
  Authentication ID
  Accessory control information (for example, firmware update information, operation request, information transmission request, and the like)
    Service name
    Control signal
[Service Management Device]

Figure 23:
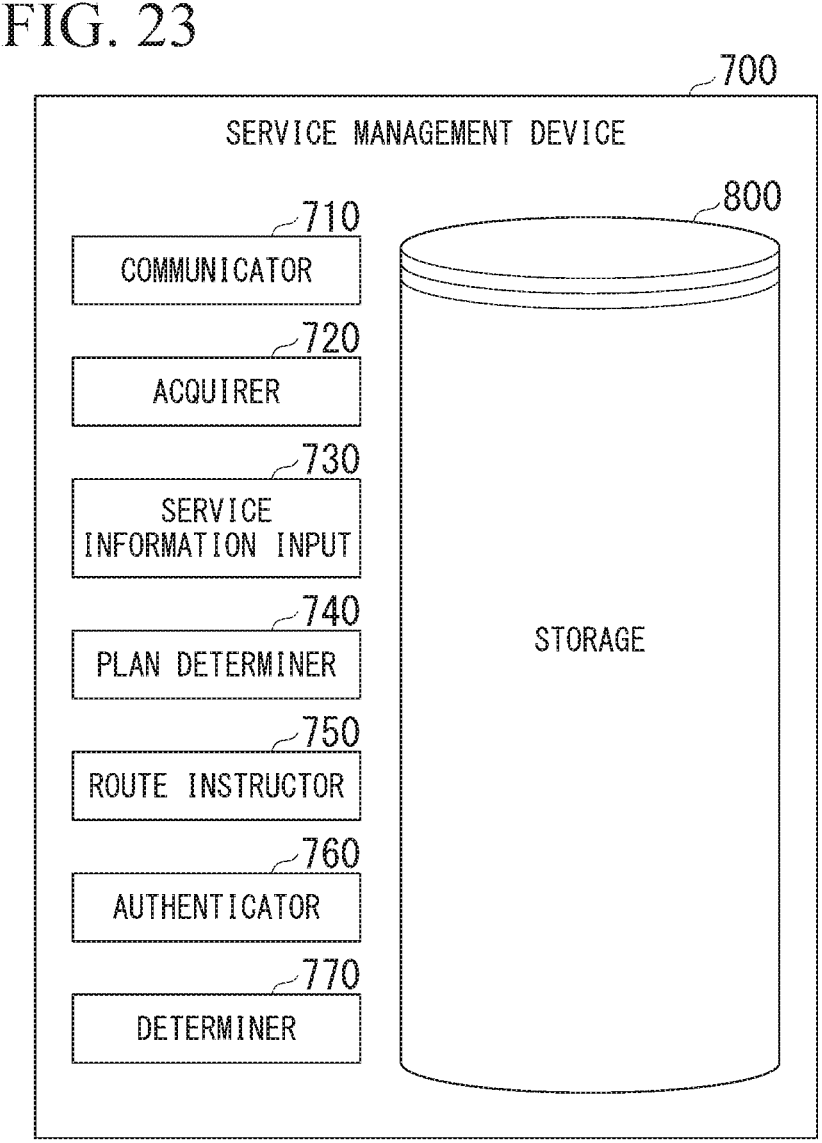
FIG. 23 is a diagram showing an example of a configuration of a service management device 700.

FIG. 23 is a diagram illustrating an example of a configuration of the service management device 700. The service management device 700 includes, for example, a communicator 710, an acquirer 720, a service information input 730, a plan determiner 740, a route instructor 750, an authenticator 760, a determiner 770, and a storage 800. Components excluding the communicator 710, the service information input 730, and the storage 800 are realized when a hardware processor such as a CPU executes a program (software). Some or all of these components may be realized by hardware (including circuitry) such as LSI, ASIC, FPGA, or GPU and may be realized by cooperation of software and hardware. The program may be stored in advance in a storage device such as an HDD or a flash memory and may be stored in a removable storage medium such as DVD or CD-ROM and be installed on a storage device when the storage medium is mounted on a drive device. The storage 800 is realized by an HDD, a flash memory, a RAM, a ROM, or the like.

The communicator 710 includes a network card for connecting to the network NW, for example. The communicator 710 communicates with the vehicle management device 300, the terminal device 500, the service provider device 600, and the like via the network NW.

The acquirer 720 acquires service use request information from the terminal device 10 via the communicator 710, acquires vehicle information from the vehicle management device 300 of the vehicle 100 registered in advance, and acquires service providing information from the service provider device 600.

The service information input 730 receives the inputs such as the type and the details of a service to be provided from the service provider S.

The plan determiner 740 specifies an available service that the service user U can enjoy on the basis of available vehicle information 820 and the service providing information and provides information on the specified available service to the terminal device 500 of the service user U.

More specifically, the plan determiner 740 sets an allowed use segment in which the service provider S can occupy at least a portion (for example, a compartment) of the vehicle 100 in the travel route of the vehicle 100 on the basis of the desired use segment included in the available vehicle information 820 and the service providing information.

The route instructor 750 gives an instruction on a route on which the vehicle 100 has to travel to the vehicle 100 by causing the communicator 710 to transmit information on a use start position and a use end position of the service user U and information on a use start position and a use end position of the service provider S to the vehicle 100.

The authenticator 760 performs authentication of the service user U and performs authentication at the start of providing services by communicating with the terminal device 500.

The determiner 770 determines whether each of the service user U and the service provider S uses the vehicle 100.

The plan determiner 740 performs various processes using the determination result obtained by the determiner 770. For example, the plan determiner 740 may accept change in the desired use segment only when the determiner 770 determines that both the service user U and the service provider S use the vehicle 100. This case occurs, for example, when the service provider S suggests the service user U to change a destination and to change a final destination during services on the basis of the information provided to the vehicle 100. The plan determiner 740 may allocate the vehicle 100 being used to the service user U preferentially when the determiner 770 determines that the service user U is already using the vehicle 100 (that is, the service user U has extended the service or has requested another service while using a service) at a time point when the acquirer 720 received the service use request information.

Figure 24:
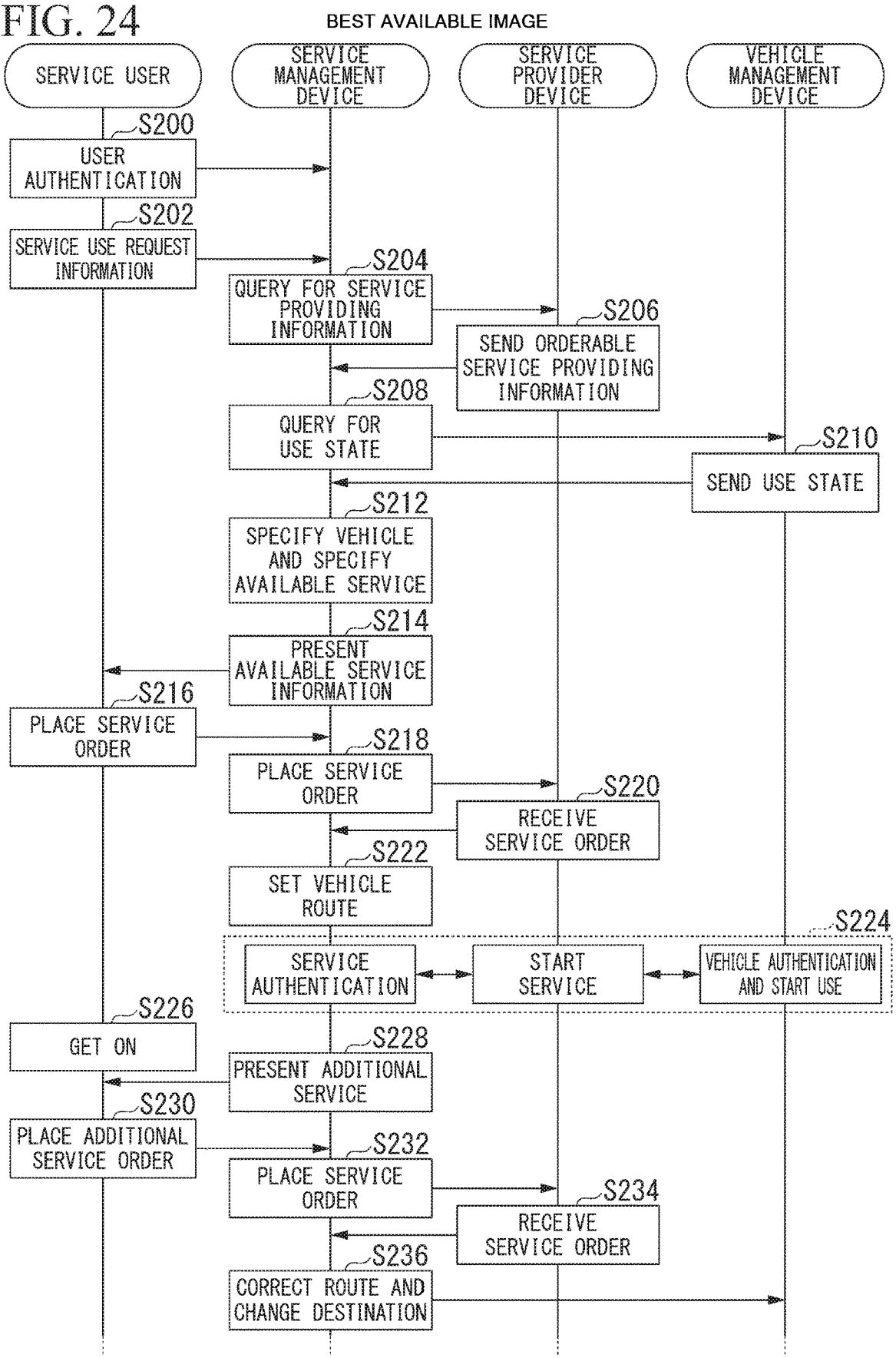
FIG. 24 is a flowchart showing an example of a flow of a process to be executed in the service providing system 2.

Service management information including the following content, for example, is stored in the storage 800.
[Service Management Information]
  User ID for identifying service requester A (service user U)
  Service ID for identifying service provided by service provider S
    Traveling device ID and upper device ID
    Firmware ID of upper device 200A
    Firmware ID of traveling device 110
    Encoded data from vehicle
    Encoded data from service provider
    Present position information of vehicle 100
    Service provider ID FIG. 24 is a flowchart illustrating an example of the flow of processes executed in the service providing system 2. First, a service requester A (the service user U) performs user authentication with respect to the authenticator 760 of the service management device 700 using the terminal device 500 (step S200). When the authentication of the authenticator 760 succeeds, the service requester A (the service user U) transmits service use request information to the service management device 700 using the terminal device 500 (step S202). The service use request information is acquired by the acquirer 720 and is stored in the storage 800 as service request management information 832.

When the service use request information is acquired, the acquirer 720 of the service management device 700 sends a query for service providing information to the service provider device 600 (step S204). A plurality of service provider devices 600 may be present depending on the attribute of a service to be provided and a service provider. In this case, the acquirer 720 may send a query to the plurality of service provider devices 600 simultaneously. The state manager 630 of the service provider device 600 replies to the service management device 700 with the service providing information related to a service for which an order can be accepted (indicating the details of a service for which an order can be accepted) (step S206).

On the other hand, the acquirer 720 of the service management device 700 sends a query for a use state (vehicle information) to the vehicle management device 300 (step S208). The vehicle/compartment manager 350 of the vehicle management device 300 replies to the service management device 700 with the use state detected by the use state detector 352 (step S210). The processes of steps S208 and S210 may be performed at an arbitrary timing whenever necessary asynchronously with the processes illustrated in the flowchart.

Next, the plan determiner 740 specifies an available vehicle on the basis of the service use request information and the information acquired in step S210 and generates available vehicle information acquired in step S206 (step S212). A plurality of vehicles may be specified in step S212. In this case, a final vehicle may be specified in the processes up to step S224 to be described later. The plan determiner 740 specifies an available service that the service user can enjoy on the basis of the available vehicle information an the service providing information indicating a service for which an order can be accepted (step S212) and transmits available service information indicating the details of the specified available service to the terminal device 500 (step S214).

The service applicant A (the service user U) browses the available service information, and as a result, places an order for services to the service management device 700 using the terminal device 500 (step S216). The plan determiner 740 of the service management device 700 extracts a part to be provided by the service provider among the services for which an order was received in step S216 and places an order for services to the service provider device 600 (step S218).

The order processor 620 of the service provider device 600 transmits a notice indicating that an order for a service has been received to the service management device 700 (step S220). In addition to this, the order processor 620 transmits the details of the order to the terminal device (not illustrated in the present embodiment) of the service provider.

Upon receiving the order notice from the service provider device 600, the route instructor 750 of the service management device 700 sets a route along which the vehicle 100 has to travel to be provided with services (step S222).

Subsequently, the authenticator 760 of the service management device 700 performs an authentication process for starting services with respect to the authenticator a330 of the vehicle 100 and the service provider device 600, the route instructor 750 sends an instruction on the route set in step S222 to the vehicle 100, the service provider device 600 performs authentication for starting services and specifies a final vehicle as necessary, the authenticator a330 of the vehicle management device 300 of the vehicle 100 performs vehicle-side authentication, and the vehicle 100 starts or plans traveling along the instructed route (step S224).

In the authentication process of S224, for example, the service provider device 600 acquires information on accessories connected to the available upper device 200A. That is, the information on accessories is transmitted from the vehicle 100 to the service provider device 600. Here, authentication may be performed in two steps for the upper device 200A and the accessories. When the owner of the upper device 200A is different from the service provider, the function of the accessory connectable to the upper device 200A or the vehicle state sharing allower 115*a* of the traveling device 110 executable by the upper device 200A may be defined separately by the owner or a travel manager.

After that, when the service user U boards the vehicle 100 (step S226) and an additional service can be presented, the plan determiner 740 presents an additional service to the terminal device 500 (step S228).

When the service user U boards the vehicle 100 (S226), the service provider may set availability of the accessories of the vehicle 100 which the user has board. In this case, the vehicle state sharing allower 115*a* allows the setting information on the availability of the accessories to be shared with the service management device 700. The service management device 700 may set the availability of the accessories. The accessories may include a video player, a power feeder, and the like provided in a compartment, for example. When the use of accessories is allowed, an occupant boarding the vehicle 100 can operate and use the accessory. In this case, the traveling state of the vehicle 100 and operation information or use information of accessories may be shared with the service provider device 600 when allowed by the vehicle state sharing allower 115*a*.

When the service user browses the details of an additional service and places an order for an additional service using the terminal device 500 (step S230), the plan determiner 740 of the service management device 700 places a service order for the additional service to the service provider device 600 (step S232). The order processor 620 of the service provider device 600 transmits information indicating that an order for an additional service has been received to the service management device 700 (step S234).

In the process of S234, for example, when an occupant places an order for services via accessories (for example, a specific video contents is played using accessories), the order processor 620 of the service provider device 600 sets a route and a destination appropriate for the service again simultaneously with reception of the order for the service and sends an instruction related to the route and destination to the vehicle 100. More specifically, a functional unit such as the order processor 620 of the service provider device 600 corrects the route so as to pass through a stop set by the service provider device 600 according to the details of the contents such as a sightseeing guidance and adjusts a passing speed according to a description hour. In this case, any one of the functional units of the service provider device 600 provided in the upper device 200A is an example of an "external control allower". In this way, a service provided by the service provider can be linked with a control state of the vehicle 100 and accessories disposed arbitrarily in the vehicle 100, and the degree of freedom of the service provider arranging the accessories linked with travel can be enhanced.

Upon receiving information indicating that an order for an additional service has been received, the route instructor 750 of the service management device 700 sends an instruction related to correction of the route and change in the destination to the vehicle 100 (step S236).

According to the configuration of the fourth modification of the first embodiment described above, similarly to the first embodiment or the first modification, it is possible to provide the vehicle 100 which can be used in a plurality of uses. Due to this, independent development by many business operators can be allowed, and a broad and deep range of functions specialized for respective uses can be provided.

Second Embodiment

Next, a second embodiment will be described. In the second embodiment, a service management device, a service providing system, a service management method, and a program to which the automated driving vehicle of the first embodiment is applicable will be described. The service management device is a device that manages a service realized by a service user riding together with a service provider within a moving vehicle. This service may mainly indicate riding together itself, or may indicate riding together and some kind of operation being further performed. An example of the former includes a service in which a service provider such as a nursery teacher, a caregiver, or a nurse rides together with a service user for whom boarding a vehicle alone is not desirable (for example, an infant, an aged person, a sick person, or a physically disabled person). Meanwhile, even in the case of indicating riding together itself, it may include performance of a concomitant service such as a service provider taking care of an infant or a baby who is a service user.

A service described in the second embodiment is applied by, for example, a riding-together request which is electronically transmitted and received. A person who sends a riding-together request (a service applicant) may be a service user himself or herself, or may be another person (such as a family) In addition, a vehicle which is used in this service is, for example, an autonomously driven vehicle which basically does not require a driving operation. In the following description, an autonomously driven vehicle is used, but a manually driven vehicle may be used.

Hereinafter, a second embodiment will be described. In the second embodiment, a service mainly indicates riding together itself, and it is assumed that a service provider is requested to ride together in a vehicle throughout the entire section in which a service user is on board the vehicle.

[Overall Configuration]

Figure 25:
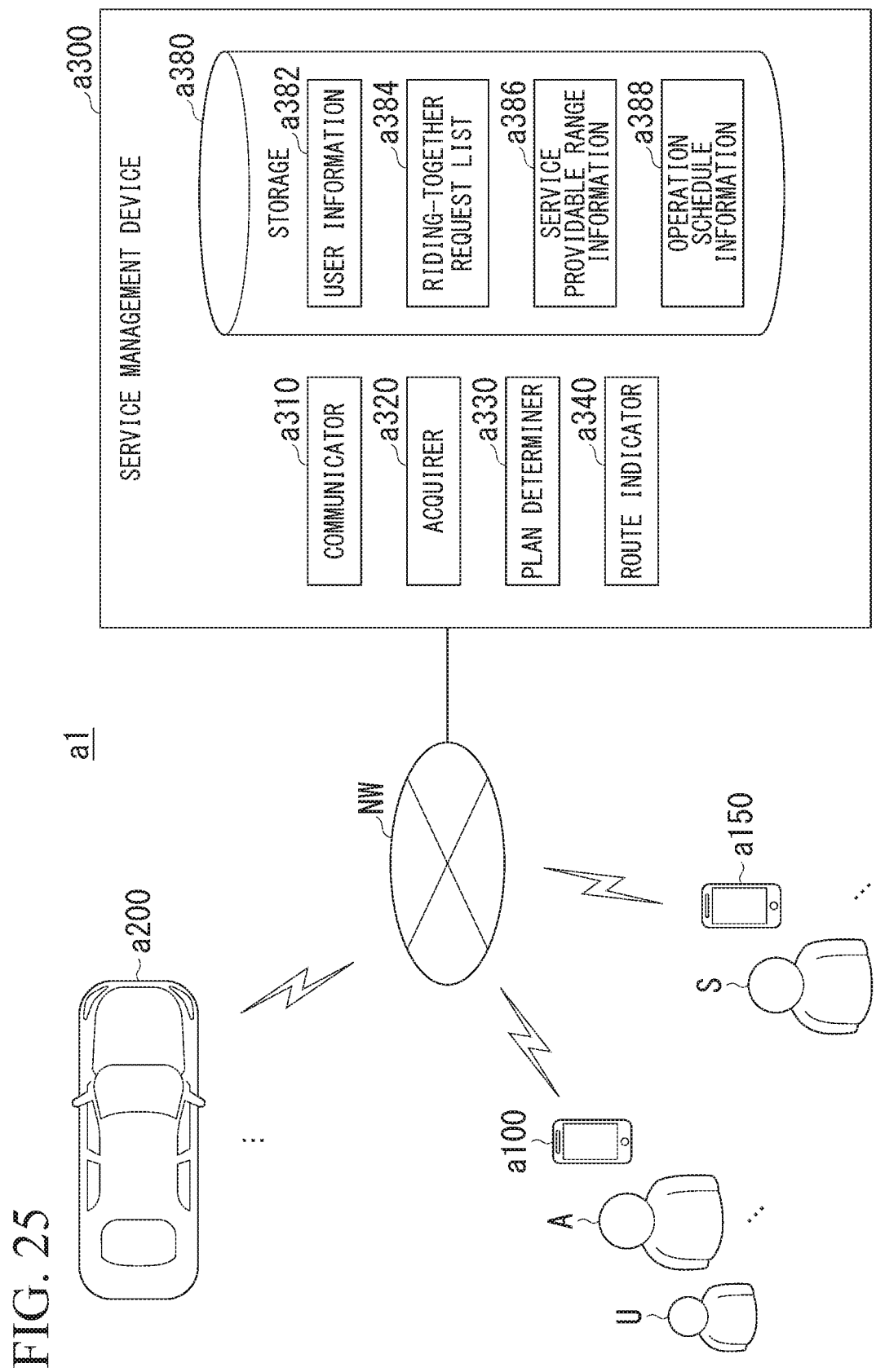
FIG. 25 is a configuration diagram of a service providing system a1 including a service management device a300.

FIG. 25 is a configuration diagram of a service providing system a1 including a service management device a300. The service providing system a1 includes one or more terminal devices a100 which are used by one or more service applicants A, one or more terminal devices a150 which are used by one or more service providers, one or more vehicles a200, and the service management device a300. These components can communicate with one another through a network NW. The network NW includes the Internet, a wide area network (WAN), a local area network (LAN), a public line, a provider device, a dedicated channel, a wireless base station, or the like. A service provided by a service provider S is provided to a service user U. In the drawing, the service applicant A and the service user U are shown like different persons, but they may be the same person. Meanwhile, "used by the service applicant A or the service provider S" may include terminal devices, capable of being used by an unspecified large number of users, such as terminal devices in an Internet cafe being temporarily used by the service applicant A or the service provider S.

[Terminal Device]

The terminal device a100 is, for example, a smartphone, a tablet terminal, a personal computer, or the like. In the terminal device a100, an application program, a browser or the like for using the service providing system a1 is started up, and a service to be described below is supported. In the following description, it is assumed that the terminal device a100 is a smartphone, and that an application program (an application for a service applicant) is started up. The application for a service user communicates with the service management device a300 in accordance with the service applicant A's operation, and transmits a request from the service applicant A to the service management device a300, or performs a push notification based on information received from the service management device a300.

Similarly to the terminal device a100, the terminal device a150 is, for example, a smartphone, a tablet terminal, a personal computer, or the like. In the terminal device a150, an application program, a browser or the like for participating in the service providing system a1 is started up, and a service to be described below is supported. In the following description, it is assumed that the terminal device a150 is a smartphone, and that an application program (an application for a service provider) is started up. The application for a service provider communicates with the service management device a300 in accordance with the service provider S's operation, and transmits acceptance information of the service provider S to the service management device a300, or performs a push notification based on information received from the service management device a300.

[Vehicle]

Figure 26:
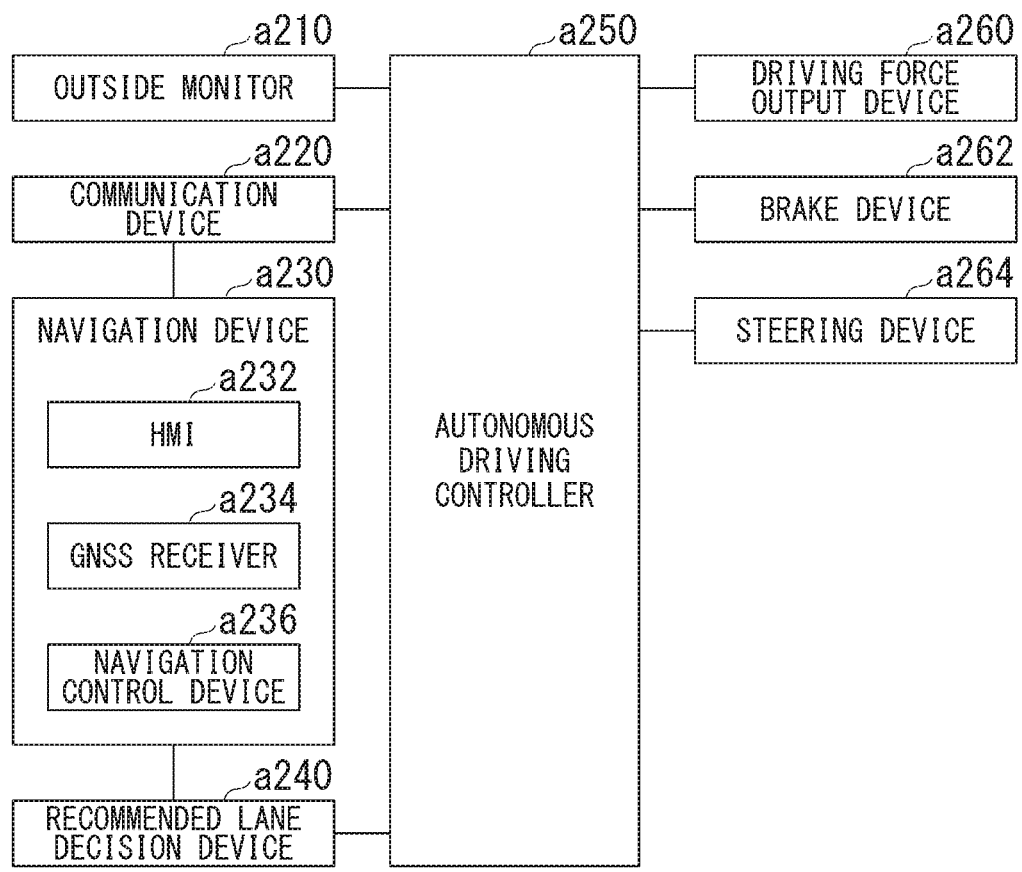
FIG. 26 is a configuration diagram of a vehicle a200.

The vehicle a200 is a vehicle including at least a vehicle interior. FIG. 26 is a configuration diagram of the vehicle a200. The vehicle a200 includes, for example, an outside monitor a210, a communication device a220, a navigation device a230, a recommended lane decision device a240, an autonomous driving controller a250, a driving force output device a260, a brake device a262, and a steering device a264.

The outside monitor a210 includes, for example, a camera, a radar, a light detection and ranging (LIDAR) sensor, an object recognition device that performs a sensor fusion process on the basis of the outputs thereof, or the like. The outside monitor a210 estimates the type of object (particularly, a vehicle, a pedestrian, and a bicycle) present in the vicinity of the vehicle a200, and outputs the estimated type to the autonomous driving controller a250 together with information on the position or speed.

The communication device a220 is, for example, a wireless communication module for connection to the network NW or direct communication with another vehicle, a pedestrian's terminal device, or the like. The communication device a220 performs wireless communication on the basis of Wi-Fi, dedicated short range communications (DSRC), Bluetooth (registered trademark), or another communication standard. As the communication device a220, a plurality of devices for its use may be prepared.

The navigation device a230 includes, for example, a human machine interface (HMI) a232, a global navigation satellite system (GNSS) receiver a234, and a navigation control device a236. The HMI a232 includes, for example, a touch panel-type display device, a speaker, a microphone, or the like. The HMI a232 outputs an image or a sound or receives operation content from an occupant. For example, the HMI a232 outputs information for displaying a route to a destination on a screen or prompting an occupant to perform an operation on the vehicle 200 on the screen or outputs the information as a sound.

The GNSS receiver 234 positions an own position (the position of the vehicle 200) based on radio waves arriving from GNSS satellites (for example, GPS satellites). The navigation control device 236 includes, for example, a CPU and various storage devices and control of the entire navigation device 230. A storage device stores map information (a navigation map). The navigation map is a map in which roads are indicated using nodes and links. The navigation control device a236 includes, for example, a central processor (CPU) or various storage devices, and controls the entirety of the navigation device a230. Map information (a navigation map) is stored in the storage device. The navigation map is a map in which roads are represented using nodes and links. The navigation control device a236 refers to the navigation map to decide a route to a destination designated using the HMI a232 from the position of the vehicle a200 measured by the GNSS receiver a234. In addition, the navigation control device a236 may transmit the position of the vehicle a200 and the destination to a navigation server (not shown) using the communication device a220, and acquire a route sent back from the navigation server. In addition, in the present example, a route to a destination may be designated by the service management device a300. Meanwhile, the route may include information on an arrival target time and a point at which a vehicle stops in order to allow a user to board or exit the vehicle. The navigation control device a236 outputs information on the route decided using any of the foregoing methods to the recommended lane decision device a240.

The recommended lane decision device a240 includes, for example, a micro processor (MPU) and various storage devices. High-accuracy map information which is more detailed than the navigation map is stored in the storage device. The high-accuracy map information includes, for example, information such as a road width or gradient for each lane, curvature, or the position of a signal. The recommended lane decision device a240 decides a preferred recommended lane in order to travel along a route which is input from the navigation device a230, and outputs the decided recommended lane to the autonomous driving controller a250.

The autonomous driving controller a250 includes one or more processors such as a CPU or an MPU and various storage devices. The autonomous driving controller a250 causes the vehicle a200 to travel autonomously while avoiding contact with an object of which the position or speed is input from the outside monitor a210 with travel in the recommended lane decided by the recommended lane decision device a240 as a principle. The autonomous driving controller a250 sequentially executes, for example, various events. Examples of the events include a constant-speed traveling event of traveling in the same traveling lane at a constant speed, a following traveling event of following a preceding vehicle, a lane change event, a merging event, a divergence event, an emergency stop event, a tollbooth event for passing a tollbooth, a handover event for terminating autonomous driving and switching to manual driving, and the like. In addition, during execution of these events, behavior for avoidance may be planned on the basis of the surrounding situation (such as the presence of a nearby vehicle or pedestrian or lane narrowing caused by road construction) of the vehicle a200.

The autonomous driving controller a250 generates a target trajectory along which the vehicle a200 will travel in the future. The target trajectory includes, for example, a speed element. For example, the target trajectory is represented as points (trajectory points), lined up in order, to be reached by a host vehicle M. A trajectory point is a point to be reached by the host vehicle M for each predetermined traveling distance, and aside from this, target speed and target acceleration for each predetermined sampling time (for example, approximately several tenths of a [sec]) are generated as a portion of the target trajectory. In addition, the trajectory point may be a position, for each predetermined sampling time, to be reached by the host vehicle M at the sampling time. In this case, information of the target speed or the target acceleration is represented by an interval between trajectory points.

Detailed descriptions of the processes of the automated driving will be emitted while supporting FIG. 3 and related descriptions thereto which are introduced in the first embodiment. A driving force output device a260 has a function the same as the driving force output device a116, a brake device a262 has a function the same as the brake device a117, and a steering device a264 has a function the same as the brake device a118.

The driving force output device a260 outputs a traveling drive force (torque) for a vehicle to travel to a driving wheel. The driving force output device a260 includes, for example, a combination of an internal-combustion engine, an electric motor, a transmission or the like, and a power ECU that controls these components. The power ECU controls the above components in accordance with information which is input from the autonomous driving controller a250 or information which is input from a driving operator (not shown).

The brake device a262 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the autonomous driving controller a250 or the information which is input from the driving operator, and causes a brake torque according to a braking operation to be output to each wheel. The brake device a262 may include a mechanism that transfers hydraulic pressure generated by the operation of a brake pedal included in the driving operator through a master cylinder to the cylinder as a backup. Meanwhile, the brake device a262 is not limited to the above-described configuration, and may be an electronic control type hydraulic pressure brake device that controls an actuator in accordance with the information which is input from the autonomous driving controller a250 and transfers hydraulic pressure of the master cylinder to the cylinder.

The steering device a264 includes, for example, a steering ECU and an electric motor. The electric motor changes the direction of a turning wheel, for example, by causing a force to act on a rack and pinion mechanism. The steering ECU drives the electric motor in accordance with the information which is input from the autonomous driving controller a250 or the information which is input from the driving operator, and changes the direction of the turning wheel.

[Service Management Device]

Referring back to FIG. 25, the service management device a300 includes, for example, a communicator a310, an acquirer a320, a plan determiner a330, a route indicator a340, and a storage a380.

The communicator a310 is, for example, a network card for connection to the network NW. In addition, the storage a380 is realized by a hard disk drive (HDD), a flash memory, a random access memory (RAM), a read only memory (ROM), or the like. The communicator a310 communicates with the terminal devices a100 and a150 or the vehicle a200 through the network NW.

The acquirer a320, the plan determiner a330, and the route indicator a340 are realized, for example, by a processor such as a CPU executing a program (software) stored in the storage 380. In addition, some or all of these functional units may be realized by hardware such as a large scale integration (LSI), an application specific integrated circuit (ASIC), or a field-programmable gate array (FPGA), or may be realized by software and hardware in cooperation.

The acquirer a320 acquires a riding-together request issued from the terminal device a100 of the service applicant A through the communicator a310 and the network NW, and registers the acquired riding-together request as a riding-together request list a384 with the storage a380. In addition, the acquirer a320 acquires a service providable range notification issued from the terminal device a150 of the service provider S through the communicator a310 and the network NW, and registers the acquired service providable range notification as service providable range information a386 with the storage a380. Meanwhile, user information a382 includes personal information or the like of the service applicant A, the service user U, and the service provider S.

FIG. 27 is a diagram illustrating an example of content of the riding-together request list a384. As shown in the drawing, the riding-together request list a384 is information in which the number of service users, a desired point of boarding, a destination, a desired time of boarding, a plan decided flag indicating whether a plan is decided (for example, 1 indicates that a plan is decided, and 0 indicates that a plan is undecided), or the like is associated with an applicant ID which is identification information of the service applicant A registered in advance. Information other than the plan decided flag has its content decided by a service application of the terminal device a100 accepting the service applicant A's input, and is transmitted to the service management device a300 as a riding-together request. A section from a desired point of boarding to a destination is an example of a "first boarding section." Hereinafter, a series of information associated with one user ID in the riding-together request list a384 may be referred to as a record. Meanwhile, the riding-together request is not required to be performed in every use, and a plurality of riding-together requests may be performed collectively. For example, an application such as a desire for a riding-together service from a desired point of boarding to a destination at fixed times on weekdays every week may be performed.

FIG. 28 is a diagram illustrating an example of content of the service providable range information a386. As shown in the drawing, the service providable range information a386 is information in which a service providable day, a service providable time slot, a service providable area, or the like is associated with a service provider ID which is identification information of the service provider S registered in advance.

The plan determiner a330 decides a riding-together plan of the service user U and the service provider S in response to the riding-together request registered with the riding-together request list a384. The plan determiner a330 of the second embodiment decides a section in which the service provider S boards the vehicle a200 (a second boarding section) so as to include a section from a desired section of boarding to a destination in the riding-together request.

Figure 29:
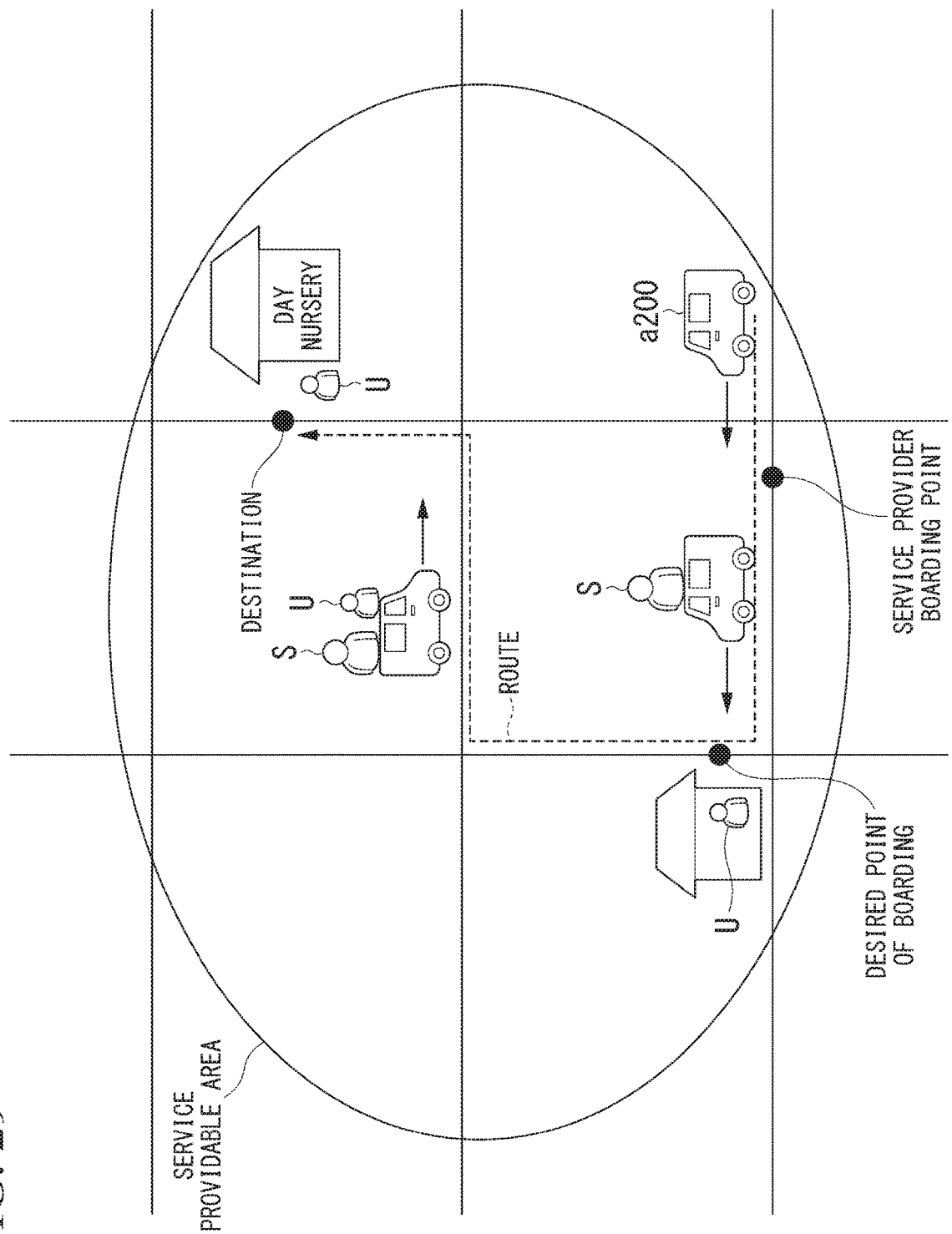
FIG. 29 is a diagram (part 1) showing a state in which a fellow passenger plan is determined.

FIG. 29 is a first diagram illustrating a status in which a riding-together plan is decided. The riding-together plan is set in a case where conditions such as both a desired point of boarding and a destination falling within a service providable area and a period obtained by adding an assumed driving time to a desired time of boarding falling within a service providable time slot are met. At the desired point of boarding of the service user U, the service provider S is already on board the vehicle a200, and the vehicle a200 moves on to a desired place after the service user U is dropped off at a destination. A day nursery or the like is at the destination.

FIG. 30 is a diagram illustrating an example of content of operation schedule information a388 in which the riding-together plan shown in FIG. 29 is reflected. As shown in the drawing, the service provider S whose service provider ID is "A" boards a vehicle at a stop point (1), the service user U corresponding to a service applicant whose applicant ID is "0001" boards the vehicle at a stop point (2) equivalent to a desired point of boarding, and the service user U exits the vehicle at a stop point (3) which is a destination and enters a day nursery. The vehicle a200 carrying the service provider S moves to a place where the service user U waits for the purpose of the next service, or sends the service provider S home.

Figure 31:
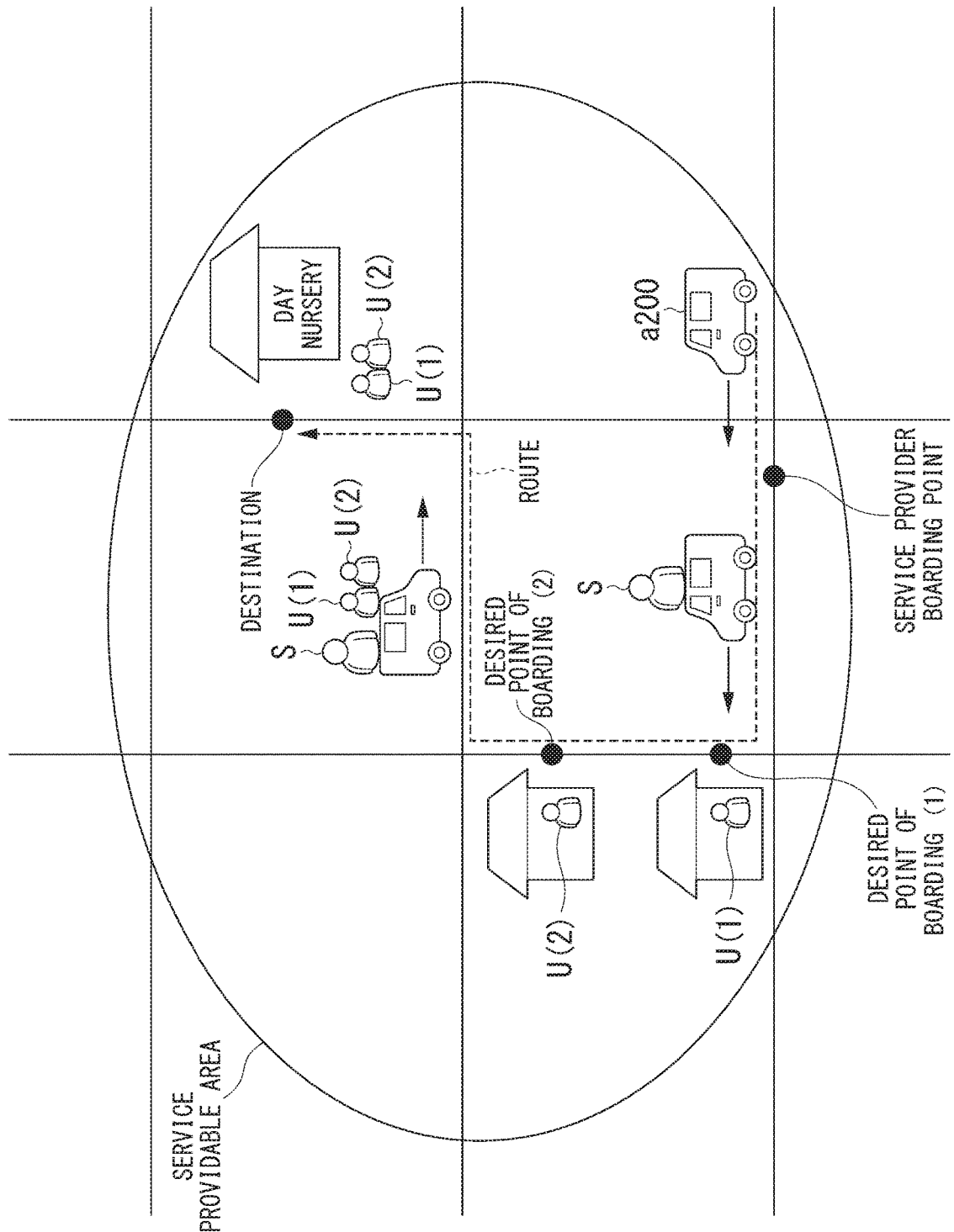
FIG. 31 is a diagram (part 2) showing a state in which the fellow passenger plan is determined.

Here, one service provider S may ride together with a plurality of services users U. In this case, a riding-together plan is decided as shown in FIG. 31, and the operation schedule information a388 is decided as shown in FIG. 32. FIG. 31 is a second diagram illustrating a status in which a riding-together plan is decided. FIG. 32 is a diagram illustrating an example of content of the operation schedule information a388 in which the riding-together plan shown in FIG. 31 is reflected. In the shown example, a service user U(1) corresponding to a service applicant A whose applicant ID is "0001" first boards the vehicle a200 that the service provider S boards, a service user U(2) corresponding to a service applicant A whose applicant ID is "0002" boards the vehicle, and the service users U(1) and U(2) exit the vehicle at the same destination. In this manner, in a case where sections from desired points of boarding of a plurality of users U to their destinations are included within a section in which the service provider S boards the vehicle a200, the plan determiner a330 may decide a riding-together plan so that one service provider S rides together with a plurality of services users U.

Figure 33:
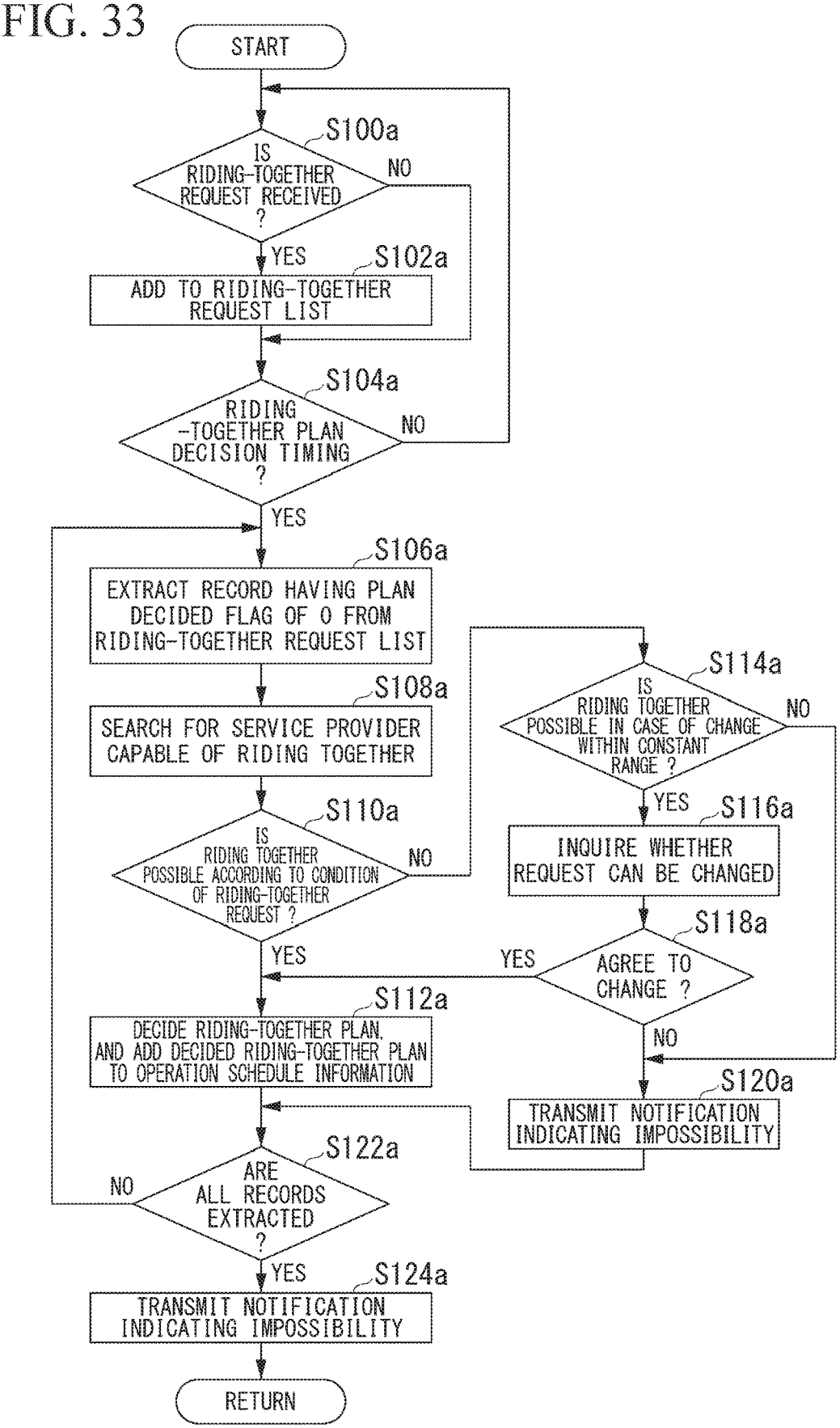
FIG. 33 is a flowchart showing an example of a flow of a process to be executed by the service management device a300.

FIG. 33 is a flowchart illustrating an example of a flow of processes which are executed by the service management device a300. First, the service management device a300 determines whether a riding-together request has been received from the terminal device a100 (step S100a). In a case where the riding-together request is received from the terminal device a100, the service management device a300 adds content included in the riding-together request to the riding-together request list a384 (step S102a).

Next, the service management device a300 determines whether a riding-together plan decision timing has arrived (step S104a). In a case where the riding-together plan decision timing has not arrived, the process is returned to step S100a. The riding-together plan decision timing can be set arbitrarily, but is set to arrive at intervals of a predetermined time (for example, about 10 minutes), for example, during business hours of the service providing system 1, or the like.

In a case where the riding-together plan decision timing has arrived, the service management device a300 extracts a record having a plan decided flag of 0 from the riding-together request list a384 (step S106a). Next, the service management device a300 refers to the service providable range information a386, and searches for a service provider S capable of riding together according to a condition of the riding-together request (step S108a).

Next, the service management device a300 determines whether the service provider S capable of riding together is present according to a condition of the riding-together request (step S110a). In a case where the service provider S capable of riding together is present according to a condition of the riding-together request, the service management device a300 decides a riding-together plan of a service user U corresponding to a record extracted in step S106a, and adds the decided riding-together plan to the operation schedule information a388 (step S112a). In this case, the service management device a300 changes a plan decided flag in the extracted record to 1.

On the other hand, in a case where the service provider S capable of riding together is not present according to a condition of the riding-together request, the service management device a300 determines whether the service provider S capable of riding together is present when the condition of the riding-together request is changed within a constant range (step S114a). Here, the wording "within a constant range" is, for example, about several tens of [h] in terms of time, and is, for example, about several hundreds of [m] in terms of a place.

Figure 34:
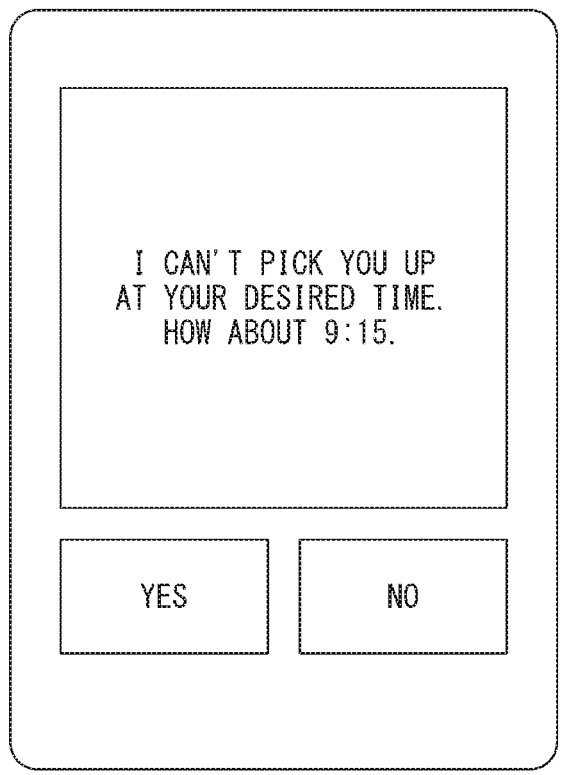
FIG. 34 is a diagram showing an example of a screen IM for asking whether or not details of a fellow passenger request can be changed.

In a case where an affirmative determination is obtained in step S114a, the service management device a300 causes the communicator a310 to transmit information for inquiring whether content of the riding-together request can be changed to the terminal device a100 (step S116a). Receiving this, in the terminal device a100, a screen for inquiring whether the content of the riding-together request can be changed is displayed. FIG. 34 is a diagram illustrating an example of a screen IM for inquiring whether the content of the riding-together request can be changed. In the screen IM, the effect that arrival is not possible at a desired time of boarding and information of an alternative time at which arrival is possible are displayed, and a YES button and a NO button for indicating whether to agree to a time change are further set. In a case where either button is operated by a user, the service application of the terminal device a100 transmits information indicating operation content to the service management device a300. Meanwhile, the same is true of a place change.

Referring back to FIG. 33, the service management device a300 determines whether the service applicant A's agreement to change is obtained on the basis of content received from the terminal device a100 (step S118a). The service management device a300 determines that the agreement is obtained in a case where the YES button is operated in the terminal device a100, and determines that the agreement is not obtained in a case where the NO button is operated.

In a case where the agreement to change is obtained, the service management device a300 decides a riding-together plan of a service user U corresponding to a record extracted in step S106 in changed content, and adds the decided riding-together plan to the operation schedule information a388 (step S112a). In this case, the service management device a300 changes a plan decided flag in the extracted record to 1. On the other hand, in a case where the agreement to change is not obtained, or a case where a negative determination is obtained in step S114a, the service management device a300 transmits a notification indicating the impossibility to respond to the riding-together request at this time (a notification of impossibility) to the terminal device a100 by controlling the communicator a310 (step S120a). In this case, the service management device a300 may delete the extracted record, or may perform a search at the next riding-together plan decision timing again.

In a case where the processes of steps S110a to S120a are terminated, the service management device a300 determines whether records corresponding to all the service applicants A have been extracted (step S122a). In a case where the records corresponding to all the service applicants A have not been extracted, the process is returned to step S106a. In a case where the records corresponding to all the service applicants A have been extracted, the route indicator 340 of the service management device a300 transmits an operation schedule added or updated in a process at this time to the vehicle a200 (step S124a). Meanwhile, in a case where a manually driven vehicle is used, the service management device a300 notifies a terminal device of a driver of the vehicle or an in-vehicle terminal device of a request for a change of a boarding request.

According to the first embodiment described above, it is possible to suitably manage a service which is provided by a service provider within a vehicle.

[First Modification of Second Embodiment]

Hereinafter, a first modification of the second embodiment will be described. Regarding a configuration diagram or a basic function of each device, FIGS. 25 to 28 and related description thereof will be quoted. In the first modification of the second embodiment, a service is assumed to be executed after riding together in a vehicle. For example, any service provided by the service provider S such as language education, a haircut, a massage, or assistance with legal procedures is provided within the vehicle a200.

Therefore, in the first modification of the second embodiment, the service provider S does not have to ride together in a vehicle throughout the entire section in which the service user U is on board the vehicle. In addition, the service user U himself or herself is mainly assumed to become the service applicant A. The plan determiner a330 of the first modification of the second embodiment decides a section in which the service provider S boards the vehicle a200 (a second boarding section) within a range which is specified by the service providable range information a386.

Figure 35:
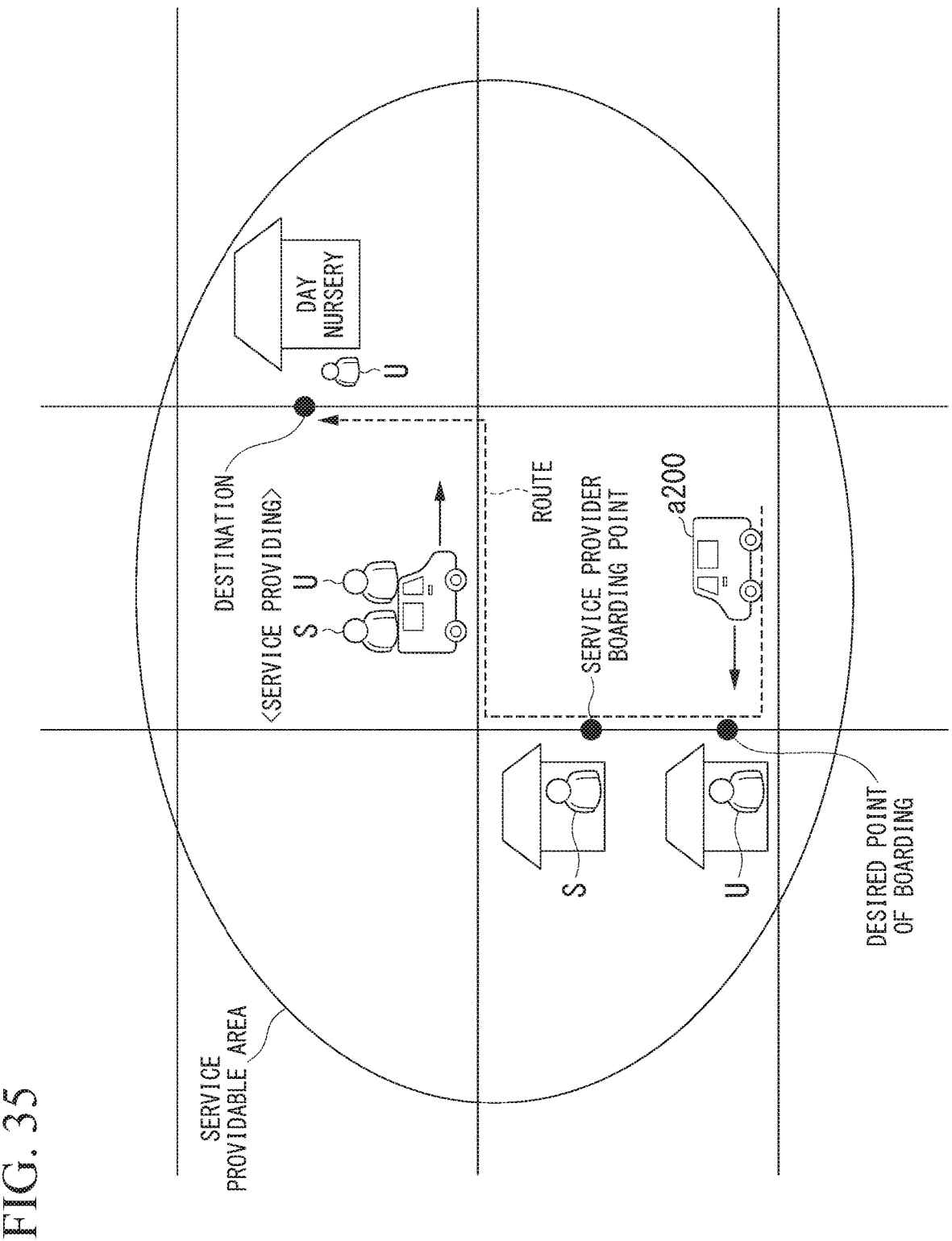
FIG. 35 is a diagram showing a state in which the fellow passenger plan is determined in a first modified example of the second embodiment.

FIG. 35 is a diagram illustrating a status in which a riding-together plan is decided in the first modification of the second embodiment. As shown in the drawing, the service provider S may board the vehicle a200 in a state in which the service user U is already on board. The service user U goes to his or her company, for example, while receiving language education from the service provider S on his or her way to work using the vehicle a200. FIG. 36 is a diagram illustrating an example of content of the operation schedule information a388 in which the riding-together plan shown in FIG. 35 is reflected.

According to the first modification of the second embodiment described above, it is possible to suitably manage a service which is provided by a service provider within a vehicle.

[Second Modification of Second Embodiment]

Hereinafter, a second modification of the second embodiment will be described. Regarding a configuration diagram or a basic function of each device, FIGS. 25 to 28 and related description thereof will be quoted. In the second modification of the second embodiment, a service is not completed within the vehicle a200, and is continued even within a facility located at a point where the service user U exits the vehicle. Hereinafter, a service performed on board is referred to as an on-board service, and a service provided after exiting is referred to as a post-exit service. In the third embodiment, a destination in a riding-together request is set at a point where a post-exit service is received. The service provider S who performs an on-board service and a service provider S #who performs a post-exit service may be the same person, or may be different persons. In the case of the former, the plan determiner a330 decides a boarding plan in which the service provider S exits a vehicle at a destination together with the service user U. Hereinafter, this is set forth as a premise.

A series of services to be provided is, for example, assistance of procedures at the time of purchase of a land. In this case, a series of services of the service provider S explaining procedures within the vehicle a200 and stopping by a real estate office after exiting to perform procedures of signature, seal and the like is provided. In a case where a reservation is required at a facility used by the service provider S at a destination, the plan determiner a330 may automatically perform an online reservation.

Figure 37:
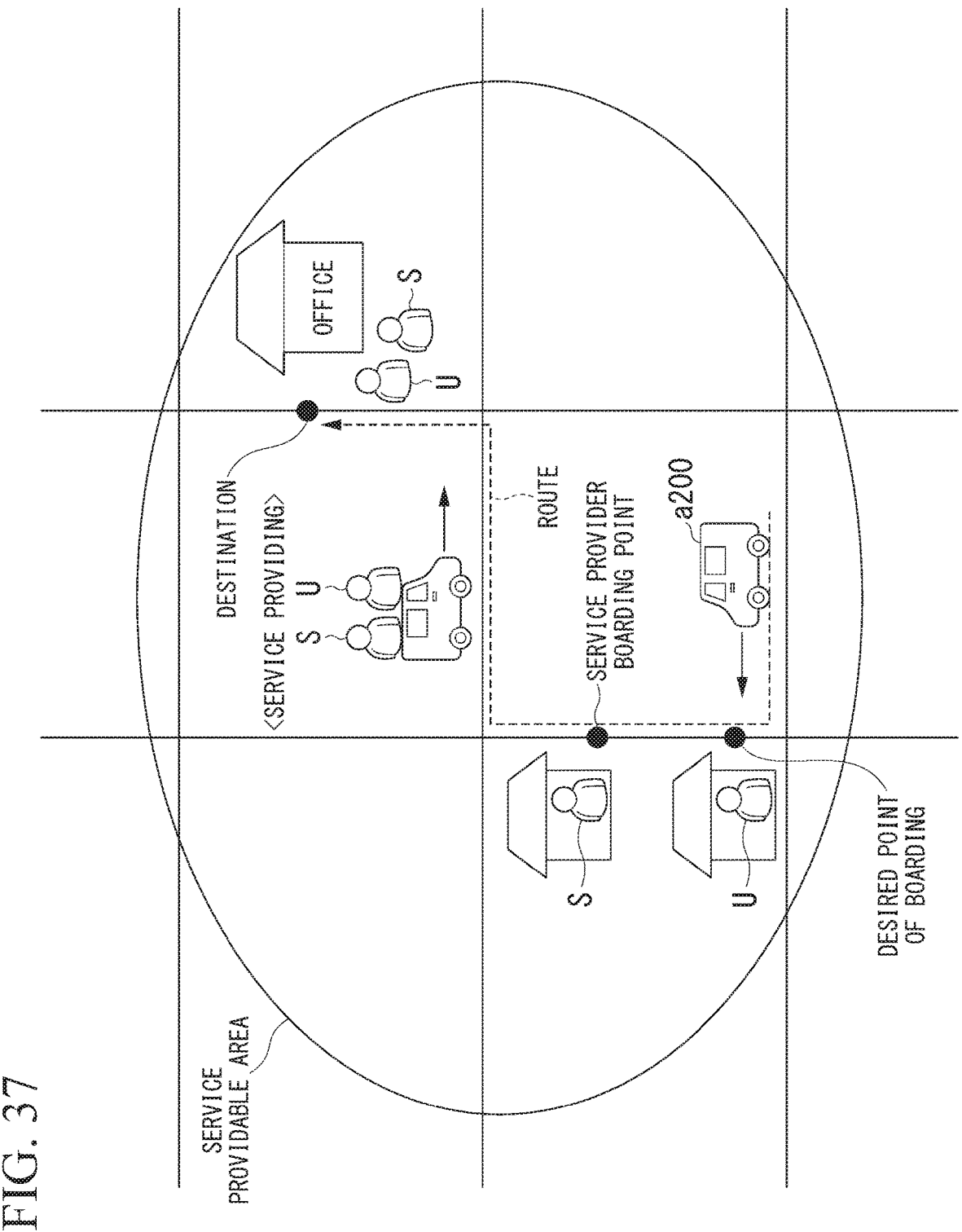
FIG. 37 is a diagram showing a state in which the fellow passenger plan is determined in a second modified example of the second embodiment.

FIG. 37 is a diagram illustrating a status in which a riding-together plan is decided in the second modification of the second embodiment. The service user U and the service provider S go to a real estate office which is a destination while riding together in a vehicle and explaining procedures, and exit the vehicle together. Procedures of signature, seal and the like are performed at the real estate office. FIG. 38 is a diagram illustrating an example of content of the operation schedule information a388 in which the riding-together plan shown in FIG. 37 is reflected.

According to the second modification of the second embodiment described above, it is possible to suitably manage services which are provided within a vehicle and after exiting.

[Third Modification of Second Embodiment]

Hereinafter, a third modification of the second embodiment will be described. Regarding a configuration diagram or a basic function of each device, FIGS. 25 to 28 and related description thereof will be quoted. In the third modification of the second embodiment, the service management device a300 manages a plurality of services. The service user U (or the service applicant A) can select and receive a desired service from among a plurality of services.

FIG. 39 is a diagram illustrating an example of content of a riding-together request list a384A according to the third modification of the second embodiment. A service type, the necessity of a post-exit service, and the like are added to a riding-together request in the third modification of the second embodiment. The necessity of a post-exit service may be automatically supplemented in the service management device a300 in a case where the service type is designated. Meanwhile, the service type or the necessity of a post-exit service is not designated for each riding-together request, and in a case where a certain service applicant A makes a decision of requesting only a specific service type, the service type or the necessity of a post-exit service may be automatically decided from the service applicant A.

FIG. 40 is a diagram illustrating an example of content of service providable range information a386A according to the third modification of the second embodiment. A service provider S in the third modification of the second embodiment preliminarily declares the type of service capable of being provided by the service provider. The service management device a300 accepts this declaration and registers the accepted declaration with the service providable range information a386A.

The plan determiner a330 according to the third modification of the second embodiment executes processes equivalent to step S104a of FIG. 33 and the subsequent steps for each service type. Thereby, the service provider S can be allocated to the service user U for each type of service.

According to the third modification of the second embodiment described above, it is possible to selectively provide various services.

<Control of Autonomously Driven Vehicle>

In the second embodiment described above (particularly, in the first to third modifications), the vehicle a200 may perform driving control for adjusting a required time which will be taken to arrive at a destination in accordance with a time scheduled for service provision. For example, a riding-together request includes information of a time at which service provision is desired, and an operation schedule which is transmitted from the route indicator 340 to the vehicle a200 includes an estimated time of service provision.

Figure 41:
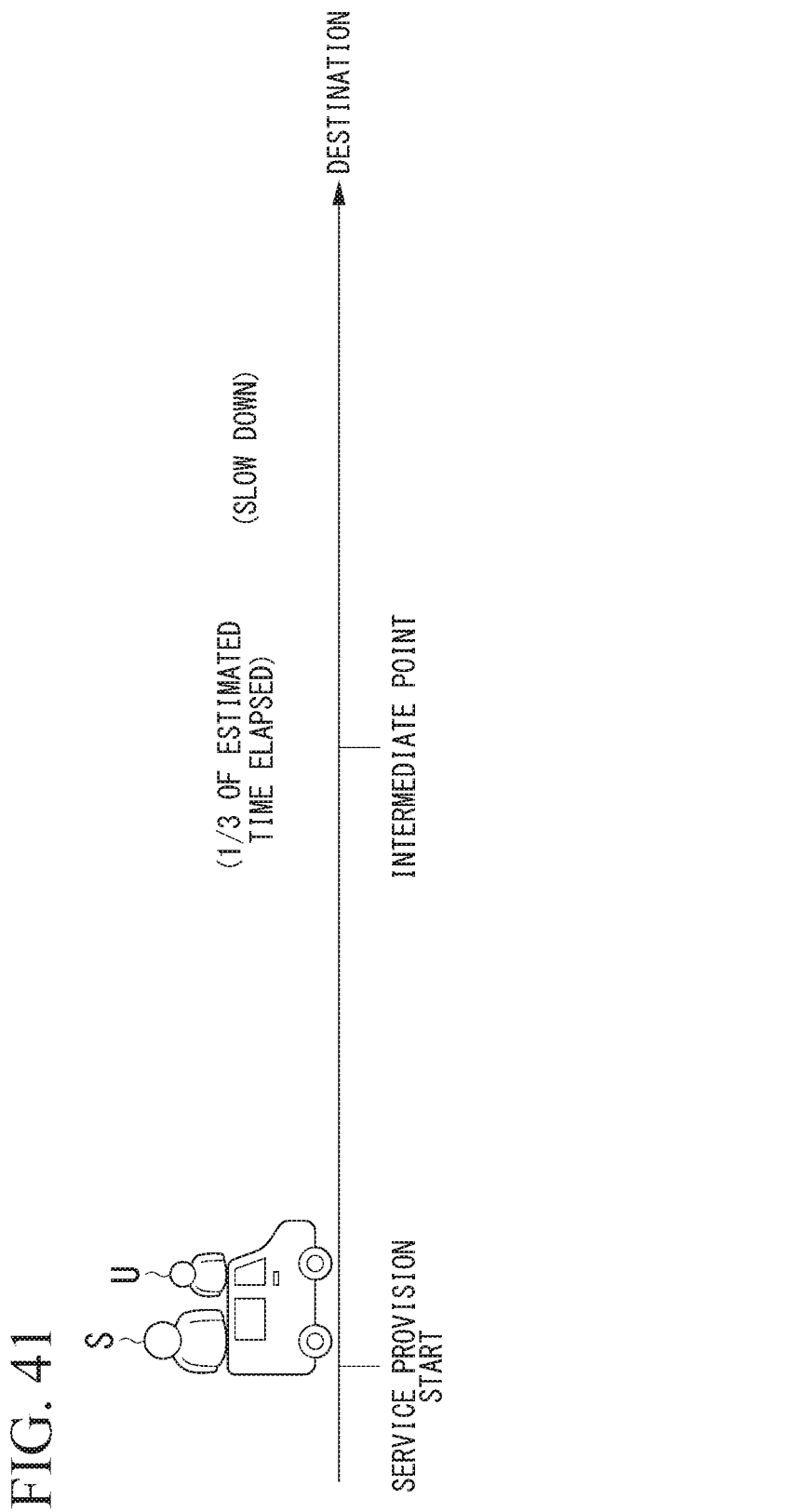
FIG. 41 is a diagram schematically showing details of operation control to be executed by the vehicle a200.

FIG. 41 is a diagram schematically illustrating content of driving control which is executed by the vehicle a200. For example, when arriving at a reference point such as an intermediate point to a destination, the autonomous driving controller a250 of the vehicle a200 compares the time elapsed until then with an estimated time. In a case where the elapsed time is shorter than an expected time which will elapse in traveling to a reference point, arrival at a destination is delayed by retarding the remaining movement process, stopping at a predetermined point, or the like. Thereby, it is possible to secure a sufficient service provision time.

[Fourth Modification of Second Embodiment]

Figure 42:
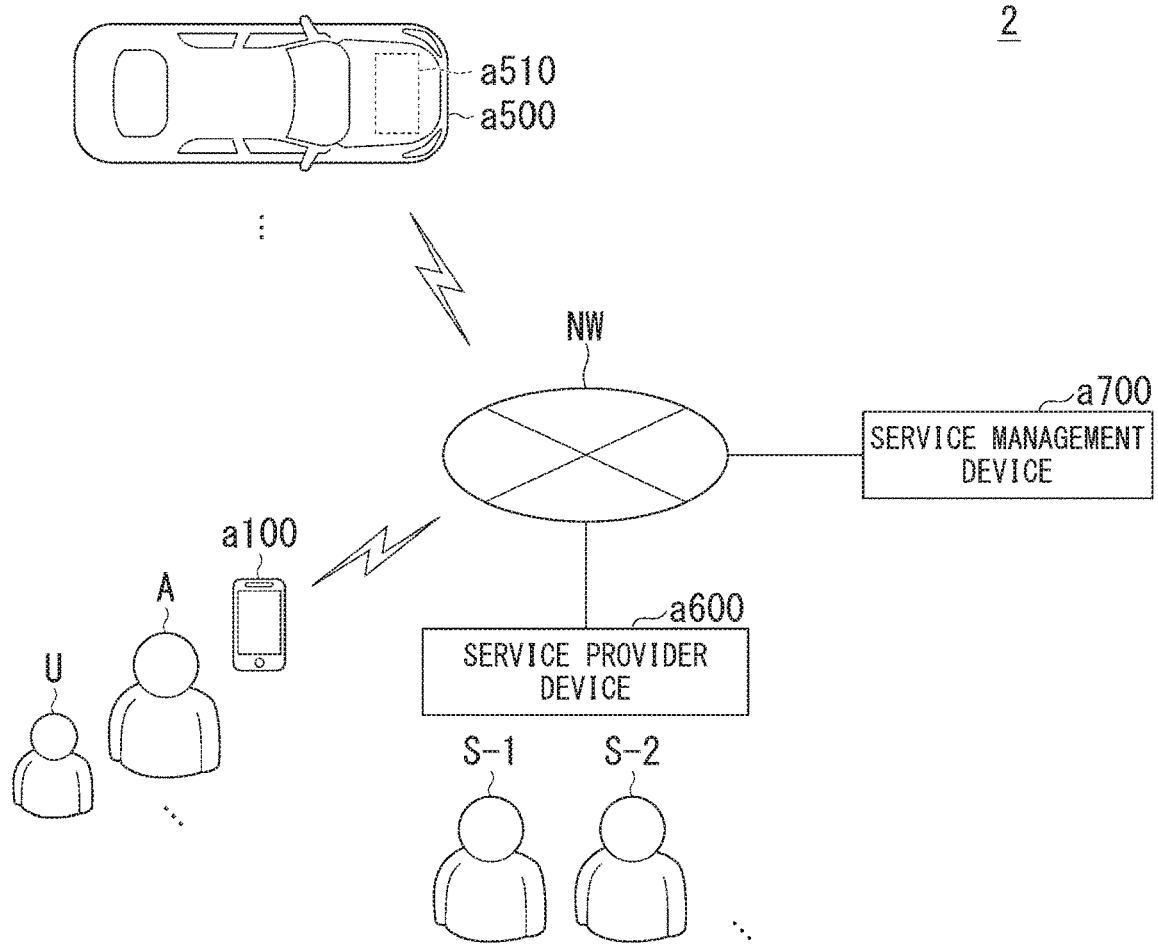
FIG. 42 is a configuration diagram of a service providing system a2 including a service management device a700 according to a fourth modified example of the second embodiment.

Hereinafter, a fourth modification of the second embodiment will be described. FIG. 42 is a configuration diagram of a service providing system a2 including a service management device 700 according to the fourth modification of the second embodiment. The service providing system a2 includes one or more terminal devices a100 which are used by one or more service applicants A, one or more vehicles a500, one or more terminal devices a150 which are used by one or more service providers S, a service provider device a600, and the service management device a700. These components can communicate with one another through a network NW. A service provided by the service provider S is provided to a service user U. In the drawing, the service applicant A and the service user U are shown like different persons, but they may be the same person. Meanwhile, "used by the service applicant A" may include terminal devices, capable of being used by an unspecified large number of users, such as terminal devices in an Internet cafe being temporarily used by the service applicant A.

[Terminal Device]

The hardware and basic function of the terminal device a100 are the same as those in the second embodiment. In the terminal device a100, an application program, a browser or the like for using the service providing system 2 is started up, and a service to be described below is supported. In the following description, it is assumed that the terminal device a100 is a smartphone, and that an application program (an application for a service applicant) is started up. The application for a service user communicates with the service management device 700 in accordance with the service applicant A's operation, and transmits a request from the service applicant A to the service management device 700, or performs a push notification based on information received from the service management device 700.

The terminal device a100 transmits, for example, service use request information including the following content to the service management device a700. Position information is measured by, for example, a GPS receiver which is built into the terminal device a100. Other information is based on information which is input by the service applicant A or the service user U in principle. Desired service provider attribute information is information on an attribute of the service provider S which is desired by the service user U. The attribute may include age, sex, personality (type), or the like in addition to the type of service to be provided. Regarding the attribute, the service management device a700 does not fixedly allocate a service provider S which is in complete accord, and may present a service provider to the service user U to select or settle the service provider.

[Service Use Request Information]
 User ID
 position information (latitude, longitude, or altitude)
 Desired space information (represented by, for example, the number of persons, the number of seats, or the like)
 Desired service provider attribute information
 Desired service ID
 Desired section information (information of a first section)
 Information on a time slot of service use which is desired by a service user
 Settlement authentication information

[Vehicle]

Figure 43:
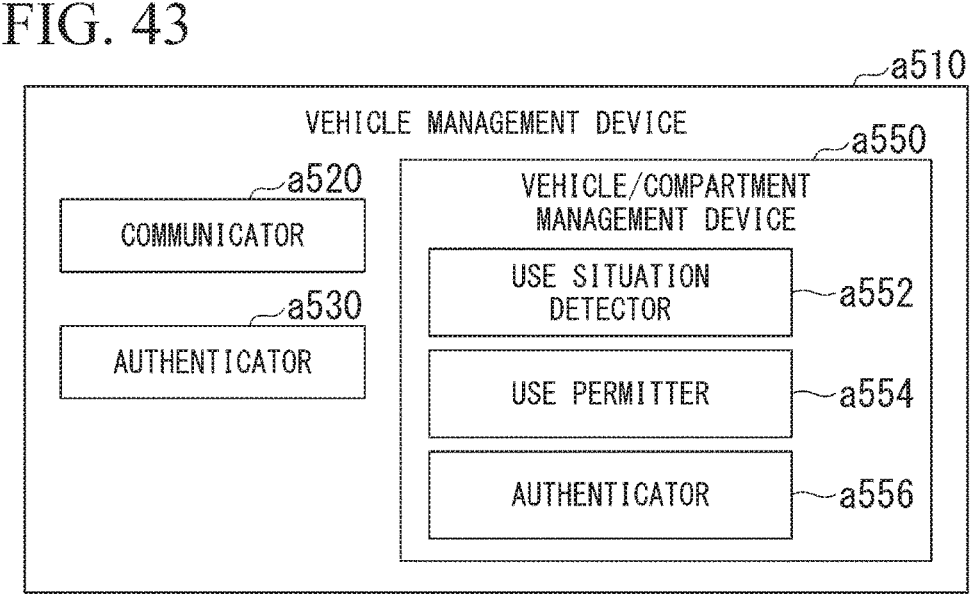
FIG. 43 is a diagram showing an example of a configuration of a vehicle management device a510 mounted on a vehicle a500.

Components related to traveling control of a vehicle a500 (for example, components related to autonomous driving) are the same as the components included in the vehicle a200 in the second embodiment. That is, the vehicle a500 is an autonomously driven vehicle, and is a vehicle having a wireless communication function as will be described below. FIG. 43 is a diagram illustrating an example of a configuration of a vehicle management device a510 which is mounted in the vehicle a500. The vehicle management device a510 includes, for example, a communicator a520, an authenticator a530, and a vehicle/compartment management device a550.

The communicator a520 is a wireless communication device. The communicator a520 communicates with the service management device a700 through the network NW. The authenticator 530 performs an authentication process for service start in accordance with an indication of the service management device a700.

The vehicle/compartment management device a550 includes, for example, a use situation detector a552, a use permitter a554, and an authenticator a556. The vehicle a500 is provided with one or more spaces (compartments) available to the service user U or the service provider S, and the use situation detector a552 detects a use situation for each compartment. For example, the use situation detector a552 detects whether each compartment is in use. In FIG. 43, an ordinary automobile appears as the vehicle a500, but the vehicle a500 may be a vehicle, such as a trailer, a bus, or a microbus, which has as large a size as one or more occupants can board each compartment obtained by delimiting a vehicle interior. For example, in a case where authentication performed by the authenticator a556 is successful, the use permitter a554 permits using a compartment designated in advance, and performs, for example, unlocking of a door or the like. The authenticator a556 performs authentication such as identity verification of the service user U or the service provider S on board.

The vehicle management device a510 transmits, for example, vehicle information including the following content to the service management device a700.

[Vehicle Information]
 Vehicle ID
 Position information (latitude, altitude, or longitude)
 Compartment use situation (such as information a user ID of a service user in use with respect to a compartment in use or an available compartment)
 Traveling condition (such as speed, acceleration, angular velocity, or a state of a vehicle-mounted device)
 Information on the service provider S (such as an ID of a service provider, information of a service in execution, or a service execution elapsed time)

Figure 44:
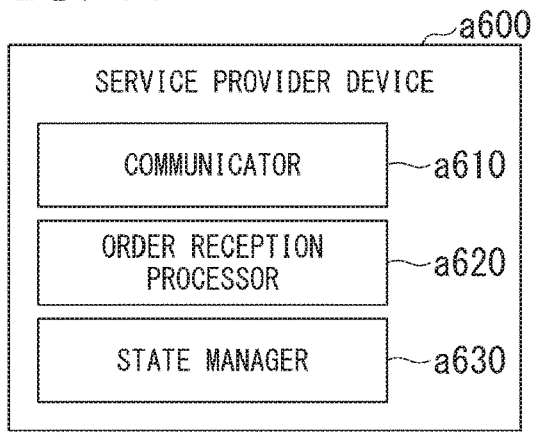
FIG. 44 is a diagram showing an example of a configuration of a service provider device a600.

FIG. 44 is a diagram illustrating an example of a configuration of the service provider device a600. The service provider device a600 is, for example, device that ascertains the states of a plurality of services providers and is capable of automatic response to ordering from the service management device a700. The service provider device a600 includes, for example, a communicator a610, an order reception processor a620, a state management device a630, and a storage a650.

The communicator a610 communicates with the service management device a700 or the like through the network NW. The order reception processor a620 performs order reception processing with respect to the service ordering from the service management device a700. The order reception processor a620 determines whether content of the service ordering is within a range of service provision information already transmitted to the service management device a700, and first advances the order reception processing in a case where it is determined to be within the range. The state management device a630 manages the state (the reservation state, the operating state or the like) of the service provider S registered with the service provider device a600, and provides the service provision information to the service management device a700.

The service provider device a600 transmits, for example, service provision information including the following content to the service management device a700. The service provision information is information related to a service for which the service provider S is able to receive an order.

[Service Provision Information]
 Order reception ID
 Service name
 Execution responsible person information
 Service provider attribute information
 Information of a service provision time slot which is desired by a service provider
 Required vehicle compartment information
 Information of a service providable area
 Facility point information (service provision point information outside of a vehicle)
 Service status

[Service Management Device]

Figure 45:
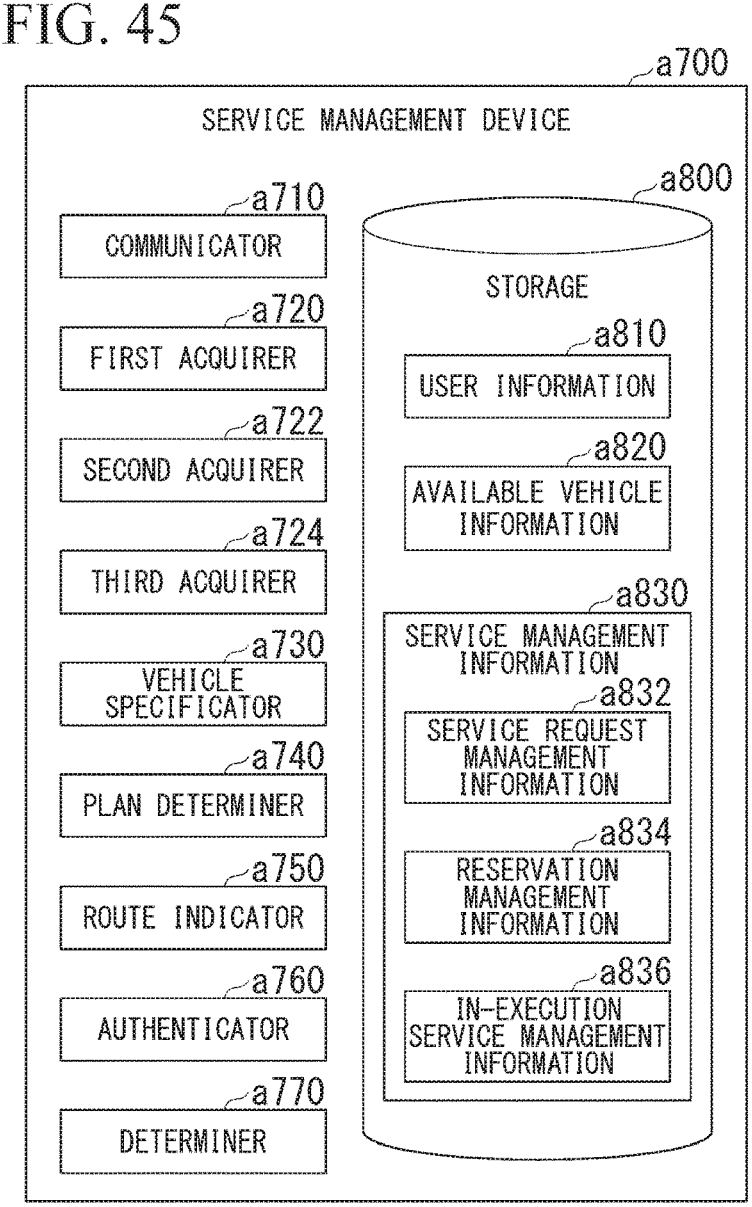
FIG. 45 is a diagram showing an example of a configuration of the service management device a700.

FIG. 45 is a diagram illustrating an example of a configuration of the service management device a700. The service management device a700 includes, for example, a communicator a710, a first acquirer a720, a second acquirer a722, a third acquirer a724, a vehicle specificator a730, a plan determiner a740, a route indicator a750, an authenticator a760, a determiner a770, and a storage a800. Components except the communicator a710 and the storage a800 are realized by a hardware processor such as, for example, a CPU executing a program (software). Some or all of these components may be realized by hardware (a circuit unit; including circuitry) such as an LSI, an ASIC, an FPGA, or a GPU, or may be realized by software and hardware in cooperation. The program may be stored in a storage device such as an HDD or a flash memory in advance, may be stored in a detachable storage medium such as a DVD or a CD-ROM, or may be installed by the storage medium being mounted in a drive device. The storage a800 is realized by an HDD, a flash memory, a RAM, a ROM, or the like.

The communicator a710 is, for example, a network card for connection to the network NW. The communicator a710 communicates with the terminal device a100, the vehicle management device a510, the service provider device a600, or the like through the network NW.

The first acquirer a720 acquires service use request information from the terminal device a100 through the communicator a710. The second acquirer a722 acquires vehicle information from the vehicle management device 510 of the vehicle 500 registered in advance through the communicator a710. The third acquirer a724 acquires service provision information from the service provider terminal a600 through the communicator a710.

The vehicle specificator a730 specifies an available vehicle a500 on the basis of the service use request information and the vehicle information, and generates available vehicle information a820. Specifically, the vehicle specificator a730 compares desired space information, desired section information, and information on a time slot of service use which are included in the service use request information with position information and compartment use situation which are included in the vehicle information, and specifies a vehicle satisfying a condition in which the position information and the compartment use situation are included in the service use request information as the available vehicle a500.

The plan determiner a740 specifies an available service which is able to be enjoyed by the service user U on the basis of the available vehicle information a820 and the service provision information, and provides information on the specified available service to the terminal device a100 of the service user U.

More specifically, the plan determiner a740 sets a second section in which the service provider S occupies at least a portion of the vehicle a500 (for example, a compartment) on the basis of the available vehicle information a820 and the service provision information, and sets a third section in which the service user U and the service provider S occupy at least a portion of the vehicle a500 on the basis of an overlap between the second section and the desired section information (information of the first section) in the service use request information. Meanwhile, in a case where the service provider S is already on board the vehicle a500 before the setting of the first section, the plan determiner a740 may set the second section with the current position of the vehicle a500 as a starting point simultaneously with the setting of the first section.

In addition, the plan determiner a740 sets a third section within an overlap range between the first section and the information of a service providable area included in the service provision information. Further, the plan determiner a740 sets the third section so that a time slot in which the service user U occupies at least a portion of the vehicle a500 is coincident with information of a service use time slot which is desired by the service user, and that a time slot in which a service provider occupies the vehicle is coincident with information of a service provision time slot which is desired by the service provider. The "time slot" includes a time such as a start time or end time, and the length of time. For example, in a case where the service use time slot which is desired by the service user U does not fall within the service provision time slot which is desired by the service provider S, the plan determiner a740 may limit the time slot in which the service user U occupies at least a portion of the vehicle a500 rather than the service use time slot which is desired by the service user U, and perform adjustment so as to fall within the service provision time slot. On the contrary, for example, in a case where the service provision time slot which is desired by the service provider S does not fall within the service use time slot which is desired by the service user, the plan determiner a740 may limit the time slot in which the service provider S occupies at least a portion of the vehicle a500 rather than the service provision time slot which is desired by the service provider S, and perform adjustment so as to fall within the service use time slot. The plan determiner a740 specifies an available service on the basis of the set third section.

In addition, in a case where a plurality of services providers S sequentially provide services to a certain service user U, the plan determiner a740 may set second sections to correspond to the plurality of services providers S, and set a plurality of third sections corresponding to the respective second sections.

As another function, the plan determiner a740 may update the first section so that the first section ends with a service provision point outside of a vehicle in accordance with an indication from the service user U using the terminal device a100. In this case, the plan determiner a740 may transmit reservation information to a facility present at the service provision point outside of a vehicle using the communicator a710 in accordance with the indication from the service user U using the terminal device a100 (or automatically), receive a reservation result through the communicator a710, and transmit the reservation result to the terminal device a100 of the service user U using the communicator a710.

The route indicator a750 indicates a route along which the vehicle 500 will travel to the vehicle a500 by causing the communicator a710 to transmit information of a use start position and a use end position of the service user U and information of a use start position and a use end position of the service provider S to the vehicle 500.

The authenticator a760 performs authentication of the service user U through communication with the terminal device a100, or performs authentication at the time of service provision start.

The determiner a770 determines whether the service user U and each of the service providers S use the vehicle 500.

The plan determiner a740 performs various processes using a determination result of the determiner a770. For example, the plan determiner a740 may accept a change of the first section (update the first section) only in a case where it is determined by the determiner a770 that both the service user U and the service provider S use the vehicle a500. This case occurs, for example, when the service provider S gives a suggestion to the service user U to change a destination, or change a final destination during a service on the basis of information which is provided to the vehicle a500 side. In addition, in a case where the determiner a770 determines that the service user U already uses the vehicle a500 (that is, a case where service extension or a separate service request is performed during service use) at a point in time when the first acquirer a720 has received the service use request information, the plan determiner a740 may preferentially allocate the vehicle 500 during the use to the service user U.

Service management information a830 is stored in the storage a800 in addition to user information a810 on the registered service user U and the above-described available vehicle information a820. The service management information a830 includes, for example, service request management information a832, reservation management information a834, and in-execution service management information a836. Each piece of the service use request information acquired by the first acquirer a720 is registered as a record with the service request management information a832. Information such as a reservation use section, a reservation use time slot, a transit point, or an estimated time of arrival at a transit point is stored in the reservation management information a834 for each service. Information such as a service status, a service attribute, or a service provider ID is registered with the in-execution service management information a836.

Figure 46:
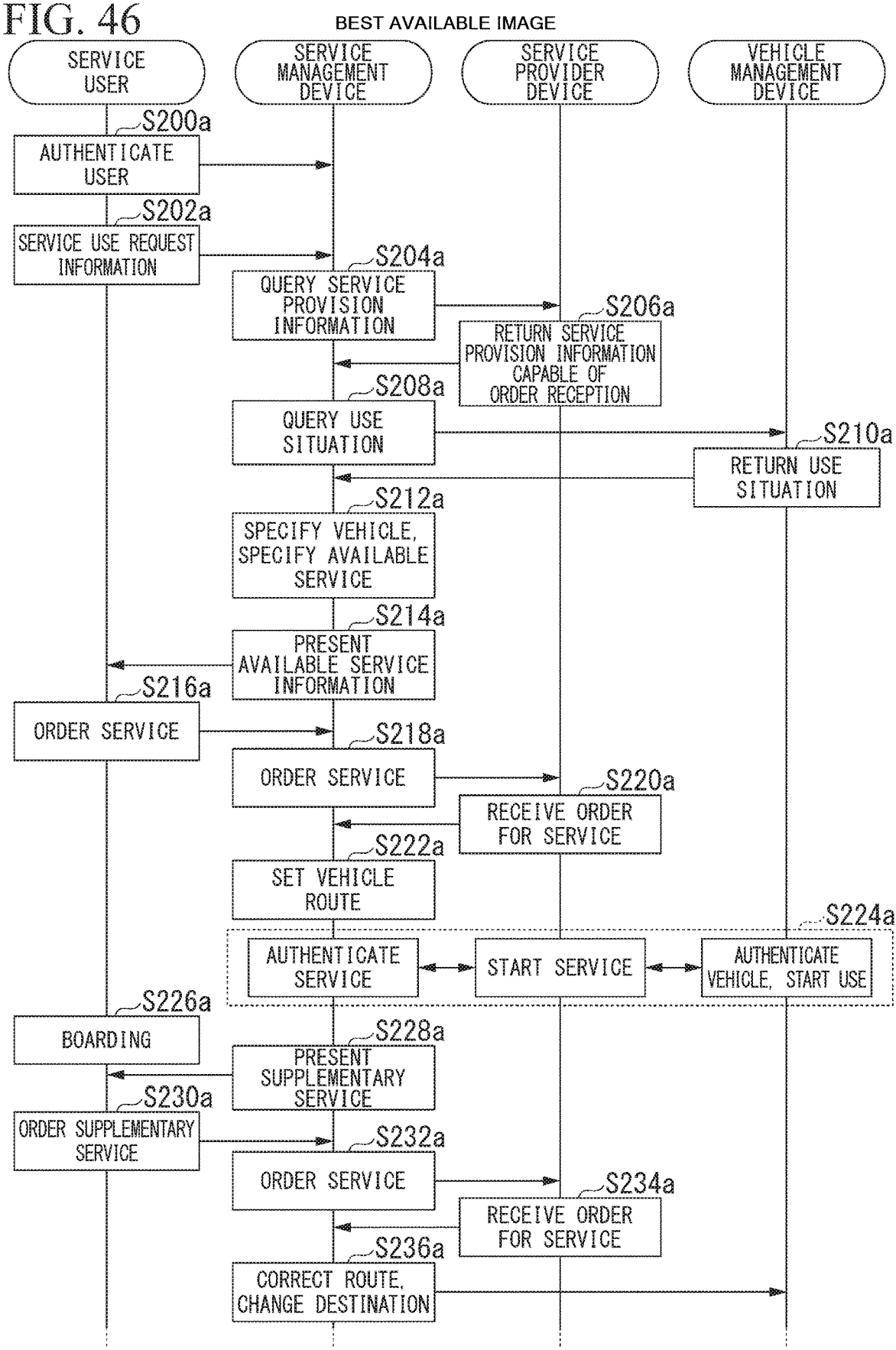
FIG. 46 is a flowchart showing an example of a flow of a process to be executed by the service providing system a2.

FIG. 46 is a flowchart illustrating an example of a flow of processes which are executed in the service providing system 2. First, a service requester A (a service user U) performs user authentication with respect to the authenticator a760 of the service management device a700 using the terminal device a100 (step S200a). In a case where authentication performed by the authenticator a760 is successful, the service requester A (the service user U) transmits the service use request information to the service management device a700 using the terminal device a100 (step S202a). The service use request information is acquired by the first acquirer, and is stored in the storage a800 as the service request management information a832.

In a case where the service use request information is acquired, the third acquirer a724 of the service management device a700 queries the service provider device 600a about the service provision information (step S204a). A plurality of service provider devices a600 may be present depending on the attribute of a service to be provided or a service provider. In that case, the third acquirer a724 may query a plurality of service provider devices a600 all at once. The state management device a630 of the service provider device a600 returns service provision information (indicating content of a service for which an order can be received) related to a service for which an order can be received to the service management device a700 (step S206a).

On the other hand, the second acquirer a722 of the service management device a700 queries the vehicle management device 510 about a use situation (vehicle information) (step S208a). The vehicle/compartment management device 550 of the vehicle management device 510 returns a use situation detected by the use situation detector 552 to the service management device a700 (step S210a). Meanwhile, the processes of step S208a and step S210a may be performed as needed at any timing asynchronously with the process shown in the flowchart.

Next, the vehicle specificator a730 specifies an available vehicle on the basis of the service use request information and the information acquired in step S210a, and generates available vehicle information (step S212a). A plurality of vehicles may be specified in step S212a. In that case, the final specification of a vehicle may be performed from the previous steps to step S224a to be described later. The plan determiner a740 specifies an available service which is able to be enjoyed by the service user on the basis of the available vehicle information and the service provision information, acquired in step S206a, for which an order can be received (step S212a), and transmits available service information indicating content of the specified available service to the terminal device a100 (step S214a).

The service applicant A (the service user U) browses the available service information, and orders a service from the service management device a700 using the terminal device a100 as a result (step S216a). The plan determiner a740 of the service management device a700 extracts a portion of which the service provider takes charge among services for which an order is received in step S216a, and orders a service from the service provider device a600 (step S218a).

The order reception processor a620 of the service provider device a600 transmits service order reception to the service management device a700 (step Sa220a). Simultaneously with this, the order reception processor a620 transmits order reception content to a terminal device of a service provider (not shown in the present embodiment).

In a case where the effect of order reception is received from the service provider device a600, the route indicator a750 of the service management device a700 sets a route along which the vehicle a500 will travel for service provision (step S222a).

Next, the authenticator a760 of the service management device a700 performs an authentication process for service start with respect to the service provider device a600 and the authenticator a530 of the vehicle a500, the route indicator a750 indicates the route which is set in step S222a to the vehicle a500, the service provider device a600 performs authentication of service start and performs final specification of a vehicle as necessary, and the authenticator a530 performs authentication on the vehicle side in the vehicle management device a510 of the vehicle 500 and starts or schedules traveling on the indicated route (step S224a).

Thereafter, the service user U boards the vehicle a500 (step S226a), and when a supplementary service can be presented, the plan determiner a740 presents the supplementary service to the terminal device a100 (step S228a). In a case where the service user browses content of the supplementary service and the supplementary service is ordered using the terminal device a100 (step S230), the plan determiner a740 of the service management device a700 performs service ordering on the supplementary service with respect to the service provider device a600 (step S232a). The order reception processor a620 of the service provider device a600 transmits information indicating that an order of the supplementary service has been received to the service management device a700 (step S234a). In a case where the information indicating an order of the supplementary service has been received is received, the route indicator a750 of the service management device a700 indicates route correction or destination change to the vehicle 500 (step S236a).

According to the fourth modification of the second embodiment described above, the vehicle information is acquired from candidates of vehicles a500 registered in advance and available vehicles a500 are specified on the basis of the service use request information in addition to the exhibition of the same effect as that of the second embodiment, whereby it is possible to promote more positive use of the vehicle a500.

For example, the service management device a300(a700) may be mounted in the vehicle a200(a500).

In addition, in a case where the vehicle a200(a500) is a manually driven vehicle, the communicator a310(a710) may communicate with a terminal device of a driver of the vehicle a200(a500) through the network NW.

In addition, the vehicle a200(a500) may be a remotely operated vehicle which is remotely operated from a remote place. In this case, the vehicle a200(a500) transmits various types of information acquired by the outside monitor a210 to an external device through the communication device a220. In the external device, an image indicating the surrounding situation of the vehicle a200(a500) is generated (or reproduced) on the basis of the received various types of information, and is presented to a remote operator. In this case, an image or the like may be corrected by look-ahead processing in order to cover a delay due to communication. The remote operator operates a driving operator on the basis of a presented image. The content of an operation performed on the driving operator is transmitted to the vehicle a200

(a500), and the vehicle a200(a500) travels on the basis of the received content of an operation.

Third Embodiment

Next, a third embodiment will be described. In the third embodiment, a pick-up/drop-off management device, a pick-up/drop-off management method, and a vehicle to which the vehicle of the first embodiment is applicable will be described. A vehicle to be allocated in the present system is, for example, an automated driving vehicle that basically does not require a driving operation. Further, the vehicle to be allocated stands by at a vehicle station prepared in each of places in a state in which the vehicle has not been allocated, and moves to a vehicle station with a vacancy near the destination and stands by after arriving at the destination.

Figure 47:
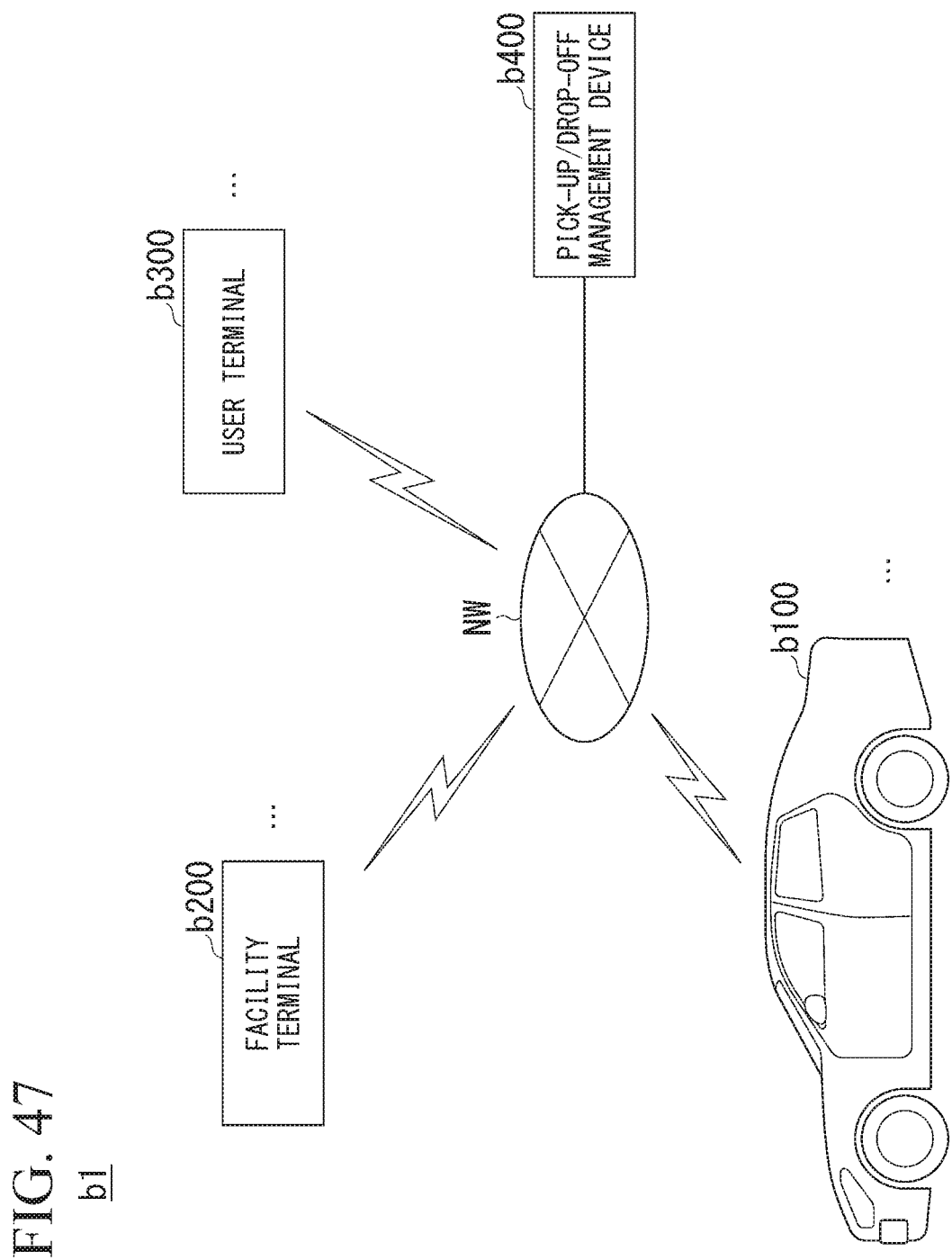
FIG. 47 is a configuration diagram of a vehicle dispatch system b1.

FIG. 47 is a configuration diagram of a vehicle allocation system b1. The vehicle allocation system b1 includes one or more vehicles b100, one or more facility terminals b200, one or more user terminals b300, and a pick-up/drop-off management device b400. These components can communicate with each other via a network NW.

The network NW includes the Internet, a wide area network (WAN), a local area network (LAN), a public line, a provider device, a dedicated line, a wireless base station, and the like.

[Vehicle]

Figure 48:
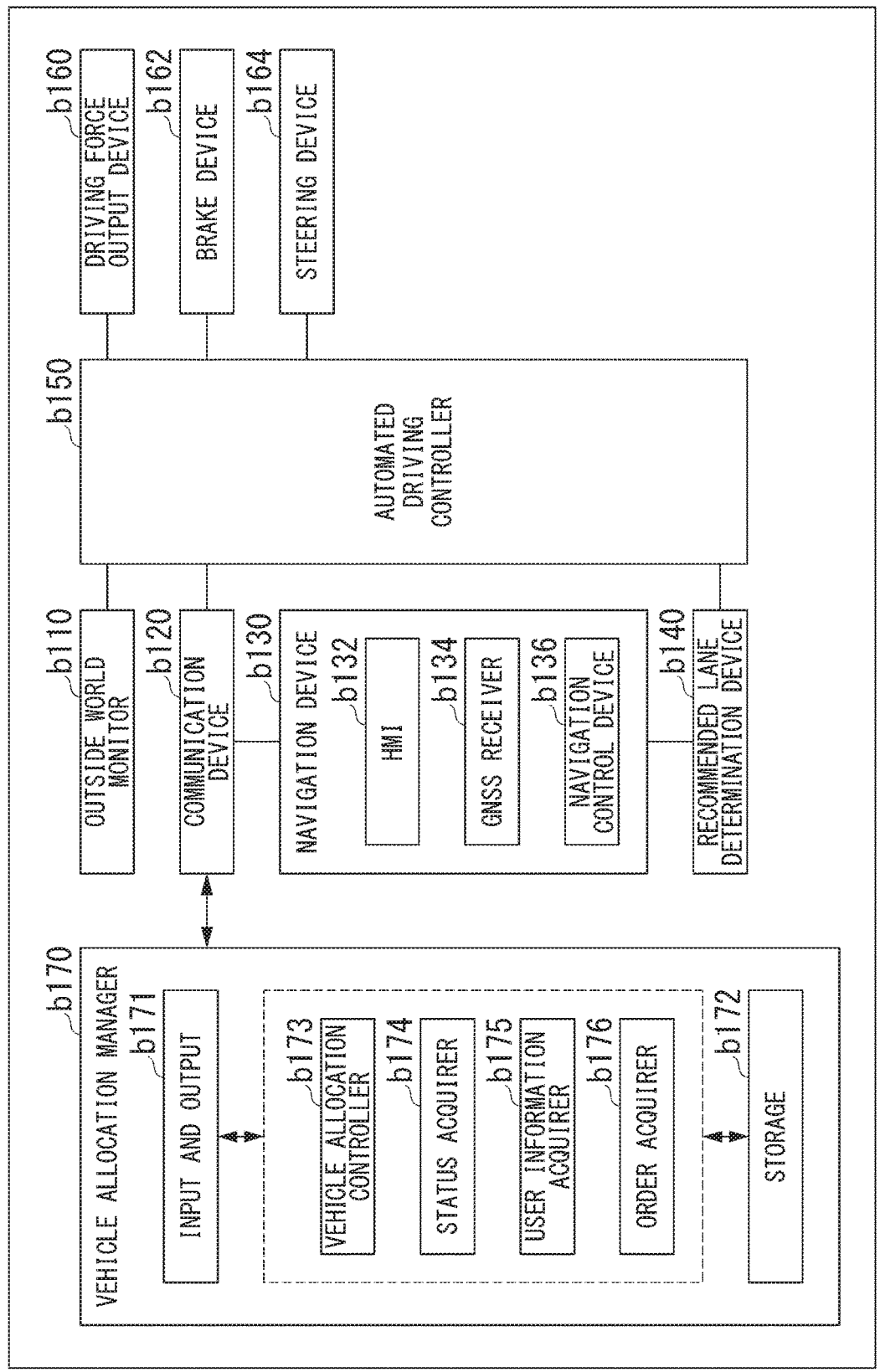
FIG. 48 is a configuration diagram of a vehicle b100.

The vehicle b100 is, for example, a vehicle having four or more wheels on which a plurality of users are allowed to get. FIG. 48 is a configuration diagram of the vehicle b100. The vehicle b100 includes, for example, an outside world monitor b110, a communication device b120, a navigation device b130, a recommended lane determination device b140, an automated driving controller b150, a driving force output device b160, a brake device b162, a steering device b164, and a vehicle allocation manager b170. The outside world monitor b110, the communication device b120, the navigation device b130, the recommended lane determination device b140, the automated driving controller b150, the driving force output device b160, the brake device b162, and the steering device b164 have configurations the same as the outside world monitor a210, a communication device a220, a navigation device a230, a recommended lane determination device a240, an automated driving controller a250, a driving force output device a260, a brake device a262, and a steering device a264 of FIG. 26 which are introduced in the second embodiment respectively, and thus the descriptions thereof will be omitted. Further, detailed descriptions of the processes of the automated driving of the third embodiment will be emitted while supporting FIG. 3 and related descriptions thereto which are introduced in the first embodiment.

The vehicle allocation manager b170 includes an input and output b171, a storage b172, a vehicle allocation controller b173, a status acquirer b174, a user information acquirer b175, and an order acquirer b176.

The input and output b171 includes an input such as a mouse, a keyboard, a touch panel, a microphone, a sensor, and a camera, and an output such as a display and a speaker. The storage b172 is realized by a hard disk drive (HDD), a flash memory, a random access memory (RAM), a read only memory (ROM), or the like.

The vehicle allocation controller b173, the status acquirer b174, the user information acquirer b175, and the order acquirer b176 are realized by, for example, a processor such as a CPU executing a program (software) stored in the storage b172. Further, some or all of these functional units may be realized by hardware such as a large scale integration (LSI), an application specific integrated circuit (ASIC), a field-programmable gate array (FPGA), or a graphics processor (GPU) or may be realized by software and hardware in cooperation.

The vehicle allocation controller b173 sets navigation setting information in the navigation control device b136 on the basis of a pick-up/drop-off schedule received from the pick-up/drop-off management device b400 using the communication device b120. The pick-up/drop-off schedule is a schedule for causing a pick-up/drop-off vehicle reserved in connection with a reservation for a facility to travel according to content of the reservation for the facility, and includes position information on a pick-up position, a time of arrival at the pick-up position, position information of a destination, a time of arrival at the destination, the number of occupants, and the like. The pick-up position is a position at which the user is caused to get on. The navigation setting information includes a pick-up position, a time of arrival at the pick-up position, a destination, a time of arrival at the destination, and the like.

The status acquirer b174 acquires information including a movement situation of the vehicle (hereinafter referred to as status information) and transmits the status information to the pick-up/drop-off management device b400 using the communication device b120. The status information includes, for example, information in which a date and time is associated with the position of the vehicle b100 measured by the GNSS receiver b134, or information indicating a target arrival time acquired by the navigation control device b136. Further, the status acquirer b174 may acquire a vehicle allocation status or an arrival situation on the basis of position information of the vehicle b100 measured by the GNSS receiver b134, the navigation setting information, and the like, and include the vehicle allocation status or the arrival situation in the status information. Examples of the vehicle allocation status include pick-up, waiting for get-on, waiting for partial get-on, get-on completion, moving, and movement completion. Examples of the arrival situation include on-time, delay, and delay during a traffic jam. The vehicle allocation status may be input by the user using the input and output b171 or may be a result of analysis of the status acquirer b174 on the basis of detection results of a sensor or an image or a video captured by the camera.

The user information acquirer b175 acquires information on the user (hereinafter referred to as user information), for example, using the input and output b171, and transmits the information to the pick-up/drop-off management device b400 using the communication device b120. Examples of the user information include the number of occupants, a sex of the user, an age of the user, a race of the user, preferences or impressions of the user, a questionnaire about a facility, the number or weight of packages, presence or absence of a wheelchair, and presence or absence of a stroller. For example, the user information acquirer b175 may acquire the number of occupants, a sex of the user, and the like by analyzing, for example, a detection result of a sensor or an image or a video captured by the camera. Further, the user information acquirer b175 may acquire a degree of excitement of conversation of the user in the vehicle, a degree of satisfaction or emotion of the user, and the like by analyzing, for example, sound data detected by a microphone.

The order acquirer b176, for example, acquires information for indicating an order for a service or a product provided by the facility (hereinafter, referred to as order indication information) using the input and output b171, and transmits the order indication information to the pick-up/drop-off management device b400 using the communication device b120. Accordingly, the user getting on the vehicle b100 can order a thing or service that is provided when the user arrives at the facility, using an online menu in advance.

[Facility Terminal]

The facility terminal b200 is a terminal that is installed in a facility that can be reserved by a user, and is a terminal that is used by an administrator of the facility. Examples of the facility include hotels, inns, restaurants, hospitals, beauty salons, and culture schools. The facility terminal b200 is, for example, a personal computer, a smartphone, or a tablet terminal.

Figure 49:
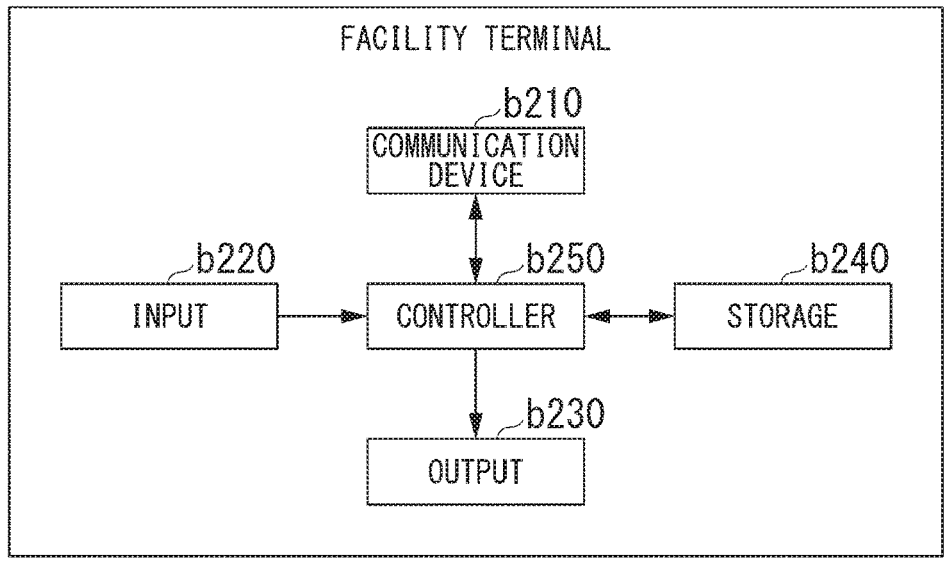
FIG. 49 is a functional configuration diagram of a facility terminal b200.

FIG. 49 is a functional configuration diagram of the facility terminal b200. The facility terminal b200 includes, for example, a communication device b210, an input b220, an output b230, a storage b240, and a controller b250.

The communication device b210 is, for example, a communication interface for connection to the network NW or direct communication with the pick-up/drop-off management device b400. The communication device b210 may include, for example, a network interface card (NIC), or may perform wireless communication on the basis of Wi-Fi, dedicated short range communications (DSRC), Bluetooth (registered trademark), or other communication standards. As the communication device b210, a plurality of communication devices may be prepared according to applications.

The input b220 includes, for example, a keyboard, a mouse, a touch panel, and a microphone. The output b230 includes, for example, a display and a speaker. The storage b240 is realized by an HDD, flash memory, a RAM, a ROM, or the like.

The controller b250 is realized, for example, by a processor such as a CPU executing a program (software) stored in the storage b240. Further, some or all of these functional units may be realized by hardware such as an LSI, an ASIC, an FPGA, or a GPU or may be realized by software and hardware in cooperation. For example, the controller b250 displays, on the output b230, a web page browsed with a browser, an application page browsed with an application program, or the like on the basis of information received from the pick-up/drop-off management device b400.

[User Terminal]

Figure 50:
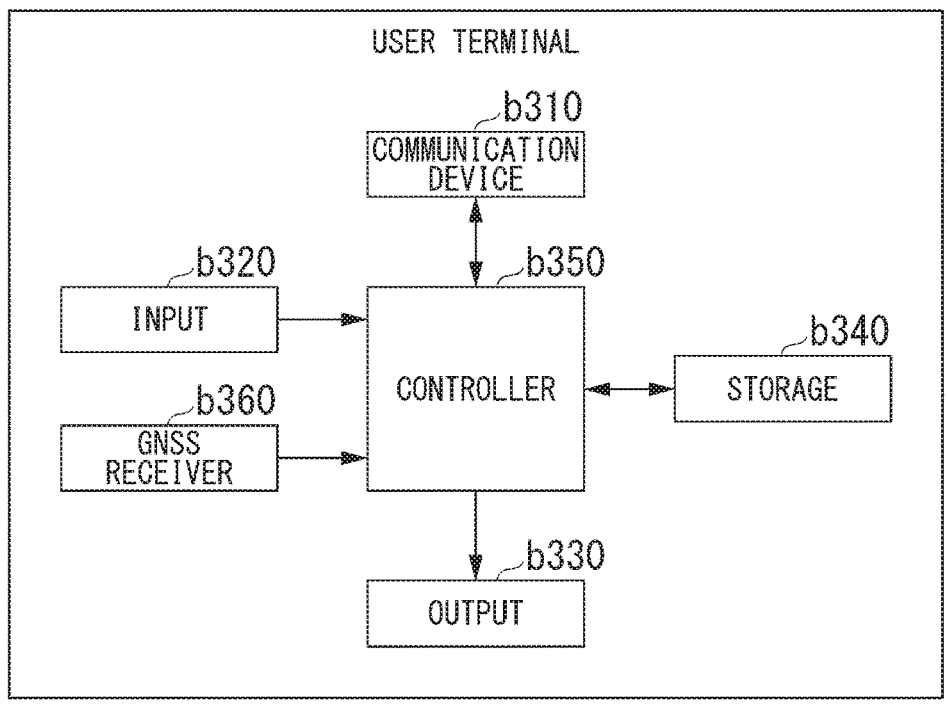
FIG. 50 is a functional configuration diagram of a user terminal b300.

The user terminal b300 is a terminal that is used by the user. The user terminal b300 is, for example, a personal computer, a smartphone, or a tablet terminal. FIG. 50 is a functional configuration diagram of the user terminal b300. The user terminal b300 includes, for example, a communication device b310, an input b320, an output b330, a storage b340, a controller b350, and a GNSS receiver b360. Components which are the same in the vehicle b100 and the facility terminal b200 are denoted by the same names, and detailed description thereof will be omitted.

Figure 51:
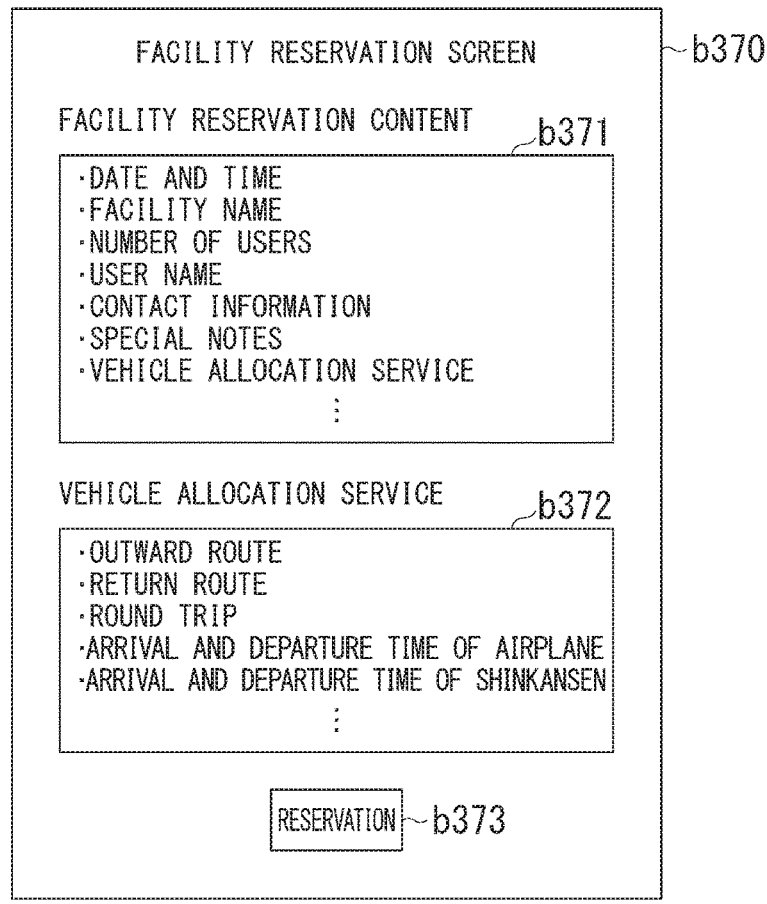
FIG. 51 is a diagram showing an example of a facility reservation screen.

An example of an operation screen displayed on the output b330 of the user terminal b300 will be described herein with reference to FIGS. 51 and b52. FIG. 51 is a diagram showing an example of a facility reservation screen. The facility reservation screen b370 is an operation screen that is displayed when a facility reservation is requested by a user using the input b320. The facility reservation screen b370 includes facility reservation content b371, pick-up/drop-off service content b372, and a reservation button b373.

The facility reservation content b371 is an operation screen that displays items necessary for a reservation for a facility and accepts a selection or input from the user for each item. The facility reservation content b371 includes items such as a date and time, a facility name, the number of users, a user name, contact information, special notes, and pick-up/drop-off service.

The pick-up/drop-off service content b372 is an operation screen that displays items necessary for a reservation for vehicle allocation and accepts a selection or input from the user for each item. The pick-up/drop-off service content b372 includes, for example, an item for selecting any one of an outward route, a return route, or both, and an item for selecting an arrival or departure time at a pick-up position, a destination, or the like of a station or an airport.

The reservation button b373 is an operation button for accepting a reservation with the content displayed in the facility reservation content b371 or the pick-up/drop-off service content b372. When the reservation button b373 is operated, the controller b350 creates facility reservation information on the basis of the reservation content displayed in the facility reservation content b371 or the pick-up/drop-off service content b372, and transmits the facility reservation information to the pick-up/drop-off management device b400 using the communication device b310.

After transmitting the facility reservation information, the controller b350 causes the output b330 to display a vehicle allocation reservation screen on the basis of information received from the pick-up/drop-off management device b400 using the communication device b310. In the embodiment, an example in which a pick-up/drop-off schedule created by the pick-up/drop-off management device b400 on the basis of the facility reservation information is displayed on the vehicle allocation reservation screen, the user is caused to confirm the pick-up/drop-off content, and then, a reservation for the pick-up/drop-off vehicle is accepted will be described, but the present invention is not limited thereto. For example, the pick-up/drop-off management device b400 may accept both a reservation for the facility and the reservation for the pick-up/drop-off vehicle by receiving the facility reservation information without causing the user to confirm the pick-up/drop-off content.

Figure 52:
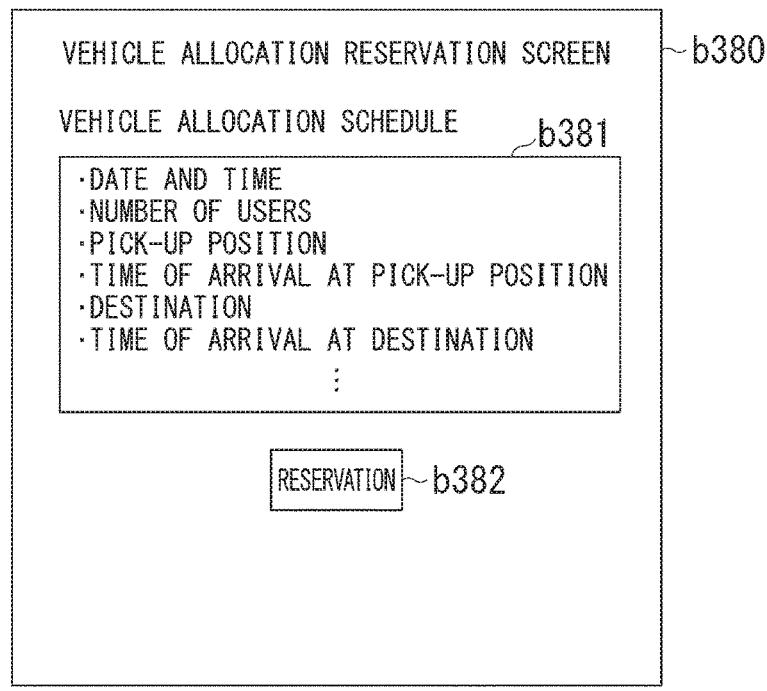
FIG. 52 is a diagram showing an example of a vehicle dispatch reservation screen.

FIG. 52 is a diagram showing an example of the vehicle allocation reservation screen. A vehicle allocation reservation screen b380 is an operation screen that displays the pick-up/drop-off schedule created by the pick-up/drop-off management device b400 on the basis of the facility reservation information. The vehicle allocation reservation screen b380 includes pick-up/drop-off content b381 and a reservation button b382.

The pick-up/drop-off content b381 is an operation screen that displays the pick-up/drop-off schedule created by the pick-up/drop-off management device b400 for each item necessary for a reservation for vehicle allocation and accepts editing of a part of the pick-up/drop-off schedule from the user. The pick-up/drop-off content b381 includes items such as a date and time, the number of users, a pick-up position, a time of arrival at the pick-up position, a destination, and a time of arrival at the destination.

The reservation button b382 is an operation button for accepting a reservation with content displayed in the pick-up/drop-off content b381. When the reservation button b382 is operated, the controller b350 creates vehicle allocation reservation information on the basis of reservation content displayed in the pick-up/drop-off content b381 and transmits the vehicle allocation reservation information to the pick-up/drop-off management device b400 using the communication device b310. Here, when there is no change in the pick-up/drop-off content, the controller b350 may include that fact in the vehicle allocation reservation information or may include only a change point of the pick-up/drop-off content in the vehicle allocation reservation information.

[Pick-Up/Drop-Off Management Device]

Figure 53:
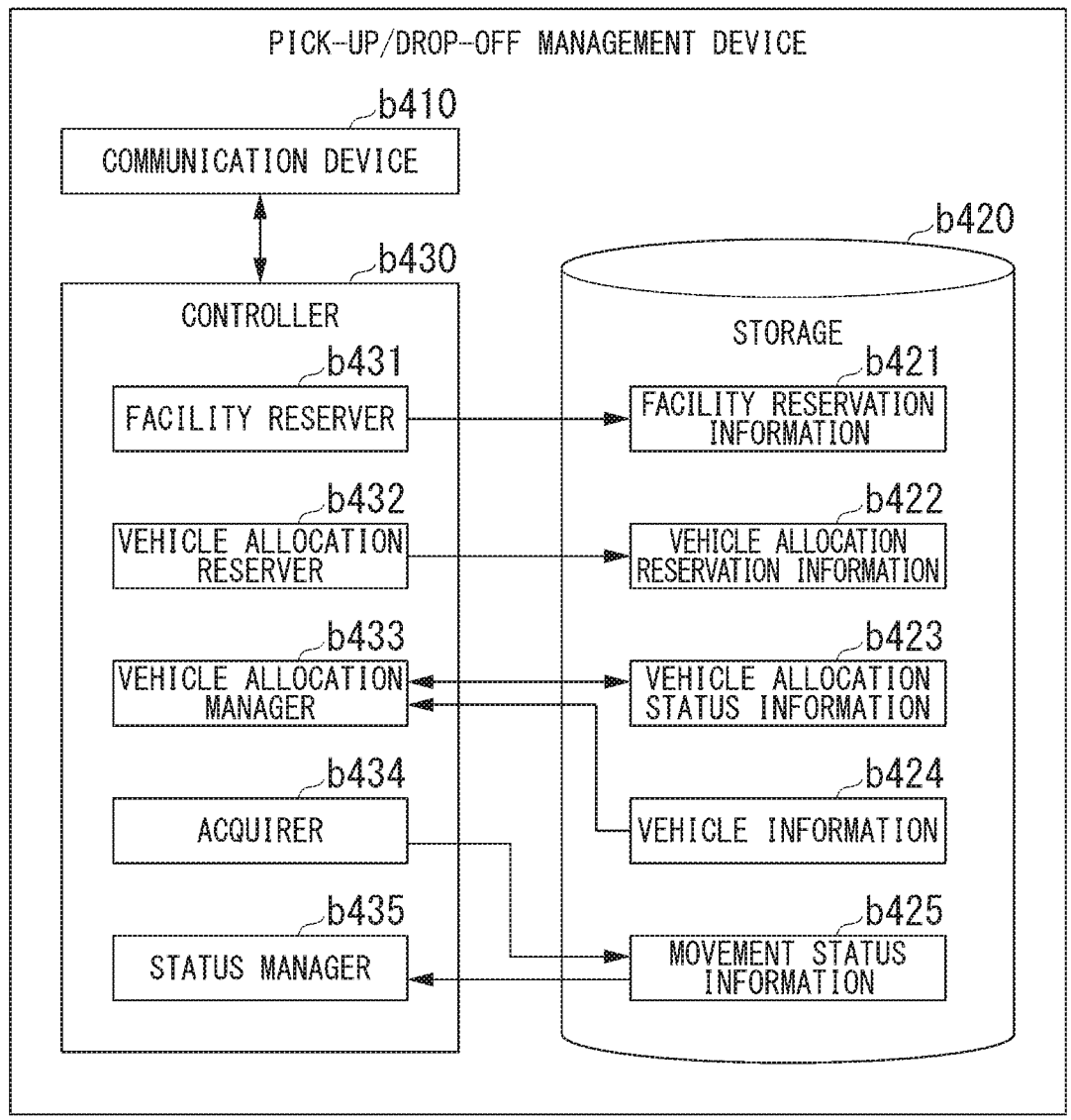
FIG. 53 is a functional configuration diagram of a pick-up/drop-off management device b400.

Next, the pick-up/drop-off management device b400 will be described with reference to FIGS. 53 to 57. FIG. 53 is a functional configuration diagram of the pick-up/drop-off management device b400. The pick-up/drop-off management device b400 includes, for example, a communication device b410, a storage b420, and a controller b430. The communication device b310 is, for example, an NIC for connection to the network NW. The communication device b310 communicates with the vehicle b100, the facility terminal b200, and the user terminal b300 via the network NW. The storage b420 is realized by an HDD, a flash memory, a RAM, a ROM, and the like.

The controller b430 includes a facility reserver b431, a vehicle allocation reserver b432, a vehicle allocation manager b433, an acquirer b434, and a status manager b435. Some or all of these components are realized, for example, by a processor such as a CPU executing a program (software) stored in the storage b420. Further, some or all of these functional units may be realized by hardware such as an LSI, an ASIC, an FPGA, or a GPU or may be realized by software and hardware in cooperation.

The facility reserver b431 reserves the facility on the basis of facility reservation information received from the user terminal b300 via the communication device b410 and the network NW. The facility reservation information is content of a reservation for a facility that is reserved by the user, and includes, for example, a reservation date and time, a name or address of the facility, the number of reserved persons, a name of the user, contact information, special notes, and a pick-up/drop-off service. In a process of reserving a facility, the facility reserver b431 may acquire a vacancy situation of a facility designated by the user by referring to an external server connected via the network NW, and transmit the availability to the user terminal b300. The facility reserver b431 stores various types of information in the facility reservation information b421 in the storage b420 on the basis of the received facility reservation information. Further, the facility reserver b431 may create information indicating a reliability of a user on the basis of a previous facility reservation situation of the user and include the information in the facility reservation information b421. The reliability of the user includes, for example, an evaluation value according to a reservation cancellation rate or an evaluation value according to a use frequency.

The facility reservation information b421 is information indicating reservation content of each facility. FIG. 54 is a diagram showing an example of the facility reservation information b421. As shown in FIG. 54 the facility reservation information b421 is information in which a user management key, a facility management key, facility reservation content, optional service information, and a reservation status are associated with a reservation management key. The reservation management key is unique information for identifying each reservation. The user management key is unique information for identifying each user. The facility management key is unique information for identifying each facility. Content of the facility reservation includes a reservation date and time, a name or address of the facility, the number of reserved persons, a name of the user, contact information, special notes, and the like. The optional service information includes information indicating whether or not an optional service such as a pick-up service is desired to be provided. The reservation status is information indicating a status of the facility reservation, and includes, for example, reservation preparation, reservation completion, and cancellation completion.

The vehicle allocation reserver b432 creates a pick-up/drop-off schedule on the basis of the facility reservation information received from the user terminal b300 via the communication device b410 and the network NW, and reserves a pick-up/drop-off vehicle in the facility. The vehicle allocation reserver b432 reserves a pick-up/drop-off vehicle for an outward route, a return route, or both for the facility on the basis of a designation of the user. The vehicle allocation reserver b432 may transmit the pick-up/drop-off schedule created on the basis of the facility reservation information to the user terminal b300 before reserving the pick-up/drop-off vehicle, receive a reservation instruction from the user, and then, reserve the pick-up/drop-off vehicle.

The vehicle allocation reserver b432 creates a pick-up/drop-off schedule allowing the vehicle to arrive in time for a designated arrival time, with the facility set as a destination or a departure place, on the basis of the facility reservation information. For example, the vehicle allocation reserver b432 determines the pick-up/drop-off schedule such as a reservation date and time of the pick-up/drop-off vehicle, the number of reserved persons, the pick-up position or the destination, and a time of arrival at the pick-up position or the destination, on the basis of the reservation date and time, the number of reserved persons, the name of the facility, and the like included in the facility reservation information. In addition to the facility reservation information, the vehicle allocation reserver b432 may receive, for example, information on the movement means to the facility (for example, an airplane or a Shinkansen) from the user terminal b300, create a pick-up/drop-off schedule to a hotel according to a time of arrival at an airport or a pick-up/drop-off schedule to a restaurant according to a time of arrival at a station, and transmit the pick-up/drop-off schedule to the user terminal b300. The vehicle allocation reserver b432 stores various types of information in the vehicle allocation reservation information b422 in the storage b420 on the basis of the created pick-up/drop-off schedule when the vehicle allocation has been reserved on the basis of the created pick-up/drop-off schedule. Further, the vehicle allocation reserver b432 may create information indicating the reliability of the user on the basis of a previous vehicle allocation reservation situation of the user and include the information in the vehicle allocation reservation information b422.

The vehicle allocation reservation information b422 is information indicating the reservation content of each pick-up/drop-off vehicle. FIG. 55 is a diagram showing an example of the vehicle allocation reservation information b422. As shown in FIG. 55, the vehicle allocation reservation information b422 is information in which a user management key, a vehicle ID, a pick-up/drop-off schedule, and a reservation status are associated with a reservation management key. The vehicle ID is unique information for identifying each vehicle.

The vehicle allocation manager b433 allocates the pick-up/drop-off vehicle reserved by the vehicle allocation reserver b432 on the basis of the reservation content. The vehicle allocation of the vehicle allocation manager b433 includes a process of allocating a pick-up/drop-off vehicle for picking up/dropping off a user according to each pick-up/drop-off schedule (hereinafter referred to as an allocation process), and a process of instructing the allocated pick-up/drop-off vehicle to perform automated driving according to the pick-up/drop-off schedule (hereinafter referred to as a driving instruction process).

In the allocation process, the vehicle allocation manager b433 reads reservation content corresponding to a predetermined allocation period (for example, a period from 0:00 to 24:00 on the next day) from the vehicle allocation reservation information b422, and allocates a relevant vehicle b100 for each pick-up/drop-off schedule included in the read information. For example, the vehicle allocation manager b433 selects a vehicle of a type on which a reserved number of users can get, which is a vehicle that can travel to the pick-up position and the destination so that the vehicle arrives in time for a reserved arrival time from among the vehicles b100 registered in vehicle information b424 on the basis of a reservation situation. The vehicle information b424 is information on the vehicle b100 and is, for example, information in which a vehicle ID, a vehicle station in which the vehicle b100 is parked, a current position (latitude, longitude, and altitude) of the vehicle b100, an address necessary for communication with the vehicle b100, and a traveling status have been associated with each other.

Further, the vehicle allocation manager b433 may allocate a vehicle b100 that allows a movement distance from a previous destination to a next pick-up position to be minimized so that no delay is shown in the pick-up/drop-off schedule due to, for example, a traffic jam on roads other than a pick-up/drop-off road. Further, the vehicle allocation manager b433 may allocate the vehicles b100 so that a predetermined number of vehicles b100 necessary for pick-up/drop-off for a facility in a predetermined range are caused to stand by at a predetermined vehicle station. The vehicle allocation manager b433 associates content of the allocated pick-up/drop-off schedule with the vehicle ID of the relevant vehicle b100, and writes the content to vehicle allocation status information b423. All vehicle allocation statuses indicate non-allocation immediately after the content is written to the vehicle allocation status information b423.

When the pick-up/drop-off schedule is created, the vehicle allocation reserver b432 may create a schedule suitable for pick-up/drop-off of the vehicle, which is a pick-up/drop-off schedule in which a pick-up/drop-off vehicle can be allocated, by referring to both the facility reservation information b421 and the vehicle allocation status information b423, in a case in which a reservation time included in the facility reservation information is included in the allocation period. For example, the vehicle allocation reserver b432 creates a first schedule including a reservation date and time of the pick-up/drop-off vehicle, the number of reserved persons, the pick-up position or the destination, a time of arrival at the pick-up position or the destination, and the like on the basis of the reservation date and time, the number of reserved persons, the name of the facility, and the like included in the facility reservation information b421, and sets the first schedule as the pick-up/drop-off schedule when there is a vehicle b100 that can be allocated according to the first schedule. On the other hand, when there is no vehicle b100 that can be allocated according to the first schedule, the vehicle allocation reserver b432 creates a second schedule by changing a part or all of the first schedule so that the vehicle b100 can be allocated, and sets the second schedule as the pick-up/drop-off schedule. Accordingly, when a facility is reserved several days ago, a pick-up/drop-off vehicle can be reserved according to a schedule according to a desire of the user regardless of the status of the vehicle b100, and when a facility is reserved several hours ago, a pick-up/drop-off vehicle can be reserved according to a schedule allowing vehicle allocation.

In the driving instruction process, the vehicle allocation manager b433 transmits a driving start instruction together with the pick-up/drop-off schedule to the vehicle b100 using the communication device b410 at a predetermined timing, and rewrites the vehicle allocation status in the vehicle allocation status information b423 during pick-up/drop-off.

The vehicle allocation status information b423 includes information on to a vehicle reserved for allocation or a vehicle that is being allocated and includes, for example, information set in the vehicle b100 or information indicating a vehicle allocation situation. FIG. 56 is a diagram showing an example of the vehicle allocation status information b423. As shown in FIG. 56, the vehicle allocation status information b423 is information in which a use date and time, the number of users, a pick-up position and a time of arrival at the pick-up position, a destination and a time of arrival at the destination, and a vehicle allocation status have been associated with a vehicle ID. The vehicle allocation status is information indicating a vehicle allocation situation of the allocated vehicle b100, and is updated by the vehicle allocation manager b433, for example.

The acquirer b434 acquires the movement situation, the vehicle allocation status, the arrival status, and the like from the vehicle b100 allocated by the vehicle allocation manager b433. For example, the acquirer b434 receives the status information periodically transmitted from the vehicle b100 using the communication device b410, and writes various types of information to movement status information b425 of the storage b420 on the basis of the received status information.

Figure 57:
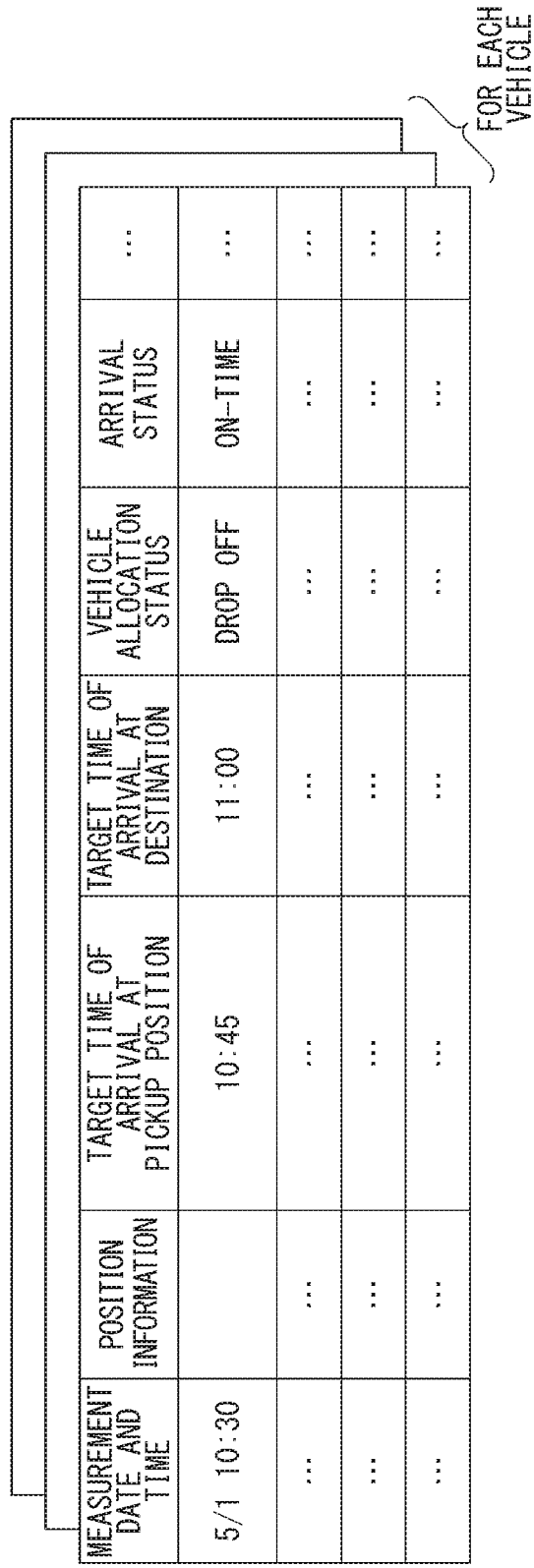
FIG. 57 is a diagram showing an example of movement status information b425.

The movement status information b425 is information indicating a situation of the vehicle b100 that is being allocated. FIG. 57 is a diagram showing an example of the movement status information b425. As shown in FIG. 57, the movement status information b425 is information in which current position information of the vehicle b100, a target time of arrival at the pick-up position at a current point in time, a target time of arrival at the destination at a current point in time, a vehicle allocation status, and an arrival status are associated with a measurement date and time, and is stored in, for example, a table prepared for each vehicle b100. The measurement date and time is a date and time when the status information has been created in the vehicle b100. The position information is information indicating the position of the vehicle b100 measured by the GNSS receiver b134 of the vehicle b100 at the measurement date and time. The target arrival time is a target arrival time derived by the navigation control device b136 of the vehicle b100 at the measurement date and time. The arrival status is information indicating an arrival situation of the allocated vehicle b100, and is, for example, an arrival situation acquired by the status acquirer b174 of the vehicle b100 at the measurement date and time.

The status manager b435 notifies at least one of the user terminal b300 and the facility terminal b200 of the movement situation acquired by the acquirer b434, using the communication device b410. The status manager b435 may notify of a message according to the vehicle allocation status at a timing at which the vehicle allocation status has changed, by referring to the movement status information b425, or may notify of a message according to the arrival status at a timing at which the vehicle b100 is delayed. For example, the status manager b435 notifies the facility terminal b200 that a movement to the facility has started or of a target time of arrival at the facility after the user has got on the vehicle b100 allocated by the vehicle allocation manager b433.

The status manager b435 determines whether or not the number of occupants is different from the number of reserved persons on the basis of information indicating the number of occupants acquired by the acquirer b434, and notifies the facility terminal b200 of change of the number of reserved persons when the number of occupants is different from the number of reserved persons. Further, the status manager b435 notifies the corresponding facility terminal b200 of the order indication information acquired by the acquirer b434.

When the time of arrival at the pick-up position or the time of arrival at the destination of the vehicle b100 allocated by the vehicle allocation manager b433 is delayed, the status manager b435 notifies at least one of the user terminal b300 and the facility terminal b200 of the fact, and receives at least one of a change or cancellation of the reservation for the vehicle allocation, or a change or cancellation of the reservation for the facility. The change includes extension of a usage time, postponement of a use date, a change of the pick-up position or the destination, and the like. Further, the status manager b435 may accept both of the cancellation of the vehicle allocation and the cancellation of the facility when neither of the cancellation or the change of the vehicle allocation nor the change of the reservation for the facility is not acceptable from the user notified of the delay in the time of arrival at the pick-up position or the time of arrival at the destination of the vehicle b100 allocated by the vehicle allocation manager b433.

The status manager b435 updates the vehicle allocation status of the vehicle allocation status information b423 at a timing at which the vehicle allocation status has changed by referring to the movement status information b425.

[Flowchart]

Figure 58:
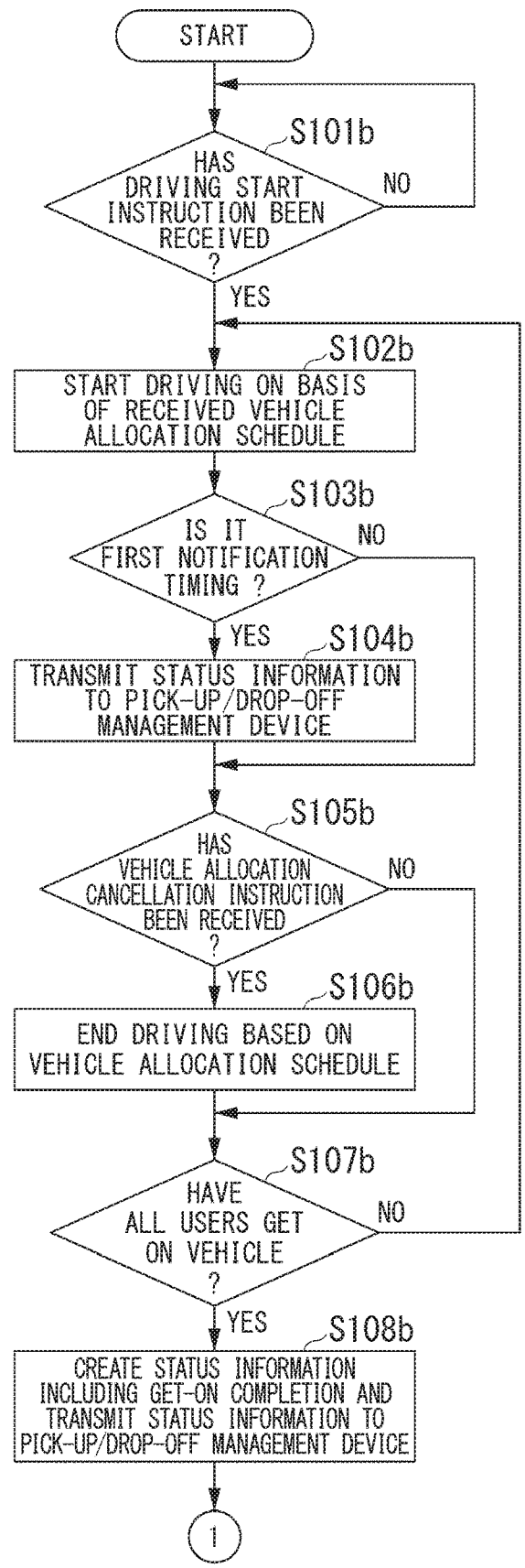
FIG. 58 is a flowchart showing an example of a processing operation in the vehicle b100.
Figure 59:
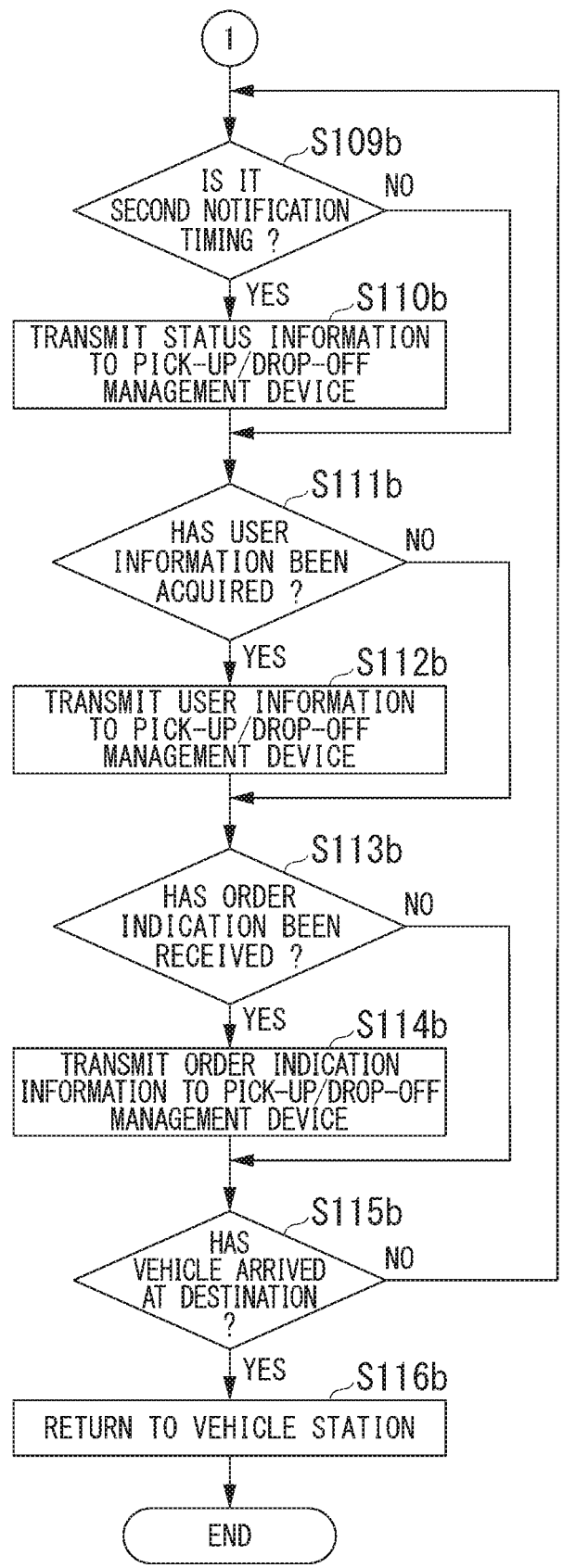
FIG. 59 is a flowchart showing an example of a processing operation in the vehicle b100.

Next, an example of a processing operation in the vehicle b100 will be described with reference to FIGS. 58 and 59. FIGS. 58 and 59 are flowcharts showing an example of a processing operation in the vehicle b100.

First, the vehicle allocation controller b173 determines whether or not the driving start instruction has been received from the pick-up/drop-off management device b400 using the communication device b120 (step S101b). When the vehicle allocation controller b173 has determined that the driving start instruction has been received, the vehicle allocation controller b173 instructs the navigation device b130 and the automated driving controller b150 to start driving on the basis of the pick-up/drop-off schedule received together with the driving start instruction (step S102b). Accordingly, a route according to a pick-up position or a destination according to the pick-up/drop-off schedule and a time of arrival at the pick-up position or the destination is set in the navigation device b130, and the automated driving controller b150 starts automated driving according to the set route.

The status acquirer b174 determines whether or not it is a predetermined first notification timing (step S103b). The first notification timing is a predetermined timing at which the vehicle b100 notifies the status information during pick-up. Examples of the first notification timing include a timing at which automated driving has been started, a timing at which a target time of arrival at the pick-up position is after a reserved arrival time, a timing at which the vehicle has arrived at the pick-up position, a timing at which the user is caused to get on the vehicle b100, and a timing at which a predetermined time has elapsed since a previous notification. When the status acquirer b174 has determined that it is the first notification timing, the status acquirer b174 acquires the status information and transmits the status information to the pick-up/drop-off management device b400 using the communication device b120 (step S104b).

The vehicle allocation controller b173 determines whether or not a vehicle allocation cancellation instruction has been received from the pick-up/drop-off management device b400 using the communication device b120 (step S105b). When the vehicle allocation controller b173 has received the vehicle allocation cancellation instruction, the vehicle allocation controller b173 instructs the navigation device b130 and the automated driving controller b150 to end the automated driving according to the set route (step S106b). Here, the navigation device b130 may accept a setting of a new destination from the user using the HMI 131. When the vehicle allocation controller b173 has received the change of the pick-up position or the destination and an instruction to change a time of arrival at the pick-up position or the destination from the pick-up/drop-off management device b400 using the communication device b120, the vehicle allocation controller b173 instructs the navigation device b130 and the automated driving controller b150 to change the navigation setting information.

The status acquirer b174 determines whether or not all the users get on the vehicle b100 (step S107b). For example, the status acquirer b174 determines that all the users have got on the vehicle b100 when all of predetermined pick-up positions are passed on the basis of the position of the vehicle b100 measured by the GNSS receiver b134. Further, the status acquirer b174 may determine that all the users have got on the vehicle b100 when the user has input the fact that all the users have got on the vehicle b100 using the input and output b171 or when the number of occupants obtained from a result of analyzing an image obtained by imaging the inside of the vehicle matches the number of reserved users. When the status acquirer b174 has determined that all the users get in the vehicle b100, the status acquirer b174 creates status information including an indication that the vehicle allocation status indicates get-on completion, and transmits the status information to the pick-up/drop-off management device b400 using the communication device b120 (step S108b).

The status acquirer b174 determines whether or not it is a predetermined second notification timing (step S109b). The second notification timing is a predetermined timing at which the status information is notified of while all the users get in the vehicle b100. Examples of the second notification timing include a timing at which all the users are caused to get in the vehicle b100, a timing at which the target time of arrival at the destination is after a reserved arrival time, and a timing at which a predetermined time has elapsed since a previous notification. When the status acquirer b174 has determined that it is the second notification timing, the status acquirer b174 acquires the status information and transmits the status information to the pick-up/drop-off management device b400 using the communication device b120 (step S110b).

The user information acquirer b175 determines whether or not user information has been acquired (step S111b). For example, when an input of the number of occupants and a sex or age of the user has been accepted from the user using the input and output b171, the user information acquirer b175 creates user information including the number of occupants and the sex or age of the user, and transmits the user information to the pick-up/drop-off management device b400 using the communication device b120 (step S112b).

The order acquirer b176 determines whether or not the order indication information has been acquired (step S113b). For example, when at least one menu has been selected from among online menus by the user using the input and output b171, the order acquirer b176 creates order indication information for requesting an order of the selected menu, and transmits the order indication information to the pick-up/drop-off management device b400 using the communication device b120 (step S114b).

The vehicle allocation controller b173 determines whether or not the vehicle has arrived at the destination on the basis of the output from the navigation control device b136 (step S115b). When the position of the vehicle b100 measured by the GNSS receiver b134 falls in a predetermined range of the destination, the navigation control device b136 notifies the vehicle allocation controller b173 that the vehicle b100 has arrived at the destination. When the vehicle allocation controller b173 is notified that the vehicle has arrived at the destination, the vehicle allocation controller b173 sets the vehicle station as a next destination and instructs the navigation device b130 and the automated driving controller b150 to perform automated driving (step S116b). When a new pick-up/drop-off schedule has been received during a movement toward the vehicle station, the vehicle allocation controller b173 proceeds to step S101b.

Figure 60:
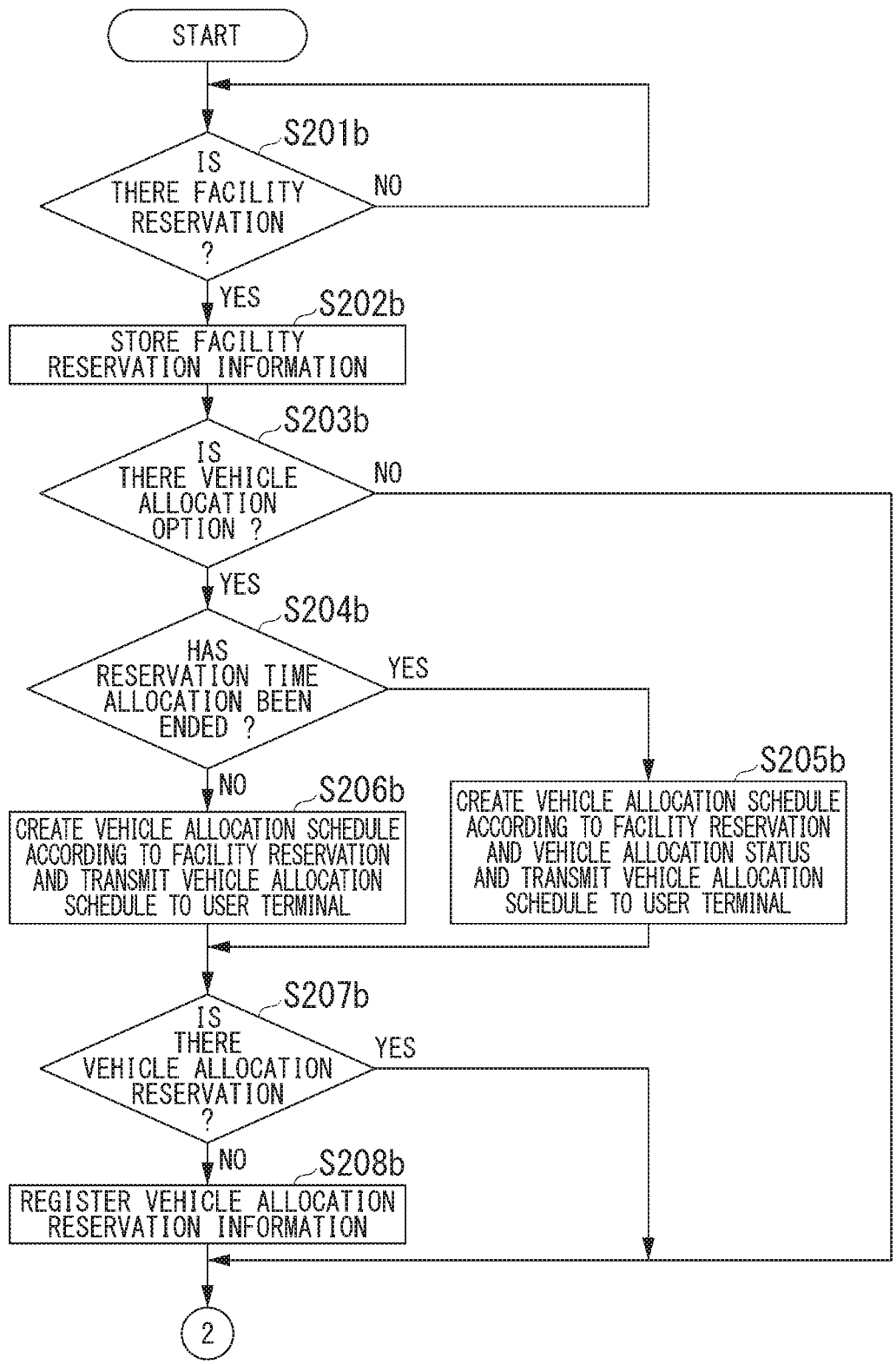
FIG. 60 is a flowchart showing an example of a processing operation in the pick-up/drop-off management device 400b.
Figure 61:
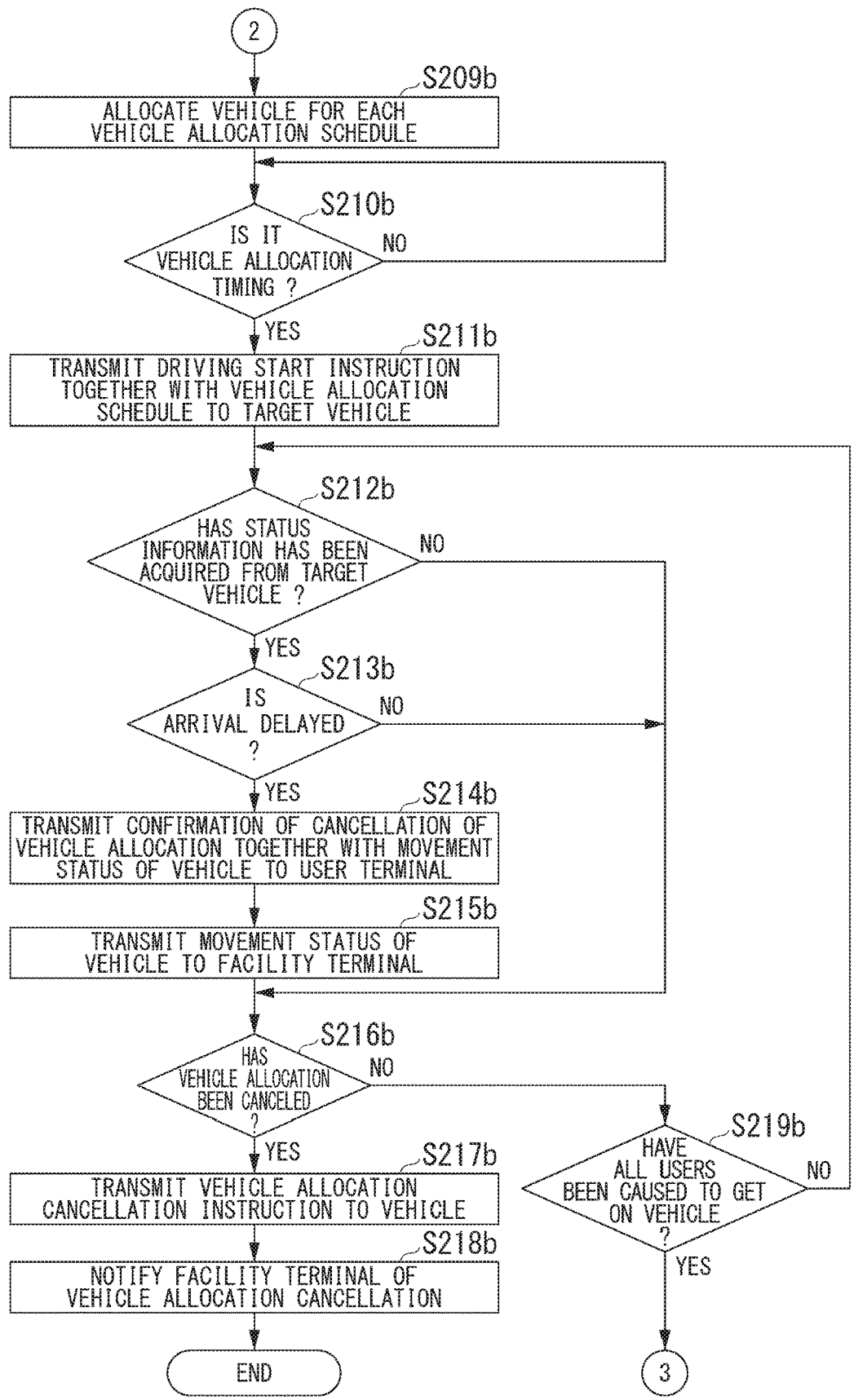
FIG. 61 is a flowchart showing an example of a processing operation in the pick-up/drop-off management device 400b.
Figure 62:
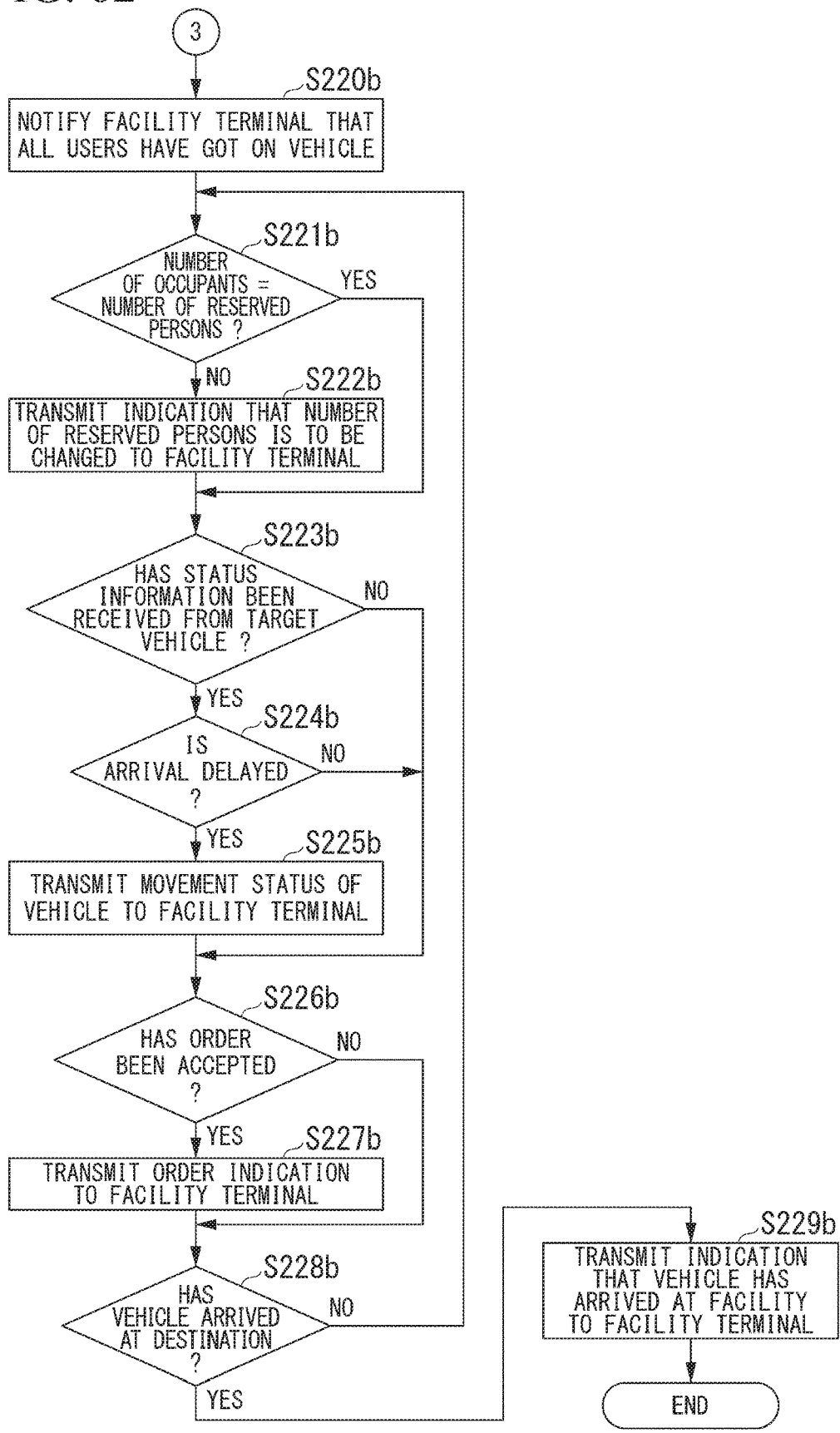
FIG. 62 is a flowchart showing an example of a processing operation in the pick-up/drop-off management device 400b.

Next, an example of a processing operation in the pick-up/drop-off management device 400b will be described with reference to FIGS. 60, 61, and 62. FIGS. 60, 61, and 62 are flowcharts showing an example of the processing operation in the pick-up/drop-off management device 400b.

First, the facility reserver b431 determines whether or not facility reservation information has been received from the user terminal b300 using the communication device b410 (step S201b). When the facility reserver b431 has determined that the facility reservation information has been received, the facility reserver b431 determines whether or not a facility having content shown in the received facility reservation information can be reserved, by referring to an external server that manages facility reservation. When the facility can be reserved, the facility reserver b431 stores various types of information in the facility reservation information b421 of the storage b420 on the basis of the received facility reservation information (step S202b). Accordingly, the facility having the content shown in the facility reservation information is reserved. When the facility cannot be reserved, the facility reserver b431 may notify the user terminal b300 of the fact using the communication device b410 and accept reservation with other content.

Then, the facility reserver b431 determines whether or not the received facility reservation information includes content indicating that a pick-up/drop-off service is desired to be provided (step S203b). When the facility reserver b431 has determined that the facility reservation information includes the content indicating that a pick-up/drop-off service is desired to be provided, the facility reserver b431 instructs the vehicle allocation reserver b432 to create the pick-up/drop-off schedule. The vehicle allocation reserver b432 determines whether or not the reservation time included in the facility reservation information is included in an allocation period in which the allocation process has already been ended (step S204b). When the reservation time is not included in the allocation period in which the allocation process has already been ended, the vehicle allocation reserver b432 creates a pick-up/drop-off schedule by referring to the facility reservation information b421, and transmits the pick-up/drop-off schedule to the user terminal b300 using the communication device b410 (step S205b). On the other hand, when the reservation time is included in the allocation period in which the allocation process has already been ended, the vehicle allocation reserver b432 creates a pick-up/drop-off schedule in which the vehicle b100 can be allocated, by referring to both the facility reservation information b421 and the vehicle allocation status information b423, and transmits the pick-up/drop-off schedule to the user terminal b300 using the communication device b410 (step S206b).

The vehicle allocation reserver b432 determines whether or not a vehicle allocation reservation instruction has been received from the user terminal b300 using the communication device b410 (step S207b). When the vehicle allocation reserver b432 has determined that the vehicle allocation reservation instruction has been received, the vehicle allocation reserver b432 stores reserved content in the vehicle allocation reservation information b422 of the storage b420 on the basis of the pick-up/drop-off schedule transmitted to the user terminal b300 (step S208b). Accordingly, a pick-up/drop-off vehicle in the reserved facility is reserved.

The vehicle allocation manager b433 executes an allocation process and writes various types of information to the vehicle allocation status information b423 (step S209b). Then, the vehicle allocation manager b433 determines whether or not it is a vehicle allocation timing by referring to the vehicle allocation reservation information b422 (step S210b). The vehicle allocation timing is a time at which the pick-up/drop-off vehicle is caused to move to the pick-up position, and is derived by reversely calculating a time of a movement from the current position of the vehicle b100 to the pick-up position so that the vehicle arrives at the pick-up position before a determined arrival time. When it is the vehicle allocation timing, the vehicle allocation manager b433 transmits the driving start instruction together with the pick-up/drop-off schedule read from the vehicle allocation reservation information b422 to the vehicle b100 using the communication device b410 (step S211b). Further, the vehicle allocation manager b433 rewrites the vehicle allocation status corresponding to the vehicle ID of the allocated vehicle b100 in the vehicle allocation status information b423 during pick-up.

The status manager b435 determines whether or not new status information has been acquired by the acquirer b434 by referring to the movement status information b425 (step S212b). When the status manager b435 determines that the new status information has been acquired, the status manager b435 determines whether or not arrival at the pick-up position is delayed (step S213b). For example, the status manager b435 compares a latest target time of arrival at the pick-up position stored in the movement status information b425 with a time of arrival at the pick-up position stored in the vehicle allocation status information b423.

When the status manager b435 has determined that the arrival at the pick-up position is delayed, the status manager b435 transmits information for confirming cancellation of the vehicle allocation or facility reservation or change of the vehicle allocation or facility reservation, together with the movement situation of the vehicle b100, to the user terminal b300 using the communication device b410 (step S214b). For example, the status manager b435 transmits, to the user terminal b300, a movement situation including the target time of arrival at the pick-up position, the current position information of the vehicle b100, the target time of arrival at the destination, and the like. Then, the status manager b435 transmits the movement situation of the vehicle b100 to the facility terminal b200 using the communication device b410 (step S215b). For example, the status manager b435 transmits a movement situation including a target time of arrival at the facility or a delayed time to the facility terminal b200.

On the other hand, when the status manager b435 has determined in step S21b2 that the status information has not been acquired, the vehicle allocation manager b433 determines whether or not the vehicle allocation cancellation instruction has been received from the user terminal b300 using the communication device b410 (step S216b). When the vehicle allocation cancellation instruction has been received, the vehicle allocation manager b433 transmits the vehicle allocation cancellation instruction to the vehicle b100 using the communication device b410 (step S217b). Further, the vehicle allocation manager b433 transmits an indication that the vehicle allocation has been canceled to the facility terminal b200 using the communication device b410 (step S218b). Here, the vehicle allocation manager b433 may receive an instruction to change the reservation for vehicle allocation from the user terminal b300 and transmit content of the change to the vehicle b100 and the facility terminal b200. Further, the vehicle allocation manager b433 may receive an instruction to cancel the reservation for the facility or change the reservation, together with the instruction to cancel the vehicle allocation or change the vehicle allocation reservation, from the user terminal b300 using the communication device b410, and transfer the fact to the facility terminal b200.

On the other hand, when the vehicle allocation manager b433 has determined in step S216b that the vehicle allocation cancellation instruction or the like has not been received, the status manager b435 determines whether or not a movement status indicating get-on completion has been received from the user terminal b300 using the communication device b410 (step S219b). When the status manager b435 has determined that the movement status indicating get-on completion has not been received, the status manager b435 returns to step S212b and repeats the process.

When the status manager b435 has determined in step S219b that the movement status indicating get-on completion has been received, the status manager b435 transmits an indication that all the users have got on the vehicle b100 to the facility terminal b200 using the communication device b410 (step S220b). Then, the status manager b435 determines whether or not the number of occupants is equal to a scheduled number on the basis of the status information or the user information received from the vehicle b100 using the communication device b410 (step S221b). When the number of occupants is not equal to the number of reserved persons, the status manager b435 transmits an indication that the number of reserved persons is to be changed to the number of occupants to the facility terminal b200 using the communication device b410 (step S222b).

Then, the status manager b435 determines whether or not status information has been received from the vehicle b100 using the communication device b410 (step S223b). When the status manager b435 determines that the status information has been received, the status manager b435 determines whether or not a target time of arrival at a destination is after a reserved time on the basis of the received status information (step S224b). When the status manager b435 has determined that the target time of arrival at the destination is after the reserved time, the status manager b435 transmits the movement situation of the vehicle b100 to the facility terminal b200 using the communication device b410 (step S225b).

Then, the status manager b435 determines whether or not an order indication has been received from the vehicle b100 using the communication device b410 (step S226b). When the status manager b435 has determined that the order indication has been received, the status manager b435 transmits the order indication to the facility terminal b200 using the communication device b410 (step S227b).

Then, the status manager b435 determines whether or not status information indicating that the vehicle has arrived at the destination has been received from the vehicle b100 using the communication device b410 (step S228b). When the status manager b435 has determined that the status information indicating that the vehicle has arrived at the destination has been received, the status manager b435 rewrites the vehicle allocation status in the vehicle allocation status information b423 and the movement status information b425 as the movement completion, and transmits an indication that the vehicle has arrived at the destination to the facility terminal b200 using the communication device b410 (step S229b).

Figure 63:
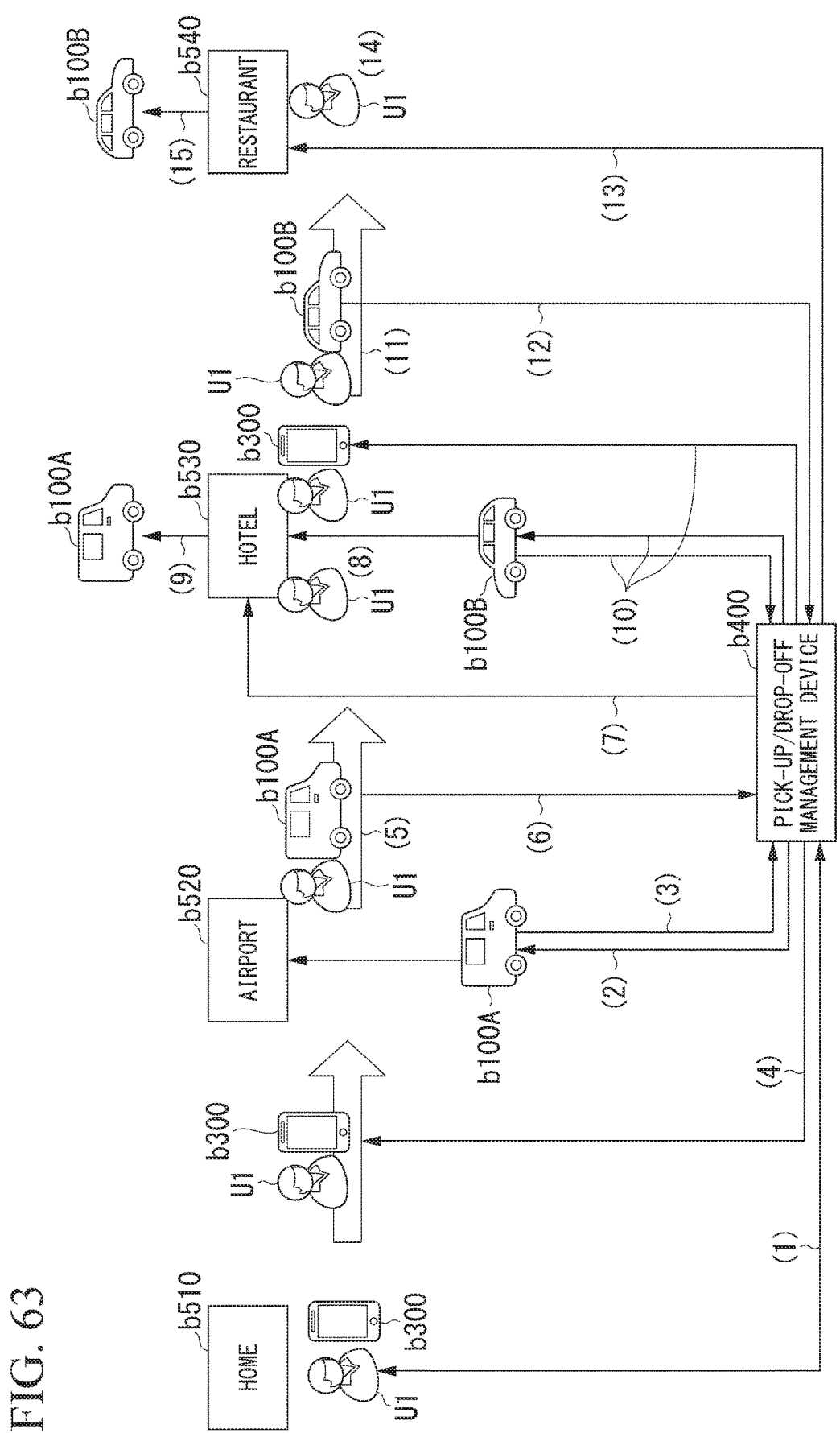
FIG. 63 is an explanatory diagram showing an example using the vehicle dispatch system b1.

Next, an overview of the vehicle allocation system b1 will be described with reference to FIG. 63. FIG. 63 is a diagram showing an example in which the vehicle allocation system b1 has been used. In the example shown in FIG. 63, it is assumed that lodging at a hotel b530, a reservation for a meal at a restaurant b540, a pick-up/drop-off vehicle from an airport b520 to the hotel b530, and a pick-up/drop-off vehicle from the hotel b530 to the restaurant b540 have been reserved.

(1) First, a user U1 transmits the facility reservation information and the vehicle allocation reservation information to the pick-up/drop-off management device b400 using the user terminal b300 at a home b510 to make a reservation for the facility and the pick-up/drop-off vehicle.

(2) The pick-up/drop-off management device b400 causes a pre-allocated vehicle b100A to move to the airport b520 that is the pick-up position when it is the vehicle allocation timing.

(3) The vehicle b100A acquires status information such as a movement situation and notifies the pick-up/drop-off management device b400 of the status information.

(4) When the arrival of the vehicle b100A at the airport b520 is delayed, the pick-up/drop-off management device b400 notifies the facility terminal b200 of the hotel b530 and the user terminal b300 of the user U1 of the fact. For example, when the user terminal b300 has instructed the pick-up/drop-off management device b400 to cancel the vehicle allocation, the pick-up/drop-off management device b400 notifies the vehicle b100A of the vehicle allocation cancellation to instruct the vehicle b100A to move to the vehicle station, and notifies the facility terminal b200 of the hotel b530 of the fact.

(5) When the vehicle b100A has arrived at the airport b520, the vehicle b100A notifies the user terminal b300 of the user U1 and the pick-up/drop-off management device b400 of, for example, information indicating that the vehicle b100A has arrived or information indicating a place at which the vehicle b100A is parking.

The pick-up/drop-off management device b400 transfers the received content to the facility terminal b200 of the hotel b530. The user U1 gets on the vehicle b100A and then the vehicle b100A departs toward the hotel b530.

(6) The vehicle b100A notifies the pick-up/drop-off management device b400 of the fact that the user U1 has got on the vehicle b100A, other movement situations, or the like. The pick-up/drop-off management device b400 transfers the received content to the facility terminal b200 of the hotel b530.

(7) When the arrival of the vehicle b100A at the hotel b530 is delayed, the pick-up/drop-off management device b400 notifies the facility terminal b200 of the hotel b530 to the fact.

(8) When the vehicle b100A has arrived at the hotel b530, the vehicle b100A notifies the pick-up/drop-off management device b400 of, for example, information indicating that the vehicle b100A has arrived or the user U1 has got off. The pick-up/drop-off management device b400 transfers the received content to the facility terminal b200 of the hotel b530.

(9) The vehicle b100A moves toward the vehicle station or a pick-up position for a next vehicle allocation reservation.

(10) Thereafter, the pick-up/drop-off management device b400 allocates the vehicle b100B according to a reservation time of the restaurant b540, and notifies the user terminal b300 that the vehicle b100B moves toward the hotel b530, which is the pick-up position. The vehicle b100A acquires a movement situation and notifies the pick-up/drop-off management device b400 of the movement situation, while moving to the hotel b530. When arrival at the hotel b530 is delayed, the pick-up/drop-off management device b400 notifies the user terminal b300 to the fact.

(11) When the vehicle b100B has arrived at the hotel b530, the vehicle b100B notifies the user terminal b300 and the pick-up/drop-off management device b400 of, for example, information indicating that the vehicle b100B has arrived, or information indicating a place at which the vehicle b100B is parking. When the user U1 has got on the vehicle b100B, the vehicle b100B departs toward the restaurant b540.

(12) The vehicle b100B notifies the pick-up/drop-off management device b400 of the fact that the user U1 has got on the vehicle b100B, other movement situations, or the like.

(13) When the arrival of the vehicle b100B at the restaurant b540 is delayed or when an indication of an order of an online menu is accepted, the pick-up/drop-off management device b400 notifies the facility terminal b200 to the fact.

(14) When the vehicle b100B has arrived at the restaurant b540, the vehicle b100B notifies the pick-up/drop-off management device b400 of, for example, information indicating that the vehicle b100B has arrived at the restaurant b540 or the user U1 has got off.

(15) The vehicle b100B moves toward the vehicle station or the pick-up position for the next vehicle allocation reservation.

Figure 64:
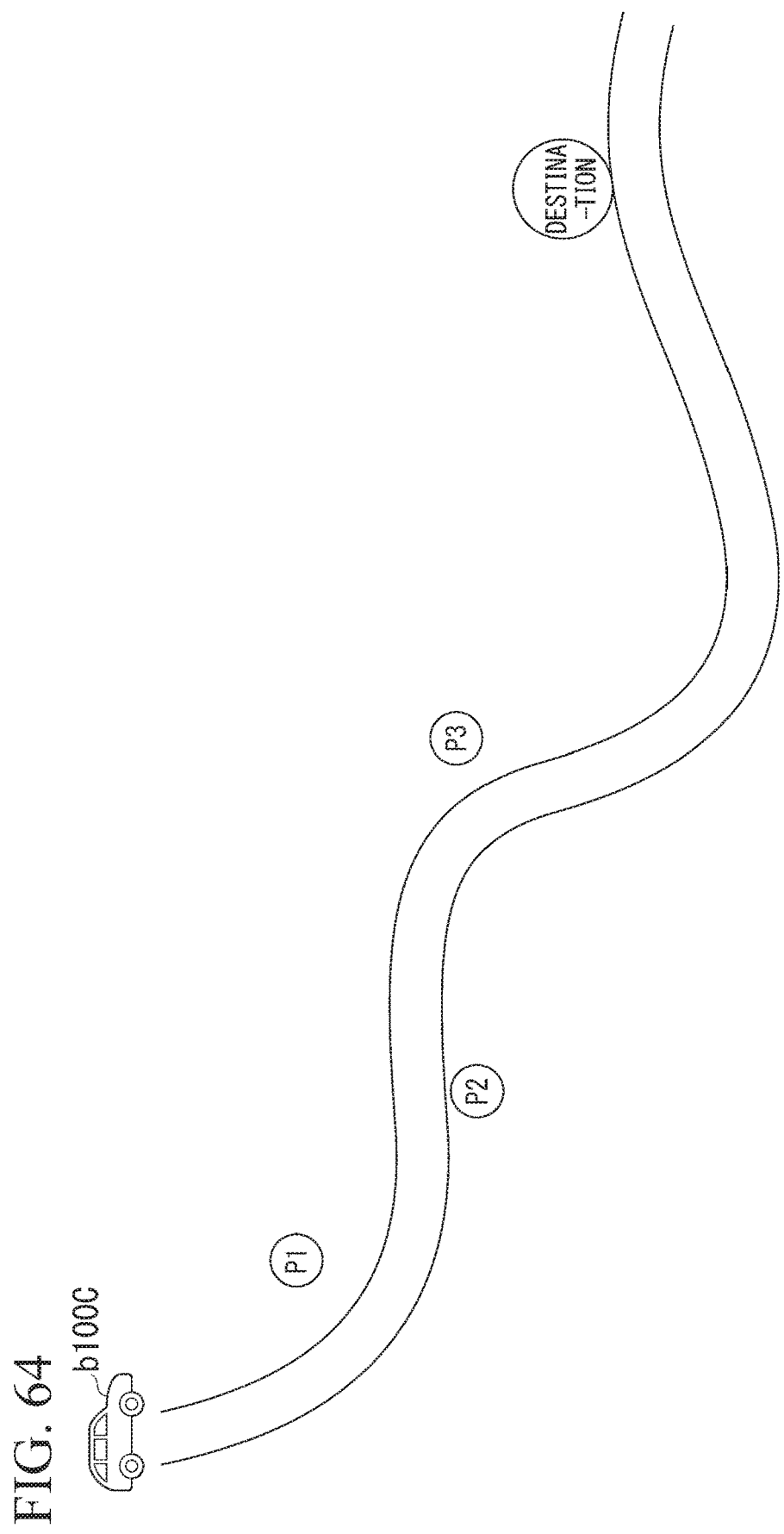
FIG. 64 is an explanatory diagram showing another example of the vehicle dispatch system b1.

Next, another example of the vehicle allocation system b1 will be described with reference to FIG. 64. FIG. 64 is a diagram showing another example in which the vehicle allocation system b1 has been used. As shown in FIG. 64, a vehicle b100C may cause users to get on the vehicle b100C at a plurality of pick-up positions P1, P2, and P3 and move toward the destination.

According to the third embodiment described above, it is possible to provide a pick-up/drop-off service linked to the reserved facility by including the vehicle allocation reserver b432 that creates the pick-up/drop-off schedule on the basis of the content of the reservation for the facility and reserves the vehicle, and the vehicle allocation manager b433 that allocates the vehicle reserved by the vehicle allocation reserver b432 according to the pick-up/drop-off schedule.

Since the user can make a vehicle allocation reservation according to the facility reservation, according to the pick-up/drop-off schedule created on the basis of the facility reservation information by the pick-up/drop-off management device b400, it is possible to secure a means for a movement to the facility. Further, since the pick-up/drop-off schedule is created on the basis of the facility reservation information, it is not necessary to input detailed information for a vehicle allocation reservation, and it is possible to reduce an effort of the user. Further, the facility side can provide the pick-up/drop-off vehicle as a part of the service to enhance the ability to attract customers, and the user side can also curb costs for a transportation means.

The user can acquire a vehicle allocation situation or a delay situation of the vehicle from the moving vehicle b100 to confirm the vehicle allocation situation or the delay situation and determine a subsequent action.

The facility side can acquire a movement situation such as a get-on situation of the user, a delay situation of the vehicle b100, and a target arrival time from the moving vehicle b100 to prepare to greet the user according to the arrival of the user and improve a service.

The user can simply change or cancel the reservation for the facility or the reservation for the pick-up/drop-off vehicle when the pick-up/drop-off vehicle is delayed.

Since the user can change the number of persons or make an order from the moving vehicle b100, it is possible to shorten a standby time in comparison with making an order after the user has arrived at the facility. Further, the facility side can smoothly guide the user by accepting a change of the number of persons or an order in advance. Further, when the order is accepted from the user in the vehicle b100, the facility side may preferentially guide the user who has made an order in advance.

The facility side can provide a service according to an attribute of a user by acquiring user information from the moving vehicle b100. For example, it is possible to prepare seats according to the number, sex, and age of users or to provide a product or service according to preferences of the user.

[Second Modification of Third Embodiment]

Hereinafter, a pick-up/drop-off management device b400A of a second modification of the third embodiment will be described. In the following description, parts having the same functions as those described in the third embodiment are denoted by the same names and reference signs, and specific descriptions thereof will be omitted.

Hereinafter, a description will be given by using an example in which pick-up/drop-off of the user by the vehicle b100 is comprehensively managed by a service provider having the authority to use a part or all of the pick-up/drop-off management device b400 and the facility terminal b200. The pick-up/drop-off management device b400A includes, for example, a pick-up/drop-off management device b400, a service provider device b600, a service management device b700, and a vehicle management device b910.

[Service Provider]

The service provider provides a user with an additional service other than the pick-up/drop-off at a timing before or during the pick-up/drop-off. In the example shown in FIG. 63, the service provider may be a person in charge on the facility side such as the airport b520, the hotel b530, and the restaurant b540 or may be an administrator of the vehicle b100. Further, the service provider may be a broker that brokers and comprehensively manages a reservation schedule of the vehicle b100, the airport b520, the hotel b530, the restaurant b540, or the like, in addition to providing the additional service.

The additional service provided by the service provider may be, for example, a product or service that the user can enjoy while moving on the vehicle b100, or it may be necessary to stop by a service providing place such as a store during the pick-up/drop-off of the user. The product or service that the user can enjoy while moving is, for example, viewing of a paid information program, or a massage that can be performed in the vehicle b100. Further, the service provider may dispatch a person in charge of service provision to the vehicle b100 in order to provide the product or service that the user can enjoy while moving. Further, a service providing device may be installed in the vehicle b100. The service providing device is, for example, a massage device. The service providing device may be a vending machine having a size for mounting in the vehicle b100.

Further, the service provider may propose a service that can be provided, to the user in the vehicle b100, on the basis of the user information acquired by the user information acquirer b175. For example, when the user seems to be bad as a result of the service provider analyzing the user information acquired by the user information acquirer b175, the service provider may provide medicine or the like from the service providing device. Further, the service provider may cause the input and output b171 to reproduce a display or sound for proposing a user to stop by a nearby break spot, medical institution, drug store, or the like.

The user may order an additional service to be provided by the service provider before getting on the vehicle b100 (for example, at the time of vehicle allocation reservation), or may order the additional server while the user is getting on the vehicle b100.

When the order acquirer b176 accepts the order for the additional service from the user via the input and output b171 or the like, the order acquirer b176 transmits content of the order to the service provider device b600 that manages the additional service.

[Service Provider Device]

Figure 65:
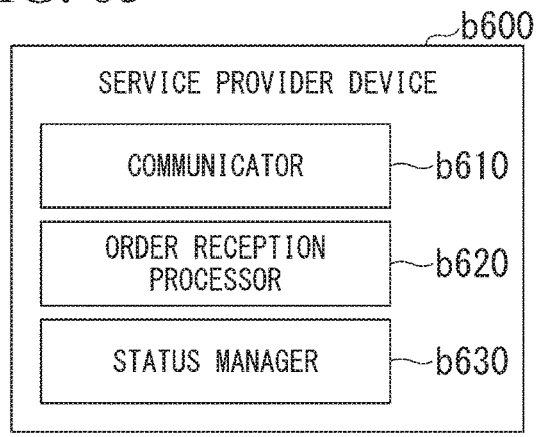
FIG. 65 is a functional configuration diagram of a service provider device b600.

FIG. 65 is a functional configuration diagram of the service provider device b600. The service provider device b600 is, for example, a device that can ascertain a status of a plurality of service providers and automatically respond to an order from the user and a service administrator. The service provider device b600 includes, for example, a communicator b610, an order reception processor b620, a status manager b630, and a storage b650 (not shown).

The communicator b610 communicates with the pick-up/drop-off management device b400 or the like via the network NW. The order reception processor b620 performs an order reception process on a service order from the user. The order reception processor b620 determines whether or not content of the service order is service provision information that has already been transmitted to the pick-up/drop-off management device b400, and first proceeds to the order reception process when the order reception processor b620 has determined that the content of the service order is not the service provision information that has already been transmitted. The status manager b630 manages a status (a reservation status, operating status, or the like) of the service provider registered in the service provider device b600, and provides the service provision information to the service management device b700 and the pick-up/drop-off management device b400. The service management device b700 will be described below.

The service provider device b600 transmits, for example, service provision information including the following content to the service management device b700 and the pick-up/drop-off management device b400. The service provision information is information relevant to a service for which the service provider can receive an order.

[Service Provision Information]
    Identification ID (ID for identifying the service provider)
    User ID
    Required vehicle compartment information (information on in-vehicle use space required for service provision)
    Facility position information
    Service provision point information (target facility information)
    Service provision time information (reservation information)
    User pick-up position
    Service status information (information corresponding to an execution situation and progress of the service provided by the service provider)
    User setting information (for example, additional information such as an input to the service and remarks)

The service status information corresponds to, for example, a performance situation of each of a plurality of additional services that are performed in the vehicle b100, and is a degree of progress such as a progress percentage and a remaining time in minutes. Further, the service status information may be indicated by a value indicating a status such as "before provision, during provision, provision end".

The communicator b610 of the service provider device b600 may cause a display device such as the input and output b171 to switch display content according to communication results. The service provider device b600, for example, causes the input and output b171 to display that a service provision start time is approaching or that the service provision has started.

[Service Management Device]

Figure 66:
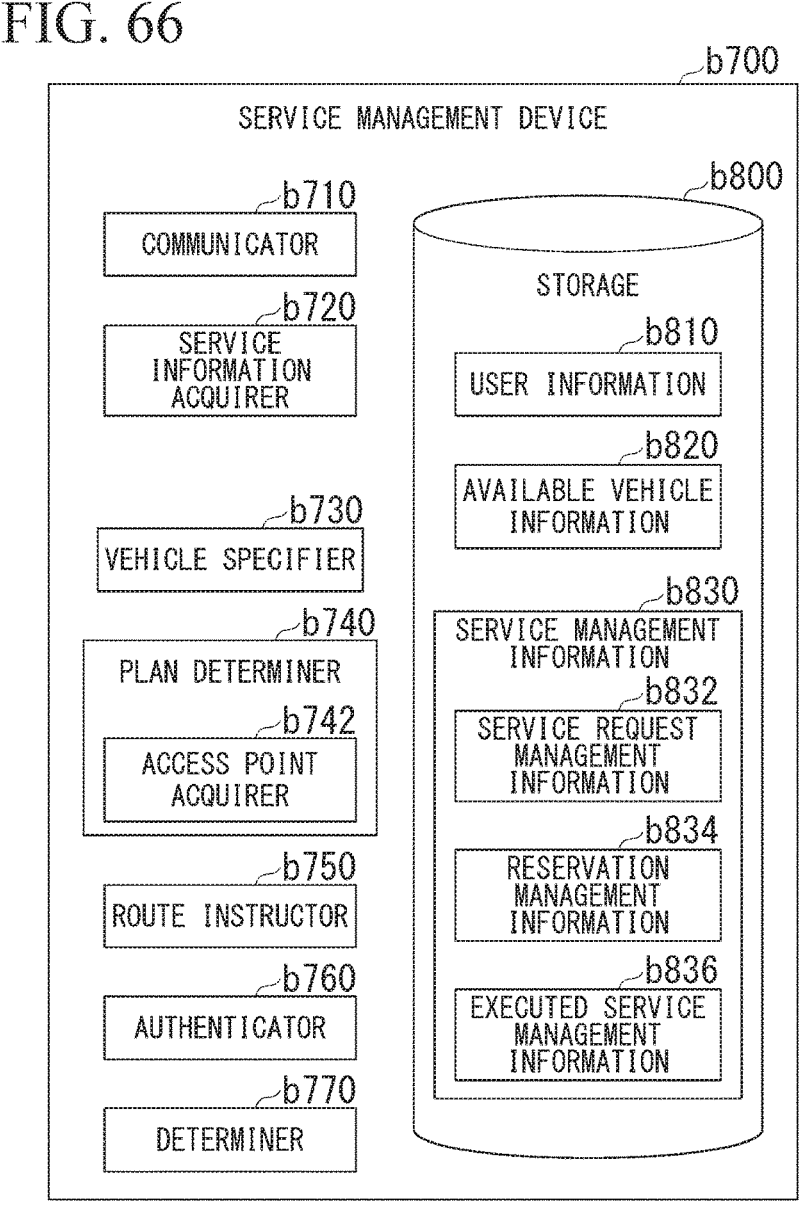
FIG. 66 is a functional configuration diagram of a service management device b700.

FIG. 66 is a functional configuration diagram of the service management device b700. The service management device b700 includes, for example, a communicator b710, a service information acquirer b720, a vehicle specifier b730, a plan determiner b740, a route indicator b750, an authenticator b760, a determiner b770, and a storage 800. The components other than the communicator b710 and the storage 800 are realized, for example, by a hardware processor such as a CPU executing a program (software). Some or all of these components may be realized by hardware (including circuitry) such as an LSI, an ASIC, an FPGA, or a GPU or may be realized by software and hardware in cooperation. The program may be stored in a storage device such as an HDD or a flash memory in advance or may be stored in a detachable storage medium such as a DVD or a CD-ROM and the storage medium may be mounted in a drive device so that the program is installed. The storage 800 is realized by an HDD, a flash memory, a RAM, a ROM, or the like.

The communicator b710 is, for example, a network card for connection to the network NW. The communicator b710 communicates with a communication device of the vehicle allocation manager b170 or the like of the vehicle b100, the service provider device b600, the service management device b700, the vehicle management device b910, or the like via the network NW and a dedicated application programming interface (API) provided by the service management device b700. Information on the user provided by the dedicated API does not include personal information (for example, a name) of the user. For example, identification information of the vehicle b100 may be used as the user ID.

The service information acquirer b720 acquires service information from a communication device of the vehicle allocation manager b170 or the like of the vehicle b100 via the communicator b710. The service information is, for example, service use request information as will be shown below.

[Service Use Request Information]
    User ID
    Position information (latitude, longitude, and altitude)
    Desired use service ID Desired use section information Information on a service usage time period desired by the user Payment authentication information Further, the service information acquirer b720 may acquire the service provision information from the service provider device b600. The service information acquirer b720 acquires point information corresponding to a service provision point, identification information of the service provider, and identification information of a user of a service provider in the service provision information, and outputs the acquired information to the plan determiner b740.

The vehicle specifier b730 specifies an available vehicle b100 on the basis of the service use request information and the vehicle information, and generates available vehicle information 820. Specifically, the vehicle specifier b730 compares desired use space (compartment) information, desired use section information, and service usage time period information included in the service use request information with the position information and a compartment use situation included in the vehicle information and specifies, as the available vehicle b100, a vehicle of which the position information and the compartment use situation satisfy conditions included in the service use request information.

The plan determiner b740 specifies an available service that can be enjoyed by the user on the basis of the available vehicle information 820 and the service provision information, and provides information on the specified available service to the vehicle allocation manager b170 of the vehicle b100 of the user.

More specifically, the plan determiner b740 sets a section in which the service provider occupies at least a part (for example, a compartment) of the vehicle b100 on the basis of the available vehicle information 820 and the service provision information, and sets the desired use section information in the service use request information.

Further, when a plurality of service providers sequentially provide a service to a certain user, the plan determiner b740 may set a section to correspond to each of the plurality of service providers.

The plan determiner b740 includes, for example, an access point acquirer b742. The access point acquirer b742 acquires an access point. The access point is, for example, a position at which the user uses the additional service, or a position at which the user or a person in charge of service provision gets on or off to receive the additional service. The access point acquired by the access point acquirer b742 may be actually measured position information (latitude, longitude, and altitude) or may be estimated position information.

As another function, the plan determiner b740 may update a use section so that the use section ends at the service provision point outside the vehicle, according to an instruction from the user who has used the vehicle b100. In this case, the plan determiner b740 may determine an operation plan according to an instruction from the user who has used the vehicle b100 (or automatically), transmit reservation information to the facility present at the service provision point outside the vehicle using the communicator b710, receive a reservation result using the communicator b710, and transmit the reservation result to the vehicle b100 of the user using the communicator b710.

Further, when the target time of arrival at the facility needs to be changed by the user ordering the additional service, the plan determiner b740 transmits an adjustment of change of the target arrival time to the facility terminal b200 and the pick-up/drop-off management device b400 via the communicator b710. Since a process that is performed by the plan determiner b740 in this case is the same as a process that is performed when the time of arrival according to the status manager b435 of the pick-up/drop-off management device b400 or the time of arrival at the destination is delayed, detailed description of the process will be omitted.

The route indicator b750 causes the communicator b710 to transmit information on a use start position and a use end position of the user and information on a use start position and a use end position of the service provider to the vehicle b100, thereby indicating a route in which the vehicle b100 is to travel, to the vehicle b100.

The authenticator b760 performs user authentication through communication with the vehicle allocation manager b170 or performs authentication at the time of service provision start.

The determiner b770 determines whether or not each of the user and the service provider is using the vehicle b100.

The plan determiner b740 performs various processes using a determination result of the determiner b770. For example, the plan determiner b740 may allow change of a service provision section to be accepted (updated) only when the determiner b770 has determined that both the user and the service provider are using the vehicle b100. This case occurs, for example, when the service provider adds a stopover through proposal to the user or changes a final destination for provision of an additional service on the basis of information provided to the vehicle b100. Further, the plan determiner b740 may allow the vehicle b100 that is being used to be preferentially allocated to the user when the determiner b770 has already determined that the user is using the vehicle b100 (that is, when a request for service extension or another service has been made during the use of the service) at a point in time when the service information acquirer b720 has received the service use request information.

Service management information 830 is stored in the storage 800 in addition to user information 810 on registered users and the available vehicle information 820 described above. The service management information 830 includes, for example, service request management information 832, reservation management information 834, and executed service management information 836. Each piece of the service use request information acquired by the service information acquirer b720 is registered as a record in the service request management information 832. Information such as a reservation use section, a reservation usage time period, a stopover, and a scheduled stopover arrival time is stored for each service in the reservation management information 834. The service status information or information such as a service attribute and a service provider ID (service provider identification information) is registered in the executed service management information 836. The service attribute is, for example, information for classifying services that can be provided by the service provider when viewed from the user receiving information from the service provider, and the service management device b700, and is, for example, a value indicating a business category (food, retail, and the like) of the service provider, a rank of a cost category, or the like.

The service status information held in the executed service management information 836 is updated, for example, at a timing at which the authenticator b760 performs an authentication process for start of the service. The service management device b700 can manage the service management information 830 to comprehensively manage a status of the user of the vehicle b100 (for example, user information acquired by the input and output b171) and a status for an operation plan of the vehicle b100. Further, the determiner b770 may use, as a determination result, a status attribute determined from use information of the user and operation information of the vehicle b100 (for example, information such as abandonment of enjoyment of the additional service due to the user prioritizing an arrival time), from the service status information.

Further, the status attribute determined from the use information of the user and the operation information of the vehicle b100 includes a value indicating, for example, an attribute (for example, rainy weather, a traffic jam, traffic regulation, low state of charge (low SoC), failure, or accident) of a surrounding environment and a driving status that is determined on the basis of sensing data of the vehicle b100, in addition to a degree of arrival (for example, earlier than scheduled, on-time, and later than scheduled) that is determined on the basis of progress with respect to the operation plan including the additional service.

[Vehicle Management Device]

Figure 67:
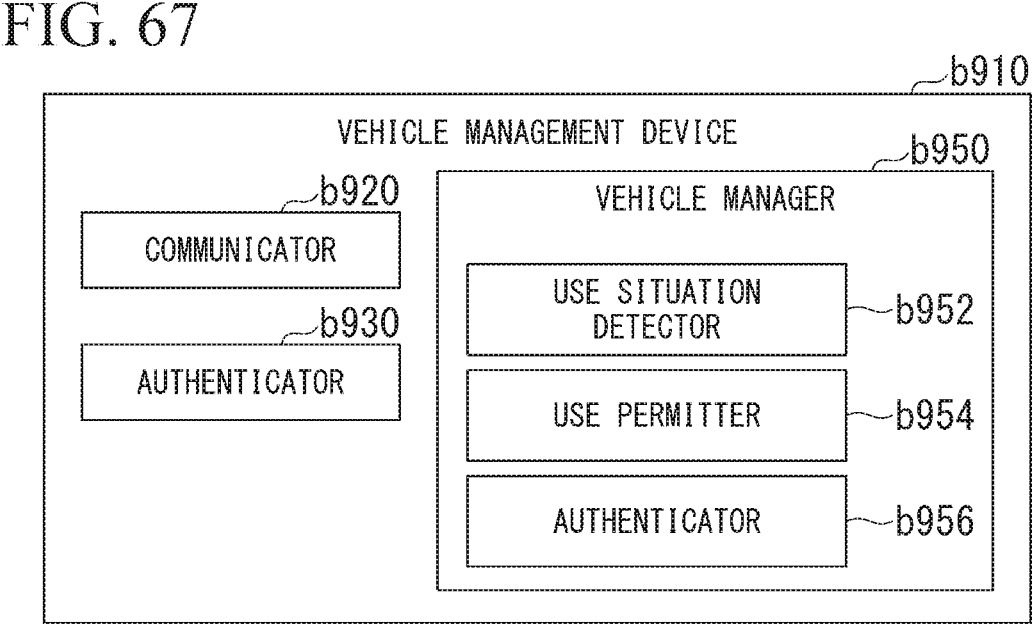
FIG. 67 is a functional configuration diagram of a vehicle management device b910 mounted on the vehicle b100.

FIG. 67 is a functional configuration diagram of the vehicle management device b910 mounted in the vehicle b100. The vehicle management device b910 includes, for example, a communicator b920, an authenticator b930, and a vehicle manager b950.

The communicator b920 is a wireless communication device. The communicator 9b20 communicates with the service management device b700 via the network NW. The authenticator b930 performs an authentication process for service start according to an instruction from the service management device b700.

The vehicle manager b950 includes, for example, a use situation detector b952, a use permitter b954, and an authenticator b956. One or more spaces (compartments) that can be used by the user are provided in the vehicle b100, and the use situation detector b952 detects a use situation of each compartment. For example, the use situation detector b952 detects whether or not each compartment is being used. The vehicle b100 is not limited to a normal passenger car, and may be a vehicle having a size allowing one or more occupants to get in respective compartments dividing a vehicle cabin, such as a trailer, a bus, and a microbus. For example, when the authentication of the authenticator b956 has been successful, the use permitter b954 permits use of a compartment designated in advance and performs, for example, unlocking a door. The authenticator b956 performs authentication such as identification of the service provider who has got on the vehicle.

The vehicle management device b910 transmits, for example, vehicle information including the following content to the service management device b700.

[Vehicle Information]
Vehicle ID
Position information (latitude, altitude, and longitude)
Compartment use situation
Traveling status (speed, acceleration, angular velocity, status of vehicle device, and the like)
Service provider information (ID of service provider, information on service that is being executed, elapsed service performance time, and the like)

Figure 68:
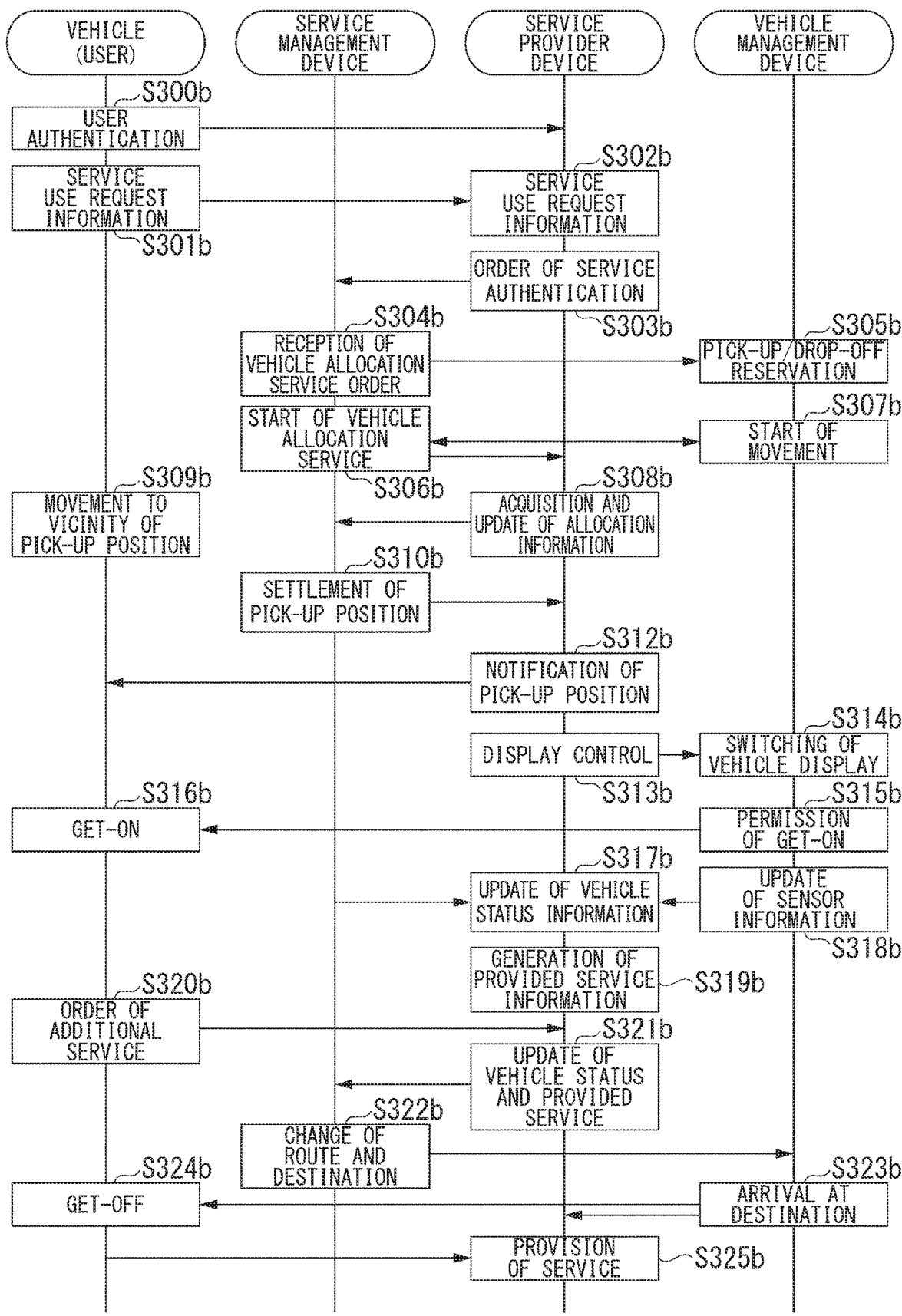
FIG. 68 is a flowchart showing an example of a flow of a process to be executed in a vehicle dispatch system b1A.

FIG. 68 is a flowchart showing an example of a flow of a process that is executed in the vehicle allocation system b1A. In the following example, the flow of the process will be described using an example in which the additional service is ordered by the service provider during get-on, and the user gets off at a destination (an additional service providing position) different from an original destination set by the user.

First, the user performs user authentication on the input and output b171 of the vehicle b100 with respect to the authenticator b760 of the service management device b700 (step S300b). Then, the user transmits service use request information to the service provider device b600 (step S301b). The service provider device b600 interprets the received service use request information (step S302b), and transmits reservation information to the service management device b700 on the basis of the interpreted service use request information (step S303b).

The service management device b700 performs a process of receiving an order for a vehicle allocation service on the basis of the reservation information transmitted by the service provider device b600 and transmits order reception information to the vehicle management device b910 (step S304b). The vehicle management device b910 causes the pick-up/drop-off management device b400 to generate a pick-up/drop-off reservation on the basis of the received order reception information (step S305b).

The service management device b700 starts the vehicle allocation service for the user on the basis of the order reception information (step S306b), and transmits an indication that the service has been started to the service provider device b600 and the vehicle management device b910. The vehicle management device b910 recognizes the start of service and notifies the vehicle b100 or the like of the start of service using a dedicated API (step S307b).

The service provider device b600 starts acquisition and update of the vehicle allocation information of the vehicle b100 (step S308b). The vehicle b100 starts movement to the vicinity of the pick-up position (step S309b). The service management device b700 settles the pick-up position and transmits the pick-up position to the service provider device b600 (step S310b). The service provider device b600 notifies the vehicle b100 of the pick-up position (step S312b), and transmits a display control instruction to the input and output b171 via the vehicle management device b910 (step S313b). The vehicle management device b910 switches a vehicle display to the input and output 171b (step S314b).

The vehicle management device b910 permits the user to get on the vehicle b100 at the pick-up position (step S315b), and the user gets on the vehicle b100 (step S316b). The service provider device b600 updates the vehicle status information (step S317b), and the vehicle management device b910 updates sensor information (step S318b).

The service provider device b600 generates information on additional services that can be provided and outputs the information to the input and output b171 or the like (step S319b). The user selects and orders the additional service (step S320b). The service provider device b600 updates the vehicle status and the service use request information on the additional service to be provided, and transmits updated content to the service management device b700 (step S321b).

The service management device b700 performs a process according to a change in the route and the destination with the provision of the additional service, and transmits a processing result to the vehicle management device b910 (step S322b).

The vehicle management device b910 notifies the service provider device b600 that the vehicle has arrived at the destination (step S323b). The user gets off the vehicle b100 (step S324b). The service provider device b600 starts providing the additional service to the user (step S325b). Then, the process of this flowchart ends.

For example, the status manager b435 may transmit information for accepting change of the vehicle allocation together with information for confirming the vehicle allocation cancellation to the user terminal b300 using the communication device b410. The user may notify the pick-up/drop-off management device b400 of, for example, an instruction of change of the pick-up position with respect to the user terminal b300. The status manager b435 of the pick-up/drop-off management device b400 may notify the vehicle b100 of the changed pick-up position to instruct route changing or transmit change content to the user terminal b300.

Further, a configuration of all or a part of the pick-up/drop-off management device b400 may be mounted in the vehicle b100. Accordingly, for example, the user can directly request the vehicle b100 to perform pick-up/drop-off using the user terminal b300. Further, when the vehicle b100 receiving the request cannot perform the pick-up/drop-off, the vehicle b100 may transfer a pick-up/drop-off request to another vehicle b100.

Further, when the pick-up/drop-off management device b400 has received the time of arrival at the pick-up position or the time of arrival at the destination designated by the user using the user terminal b300, the pick-up/drop-off management device b400 may create the pick-up/drop-off schedule on the basis of these pieces of information and the facility reservation information.

Further, the user terminal b300 may periodically transmit information indicating a position of the user measured by the GNSS receiver b360 to the pick-up/drop-off management device b400. The pick-up/drop-off management device b400 may track a current position of the user and a current position of the vehicle b100 on the basis of the received information to set the pick-up position as a merging position of the user and the vehicle b100 or change the set pick-up position to the merging position of the user and the vehicle b100. Further, the vehicle b100 may set the merging position of the user and the vehicle b100 as the pick-up position on the basis of position information of the user received from the pick-up/drop-off management device b400 and position information of the host vehicle, and set a route of the host vehicle.

Further, the user terminal b300 can accept a vehicle allocation cancellation instruction through various operations. For example, the user terminal b300 receives information for confirming vehicle allocation cancellation, and notifies the user of the information using the output b330. Thereafter, the user terminal b300 may accept an extension instruction, a vehicle allocation cancellation instruction, or the like from the user using the input b320. When no instruction is input using the input b320 within a certain period of time, the user terminal b300 may accept both a facility reservation and a vehicle allocation reservation.

Further, when vehicle allocation for a return route is also reserved, the user may reserve the time of arrival at the pick-up position in advance and request the pick-up/drop-off management device b400 to perform pick-up using the user terminal b300 when leaving the facility.

Further, when there is a user for which the pick-up/drop-off schedule is similar before the vehicle allocation timing, the pick-up/drop-off management device b400 may reconstitute a pick-up/drop-off schedule in which users in a different group are caused to get on together using the same vehicle, and allocate the vehicle b100. For example, there is a case in which a user who has arrived at the same airport on the same flight is picked up/dropped off at the same hotel, or a case in which the user is picked up/dropped off from the same hotel to another nearby restaurant. The facility side can curb a cost of the vehicle allocation by realizing carpool with the vehicle b100 in this way. In this case, the facility side may provide an incentive to the user.

Further, the service management device b700 may manage the vehicle allocation reservation instead of the pick-up/drop-off management device b400, or both the pick-up/drop-off management device b400 and the service management device b700 may manage the vehicle allocation reservation.

Fourth Embodiment

Next, a fourth embodiment will be described. The fourth embodiment is an embodiment of a vehicle system to which the vehicle shown in the first embodiment can be applied. Also, an automated driving vehicle according to the fourth embodiment is, for example, a vehicle that basically does not require a driving operation. The vehicle system provides a guidance service for guiding a user to a store selected by a user using an automated driving vehicle. Hereinafter, description will be made using an example in which a store related to guidance of the automated driving vehicle is a store that provides food. In the automated driving vehicle, products and dishes provided by a store for which guidance is provided and some of their materials are prepared as food samples. The user can try a food sample before the store is selected. Provision includes serving meals at restaurants, selling products at souvenir stores, and the like.

Figure 69:
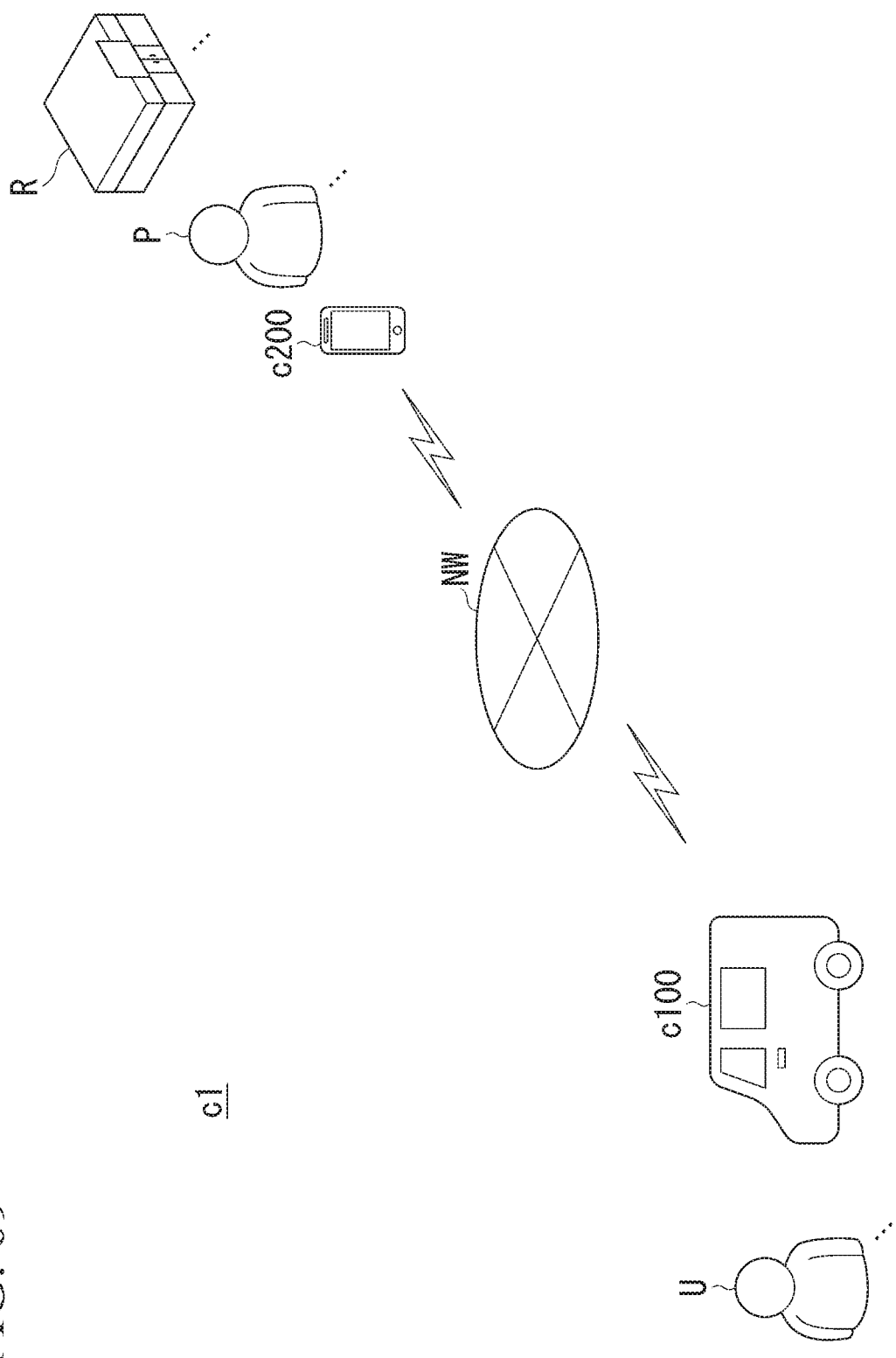
FIG. 69 is a configuration diagram of a vehicle system c1.

FIG. 69 is a block diagram of a vehicle system c1. The vehicle system c1 includes one or more automated driving vehicles c100 and one or more terminal devices c200 used by one or more product providers P. These components can communicate with each other via a network NW. The network NW includes the Internet, a WAN, a LAN, a public circuit, a provider device, a dedicated circuit, a wireless base station and the like.

The automated driving vehicle c100 is, for example, a vehicle having four or more wheels into which a plurality of users U can get, but may be a motorcycle or other vehicles. The automated driving vehicle c100 loads food samples, moves between sales promotion points such as a point in front of a station and a sightseeing spot, and takes the user U to a store R that provides food samples according to automated driving.

The terminal device c200 is, for example, a smartphone, a tablet terminal, a personal computer, or the like.

Figure 70:
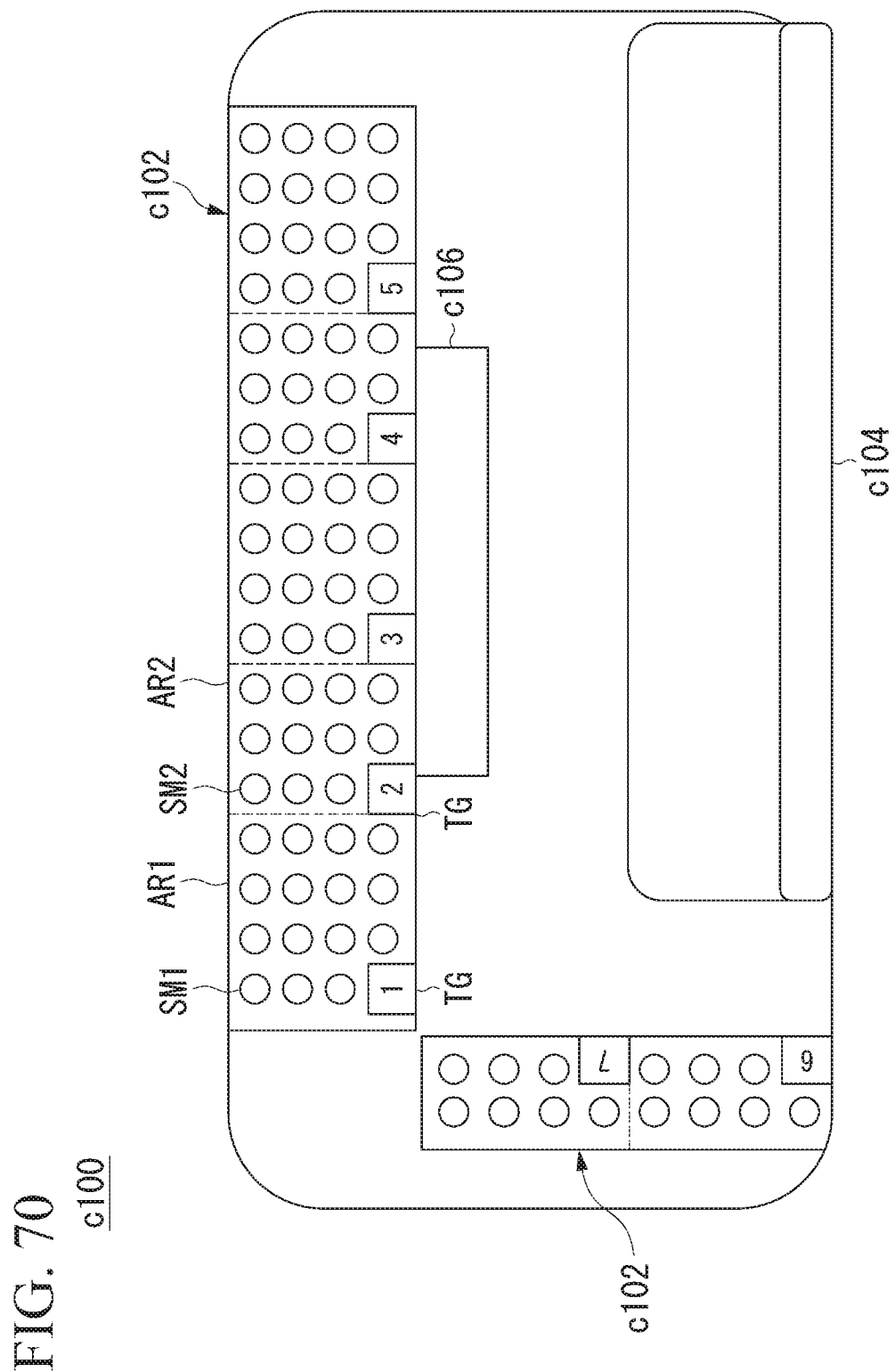
FIG. 70 is a diagram showing a configuration inside an automated driving vehicle c100.

FIG. 70 is a diagram showing an internal configuration of the automated driving vehicle c100. FIG. 70 is a diagram of the automated driving vehicle c100 viewed from above. A rack part c102, a seat c104, and a touch panel c106 are provided inside the automated driving vehicle c100.

The rack part c102 which forms a part of a compartment of the vehicle itself includes a plurality of compartments of the vehicle and has a placement surface on which a plurality of food samples SM1, SM2, and the like can be placed. For example, the placement surface of the rack part c102 has placement spaces (areas) AR1, AR2, and the like as vehicle compartments for each type of food sample or each store. The areas AR1, AR2, and the like shown in FIG. 70 are placement spaces assigned to stores R1, R2, and the like and the food samples SM1, SM2, and the like are placed therein. For example, sample numbers 1, 2, and the like are allocated to the areas AR1, AR2, and the like and tags TG on which the allocated sample numbers are described are attached thereto. Also, the types and number of food samples placed in each area can be arbitrarily determined by the store and a plurality of types of food samples may be placed therein. Also, the rack part c102 may be equipped with a refrigeration function or a heat retaining function on the placement surface. Also, although a case in which one section on the automated driving vehicle c100 is a compartment of the automated driving vehicle c100 will be described hereinafter, a plurality of sections including two or more sections (for example, placement spaces) may be handled as a compartment. That is, as long as the compartments can be distinguished from each other, an inclusion relationship and independence of each compartment may be appropriately determined in accordance with a purpose, a manager of each compartment, and the like.

Figure 71:
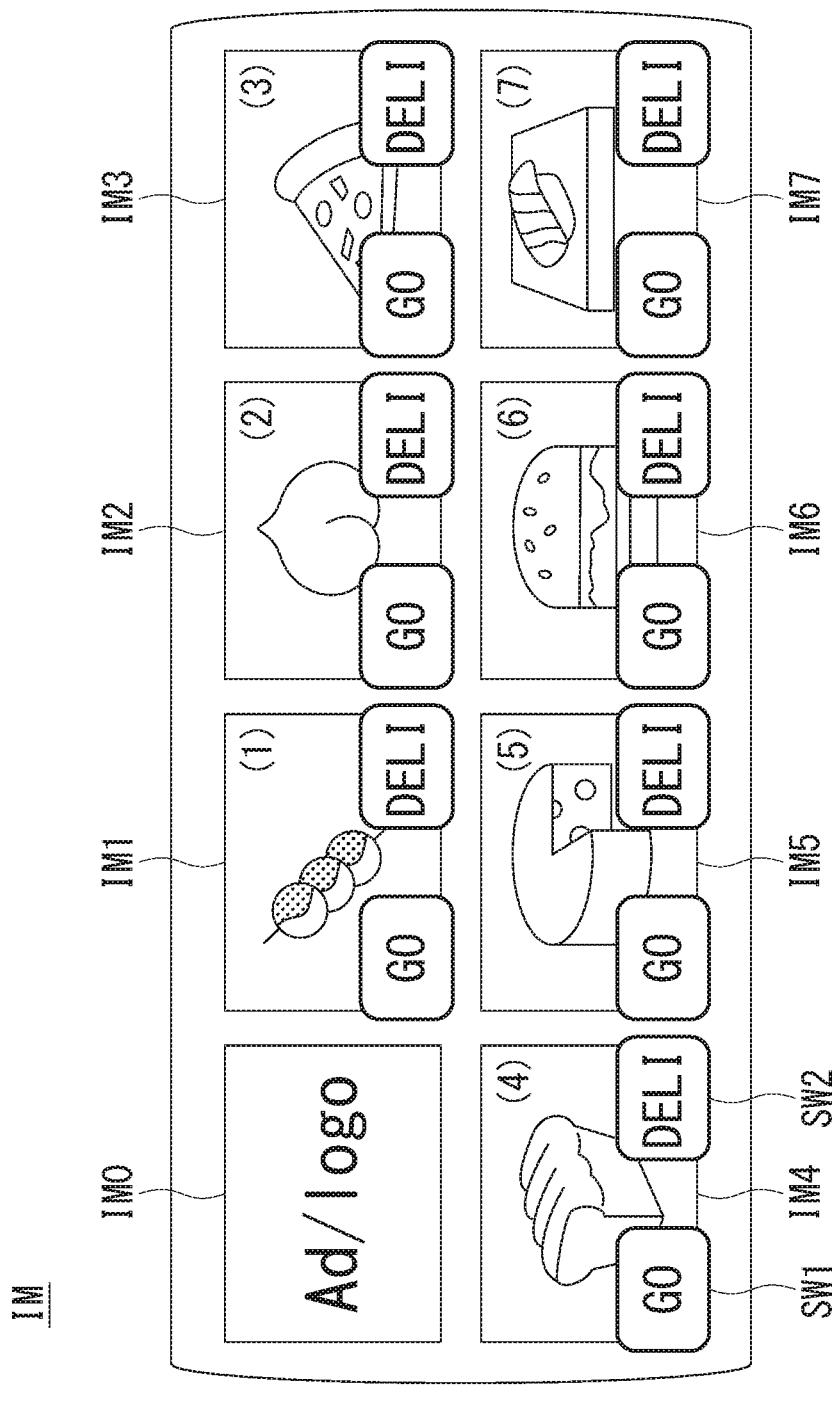
FIG. 71 is a diagram showing an example of a store screen IM.

The touch panel c106 is, for example, a touch panel display device. A store screen IM including store information is displayed on the touch panel c106 in association with the food sample placed on rack portion c102. FIG. 71 is a diagram showing an example of the store screen IM. The store information includes images and illustrations of food samples of each store, illustrations representing a name of each store and food provided at each store, advertisements at each store, and the like. The screen IM displays a switching image IM0 for receiving an image switching instruction and a plurality of store screens IM1, IM2, and the like corresponding to the plurality of stores R1, R2, and the like. For example, corresponding sample numbers 1, 2, and the like are displayed in some of the store screens IM1, IM2, and the like. The store screens IM1, IM2, and the like may display all store information at the same time, or may switch screens automatically or in response to an operation from the user on the touch panel c106. For example, the store screens IM1, IM2, and the like display an illustration of a food sample in an initial state and are switched to advertisements of respective stores when a touch operation on the switching image IM0 has been received. The touch panel c106 is an example of an "operator".

Also, a GO switch SW1 and a DELI switch SW2 are provided in some of or near the respective store screens IM1, IM2, and the like. The GO switch SW1 is a switch for issuing an instruction for movement to a corresponding store. The DELI switch SW2 is a switch for instructing the corresponding store to deliver food. Each switch of the GO switch SW1, the DELI switch SW2, and the like is another example of the "operator". Also, the store IM1 associated with the GO switch SW1 is an example of a "point to be visited". A process of causing the corresponding store to deliver food is an example of "delivery details".

Figure 72:
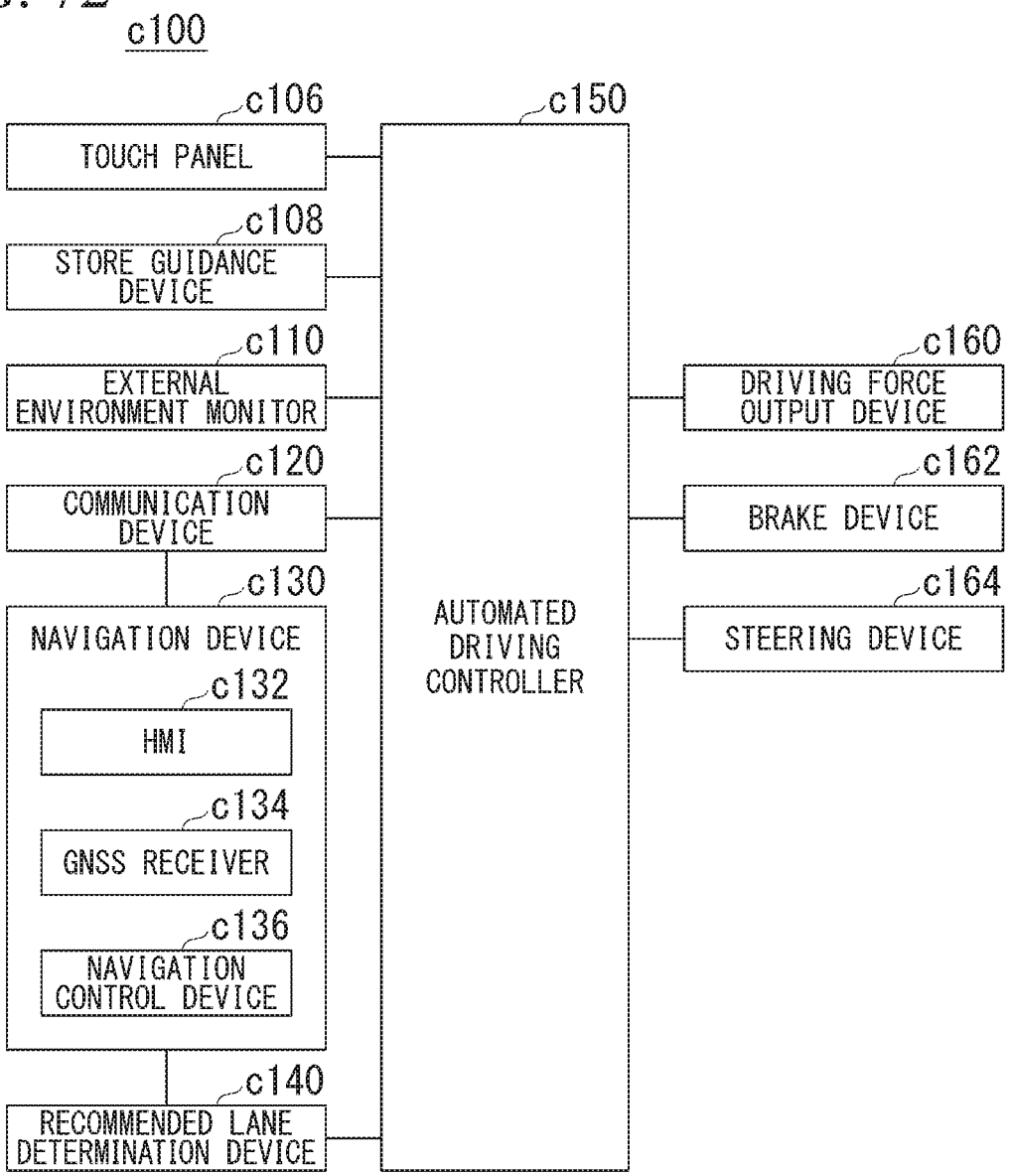
FIG. 72 is a functional configuration diagram of the automated driving vehicle c100.

Next, a functional configuration of the automated driving vehicle c100 will be described with reference to FIG. 72. FIG. 72 is a functional configuration diagram of the automated driving vehicle c100. For example, the automated driving vehicle c100 includes a store guidance device c108, an external environment monitor c110, a communication device c120, a navigation device c130, a recommended lane determination device c140, and an automated driving controller c150, a driving force output device c160, a brake device c162, and a steering device c164 in addition to the touch panel c106 described above. Because the external environment monitor c110, the communication device c120, the navigation device c130, the recommended lane determination device c140, the automated driving controller c150, the driving force output device c160, the brake device c162, and the steering device c164 have configurations similar to those of the external environment monitor a210, the communication device a220, the navigation device a230, the recommended lane determination device a240, the automated driving controller a250, the driving force output device a260, the brake device a262, and the steering device a264 of FIG. 26 introduced into the above-described second embodiment, detailed description thereof will be omitted here. Also, in the navigation device c130, the destination may be set by the store guidance device c108. The navigation device c130 and the recommended lane determination device c140 are examples of a "route setter". Also, FIG. 3 and associated information introduced into the first embodiment are adopted in a process of processing automated driving in the fourth embodiment and detailed description thereof will be omitted.

The store guidance device c108 includes one or more processors such as a CPU and an MPU and various types of storage devices. The store guidance device c108 may be implemented by a part of the automated driving controller c150. The store guidance device c108 instructs the navigation device c130 to provide guidance for the store specified by the user U on the basis of the operation of the user U on the touch panel c106. Also, the store guidance device c108 may transmit information indicating the instruction details from the user U to the terminal device c200 using the communication device c120 on the basis of an operation of the user U on the touch panel c106. The store guidance device c108 may include the touch panel c106.

Also, in the navigation device c130, the destination may be set by the store guidance device c108. The navigation device c130 and the recommended lane determination device c140 are examples of a "route setter".

Figure 73:
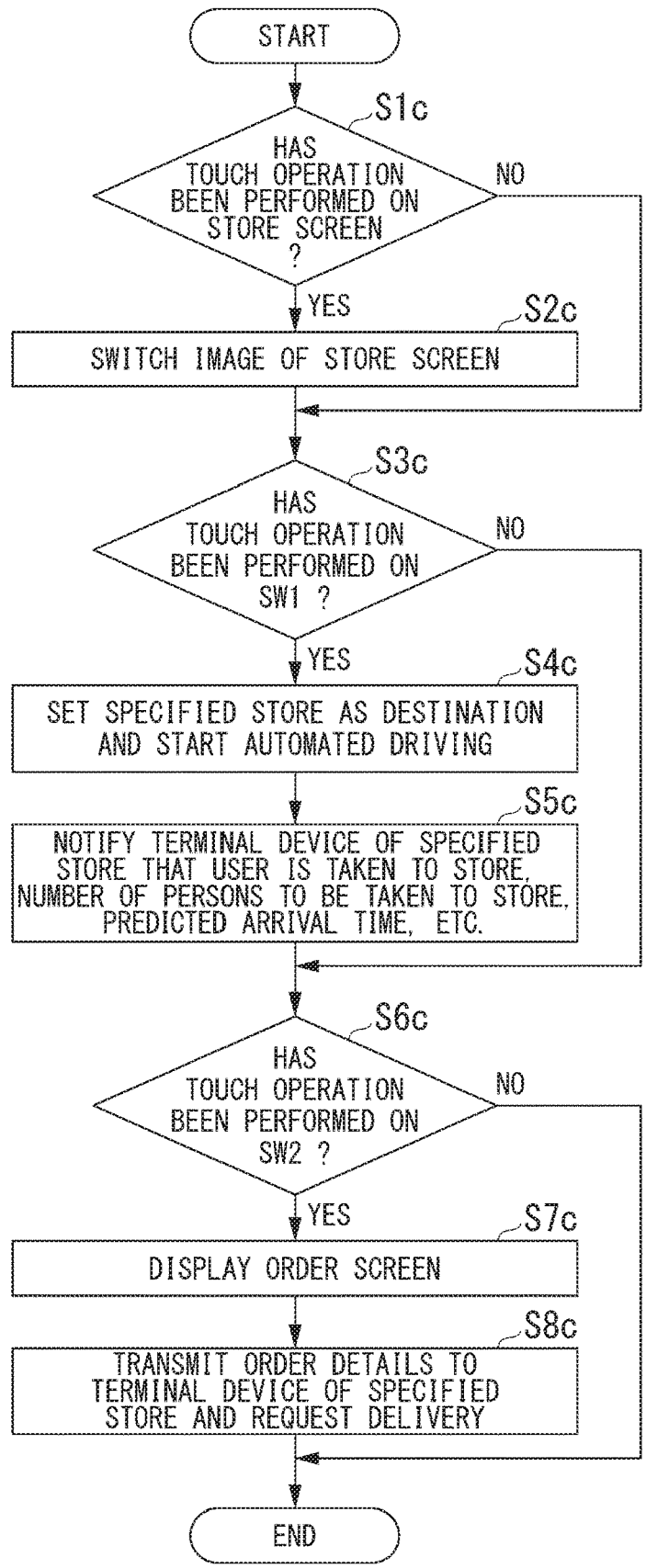
FIG. 73 is a flowchart showing an example of a processing operation in the automated driving vehicle c100.

Next, an example of a processing operation in the automated driving vehicle c100 will be described with reference to FIG. 73. FIG. 73 is a flowchart showing the example of the processing operation in the automated driving vehicle c100. The present process is an example when the user U has performed an operation on the store screen IM2.

For example, when a touch operation from the user U on the store screen IM2 displayed on the touch panel c106 is received (step S1c), the store guidance device c108 switches the screen of the store screen IM2 on which the touch operation has been performed (step S2c). For example, after a food sample is tried, the user U can look at information about the store corresponding to the store screen IM2 displayed on the touch panel c106 and consider whether or not to go to the store.

Next, for example, it is assumed that the store guidance device c108 has performed a touch operation on the GO switch SW1 of the store R2 in the touch panel c106 (step S3c). Thereby, the store guidance device c108 causes the touch panel c106 to display an input screen for receiving an input of information about store guidance on the basis of identification information (for example, a store ID of the store R2) associated with the GO switch SW1. The information about the store guidance includes the number of persons who will go to the store, a desired closing time, and the like. When the information about the store guidance has been input, the store guidance device c108 sets the specified store R2 as the destination and instructs the navigation device c130 to start the automated driving (step S4c). The navigation device c130 derives a predicted time of arrival at the store R2, outputs a derivation result to the store guidance device c108, and outputs information of a route to the store R2 to the recommended lane determination device c140. Also, the store guidance device c108 transmits the input information about the store guidance, the predicted arrival time derived by the navigation device c130, and the like to the terminal device c200 of the specified store R2 using the communication device c120 (step S5c).

Next, for example, it is assumed that the store guidance device c108 has received a touch operation on the DELI switch SW2 of the store R2 in the touch panel c106 (step S6c). Thereby, the store guidance device c108 causes the touch panel c106 to display the order screen of the store R2 (step Sc7). The order screen displays menu items that can be delivered, their prices, and the like, and includes a button for issuing an order instruction for a specified menu item, a button for specifying the number of orders, an input field for specifying a reception location and a reception time, and the like. The store guidance device c108 transmits information input using the order screen (hereinafter referred to as order information) to the terminal device c200 of the specified store R2 using the communication device c120 (step S8c). Thereby, the process of the present flowchart ends.

Figure 74:
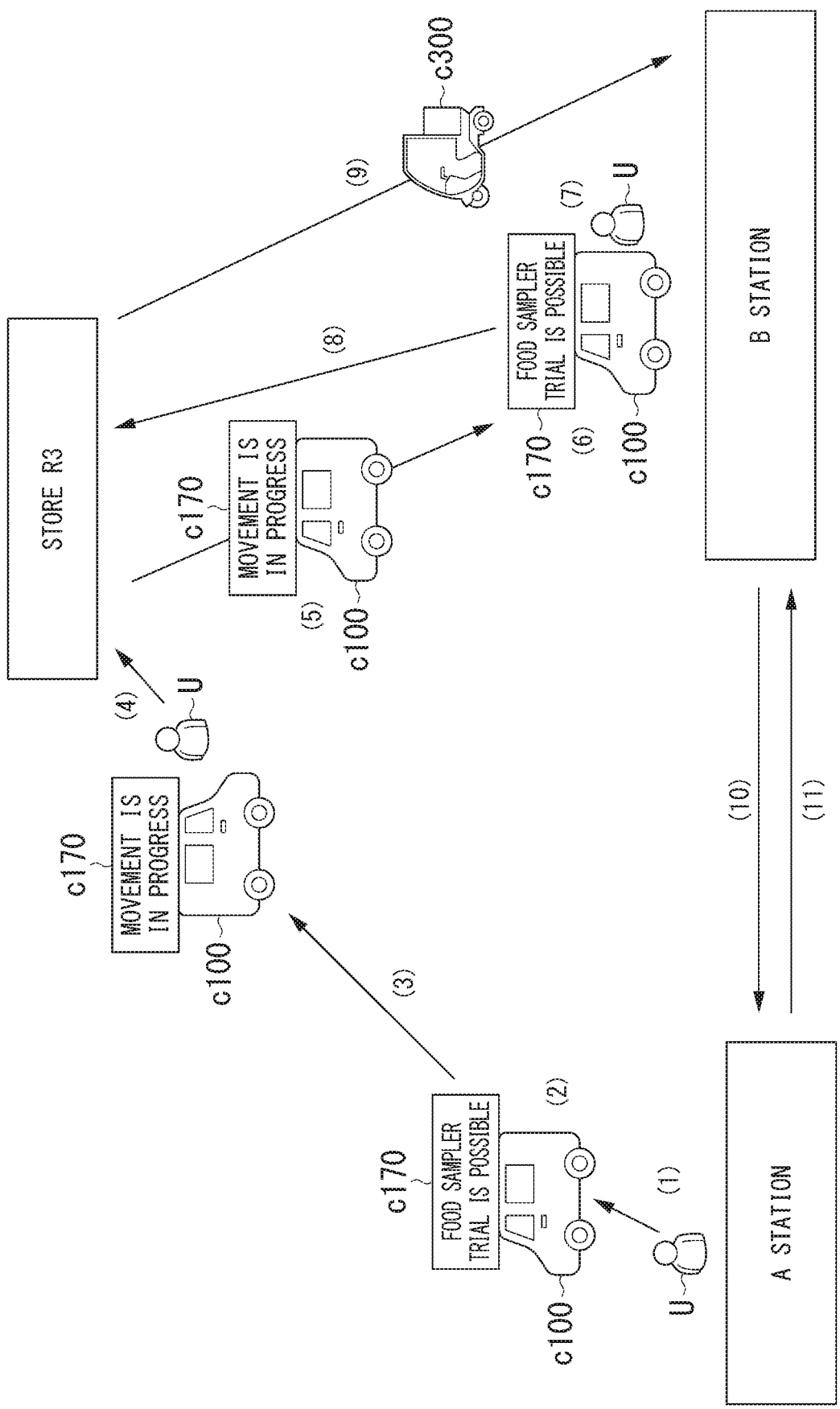
FIG. 74 is a diagram showing an example of a usage form of the automated driving vehicle c100.

Next, a usage form of the automated driving vehicle c100 will be described with reference to FIG. 74. FIG. 74 is a diagram showing an example of a usage form of the automated driving vehicle c100. In front of station A, the automated driving vehicle c100 is waiting. The waiting refers to a state in which a food sample can be tried within the vehicle and can be picked up or delivered from the store where the food sample is provided within the vehicle. During waiting, a digital signage c170 attached to the outside of the automated driving vehicle c100 displays that food samples can be tried within the vehicle. Also, the digital signage is electronic display equipment such as a display or electronic display equipment including a speaker.

(1) The user U coming out of the A station gets into the automated driving vehicle c100 during waiting. (2) The user U touches the GO switch SW1 corresponding to the store R3 to be visited after trying the food sample within the automated driving vehicle c100. (3) Thereby, the automated driving vehicle c100 automatically drives to the store R3 and drops off the user U at the store R3. Here, the digital signage c170 indicates that movement is in progress. (4) The user U gets out of the automated driving vehicle c100 and enters the store R3.

(5) Thereafter, the automated driving vehicle c100 may drop off the user U at the B station after waiting for the user U in front of the store R3 until the end of eating or shopping at the store R3, may move to the B station without waiting for the user U, or may drop off another user U getting out of the store R at the B station. The B station is, for example, a station closest to the store R3, a station adjacent to the A station, or the like. Also, the automated driving vehicle c100 may wait for a certain period of time in front of the store R3. (6) Then, the automated driving vehicle c100 waits for a certain period of time at the B station. During the waiting period, the digital signage c170 indicates that the food sample can be tried within the vehicle. (7) After the user U coming out of the B station gets into the automated driving vehicle c100 in the waiting state and tries the food sample within the automated driving vehicle c100, the user U performs the touch operation on the DELI switch SW2 corresponding to the store R3 to which a delivery request is desired to be sent. (8) Thereby, the automated driving vehicle c100 transmits order information to the terminal device c200 of the store R3. (9) Then, the store R3 delivers a product to the user U with the motorcycle c300 for delivery at the store.

On the other hand, (10) when the user U getting into the vehicle does not appear even when a certain period of time has elapsed after the automated driving vehicle c100 was parked in front of the B station, the automated driving vehicle c100 moves to the A station and waits.

(11) Furthermore, when the user U getting into the vehicle does not appear even when a certain period of time has elapsed after the vehicle was parked in front of the A station, the automated driving vehicle c100 moves to the B station and waits.

According to such a usage form, because the user U can go to the store R that provides the food sample after trial, even when he/she is visiting a country that is not well known for travel or work, he/she can go to a store such as his/her favorite souvenir store or restaurant. Also, because the automated driving vehicle c100 drops off the user U at the store R, it is possible to particularly improve convenience for the user when the souvenir store or restaurant to which the user wants to go is in a place where transportation is not convenient or a route is not well understood.

Also, the use of the user can be promoted by the automated driving vehicle c100 moving between a plurality of sales promotion points. When the automated driving vehicle c100 moves between a plurality of sales promotion points, the digital signage c170 may be used to display a guidance service provided by the automated driving vehicle c100 or a sound/moving image, a still image, or the like for providing a notification of a delivery service. Thereby, it is possible to provide broad notification to users who are not aware of the provided service.

According to the fourth embodiment described above, the automated driving controller c150 for automatically driving the vehicle, the rack part c102 on which the food sample can be placed, and the first switch for an instruction for movement to the store (the GO switch SW1) are provided. It is possible to improve convenience when the user U moves to a store which provides food by moving the vehicle to the store specified by the automated driving controller c150 if the first switch has been operated.

Also, a second switch (the DELI switch SW2) for issuing a delivery instruction to a store of a food sample provider and a communication device c120 for transmitting delivery details to the terminal device managed by the store when the second switch has been operated are further provided, so that it is possible to further improve the convenience for the user U.

First Modified Example of Fourth Embodiment

Figure 75:
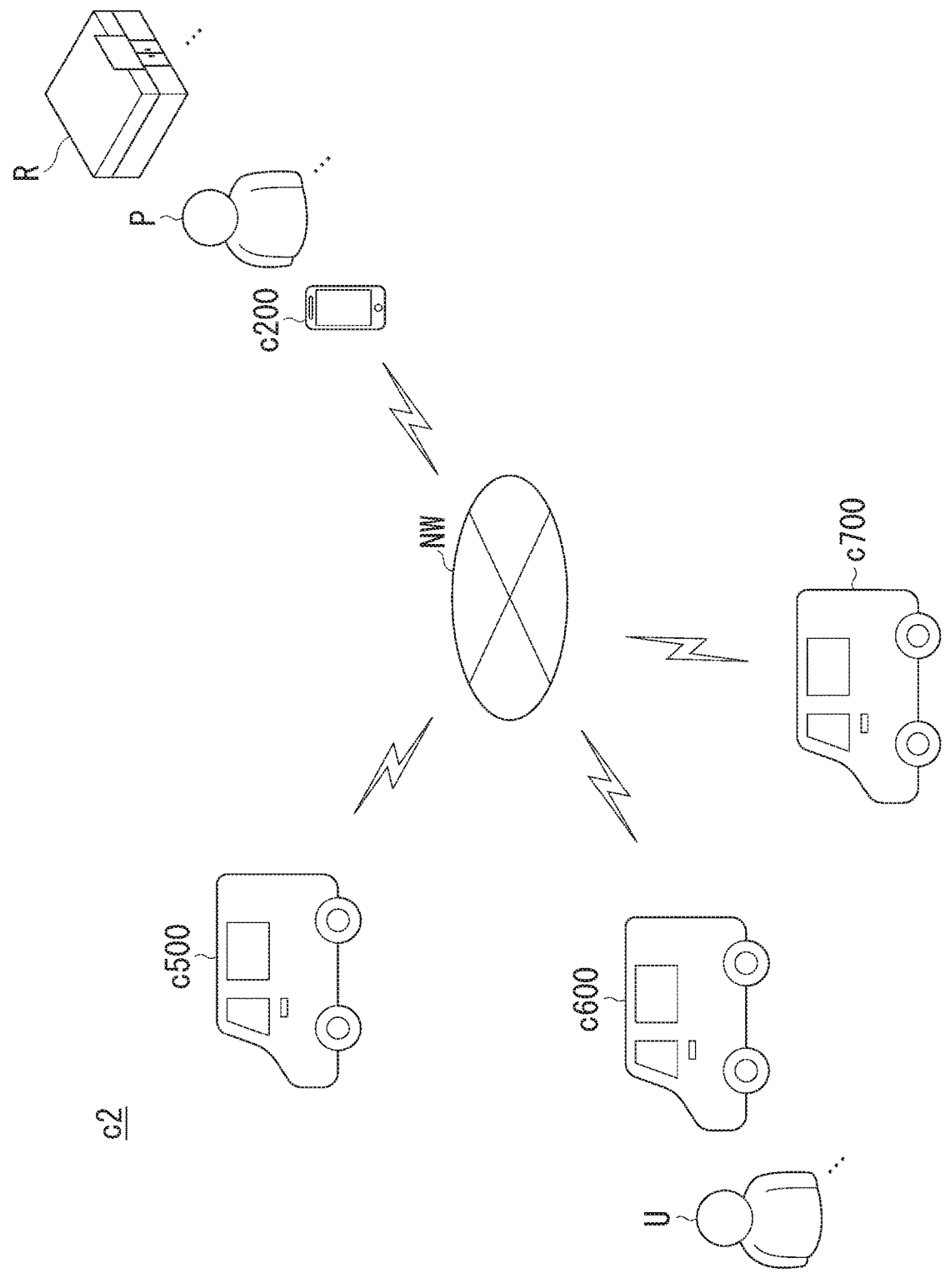
FIG. 75 is a configuration diagram of a vehicle system c2 according to a first modified example of a fourth embodiment.

Next, a first modified example of the fourth embodiment will be described. FIG. 75 is a configuration diagram of a vehicle system c2 according to a first modified example of the fourth embodiment. The vehicle system c2 includes one or more first vehicles c500, one or more second vehicles c600 and c700, and one or more terminal devices c200 used by one or more product providers P. These components can communicate with each other via the network NW. The first vehicle c500 has a configuration similar to that of the automated driving vehicle c100. The second vehicles c600 and c700 are configured to have a seat in which the user U can sit, except for the rack portion c102, the touch panel c106, and the store guidance device c108 from the automated driving vehicle c100.

The first vehicle c500 is loaded with food samples and moves between sales promotion points such as points in front of stations and sightseeing spots. The user U can get into the first vehicle c500, try the food sample, and operate the touch panel c106, the GO switch SW1, and the DELI switch SW2 to send a guidance or delivery request to the store R. When guidance from the user U to the store R has been requested, the second vehicle c600 or c700 takes over the user U from the first vehicle c500, allows the user U to get into the second vehicle c600 or c700, and moves the user U to the store R according to automated driving. The DELI switch SW2 is an example of a "fourth switch".

The store guidance device c108 of the first vehicle c500 may receive current position information sequentially transmitted from the plurality of second vehicles c600, c700, and the like using the communication device c120 and store the current position information in the storage device. The first vehicle c500 may determine a vehicle that takes the user U to the specified store R as an optimum second vehicle from among the plurality of second vehicles c600, c700, and the like with reference to the storage device. For example, the optimum second vehicle is a second vehicle by which the user is not being picked up and includes a second vehicle closest to the first vehicle c500, a second vehicle which arrives at a position of the first vehicle c500 at the earliest time, or the like among vehicles into which a specified number of users U can get.

Figure 76:
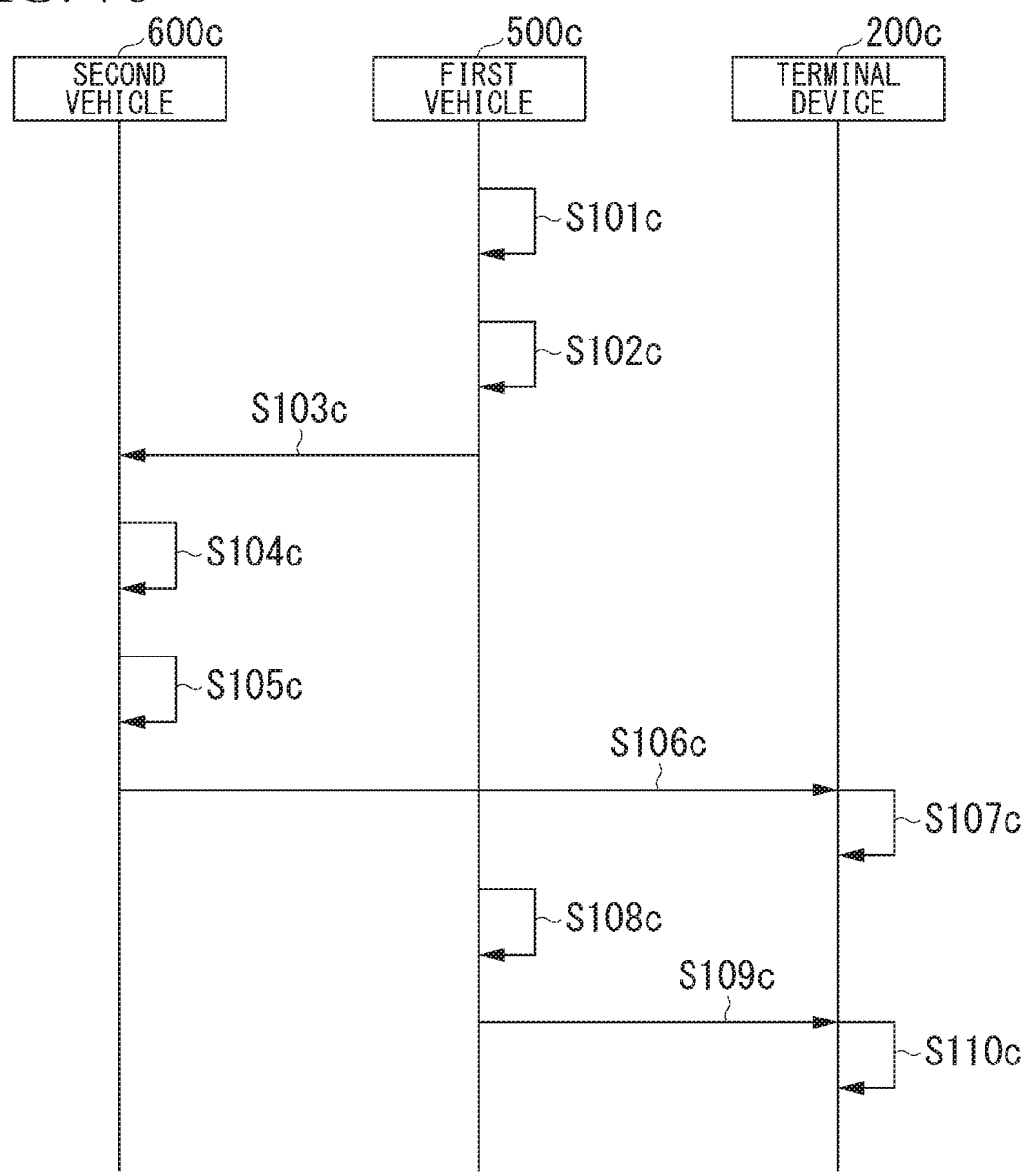
FIG. 76 is a sequence diagram showing an example of a processing method of the vehicle system c2.

Next, an example of a processing method of the vehicle system c2 will be described with reference to FIG. 76. FIG. 76 is a sequence diagram showing an example of the processing method of the vehicle system c2.

For example, it is assumed that the first vehicle c500 has received a touch operation on the GO switch SW1 of the store R3 on the touch panel c106 (step S101c). Thereby, the store guidance device c108 causes the touch panel c106 to display an input screen for receiving an input of information about the store guidance. Also, the store guidance device c108 searches for the optimum second vehicle from the plurality of second vehicles c600 and c700 with reference to its own storage device (step S102c). Then, the store guidance device 108 transmits information indicating the position of the first vehicle c500 to the optimum second vehicle (for example, the second vehicle c600) obtained by the search and requests the optimum second vehicle to drop off a user U at the specified store R3 (step S103c).

The second vehicle c600 receiving a pick-up/drop-off request from the first vehicle c500 moves to a place where the first vehicle c500 is parked to pick up the user U. For example, when the optimal second vehicle c600 obtained by the search is not near the first vehicle c500 (for example, a surrounding range of 5 m), the navigation device c130 of the second vehicle c600 sets a route for movement to the vicinity of the first vehicle c500 on the basis of information indicating the position of the first vehicle c500 (step S104c). The automated driving controller c150 causes the second vehicle c600 to be automatically driven on the basis of the set route. Then, after the second vehicle c600 is stopped near the first vehicle c500, the navigation device c130 of the second vehicle c600 sets the store R3 as the destination of the second vehicle c600 on the basis of a request from the first vehicle c500 (step S105c). The automated driving controller c150 of the second vehicle c600 causes the second vehicle c600 to be automatically driven and causes the second vehicle c600 to be moved to the store R3 after the user U gets into the second vehicle c600.

The navigation device c130 of the second vehicle c600 transmits information indicating the number of users U for guidance to the store R3, a predicted time of arrival at the store R3, or the like to the terminal device c200 using the communication device c120 of the second vehicle c600 (step S106c). The terminal device c200 causes the display to display the received information and notifies the product provider P of the information (step S107c).

Next, for example, it is assumed that the first vehicle c500 has received a touch operation on the DELI switch SW2 of the store R3 on the touch panel c106 (step S10c8). Thereby, the store guidance device c108 causes the touch panel c106 to display the order screen of the store R3. The store guidance device 108 transmits the input order information to the terminal device c200 of the specified store R3 using the communication device c120 (step S109c). The terminal device c200 causes the display to display the received information and notifies the product provider P of the information (step S110c).

Figure 77:
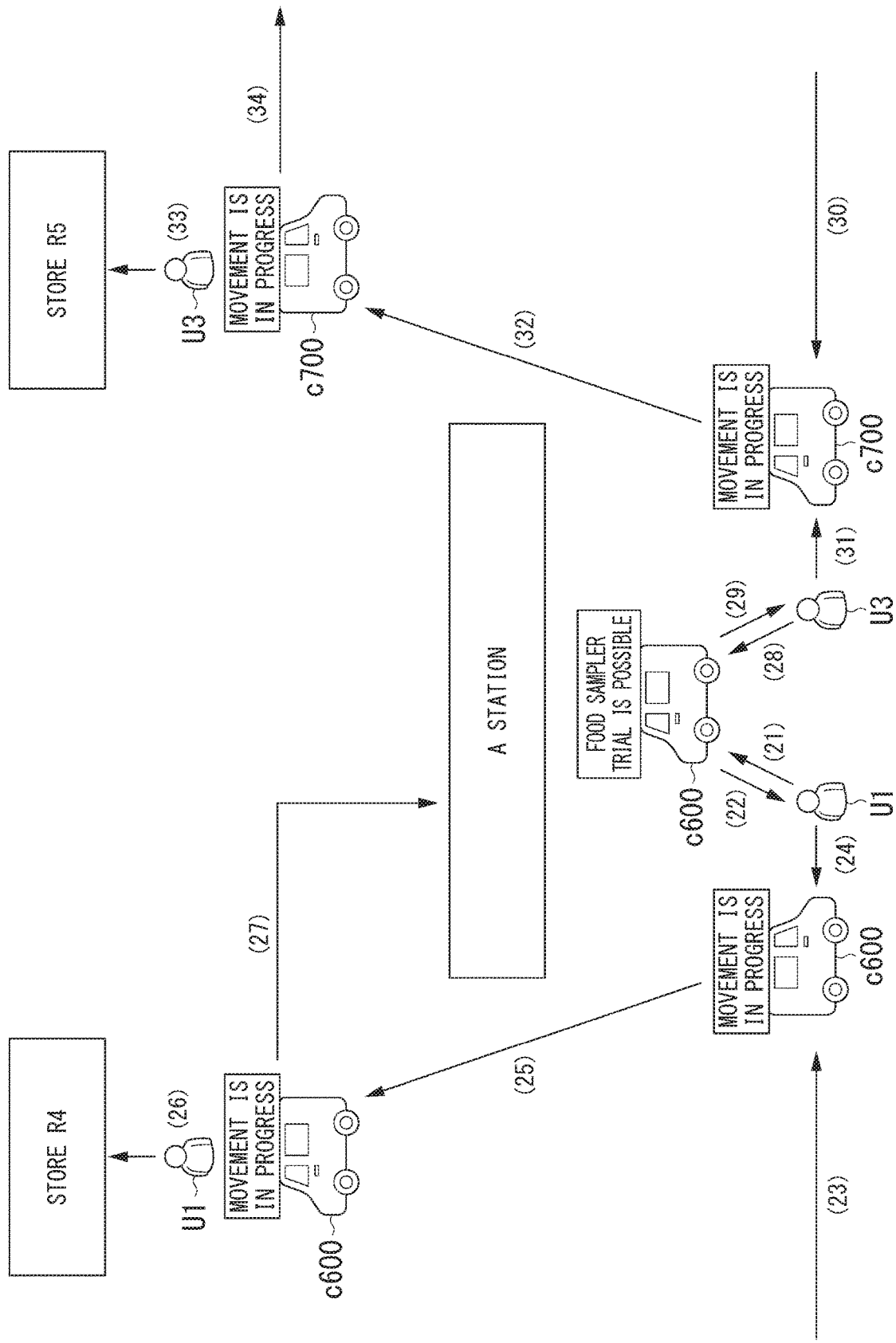
FIG. 77 is a diagram showing a usage form of a first vehicle c500 and second vehicles c600 and c700.

Next, a usage form of the first vehicle c500 and the second vehicles c600 and c700 will be described with reference to FIG. 77. FIG. 77 is a diagram showing an example of a usage form of the first vehicle c500 and the second vehicles c600 and c700. The first vehicle c500 is parked in front of the A station. The digital signage c170 of the first vehicle c500 displays that the food sample can be tried within the vehicle.

(21) The user U1 coming out of the A station gets into the first vehicle c500 parked at the A station. (22) After trying the food sample within the first vehicle c500, the user U1 performs a touch operation on the GO switch SW1 corresponding to the store R4 to which the user U1 wants to go and gets out of the first vehicle c500.

The store guidance device c108 of the first vehicle c500 determines the second vehicle c600 as the optimum second vehicle from among the plurality of second vehicles c600, c700, and the like and transmits information indicating a position at which the position where the first vehicle c500 is parked to the second vehicle c600. (23) The second vehicle c600 moves to the A station where the first vehicle c500 is parked. (24) Then, the user U1 gets into the second vehicle c600 arriving to pick up him/her. (25) The second vehicle c600 is automatically driven to the specified store R4 in accordance with the instruction of the first vehicle c500 and drops off the user U1 at the store R4. Here, the digital signage c170 of the second vehicle c600 displays that movement is in progress. (26) The user U1 gets out of the second vehicle c600 and enters the store R4.

(27) Thereafter, the second vehicle c600 may drop off the user U1 at the A station after waiting for the user U1 in front of the store R4 until the end of eating or shopping at the store R4 or may pick up another user U2 getting out of the store R4 and drop off the other user U2 at a specified place. Also, the second vehicle c600 returns to the A station, when the pick-up/drop-off request has been received from the first vehicle c500. Also, the second vehicle c600 may wait for a certain period in front of the store R4.

A user U3 is assumed to get out of the second vehicle c600 at the A station while the second vehicle c600 picks up the user U1 to the store R4. At this time, because the second vehicle c600 is picking up the user U1 to the store, the first vehicle c500 is parked at the A station. (28) The user U3 gets into the first vehicle c500. (29) After the food sample within the first vehicle c500 is tried, the user U3 touches the GO switch SW1 corresponding to the store R5 to which the user U3 wants to go, and gets out of the first vehicle c500.

The store guidance device c108 of the first vehicle c500 determines the second vehicle c700 as the optimum second vehicle from among the plurality of second vehicles c600, c700, and the like and transmits information indicating a position at which the first vehicle c500 is parked to the second vehicle c700. (30) The second vehicle c700 moves to the A station where the first vehicle c500 is parked. (31) Then, the user U3 gets into the second vehicle c700 that has arrived to pick him/her up. (32) The second vehicle c700 is automatically driven to the specified store R5 in accordance with an instruction of the first vehicle c500 and drops off the user U3 at the store R5. Here, the digital signage c170 of the second vehicle c700 displays that movement is in progress. (33) The user U3 gets out of the second vehicle c700 and enters the store R5.

(34) Thereafter, the second vehicle c700 may drop off the user U3 at the A station after waiting for the user U3 in front of the store R54 until the end of eating or shopping at the store R5 or may drop off another user U4 getting out of the store R5 at a specified place. Also, the second vehicle c700 returns to the A station when a pick-up/drop-off request has been received from the first vehicle c500. Also, the second vehicle c700 may wait for a certain period in front of the store R5.

According to such a usage form, because the first vehicle c500 loaded with food samples can be parked in a predetermined place, the replenishment and replacement of the food samples can be simplified and the hygiene aspect of the food sample can be improved. Also, because the automated driving vehicle that travels nearby can be used as the second vehicle, it is possible to simply implement the vehicle system c2 that can reduce the number of first vehicles.

According to the fourth embodiment described above, there are provided the first vehicle c500 including the rack part c102 on which a food sample can be placed and the third switch (the GO switch SW1) for paging the second vehicles c600, c700, and the like which are automated driving vehicles and the second vehicles c600, c700, and the like paged when the third switch is operated and configured to take over the user from the first vehicle c500 and take the user to a specified store according to automated driving, so that the user can be guided to the store by the second vehicles c600, c700, and the like while the first vehicle c500 is always parked at a predetermined position.

Although an example in which a plurality of food samples SM1, SM2, and the like are placed on the rack part c102 has been described, sample products other than food samples (for example, beverage sample containers, daily necessities, cosmetics, fragrances, and the like) may be placed.

Fifth Embodiment

Next, a fifth embodiment will be described. In the fifth embodiment, an event vehicle dispatch device, an event vehicle dispatch method, a program, and a management system to which the vehicle of the first embodiment is applicable will be described. In the following description, a vehicle used for the event vehicle dispatch system including the event vehicle dispatch device is assumed to be an automated driving vehicle. The automated driving vehicle is a vehicle that automatically controls at least one of an accelerated or decelerated speed and steering of the vehicle and can travel. An occupant may perform manual driving of the automated driving vehicle. The automated driving vehicle includes a vehicle that can perform unmanned traveling. A vehicle used for the event dispatch system may be a manual driving vehicle. The event dispatch system is an example of a "management system."

Figure 78:
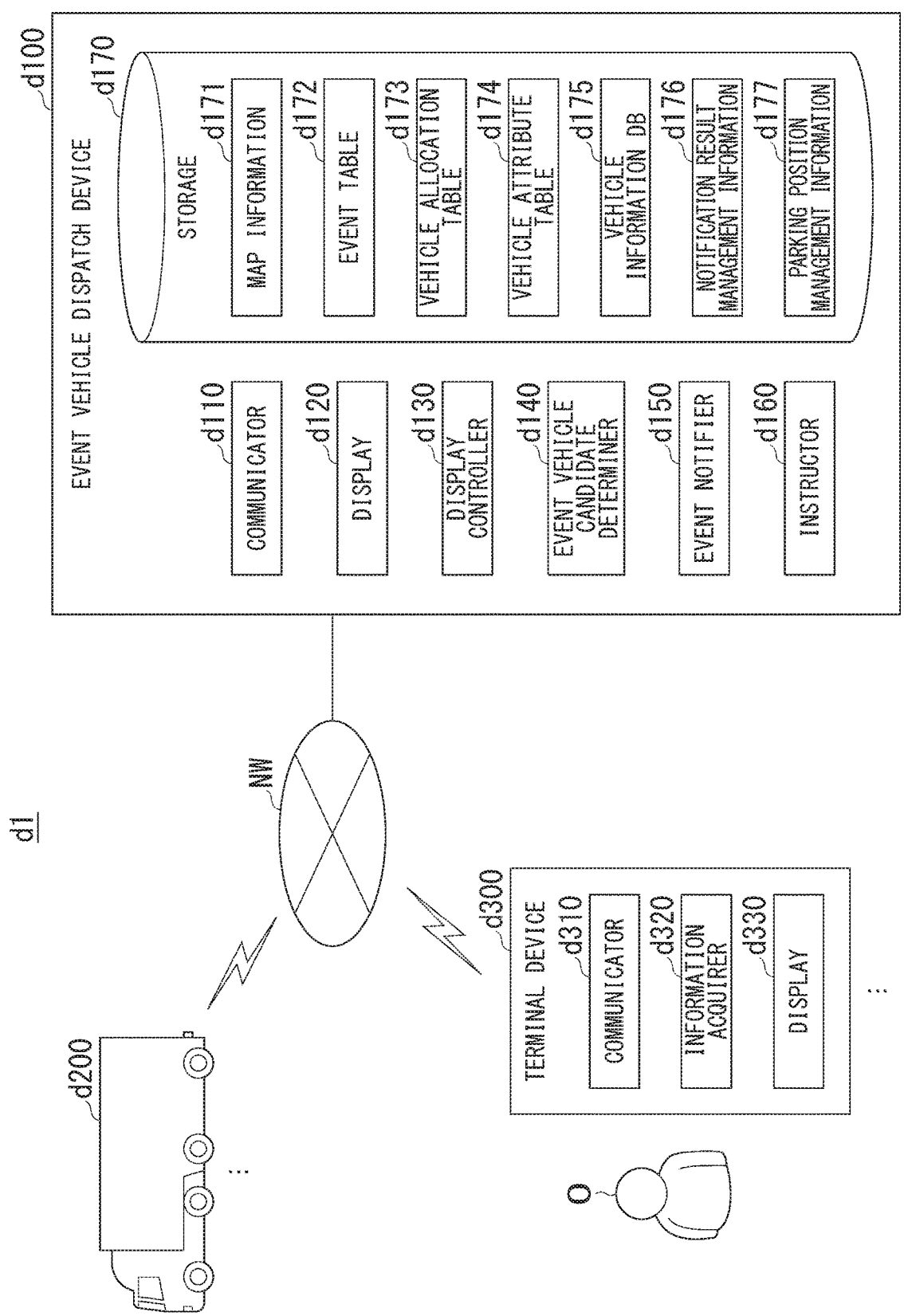
FIG. 78 is a configuration diagram of an event vehicle dispatch system d1 according to a fifth embodiment.

FIG. 78 is a diagram showing a configuration of an event vehicle dispatch system d1 according to the fifth embodiment. The event vehicle dispatch system d1 includes an event vehicle dispatch device d100, one or more vehicles d200 and a terminal device d300 used by an owner O of the one or more vehicles d200. These constituent elements can communicate with one another via a network NW. The network NW includes the Internet, a wide area network (WAN), a local area network (LAN), a public communication line, a provider device, a dedicated line, and a wireless base station.

[Event Vehicle Dispatch Device]

The event vehicle dispatch device d100 includes, for example, a communicator d110, a display d120, a display controller d130, an event vehicle candidate determiner d140, an event notifier d150, an instructor d160, and a storage d170. The display controller d130, the event vehicle candidate determiner d140, the event notifier d150, and the instructor d160 are realized, for example, by causing a processor such as a central processor (CPU) to execute a program (software) stored in the storage d170. Some or all of the function units may be realized by hardware (a circuit including circuitry) such as a large scale integration (LSI), an application specific integrated circuit (ASIC), a field-programmable gate array (FPGA), or a graphics processor (GPU), or may be realized by software and hardware in cooperation. The program may be stored in advance in the storage d170 such as a hard disk drive (HDD) or a flash memory or may be stored in a storage medium detachably mounted on a DVD, a CD-ROM, or the like so that the storage medium is mounted on a drive device (not shown) and is installed on the storage d170. A combination of some or all of the event vehicle candidate determiner d140 and the event notifier d150 is an example of an "adjuster." The event notifier d150 is an example of a "notifier."

The communicator d110 is, for example, a network card for connection to the network NW. The communicator d110 communicates with the vehicle d200, the terminal device d300, and another external device via the network NW.

The display d120 is a display device such as a liquid crystal display (LCD) or an organic electro-luminescence (EL) display device, or the like. The display d120 displays, for example, various kinds of information regarding vehicle dispatch for a supervisor or the like of the event vehicle dispatch device d100 under the control of the display controller d130. The display d120 may have a function of a so-called touch panel receiver that receives an input of information or a confirmation operation when a display screen is touched with a finger tip.

The display controller d130 performs control such that various kinds of information regarding event vehicle dispatch are displayed on the display d120. The display controller d130 acquires an input of information or information regarding a confirmation operation from a supervisor or the like received from the display screen of the display d120. For example, the display controller d130 receives information regarding an event to be held, information regarding an area where the event is held, and the like from the supervisor or the like. The event includes various events like a large-scale or medium-scale event such as a music festival or a food festival in which a period is fixed, a seasonal affair such as a first Shinto shrine visit, cherry blossom viewing, sea bathing, or skiing, a sports event such as Olympic, an exhibition, and festivals performed by a local public organization, a local business company, and the like. The area is, for example, an area in which a plurality of vehicles can be parked. The details of a function of the display controller d130 will be described later.

The event vehicle dispatch candidate determiner d140 receives information regarding a held event received by the display controller d130 and information regarding the area in which the event is held and determines vehicle attributes of vehicles allowed to participate in the event and the number of vehicles for each vehicle attribute with reference to the vehicle allocation table d173 stored in the storage d170. The details of a function of the event vehicle candidate determiner d140 will be described later.

The event notifier d150 notifies candidates for the vehicle d200 determined by the event vehicle candidate determiner d140 of information regarding an event to be held for one or both of the terminal devices d300 and inquiry information for inquiring whether to participate as a service provider in the event among the vehicles d200 or the owners O of the vehicles. The owner O may be a service supervisor who manages provision of a service by the vehicle d200 or may be an occupant of the vehicle d200. The event notifier d150 acquires response information to the inquiry information. The details of a function of the event notifier d150 will be described below.

When the vehicle d200 providing a service in the event travels in the vicinity of the area of an event site, the instructor d160 allocates a parking position inside the area and instructs the vehicle d200 or the owner O of the vehicle d200 of information regarding the allocated position. The vicinity of the area is, for example, a distance from the event site corresponding to an area ID to the vehicle d200 which is within a predetermined distance (for example, within d100 $m$). The details of a function of the instructor d160 will be described later.

The storage d170 is realized as an HDD, a flash memory, a random access memory (RAM), a read-only memory (ROM), or the like. The storage d170 stores, for example, map information d171, an event table d172, a vehicle allocation table d173, a vehicle attribute table d174, a vehicle information DB d175, notification result management information d176, parking position management information d177, and other information.

[Vehicle]

Figure 79:
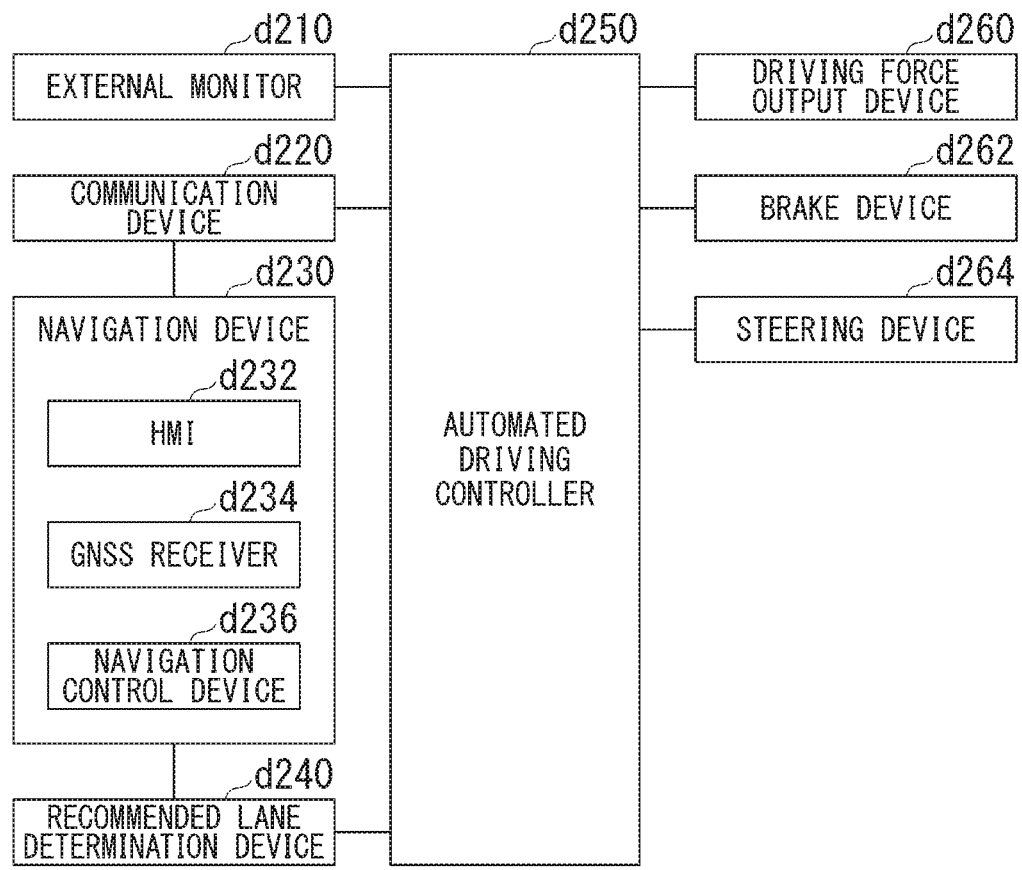
FIG. 79 is a configuration diagram of a vehicle d200 according to the fifth embodiment.

The vehicle d200 is, for example, a vehicle that has the number of wheels equal to or greater than four, but may be another vehicle other than a motorcycle. For example, the vehicle d200 may be a towing vehicle that tows a detachable cargo stand or the like or may be a vehicle integrated with a cargo stand. FIG. 79 is a diagram showing a configuration of the vehicle d200 according to the fifth embodiment. The vehicle d200 includes, for example, an external monitor d210, a communication device d220, a navigation device d230, a recommended lane determination device d240, an automated driving controller d250, a driving power output device d260, a brake device d262, and a steering device d264. The automated driving controller d250 includes, for example, a processor such as a CPU that executes a program (software) stored in a storage (not shown) in the vehicle d200. The external monitor d210, a communication device d220, a navigation device d230, a recommended lane determination device d240, an automated driving controller d250, a driving power output device d260, a brake device d262, and a steering device d264 have configurations the same as the outside world monitor a210, a communication device a220, a navigation device a230, a recommended lane determination device a240, an automated driving controller a250, a driving force output device a260, a brake device a262, and a steering device a264 of FIG. 26 which are introduced in the second embodiment respectively, and thus the descriptions thereof will be omitted. In the fifth embodiment, the HMI d232 causes event notification information and inquiry information from the event vehicle dispatch device d100 to be displayed on the screen or to be notified of as a sound. The HMI d232 receives response information to the inquiry information operated by the occupant and transmits the received response information to the event vehicle dispatch device d100. The navigation control device d236 may spontaneously determine a route from the position of the vehicle d200 positioned by the GNSS receiver d234 to a destination designated using the HMI d232 with reference to the navigation map. Further, detailed descriptions of the processes of the automated driving of the fifth embodiment will be emitted while supporting FIG. 3 and related descriptions thereto which are introduced in the first embodiment.

[Terminal Device]

Referring back to FIG. 78, the terminal device d300 is, for example, a smartphone, a tablet terminal, a personal computer, or the like. The terminal device d300 supports a service to be described below, for example, by activating an application program, a browser, or the like for using the event vehicle dispatch system. In the following description, it is assumed that the terminal device d300 is a smartphone and an application program (an event vehicle dispatch application) is activated.

The terminal device d300 includes, for example, a communicator d310, an information acquirer d320, and a display d330. The communicator d310 is, for example, a network card connected to the network NW. The communicator d310 communicates with the event vehicle dispatch device d100 or other external devices via the network NW.

The information acquirer d320 is realized, for example, when a processor such as a CPU executes a program (software) stored in a storage (not shown). The information acquirer d320 may be realized by hardware (a circuit including circuitry) such as an LSI, an ASIC, or an FPGA, or a GPU or may be realized by software and hardware in cooperation. The program may be stored in advance in a storage or may be stored in detachable storage medium such as a DVD or a CD-ROM so that the storage medium is installed in a drive device and is installed in the storage. The information acquirer d320 acquires, for example, inquiry information and information regarding the event, or the like from the event vehicle dispatch device d100. The information acquirer d320 is, for example, a function that is realized by activating the event vehicle dispatch application installed in the terminal device d300. The information acquirer d320 may have a function of acquiring an electronic mail transmitted from the event vehicle dispatch device d100 or transmitting a mail by mail software installed in the terminal device d300.

The display d330 is an LCD, an organic EL display device, or the like. The display d330 displays the inquiry information and the information regarding the event acquired by the information acquirer d320. The display d330 may have a function of a so-called touch panel receptor that receives information operated by the owner O with regard to the displayed content. The operated information is, for example, response information corresponding to the inquiry information. The display d330 causes the communicator d310 to transmit the received response information to the event vehicle dispatch device d100.

[Specific Process Content in Event Vehicle Dispatch System d1 According to Fifth Embodiment]

Hereinafter, specific process content in the event vehicle dispatch system d1 according to the fifth embodiment will be described. The event vehicle dispatch device d100 causes the display d120 to display an event vehicle dispatch setting screen IM1 when an instruction to perform an event vehicle dispatch process according to the first embodiment is received from the supervisor.

Figures 80, 81:
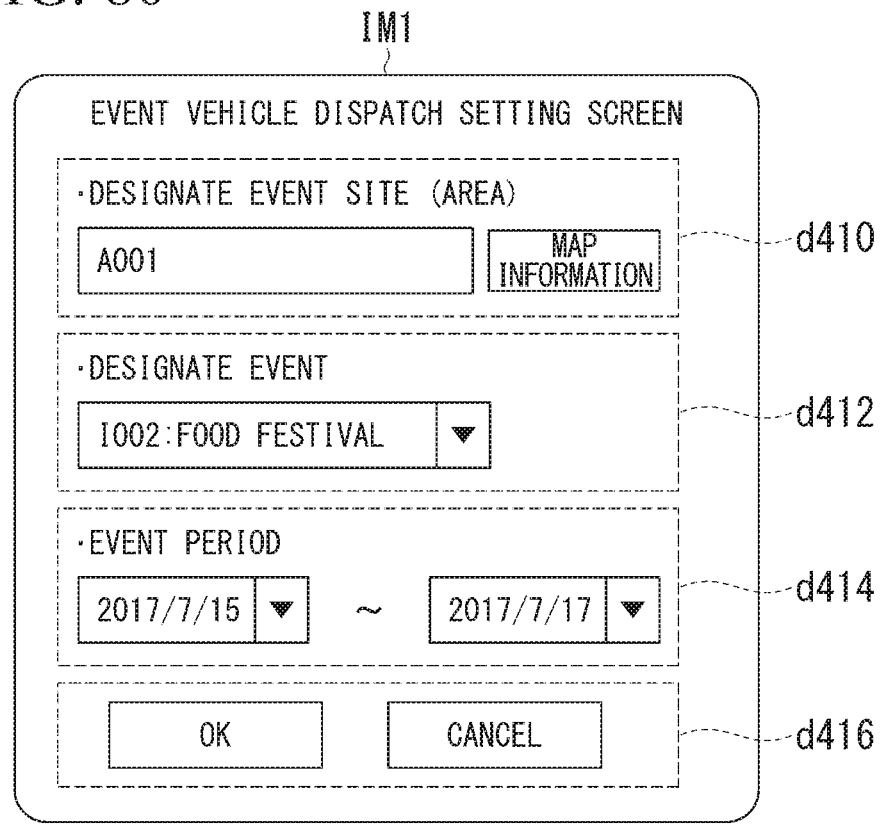
FIG. 80 is a diagram showing an example of an event vehicle dispatch setting screen IM1.
FIG. 81 is a diagram showing an example of details of an event table d172.

FIG. 80 is a diagram showing an example of the event vehicle dispatch setting screen IM1. On the event vehicle dispatch setting screen IM1, an event site destination region d410 in which a held event site (area) is designated, an event destination region d412 in which an event is designated, an event period designation region d414 in which an event period is designated, and a confirmation operation region d416 in which execution or cancellation of vehicle dispatch based on input content is confirmed are shown. Display items of a layout of the event vehicle dispatch setting screen IM1 are not limited to the example of FIG. 71. A layout or items of another screen IMx (where x is a natural number equal to or greater than 2) to be described below may be arbitrarily changed.

The display controller d130 receives information regarding an event site which is input to the event site destination region d410 through an operation input of the supervisor. The display controller d130 displays a map information button in the event site destination region d410. When the supervisor selects the map information button, map information included in the map information d171 stored in the storage d170 is displayed on the display d120. Here, the map information d171 includes, for example, road information regarding roads expressed with nodes and links, traffic regulation information, address information (an address and a postal code), and facility information. The road information includes information indicating kinds of roads such as expressways, toll roads, national ways, or prefecture roads and information such as the number of lanes of a road, an emergency parking area, the width of each lane, the gradients of roads, the positions of roads (3-dimensional coordinates including longitude, latitude, and height), curvatures of curves of lanes, positions of joining and branching points of lanes, and signs installed on roads. The map information d171 may include identification information (an area ID) for identifying a parking area in which the vehicle d200 is parked or information regarding a position or a size for each area ID.

The display controller d130 may cause the display d120 to display the map information and receive a position touched by the supervisor as an input of the event site.

The display controller d130 receives information for specifying an event input in the event destination region d412 through an operation input of the supervisor. The display controller d130 displays, for example, a list box including a plurality of events set in advance in the event destination region d412 and receives information regarding one event selected by the supervisor among the plurality of events. The events displayed in the list box are stored in the event table d172.

FIG. 81 is a diagram showing an example of content of the event table d172. In the event table d172, event content is associated with an event ID for identifying an event. For example, an event "food festival" is associated with event ID "I002."

The display controller d130 receives information for specifying an event period input in the event period designation region d414 in which an event period is designated through an operation input of the supervisor. For example, the display controller d130 selects a start date and an end date of an event from the list box and receives information regarding one date.

The display controller d130 receives an execution of event vehicle dispatch by receiving a selection of an OK button in the confirmation operation region d416 and confirms cancellation of the event vehicle dispatch by receiving a selection of a cancellation button.

The event vehicle candidate determiner d140 adjusts vehicle attributes of the vehicles d200 allowed to participate in the event and the number of vehicles for each vehicle attribute with reference to the vehicle allocation table d173 stored in the storage d170 based on information regarding an area in which the event received by the display controller d130 is held and the event, and determines candidates for the vehicles d200 notified of by the event notifier d150.

FIG. 82 is a diagram showing an example of content of the vehicle allocation table d173. In the vehicle allocation table d173, a vehicle attribute ID and the number of vehicles for each vehicle are associated with the area ID and the event ID. The area ID is identification information for identifying an area. The vehicle attribute ID is identification information for identifying an attribute of the vehicle d200 participating in the event. The attribute of the vehicle is, for example, an attribute indicating a genre of a service and specific content of the service provided by the vehicle d200 or a cargo stand of the vehicle d200. The content of the attribute may be stored as a vehicle attribute table d174 in the storage d170.

FIG. 83 is a diagram showing an example of content of the vehicle attribute table d174. In the vehicle attribute table d174, attribute content is associated with the vehicle attribute ID. Examples of the attribute content include a food stand vehicle in which predetermined food such as curry or ramen noodles is cooked, a convenience store vehicle in which many kinds of items such as food and daily necessities are sold, and a lodging vehicle in which a user is allowed to lodge. As the attribute content, there is an electricity or fuel vehicle in which batteries or fuels are supplied to a plurality of vehicles participating in an event.

Referring back to FIG. 82, the number of vehicles in the vehicle allocation table d173 is the number of vehicles which can be parked in an area of an area ID. For example, the example of FIG. 74 shows that twenty vehicles of vehicle ID "T004" can be allocated when an event of event ID "I001" is held in an area of area ID "A001." When another event (event ID "I002") is held in the same area of area ID "A001," ten vehicles of vehicle ID "T001" and vehicles of vehicle ID "T002" can be allocated. The event vehicle candidate determiner d140 may receive an instruction or the like for the supervisor or the like to generate, change, or delete various kinds of information of the vehicle allocation table d173 and may adjust the vehicle attribute of the area or the event, the number of vehicles, or the like based on the received instruction.

The event vehicle candidate determiner d140 outputs information regarding the determined vehicle attribute and number of vehicles of the vehicle dispatch to the display controller d130 with reference to the vehicle allocation table d173 and the vehicle attribute table d174. The display controller d130 displays the information regarding the vehicle attribute of the vehicle dispatch and the number of vehicles determined by the event vehicle candidate determiner d140 on the display d120.

Figures 84, 85:
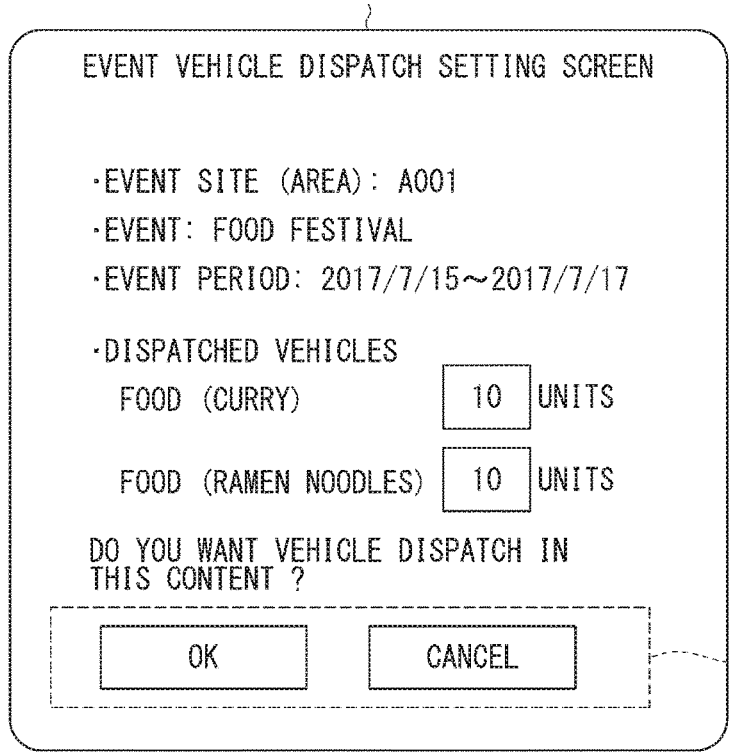
FIG. 84 is a diagram showing an example of an event vehicle dispatch setting screen IM2 displayed on a display d120 after event vehicle dispatch is executed.
FIG. 85 is a diagram showing an example of details of a vehicle information DB d175.

FIG. 84 is a diagram showing an example of an event vehicle dispatch setting screen IM2 displayed on the display d120 after event vehicle dispatch is performed. In the event vehicle dispatch setting screen IM2, kinds of vehicles scheduled to be dispatched and the number of each kind of vehicle are displayed. In the number of vehicles, kinds of vehicles allocated in the vehicle allocation table d173 and the number of vehicles are displayed. The display controller d130 can display the number of dispatched vehicles so that the number of dispatched vehicles can be changed by the supervisor and can arbitrarily change and adjust the number of vehicles through an input of the supervisor. The display controller d130 may update the number of vehicles in the vehicle allocation table d173 based on the number of vehicles adjusted through the operation input by the supervisor.

On the event vehicle dispatch setting screen IM2, a confirmation operation region 420 is shown. When a selection of an OK button is received in the confirmation operation region 420, the display controller d130 receives an execution of event vehicle dispatch. When a selection of a cancellation button is received, the display controller d130 confirms cancellation of the event vehicle dispatch.

When an execution of the event vehicle dispatch is received on the event vehicle dispatch setting screen IM2, the event vehicle candidate determiner d140 determines the vehicles d200 which are candidates participating in the event based on the set kinds of vehicles and number of vehicles with reference to the vehicle information DB d175 stored in the storage d170. For example, the event vehicle candidate determiner d140 acquires the vehicle IDs corresponding to the vehicle attribute ID by the number of vehicles set in the vehicle allocation table d173 with reference to the vehicle information DB d175.

FIG. 85 is a diagram showing an example of content of the vehicle information DB d175. In the vehicle information DB d175, a vehicle ID which is identification information for identifying the vehicle d200, a vehicle communication address for communicating with the vehicle d200, an owner address for communicating with the terminal device d300 of the owner of the vehicle d200, and positional information of the vehicle are associated with the vehicle attribute ID. The vehicle communication address is an IP address for communicating with the communication device of the vehicle d200 or a mail address, a telephone number, or the like allocated to the vehicle d200. The owner address is an IP address for communicating with the terminal device d300 or a mail address, a telephone number, or the like allocated to the terminal device d300. The positional information is information (for example, latitude and longitude) for specifying a position of the vehicle d200 transmitted at a predetermined timing from each vehicle d200.

The event notifier d150 acquires an address of one or both of the terminal devices d300 between the vehicle d200 and the owner O of the vehicle with regard to the candidates for the vehicles d200 determined by the event vehicle candidate determiner d140 and notifies of the acquired address of the inquiry information and the information regarding the held event. The event notifier d150 may notify of the address by an electronic mail, may notify of the address by making a phone call to the telephone number with a mechanic voice, or may notify of the address via an application program installed in the vehicle d200 or the terminal device d300.

The event notifier d150 updates the notification result management information d176 stored in the storage d170 based on a response result indicating whether to participate acquired from the target vehicle d200 or the terminal device d300.

FIG. 86 is a diagram showing an example of content of the notification result management information d176. In the notification result management information d176, a notification flag and a participation flag are associated with the vehicle ID that is notified of. The notification flag is a flag for identifying whether to notify the vehicle d200 corresponding to the vehicle ID or the terminal device d300 of the owner O of the vehicle d200 of the inquiry information and the information regarding the event by the event notifier d150. In the example of FIG. 86, the event notifier d150 sets "1" in the notification flag when the information is notified of. The event notifier d150 sets "0" when the information is not notified of. However, the identification information of the flag is not limited thereto. The same applies to other flags to be described below.

The participation flag is a flag for identifying whether a vehicle of a vehicle ID participates in an event that is notified of. The participation flag is set by the event notifier d150 based on an inquiry result corresponding to the inquiry information that is notified of. In the example of FIG. 86, "1" is set in the participation flag in the case of participation in the event as a service provider, and "0" is set in the participation flag in the case of no participation in the event as a service provider or the case of no response to the inquiry information.

Figure 87:
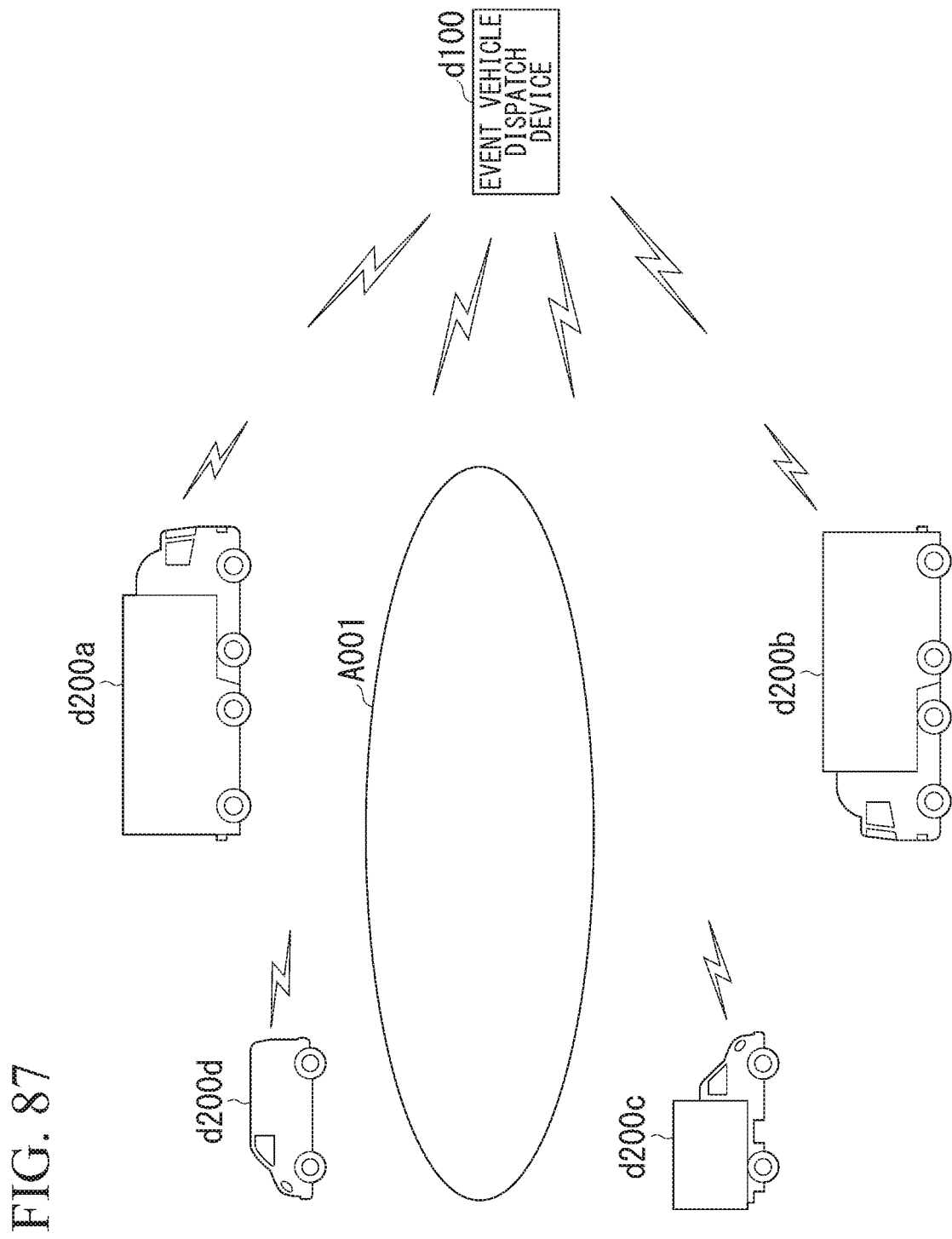
FIG. 87 is an explanatory diagram showing an event notification to the vehicle d200.

FIG. 87 is a diagram showing event notification to the vehicle d200. In the example of FIG. 87, for example, the event notifier d150 notifies the number of vehicles set in a vehicle order (for example, a vehicle ID order) registered in the vehicle information DB d175 of the inquiry information and the information regarding the event for each vehicle attribute.

The event notifier d150 may notify the set number of vehicles of the inquiry information and the information regarding the event information for the vehicles which have the vehicle attribute IDs that are set as participants in the event and in order of proximity from an area in which the event is held among the vehicles registered in the vehicle information DB d175. In the example of FIG. 87, four vehicles d200a to d200d are notified in order proximity from area "A001" in which an event is held. By notifying the vehicles closer to the area in which the event is held of the event first, it is possible to gather the vehicles d200 at the event site quickly.

Figure 88:
FIG. 88 is a diagram showing an example of an event notification screen IM3 displayed on an HMI d232 of the vehicle d200.

FIG. 88 is a diagram showing an example of an event notification screen IM3 displayed on the HMI d232 of the vehicle d200. The screen shown in FIG. 88 and a screen shown in FIG. 89 to be described below may be displayed on the terminal device d300. On the event notification screen IM3, for example, an event notification region 430 in which the information regarding the event notified of by the event vehicle dispatch device d100 is displayed and an inquiry confirmation region 432 in which whether to participate in the event as a service provider is inquired of. In the event notification region 430, for example, an event site, event content, an event period, and service content desired to be provided are shown. In the inquiry confirmation region 432, a button for confirming whether to participate in the event is displayed. When a selection of the participation button by an occupant of the vehicle d200 is received, the HMI d232 causes the communication device d220 to transmit response information indicating the participation to the event vehicle dispatch device d100. When a selection of a non-participation button is received or the selection of the participation button or the non-participation button is not received despite elapse of a predetermined time or more after the display of the event notification screen IM3, the HMI d232 transmits information indicating the non-participation to the event vehicle dispatch device d100.

Figure 89:
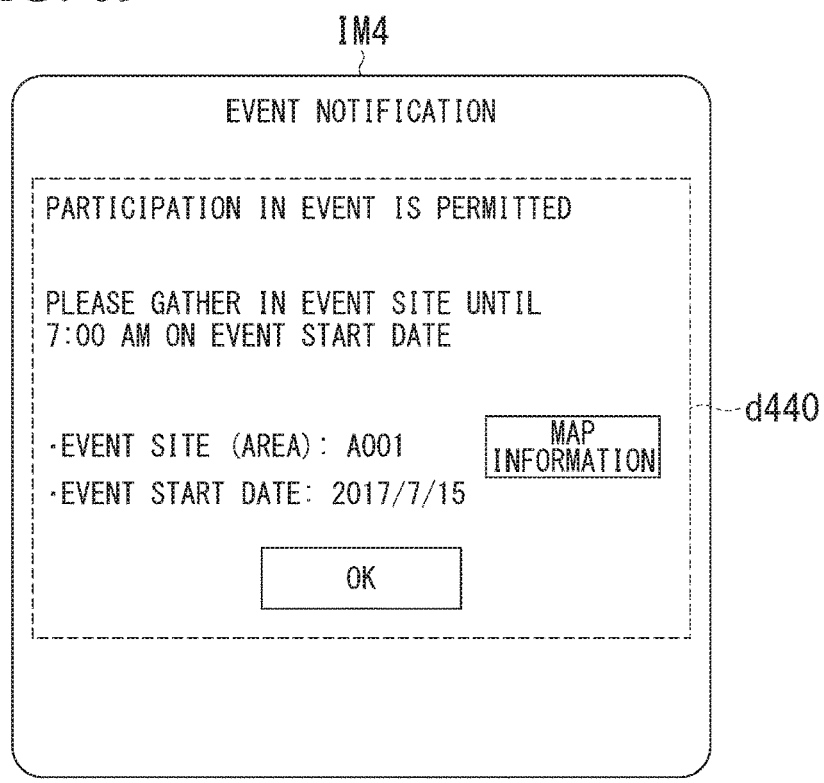
FIG. 89 is a diagram showing an example of an event notification screen IM4 transmitted to the vehicle d200 making a participation response.

When information indicating the participation in the event is received from the vehicle d200, the event notifier d150 registers response information from the vehicle d200 in the notification result management information d176 and transmits specific content of the event to the participating vehicle d200. FIG. 89 is a diagram showing an example of an event notification screen IM4 transmitted to the vehicle d200 which has responded with an intention to participate. On the event notification screen IM4, a participation determination notification region 440 is shown. In the participation determination notification region 440, for example, information indicating permission for the participation, information regarding a gathering schedule, information regarding an event site and an event start date, and an OK button are shown. When a selection of the OK button is received, the HMI d232 closes the event notification screen IM4.

When information indicating non-participation in the event is received from the vehicle, the event notifier d150 registers the response information from the vehicles d200 in the notification result management information d176. Further, the event notifier d150 may select a vehicle from the vehicle information DB d175 in place of the vehicle which does not participate in the event and notify the selected vehicle of the inquiry information and the information regarding the event. Thus, the notification can be performed until the number of vehicles participating in the event becomes a scheduled number, and thus it is possible to ensure the scheduled number of event vehicles.

The event notifier d150 may notify the vehicles d200 of a request for gathering at the event or a demand prospect when the vehicles d200 perform automated driving. In this case, when the notification of the request for gathering at the event or the demand prospect is received, the vehicles d200 perform the automated driving by the automated driving controller d250 and move to the area in which the event is held despite not knowing the content of the event. Thus, the number of vehicles necessary for the event can gather in the area. The vehicles d200 may notify the event vehicle dispatch device d100 of an area arrival time by the automated driving.

When the vehicles d200 participating in the event perform the automated driving by the automated driving controller d250 and arrive at the vicinity of the event site at a time close to the gathering time, the instructor d160 notifies the vehicles d200 (or the terminal devices d300) of information regarding vehicle parking position. The time close to the gathering time is a range such as several hours before or after the gathering time (for example, 3 hours before or after the gathering time) or the like.

Figure 90:
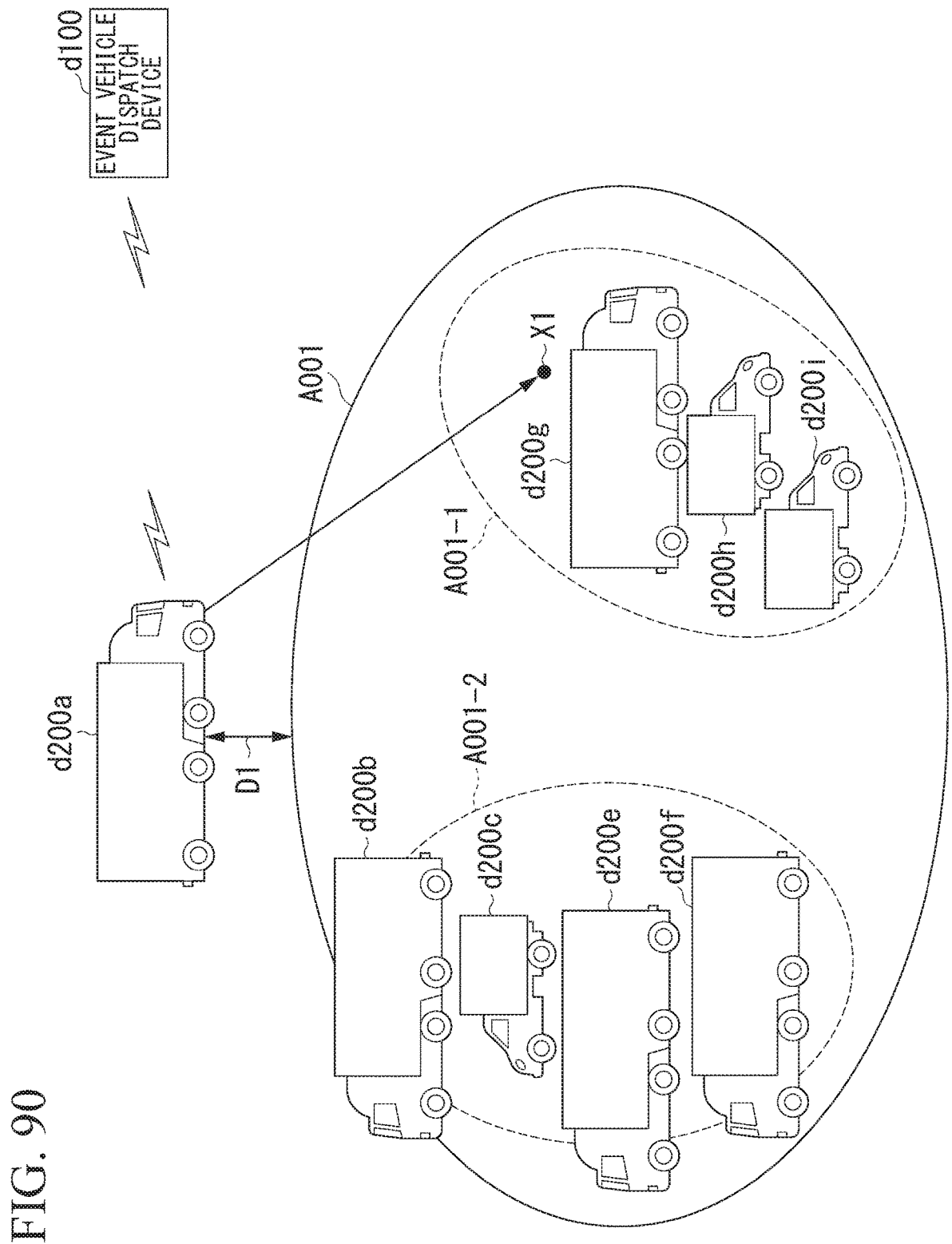
FIG. 90 is an explanatory diagram showing a state of an indication of an indicator d160 for a parking position of the vehicle d200.

FIG. 90 is a diagram showing an aspect of an instruction for parking positions of the vehicles d200 by the instructor d160. The instructor d160 acquires positional information of the vehicles d200. For example, when a shortest distance D1 between a traveling position of the vehicle d200a participating in the event and area "A001" of the event site is within a threshold (for example, d100 m), the instructor d160 notifies the vehicle d200a of a parking position of the vehicle d200a with regard to area "A001." The vehicle d200a that is notified of performs the automated driving by the automated driving controller d250, and moves to the instructed parking position and stops. The information regarding the parking position is stored as the parking position management information d177 in the storage d170.

FIG. 91 is a diagram showing an example of content of the parking position management information d177. In the parking position management information d177, a parking position of a vehicle in the area in which the event is performed is associated with the vehicle ID. The instructor d160 may generate the parking position management information d177 at a time point at which the vehicles d200 participating in the event are confirmed or may be generate the parking position management information d177 at a time point at which the vehicles d200 arrive at the vicinity of the area.

The instructor d160 may output information regarding a parking position instruction to the terminal device d300 of the owner O of the vehicle d200 or may post the information regarding the parking position instruction on an electric bulletin board or the like installed in an entrance gate or the like of area "A001." Based on the supported information, the vehicle d200 moves to an instructed place and stops or the owner O who is a driver of the vehicle d200 moves the vehicle d200 to the instructed place and stops.

When the vehicles d200 participating in the event are parked at the event site, the instructor d160 may group the vehicles d200 for each vehicle attribute so that the vehicle d200 can be parked together in the area. The instructor d160 may set a plurality of sub-areas (for example, areas "A001-1" and "A001-2" in FIG. 90) at the event site A001 and notify of the parking positions so that the vehicles are parked together in accordance with the same vehicle attribute ID for each sub-area. In the example of FIG. 90, vehicles d200a, d200g, d200h, and d200i are parked in sub-area "A001-1" and vehicles d200b, d200c, d200e, and d200f are parked in sub-area "A001-2." In this way, by disposing the plurality of vehicles d200 together for each service supplied by each vehicle, it is possible to provide a service together in a food area, a lodging area, or the like for each sub-area.

The instructor d160 may combine and group the vehicles of different vehicle attributes and allow the vehicles to be parked in sub-areas determined in units of groups. Thus, a plurality of different services can be provided in units of sub-areas.

[Process Flow]

Figure 92:
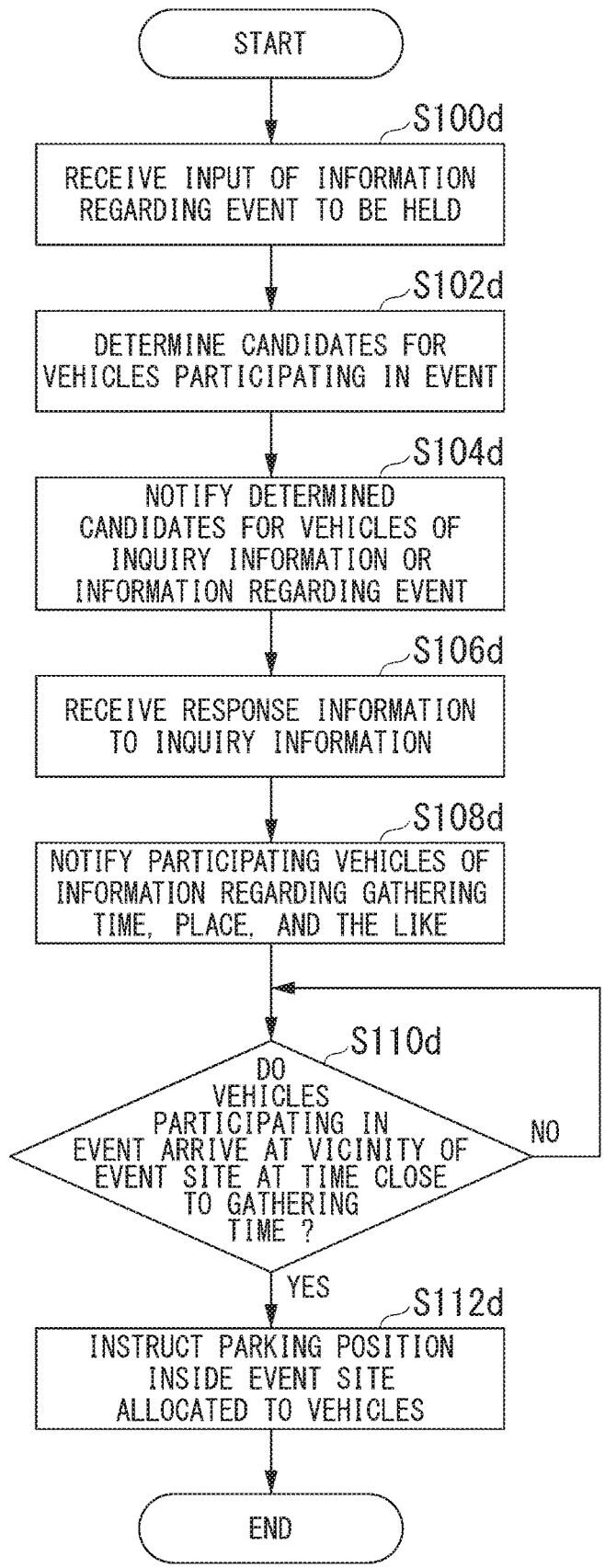
FIG. 92 is a flowchart showing an example of the flow of a process to be executed by an event vehicle dispatch device d100 according to the fifth embodiment.

Next, a flow of a process performed by the event vehicle dispatch device d100 according to the fifth embodiment will be described. FIG. 92 is a flowchart showing an example of a flow of a process performed by the event vehicle dispatch device d100 according to the fifth embodiment. The event vehicle dispatch device d100 causes the supervisor or the like to receive an input of information regarding an event to be held (step S100d). Subsequently, the event vehicle candidate determiner d140 determines candidates for the vehicles participating in the event (step S102d). Subsequently, event notifier d150 notifies one or both of the vehicle d200 and the terminal device d300 with regard to the determined candidates for the vehicles, of the inquiry information and the information regarding the event (step S104d).

Subsequently, the event notifier d150 in the event vehicle dispatch device d100 receives response information to the inquiry and manages the notification result management information d176 based on the received response information (step S10d6). Subsequently, the event notifier d150 notifies the vehicles d200 participating in the event of information regarding a gathering time, place, and the like (step S108d).

The instructor d160 determines whether the vehicles 200d participating in the event arrive at the vicinity of the event site at a time close to the gathering time (step S108d). When the vehicles d200 participating in the event does not arrive at the vicinity of the event site, the instructor d160 waits until the vehicles d200 arrive at the vicinity of the event site. When the vehicles d200 arrive at the vicinity of the event site, the instructor d160 instructs the vehicles d200 of a parking position at the event site allocated to the vehicle d200 (step S110d). Then, the process of the flowchart ends. In the process of step S108d, when a predetermined time exceeds the gathering time of the event, the flowchart may end.

As described above, according to the fifth embodiment, it is possible to gather the vehicles efficiently in accordance with the event and provide the service by the vehicles. According to the fifth embodiment, by gathering the plurality of vehicles capable of providing a variety of services to a specific area, it is possible to dynamically construct, for example, a facility such as a shopping mall. According to the fifth embodiment, for example, when a temporary event is held, it is possible to construct a facility providing a service quickly and remove the facility quickly after the event ends.

[First Modification of Fifth Embodiment]

Next, an event vehicle dispatch system d2 according to a first modification of the fifth embodiment will be described. According to the first modification of the fifth embodiment, an event vehicle dispatch device d100A notifies a user U who will use an event of the event and performs pick-up vehicle dispatch of a vehicle d200 to the user who participates in the event and desires pick-up.

Figure 93:
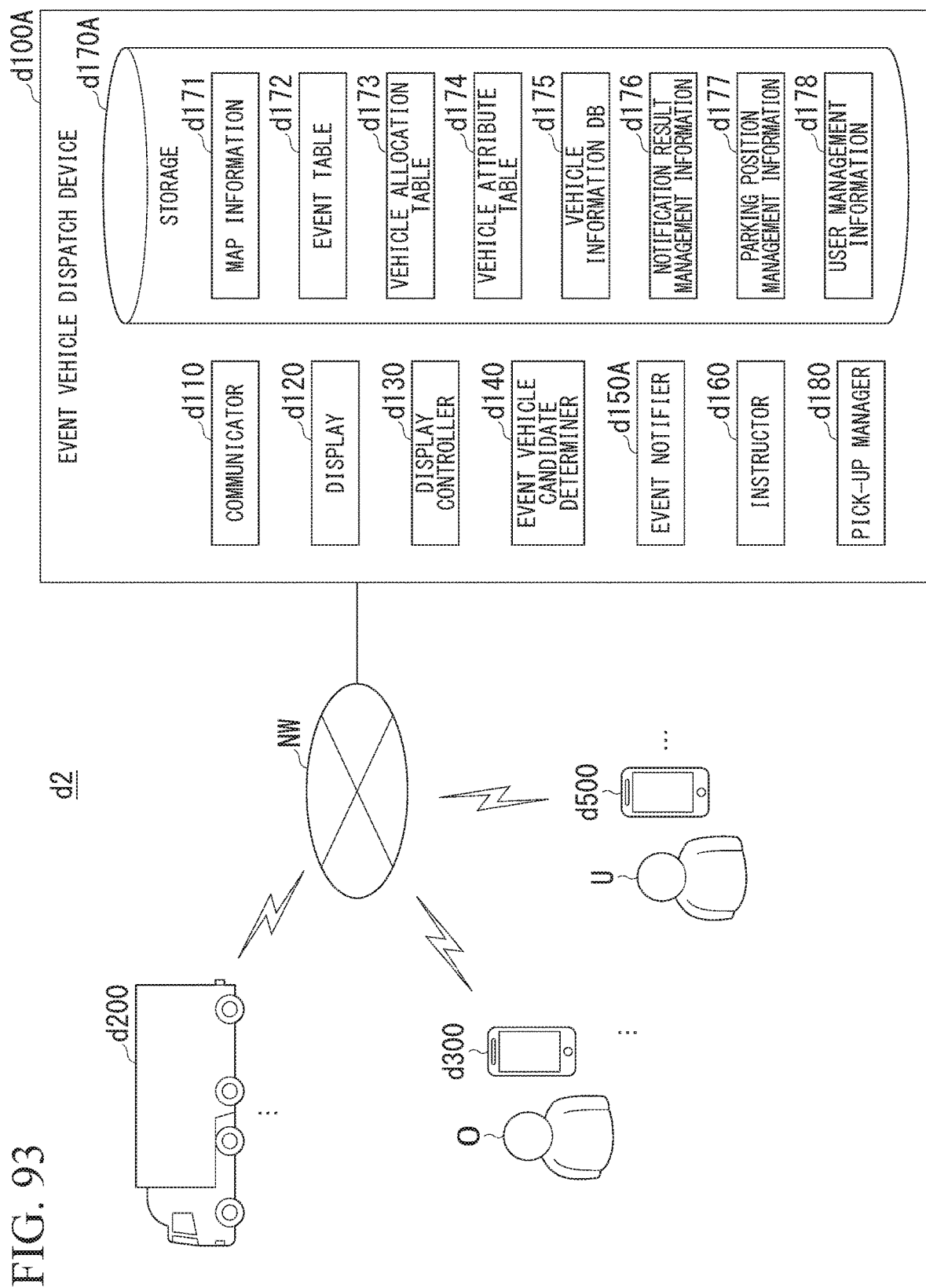
FIG. 93 is a configuration diagram of an event vehicle dispatch system d2 according to a first modified example of the fifth embodiment.

FIG. 93 is a diagram showing a configuration of the event vehicle dispatch system d2 according to the first modification of the fifth embodiment. In the event vehicle dispatch system d2, the terminal device d500 used by the system user U is connected to the network NW. Since the terminal device d500 has similar functions to those of the above-described terminal device d300, specific description thereof will be omitted herein. The event vehicle dispatch device d100A includes an event notifier d150A and a pick-up manager d180, and user manager information d178 is stored in the storage d170A. The functions of other constituent elements are the same as those of the fifth embodiment. Accordingly, in the following description, a function of the pick-up manager d180 will be described mainly.

The event notifier d150A notifies the terminal device d500 used by the user U of event information and pick-up confirmation information indicating whether to desire pick-up to the event site is confirmed using address information of the user U by using the event stored in advance in a user management information d178 in addition to the function of the event notifier d150 according to the fifth embodiment. Thus, the event information is notified on a screen of the terminal device d500.

Figure 94:
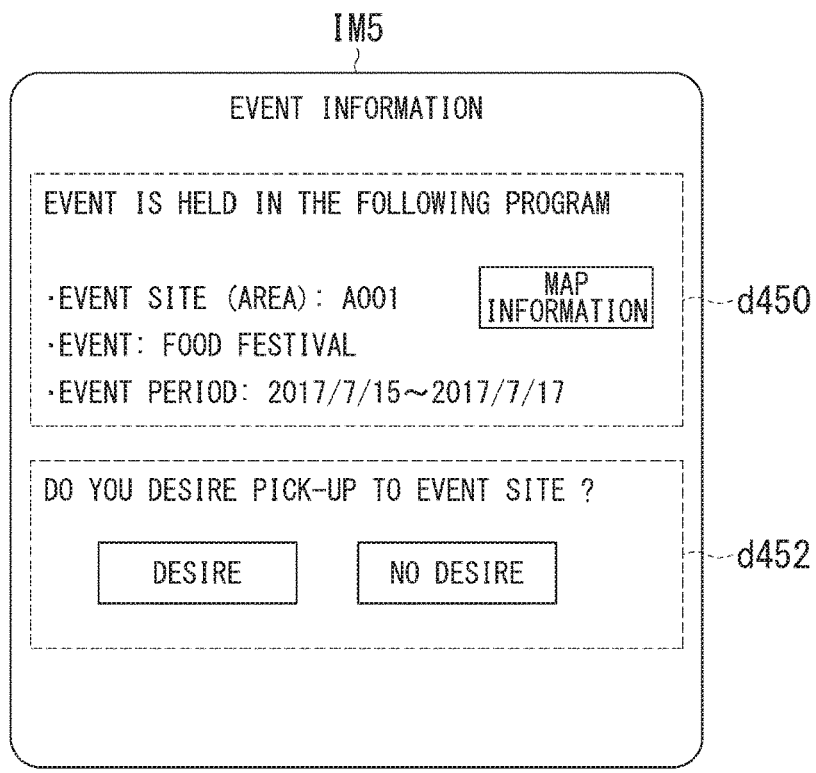
FIG. 94 is a diagram showing an example of an event information screen IM5 displayed on a terminal device d500.

FIG. 94 is a diagram showing an example of an event information screen IM5 displayed on the terminal device d500. On the event information screen IM5, an event information display region 450 and an event pick-up confirmation region 452 are shown. On the event information display region 450, information regarding an event site, event content, and an event period is shown. In the event pick-up confirmation region 452, two kinds of buttons for selecting whether to desire pick-up to the event site are shown.

When the user U confirms information shown in the event information display region 450 and thinks that the user U wants the pick-up to the event site, the user U selects a "Desire" button in the event pick-up confirmation region 452. When the user U does not want the pick-up, the user U selects a "No desire" button. The terminal device d500 receives a selection of the "Desire" button or the "No desire" button and transmits a received selection result to the event vehicle dispatch device d100A.

Figure 95:
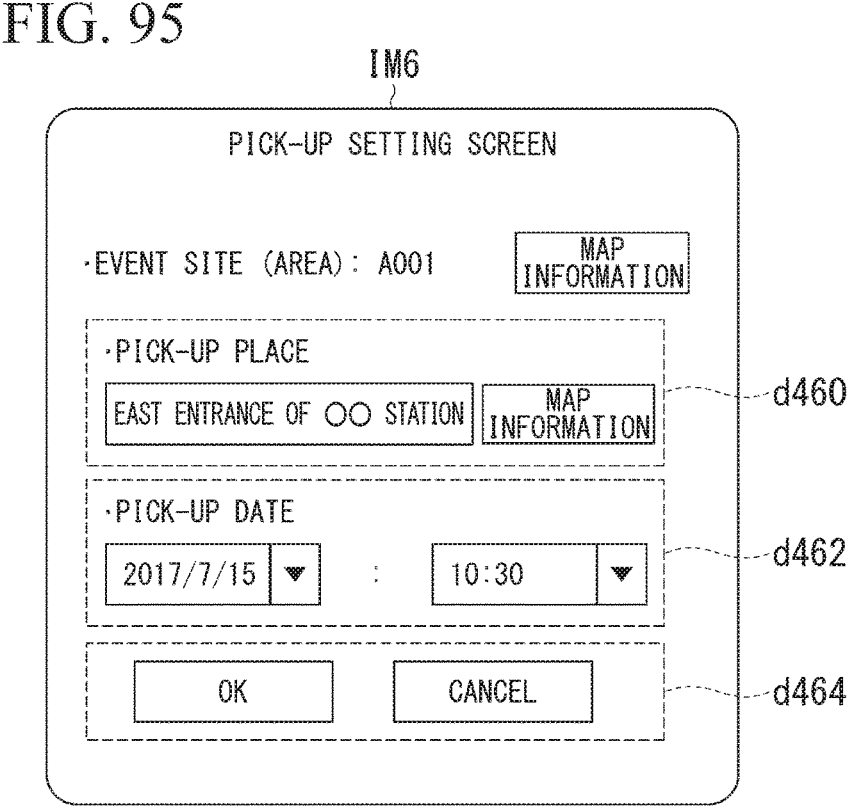
FIG. 95 is a diagram showing an example of a pick-up/drop-off setting screen IM6.

When the terminal device d500 receives a selection indicating desire for pick-up, the pick-up manager d180 of the event vehicle dispatch device d100A causes the terminal device d500 to display the pick-up setting screen IM6. FIG. 95 is a diagram showing an example of the pick-up setting screen IM6. On the pick-up setting screen IM6, information regarding the event site is shown. On the pick-up setting screen IM6, a pick-up place designation region d460 in which a pick-up place is designated, a pick-up date destination region d462 in which a pick-up date is designated, and a confirmation operation region d464 in which execution or cancellation of pick-up based on input content is confirmed are shown.

In the pick-up place designation region d460, a text box used for a user to designate a pick-up place is shown. The user U designates a pick-up place by inputting "east entrance of OO station" in the text box. In the pick-up place designation region d460, a map information button used to designate a place at which the user boards a pick-up vehicle is shown. When a selection of the map information button is received, a map including the map information d171 is displayed and a place selected by the user is set as a pick-up place.

In the pick-up date destination region d462, a date and a time are shown in two list boxes used for designation. In the list boxes, a date or a time corresponding to a period in which the event is held is shown. For example, in the list box of the date, "2017/7/15," "2017/7/16," and "2017/7/17" which are dates corresponding to dates on which the event is held are shown.

When the selection of an OK button is received in the confirmation operation region d464, the terminal device d500 receives a selection of a pick-up vehicle dispatch process and confirms cancellation of pick-up by receiving a selection of a cancellation button. The pick-up manager d180 may receive not only pick-up setting from the pick-up place to the event site but also pick-up setting from the event site to another place on the pick-up setting screen IM6.

The pick-up manager d180 stores information set on the pick-up setting screen IM6 in the user management information d178. FIG. 96 is a diagram showing an example of content of the user management information d178. In the user management information d178, a user address for communicating with the terminal device d500 used by the user U, a vehicle dispatch flag for identifying whether to perform vehicle dispatch to a user, a vehicle ID, a pick-up place arrival date, and a pick-up place are associated with the user ID for identifying the user U. A user registered in the user management information d178 is a user registered for notifying of information regarding an event in advance. The pick-up manager d180 registers the user address in association with the user ID at the time of registration of the user.

In the vehicle dispatch flag, information corresponding to whether to desire the pick-up to the event site by the user U is stored in accordance with the event pick-up confirmation region 452 of the event information screen IM5. In the example of FIG. 96, when the pick-up to the event site is desired, "1" is set in the vehicle dispatch flag. When the pick-up is not desired, "0" is set in the vehicle dispatch flag. When whether the user U desires the pick-up to the event site is not selected, the vehicle dispatch flag is blank.

When a vehicle for the pick-up is dispatched to the user, the pick-up manager d180 sets a pick-up place and a pick-up date set in the pick-up setting screen IM6 to the pick-up place and the pick-up place arrival date of the user management information d178. The pick-up manager d180 selects the vehicle d200 for the pick-up and stores the vehicle ID of the selected vehicle d200 in the user management information d178. The pick-up manager d180 notifies the selected vehicle d200 of information regarding the pick-up place arrival date or the pick-up place. The vehicle d200 notified of the information performs automated driving by the automated driving controller d250 to pick up the user U.

Figure 97:
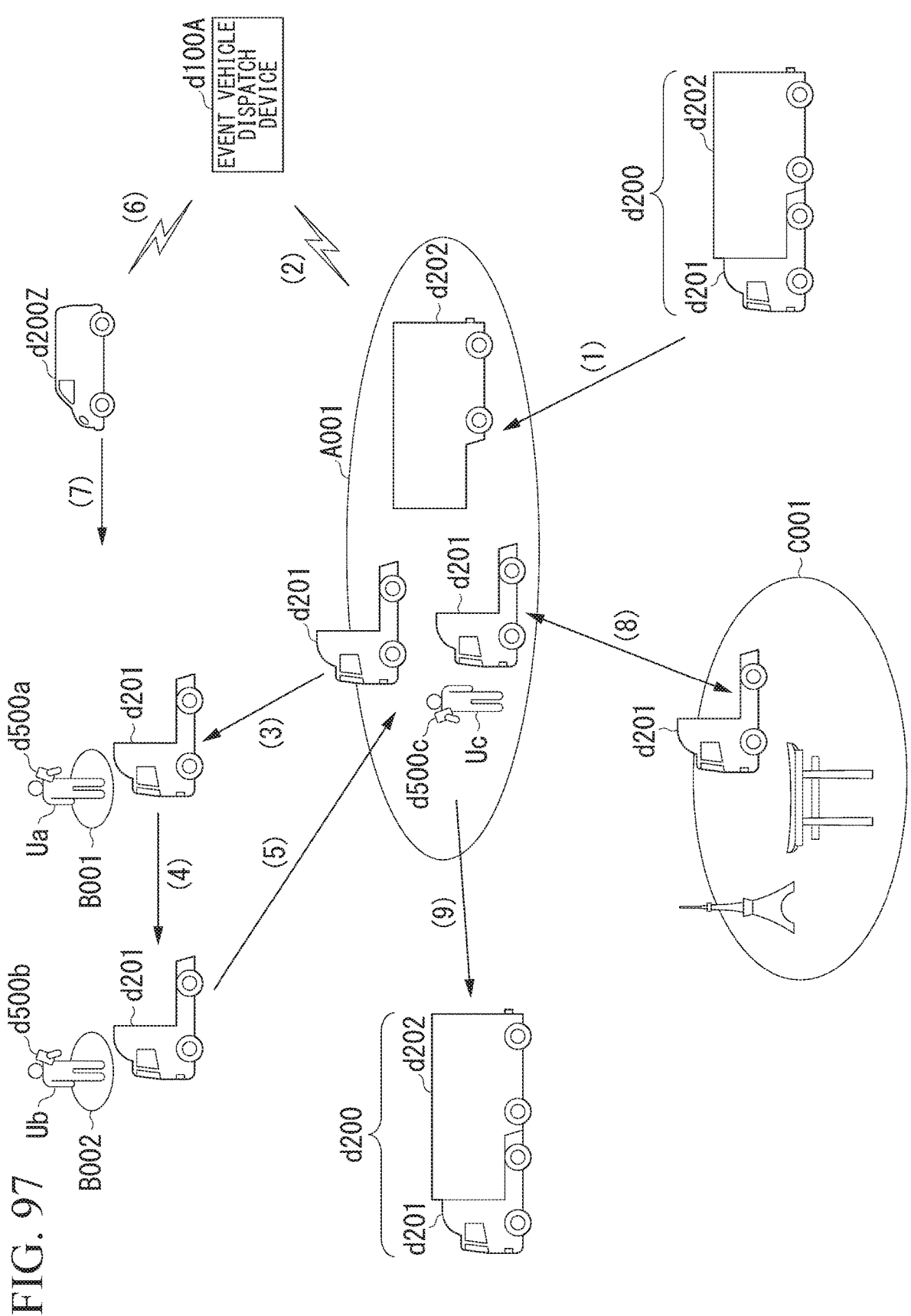
FIG. 97 is an explanatory diagram showing a pick-up/drop-off state using the vehicle d200.

FIG. 97 is a diagram showing an aspect of pick-up in which the vehicle d200 is used. In the example of FIG. 97, a pick-up pattern of the vehicle d200 according to the first modification of the fifth embodiment is shown. In the example of FIG. 97, the vehicle d200 is, for example, a trailer vehicle or a track vehicle that includes a vehicle body d201 and a cargo stand d202. The vehicle body d201 tows the cargo stand d202. The vehicle body d201 can be detachably connected to the cargo stand d202. The vehicle body d201 has a similar configuration to the configuration of the vehicle d200 shown in FIG. 79, as described above. The cargo stand d202 includes a facility that provides a service corresponding to a vehicle attribute.

For example, when the vehicle d200 moves to area "A001" of the event site to participate in the event and receives an instruction of a parking place from the event vehicle dispatch device d100A, the vehicle d200 parks at an instructed place ((1) in the drawing). Here, when pick-up setting is performed from the terminal device d500 of the user U entering the event, the pick-up manager d180 of the event vehicle dispatch device d100A selects the vehicle d200 to pick up the user U among one or more vehicles d200 parked in area "A001" and transmits a pick-up instruction including a pick-up time and a pick-up place to the selected vehicle d200 ((2) in the drawing).

The vehicle body d201 receiving the pick-up instruction generates a route of automated driving for arriving at the pick-up place at the pick-up time when there is no other traveling schedule during several hours before and after the pick-up time and the pick-up is possible. The vehicle body d201 detaches the vehicle body d201 from the cargo stand d202 and starts traveling to a target pick-up place to arrive at the pick-up place a predetermined time (for example, 5 minutes earlier) before the pick-up time.

For example, the vehicle body d201 allows a user Ua to board at place B001 ((3) in the drawing) and thereafter allows a user Ub to board at place B002 ((4) in the drawing). The vehicle body d201 may performs an authentication process when the users Ua and Ub are allowed to board. In this case, in terminal devices d500a and d500b respectively used by the users Ua and Ub, permission information for enabling the users to board the vehicle body d201 is registered in a memory. The vehicle body d201 acquires boarding permission information by communicating with the terminal devices d500a and d500b, performs boarding authentication for the users Ua and Ub, and allows the users to board when boarding is permitted.

The vehicle body d201 picks up the users Ua and Ub allowed to board to area "A001" ((5) in the drawing). The pick-up manager d180 issues route information in which a representative place (for example, a central place or a place equivalent to an entrance) of area "A001" is a transit place to the vehicle body d201 when a plurality of vehicles are disposed in area "A001." Thus, the vehicle body d201 can pick up the users Ua and Ub to an appropriate position of area "A001." In this way, by picking up the users U using the vehicle d200 participating in the event, it is possible to provide a service for improving convenience for the users. By causing the cargo stand d202 to remain parked in area "A001" and picking up the users using only the vehicle body d201, it is possible to improve fuel efficiency due to weight reduction and efficiently utilize the vehicle d200.

The pick-up manager d180 of the event vehicle dispatch device d100A may transmit a pick-up instruction to a vehicle d200Z which does not participate in the event ((6) in the drawing). When the pick-up is possible, the vehicle d200Z performs automated driving, allows the users U to board, and performs the pick-up to area "A001" ((7) in the drawing).

The vehicle body d201 may pick up a user U in area "A001" to a destination. For example, when a user Uc who does not use a lodging facility provided in the cargo stand d202 wants to move to a tourist site C001, pick-up setting is performed in the terminal device d500. The pick-up manager d180 of the event vehicle dispatch device d100A selects the vehicle d200 allowing the user to board to the designated tourist site C001 and outputs a pick-up instruction to the selected vehicle d200. The example of FIG. 97 is an example in which the vehicle body d201 generates a route to the tourist site, causes the automated driving controller d250 to perform automated driving along the generated route, and performs the pick-up to the tourist site C001 for the user Uc ((8) in the drawing). The vehicle body d201 may return to area "A001" after the vehicle body d201 allows the user Uc to get out at the tourist site C001 or may allow the user Uc who has done sightseeing to board again and perform the pick-up to area "A001."

When the cargo stand d202 of the vehicle d200 is a lodging facility, the vehicle d200 may be moved to another place while the cargo stand d202 may be used as the lodging facility ((9) in the drawing). For example, when the vehicle is moved to a next destination in the night, the vehicle d200 moves in a state of connection with the cargo stand which is a lodging facility so that a user can be moved while the user sleeps. Thus, since movement to a subsequent destination during sleeping hours is possible, an efficient travel plan can be executed. When the vehicle d200 moves with each cargo stand d202, for example, a user can travel around each tourist site while lodging.

[Process Flow]

Figure 98:
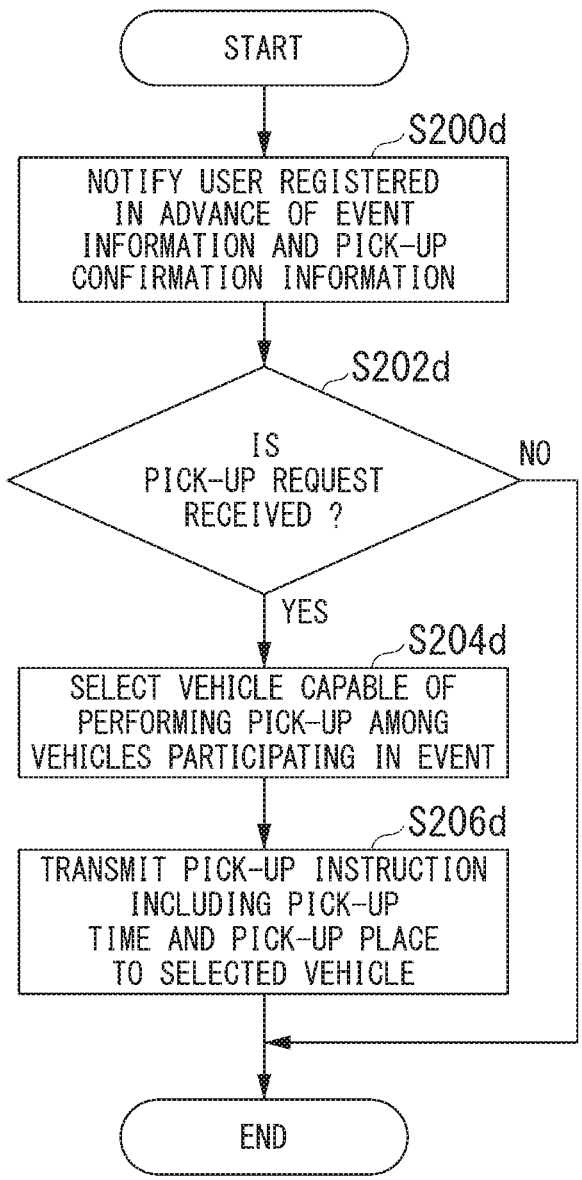
FIG. 98 is a flowchart showing an example of a flow of a process to be executed by an event vehicle dispatch device d100A according to the first modified example of the fifth embodiment.

Next, a flow of a process performed by the event vehicle dispatch device d100A according to the first modification of the fifth embodiment will be described. FIG. 98 is a flowchart showing an example of a flow of a process performed by the event vehicle dispatch device d100A according to the first modification of the fifth embodiment. FIG. 98 shows an example of a process performed in addition to the process performed by the above-described event vehicle dispatch device d100.

The event notifier d150A notifies a user registered in advance of the event information and the pick-up confirmation information (step S200d). Subsequently, the pick-up manager d180 determines whether a pick-up request is received from the user U (step S202d). When the pick-up request is received, the pick-up manager d180 selects a vehicle capable of performing the pick-up among the vehicles d200 participating in the event (step S204d). Subsequently, the pick-up manager d180 transmits a pick-up instruction including a pick-up time and a pick-up place to the selected vehicle d200 (step S206d). Then, the process of the flowchart ends.

As described above, according to the first modification of the fifth embodiment, it is possible to perform the pick-up for users using an event using an automated driving vehicle in addition to similar advantageous effects to those of the fifth embodiment. Further, according to the first modification of the fifth embodiment, by performing the pick-up using a vehicle providing a service at an event, it is possible to efficiently use the vehicle.

Application Example

Next, an application example in which a vehicle is used in the fifth embodiment and the first modification of the fifth embodiment will be described. A travel plan in which it is assumed that the vehicle d200 moves during lodging using a lodging facility of the vehicle d200 in the fifth embodiment and the first modification of the fifth embodiment can be provided, for example, in the navigation device d230 of the vehicle d200.

Figure 99:
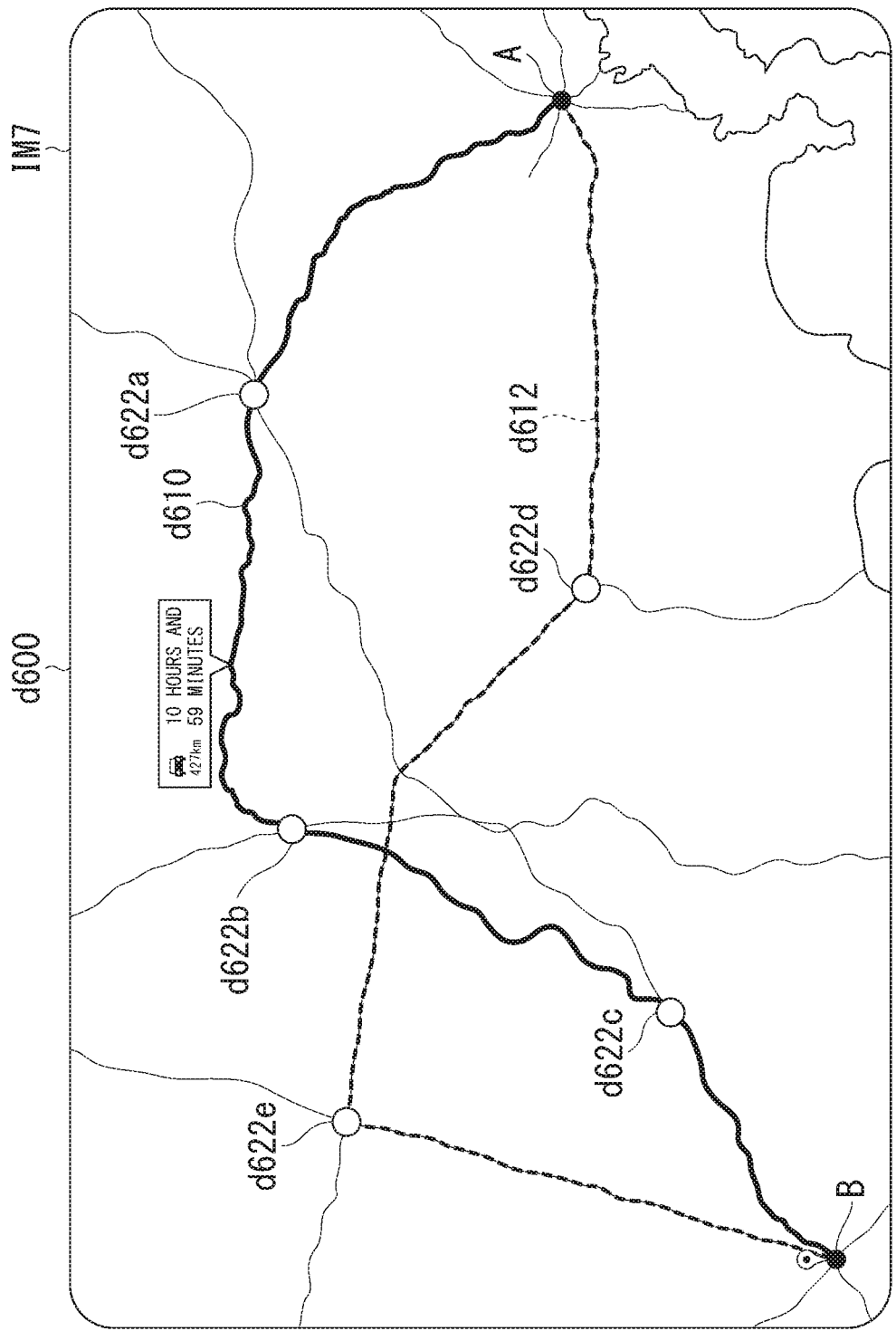
FIG. 99 is a diagram showing an example of a travel plan navigation screen IM7.

FIG. 99 is a diagram showing an example of a navigation screen IM7 of a travel plan. On the navigation screen IM7, a route is generated by the navigation device d230 when an occupant sets a destination. In this case, the navigation device d230 generates a route along which the user lodges at tourist sites on the way to the destination, as described above, and displays the generated route as the navigation screen IM7 in the HMI d232. On the navigation screen IM7, a route d610 from a current place (a place A in the drawing) to a destination (a place B in the drawing) of the vehicle d200 is generated in a map image 600. On the navigation screen IM7, the route d610 along which the vehicle goes through a plurality of parking areas d622a to d622c in which lodging is possible until the vehicle arrives at the place B from the place A is displayed. The parking areas d622a to d622c are, for example, places at which the plurality of vehicles d200 gather in accordance with the event provided according to the fifth embodiment and the first modification of the fifth embodiment. The parking areas d622a to d622c may be places at which night scenery is beautiful or places, tourist attractions, or the like at which regional specialties can be eaten and drunk.

On the navigation screen IM7, another route d612 along which the vehicle can arrive at the destination via other parking areas d622d and d622e is displayed. The occupant performs navigation of the vehicle d200 by selecting either the route d610 or d612.

The above-described routes may be generated by the event vehicle dispatch device d100A. In this case, for example, the terminal device d500 used by the user U transmits information regarding the current position and the destination to the event vehicle dispatch device d100A. The event vehicle dispatch device d100A can perform travel using the allocated vehicle d200 by performing generation of route candidates and allocation or the like of the vehicle based on information acquired from the terminal device d500, transmitting information regarding the generated route candidates and the allocated vehicle to the terminal device d500, and allowing the user U to select a route.

In this way, according to the application example, it is possible to provide the travel plan in which the lodging facility of the vehicle d200 is assumed. Thus, for example, it is possible to utilize inland cities as relay places to the destination and employ the inland cities for regional vitalization or the like of the inland cities. According to the application example, the vehicle d200 can provide an optimum route for enjoying tourist sites or the like without depending on a travel time or a travel distance. According to the application example, it is possible to provide a service in which a lodging function is added to long-haul movement and it is possible to provide a lodging movement service along a route selected by the user more freely compared to a sleeping train or an express bus.

[Second Modification of Fifth Embodiment]

Figure 100:
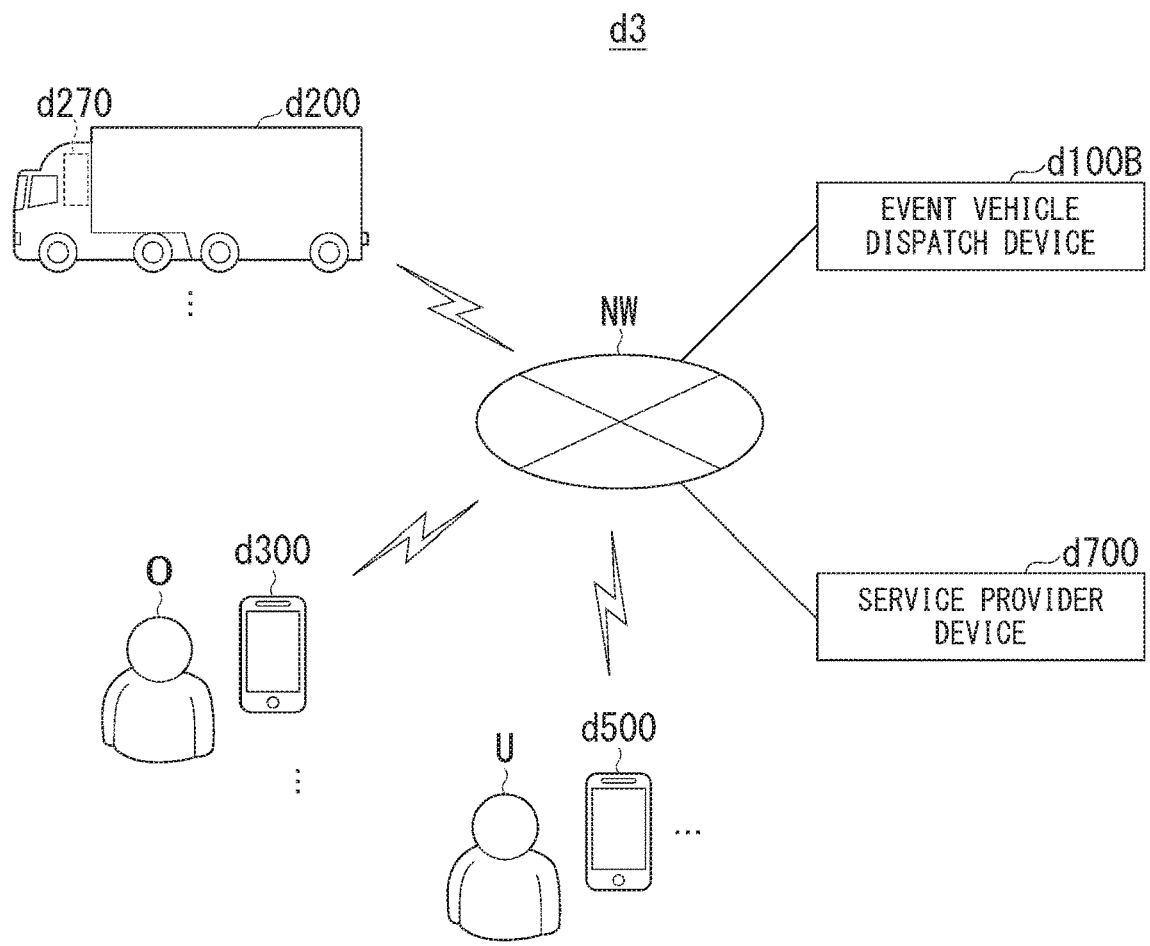
FIG. 100 is a configuration diagram of an event vehicle dispatch system d3 according to a second modified example of the fifth embodiment.

Next, an event vehicle dispatch system d3 according to a second modification of the fifth embodiment will be described. In the second modification of the fifth embodiment, an external service provider (a service provider or a third party) provides at least a part of the event dispatch service. FIG. 100 is a diagram showing a configuration of the event vehicle dispatch system d3 according to the second modification of the fifth embodiment. The event vehicle dispatch system d3 includes an event vehicle dispatch device d100, one or more vehicles d200, the terminal devices d300 used by the owners O of the one or more vehicles d200, the terminal device d500 used by the user U, and a service provider device d700 used by an external service provider. These constituent elements can communicate with one another via the network NW. Hereinafter, a function of each of the terminal device d300, the vehicle d200, the terminal device d500, the event vehicle dispatch device d100B, and the service provider device d700 will be described.

[Terminal Device d300]

The terminal device d300 receives an operation from the owner O to designate a date and time, an area, and the like at which an event is held and transmits the designated information to the event vehicle dispatch device d100B. Here, the owner O may be an event owner who holds an event in addition to the owner of the vehicle d200 or may be a predetermined organization such as a local government. The terminal device d300 may order an additional service to the service provider device d700.

[Vehicle]

In the second modification of the fifth embodiment, in a configuration related to travel control of the vehicle d200 (for example, a configuration related to automated driving), a vehicle management device d270 is mounted in addition to the configuration in which the vehicle d200 in the first embodiment is included. Accordingly, the configuration of the vehicle management device d270 will be mainly described below.

Figure 101:
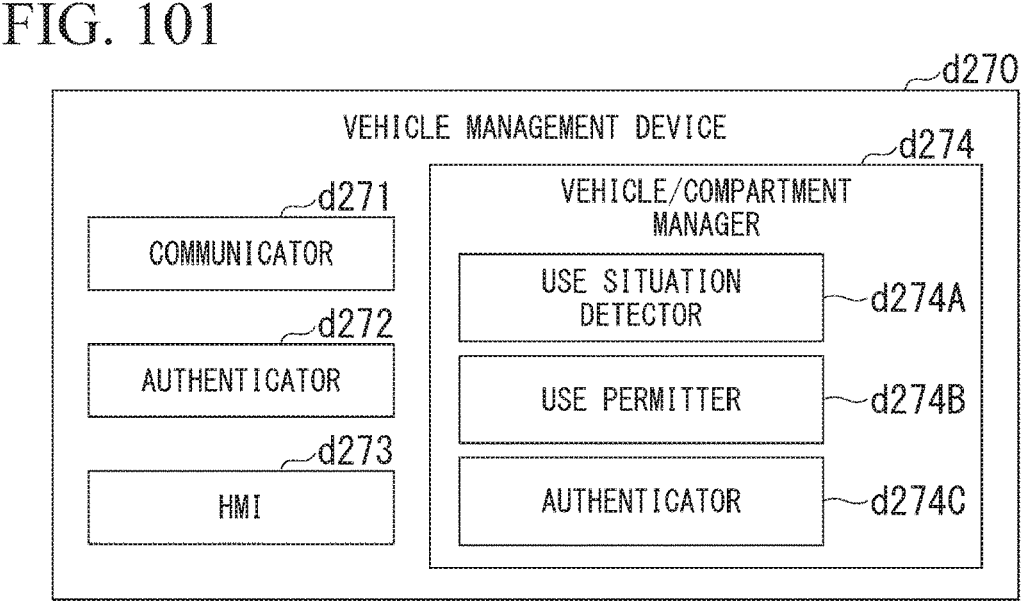
FIG. 101 is a diagram showing an example of a configuration of a vehicle management device d270 mounted on the vehicle d200 according to the second modified example of the fifth embodiment.

FIG. 101 is a diagram showing an example of a configuration of the vehicle management device d270 mounted in the vehicle d200 according to the second modification of the fifth embodiment. The vehicle management device d270 includes, for example, a communicator d271, an authenticator d272, an HMI d273, and a vehicle/compartment manager d274. The communicator d271 is, for example, a wireless communication device. The communicator d271 communicates with the event vehicle dispatch device d100B via the network NW. The authenticator d272 performs an authentication process to start the service in accordance with an instruction of the event vehicle dispatch device d100B. The HMI d273 is a touch panel display device (display), a speaker, a microphone, or any of various operational switches provided apart from the HMI d232. The HMI d273 may include not only a vehicle interior interface but also a vehicle exterior interface.

The vehicle/compartment manager d274 includes, for example, a use situation detector d274A, a use permitter d274B, and an authenticator d274C. In the vehicle d200, one or more spaces (compartments) which can be used by the user U are provided. The compartment is, for example, a placement region or the like in which a seat or luggage is placed. For example, the compartment may be a region divided by a predetermined partition. The vehicle/compartment manager d274 controls a mechanism that drives a seat or a placement region and changes a seat into a placement region or changes a placement region into a seat. Further, for example, the vehicle/compartment manager d274 accommodates a seat in an accommodation portion that accommodates the seat or takes out the seat accommodated in the accommodation portion from the accommodation portion.

The use situation detector d274A detects a use situation of each compartment. For example, the use situation detector d274A detects whether each compartment is in use. In FIG. 100, a trailer vehicle is shown as the vehicle d200, but the vehicle d200 may be a vehicle such as a passenger car, a bus, or a microbus that has a size in which one or more occupants of the compartments divided inside the vehicle can board. For example, when authentication by the authenticator d274C succeeds, the use permitter d274B permits to use a compartment designated in advance and, for example, unlocks a door. The authenticator d274C performs authentication such as identity verification of the user U who will board.

For example, the vehicle management device d270 transmits vehicle information including the following content to the event vehicle dispatch device d100B.

[Vehicle Information]
  Vehicle ID
  Positional information (latitude, altitude, and longitude)
  Compartment use situation (a user ID of a service user who is using the compartment which is in use, information regarding usable compartments, or the like)
  Traveling state (a speed, acceleration, angular velocity, in-vehicle device state, or the like)
  Information regarding a service provider (an ID of a service provider, information regarding a service which is in operation, a service execution elapsed time, or the like)

[Terminal Device d500]

The terminal device d500 transmits, for example, service use request information including the following content to the event vehicle dispatch device d100B. The positional information is, for example, information obtained through positioning by a GPS receiver included in the terminal device d500. Other information is based on information input by the user U in principle. Use desire service provider attribute information is, for example, information regarding an attribute of a service provider desired by the user U. The attribute may include, for example, age, sex, and personality (type) in addition to a kind of service to be provided. For the attribute, the event vehicle dispatch device d100B may present a service provider to the user U for selection or confirmation rather than allocating a completely matched service provider in a fixed manner.

[Service Use Request Information]
  User ID
  Positional information (latitude, altitude, and longitude)
  Use desire space information (for example, expressed in accordance with the number of people, the number of seats, or the like)
  Use desire service provider attribute information
  Use desire service ID
  Use desire section information (information regarding a first section)
  Information regarding a period of time of service use desired by the user U
  Settlement authentication information

[Service Provider Device]

Figure 102:
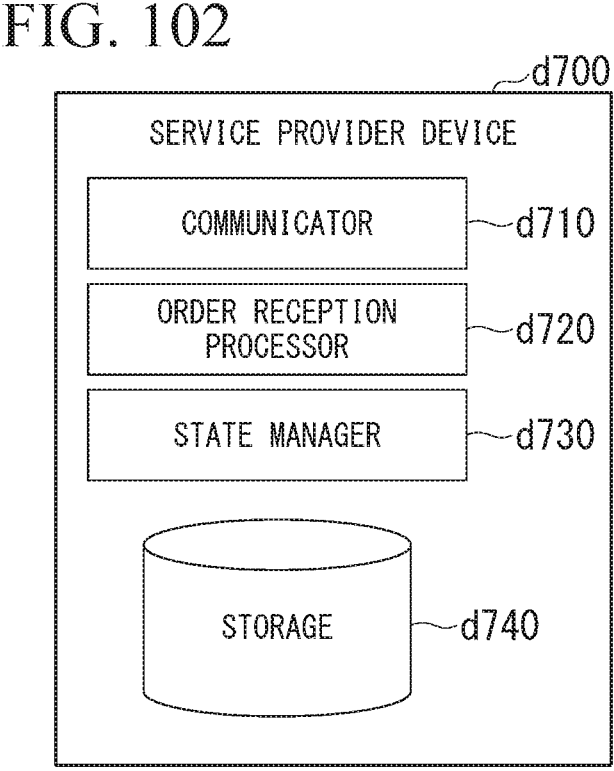
FIG. 102 is a diagram showing an example of a configuration of a service provider device d700 according to the second modified example of the fifth embodiment.

FIG. 102 is a diagram showing an example of a configuration of the service provider device d700 according to the second modification of the fifth embodiment. The service provider device d700 is, for example, a device that can ascertain a plurality of service provider states and automatically responds to an order from the event vehicle dispatch device d100B. The service provider device d700 includes, for example, a communicator d710, an order reception processor d720, a state manager d730, and a storage d740. The order reception processor d720 and the state manager d730 are realized, for example, by causing a processor such as a CPU to execute a program (software) stored in the storage d170. Some or all of the function units may be realized by hardware (a circuit including circuitry) such as an LSI, an ASIC, an FPGA, or a GPU, or may be realized by software and hardware in cooperation. The program may be stored in advance in the storage d740 such as an HDD or a flash memory or may be stored in a storage medium detachably mounted on a DVD, a CD-ROM, or the like so that the storage medium is mounted on a drive device (not shown) and is installed on the storage d740. The service provider device d700 may include a part or the entirety of the configuration of the event vehicle dispatch device d100B.

The communicator d710 communicates with the event vehicle dispatch device d100B, the vehicle d200, the terminal device d300, or the like via the network NW. The order reception processor d720 performs an order reception process on a service order from the event vehicle dispatch device d100B. The order reception processor d720 determines whether the order content of the service is within a range of service provision information already transmitted to the event vehicle dispatch device d100B. When the order reception processor d720 determines that the order content is within the range, the order reception processor d720 first performs the order reception process. The state manager d730 manages the service provider states (a reservation state, an activation state, and the like) registered in the service provider device d700 and provides the service provision information including the following content to the event vehicle dispatch device d100B.

For example, the service provider device d700 transmits the service provision information to the event vehicle dispatch device d100B. The service provision information is information regarding a service of which an order can be received by the service provider.

[Service Provision Information]
  Order reception ID
  Service name
  Information regarding a person in charge of execution
  Service provider attribute information
  Information regarding a period of service provision time desired by a service provider
  Necessary vehicle compartment information
  Information regarding region in which a service can be provided
  Necessary vehicle compartment information
  Information regarding an area in which an order can be received
  Information regarding a time at which an order can be received
  Facility position information (service provision place information outside vehicle)
  Service status When there is a control request for the compartment or a request for providing contents from the event vehicle dispatch device d100B, the service provider device d700 transmits contents to the vehicle management device d270 in response to the request. In this case, a storage device of the service provider device d700 stores various kinds of contents associated with content IDs. The various kinds of contents may be stored in advance in the storage device of the event vehicle dispatch device d100B. The order reception processor d720 transmits a control signal of the compartment based on a control request or information regarding vehicle exterior display or vehicle interior display of the contents for each compartment to the vehicle management device d270 and causes the vehicle d200 to perform predetermined contents display. The order reception processor d720 may receive an order of an additional service from the terminal device d300 or the like and causes the vehicle management device d270 to perform control based on the reception of the order.

The storage d740 is realized as an HDD, a flash memory, a RAM, a ROM, or the like. The storage d740 stores the service provision information and other information.

[Event Vehicle Dispatch Device]

Figure 103:
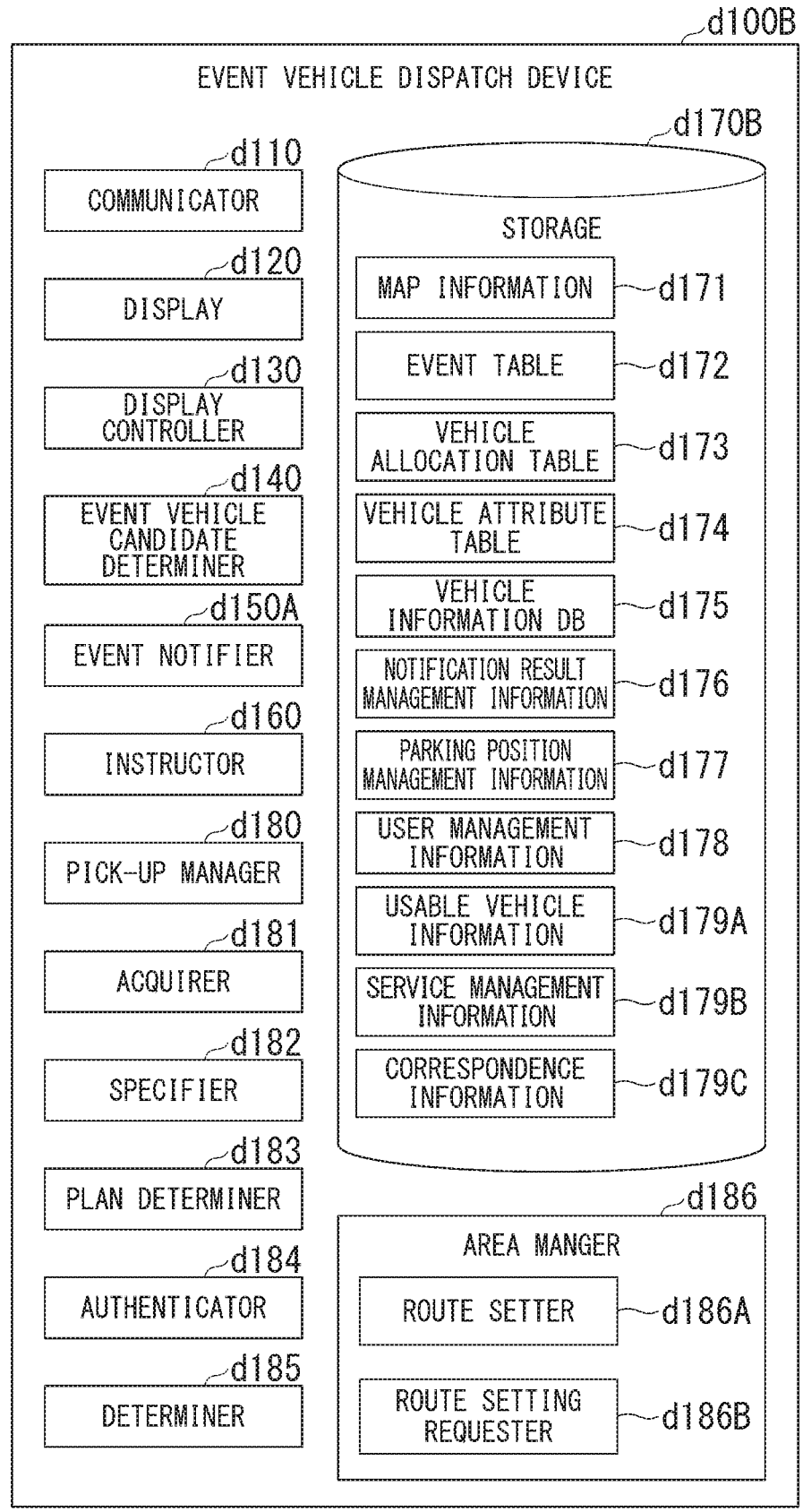
FIG. 103 is a diagram showing an example of the configuration of an event vehicle dispatch device d100B according to the second modified example of the fifth embodiment.

FIG. 103 is a diagram showing an example of a configuration of the event vehicle dispatch device d100B according to the second modification of the fifth embodiment. The event vehicle dispatch device d100B includes an acquirer d181, a specifier d182, a plan determiner d183, an authenticator d184, a determiner d185, and an area manager d186 compared to the configuration of the event vehicle dispatch device d100A according to the second embodiment. Accordingly, functions of the acquirer d181, the specifier d182, the plan determiner d183, the authenticator d184, the determiner d185, and the area manager d186 will be mainly described below.

The acquirer d181 acquires service use request information from the terminal device d500 via the communicator d110. The acquirer d181 acquires vehicle information from the vehicle management device d270 of the vehicle d200 registered in advance via the communicator d110. The acquirer d181 acquires the service provision information from the service provider device d700 via the communicator d110.

The specifier d182 specifies an area in which a plurality of vehicles can be parked based on information regarding a date or an area in which an event is held from the terminal device d300. The specifier d182 specifies the usable vehicle d200 based on the service use request information and the vehicle information and generates usable vehicle information. Specifically, the specifier d182 compares the use desire space information, the use desire section information, and information regarding a period of time of service use desired by the user U included in the service use request information with positional information included in the vehicle information and a compartment use situation, specifies a vehicle satisfying a condition that the positional information and the compartment use situation are included in the service use request information as the usable vehicle d200, and generates information regarding the specified vehicle d200 as the usable vehicle information.

The plan determiner d183 specifies available information which can be enjoyed by the user U based on the usable vehicle information and the service provision information and supplies information regarding the specified available service as an event status to the terminal device d500 of the user U via the event notifier d150A. Specifically, the plan determiner d183 sets a second section in which the service provider occupies at least a part (for example, a compartment) of the vehicle d200 based on the usable vehicle information and the service provision information and sets a third section in which the user U occupies at least a part of the vehicle d200 based on an overlapping portion of the second section and the use desire section information (the information regarding the first section) in the service use request information. When the service providers already boards the vehicle d200 before setting of the first section, the plan determiner d183 may set the first section and set the second section using a current position of the vehicle d200 as a starting point.

The plan determiner d183 may set information regarding a service providable region included in the service provision information and the third section within the overlapping range of the first section. Further, the plan determiner d183 may set the third section so that a period of time in which the user U occupies at least a part of the vehicle d200 matches information regarding a service usable period of time desired by the service user and a period of time in which the service provider occupies the vehicle matches information regarding a service provision period of time desired by the service provider. Then, the plan determiner d183 specifies an available service based on the set third section.

When the plurality of service providers sequentially provide services to a certain user U, the plan determiner d183 may set the second section to correspond to each of the plurality of service providers and set the plurality of third sections corresponding to each second section.

As another function, the plan determiner d183 may update the first section so that the first section ends at a service provision place outside the vehicle in response to an instruction from the user U using the terminal device d500. In this case, the plan determiner d183 may transmit reservation information to a facility which is at the service provision place outside the vehicle using the communicator d110 in response to an instruction from the user U using the terminal device d500 (or automatically) and receive a reservation result through the communicator d110, and may transmit the reservation result to the terminal device d500 of the user U using the communicator d110.

The instructor d160 instructs the vehicle d200 of a route along which the vehicle d200 will travel by causing the communicator d110 to transmit information regarding a use start position and a use end position of the user U and information regarding a use start position and a use end position of the service provider to the vehicle d200. The instructor d160 instructs each of the plurality of vehicles of a parking position so that the plurality of vehicles arriving at an event-held area are disposed at predetermined positions within the area.

The authenticator d184 performs authentication of the user U through communication with the terminal device d500 or authentication at a service provision start time.

The determiner d185 determines whether the vehicle d200 is used with regard to each of the service providers and the user U.

The plan determiner d183 performs various processes using a determination result of the determiner d185. For example, the plan determiner d183 may receive a change in the first section (update the first section) only in a case where the determiner d185 determines that both the user U and the service provider use the vehicle d200. This case arises, for example, when the service provider makes a suggestion to the user U to change a destination or a final destination is changed during a service based on information provided to the side of the vehicle d200. When the determiner d185 determines that the user U has already used the vehicle d200 (that is, the user extends the service or requests another service during using the service) at a time point at which the acquirer d181 receives the service use request information, the plan determiner d183 may preferentially allocate the vehicle d200 which is being used to the user U.

The storage d170B stores usable vehicle information d179A, service management information d179B, and correspondence information d179C in addition to the information stored in the storage d170A. The service management information d179 includes, for example, service request management information, reservation management information, and service management information during execution. In the service request management information, for example, each piece of service use request information acquired by the acquirer d181 is registered as a record. In the reservation management information, information regarding a reservation use section, a reservation use period of time, a transit place, an estimated time of arrival at the transit place, and the like are stored for each service. The service management information during execution, information regarding a service status, a service attribute, a service provider ID, and the like is registered. The correspondence information d179C is information transmitted from the terminal device d500 or the vehicle management device d270 and is information in which a user ID (or a driver ID driving a vehicle), a vehicle ID, and a contents ID requested by the user for use are associated with one another.

In the correspondence information d179C, a contents provision provider ID, a contents use target area ID, a contents use time, a contents interest index, and the like are associated with the contents ID. The content use target area ID is, for example, an ID indicating an area in which contents can be used. The contents use time is, for example, a time at which the contents can be used.

The area manager d186 notifies of the area information acquired by the specifier d182 based on the vehicle attribute of each of the plurality of vehicles, acquires information regarding arrival of the vehicle d200 at the area, and manages the event-held area. The area manager d186 includes, for example, a route setter d186A and a route setting requester d186B. The route setter d186A sets a route used for the unmanned vehicle d200 to arrive at the area and transmits the set route to the vehicle d200 when the vehicle d200 is an automated driving vehicle. The route setting requester d186B notifies vehicles other than the automated driving vehicle of route information to the event-held area. Thus, appropriate route information can be transmitted in accordance with the kinds of vehicles d200 and the vehicles can be guided to the event-held area.

According to the second modification of the fifth embodiment, the event notifier d150A notifies the vehicle d200 or the owner O of the vehicle d200 within a predetermined distance from the position of the area of the area information. The event notifier d150A notifies the terminal device d500 or the like of dynamic relevant information acquired from the vehicle d200 within the area or the supervisor of the vehicle d200 as event status information.

Figure 104:
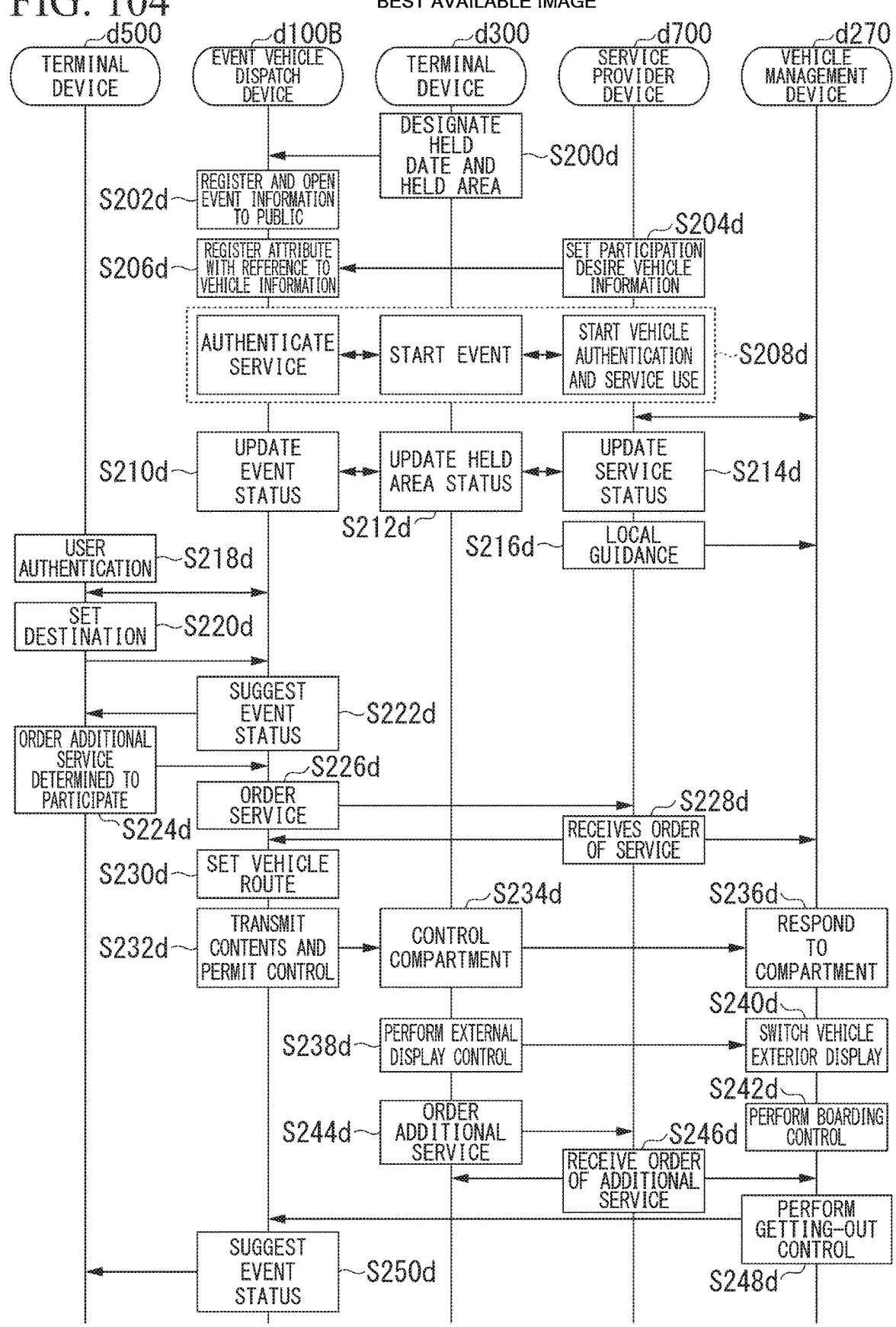
FIG. 104 is a sequence diagram showing an example of a flow of a process of the event vehicle dispatch system d3 according to the second modified example of the fifth embodiment.

FIG. 104 is a sequence diagram showing an example of a flow of a process of the event vehicle dispatch system d3 according to the second modification of the fifth embodiment. In the example of FIG. 104, processes in the terminal device d500 used mainly by the user, the event vehicle dispatch device d100B, the terminal device d300 used by the owner O, the service provider device d700, and the vehicle management device d270 will be mainly described.

First, information regarding an held date and a held area of an event designated by the owner O is transmitted from the terminal device d300 to the event vehicle dispatch device d100B (step S200d). The owner O may be an individual owner such as an owner of the vehicle d200, a predetermined organization such as a local government, or the like. The event vehicle dispatch device d100B registers information regarding event and opens a web, a mail, or the like to the public (step S202d). Subsequently, the service provider device d700 acquires the event information opened to the public by the event vehicle dispatch device d100B, sets a desire to participate in the event and vehicle information (a desired attribute such as a store) for participating in the event in the acquired event information, and transmits the event information to the event vehicle dispatch device d100B (step S204d). Subsequently, the event vehicle dispatch device d100B registers the desired attribute with reference to the vehicle information from the service provider device d700 (step S206d). In this way, when the vehicle (store) determines to participate in a service, an attribute (a kind of service) is added to the event. Thus, service authentication by the event vehicle dispatch device d100B and start of vehicle authentication and service use by the service provider device d700 are notified of, and the terminal device d300 is notified of start of the event (step S208d). The service provider device d700 transmits information to start the service use to the vehicle management device d270 of the participating vehicle d200 so that the service can be provided to the vehicle d200.

Subsequently, the event vehicle dispatch device d100B manages an arrival state or the like of the vehicle d200 and dynamically updates an event status of the event vehicle dispatch device d100B based on an empty state or the like of the parking region (step S210d). The terminal device d300 acquires the held area status updated dynamically to correspond to the event status or the like (step S212d). The service provider device d700 acquires the service status dynamically updated to correspond to the event status, the held area status, or the like (step S214d). Thus, an event participant can obtain latest status information at a timing at which the event is used. The service provider device d700 may perform local guidance to the held area as necessary, on the vehicle management device d270 of the individual vehicle (step S216d).

Subsequently, the terminal device d500 performs user authentication with the event vehicle dispatch device d100B (step S218d). Subsequently, the terminal device d500 sets a destination and transmits the set destination to the event vehicle dispatch device d100B (step S220d). The event vehicle dispatch device d100B transmits the latest dynamic event status to the terminal device d500 (step S222d). The terminal device d500 transmits a participation desire based on the latest event status in the case of participation in the event and transmits information indicating that an additional service (for example, pick-up) is desired to the event vehicle dispatch device d100B in the case of the desire of the additional service in accordance with the participation desire (step S224). When the additional service is ordered, the event vehicle dispatch device d100B transmits order information to the service provider device d700 (step S226d). The service provider device d700 receives the order of the service, prepares for the vehicle, and transmits a signal indicating the preparation of the vehicle to the event vehicle dispatch device d100B (step S228d).

Subsequently, the event vehicle dispatch device d100B sets a route for the prepared vehicle (step S230d). Subsequently, the event vehicle dispatch device d100B transmits contents information to be output to the compartmented region of the vehicle d200 and transmits permission to display contents to the terminal device d300 (step S23d2). The terminal device d300 permits control of the compartment such as display, a function, or the like in response to an instruction from an event owner (or a store vehicle) to the vehicle of the participating user and transmits the compartment information to the vehicle management device d270 (step S234d). When the vehicle management device d270 acquires the compartment information, the vehicle d200 performs predetermined control in response to this information and (step S236d).

When the contents information is acquired from the event vehicle dispatch device d100B, the terminal device d300 transmits external display control for the acquired contents to the vehicle management device d270 (step S238d). When the contents information is acquired, the vehicle management device 270d causes the vehicle exterior display of the HMI d273 to display the contents responded to the contents information (step S240d).

Thereafter, the vehicle management device d270 performs boarding control so that the user U can board (step S242d). Subsequently, the terminal device d300 orders an additional service by inviting another service provider at any timing (step S244d). When the order of the additional service is received, the service provider device d700 transmits the fact indicating the reception of the order to the terminal device d300, transmits content of the additional service to the vehicle management device d270 of the same vehicle or another vehicle, and causes the vehicle management device d270 to perform the additional service (step S246d). Subsequently, the vehicle management device d270 performs getting-out control of the user U (step S248d). The service after the boarding may be continued. For example, the event vehicle dispatch device d100B suggests an event status to the terminal device d500 (step S250d). Thus, for example, by transmitting pick-up information or the like for return to the terminal device d500, it is possible to guide the user U to a specific vehicle or store. In addition, each of the above-described first to third embodiments may be combined with some or all of other embodiments.

Sixth Embodiment

Figure 105:
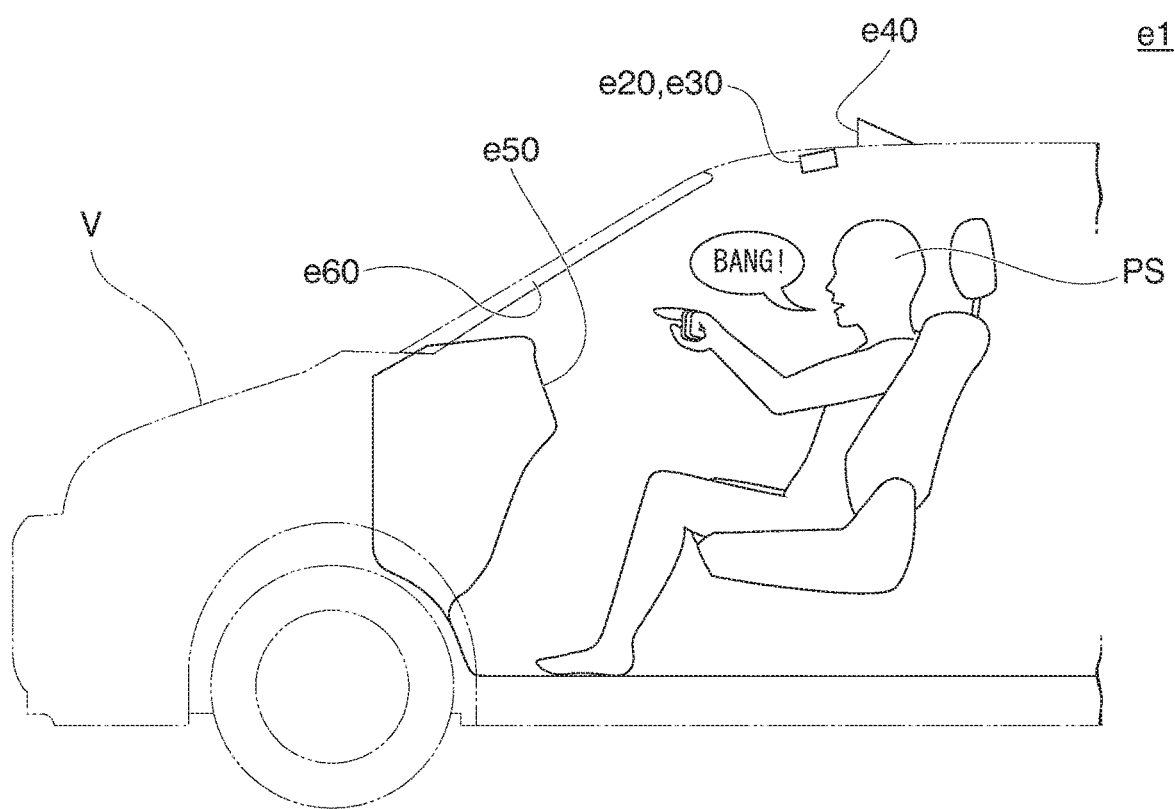
FIG. 105 is a diagram showing an outline of an in-vehicle performance device e1 according to a sixth embodiment.

Hereinafter, a sixth embodiment of the present invention will be described with reference to the drawings. In the sixth embodiment, an in-vehicle performance device e1 to which the vehicle of the first embodiment is applicable will be described. FIG. 105 is a diagram showing an overview of an in-vehicle performance device e1 according to the sixth embodiment. The in-vehicle performance device e1 is a device that provides entertainment to an occupant (hereinafter referred to as an occupant PS) in a vehicle (hereinafter referred to as a vehicle V) who is moved by the vehicle V. The in-vehicle performance device e1 performs, for example, a shooting game in which an object present in a surrounding environment of the vehicle V is a shooting target during a movement of the vehicle V. In an example of the first embodiment, the vehicle V travels according to automated driving. The in-vehicle performance device e1 is disposed in the vehicle V. Further, a sound detector e20, a motion detector e30, an imager e40, an input e50, and a display e60 are disposed in the vehicle V.

The sound detector e20 detects sound that is emitted by the occupant PS. The sound detector e20 is, for example, a microphone. The motion detector e30 detects a motion of the occupant PS. The motion detector e30 is, for example, a motion sensor. The imager e40 images a surrounding environment in which the vehicle V travels. The input e50 includes an input device and receives an input motion of the occupant PS. The input device includes a device that inputs text information such as a keyboard, a pointing device such as a mouse or a touch panel, a button, a dial, a joystick, a touch sensor, a touch pad, or the like. The display e60 displays various types of information on the basis of control of the in-vehicle performance device e1. In an example of the first embodiment, the display e60 is a transmissive display and is disposed in contact with a front window of the vehicle V. The occupant PS can visually recognize the surrounding environment of the vehicle V and an image displayed on the display e60 from the front window. The vehicle V may not include the front window. In this case, the display e60 displays the surrounding environment image of the vehicle V imaged by the imager e40 to be superimposed on the response image. The display e60 may be a head-up display (HUD).

The in-vehicle performance device e1 displays a response image according to a motion of the occupant PS on the display e60 on the basis of detection results of the sound detector e20 and the motion detector e30 and information input to the input e50. The in-vehicle performance device e1 presents the response image or calculates a score associated with the shooting motion on the basis of, for example, a motion in which the occupant PS shoots the object present in the surrounding environment of the vehicle V (hereinafter referred to as the shooting motion). Hereinafter, a specific configuration of the in-vehicle performance device e1 will be described.

[Functional Configuration of in-Vehicle Performance Device]

Figure 106:
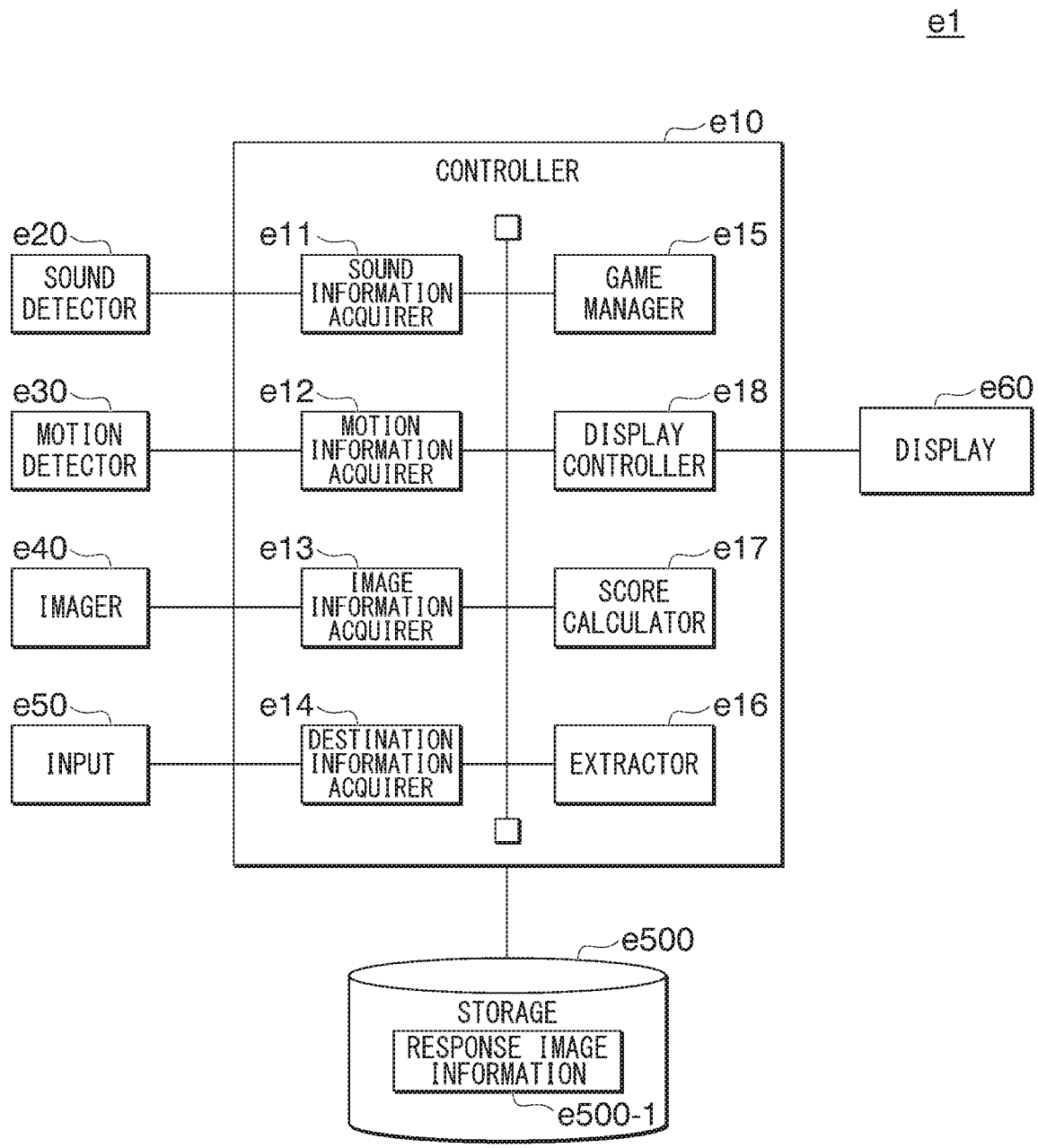
FIG. 106 is a functional configuration diagram showing an example of the configuration of the in-vehicle performance device e1 according to the sixth embodiment.

FIG. 106 is a functional configuration diagram showing an example of the configuration of the in-vehicle performance device e1 according to the sixth embodiment. The in-vehicle performance device e1 includes a controller e10, a sound detector e20, a motion detector e30, an imager e40, an input e50, a display e60, and a storage e500. Information indicating the response image (hereinafter, response image information e500-1) is stored in the storage e500.

The controller e10 realizes, for example, a sound information acquirer e11, a motion information acquirer e12, an image information acquirer e13, a destination information acquirer e14, a game manager e15, an extractor e16, a score calculator e17, and a display controller e18 as functional units thereof, by a processor such as a central processor (CPU) executing a program stored in the storage e500. These functional units may be realized by hardware such as a large scale integration (LSI), an application specific integrated circuit (ASIC), or a field-programmable gate array (FPGA) or may be realized by software and hardware in cooperation.

The sound information acquirer e11 acquires sound information indicating a sound of the occupant PS detected by the sound detector e20. The motion information acquirer e12 acquires motion information indicating the motion of the occupant PS detected by the motion detector e30. In an example of the first embodiment, the occupant PS performs a motion for emitting a sound imitating a shooting sound and pointing at an object (a shooting target) present in the surrounding environment of the vehicle V with a finger, as the shooting motion. Therefore, the sound information includes the sound imitating the shooting sound. "Bang!" shown in FIG. 105 indicates content of the sound obtained by the occupant PS imitating the shooting sound. Further, the motion information includes a pointing motion for pointing at the shooting target. The sound information acquirer e11 outputs the acquired sound information to the display controller e18 and the score calculator e17. Further, the motion information acquirer e12 outputs the acquired motion information to the display controller e18 and the score calculator e17.

The image information acquirer e13 acquires information indicating a surrounding environment image generated by the imager e40 imaging the surrounding environment in which the vehicle V travels (hereinafter, image information). The image information acquirer e13 outputs the acquired image information to the extractor e16. The destination information acquirer e14 acquires information indicating a destination indicated by an operation input to the input e50 (hereinafter referred to as destination information). The vehicle V, for example, travels according to automated driving toward the destination indicated by the destination information acquired by the destination information acquirer e14. Further, the destination information acquirer e14 outputs the destination information to the display controller e18.

The game manager e15 manages the shooting game that is performed by the in-vehicle performance device e1. The game manager e15, for example, manages starting and ending of the shooting game. For example, when the operation input to the input e50 indicates the starting of the shooting game, the game manager e15 executes a process of starting the shooting game. Further, when the operation input to the input e50 indicates the ending of the shooting game, the game manager e15 performs a process of ending the shooting game. The process of starting the shooting game is a process of permitting the extractor e16, the score calculator e17, and the display controller e18 to execute various processes (hereinafter referred to as an enabling process). Further, the process of ending the shooting game is a process of not permitting the extractor e16, the score calculator e17, and the display controller e18 to execute various processes (hereinafter referred to as a disabling process). The extractor e16, the score calculator e17, and the display controller e18 execute various processes when the game manager e15 executes the enabling process, and does not execute various processes when the game manager e15 executes the disabling process.

In the above description, a case in which the game manager e15 acquires information indicating the starting and ending of the shooting game on the basis of the operation input to the input e50 has been described, but the present invention is not limited thereto. The starting and ending of the shooting game may be instructed using a sound of the occupant PS. In this case, the game manager e15 may manage the starting and ending of the shooting game on the basis of a detection result of the sound detector e20. Further, a configuration in which the game manager e15 determines a degree of excitement of an in-vehicle environment of the vehicle V on the basis of a detection result of the sound detector e20 or the motion detector e30 may be adopted. The game manager e15 may automatically execute the enabling process when the degree of excitement of the in-vehicle environment of the vehicle V is low. In this case, the in-vehicle performance device e1 can play the shooting game when the inside of the vehicle is not excited, and excite the inside of the vehicle. Further, the game manager e15 may automatically execute the disabling process when the degree of excitement of the in-vehicle environment of the vehicle V is low. In this case, the in-vehicle performance device e1 can end the shooting game when the inside of the vehicle is not excited by the performed shooting game.

The extractor e16 receives the image information from the image information acquirer e13. The extractor e16 performs an image recognition process on the surrounding environment image indicated by the image information, and extracts an object that is a shooting target of the occupant PS. The extractor e16 extracts, for example, an object such as a preceding vehicle, a following vehicle, a vehicle traveling at the side, and an oncoming vehicle traveling around the vehicle V, a signboard of a store present around the vehicle V, or a road sign, as the shooting target of the occupant PS. Further, the extractor e16 matches a position of an actual object around the vehicle V with a position of the extracted object (the shooting target) on the basis of the surrounding environment image, and outputs information indicating a position of the shooting target to the score calculator e17.

Specifically, the extractor e16 performs an image recognition process on the surrounding environment image, and recognizes positions on the surrounding environment image of various objects captured in the surrounding environment image. Further, the extractor e16 matches a position on the front window when the surrounding environment image has been presented in an actual size on the front window with a position on the surrounding environment image of the extracted object (the shooting target). The extractor e16 outputs the position of the front window to the score calculator e17 and the display controller e18 as virtual position information indicating a virtual position of the shooting target.

The score calculator e17 calculates a score for the motion of the occupant PS on the basis of the sound information input from the sound information acquirer e11, the motion information acquired by the motion information acquirer e12, and the virtual position information input from the extractor e16. For example, when the sound information indicates the sound imitating the shooting sound and a pointing direction of the pointing motion indicated by the motion information is a direction of the position of the shooting target indicated by the virtual position information, the score calculator e17 calculate a high score for the motion of the occupant PS. Further, when the sound information indicates the sound imitating the shooting sound and the pointing direction of the pointing motion indicated by the motion information is not the direction of the position of the shooting target indicated by the virtual position information, the score calculator e17 calculate a low score for the motion of the occupant PS. The score calculator e17 outputs score information indicating the calculated score to the display controller e18.

The display controller e18 displays the response image on the display e60 on the basis of the sound information input from the sound information acquirer e11, the motion information input from the motion information acquirer e12, the destination information input from the destination information acquirer e14, the virtual position information input from the extractor e16, and the score information input from the score calculator e17. Hereinafter, a specific example of the response image displayed on the display e60 by the display controller e18 will be described.

[Example of Response Image Showing that Shooting Motion has been Detected]

Figure 107:
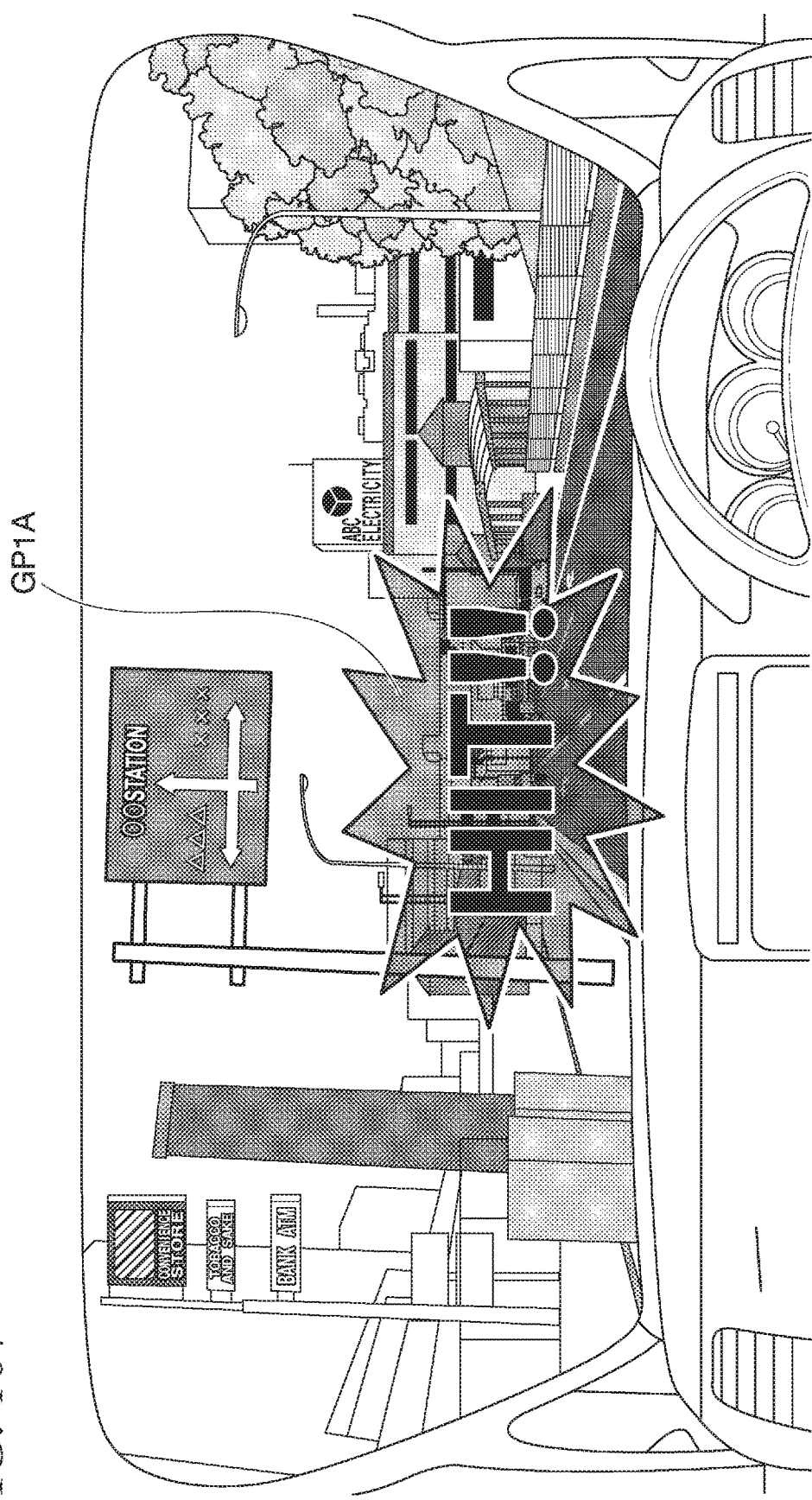
FIG. 107 is a diagram showing an example of a response image GP1A indicating that a shooting operation has been detected.

FIG. 107 is a diagram showing an example of a response image GP1A showing that the shooting motion has been detected. The display controller e18 displays a response image (the shown response image GP1A) showing that the shooting motion has been detected on the display e60 when the sound information indicates the sound imitating the shooting sound and the motion information indicates the pointing motion. As shown in FIG. 107, the response image GP1A is, for example, an image showing that the shooting target has been hit by shooting. The display controller e18 presents the response image GP1A and clearly indicates that the shooting motion has been detected, to the occupant PS.

[Example of Response Image Showing that Shooting has been Performed]

Figure 108:
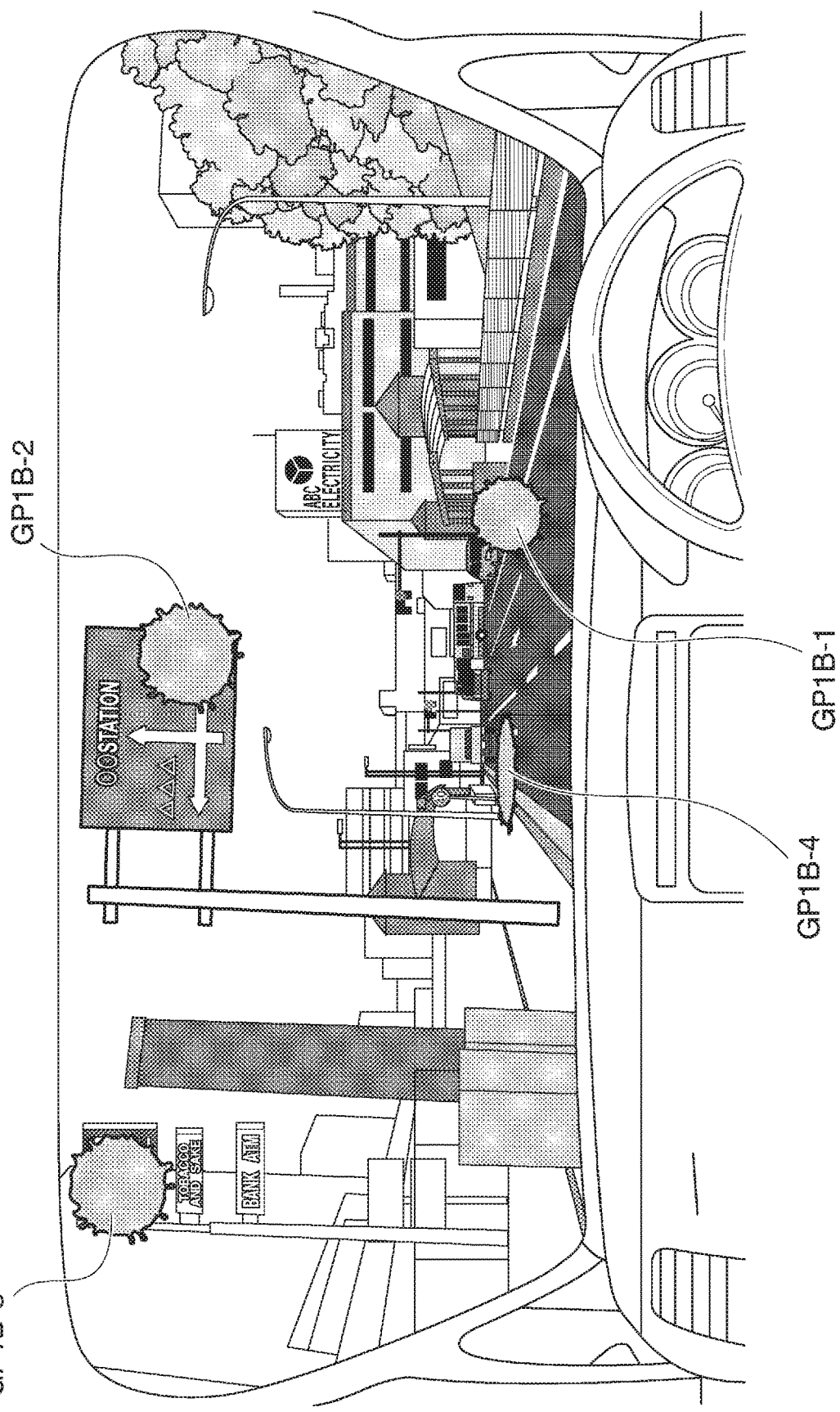
FIG. 108 is a diagram showing an example of a response image GP1B indicating that the shooting operation has been performed.

FIG. 108 is a diagram showing an example of a response image GP1B indicating that shooting has been performed. The display controller e18 displays a response image GP1B (shown response images GP1B-1 to GP1B-4) indicating that shooting has been performed, on the display e60. As shown in FIG. 108, the response image GP1B is, for example, an image in which ink is applied to a predetermined region. The display controller e18 presents the response image GP1B in the pointing direction indicated by the motion information, and clearly indicates that the shooting motion has been performed, to the occupant PS. Further, the display controller e18 may display the response image GP1B to be superimposed on the shooting target. Specifically, the display controller e18 may display the response image (the shown response image GP1B-1) to be superimposed on an oncoming vehicle. Further, the display controller e18 may display the response image (the shown response image GP1B-2) to be superimposed on a road sign. Further, the display controller e18 may display the response image (the shown response image GP1B-3) to be superimposed on a signboard of a store present around the vehicle V. Further, when there is no shooting target in a direction indicated by the pointing motion, the display controller e18 may display the response image (the shown response image GP1B-4) on a road surface in the direction.

A configuration in which the display controller e18 displays a predetermined region indicated by the response image GP1B in an enlarged or reduced manner as the shooting target approaches or moves away from movement of the vehicle V may be adopted. Specifically, a configuration in which the display controller e18 enlarges or reduces the predetermined region indicated by the response image GP1B so that the predetermined region shows a predetermined area may be adopted.

[Example of Response Image Showing Score]

Figure 109:
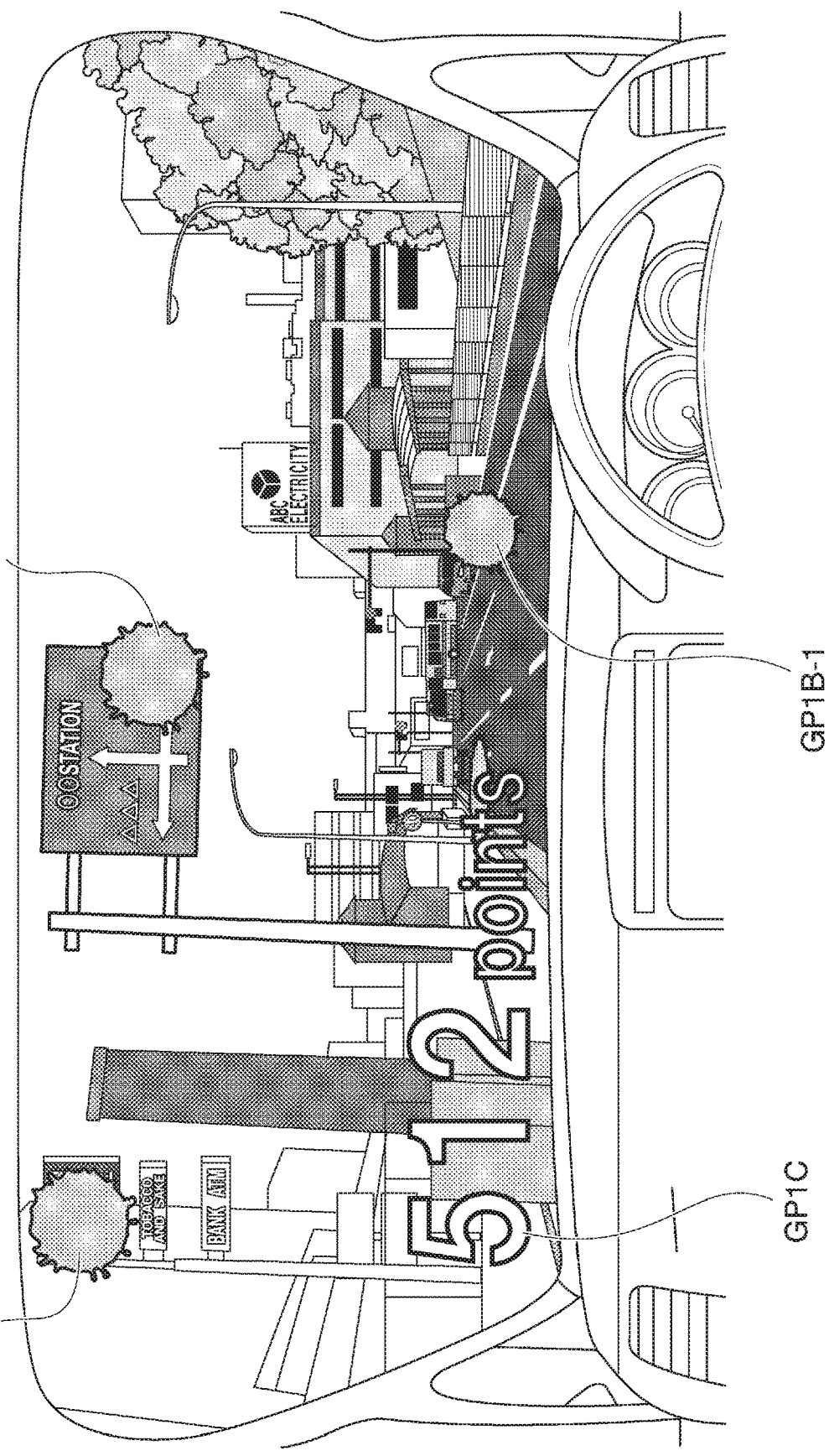
FIG. 109 is a diagram showing an example of a response image GP1C indicating a score of a score information.

FIG. 109 is a diagram showing an example of a response image GP1C indicating the score of the score information. The display controller e18 displays on the display e60 a response image (the shown response image GP1C) indicating the score indicated by the score information, which is a score calculated on the basis of the motion of the occupant PS. As shown in FIG. 100, the response image GP1C is, for example, an image in which the score is indicated by a numerical value. The display controller e18 presents the response image GP1C and clearly indicates an evaluation of the shooting motion of the occupant PS to the occupant PS. The response image GP1C may be an image in which the score is indicated by a level. Specifically, the response image GP1C may present an image (for example, "beginner", "skilled person", "professional", "expert", and "master") showing the level of the occupant PS according to the score.

[Operation of In-Vehicle Performance Device]

Figure 110:
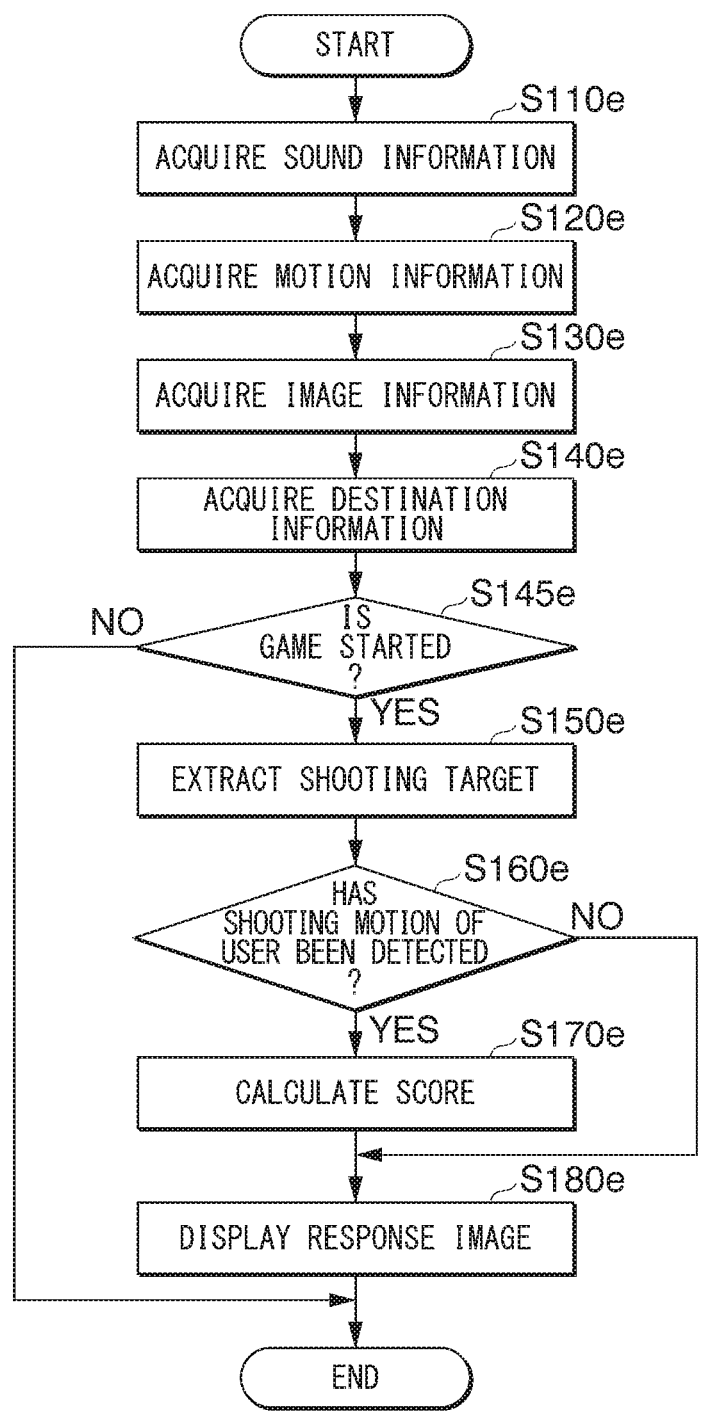
FIG. 110 is a flowchart showing an example of an operation of the in-vehicle performance device e1 according to the sixth embodiment.

FIG. 110 is a flowchart showing an example of an operation of the in-vehicle performance device e1 according to the sixth embodiment. The sound information acquirer e11 acquires the sound information from the sound detector e20 continually or at predetermined time intervals (step S110e). The motion information acquirer e12 acquires the motion information from the motion detector e30 continually or at predetermined time intervals (step S120e). The image information acquirer e13 acquires the image information from the imager e40 continually or at predetermined time intervals (step S130e). The destination information acquirer e14 acquires the destination information indicated by the operation input to the input e50 (step S140e). The occupant PS inputs the destination information through the input e50, for example, when starting the travel of the vehicle V.

The game manager e15 manages starting and ending of a game (step S145e). The game manager e15 proceeds to a process of step S150e when the operation input to the input e50 indicates starting of a shooting game. Further, the game manager e15 ends the process when the operation input to the input e50 does not indicate the starting of the shooting game and when the operation indicates the ending of the shooting game that has already been started.

The extractor e16 performs image processing on the surrounding environment image indicated by the image information acquired by the motion information acquirer e12, extracts the shooting target, and generates the virtual position information (step S150e). For example, the extractor e16 extracts a shooting target each time the image information acquirer e13 acquires the image information, and generates the virtual position information. The score calculator e17 determines whether or not the occupant PS has performed a shooting motion on the basis of the sound information acquired by the sound information acquirer e11 and the motion information acquired by the motion information acquirer e12 (step S160e). When the score calculator e17 determines that the occupant PS has performed the shooting motion, the score calculator e17 calculates a score for the motion of the occupant PS on the basis of the motion information, the image information acquired by the image information acquirer e13, and the virtual position information generated by the extractor e16 (step S170e). Further, when the score calculator e17 determines that the occupant PS does not perform the shooting motion, the score calculator e17 does not calculate the score for the motion of the occupant PS, and the process proceeds to step S180e. The display controller e18 displays the response image on the display e60 on the basis of the sound information, the motion information, the destination information, and the virtual position information (step S180e).

The case in which the shooting motion is a motion for emitting the sound imitating the shooting sound and pointing at the shooting target present in the surrounding environment of the vehicle V with the finger, but the present invention is not limited thereto. The shooting motion may be, for example, any one of a motion for emitting the sound imitating the shooting sound and a motion for pointing at the shooting target present in the surrounding environment of the vehicle V. In this case, the in-vehicle performance device e1 may not include a detector (the sound detector e20 or the motion detector e30) that detects information that is not used for the shooting motion.

As described above, the in-vehicle performance device e1 of the sixth embodiment includes the motion detector e30 that detects the motion of the occupant PS of the vehicle V, and the display controller e18 that controls the display of the response image (in this example, the response image GP1A-1) according to the motion of the occupant PS on the basis of the motion of the occupant PS detected by the motion detector e30. Therefore, the in-vehicle performance device e1 can provide entertainment to the occupant PS moved by the vehicle V.

Further, in the in-vehicle performance device e1 of the sixth embodiment, the display controller e18 displays the response images (in this example, the response images GP1B-1 to GP1B-3) that are superimposed on the object (the shooting target) in the surrounding environment of the vehicle V. Further, in the in-vehicle performance device e1, the shooting target is a motion for pointing at the object in the surrounding environment, the motion detector e30 detects a pointing direction of the occupant PS (in this example, the motion information), and the display controller e18 displays the response images (in this example, the response images GP1B-1 to GP1B-4) on the basis of the motion information detected by the motion detector e30. Further, the in-vehicle performance device e1 further includes the score calculator e17 that calculates the score on the basis of the motion information and the virtual position information, and the display controller e18 further displays the response image (in this example, the response image GP1C) indicating the score calculated by the score calculator e17. Accordingly, with the in-vehicle performance device e1, it is possible to display the response image on the display e60 through performance with higher entertainment and to improve willingness for the shooting motion of the occupant PS.

[Rule of Shooting Game and Score]

Further, the configuration in which the score calculator e17 calculates the score on the basis of the direction of the pointing motion indicated by the motion information and the position of the shooting target has been described above, but the present invention is not limited thereto. A configuration in which the score calculator e17 calculates a score according to a rule of a shooting game that is performed by the in-vehicle performance device e1 may be adopted. Examples of the rule of the shooting game include a rule in which a road sign in a destination direction indicated by the destination information is a shooting target, a rule in which a specific type of vehicle is a shooting target, and a rule in which a signboard of a store is a shooting target. In the case of this rule, a high score is calculated for a shooting motion for pointing at a shooting target according to the rule among the shooting targets extracted by the extractor e16.

Further, a configuration in which the score calculator e17 calculates the score on the basis of an area in which the response image GP1B (an image in which ink is applied to a predetermined region) is displayed may be adopted. In the following description, a rule for calculating a score on the basis of an area in which the response image GP1B is displayed is referred to as a territory area rule. In the territory area rule, the score calculator e17 calculates a score according to an area of the ink shown in the response image GP1B. Accordingly, with the in-vehicle performance device e1 of the first embodiment, it is possible to display the response image on the display e60 through performance with higher entertainment and to improve willingness for the shooting motion of the occupant PS.

A case in which the extractor e16, the score calculator e17, and the display controller e18 do not execute various processes when the game manager e15 performs the disabling process has been described above, but the present invention is not limited thereto. For example, a configuration in which only the display controller e18 does not execute various processes when the game manager e15 performs the disabling process may be adopted. In this case, various functional units execute processes, but various images are not displayed on the display e60.

[First Modification of Sixth Embodiment]

Hereinafter, a first modification of the sixth embodiment will be described with reference to the drawings. An in-vehicle performance device e2 that displays an image according to a position of a vehicle V will be described in the first modification of the sixth embodiment. Further, the in-vehicle performance device e2 that displays, on a display e60 of the in-vehicle performance device e2, an image that an in-vehicle performance device e2 mounted in another vehicle V displays will be described. Further, the same configurations as those in the first embodiment described above are denoted by the same reference signs and description thereof will be omitted.

Figure 111:
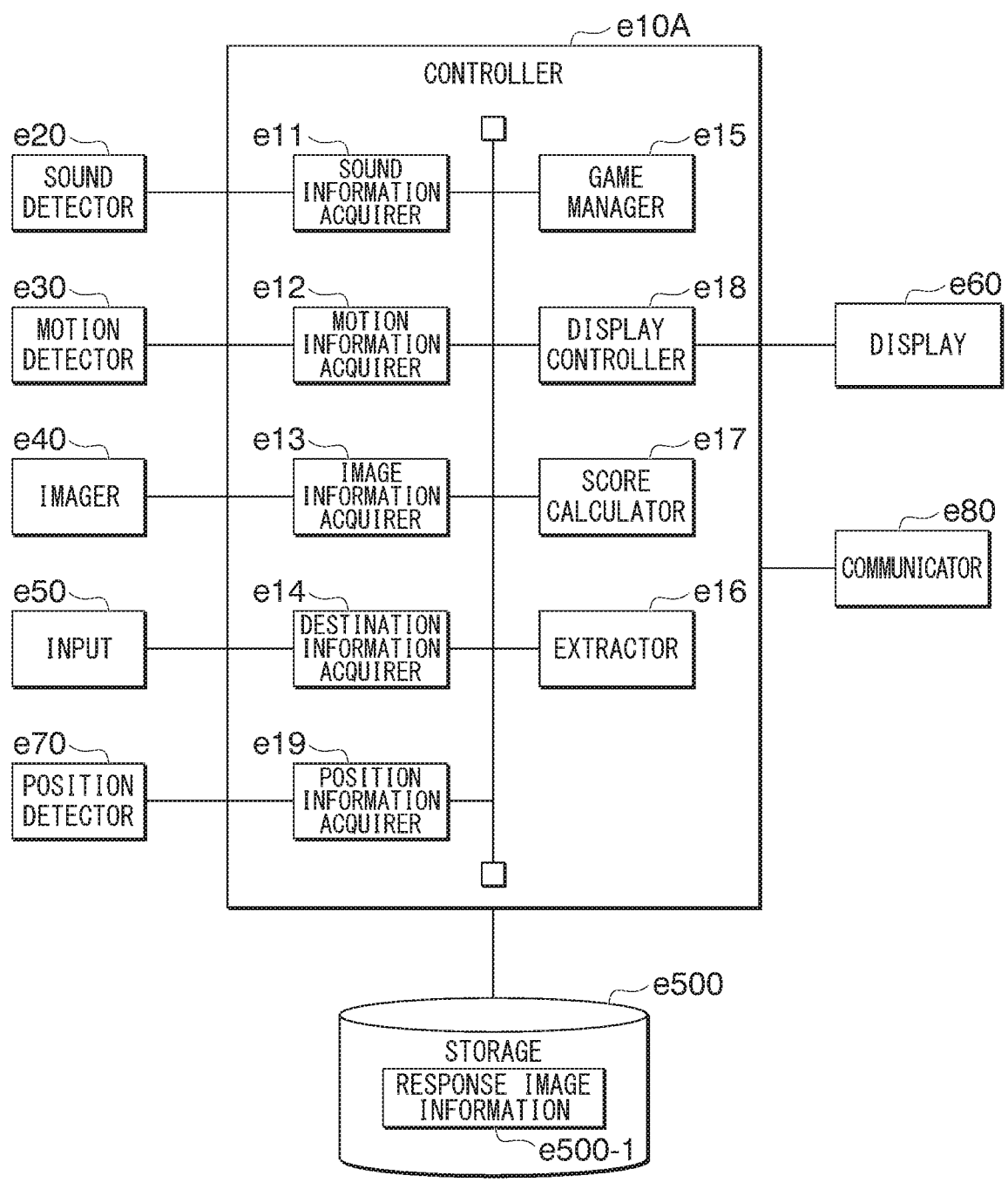
FIG. 111 is a functional configuration diagram showing an example of a configuration of an in-vehicle performance device e2 according to a first modified example of the sixth embodiment.

FIG. 111 is a functional configuration diagram showing an example of a configuration of the in-vehicle performance device e2 according to the first modification of the sixth embodiment. The in-vehicle performance device e2 includes a controller e10A, a sound detector e20, a motion detector e30, an imager e40, an input e50, the display e60, a position detector e70, a communicator e80, and a storage e500.

The position detector e70 detects a position at which the vehicle V travels. The position detector e70 detects the position of the vehicle V, for example, using a method using a global navigation satellite system(s) (GNSS) such as a global positioning system (GPS) or a method using a regional navigation satellite system (RNSS) such as a quasi-zenith satellite (QZS). The position detector e70 outputs position information indicating the position of the vehicle V to the controller e10A.

The communicator e80 communicates with a server (not shown) that integrates information to be used for a process of the in-vehicle performance device e2, through wireless communication. The wireless communication is, for example, short-range wireless communication using Wi-Fi (registered trademark) or wireless communication via a mobile communication network such as long term evolution (LTE). Direct communication may be performed between the vehicles V. In this case, the vehicles V perform communication with each other using an ad hoc network such as dedicated short range communications (DSRC).

The controller e10A executes a program stored in the storage e500 to realize a sound information acquirer e11, a motion information acquirer e12, an image information acquirer e13, a destination information acquirer e14, a game manager e15, an extractor e16, a score calculator e17, a display controller e18, and a position information acquirer e19 as the functional units.

The position information acquirer e19 acquires position information from the position detector e70. The position information acquirer e19 acquires the position information continually or at predetermined time intervals. The position information acquirer e19 outputs the acquired position information to the display controller e18 and the communicator e80. Further, the display controller e18 of the first modification of the sixth embodiment outputs a response image to be displayed on the display e60 to the communicator e80 continually or at predetermined time intervals.

The communicator e80 associates the position information input from the position information acquirer e19 with the response image input from the display controller e18 and transmits resultant information to the server. In the following description, the information in which the position information is associated with the response image is referred to as position image information. Further, the communicator e80 receives position image information that another in-vehicle performance device e2 has transmitted to the server. Specifically, the communicator e80 receives position image information associated with the position information input from the position information acquirer e19 on the basis of the position information. In other words, the communicator e80 receives position image information associated with position information indicating a current position of the vehicle V from the server. The communicator e80 outputs the received position image information to the display controller e18.

The display controller e18 of the second embodiment receives the position image information from the communicator e80. The display controller e18 displays the response image of the position image information associated with the position information matching the position information input from the position information acquirer e19 on the display e60. That is, the display controller e18 causes the display e60 to display the response images that the other in-vehicle performance device e2 has displayed at a current position of the vehicle V in the past.

[Example of Display of Response Image Displayed by Other in-Vehicle Performance Device]

Figure 112:
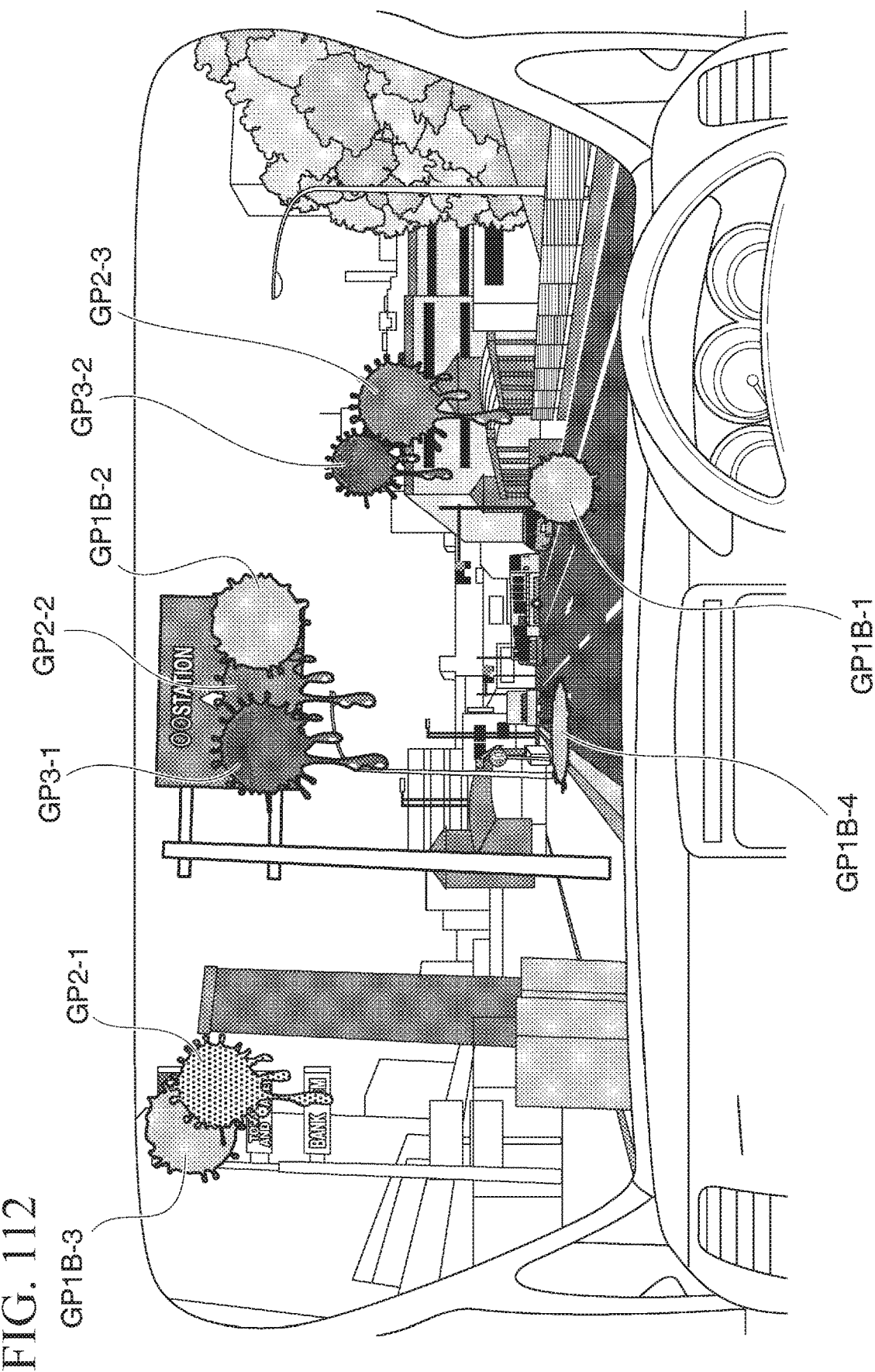
FIG. 112 is a diagram showing an example of display of a response image displayed by another in-vehicle performance device e2 according to the first modified example of the sixth embodiment.

FIG. 112 is a diagram showing an example of the response image displayed by the other in-vehicle performance device e2 according to the first modification of the sixth embodiment. The display controller e18 displays response images (response images GP1B-1 to GP1B-3 shown in FIG. 112) based on a process of the in-vehicle performance device and response images (response images GP2-1 to GP2-3 and response images GP3-1 to GP3-2 shown in FIG. 112) that the other in-vehicle performance devices 2 has displayed at a current position in the past. The shown response images GP2-1 to GP2-3 are response images that the other in-vehicle performance device e2 has displayed at the current position of the vehicle V in the past. Further, the shown response images GP3-1 to GP3-2 also are response images that still another in-vehicle performance device e2 has displayed at the current position of the vehicle V in the past.

As described above, in the in-vehicle performance device e2 of the first modification of the sixth embodiment, the position detector e70 detects the position of the vehicle V, the communicator e80 performs transmission and reception of the position image information, and the display controller e18 displays the response images (the response images GP1B-1 to GP1B-3 shown in FIG. 112) based on the process of the in-vehicle performance device and the response images (the response images GP2-1 to GP2-3 and the response images GP3-1 to GP3-2 shown in FIG. 112) that the other in-vehicle performance devices 2 has displayed at the current position of the vehicle V in the past. Accordingly, the in-vehicle performance device e2 of the first modification of the sixth embodiment can display a response image in which another person other than the occupant PS has played the shooting game on the display e60, and improve competitiveness of the occupant PS to improve willingness for the shooting motion.

[Confrontation According to Territory Area Rule]

A configuration in which the shooting game performed by the in-vehicle performance device e2 performs confrontation according to the territory area rule between the occupant PS and the other person on the basis of the position image information may be adopted. Specifically, the score calculator e17 calculates a score on the basis of areas of response images (the response images GP2-1 to GP2-3 and the response images GP3-1 to GP3-2 shown in FIG. 112) of the other person shown in the position image information. Further, the score calculator e17 calculates the score on the basis of areas of the response images (the response images GP1B-1 to GP1B-3 shown in FIG. 112) displayed on the basis of the process of the in-vehicle performance device. The in-vehicle performance device e2 determines the occupant PS of the in-vehicle performance device e2 (the vehicle V) that has displayed a high-score response image, as a winner.

[Confrontation According to Territory Area Rule: Team Battle]

Further, a configuration in which the shooting game according to the territory area rule is performed in a team battle may be adopted. For example, a configuration in which the shooting game according to the territory area rule is performed by a plurality of teams (for example, a red team, a blue team, and a yellow team,) may be adopted. In this case, the score calculator e17 calculates a sum of an area of a response image with color matching color of an ink of the response image of the in-vehicle performance device among the response images of the position image information and an area of a response image to be displayed on the basis of the process of the in-vehicle performance device, as a score of the own team. Further, the in-vehicle performance device e2 determines a team having a high score as a winner.

[Territory Area Rule Based on Travel Route]

The case in which the shooting game with the territory area rule is performed on the basis of the area of the response image according to the shooting motion of the occupant PS has been described above, but the present invention is not limited thereto. The in-vehicle performance device e2 may play the shooting game with the territory area rule on the basis of the area of the route in which the vehicle V has traveled, on the basis of the position information acquired by the position information acquirer e19. In this case, the display controller e18 calculates an area by multiplying the route in which the vehicle V having the in-vehicle performance device mounted therein has traveled by a predetermined value indicating a route width, and calculates a score according to the area. Further, the communicator e80 receives travel route information indicating a route in which a vehicle having the other in-vehicle performance device e2 mounted therein has traveled. The score calculator e17 calculates an area by multiplying the route in which the other vehicle has traveled, which is indicated by the received travel route information, by the predetermined value indicating the route width, and calculates a score according to the area. The in-vehicle performance device e2 determines the occupant PS of the vehicle V having a high score as a winner.

[Display of Territory Area Rule Based on Travel Route]

Figure 113:
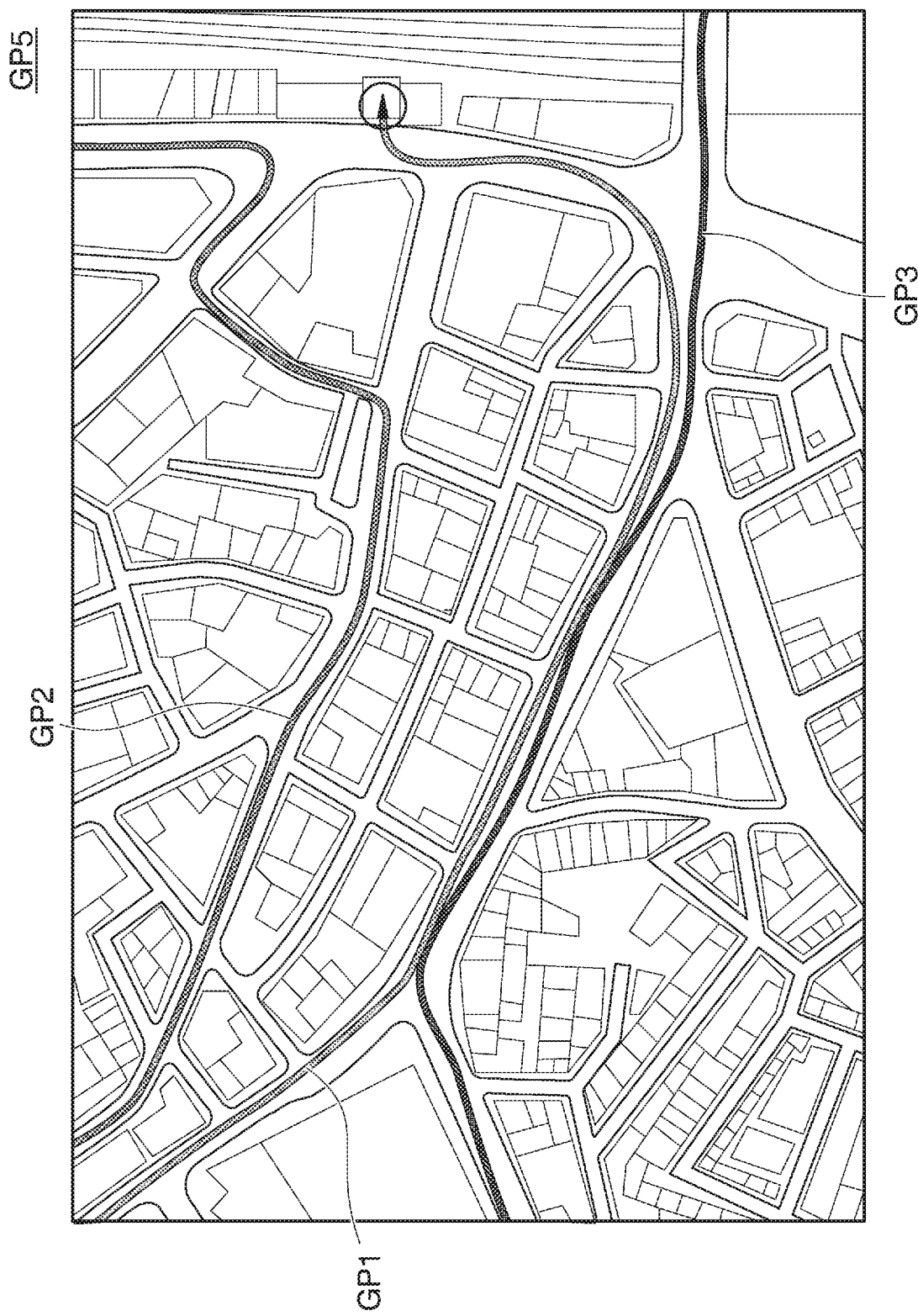
FIG. 113 is a diagram showing an example of a result of a shooting game based on a territory area rule based on a travel route.

Further, a configuration in which the display controller e18 displays an image showing the area of the route in which the vehicle V has traveled and an image showing an area of a route indicated by the received travel route information on the display e60 may be adopted. FIG. 113 is a diagram showing an example of a result of the shooting game according to the territory area rule based on a travel route. In this case, the display controller e18 generates the image (a shown image P1) indicating the route in which the vehicle V has traveled, on the basis of the position information acquirer e19. Further, the communicator e80 receives the travel route information indicating the route in which the vehicle V having the other in-vehicle performance device e2 mounted therein has traveled. The display controller e18 generates the images (shown images P2 and P3) indicating the travel route information received by the communicator e80. The display controller e18 disposes the generated images P1 to P3 to be superimposed on an image (a shown image P5) indicating a map in a predetermined range, and displays the images on the display e60. Accordingly, with the in-vehicle performance device e2 of the second embodiment, it is possible to display a route in which another person other than the occupant PS has moved on the display e60 and to improve competitiveness of the occupant PS to improve willingness for a movement using the vehicle V.

When the occupant PS moves the vehicle V for a long time within a predetermined range for the purpose of victory according to the territory area rule, a traffic jam is likely to occur within the range. In this case, with an automated driving function of the vehicle V, traveling of the vehicle V may be controlled so that the vehicle V is moved to the destination indicated by the destination information or the vehicle V is moved not to stay in the range for a long time.

[Image Showing Victory or Defeat of Shooting Game According to Territory Area Rule]

Figure 114:
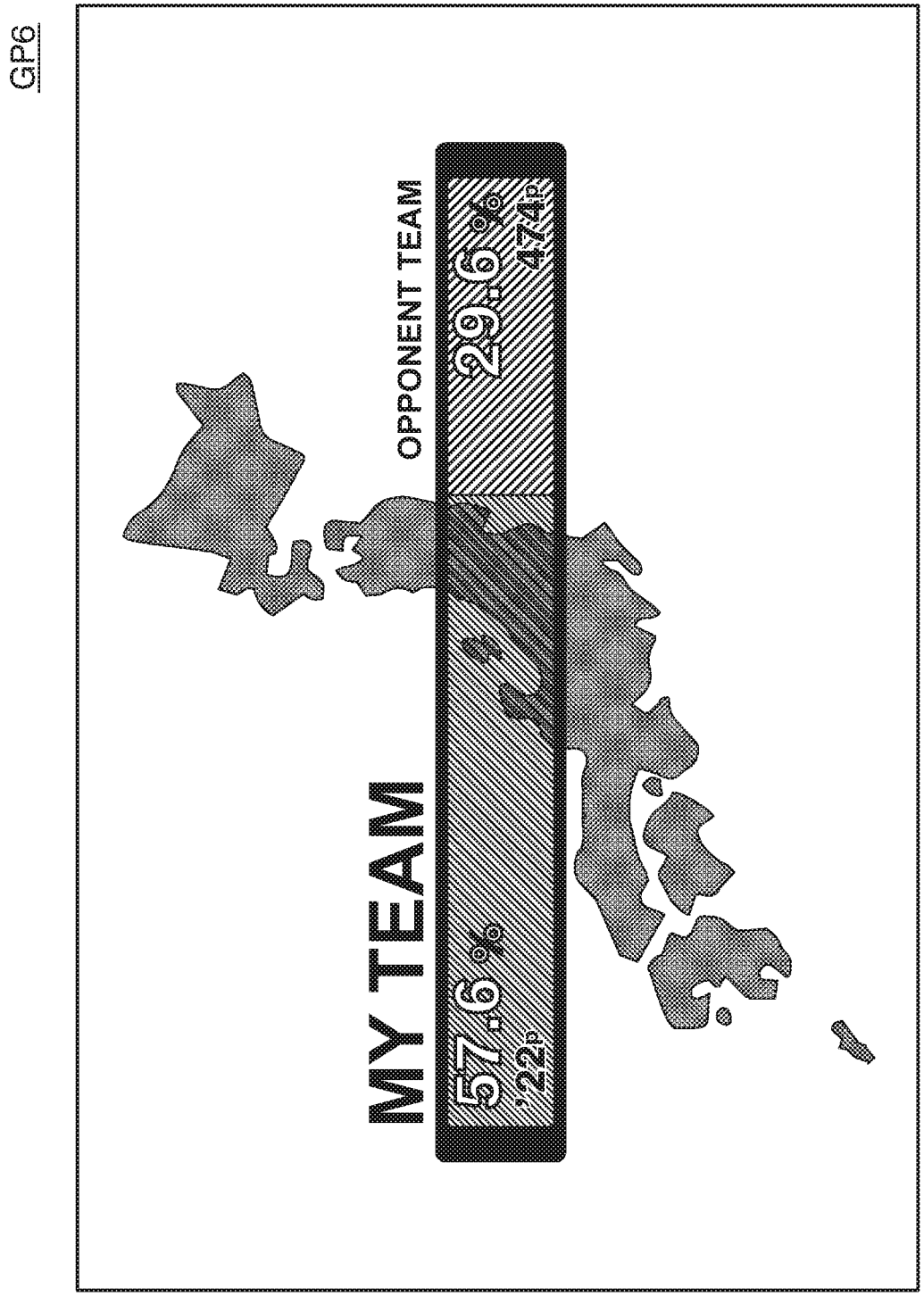
FIG. 114 is a diagram showing an example of victory and defeat of a shooting game based on a territory area rule.

Further, when a shooting game with the territory area rule based on the travel route is performed in a team battle, the display controller e18 may display an image showing the victory or defeat of the game on the display e60. FIG. 114 is a diagram showing an example of victory or defeat in the shooting game according to the territory area rule. The display controller e18 calculates an area of the own team and an area of the other team on the basis of the position information and the travel route information. Further, the display controller e18 generates an image (a shown image P6) showing a ratio between the area of the own team and the area of the other team in a range (a shown entire region of Japan) in which the shooting game with the territory area rule based on the travel route is performed, and displays the image on the display e60. A configuration in which the display controller e18 generates and displays the image P6 in a predetermined range (for example, a range of Kanto Koshinetsu) in the range in which the shooting game with the territory area rule based on the travel route is performed may be adopted. Accordingly, with the in-vehicle performance device e2 of the second embodiment, it is possible to improve competitiveness of the occupant PS to improve willingness for a movement using the vehicle V.

[Relation Between Shooting Game and Reality]

Further, the in-vehicle performance device e2 may be configured to provide services, content, and the like to the occupant PS on the basis of the score calculated by the score calculator e17 or a result of the territory area rule. For example, when the occupant PS has performed the shooting motion on a signboard of a store present around the vehicle V, the in-vehicle performance device e2 transmits information indicating that the shooting motion has been performed, to a server device of the store. The server device of the store gives a coupon available when the occupant PS purchases a product at the store to the occupant PS. Further, when the vehicle V is a vehicle that is used by a car sharing service, the in-vehicle performance device e2 transmits the score calculated by the score calculator e17 to a server device of a service provider that provides the service. The server device of the service provider gives a coupon available in the next car sharing service to the occupant PS that has obtained a high score. Further, a configuration in which various coupons are given to the occupant PS who has won according to the territory area rule or the occupant PS who belongs to a winning team may be adopted.

Further, the in-vehicle performance device e2 may perform a process of prompting movement to a certain shooting target, on the basis of information indicating a behavior of each vehicle V (hereinafter referred to as behavior information). In this case, the behavior information is, for example, the position image information, the position information, and the travel route information acquired by each in-vehicle performance device e2.

The in-vehicle performance device e2 acquires the behavior information acquired from the other in-vehicle performance device e2, from a server in which the behavior information is stored (hereinafter referred to as a "behavior information server"). The in-vehicle performance device e2 may be configured to highlight and display a shooting target on which many others have performed the shooting motion, a shooting target to which a coupon of a store is given, or the like on the basis of the acquired behavior information. Specifically, the in-vehicle performance device e2 may be configured to display a highlighting image to be superimposed on the position of the shooting target on the display e60. Further, the in-vehicle performance device e2 may be configured to display an image obtained by an imager mounted in a vehicle V of the other person having imaged the shooting target in the past, on the display e60. Further, the in-vehicle performance device e2 may be configured to display an image showing a movement direction in which the vehicle V moves to the position of the shooting target, on the display e60.

Here, the occupant PS may move the vehicle V in a direction of the highlighted shooting target, the shooting target on which many others have performed the shooting motion, and the shooting target to which the coupon of the store is given. Therefore, the in-vehicle performance device e2 can prompt the in-vehicle performance device e2 (the vehicle V) to move to a certain shooting target on the basis of the behavior information. The in-vehicle performance device e2, for example, detects a congestion state on the basis of a position at which another in-vehicle performance device e2 (vehicle V) indicated by the behavior information is present. The in-vehicle performance device e2 can move the vehicle V so that congestion is avoided, by prompting a movement to a shooting target at a position different from a congestion position (direction) so that the vehicle V does not move to the congestion position.

Further, a configuration in which the behavior information server performs the process of prompting a movement to a certain shooting target on the basis of the behavior information may be adopted instead of the configuration in which the in-vehicle performance device e2 performs the process of prompting a movement to a certain shooting target on the basis of the behavior information. In this case, the behavior information server transmits, to the in-vehicle performance device e2, an image for prompting a movement of the in-vehicle performance device e2 (the vehicle V) or information for prompting a movement on the basis of the behavior information acquired from each in-vehicle performance device e2. The in-vehicle performance device e2 causes the display e60 to display the image acquired from the behavior information server, for example.

Further, an index indicating a frequency at which the shooting motion has been performed may be attached to the shooting target on the basis of the line information acquired from each in-vehicle performance device e2. The in-vehicle performance device e2 or the behavior information server, for example, calculates an index at which the shooting motion has been performed, on the basis of the behavior information acquired from each in-vehicle performance device e2. The in-vehicle performance device e2 may be configured to perform a display for highlighting the response image or the shooting target on the basis of the index.

The in-vehicle performance device e2 determines, for example, that, for a shooting target having a high index attached thereto, a large number of in-vehicle performance devices 2 (vehicles V) are present around the shooting target, that is, crowded. In this case, the in-vehicle performance device e2 may perform a process of not highlighting the shooting target or of not regarding (of filtering) the shooting target as a shooting target. Further, when the shooting target having a high index attached thereto is the shooting target to which the coupon of the store is given, the in-vehicle performance device e2 (or the behavior information server) may perform a process of providing a function of giving the coupon to, for example, a store that is a shooting target (a signboard) having a low index attached thereto among affiliated stores of the store that is the shooting target. Further, the in-vehicle performance device e2 determines that, for a shooting target having a low index attached thereto, a large number of in-vehicle performance devices 2 (vehicles V) are not present around the shooting target, that is, not crowded. In this case, the in-vehicle performance device e2 may perform a process of highlighting the shooting target. Through these processes, the in-vehicle performance device e2 can prompt the in-vehicle performance device e2 (the vehicle V) to move to a certain shooting target on the basis of the behavior information (the index).

[Non-Image Output Method]

Further, the case in which the display controller e18 outputs a result of the shooting game by displaying various images has been described above, but the present invention is not limited thereto and the display controller e18 may output the result of the shooting game using a sound. Specifically, a configuration in which the vehicle V includes a speaker, and the display controller e18 outputs a shooting sound from the speaker while displaying a response image may be adopted. Further, a configuration in which the display controller e18 outputs sound for informing of the result or victory or defeat of the shooting game from the speaker while displaying the result or victory or defeat of the shooting game shown in the image P5 or the image P6 on the display e60 may be adopted.

[Image Display Method Other than Display]

Further, the case in which various images are displayed on the display e60 has been described above, but the present invention is not limited thereto. For example, in the case of an open car or a vehicle having no front window, a configuration in which the occupant PS in the vehicle uses a head mounted device may be adopted. In this case, the head mounted device displays the surrounding environment image of the vehicle imaged by the imager e40 and the response image that are superimposed on each other. Further, a configuration in which the vehicle V includes the display e60 provided on a side window, in addition to the front window may be adopted. In this case, the extractor e16 performs an image recognition process on the surrounding environment image, and recognizes positions on the surrounding environment image of various objects captured in the surrounding environment image. Further, the extractor e16 matches a position on the side window when the surrounding environment image is presented in an actual size onto the side window with a position on the surrounding environment image of the extracted object (the shooting target). The extractor e16 outputs the position of the front window to the score calculator e17 and the display controller e18 as virtual position information indicating a virtual position of the shooting target. When a size of the side window is smaller than that of the front window, it is preferable for a target of the shooting motion performed from the side window to be a shooting target with a large volume or area, that is, a shooting target on which it is easy for the shooting motion to be performed in a small region (the side window).

[Image Display Method Based on Vehicle Information]

Further, the in-vehicle performance device e1 and the in-vehicle performance device e2 (hereinafter simply referred to as an "in-vehicle performance device") may have a configuration for detecting a state of the vehicle V. In this case, the in-vehicle performance device includes a vehicle state acquirer. The vehicle state acquirer acquires motion parameters such as a speed, a rudder angle, and a pitch and roll angle of the vehicle V. The display controller e18, for example, displays various images on the basis of the motion parameters acquired by the vehicle state acquirer. Specifically, the display controller e18 performs a refreshing process on an image to be displayed on the display e60 on the basis of the speed of the vehicle V. More specifically, the display controller e18 performs a refreshing operation on an image to be displayed on the display e60 at a time interval sufficiently faster than a change in the surrounding environment with a movement of the vehicle V on the basis of the speed of the vehicle V.

Further, the display controller e18 displays an image according to the traveling direction of the vehicle V on the display e60 on the basis of, for example, the rudder angle and the pitch and roll angle of the vehicle V among the acquired motion parameters. Here, the vehicle V may turn (turn right or left) in a direction other than a straight direction on the basis of control. In this case, the occupant PS may turn his eyes to the traveling direction, that is, a turning direction, instead of the front of the vehicle V. The display controller e18 can display an image according to a line of sight of the occupant PS by displaying the image according to the traveling direction of the vehicle V on the display e60 on the basis of the motion parameters.

Further, a configuration in which the display controller e18 displays various images on the display e60 on the basis of a vibration on the vehicle V may be adopted. The display controller e18, for example, displays various images at a distance and in a direction opposite to a distance and a direction at and in which the vehicle V moves with the vibration according to the vibration applied to the vehicle V. Accordingly, the in-vehicle performance device e2 can suppress shake of the image displayed on the display e60 with the vibration. Therefore, the in-vehicle performance device e2 can suppress the occupant sickness from being caused by the occupant PS visually recognizing the image on the display e60. A configuration in which the display controller e18 displays various images on the display e60 on the basis of a relative movement distance and direction between a vibration applied to the vehicle V and a vibration applied to the occupant PS may be adopted.

[Second Modification of Sixth Embodiment]

Hereinafter, a second modification of the sixth embodiment will be described with reference to the drawings. In the second modification of the sixth embodiment, an in-vehicle performance device e3 that specifies a pointing target on the basis of a three-dimensional point group in a real space in a pointing direction through a pointing motion of an occupant PS and generates a history of the pointing motion of the occupant PS will be described. The same configurations as those in the embodiments described above are dented by the same reference signs and description thereof will be omitted. Here, the in-vehicle performance device e3 is an example of a "pointing measurement device".

Figure 115:
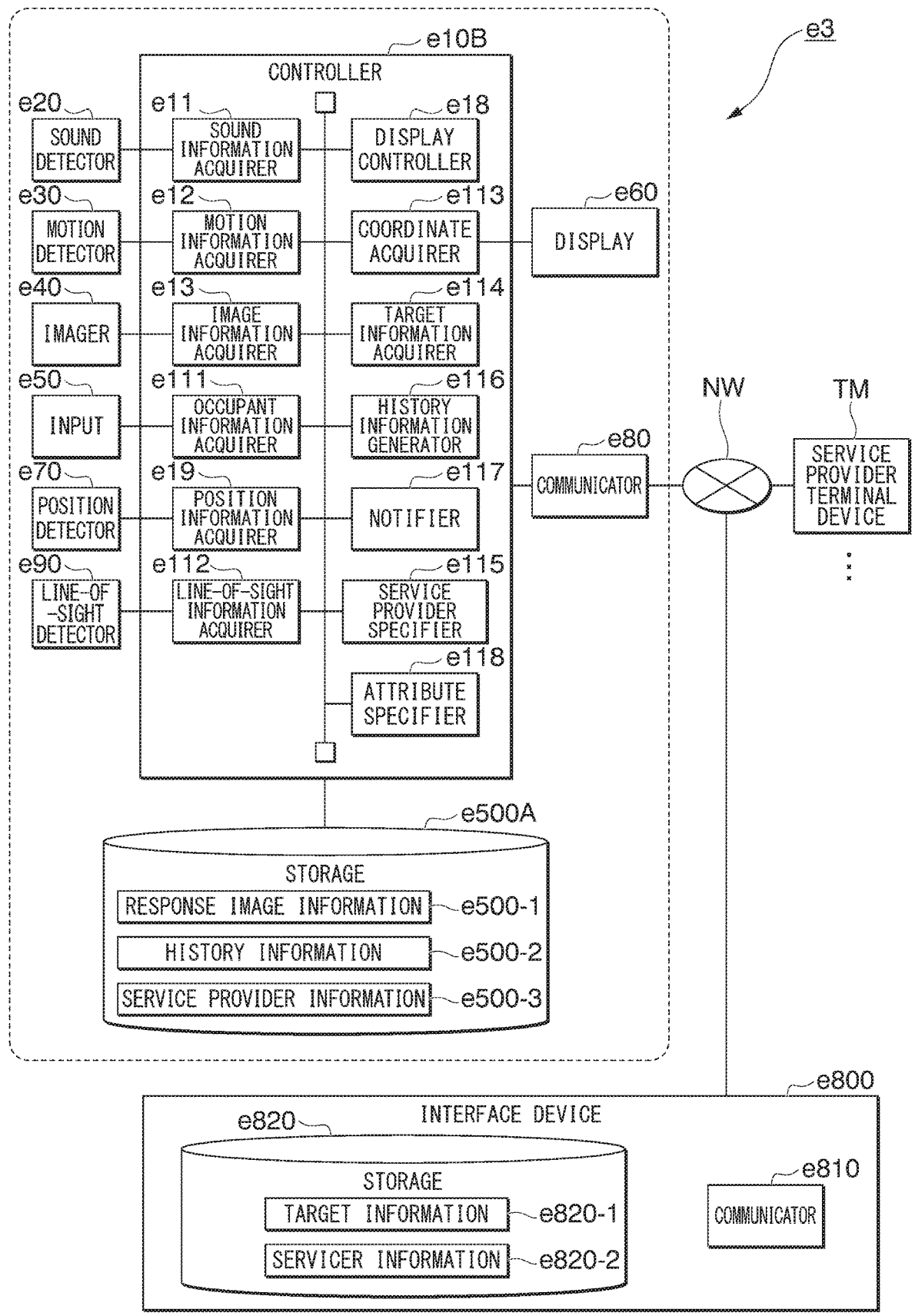
FIG. 115 is a functional configuration diagram showing an example of a configuration of an in-vehicle performance device 3 according to a second modified example of the sixth embodiment.

FIG. 115 is a functional configuration diagram showing an example of a configuration of the in-vehicle performance device e3 according to the second modification of the sixth embodiment. The in-vehicle performance device e3 (a communicator e80) of the second modification of the sixth embodiment transmits and receives information to and from a service provider terminal (hereinafter referred to as a service provider terminal device TM) and an interface device e800 via a network NW.

The interface device e800 includes a controller 810 and a storage 820. The storage 820 stores target information 820-1 and servicer information 820-2. The target information 820-1 is information in which information indicating a target present in a real space indicated by the three-dimensional point group is associated with information indicating the three-dimensional point group. The servicer information 820-2 is information in which information indicating the target is associated with information indicating a service provider relevant to the target.

The controller 810 searches for the target information 820-1 or the servicer information 820-2 on the basis of the information received from the in-vehicle performance device e3, and transmits the information indicating the target or the information indicating the service provider to the in-vehicle performance device e3.

The in-vehicle performance device e3 includes a sound detector e20, a motion detector e30, an imager e40, an input e50, a display e60, a position detector e70, a communicator e80, and a line-of-sight detector e90. Further, the in-vehicle performance device e3 includes a controller e10B instead of (or in addition to) the controller e10 or the controller e10A, and includes a storage e500A instead of (or in addition to) the storage e500. The storage e500A stores response image information e500-1, history information e500-2, and service provider information e500-3. Details of each piece of information will be described below.

The controller e10B executes a program stored in the storage e500A to execute a sound information acquirer e11, a motion information acquirer e12, an image information acquirer e13, a display controller e18, a position information acquirer e19, an occupant information acquirer e111, a line-of-sight information acquirer e112, a coordinate acquirer e113, a target information acquirer e114, a service provider specifier e115, a history information generator e116, a notifier e117, and an attribute specifier e118 as functional units thereof.

The occupant PS inputs information (hereinafter referred to as an occupant ID) for identifying the occupant to the input e50, and the occupant information acquirer e111 acquires the occupant ID input to the input e50. For example, when the occupant PS has gotten in the vehicle V, the occupant PS inputs the occupant ID to the input e50.

The line-of-sight detector e90 detects, for example, a position (hereinafter referred to as a viewpoint position) in a real space visually recognized by the occupant PS imaged by an imager (not shown) that images the inside of the vehicle V. The line-of-sight information acquirer e112 acquires information indicating the viewpoint position of the occupant PS detected by the line-of-sight detector e90.

The coordinate acquirer e113 acquires a three-dimensional point group in the real space in a pointing direction according to the pointing motion of the occupant PS on the basis of a pointing motion of the occupant PS acquired by the motion information acquirer e12 and the viewpoint position of the occupant PS acquired by the line-of-sight information acquirer e112 on the basis of a surrounding environment image of the vehicle V imaged by the imager e40. The coordinate acquirer e113 detects, for example, feature points of the object shown in the surrounding environment image of the vehicle V imaged by the imager e40, which is an object present in the real space in the pointing direction, and acquires a set of detected feature points as the three-dimensional point group in the real space in the pointing direction. In this case, the imager e40 is a stereo camera.

The target information acquirer e114 acquires the information indicating the target present in the real space on the basis of the information indicating the three-dimensional point group in the real space in the pointing direction specified by the coordinate acquirer e113. The target information acquirer e114 transmits, for example, the information indicating the three-dimensional point group in the real space in the pointing direction specified by the coordinate acquirer e113 to the interface device e800 via the network NW. When the controller 810 of the interface device e800 receives the information indicating the three-dimensional point group from the in-vehicle performance device e3, the controller 810 searches for the target information 820-1 using the information as a search key, and specifies the target with which the three-dimensional point group indicated by the information has been associated. The controller 810 transmits information indicating the specified target to the in-vehicle performance device e3 via the network NW. The target information acquirer e114 acquires the information indicating the target received from the interface device e800.

The service provider specifier e115 specifies the service provider associated with the target acquired by the target information acquirer e114. The service provider specifier e115, for example, transmits the information indicating the target acquired by the target information acquirer e114 to the interface device e800 via the network NW. When the controller 810 of the interface device e800 acquires the information indicating the target from the in-vehicle performance device e3, the controller 810 searches for the servicer information 820-2 using the information as a search key and specifies the service provider associated with the target indicated by the information. The controller 810 transmits information indicating the specified target to the in-vehicle performance device e3 via the network NW. The service provider specifier e115 acquires the information indicating the service provider received from the interface device e800.

The history information generator e116 generates the history information e500-2 indicating a history of the pointing target pointed by the occupant PS through the pointing motion.

FIG. 116 is a diagram showing an example of content of the history information e500-2. As shown in FIG. 116, the history information e500-2 is information in which an occupant ID, a date and time when the occupant PS has performed a pointing motion (hereinafter referred to as a pointing date and time), the pointing target pointed through the pointing motion of the occupant PS, and a service provider corresponding to the pointing target are associated with each other for each occupant ID. The history information generator e116, for example, associates the pointing date and time when the pointing motion of the occupant PS has been acquired by the motion information acquirer e12, the target indicated by the information acquired by the target information acquirer e114, which is the target pointed through the pointing motion, the service provider indicated by the information acquired by the service provider specifier e115, which is a service target corresponding to the pointed target, and the occupant ID of the occupant PS to generate the history information e500-2, and stores the history information e500-2 in the storage e500A. A relationship between the target and the service provider can be arbitrarily set. For example, it is not essential that the target is a property of the service provider. Further, a non-business target (for example, a sign or a signal in the first embodiment) may be defined as a target relevant to the service provider.

The notifier e117 notifies the service provider associated with the target pointed by the occupant PS that the pointing target has been pointed by the occupant PS.

FIG. 117 is a diagram showing an example of content of the service provider information e500-3. As shown in FIG. 117, the service provider information e500-3 is information in which information indicating a service provider (a shown service provider name) and a notification destination are associated with each other. The notifier e117 searches for the service provider information e500-3 using the service provider specified by the service provider specifier e115 as a search key, and notifies the notification destination associated with the service provider that the occupant PS has performed a pointing motion, that is, the occupant PS is interested in a target with which the service provider has been associated. An address of the service provider terminal device TM (for example, a server device), for example, is indicated in the notification destination.

For example, the notifier e117 may send a notification to the service provider each time the occupant PS performs the pointing motion. The notifier e117 may perform extraction from the history information e500-2 in a predetermined period for each associated service provider and send a notification to the service provider. Further, the notifier e117 may notify the occupant PS of the history information e500-2, in addition to notifying the service provider of the history information e500-2. Accordingly, the occupant PS can use the history information e500-2 as information indicating his or her interest. Further, the occupant PS can acquire information on the service provider on which the occupant PS has performed a pointing motion by referring to the notified history information e500-2.

As described above, the in-vehicle performance device e3 of the second modification of the sixth embodiment includes the motion detector e30 configured to detect the motion of the occupant PS in the vehicle V, the line-of-sight detector e90 configured to detect the viewpoint position of the occupant PS, the line-of-sight information acquirer e112 configured to acquire the three-dimensional point group in the real space in the pointing direction according to the pointing motion of the occupant PS on the basis of the pointing motion of the occupant PS detected by the motion detector e30 and the viewpoint position of the occupant PS detected by the line-of-sight detector e90, the target information acquirer e114 configured to acquire information indicating the target associated with the three-dimensional point group acquired by the coordinate acquirer e113 from the interface device e800 supplying the information indicating the target present in the real space indicated by the three-dimensional point group, the service provider specifier e115 configured to specify the service provider associated with the target indicated by the information acquired by the target information acquirer, on the basis of the servicer information 820-2 indicating the service provider associated with the target, and the history information generator e116 configured to generate 800-2 in which the service provider specified by the service provider specifier e115 is associated with the target indicated by the information acquired by the target information acquirer e114, and the history of the pointing motion performed by the occupant PS is acquired such that information on the interest of the occupant PS can be collected. Further, according to the in-vehicle performance device e3 of the second modification of the sixth embodiment, it is possible to notify the service provider associated with the target on which the pointing motion has been performed that the pointing motion has been performed.

[Three-Dimensional Point Group Transmitted to Interface Device e800]

The case in which the information indicating the three-dimensional point group acquired by the coordinate acquirer e113 is all transmitted to the interface device e800 has been described above, but the present invention is not limited thereto. For example, a configuration in which the coordinate acquirer e113 selects a three-dimensional point group to be transmitted to the interface device e800 from among acquired three-dimensional point groups on the basis of an attribute of the surrounding environment of the vehicle V, and transmits the selected three-dimensional point group may be adopted.

In this case, the attribute specifier e118 specifies the attribute of the surrounding environment of the vehicle V on the basis of the surrounding environment image of the vehicle V imaged by the imager e40. This attribute is, for example, a property (a feature) of the surrounding environment of the vehicle V, such as a highway or a store crowded region. The attribute specifier e118 analyzes, for example, whether a traffic road sign of a highway is captured in the surrounding environment image of the vehicle V imaged by the imager e40 or a large number of signs of stores are imaged, and specifies the attribute of the surrounding environment of the vehicle V. Here, an example of the "attribute" has included the property (the feature) of the surrounding environment is described, but the present invention is not limited thereto. A plurality of "attributes" may be specified in such a manner that some or all of attributes of identifiable targets have been listed at coordinates, in directions, or the like.

A configuration in which the attribute specifier e118 transmits the surrounding environment image of the vehicle V imaged by the imager e40 to the interface device e800 via the network NW, and the interface device e800 specifies the attribute of the surrounding environment of the vehicle V may be adopted. In this case, the attribute specifier e118 transmits the surrounding environment image of the vehicle V imaged by the imager e40 via the network NW, and acquires information indicating the attribute of the surrounding environment of the vehicle V from the interface device e800 to specify the attribute.

Further, a configuration in which the attribute specifier e118 specifies the attribute of the surrounding environment of the vehicle V, for example, on the basis of position attribute information in which the position information is associated with the attribute may be adopted. In this case, the position attribute information may be stored in the storage e500A or may be stored in the storage 820. When the position attribute information is stored in the storage 820, the attribute specifier e118 transmits information indicating the current position of the vehicle V via the network NW, and acquires information indicating the surrounding environment of the vehicle V from the interface device e800 to specify the attribute.

The coordinate acquirer e113 transmits the information indicating the three-dimensional point group to the interface device e800 on the basis of the attribute specified by the attribute specifier e118. Here, when the vehicle V moves at high speed on a "highway", an amount of data of the three-dimensional point group acquired during the pointing motion is likely to increase. Therefore, for example, when the specified attribute is a "highway", the coordinate acquirer e113 can narrow a range pointed through the pointing motion, which is a range in which the three-dimensional point group is acquired, in comparison with a usual case, and curb the amount of data that is transmitted to the interface device e800.

Further, when the vehicle V moves in a "store crowded region", there may be a plurality of targets (that is, signboards) that are pointed through a pointing motion. Therefore, for example, when the specified attribute is the "store crowded region", the coordinate acquirer e113 can widen a range pointed through the pointing motion, which is a range in which the three-dimensional point group is acquired, in comparison with a usual case, and acquire a large amount of information indicating the target from the interface device e800. Accordingly, the in-vehicle performance device e3 can generate the faithful history information e500-2. That is, it is possible to perform various displays and performances for occupants, as described in the sixth embodiment, on the basis of the pointing motion including a motion of an occupant irrelevant to driving, which has been measured by the pointing measurement device as the aspect of the invention, and to achieve reuse of information and utilization of the information for other purposes by appropriately recording and holding the pointing motion and a history thereof.

Seventh Embodiment

Hereinafter, a seventh embodiment will be described. In the seventh embodiment, a vehicle control system, a vehicle control method, a program, and a vehicle management system to which the first embodiment is applicable will be described with reference to the drawings. A vehicle controlled by the vehicle control system is, for example, an automated driving vehicle which does not require a driving operation basically. Although description will be made on the assumption that an automated driving vehicle is used hereinafter, a manual driving vehicle may be used.

[Overall Configuration]

Figure 118:
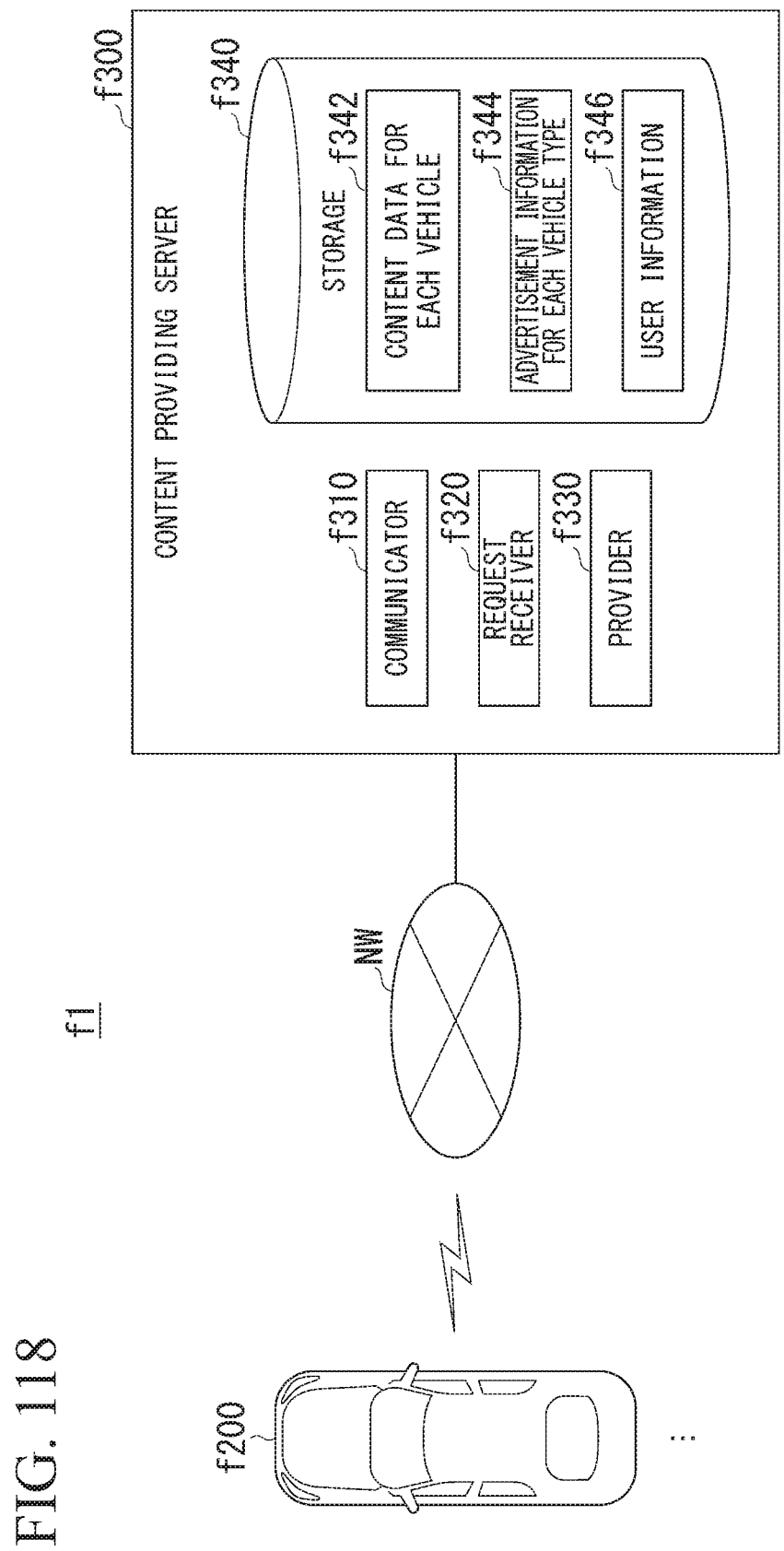
FIG. 118 is a configuration diagram of a vehicle control system f of an embodiment.

FIG. 118 is a configuration diagram of a vehicle control system f of an embodiment. The vehicle control system f1 includes one or more vehicles f200 and a content providing server f300. These components can communicate with each other through a network NW. The network NW includes the Internet, a wide area network (WAN), a local area network (LAN), a public line, a provider device, a dedicated line, a wireless base station, and the like.

[Vehicle]

Figure 119:
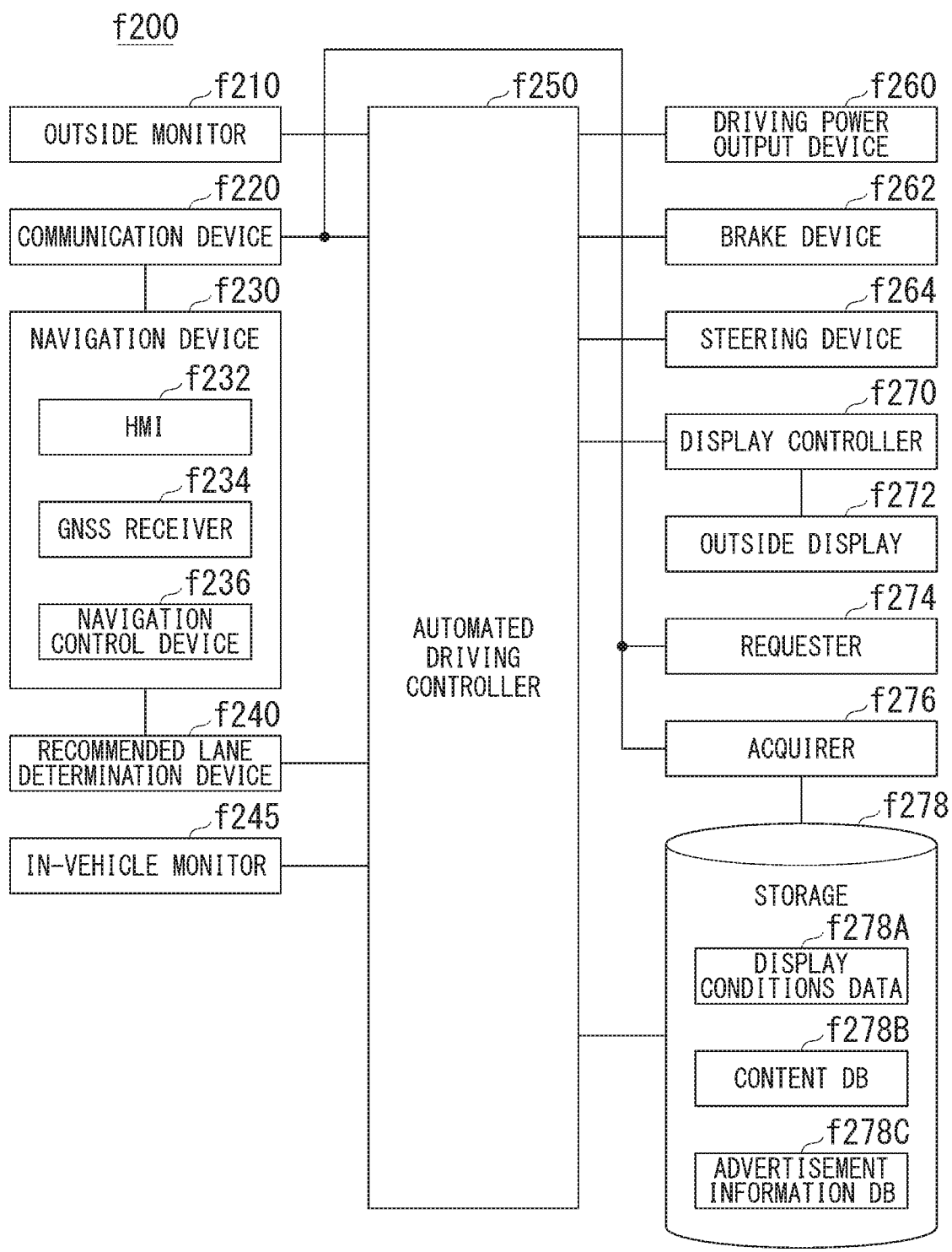
FIG. 119 is a configuration diagram of a vehicle f200 according to the embodiment.

Although the vehicle f200 is, for example, a vehicle having four or more wheels in which a user can ride, it may be automated two-wheeled vehicles and other vehicles. FIG. 119 is a configuration diagram of the vehicle f200 of an embodiment. The vehicle f200 includes, for example, an outside monitor f210, a communication device (communicator) f220, a navigation device f230, a recommended lane determination device f240, an in-vehicle monitor f245, an automated driving controller f250, a driving power output device f260, a brake device f262, a steering device f264, a display controller f270, an outside display f272, a requester f274, an acquirer f276, and a storage f278. For example, the automated driving controller f250, the display controller f270, the requester f274 and the acquirer f276 may include processors such as central processors (CPUs) which execute programs (software) stored in the storage f278 in the vehicle f200. Some or all of these functional parts may be realized by hardware such as a large scale integration (LSI) circuit, an application specific integrated circuit (ASIC), a field-programmable gate array (FPGA) and a graphics processor (GPU) or realized by software and hardware in cooperation. Programs may be stored in advance in a storage device such as a hard disk drive (HDD) or flash memory or stored in a detachable storage medium such as a DVD or a CD-ROM and installed in a storage device when the storage medium is set in a drive device. Some or all of the outside monitor f210 and the in-vehicle monitor f245 are an example of a "vehicle environment acquirer." The automated driving controller f250 is an example of an "automated driving controller."

The outside monitor f210, the communication device (communicator) f220, the navigation device f230, the recommended lane determination device f240, the in-vehicle monitor f245, the automated driving controller f250, the driving power output device f260, the brake device f262, and the steering device f264 have configurations the same as the outside world monitor a210, a communication device a220, a navigation device a230, a recommended lane determination device a240, an automated driving controller a250, a driving force output device a260, a brake device a262, and a steering device a264 of FIG. 26 which are introduced in the second embodiment respectively, and thus the descriptions thereof will be omitted and descriptions will be made mainly focused on the specific functions in the seventh embodiment. Further, detailed descriptions of the processes of the automated driving of the seventh embodiment will be emitted while supporting FIG. 3 and related descriptions thereto which are introduced in the first embodiment.

When an object present around the vehicle f200 is a person, the outside monitor f210 monitors a line of sight of the person on the basis of an image from the camera and derives a degree of attention on the vehicle f200 on the basis of a line-of-sight direction of the monitored person. For example, when it is determined that there is no person whose line-of-sight direction faces the vehicle f200, the outside monitor f210 sets the degree of attention to "0." The outside monitor f210 sets the degree of attention to "1" when the number of persons whose line-of-sight directions faces the vehicle f200 is less than a predetermined number (e.g., 3) and sets the degree of attention to "2" when the number of persons whose line-of-sight directions faces the vehicle f200 is equal to or greater than the predetermined number. The outside monitor f210 outputs information about a line-of-sight direction of a person and the degree of attention on the vehicle f200 to the display controller f270.

The communication device f220 is, for example, a wireless communication module for accessing the network NW to communicate with the content providing server f300 or directly communicating with other vehicles, terminal devices of pedestrians, or the like. The HMI f232 outputs images and audio and receives details of operations from occupants. For example, the HMI f232 may display information for promoting operation of an occupant for the vehicle f200 on a screen or output the information through audio. The HMI f232 displays a content acquisition request screen, a content acquisition result screen, and the like and receives an operation of an occupant for a displayed screen. Content may be an image, for example. Content includes one or more objects. For example, an object may be an image of a personality or a mascot, an image of a character in an animation, an image of an animal, or the like. These images are images for which publication rights such as copyrights have been cleared. An object may represent a picture, a letter, a symbol, a shape, a pattern or the like as an image. Content may be a video which causes an object to act using a plurality of images. The HMI f232 transmits an acquisition request for content operated by an occupant, and the like to the content providing server f300.

The in-vehicle monitor f245 includes, for example, a camera, a load sensor provided in a seat on which an occupant sits, an occupant recognition device which performs sensor fusion processing on the basis of outputs of these components, and the like. The in-vehicle monitor f245 acquires information about the number of occupants in a vehicle cabin, sitting positions of occupants, and occupant states and outputs the acquired information to the display controller f270. Occupant states are, for example, a state in which an occupant is sleeping or awake, and the like.

The display controller f270 controls the outside display f272 such that the outside display f272 displays content included in a content DB f278B stored in the storage f278 and advertisement information included in an advertisement information DB f278C on the basis of display conditions data f278A stored in the storage f278. The advertisement information is information presented around products, services and the like acquired from advertisers by the content providing server f300. The content included in the content DB f278B is an example of "first content." The advertisement information is an example of "second content." Functions of the display controller f270 will be described in detail later.

The outside display f272 is, for example, an organic electroluminescence display attached to the surface of a body part on the outer side of the vehicle f200. The outside display f272 may be a liquid crystal display (LCD) fitted in the body part or a display panel configured as the entire body part or a part thereof. The outside display f272 may be a portable display device including a driver. In this case, the outside display f272 is stored at a position at which a display surface thereof is not viewed from the outside of the vehicle when content is not displayed thereon and moved by the driver to a position at which the display surface is viewed from the outside of the vehicle when content is displayed thereon. The outside display f272 may be a light transmission type liquid crystal panel formed on at least a part of the front windshield, side windshield and rear windshield of the vehicle f200. The aforementioned body part and various windshields are an example of "exterior."

The requester f274 performs a content acquisition request for the content providing server f300 through the communication device f220 when a content request operation is received from an occupant of the vehicle f200. The requester f274 may perform a content acquisition request for the content providing server f300 at predetermined time intervals. The requester f274 may perform an advertisement information acquisition request for the content providing server f300. Functions of the requester f274 will be described in detail later.

The acquirer f276 acquires content requested through the requester f274 from the content providing server f300. When a plurality of pieces of content have been acquired, the acquirer f276 may select one or more pieces of content therefrom. The acquirer f276 stores acquired content in the content DB f278B stored in the storage f278.

The acquirer f276 acquires advertisement information provided by the content providing server f300 and stores the acquired advertisement information in the advertisement information DB f278C stored in the storage f278.

The storage f278 is realized by a hard disk drive (HDD), a flash memory, a random access memory (RAM), a read only memory (ROM) or the like. The storage f278 stores, for example, the display conditions data f278A, the content DB f278B, the advertisement information DB f278C, and other types of information. The content DB f278B is, for example, information in which a content identification ID for identifying content is associated with the content. The advertisement information DB f278C is, for example, information in which an advertisement identification ID for identifying advertisement information is associated with the advertisement information.

[Content Providing Server]

Referring back to FIG. 118, the content providing server f300 includes, for example, a communicator f310, a request receiver f320, a provider f330 and a storage f340. The request receiver f320 and the provider f330 is realized, for example, by a processor such as a CPU executing a program (software) stored in the storage f340. Some or all of these functional parts may be realized by hardware such as an LSI circuit, an ASIC, an FPGA and a GPU or realized by software and hardware in cooperation.

The communicator f310 is, for example, a network card for accessing the network NW. The communicator f310 communicates with the vehicle f200 and other external devices through the network NW.

The request receiver f320 receives a content acquisition request from the vehicle f200. The request receiver f320 may receive an advertisement information acquisition request from the vehicle f200.

The provider f330 refers to content data f342 for each vehicle stored in the storage f340 on the basis of a content request received by the request receiver f320 and extracts content data which corresponds to a vehicle f200 that has transmitted the content acquisition request and satisfies the request. The provider f330 transmits the extracted content data to the vehicle f200 that has transmitted the content request.

The provider f330 refers to advertisement information f344 for each vehicle type stored in the storage f340, acquires advertisement information corresponding to a vehicle type (e.g., a box car, a minivan, or a truck) of a vehicle f200 that has transmitted a content request, and transmits the acquired advertisement information to the vehicle f200 that has transmitted the content request. Advertisement information may be acquired at a timing at which a content acquisition request is received by the request receiver f320, a timing at which an advertisement information acquisition request is received, or other predetermined timings (e.g., a predetermined period).

The provider f330 stores a content provision history in the storage f340 as user information f346. The provider f330 may transmit special content to the vehicle f200 on the basis of the number of times of utilization of a user (the number of times of providing content) and other types of information with reference to the user information f346. The special content is, for example, "rare content" such as content that cannot be acquired through a normal content request or content for which the number of provisions is limited. Functions of the provider f330 will be described in detail later.

The storage f340 is realized by an HDD, a flash memory, a RAM, a ROM or the like. The storage f340 stores, for example, the content data f342 for each vehicle, the advertisement information f344 for each vehicle type, the user information f346, and other types of information. Data stored in the content data f342 for each vehicle and the advertisement information f344 for each vehicle type is, for example, data updated according to instructions from a server manager or other external devices at any time.

[Details of Specific Processing in Vehicle Control System f1 of Seventh Embodiment]

Hereinafter, details of specific processing in the vehicle control system f1 of the seventh embodiment will be described.

[Acquisition of Content and Advertisement Information]

First, an example of acquisition of content and advertisement information in the seventh embodiment will be described. An occupant of the vehicle f200 acquires content and advertisement information to be displayed on the outside display f272 from the content providing server. In this case, the requester f274 causes a display of the HMI f232 to display a content acquisition request screen IM1 and allows the occupant to perform an operation for acquiring the content.

Figures 120, 121:
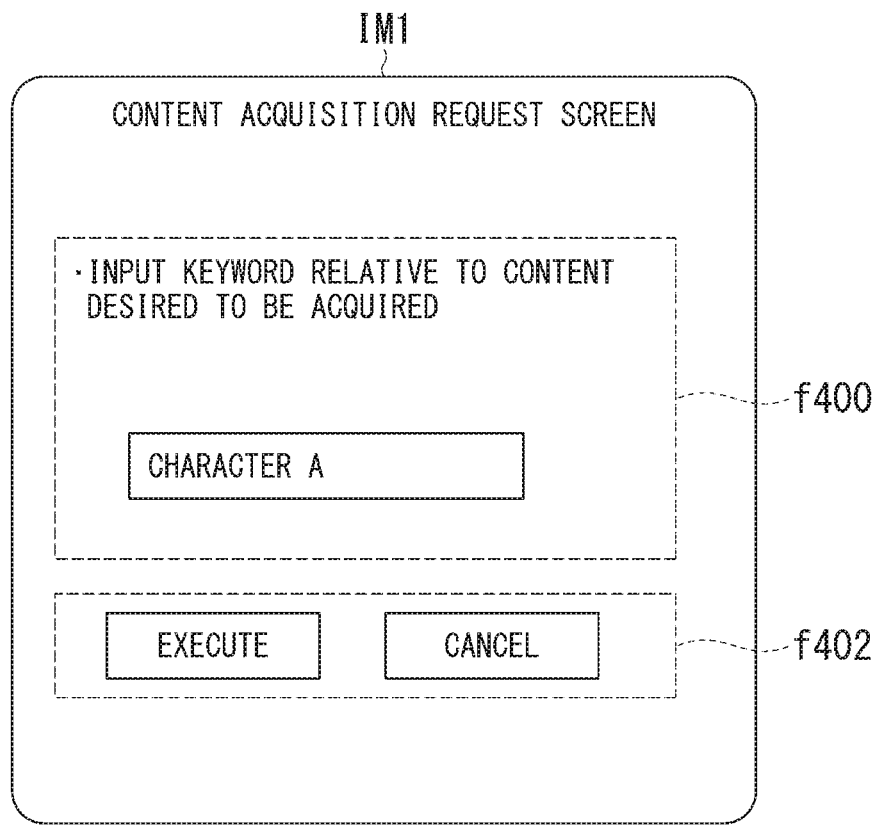

FIG. 120 is a diagram showing an example of the content acquisition request screen IM1. The content acquisition request screen IM1 displays a keyword input area f400 through which a keyword about content desired to be acquired is input, and a determination operation area f402 through which execution or cancellation of a content acquisition request based on input details is determined. A layout of the content acquisition request screen IM1 is not limited to the example of FIG. 120 with respect to display items. Layouts and items with respect to other screens IMx (x is a natural number equal to or greater than f2) described below may also be arbitrarily changed. Various screens displayed on displays of the vehicle f200 may be displayed, for example, on a display of a terminal device used by an occupant. The terminal device is, for example, a smartphone, a tablet terminal, or a personal computer.

An occupant inputs a keyword to the keyword input area f400 of the content acquisition request screen IM1. The keyword is, for example, information about the name of a character or the genre of content, or the like. The occupant selects an execution button of the determination operation area f402 after input of the keyword. Accordingly, the requester f274 transmits a content acquisition request including the input keyword and a vehicle identification ID for identifying the vehicle f200 to the content providing server f300. The vehicle identification ID may include information for identifying a vehicle type. For example, when the vehicle identification ID is "Va001," "Va" may be vehicle type identification information.

The request receiver f320 of the content providing server f300 outputs the keyword and the identification information of the vehicle included in the content acquisition request to the provider f330 when the content acquisition request transmitted from the vehicle f200 is received. The provider f330 acquires content corresponding to content data f342 for each vehicle, the keyword and the identification information of the vehicle on the basis of the keyword and the identification information of the vehicle.

FIG. 121 is a diagram showing an example of details of the content data f342 for each vehicle. In the content data f342 for each vehicle, content data is associated with a keyword and a vehicle ID. One or more pieces of content are stored in content data. Each piece of content includes an object corresponding to a shape based on the vehicle type of the vehicle f200, and information about a display position, a display size, a color and the like for each object. The provider f330 transmits the content acquired from the content data f342 for each vehicle to the vehicle f200 which has transmitted the content acquisition request.

The provider f330 acquires advertisement information corresponding to a vehicle type with reference to the advertisement information f344 for each vehicle type on the basis of vehicle type information included in the vehicle identification ID of the content acquisition request. FIG. 122 is a diagram showing an example of details of the advertisement information f344 for each vehicle type. In the advertisement information f344 for each vehicle type, one or more pieces of advertisement information are associated with vehicle type identification information. Advertisement information includes information about a product or a service desired to be advertised and information about a display position, a display size, a color and the like of advertisement information in accordance with a vehicle type. The provider f330 transmits the acquired advertisement information to the vehicle f200 which has transmitted the content acquisition request. The provider f330 may receive a content acquisition request from the vehicle f200 in advance, refer to the content data f342 for each vehicle and the advertisement information f344 for each vehicle type at predetermined intervals, and when new content or advertisement information is provided, transmit the new content or advertisement information to the vehicle f200.

The provider f330 stores a provision history of content and advertisement information in the storage f340 as the user information f346. FIG. 123 is a diagram showing an example of details of the user information f346. In the user information f346, a provision date and time when one or both of content data and advertisement information has been provided to the vehicle f200, the provided content data and advertisement information are associated with a vehicle ID. When charging is performed for provision of content or a point is given for utilization of advertisement information, information about the aforementioned charging or point may be associated with a vehicle ID in the user information f346.

For example, when the provider f330 provides content to the vehicle f200, the provider f330 may acquire the number of times of utilization of content and advertisement information (the number of times of provisions of content) with reference to the user information f346 and provide rare content to the vehicle f200 when the acquired number of times of utilization is equal to or greater than a threshold value. The provider f330 may provide rare content to the vehicle f200 when a charged amount or a point is equal to or greater than a threshold value or there is a content acquisition request in a predetermined event execution period.

Figure 124:
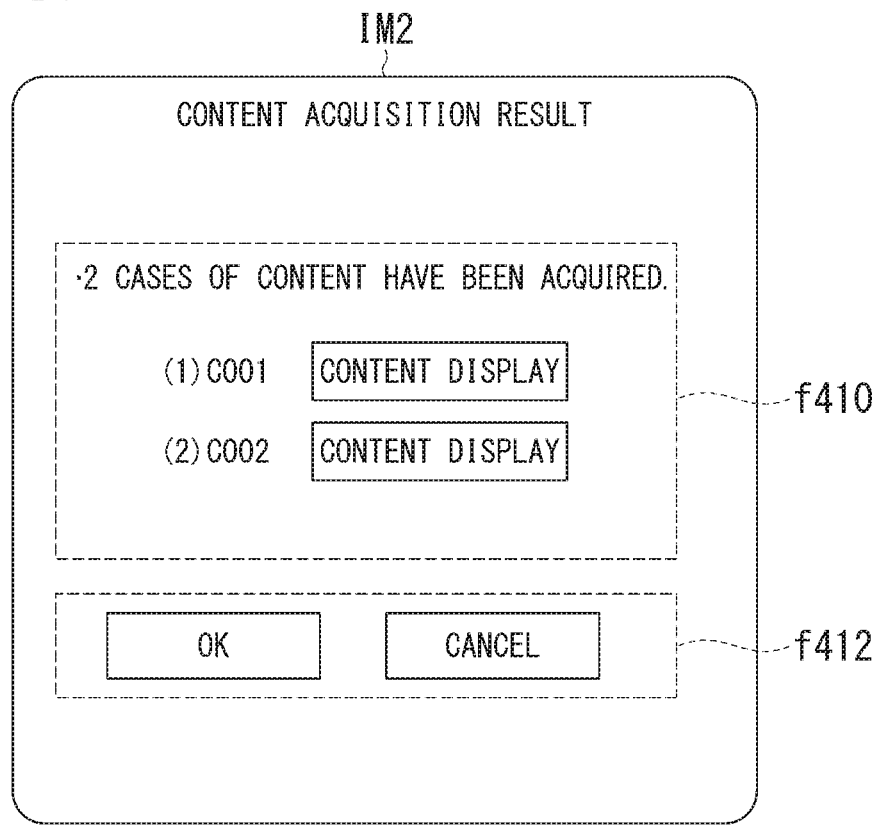

The acquirer f276 of the vehicle f200 displays an acquisition result of content acquired according to a content acquisition request of the requester f274 on the display of the HMI f232. FIG. 124 is a diagram showing an example of a content acquisition result screen IM2. The content acquisition result screen IM2 displays a content list area f410 in which a list of acquired content is displayed, and a determination operation area f412 through which confirmation or cancellation of a content acquisition result is determined.

Content display buttons through which details of acquired content are displayed are displayed in the content list area f410, and an occupant presses a content display button to display details of content on the display of the HMI f232. The occupant selects an OK button of the determination operation area f412. Accordingly, the acquirer f276 stores the acquired content in the content DB f278B. The occupant may select one or more pieces of content from content results displayed in the content list area f410 of the content acquisition screen IM2. In this case, the acquirer f276 stores the content selected by the occupant in the content DB f278B.

When the acquirer f276 acquires advertisement information from the content providing server f300, the acquirer f276 stores the acquired advertisement information in the advertisement information DB f278C. In this case, the acquirer f276 may display an advertisement information acquisition result screen like the content acquisition result screen IM2, or the like on the display of the HMI f232 and allow the occupant to select advertisement information.

[Display Control of Content and Advertisement Information]

Next, an example of display control of content and advertisement information in an embodiment will be described. The display controller f270 refers to the display conditions data f278A stored in the storage f278 and controls display of content and advertisement information through the outside display f272.

FIG. 125 is a diagram showing an example of details of the display conditions data f278A. In the display conditions data f278A, vehicle environment details representing specific details of a vehicle environment, a content display flag indicating whether content display is being performed, a content identification ID, an advertisement display flag indicating whether advertisement display is being performed, and an advertisement identification ID are associated with a vehicle environment ID for identifying the vehicle environment. In the example of FIG. 125, the content display flag is set to "1" when content is displayed and set to "0" when content is not displayed. The advertisement display flag is set to "1" when advertisement information is displayed and set to "0" when advertisement information is not displayed. Information set as a flag is not limited to "0 and 1" and may be information capable of indicating whether display is being performed, such as "YES and NO" and "a and b." The display conditions data f278A may be provided by the content providing server f300 or set by an occupant.

The display controller f270 acquires environment information of the vehicle f200 on the basis of an environment of the surroundings or the vehicle cabin of the vehicle f200 provided by the outside monitor f210 and the in-vehicle monitor f245, and states such as steering, an acceleration/deceleration, a travel position and a travel road of the vehicle f200 provided by the automated driving controller f250. The display controller f270 refers to the display conditions data f278A depending on the acquired environment information and acquires a content display flag and an advertisement display flag corresponding to environment information details matching the acquired environment information.

When the content display flag is "1," the display controller f270 acquires content corresponding to a content identification ID from the content DB f278B and displays the acquired content on the outside display f272.

Figure 126:
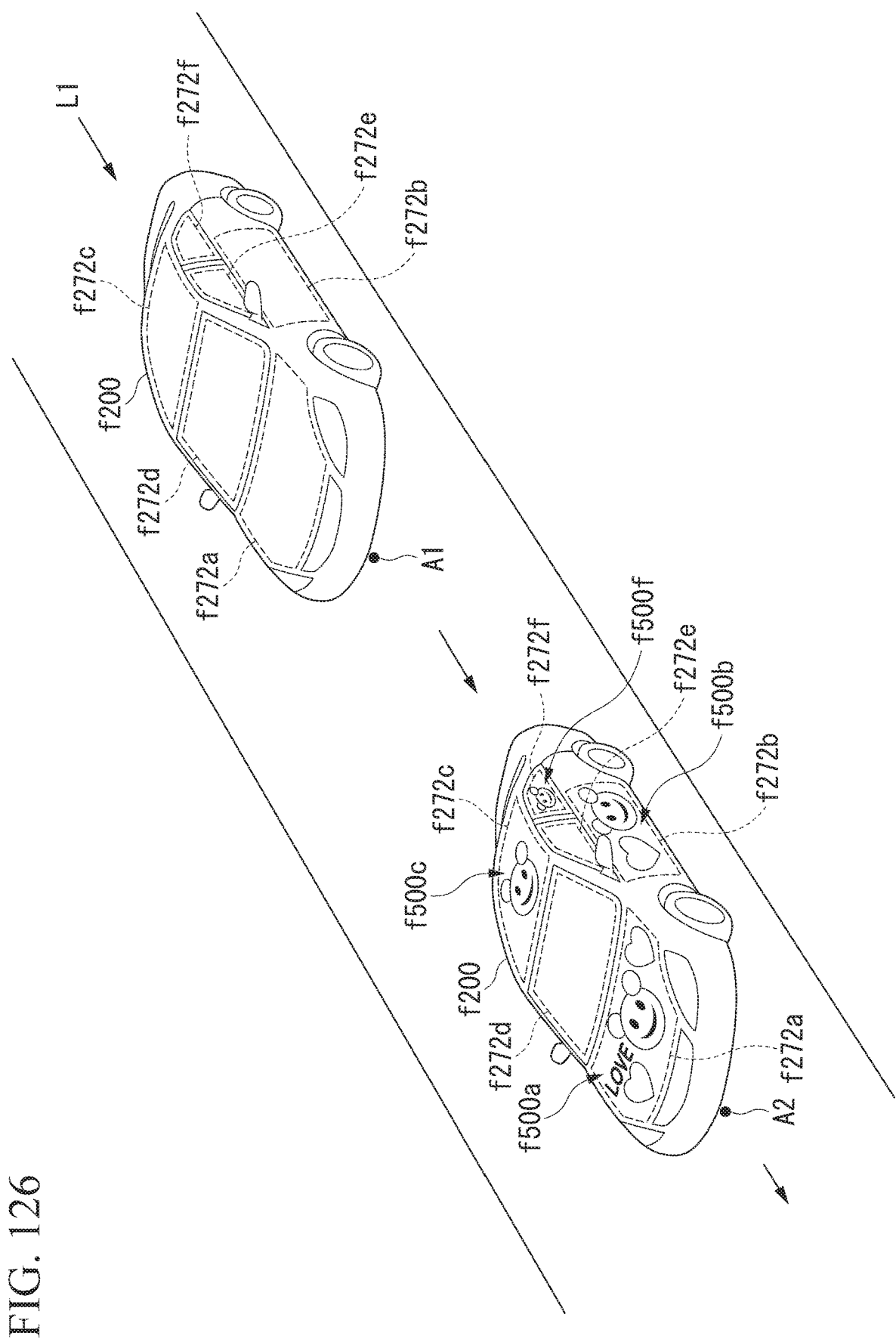

FIG. 126 is a diagram for describing a state in which content is displayed on the outside display f272. The vehicle f200 includes the outside display f272 provided on the front, rear, left, right and upper (roof part) parts of the vehicle. The example of FIG. 126 shows the vehicle f200 in which outside displays f272a to f272c are provided on the body part and outside displays f272d to f272f are provided on the windshield parts.

Next, display control of content and advertisement information based on the display conditions data f278A will be described in detail. For example, the display controller f270 may acquire positional information of the vehicle f200 from the automated driving controller f250 and determine whether the position of the vehicle f200 is in proximity to a preset house of an occupant. Proximity to a house is within a range of a radius of tens of meters to hundreds of meters from the position of a house registered in advance. The same applies to "proximity to ∘∘" in the description below.

When the position of the vehicle f200 is in proximity to the house, the display controller f270 controls the outside display f272 such that content and advertisement information are displayed on the outside display f272. In the example of FIG. 126, a point A of the vehicle f200 traveling in a lane L1 is assumed to be in proximity to the house. In this case, the display controller f270 does not display content and advertisement information on the outside display f272.

The display controller f270 acquires positional information of the vehicle f200 from the automated driving controller f250 and determines whether the position of the vehicle f200 is in proximity to a station A. Positional information of the station A is acquired, for example, from map information of the navigation control device f236. When the position of the vehicle f200 is in proximity to the station A, the display controller f270 refers to the display conditions data f278A, acquires content having a content identification ID of "C001" from the content DB f278B and displays the content on the outside display f272. In the example of FIG. 126, a travel point A2 of the vehicle f200 is assumed to be in proximity to the station A. In this case, the display controller f270 displays content 500a to 500c and 500f associated with the outside displays f272a to f272c and f272f. Since this content is acquired on the basis of the vehicle identification ID, the display controller f270 can display objects in accordance with the size and shape of the vehicle f200.

Figure 127:
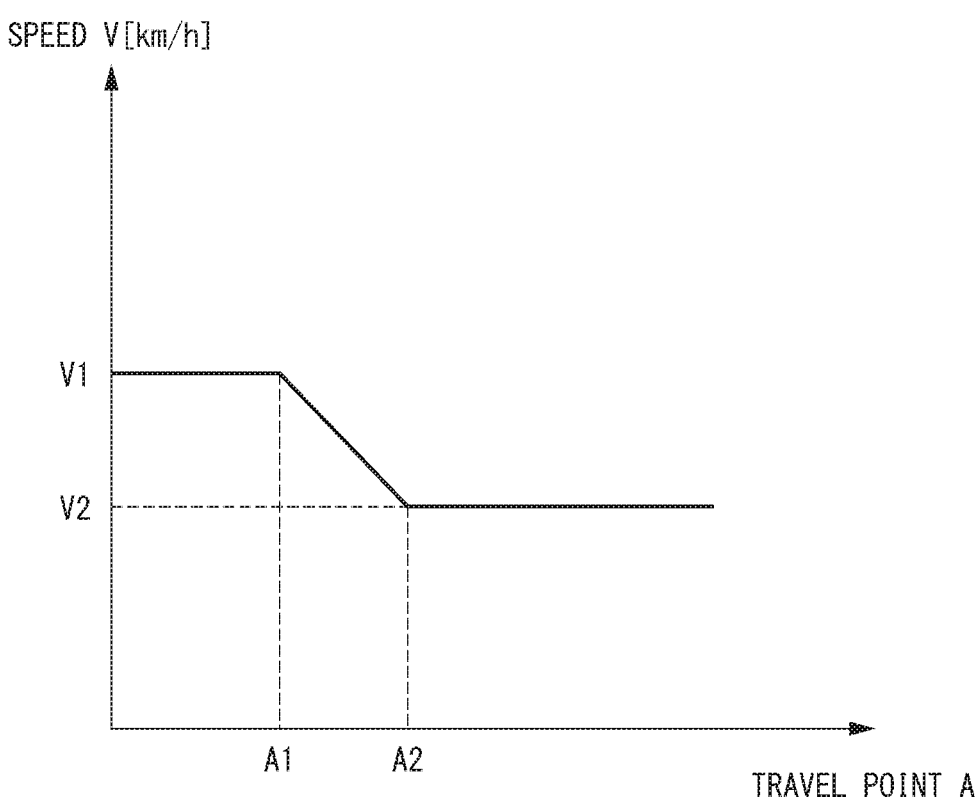

Here, the automated driving controller f250 may control the speed of the vehicle f200 in connection with displaying of content 500 through the display controller f270. FIG. 127 is a diagram for describing speed control of the vehicle f200. The vertical axis of FIG. 127 represents a travel point A based on a predetermined route and the vertical axis represents a vehicle speed V [km/h]. The automated driving controller f250 causes the vehicle f200 to travel at a speed V1 [km/h] when the vehicle f200 is traveling at a point A1 at which the content 500 is not displayed on the outside display f272. The automated driving controller f250 performs deceleration control when the vehicle f200 comes into proximity to a point A2 at which content is displayed on the outside display f272 and causes the vehicle f200 to travel at a speed V2 (V2<V1) [km/h] when the vehicle f200 passes through the point A2. The speed V2 is set on the basis of a legal speed limit of the road on which the vehicle f200 is traveling and states of neighboring vehicles. Accordingly, content can be easily seen by persons around the vehicle f200 and thus can attract attention more efficiently.

The display controller f270 acquires positional information of the vehicle f200 from the automated driving controller f250 and determines whether the position of the vehicle f200 is in proximity to a station B. Positional information of the station B is acquired, for example, from map information of the navigation control device f236. When the position of the vehicle f200 is in proximity to the station B, the display controller f270 refers to the display conditions data f278A, displays content having a content identification ID of "C001" on the outside display f272, acquires advertisement information having an advertisement identification ID of "A001" from the advertisement information DB f278C and displays the advertisement information on the outside display f272.

Figure 128:
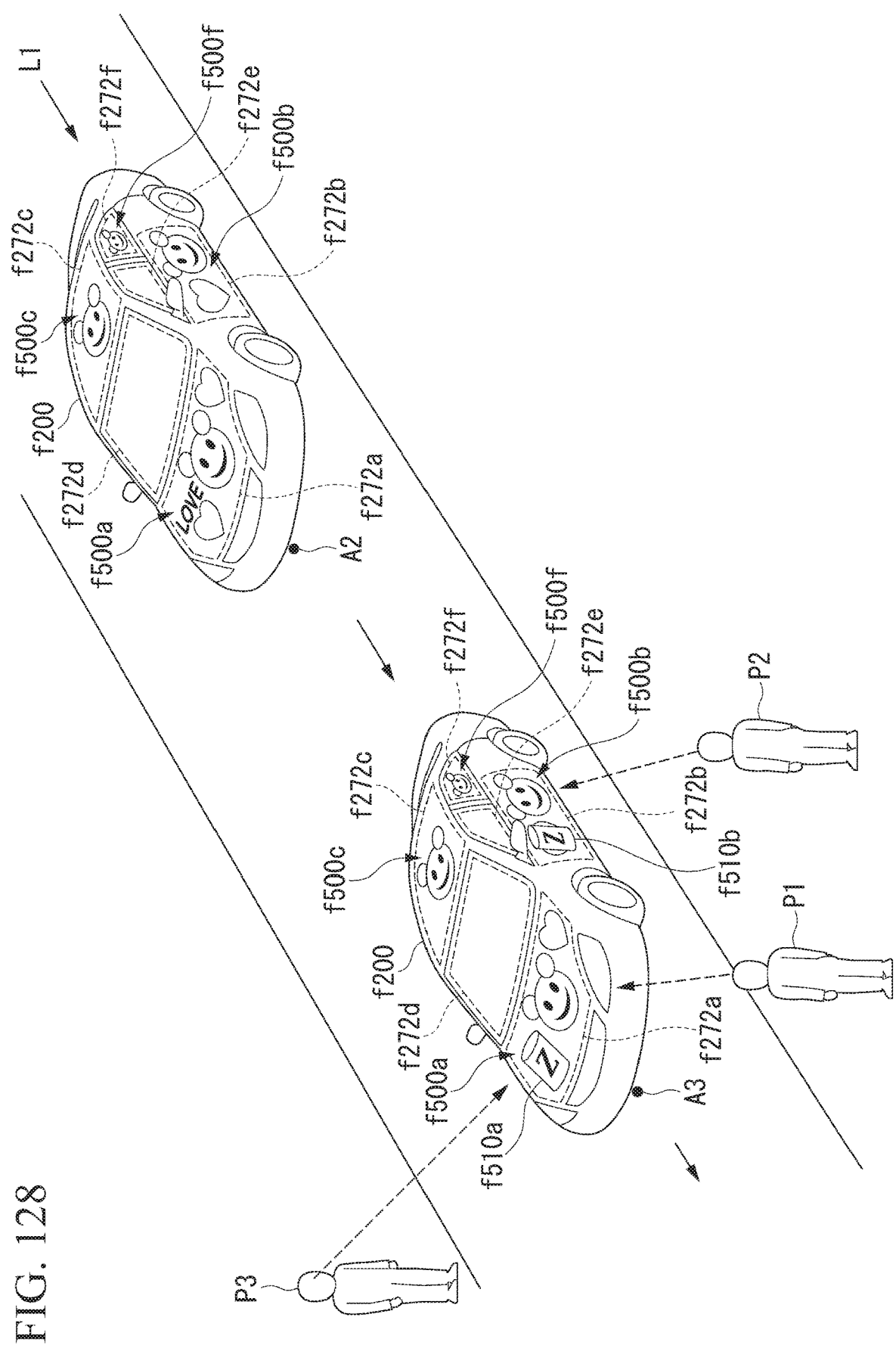

FIG. 128 is a diagram for describing display control of advertisement information. The example of FIG. 128 shows the vehicle f200 after passing through the travel point A2 shown in FIG. 126. In the example of FIG. 128, a travel point A3 of the vehicle f200 is assumed to be in proximity to the station B. In this case, the display controller f270 displays content 500a to 500c and 500f corresponding to the outside displays f272a to f272c and f272f and displays advertisement information objects 510a and 510b on the outside displays f272a and f272b.

When the display controller f270 displays advertisement information 510, the display controller f270 changes some objects of content 500 to objects of the advertisement information and displays the advertisement information. The display controller f270 may display objects of the advertisement information 510 superposed on objects of the content 500. The display controller f270 may change display of the content 500 to display of only the advertisement information 510 and display the advertisement information 510.

The display controller f270 may display a product (e.g., canned coffee Z) that is an example of an object of the advertisement information 510 by adjusting the position, size, direction and the like of the object such that a character that is an object of the content 500 is holding or using the product. The display controller f270 may generate an image by combining the content 500 and the advertisement information 510 and display the generated image on the outside display f272.

In the example of FIG. 128, line-of-sight directions of persons P1 to P3 face the side of the vehicle f200 in proximity to the travel point A3 of the vehicle f200. In this case, the outside monitor f210 detects the line-of-sight directions of the persons P1 to P3, sets a degree of attention on the vehicle f200 to "2" and outputs the degree of attention to the display controller f270. The display controller f270 displays the content 500 and the advertisement information 510 on the outside display f272 because the degree of attention exceeds a predetermined value (e.g., "1"). Accordingly, the vehicle f200 displays the advertisement information 510 after attracting attention of surrounding people by displaying the content 500 and thus can improve advertising effects of the advertisement information.

The display controller f270 may change display positions of objects included in the content 500 and the advertisement information 510 displayed on the outside display f272 depending on a line-of-sight direction of a person P obtained by the outside monitor f210. For example, when the vehicle f200 passes through the position of the person P2 shown in FIG. 126, the display controller f270 may change display such that an object of a character included in the content 500 or an object of the advertisement information 510 is displayed in the line-of-sight direction of the person P2 in accordance with the line-of-sight direction of the person P2. Accordingly, the vehicle f200 can show the character and the object of the advertisement information 510 displayed on the outside display f272 to surrounding people for a long time.

The display controller f270 may control display of the content 500 and the advertisement information 510 depending on a travel state of the vehicle f200 obtained by the automated driving controller f250. For example, when the vehicle f200 is traveling on a highway according to the automated driving controller f250, the display controller f270 may control the content 500 and the advertisement information 510 such that they are not displayed. Accordingly, the vehicle f200 does not display the content 500 and the advertisement information 510 when there is no person thereearound on a highway, and the like and thus can reduce power costs and the like for display. The display controller f270 may change an image of a character included in the content 500 to a running image and display the running image when the vehicle f200 is traveling at a speed equal to or higher than a predetermined speed (e.g., 60 [km/h]) and change the image of the character to an image in which the character stops and display the image when the vehicle f200 decelerates. Accordingly, the vehicle f200 can display content corresponding to a behavior of the vehicle.

The display controller f270 may control display of the content 500 and the advertisement information 510 depending on a state of an occupant detected by the in-vehicle monitor f245. For example, when the in-vehicle monitor f245 determines that the occupant is sleeping, the display controller f270 may control the content 500 and the advertisement information 510 such that they are not displayed. Accordingly, the vehicle f200 can reduce power costs and the like for display. When the vehicle f200 is a ridesharing vehicle and the number of occupants detected by the in-vehicle monitor f245 is less than a predetermined number (e.g., f2), the display controller f270 may control the content 500 and the advertisement information such that they are displayed in order to attract attention of surrounding people. A ridesharing vehicle is one or more vehicles shared by a plurality of users.

The display controller f270 may perform vehicle-to-vehicle communication with a neighboring vehicle f200 and display content relative to content displayed on another neighboring vehicle. Content relative to content is, for example, content including objects having unity in type, color and shape, content related to each member in an idol group or an animation, and ideologically relative content such as stories. In the case of platooning of a plurality of vehicles, the display controller f270 may change the order of content displayed through the respective vehicles and display the content in the order in platooning. Accordingly, even when the order of a plurality of vehicles in platooning has changed, for example, content display order is changed depending on the order in platooning and thus details of an entire display in platooning can be uniform.

[Processing Flow]

Figure 129:
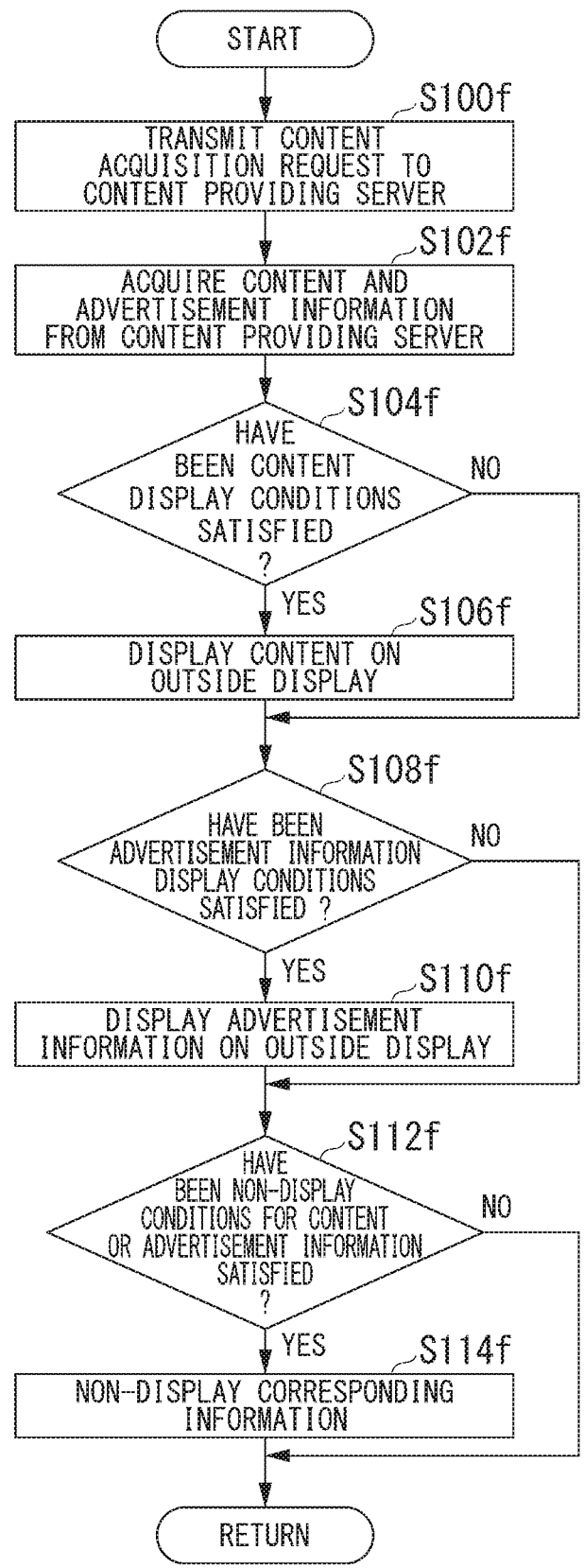

FIG. 129 is a flowchart showing an example of a processing flow executed by the vehicle f200. First, the requester f274 transmits a content acquisition request to the content providing server f300 (step S100f). Next, the acquirer f276 acquires content and advertisement information from the content providing server f300 (step S10f2). Then, the display controller f270 determines whether display conditions for the content are satisfied with reference to the display conditions data f278A (step S104f). When the display conditions for the content are satisfied, the display controller f270 displays the corresponding content on the outside display f272 (step S106f).

Next, the display controller f270 determines whether display conditions for the advertisement information are satisfied with reference to the display conditions data f278A (step S108f). When the display conditions for the advertisement information are satisfied, the display controller f270 displays the corresponding advertisement information on the outside display f272 (step S110f).

Next, the display controller f270 determines whether non-display conditions for one or both of the content and the advertisement information are satisfied with reference to the display conditions data f278A (step S112f). When the non-display conditions for the content or the advertisement information are satisfied, the display controller f270 does not display information of one or both of the corresponding content and advertisement information (step S114f). Accordingly, processing of this flowchart ends. Processing of steps S100f and S102f may be performed asynchronously to processing of steps S104f to S114f.

As described above, according to the seventh embodiment, it is possible to realize content display to the outside of a vehicle in a state suitable for the environment of the vehicle.

[First Modification of Seventh Embodiment]

Figure 130:
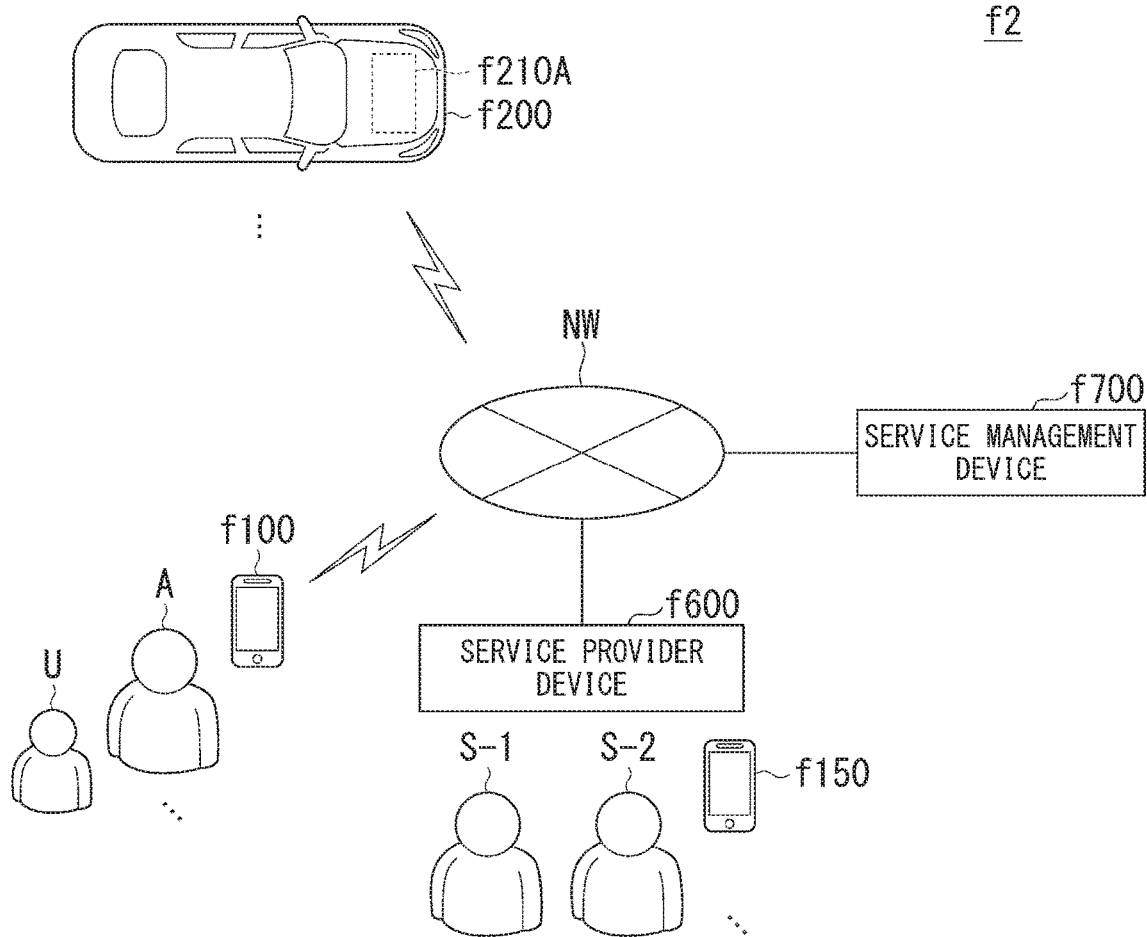

Hereinafter, a first modification of the seventh embodiment will be described. FIG. 130 is a configuration diagram of a service providing system f2 including a vehicle f200 according to the first modification of the seventh embodiment. The service providing system f2 includes one or more terminal devices 100 used by one or more service applicants A, one or more vehicles f200, one or more terminal devices 150 used by one or more service providers S, a service provider device 600, and a service management device f700. These components can communicate with one another through a network NW. Services from the service providers S are provided to service users U. Although the figure shows the service applicant A and the service user U are different persons, they may be the same person. "Using by the service applicant A" may include "temporarily using a terminal device that can be used by unspecified individuals, such as a terminal device of an Internet café, by the service applicant A."

[Terminal Device]

The terminal device f100 is, for example, a smartphone, a tablet terminal, a personal computer or the like. The terminal device f100 supports services described below by starting an application program or a browser for using the service providing system f2. The following description is based upon the premise that the terminal device f100 is a smartphone and the application program (application for service applicants) has been started. An application for service users communicates with the service management device f700 according to an operation of the service applicant A and transmits a request from the service applicant A to the service management device f700 or performs a push notification based on information received from the service management device f700.

The terminal device f100 transmits, for example, service use request information including details described below to the service management device f700. Positional information may be identified by a GPS receiver included in the terminal device f100, for example. Other types of information are based on information input by the service applicant A or the service user U in principle. Desired service provider attribute information is information about attributes of the service provider S desired to be used by the service user U. Attributes may include an age, a sex, a character (type) and the like in addition to the type of a service to be provided. With respect to attributes, the service management device f700 may suggest service providers S to the service user U and allow the service user U to select or determine a perfectly matching service user U instead of performing fixed allocation of a perfectly matching service provider S.

[Service Use Request Information]
 User ID
 Positional information (latitude, longitude and altitude)
 Desired space information (represented by the number of persons, the number of seats, or the like, for example)
 Desired service provider attribute information
 Desired service ID
 Desired section information (information on first section)
 Information on time period for use of service desired by service user
 Settlement authentication information

Figure 131:
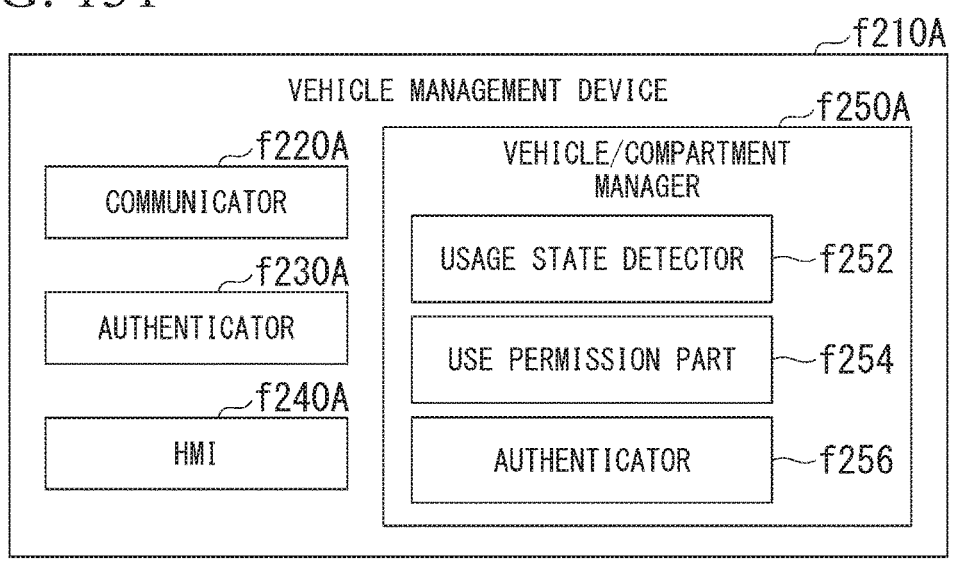

[Vehicle]
Components relative to travel control of the vehicle f200 (e.g., components relative to automated driving) are the same as those included in the vehicle f200 in the first embodiment. That is, the vehicle f200 is an automated driving vehicle and a vehicle having a wireless communication function as described below. FIG. 131 is a diagram showing an example of a configuration of a vehicle management device f210A mounted in the vehicle f200. The vehicle management device f210A includes, for example, a communicator f220A, an authenticator f230A, an HMI f240A, and a vehicle/compartment manager f250A.

The communicator f220A is a wireless communication device. The communicator f220A communicates with the service management device f700 through the network NW. The authenticator f230A performs authentication processing for starting a service according to an instruction of the service management device f700. The HMI f240A is, for example, a touch panel type display device (displayer), a speaker, a microphone, or various operation switches or the like provided separately from the HMI f232.

The vehicle/compartment manager f250A includes, for example, a usage state detector f252, a use permission part f254, and an authenticator f256. One or more spaces (compartments) that can be used by the service user U and the service provider S are provided in the vehicle f200. A compartment is, for example, a seat, a loading area in which cargo is loaded, or the like. For example, a compartment may be an area, for example, defined by a predetermined partition. For example, a compartment controller which is not shown may convert a seat to a loading area or convert a loading area to a seat by controlling a mechanism for driving seats and loading areas. Further, the compartment controller may store a seat in a storage part for storing the seat or take the seat stored in the storage part out of the storage part. The usage state detector f252 detects a usage state of each compartment. For example, the usage state detector f252 may detect whether each compartment is being used. Although a normal car is shown as the vehicle f200 in FIG. 130, the vehicle f200 may be a vehicle with a size such that one or more occupants can ride in respective compartments partitioned from a vehicle cabin, such as a trailer, a bus, a microbus, or the like. The use permission part f254 permits use of compartments designated in advance and performs, for example, door unlocking and the like when authentication has been successfully performed by the authenticator f256, for example. The authenticator f256 performs authentication such as personal identification of the service user U or the service provider S who will ride in a vehicle.

The vehicle management device f210A transmits, for example, vehicle information including details described below to the service management device f700.

[Vehicle Information]
 Vehicle ID
 Positional information (latitude, altitude and longitude)
 Compartment usage state (a user ID of a service user who is using a compartment that is being used, information on available compartments, and the like)
 Travel state (speed, acceleration, angular velocity, an on-board apparatus state, and the like)
 Information on service provider S (service provider ID, information on a service being executed, an elapsed time after executing the service, and the like)
 Display content ID (content ID displayed on the outside display f272), display destination ID (ID indicating a position of content displayed on the outside display f272 in the outside display f272)

FIG. 132 is a diagram showing an example of a configuration of the service provider device 600. The service provider device 600 is, for example, a device which detects states of a plurality of service providers and can automatically respond to an order from the service management device f700. The service provider device 600 includes, for example, a communicator 610, an order processor 620, a state manager 630, and a storage 650. The service provider device 600 may include the functional configuration of the content providing server f300.

The communicator 610 communicates with the service management device f700 or the like through the network NW. The order processor 620 performs order reception processing for a service order from the service management device f700. The order processor 620 determines whether details of the service order are within a range of service provision information that has already been transmitted to the service management device f700 and proceeds with the order reception processing when it is determined that the details of the service order are within the range. The state manager 630 manages states (reservation states, operation states, and the like) of service providers S registered in the service provider device 600 and provides service provision information to the service management device f700.

The service provider device 600 transmits, for example, service provision information including details described below to the service management device f700. The service provision information is information about services that can be ordered from a service provider S.

[Service Provision Information]
  Order reception ID
  Service name
  Information on person responsible for execution
  Service provider attribute information
  Information on service provision time period desired by service provider
  Necessary vehicle compartment information
  Information on area in which service can be provided
  Facility point information (information on a service provision site outside a vehicle)
  Information about content ID (e.g., information on available content)
  Service status In addition, when there is a content provision request from the service management device f700, the service provider device 600 transmits content corresponding to the request to the service management device f700. In this case, various types of content corresponding to content IDs are stored in a storage device of the service provider device 600. Various types of content may be stored in advance in a storage device of the service management device f700. The terminal device 150 is, for example, a smartphone, a tablet terminal, a personal computer, or the like. The terminal device 150 supports services described below by starting an application program or a browser for using the service providing system f2. The terminal device 150 transmits the same information as service use request information to the service management device f700. That is, the terminal device 150 has the same function as that of the terminal device f100.

[Service Management Device]

FIG. 133 is a diagram showing an example of a configuration of the service management device f700. The service management device f700 includes, for example, a communicator f710, a first acquirer f720, a second acquirer f722, a third acquirer f724, a vehicle identifier f730, a plan determiner f740, a content controller f742, an updater f744, a requester f746, a route indicator f750, an authenticator f760, a determiner f770, and a storage f800. Components other than the communicator f710 and the storage f800 are realized, for example, by a hardware processor such as a CPU executing a program (software). Some or all of these components may be realized by hardware (circuit part including a circuitry) such as an LSI circuit, an ASIC, an FPGA and a GPU or realized by software and hardware in cooperation. The program may be stored in advance in a storage device such as an HDD, a flash memory or the like, or stored in a detachable storage medium such as a DVD or a CD-ROM and installed in a storage device when the storage medium is inserted into a drive device. The storage f800 is realized by an HDD, a flash memory, a RAM, a ROM or the like.

The communicator f710 is, for example, a network card for accessing the network NW. The communicator f710 communicates with the terminal device f100, the terminal device 150, the vehicle management device f210A, the service provider device 600 and the like through the network NW.

The first acquirer f720 acquires service use request information from the terminal device f100 and the terminal device 150 through the communicator f710. The second acquirer f722 acquires vehicle information or environment information from the vehicle management device f210A of a vehicle f200 registered in advance through the communicator f710. The third acquirer f724 acquires service provision information from the service provider device 600 through the communicator f710.

The vehicle identifier f730 identifies an available vehicle f200 on the basis of service use request information and vehicle information and generates available vehicle information f820. Specifically, the vehicle identifier f730 compares desired space information, desired section information and service use time period information included in the service use request information with positional information and a compartment usage state included in the vehicle information and identifies a vehicle whose positional information and compartment usage state satisfies conditions included in the service use request information as an available vehicle f200.

The plan determiner f740 identifies an available service that the service user U can enjoy on the basis of the available vehicle information f820 and the service provision information and provides information about the identified available service to the terminal device f100 of the service user U.

More specifically, the plan determiner f740 sets a second section in which the service provider S occupies at least a part (e.g., a compartment) of the vehicle f200 on the basis of the available vehicle information f820 and the service provision information and sets a third section in which the service user U and the service provider S occupy at least a part of the vehicle f200 on the basis of an overlap part of the desired section information (information on a first section) in the service use request information and the second section. When the service provider S has already boarded the vehicle f200 before the first section is set, the plan determiner f740 may set the second section having the current position of the vehicle f200 as a starting point simultaneously with setting of the first section.

In addition, the plan determiner f740 sets the third section within an overlap range of information on an area in which the service can be provided included in the service provision information and the first section. Further, the plan determiner f740 sets the third section such that a time period in which the service user U occupies at least a part of the vehicle f200 matches information on a service use time period desired by the service user U and a time period in which the service provider S occupies the vehicle matches information on a service provision time period desired by the service provider S. A "time period" includes time such as start time and end time and a duration. When the service use time period desired by the service user U is not included within the service provision time period desired by the service provider S, for example, the plan determiner f740 may limit the time period in which the service user U occupies at least a part of the vehicle f200 such that it is shorter than the service user time period desired by the service user U to adjust the service use time such that it is included within the service provision time period. On the contrary, when the service provision time period desired by the service provider S is not included within the service use time period desired by the service user U, for example, the plan determiner f740 may limit the time period in which the service provider S occupies at least a part of the vehicle f200 such that it is shorter than the service provision time period desired by the service provider S to adjust the service provision time period such that it is included within the service user time period. Then, the plan determiner f740 identifies an available service on the basis of the set third section.

Further, when a plurality of service providers S sequentially provide services to a certain service user U, the plan determiner f740 may set second sections corresponding to the respective service providers S and set third sections corresponding to the respective second sections.

As another function, the plan determiner f740 may update the first section such that the first section ends at a service provision point outside the vehicle according to an instruction from the service user U using the terminal device f100. In this case, the plan determiner f740 may transmit reservation information with respect to a facility present at the service provision point outside the vehicle using the communicator f710 according to an instruction from the service user U (or automatically) using the terminal device f100, receive a reservation result through the communicator f710 and transmit the reservation result to the terminal device f100 of the service user U using the communicator f710.

Further, the plan determiner f740 refers to a corresponding relationship between a user of the vehicle during travel of the vehicle or an operator of the vehicle and content (a corresponding relationship included in corresponding information f838 described later). The operator of the vehicle is a person who arranges operation of the vehicle, a person responsible for operation or an owner of the vehicle. For example, the operator of the vehicle may be a service manager, a service provider or the like in an embodiment.

The content controller f742 performs processing of displaying content on the outside display f272. The content controller f742 permits use of content on the basis of a reference result of the plan determiner f740. Functions of the updater f744 will be described in detail later. The requester f746 causes the communicator f710 to transmit a content request for requesting content to the service provider device 600.

The route indicator f750 indicates, to the vehicle f200, a route along which the vehicle f200 will travel by causing the communicator f710 to transmit information on a user start position and a user end position of the service user U and a user start position and a user end position of the service provider S to the vehicle f200.

The authenticator f760 performs authentication of the service user U according to communication with the terminal device f100 and the terminal device 150 or performs authentication when service provision is started.

The determiner f770 determines whether each of the service user U and the service provider S is using the vehicle f200.

The plan determiner f740 performs various types of processing using a determination result of the determiner f770. For example, the plan determiner f740 may accept change of the first section (update the first section) only when the determiner f770 determines that both the service user U and the service provider S are using the vehicle f200. This case occurs, for example, when the service provider S suggests change of a destination to the service user U or changes a final destination during service on the basis of information provided to the side of the vehicle f200. In addition, when the determiner f770 determines that the service user U has already been using the vehicle f200 (i.e., when service extension or a request for a separate service has been performed) at a time when the first acquirer f720 receives service use request information, the plan determiner f740 may preferentially allocate the vehicle f200 that is being used to the service user U.

The storage f800 stores user information f810 about a registered service user U, the aforementioned available vehicle information f820, service management information f830 and the corresponding information f838. The service management information f830 includes, for example, service request management information f832, reservation management information f834, and management information on a service in progress f836. Each piece of service use request information acquired by the first acquirer f720 is registered as a record in the service request management information f832. Information such as a reservation use section, a reservation use time period, a stop and an estimated arrival time at a stop is stored in the reservation management information f834 for each service. Information such as a service status, service attributes, and a service provider ID is registered in the management information on a service in progress f836. The corresponding information f838 is information transmitted from the terminal device f100, the terminal device 150 or the vehicle management device f210A and information in which a user ID (or a driver ID of a driver who drives the vehicle), a vehicle ID and a content ID requested to be used by a user are associated.

In the corresponding information f838, a content provider ID, a content user target area ID, a content use time, a content attention degree index, and the like are associated with a content ID. The content use target area ID is, for example, an ID indicating an area in which content can be used. The content use time is a time at which content can be used.

The corresponding information f838 includes display conditions data f839. FIG. 134 shows an example of details of the display condition data f139. For example, a vehicle environment ID, vehicle environment details, a content identification ID, and information indicating whether use is permitted are associated with each user (or operator) in the display conditions data f839, as shown in FIG. 134. The display conditions data f839 may include the same information as the display conditions data f278A, for example.

The updater f744 updates the corresponding information f838 of a vehicle user or a vehicle operator and content. For example, the updater f744 updates a corresponding relationship between a vehicle user or operator and content in the corresponding information f838. Updating includes recording or storage of results, change in priority of displayed content, and the like. Processing results and usage states of the vehicle management device f210A and the service provider device 600 which provides content are counted and thus a correlation between the content and an exposure degree, usage degree and environment information of the content, and the like can be ascertained. Then, the service management device f700 can derive a usage result of the content on the basis of a processing result of the updater f744 and provide a derivation result to the provider or a predetermined manager. The usage result is used, for example, for measurement of an incentive for the user or the content provision source.

FIG. 135 is a view for describing a process of the updater f744. For example, the updater f744 stores, in the storage f800 as corresponding information f838, information in which a vehicle environment ID, a degree of attention, and a date and time for each user are associated with one another, as shown in FIG. 135. Then, the updater f744 updates the display conditions data f839 on the basis of the corresponding information f838. For example, in the display conditions data f839, the updater f744 may set "content C10" having priority 1 before update to priority f2 after update and set "content C15" having priority f2 before update to priority 1 after update. That is, the updater f744 increases a priority of content having a high degree of attention.

The updater f744 may acquire, from the vehicle f200, information (an example of "environment information") on the line of sight of a person around the vehicle f200 which is associated with content displayed on the outside display f272 and the position at which the content is displayed in the outside display f272, and update a corresponding relationship between the user of the vehicle f200 or the operator of the vehicle f200 and the content on the basis of the acquired information. For example, the updater f744 may reflect the position at which the content is displayed, the type of the content and a correlation between the content and the position in the display conditions data f839 to update the display conditions data f839 such that a frequency of the line of sight of the person facing the content increases or a time for which the line of sight faces the content increases.

The updater f744 may update a corresponding relationship between content acquired from the service provider device 600 and a user of the vehicle f200 or an operator of the vehicle when the vehicle f200 is traveling according to the request of the requester f746 (refer to FIG. 136). For example, the updater f744 may associate a user who has requested content with an acquired content ID.

FIG. 136 is a flowchart showing an example of a processing flow executed in the service providing system f2. FIG. 136 shows an example of processing in which display of the outside display f272 of the vehicle f200 is changed according to a request from a service provider S (a user sharing the vehicle).

First, a service client A (service provider S) performs user authentication for the authenticator f760 of the service management device f700 using the terminal device 150 (step S200f). When authentication by the authenticator f760 has been successfully performed, the service client A (service provider S) transmits service use request information to the service management device f700 using the terminal device 150 (step S202f). The service use request information is acquired by the first acquirer and stored in the storage f800 as service request management information f832. The service use request information in this flowchart is, for example, information for requesting use of content (hereinafter, content use request information).

When the content use request information is acquired, the third acquirer f724 of the service management device f700 inquires of the service provider device 600 about content provision information (step S204f). A plurality of service provider devices 600 may be present depending on attributes and service providers of content (or services) to be provided. In this case, the third acquirer f724 may simultaneously inquire of the plurality of service provider devices 600. The state manager 630 of the service provider device 600 returns information related to available content (representing details of available content) to the service management device f700 (step S206f). The state manager 630 returns information on provision of services that can be ordered to the service management device f700.

The second acquirer f722 of the service management device f700 inquires of the vehicle management device f210A of a usage state (vehicle information) (step S208f). The vehicle/compartment manager f250A of the vehicle management device f210A returns, to the service management device f700, vehicle information and environment information detected by the usage state detector f252 along with a vehicle ID associated with the vehicle management device f210A (step S210f). The environment information includes positional information of the vehicle f200 and information representing a surrounding state of the vehicle. The information representing a surrounding state of the vehicle is a degree of attention on the vehicle f200. Processing of steps S208f and S210f may be always performed at any timing asynchronously with processing shown in the flowchart.

Next, the vehicle identifier f730 identifies an available vehicle on the basis of the content use request information and the information acquired in step S210f and generates available vehicle information (step S212f). A plurality of vehicles may be identified in step S212f. In this case, identification of a final vehicle may be performed until step S224f described later. Then, the plan determiner f740 identifies an available service that can be enjoyed by the service provider S (e.g., an available service or content) on the basis of the available vehicle information and the available content information acquired in step S206f (step S212f) and transmits available service information representing details of the identified available service to the terminal device 150 (step S214f).

The service client A (service provider S) reads the available service information and performs service ordering (e.g., service ordering with respect to the content or service ordering with respect to use of the vehicle) for the service management device f700 using the terminal device 150 as a result (step S216f). The plan determiner f740 of the service management device f700 extracts a part for which the service provider device 600 will be responsible from among services ordered in step S216f and performs service ordering for the service provider device 600 (step S218f).

The order processor 620 of the service provider device 600 transmits the intent of service ordering to the service management device f700 (step S220f). In addition, the order processor 620 transmits details of ordering reception to the terminal device 150 of the service provider S.

When the intent of ordering is received from the service provider device 600, the route indicator f750 of the service management device f700 sets a route along which the vehicle f200 will travel in order to provide the service (step S222f).

Next, the authenticator f760 of the service management device f700 performs authentication processing for starting the service on the service provider device 600 and the authenticator f230A of the vehicle f200, the route indicator f750 indicates the route set in step S22f2 to the vehicle f200, the service provider device 600 performs authentication of starting of the service and performs final vehicle identification as necessary, and the authenticator f230A in the vehicle management device f210A of the vehicle f200 performs authentication on the side of the vehicle and starts or schedules travel along the indicated route (step S224f).

Next, when a distance between the vehicle f200 and the service client A reaches a set distance, for example, the content controller f742 of the service management device f700 transmits requested content information along with the environment information of the vehicle f200 including the positional information to the terminal device 150 (step S226f). Further, the content controller f742 transmits the content information and compartment information to the service provider device 600 (step S228f). That is, the service management device f700 that is an operator associates the content information related to the service provider S with the environment information of the vehicle including the positional information and provides the associated information on the basis of the request from the service provider S as a user. The compartment information is, for example, information for controlling functions related to compartments. For example, the compartment information may be control information for changing a loading area to a seat and information for controlling each function of devices provided in other compartments, and the like.

Next, the service provider device 600 acquires the compartment information and transmits the acquired compartment information to the vehicle management device f210A (step S230f). When the compartment information is acquired, the vehicle management device f210A performs predetermined control on the vehicle f200 in response to this information (step S230f). Meanwhile, the terminal device 150 may directly communicate with the vehicle f200 to transmit the content information, the compartment information and the like to the vehicle f200.

Next, the service provider device 600 acquires the content information and transmits the acquired content information to the vehicle management device f210A (step S232f). That is, the service provider device 600 performs control of displaying the content information on the outside display f272 of the vehicle f200 (outside display control). When the vehicle management device f210A acquires the content information, the display controller f270 of the vehicle f200 displays the content on the outside display f272 in response to this information (step S234f). The display controller f270 changes display outside the vehicle.

Thereafter, the service client A rides in the vehicle f200 (step S23f6) and operates, for example, the HMI f240A to instruct outside display to be changed (step S238f), and when the display controller f270 of the vehicle f200 acquires information about details of the operation, the display controller f270 changes content in response to the acquired operation (step S240f). Although an example in which the service client A transmits the service use request information to the service management device f700 using the terminal device 150 and then rides in the vehicle f200 has been described in FIG. 136, the service client A may ride in the vehicle f200 and then transmit the service use request information to the service management device f700 by operating the terminal device 150 or the HMI f240. In addition, the HMI f240A may have the same function as that of the terminal device 150. In this case, the service client A can ride in the vehicle f200 and then instruct outside display to be changed by operating the HMI f240A instead of the terminal device 150, for example.

As described above, when the vehicle f200 has changed content, the vehicle f200 transmits information on the changed content to the service management device f700. When the service management device f700 acquires the information on the changed content, the route indicator f750 of the service management device f700 determines execution of correction of a route, change of a destination or change of a travel state, and the like on the basis of the information on the acquired content and transmits the determination result to the vehicle f200 (step S24f2). For example, when the acquired information on the content is first information, the route indicator f750 may determine travel along a route associated with the first information, determine travel toward a destination or change a travel state. Meanwhile, the route indicator f750 may determine execution of correction of a route, change of a destination, change of a travel state or the like on the basis of acquired environment information and transmit the determination result to the vehicle f200. For example, the route indicator f750 may determine change of routes to a route that attracts attention of people or determine travel with a reduced speed. In such a case, the vehicle f200 executes control based on the determination result. That is, the vehicle f200 travels along a corrected route, travels toward a changed destination or travels in a changed travel state.

When an additional service can be presented, the plan determiner f740 presents the additional service to the terminal device 150 (step S244f). When the service client A reads details of the additional service and orders the additional service using the terminal device 150 (step S244f), the plan determiner f740 of the service management device f700 performs service ordering with respect to the additional service for the service provider device 600 (step S246f). The order processor 620 of the service provider device 600 transmits information representing the intent of additional service ordering to the service management device f700 (step S248f). When the information representing the intent of additional service ordering is received, the route indicator f750 of the service management device f700 notifies the service client A of reception of change of available content (step S250f).

The above-described processing is performed and the content requested by the service client A is displayed while the vehicle is traveling. Specifically, the plan determiner f740 refers to a corresponding relationship between a vehicle user (or operator) during travel of the vehicle recognized on the basis of the environment (environment information) of the vehicle and the content and the content controller f742 permits use of the content on the basis of the reference result and thus the content is displayed on the outside display f272.

The plan determiner f740 may acquire a state of an occupant from the vehicle f200 and determine whether to refer to the corresponding relationship between the content vehicle user or the vehicle operator and the content depending on the acquired state of the occupant. For example, the plan determiner f740 may determine that the content is not displayed on the outside display f272 without referring to the corresponding relationship when it is determined that the occupant is sleeping. In addition, the state of the occupant may be the attribute of the occupant such that whether the occupant is an adult, presence or absence of authentication or subscription of a charged service, an elapsed time from riding in the vehicle, or the like. For example, the plan determiner f740 may determine that the content is not displayed on the outside display f272 without referring to the corresponding relationship when the occupant is not an adult and when the occupant does not subscribe to a charged service.

The route indicator f750 may instruct a travel state or a route to be changed according to environment information acquired from the vehicle f200. For example, when the route indicator f750 acquires information indicating a low degree of attention from the vehicle f200, the route indicator f750 may instruct the vehicle f200 to travel along a route set or acquired in advance (a route attracting a high degree of attention) or instruct the vehicle f200 to travel in a travel state attracting a high degree of attention (a travel state in which a speed is reduced).

Hereinafter, information displayed on the outside display f272 of the vehicle f200 on the basis of control of the service management device f700 or the service provider device 600 will be described. A specific example when the service management device f700 refers to environment information and a corresponding relationship between a vehicle operator and content and causes the content to be used on the basis of a reference result will be described with reference to FIG. 17 and FIG. 18 described in the first embodiment and FIGS. 137 to 144 to be described later. This is an example in which content relative to a service provided by a service provider that is an operator is displayed on the outside display f272. Hereinafter, illustration and description will be performed using the XYZ coordinate system as necessary. X and Y directions are directions along approximately a horizontal plane. The X direction is a direction in which a vehicle progresses and the Y direction is a direction intersecting (e.g., approximately perpendicular to) the X direction. The Z direction is a direction intersecting (e.g., approximately perpendicular to) the X direction and the Y direction.

For example, a trademark or a logo indicating a service, details of the service (English conversation institution), a destination of the vehicle f200, a service provision state (information indicating whether the service can be used) and the like may be displayed on the outside display f272. FIG. 17 is a perspective view of the vehicle f200 providing a service with respect to an English conversation institution. FIG. 18 is a diagram of the vehicle f200 providing the service with respect to the English conversation institution, viewed in the lateral direction.

For example, information (e.g., a name, a nickname, a reservation number and the like) representing a user who has reserved use of the vehicle f200 (next user approaching the vehicle f200) is displayed on the outside display f272. FIG. 137 is a perspective view of the vehicle f200 having the outside display f272 on which information on the user who has reserved use of the vehicle is displayed. FIG. 138 is a diagram of the vehicle f200 having the outside display f272 on which information on the user who has reserved use of the vehicle is displayed, viewed in the lateral direction.

For example, information representing attributes (e.g., a product or food on sale, a provided service, and the like) of a service provided by the vehicle f200 or conditions for provision of a product or service (a price and a provision time) is displayed on the outside display f272. FIG. 139 is a perspective view of the vehicle f200 having the outside display f272 displaying an attribute of a service. FIG. 140 is a diagram of the vehicle f200 having the outside display f272 displaying information on the attribute of the service, viewed in the lateral direction.

For example, information about an event (an event name and an event date) and information for accessing the information (a URL, a f2-dimensional barcode, or the like) are displayed on the outside display f272. FIG. 141 is a perspective view of the vehicle f200 having the outside display f272 displaying information about an event. FIG. 142 is a diagram of the vehicle f200 having the outside display f272 displaying the information about the event, viewed in the lateral direction. For example, the vehicle shown in FIG. 141 and FIG. 142 is a vehicle traveling toward an event venue and a user going to the vent can ride in the vehicle.

For example, information about an event (an event name and an event date) and information for accessing the event (a URL, a f2-dimensional barcode or the like) may be displayed on the outside display f272 provided on the rear side of the vehicle. FIG. 143 is a diagram of the vehicle viewed on the rear side. For example, the vehicle f200 on which the information about the event is displayed may travel toward the event venue. A user interested in the event can arrive at the event venue by following the vehicle f200. The user can follow the vehicle f200, when following the vehicle f200, while viewing the information about the event displayed on the rear side of the vehicle f200.

For example, when the vehicle f200 is a vehicle that travels around a predetermined area and provides specialty and sightseeing information of that area (a local circulating sampler vehicle), information representing the local circulating sampler vehicle is displayed on the outside display f272. FIG. 144 is a perspective view of the vehicle f200 having the outside display f272 displaying information representing a local circulating sampler vehicle.

For example, the vehicle f200, the service provider device 600 and the service management device f700 may provide information about services (details of services and information on vehicles providing the services) to a vehicle different from the vehicle f200. The different vehicle is, for example, a vehicle performing automated driving. The different vehicle may acquire the information about services, select any service and vehicle from the acquired information and follow the selected vehicle f200. For example, the aforementioned different vehicle may follow the vehicle f200 traveling toward the event venue.

In addition, when predetermined conditions are satisfied, content displayed when the conditions are satisfied is displayed on the outside display f272. The predetermined conditions are conditions defined on the basis of a surrounding environment state or a relationship between a user and a service provider. For example, when a predetermined product with respect to the service provider S is purchased by a service user, content according to the purchase is displayed on the outside display f272.

According to the above-described first modification of the seventh embodiment, the service management device f700 can refer to a corresponding relationship between a user or an operator of a vehicle and content during travel of the vehicle and permit use of the content on the basis of a reference result to realize content display outside the vehicle in a state suitable for the environment of the vehicle.

Eighth Embodiment

Next, an eighth embodiment will be described. In the eighth embodiment, a vehicle system to which a vehicle of the first embodiment is applicable will be described below. The vehicle is, for example, an automated driving vehicle that does not basically require a driving operation. In the vehicle system, an automated driving vehicle is used to provide a room environment according to a user's needs.

FIG. 145 is a configuration diagram of a vehicle system g1. The vehicle system g1 includes one or more vehicles g100, one or more room facilities g200 installed in a room capable of being used by a user, and a management server g300. These components can communicate with each other via a network NW. The network NW includes the Internet, a wide area network (WAN), a local area network (LAN), a public circuit, a provider device, a dedicated circuit, a wireless base station, and the like. A room that can be used by a user is a room where the use of the user has been previously permitted by an owner of the room, a manager, or the like and is, for example, the user's home or workplace, a hotel or an inn where the user stays, or the like. The room that can be used by the user is an example of a space outside the vehicle g100 and equipment present in the room facility g200 is an example of an external device present in a space outside the vehicle g100. As will be described below, the external equipment includes an object that is remotely operated by the user from the interior of the vehicle on the basis of operation information acquired through an operation interface prepared within the vehicle. Hereinafter, although the external equipment will be described as a configuration included in the room facility g200, the present invention is not limited thereto. For example, the external equipment is equipment other than the equipment mounted on the vehicle g100 and may include, for example, equipment mounted on another vehicle.

[Vehicle]

The vehicle g100 creates a room request on the basis of an operation of a user U and transmits the room request to the management server g300 via the network NW. The room request is a request for an instruction for reproducing a pseudo room environment in the interior of the vehicle g100, and includes usage conditions such as a type of room and an attribute of the user U, identification information of the vehicle g100, and the like. The room request does not need to be transmitted every time the user U gets into the vehicle g100. Once the room request is transmitted, provision of the room environment may be continued until the room request is canceled.

The vehicle g100 is, for example, a vehicle having four or more wheels into which a plurality of users U can get. FIG. 146 is a configuration diagram of the vehicle g100. The vehicle g100 includes, for example, an external environment monitor g110, a communication device g120, a navigation device g130, a recommended lane determination device g140, an automated driving controller g150, a driving force output device g160, a brake device g162, a steering device g164, and an environment provider g170. For example, because configurations of the external environment monitor g110, the communication device g120, the navigation device g130, the recommended lane determination device g140, the automated driving controller g150, the driving force output device g160, the brake device g162, and the steering device g164 are similar to those of the external environment monitor a210, the communication device a220, the navigation device a230, the recommended lane determination device a240, the automated driving controller a250, the driving force output device a260, the brake device a262, and the steering device a264 of FIG. 26 introduced into the above-described second embodiment, detailed description thereof will be omitted here. Also, FIG. 3 and associated information introduced into the first embodiment are adopted in a process of processing automated driving in the eighth embodiment and detailed description thereof will be omitted.

The environment provider g170 includes an output g171, a controller g172, an acquirer g173, a storage 174, an identifier g175, and an authenticator g176.

For example, the environment provider g170 reproduces the environment of the room including the room facility g200 in the vehicle g100 by providing the interior of the vehicle with state information indicating the state of the external equipment included in the room facility g200. The state information of the external equipment includes, for example, information indicating the control state of the external equipment, information indicating the external state of the external equipment detected by the detector outside the external equipment, and the like.

The control state of the external equipment includes, for example, a state in which a television is turned on, a rice cooking state of a rice cooker, and the like. Also, the control state of the external equipment includes a functional operation possessed by the external equipment in advance (or an operation associated with the functional operation) and a functional operation set in the external equipment. The functional operation of the external equipment includes, for example, an operation of adjusting the volume of the television, a level value (a setting value) of the set volume, and the like. The functional operation set in the external equipment also includes a functional operation that can be remotely operated from outside, a functional operation that cannot be remotely operated from outside, and the like. The control state of the external equipment also includes an operation state of the external equipment and the like.

The detector is a component that is not included in the external equipment. The detector is not limited to a camera. For example, it is only necessary for the detector to detect an external state of the external equipment. The detector may include a thermometer, an illuminometer, a speaker, and the like. The external state of the external equipment includes a state of the external equipment observed from outside, a state of a surrounding environment where the external equipment is placed, and the like.

Providing state information to the interior of the vehicle includes displaying an image or text indicating the control state of the external equipment to the interior of the vehicle, displaying an image or text of a functional operation set in the external equipment to the interior of the vehicle, and the like. Also, providing the state information to the interior of the vehicle may include displaying an image or text of an operation interface within the vehicle with respect to a functional operation on the external equipment.

The output g171 reproduces a predetermined room environment by causing the state information to be displayed in the interior of the vehicle g100 on the basis of information for displaying the state information within the vehicle (hereinafter referred to as reproduction data). For example, the reproduction data is generated by the controller g172 on the basis of information received from the room facility g200 or the management server g300. Also, the reproduction data may be generated by the room facility g200 or the management server g300, or may be partially generated by the room facility g200 or the management server g300 and finally generated by the controller g172 on the basis of a part thereof.

For example, the output g171 causes a predetermined image to appear within the vehicle on the basis of the reproduction data. A means for causing the predetermined image to appear may be a method of projecting an image onto a wall within the vehicle using a projector, or a method of displaying an image on a display installed within the vehicle. Also, the predetermined image includes not only an image related to the external equipment but also various images for reproducing a specified space, and also includes an image related to a structure such as wallpaper or a floor of the specified space, an image related to a structure such as furniture or home appliances present in the specified space, and the like.

The output g171 includes, for example, one or more of a projector, a display, a speaker, and the like. The reproduction data differs according to the reproduction means in the vehicle g100. For example, data to be projected onto an interior surface of the vehicle 100 if the reproduction means in the vehicle g100 is a projector, data to be displayed on a display if the reproduction means in the vehicle g100 is a display, and the like are included. Also, the output g171 may reproduce the room environment using projection mapping technology.

Also, the output g171 notifies the interior of the vehicle of a situation of the external equipment present in the room facility g200. For example, an image according to a situation of the device present in the room facility is output, or words or illustrations indicating a situation of the equipment present in the room are output as an image or a sound, on the basis of information received from the room facility g200. Details will be described below.

The acquirer g173 includes, for example, an interface device that receives an operation of a user and outputs details of the received operation to the controller g172. The acquirer g173 includes, for example, a keyboard, a mouse, a touch panel, and the like. Also, the acquirer g173 includes a camera and a sensor, and the controller g172 may analyze characteristics of the user U and details of an operation of the user U on the basis of an image captured by the camera, a detection result of the sensor, and the like. For example, when the controller g172 has detected the movement of the user U who touches an operation button of the pseudo external equipment reproduced in the room environment within the vehicle, the controller g172 detects details of the operation on the external equipment. That is, the controller g172 and the acquirer g173 may function as operation interfaces that receive an instruction for remotely operating the external equipment reproduced within the vehicle as a pseudo image.

Also, the acquirer g173 acquires a traveling state of the vehicle g100. The traveling state of the vehicle g100 is indicated by, for example, an event executed by the automated driving controller g150, the speed of the host vehicle, the position of the vehicle g100 measured by the GNSS receiver g134, a shape of a road on which the vehicle g100 is traveling (a road over a mountain pass, a straight road, or the like), or the like. For example, the acquirer g173 acquires information indicating a type of event executed by the automated driving controller g150 using the communication device g120.

The storage g174 is implemented by a hard disk drive (HDD), a flash memory, a random access memory (RAM), a read only memory (ROM), or the like.

The controller g172, the identifier g175, and the authenticator g176 are implemented, for example, by a processor such as a CPU executing a program (software) stored in the storage g174. Also, some or all of these functional parts may be implemented, for example, by hardware such as large scale integration (LSI), an application specific integrated circuit (ASIC), or a field-programmable gate array (FPGA) or may be implemented by cooperation between software and hardware.

The controller g172 creates a room request on the basis of information input from the user U using the acquirer g173, an identification result of the identifier g175, an authentication result of the authenticator g176, and the like, and uses the created room request to the management server g300 using the communication device g120. For example, the controller g172 includes usage conditions such as a name and an attribute of the user and a type of room in the room request.

Also, the controller g172 generates reproduction data on the basis of information received from the room facility g200 or the management server g300. Also, the controller g172 may acquire the reproduction data from the room facility g200 or the management server g300. The controller g172 outputs the reproduction data to the output g171.

Also, the controller g172 provides an operation interface for receiving an operation on the external equipment within the vehicle. For example, the controller g172 generates information in which identification information for identifying each part included in the acquirer g173 (hereinafter referred to as an operation interface ID) is associated with identification information for identifying an operation on the external equipment (hereinafter referred to as an operation ID) and stores the generated information as a part of the interface information g174A in the storage g174. Also, the interface information g174A may include information for identifying a combination of the operation interface ID and the operation ID (hereinafter referred to as an interface ID). In the interface information g174A, for example, a button A displayed on the touch panel is registered as an operation interface for turning on a power supply of the television. This interface information g174A may be the same information as all or part of the interface information g322 to be described below.

Also, the controller g172 provides an operation interface for a functional operation that can be remotely operated from the interior of the vehicle among all functional operations provided in the external equipment within the vehicle. For example, the controller g172 determines operation details received by the operation interface in accordance with whether or not a remote operation from the vehicle is possible. When the functional operation that can be remotely operated from the vehicle among all the functional operations provided in the external equipment is limited, the controller g172 provides the operation interface of the functional operation that can be remotely operated from the vehicle within the vehicle. Specifically, the controller g172 registers the interface ID in the interface information g174A in association with the operation ID of the functional operation that can be remotely operated from the vehicle and does not register an operation ID of the functional operation that cannot be remotely operated from the vehicle in the interface information g174A. Also, the controller g172 may set a flag indicating that the operation ID of the functional operation that cannot be remotely operated from the vehicle is invalid.

Also, an example in which a remote operation from the vehicle is limited will be described. For example, although an operation of the television itself such as an operation of turning on the television can be remotely operated from the vehicle when the external equipment is a television, recording equipment connected to the television can be remotely operated from the vehicle. Also, an operation on the recording equipment is an operation of the recording equipment and an operation interface may be provided by the controller g172.

Also, the controller g172 may determine operation details to be received by the operation interface in accordance with, for example, whether or not the occupant is an individual authenticated by the authenticator g176. When a functional operation in which an operation of the occupant is permitted among all functional operations provided in the external equipment is limited, the controller g172 provides the operation interface of the functional operation in which the operation of the occupant is permitted within the vehicle. Specifically, the controller g172 registers the interface ID in the interface information g174A in association with an operation ID of a functional operation in which an operation of the occupant is permitted and does not register an operation ID of a functional operation in which an operation of the occupant is not permitted in the interface information g174A. Also, the controller g172 may set a flag indicating that the operation ID of the functional operation in which an operation of the occupant is not permitted is invalid.

Also, the controller g172 causes operation details received by the operation interface to be synchronized with a control state of the external equipment on the basis of information received from the room facility g200 or the management server g300 using the communication device g120. For example, the controller g172 determines operation details that are received by the operation interface on the basis of latest information received from the room facility g200 or the management server g300.

Also, the controller g172 may include a clock function part and cause synchronization with a clock time measured by the clock function part included in the external equipment to be achieved. For example, the start of rice cooking control of the rice cooker included in the external equipment is assumed to be set to 17:00 in advance. In this case, the controller g172 transmits a command for instructing the room facility g200 to start rice cooking control of the rice cooker using the communication device g120 when the clock time measured by its own clock function part has reached 17:00 and causes a state in which a cooking start button of the rice cooker included in the operation interface is turned on to be displayed.

Also, when the room facility g200 includes a plurality of pieces of external equipment having the same function, the controller g172 may cause an operation interface for receiving the same operation details with respect to the plurality of pieces of external equipment to be shared and reproduce the operation interface within the vehicle. Thereby, when the occupant has operated an operation interface for issuing an instruction for turning off a lighting device within the vehicle, a lighting device of a living room and a lighting device of a bedroom can be turned off simultaneously.

Also, the controller g172 may limit the occupant capable of operating the operation interface among all occupants by determining the occupant capable of operating the operation interface in accordance with situations of the occupants within the vehicle. The situations of the occupants within the vehicle include a distribution of occupant positions within the vehicle, directions of lines of sight of the occupants, and the like. For example, image data acquired by a camera or the like provided within the vehicle is analyzed and information indicating the situation of the occupant within the vehicle is acquired by the controller g172. For example, the controller g172 may acquire a distance between the operation interface and the occupant on the basis of the position of the occupant within the vehicle and determine an occupant having a distance from the operation interface which is less than or equal to a threshold value or an occupant having a shorter distance from the operation interface than another occupant as an occupant capable of operating the operation interface. Also, the controller g172 may determine whether or not a reproduced image of the external equipment capable of being operated using the operation interface is viewed on the basis of a direction of a line of sight of the occupant and determine an occupant determined to view the reproduced image of the external equipment as an occupant capable of operating the operation interface.

Also, the controller g172 may create a room request regardless of an operation of the user U and transmit the room request to the management server g300. For example, the controller g172 creates a room request for issuing an instruction for reproducing room environments of a plurality of rooms (for example, a living room, a bedroom, and a kitchen). Then, the controller g172 continuously reproduces the room environments of the plurality of rooms on the basis of the information received from the management server g300. For example, the controller g172 changes the room environment to be reproduced so that the room environment is automatically changed at regular time intervals and the changed room environment is viewed.

In this case, the controller g172 provides an operation interface, which corresponds to the external equipment included in the room reproduced within the vehicle, within the vehicle and does not provide an operation interface, which corresponds to the external equipment included in the room that is not reproduced within the vehicle, within the vehicle. Also, the controller g172 may transmit a command for controlling the external equipment included in the room reproduced within the vehicle to the room facility g200 using the communication device g120 on the basis of an operation instruction received from the occupant. In this case, the controller g172 does not transmit a command to the external equipment even when the operation instruction received from the passenger is applicable to the external equipment included in the room that is not reproduced within the vehicle. Also, the operation instruction from the occupant is not limited to the operation interface implemented by the HMI g132 or the operation interface displayed within the vehicle by the projector. For example, the controller g172 may acquire the operation instruction from the occupant by sound. For example, when the occupant has said "Raise the volume of the television a little more", the controller g172 may receive an operation instruction from the occupant on the basis of sound information acquired by the acquirer g173. That is, the controller g172 receives an operation on external equipment included in a room reproduced within the vehicle in preference to an operation on external equipment included in a room that is not reproduced within the vehicle. As described above, when a plurality of pieces of external equipment that can be operated are associated with one operation interface, the controller g172 may determine external equipment to be operated based on the operation interface on the basis of a predetermined priority order.

The identifier g175 identifies an individual in the interior of the vehicle g100 on the basis of information acquired by the acquirer g173. For example, the identifier g175 identifies an individual with reference to the storage g174. Information indicating the user's characteristics is registered in the storage g174 in advance. For example, information indicating characteristics of a face of the user, information indicating characteristics of voice of the user, information indicating characteristics of a fingerprint of the user, and the like are registered in the storage g174. The identifier g175 can identify an individual according to face authentication, voice authentication, fingerprint authentication, or the like with reference to the storage g174. Also, the identifier g175 may perform authentication through communication using a password input, QR code (registered trademark) authentication, or an IC card such as Felica, and may identify an individual on the basis of an authentication result.

The authenticator g176 determines whether or not the individual identified by the identifier g175 (or a vehicle equipped with the authenticator g176) has right to access the management server g300 with reference to information indicating a corresponding relationship with the management server g300 as will be described below. When the authenticator g176 determines that the individual has the right to access the management server g300, the controller g172 creates a room request.

The authenticator g176 determines whether or not the individual identified by the identifier g175 has the access right for controlling the external equipment with reference to information indicating a corresponding relationship with an external device to be described below and causes the controller g172 to generate a signal including the access right when the access right is present. That is, the authenticator g176 identifies external equipment capable of being used by the individual identified by the identifier g175 among pieces of external equipment registered in the "information indicating the corresponding relationship with the external device (to be described below)". For example, the "information indicating the corresponding relationship with the external device" is information for identifying each of spaces where the external equipment is present (for example, a room ID), information for identifying each of individuals, information for identifying each of pieces of external equipment present in a space indicated by the room ID (for example, an external equipment ID), and information associated with the presence/absence of right to access each piece of external equipment, and is stored, for example, in a storage device mounted in the vehicle g100.

Also, the authenticator g176 may identify remotely controllable external equipment among pieces of external equipment present in a specified space on the basis of information received from the external equipment via the management server g300 and determine whether or not an individual identified by the identifier g175 can use the identified external equipment.

Also, the authenticator g176 may identify external equipment capable of being used by the individual identified by the identifier g175 (hereinafter referred to as available equipment) or external equipment incapable of being used by the individual identified by the identifier g175 (hereinafter referred to as unavailable equipment) among a plurality of pieces of external equipment present in the space (room) identified by the occupant via the acquirer g173 with reference to the above-described information indicating the corresponding relationship with the external device.

Also, the "information indicating the corresponding relationship with the external device" may be stored in the storage of the management server g300 and a process of the authenticator g176 as described above may be executed by a component included in the management server g300.

Also, the controller g172 selectively transmits the operation information acquired via the operation interface (implemented by the acquirer g173) to the management server g300 using the communication device g120. For example, when operation details indicated by the acquired operation information are operation details for external equipment (available equipment) for which the authenticator g176 determines that there is access right, the controller g172 transmits the operation information to the management server g300. On the other hand, when the operation details indicated by the acquired operation information are operation details for external equipment (unavailable equipment) for which the authenticator g176 determines that there is no access right, the controller g172 does not transmit the operation information to the management server g300.

Also, the controller g172 determines an operation interface to be connected to the external equipment on the basis of at least one of a type of external equipment present in the specified space (first requirement), access right indicating whether or not the use of the external equipment is permitted (second requirement), and a state of the external equipment (third requirement). For example, information indicating the state of the external equipment is state information to be described below.

For example, the controller g172 may display operation buttons corresponding to all pieces of external equipment present in the specified space on the touch panel included in the acquirer g173 on the basis of the first requirement. Furthermore, in consideration of the second requirement, the controller g172 may invalidate the operation buttons of the external equipment for which there is no access right among the operation buttons displayed on the touch panel or may not display the operation buttons on the touch panel.

Also, when new external equipment has been added as the room facility g200 in consideration of the third requirement, the controller g172 adds the new external equipment to the external equipment of the room facility g200 by communicating with the newly added equipment and acquiring necessary information and adds an operation button corresponding to the newly added external equipment to the touch panel. Also, likewise, when the external equipment of the room facility g200 has been removed from a space thereof, the controller g172 may exclude the removed external equipment from the external equipment of the room facility g200 and remove an operation button corresponding to the removed external equipment from the touch panel. Also, the controller g172 may cause operation buttons according to the control situation of the external equipment to be displayed on the touch panel when the control state of the external equipment has been changed in consideration of the third element. For example, when the external equipment is a recording device and the control state is a state in which recording is in progress, the controller g172 indicates that recording is in progress, displays an operation button for invalidating a recording operation, prevents a recording instruction from being accepted even when the operation button is operated, and prevents the same program from being redundantly recorded.

Also, the controller g172 may change the operation details received by the operation interface on the basis of the traveling state of the vehicle g100. For example, the controller g172 limits or expands some of the operation details received by the operation interface in accordance with the traveling state of the vehicle g100. Specifically, some operation details are limited when the speed is greater than or equal to a certain level or the operation details are changed so that the size of characters and buttons become large to prevent the occupant from getting motion sickness due to a small operation interface at the time of a road over a mountain pass.

Also, when the external equipment g230 has been added to the specified space, the controller g172 adds an operation interface according to the function of the added external equipment g230. For example, when a vacuum cleaner has been added as the external equipment g230, the controller g172 adds an operation button for operating the vacuum cleaner to the touch panel included in the output g171.

[Room Facility]

FIG. 147 is a functional configuration diagram of the room facility g200. The room facility g200 includes, for example, a communication device g210, one or more detectors g220, one or more pieces of external equipment g230, and a gateway device g240.

For example, the communication device g210 is a communication interface for connecting to the network NW or directly communicating with the vehicle g100. For example, the communication device g210 may include a network interface card (NIC), or may perform wireless communication on the basis of Wi-Fi, dedicated short range communications (DSRC), Bluetooth (registered trademark), or other communication standards. A plurality of communication devices 210 may be prepared according to a purpose.

The detector g220 is provided at a position where a room capable of being used by the user U, for example, a living room, a kitchen, and a child's room in a home of the user U, the interior of a workplace of the user U, or the like, is imaged. As the detector g220, for example, a 360° camera can be used. The detector g220 outputs captured image data (hereinafter referred to as image data) to the gateway device g240.

The external equipment g230 is external equipment installed in a room that can be used by the user U, and includes, for example, a television, a recording device, a refrigerator, a rice cooker, a microwave oven, an air conditioning device, a personal computer, a printer, a game machine, a treadmill, an electric sauna, and the like. Hereinafter, the external equipment g230 includes not only electrical equipment but also electronic equipment. The external equipment g230 may be connected to the gateway device g240 and controlled by the gateway device g240. Also, the external equipment g230 may generate state information indicating an operation state, a control state, and the like and output the state information to the gateway device g240. The state information may further include information indicating a model number, a color, a shape, and the like of the external equipment g230.

The gateway device g240 is connected to the communication device g210, the detector g220, and the external equipment g230 within the room and can cause the communication device g210, the detector g220, and the external equipment g230 to be operated as Internet of things (IoT) equipment. The gateway device g240 includes, for example, a processor such as a CPU, a control signal generator g240A (whose details will be described below), and an authenticator g240B.

The gateway device g240 controls the detector g220 and the external equipment g230 on the basis of the information received from the management server g300. For example, when information of an instruction for transmitting video data of the living room has been received, the gateway device g240 controls the detector g220 installed in the living room to acquire the video data and transmits the acquired video data to the management server g300 using the communication device g210. Also, when information of an instruction for recording of the television has been received, the gateway device g240 controls the external equipment g230 that is a recording device connected to the television to make a recording reservation for a specified program. Also, when a part of the state information has been input from the external equipment g230, the gateway device g240 may transmit the input information to the vehicle g100 using the communication device g210 or may transmit the input information to the vehicle g100 via the management server g300.

The authenticator g240B performs a process similar to that of the above-described authenticator g176. For example, it is determined whether or not there is access right for reproducing the room specified by an occupant (for example, an individual specified in the vehicle g100) with reference to the information indicating the corresponding relationship with the external equipment on the basis of information received from the management server g300 or the vehicle g100 using the communication device g210. When the access right is present, the authenticator g240B instructs the state information acquirer g240C to acquire the state information of the external equipment present in the specified room.

The authenticator g240B determines whether or not there is access right for each piece of external equipment present in the room specified by the occupant with reference to the information indicating the corresponding relationship with the external equipment on the basis of the received information. When the information received from the management server g300 or the vehicle g100 using the communication device g210 includes an operation instruction for external equipment for which there is access right, the authenticator g240B outputs information indicating that the authentication has succeeded to the control signal generator g240A. The control signal generator g240A generates a control signal according to the operation instruction included in the received information with respect to the external equipment successfully authenticated by the authenticator g240B and transmits the generated control signal to the management server g300 or the vehicle g100 using the communication device g210.

The state information acquirer g240C acquires information indicating the detection result detected by the detector g220 and operation details set in the external equipment g230 from the detector g220 or the external equipment g230.

The state information acquirer g240C acquires state information of the external equipment on the basis of information input from the detector g220 or the external equipment g230 and transmits the state information to the management server g300 or the vehicle g100 using the communication device g210. The state information acquirer g240C may generate reproduction data on the basis of the acquired state information of the external equipment and may transmit the reproduction data to the management server g300 or the vehicle g100 using the communication device g210.

[Management Server]

FIG. 148 is a functional configuration diagram of the management server g300. For example, the management server g300 manages communication between the vehicle g100 and the room facility g200. Also, some of the functions of the management server g300 to be described below may be implemented by the vehicle g100. The management server g300 includes, for example, a communication device g310, a storage g320, and a server controller g330. The communication device g310 is, for example, a NIC for connecting to the network NW. The communication device g310 communicates with the vehicle g100 or the room facility g200 via the network NW. The storage g320 is implemented by an HDD, a flash memory, a RAM, a ROM, or the like.

The server controller g330 includes, for example, a reproduction data acquirer g330A, an I/F manager g330B, and an authenticator g330C. These functional parts are implemented, for example, by a processor such as a CPU executing a program (software) stored in the storage g320. Some or all of these functional parts may be implemented by hardware such as LSI, an ASIC, or an FPGA or may be implemented by cooperation between software and hardware.

The reproduction data acquirer g330A receives the room request transmitted from the vehicle g100 via the communication device g310 and the network NW, acquires the reproduction data according to the usage conditions included in the room request, and transmits the acquired reproduction data to the vehicle g100. The reproduction data acquirer g330A may acquire reproduction data from a reproduction data DB g321 saved in the storage g320 or may acquire reproduction data based on a captured video acquired in real time from the room facility g200.

The reproduction data DB g321 includes various reproduction data for reproducing the room. For example, an image obtained by processing an illustration image or a photograph for reproducing a room or the like is included. Also, the reproduction data is information for outputting a predetermined image to the interior of the vehicle using the output g171 such as a projector or a display as described above. The predetermined image may be an image projected into the vehicle or an image displayed on a display installed within the vehicle. That is, the reproduction data is information for outputting images of various items according to the room environment to the interior of the vehicle using the output g171, and includes information for outputting the image of the external equipment g230 to the interior of the vehicle using the output g171. The reproduction data DB 321 is, for example, a database that saves reproduction data prepared in advance in association with information indicating the type of room.

Also, the reproduction data acquirer g330A may generate reproduction data by compositing a part of the reproduction data DB g321 saved in the storage g320 with a captured video acquired in real time from the room facility g200. For example, the reproduction data acquirer g330A reads information for outputting an image of the external equipment from the reproduction data DB g321 and composites the read information with the captured video.

Also, the reproduction data DB g321 may include information for outputting an image according to the state of the external equipment. For example, when the state information has been received from the external equipment g230, the reproduction data acquirer g330A may read information indicating the state of the external equipment g230 from the reproduction data DB g321 and composite the read information with the captured video. The information representing the state of the external equipment g230 includes, for example, an image representing the state of the external equipment g230 by text, an image representing an image of the external equipment g230 operating in that state, and the like. The reproduction data acquirer g330A generates reproduction data that is displayed by superimposing a part or all of the information representing the state of the external equipment g230 on the image of the external equipment g230.

Also, the present invention is not limited to the above. The reproduction data acquirer g330A may generate reproduction data for causing information indicating the state of the external equipment g230 to be displayed in the vicinity of the image of the external equipment g230 after a remote operation from the vehicle g100 side is performed on the basis of operation information, on the basis of information indicating the state of the external equipment g230. The reproduction data is transmitted to the vehicle g100, so that the output g171 can output information indicating the state of the external equipment g230 after a remote operation is performed on the basis of the operation information to the interior of the vehicle.

In this manner, an image based on the "reproduction data generated on the basis of the state information of the external equipment g230" is output to the interior of the vehicle, so that the environment provider g140 causes a situation of the image of the external equipment g230 output to the interior of the vehicle g100 to be synchronized with a situation of the external equipment g230 in a specified space.

Also, the reproduction data acquirer g330A may generate information for causing information indicating a function or a state of the external equipment g230 to be displayed on a part of the operation interface (such as a touch panel) and transmit information assigned to the reproduction data (or only information) or the like to the vehicle g100. For example, the controller g172 causes the touch panel to display an operation button according to a function or a control state of the external equipment g230 on the basis of the received information. Specifically, when the external equipment g230 is a recording device, the controller g172 causes the touch panel to display operation buttons corresponding to operation details that can be received by the recording device. Also, when the control state of the recording device is a state in which recording is in progress, the controller g172 indicates that recording is in progress, displays an operation button for invalidating a recording operation, prevents a recording instruction from being accepted even when the operation button is operated, and prevents the same program from being redundantly recorded. In this manner, by outputting an image based on the information received from the reproduction data acquirer g330A to the interior of the vehicle, the environment provider g140 can cause operation details received by the operation interface in the interior of the vehicle g100 to be synchronized with at least one of the function and the situation of the electronic equipment g230.

Also, the reproduction data acquirer g330A may generate information for outputting information indicating the function or the state of the external equipment g230 to the interior of the vehicle by sound and transmit the information to the vehicle g100.

Also, when new external equipment has been added to a space reproduced within the vehicle, the reproduction data acquirer g330A may read information corresponding to the added external equipment from the reproduction data DB g321 and composite the read information with the captured video.

Also, the reproduction data acquirer g330A may receive an authentication result of the authenticator g176 from the vehicle g100 (or acquire an authentication result of the authenticator g330C) and generate reproduction data according to the authentication result. For example, when information indicating external equipment capable of being used by an individual specified by the identifier g175 (hereinafter referred to as available equipment) or information indicating external equipment incapable of being used by an individual specified by the identifier g175 (hereinafter referred to as unavailable equipment) has been received from the vehicle g100, the reproduction data acquirer g330A generates reproduction data for causing the available equipment to appear and causing the unavailable equipment not to appear. For example, the reproduction data acquirer g330A may composite the reproduction data corresponding to the available equipment with the captured video and may composite a predetermined image for an unavailable state with the captured video at a position corresponding to the unavailable equipment. The image for the unavailable state includes, for example, an image filled with one color, an image in which text indicating the unavailable state is displayed, and the like. Also, a process of compositing the image for the unavailable state is not limited to the above, and, for example, a process of mosaicking a part corresponding to the unavailable equipment in the captured video or the like is included.

Also, a part or all of the reproduction data acquirer g330A described above may be implemented by the environment provider g170.

The I/F manager g330B establishes communication between the vehicle g100 and the external equipment g230 via the communication device g310 and the network NW. For example, the server controller g330 transmits operation information received from the vehicle g100 to the external equipment g230. Also, the server controller g330 transmits the state information received from the external equipment g230 to the vehicle g100.

Also, the I/F manager g330B generates interface information g322 and stores the generated interface information g322 in the storage g320. FIG. 149 is a diagram showing an example of details of the interface information g322. As shown in FIG. 149, the interface information g322 is a table in which an interface ID, an operation interface ID, a type, an external equipment ID, and an external equipment interface ID are associated. The type is information indicating a type of operation interface. The external equipment ID is identification information for identifying external equipment. The external equipment interface ID is identification information for identifying an operation interface included in the external equipment. Also, the "example" shown in FIG. 149 is a specific example of the functional operation of the external equipment. The I/F manager g330B generates the interface information g322 on the basis of various types of information related to an operation interface prepared in advance. Various types of information about the operation interface prepared in advance include, for example, information indicating operation details that can be received by the operation interface indicated by the operation interface ID, information indicating operation details that can be received by the operation interface indicated by the external equipment interface ID, and the like.

As shown in FIG. 149, for example, an operation interface of the vehicle g100 side is associated with each of different operation interfaces included in the same external equipment g230. In this manner, a communication path between the operation interface of the vehicle g100 side and the operation interface of the external equipment g230 side can be established. Consequently, a pseudo room environment can be reproduced within the vehicle.

Also, the I/F manager g330B may manage communication with an external server (for example, the third party). For example, the I/F manager g330B determines whether or not communication with the external server is necessary on the basis of information received from the vehicle g100 (including a room request, an operation instruction for the external equipment g230, or the like). When communication with an external server is necessary, the I/F manager g330B may communicate with the external server and store interface information on the basis of acquired information after acquiring necessary information from the external server.

The authenticator g330C executes a process similar to that of the authenticator g176 described above. For example, it is determined whether or not the individual identified in the vehicle g100 has access right for controlling the external equipment g230 with reference to the information indicating the corresponding relationship with the external equipment on the basis of information received from the vehicle g100 using the communication device g210. When the access right is present, information indicating that the authentication has succeeded is output to the reproduction data acquirer g330A or the I/F manager g330B. The reproduction data acquirer g330 acquires reproduction data when the authentication of the authenticator g330C has succeeded. When the authentication of the authenticator g330C has succeeded, the I/F manager g330B transmits information of the vehicle g100 and the external equipment g230.

FIG. 150 is a diagram showing an example of the room information g322. The room information g143 is information about a room for which use permission is required and is information in which a type of room, usability information, and the like are associated with the room ID. For example, the room information g322 is stored in a table prepared for each house. The room ID is unique information for identifying each room among all available rooms. The usability information is information indicating the user U permitted to use each room, and includes, for example, a user ID. The user ID is unique information for identifying each user U.

The room selector g330D determines whether or not the room ID of the room specified by the user has been registered in room information g322 on the basis of the room request received from the vehicle g100. When the room ID has not been registered in the room information g322, the room selector g330D acquires reproduction data according to the room request from the reproduction data DB g321 and transmits the acquired reproduction data to the vehicle g100 transmitting the room request. On the other hand, when the room ID has been registered in the room information g322, the room selector g330D determines whether or not the user has been registered as a user whose use has been permitted. When the user has been registered as a user whose use has been permitted, the room selector g330D requests the room facility g200 in the specified room to transmit video data of the specified room.

Next, an example of a process of the vehicle system g1 will be described with reference to FIG. 151. FIG. 151 is a sequence diagram showing an example of the process of the vehicle system g1. Here, an example in which reproduction of a room for which reproduction data is prepared in advance is requested from a user U1 will be described.

In the vehicle g100, for example, the controller g172 acquires information about the user with respect to the user U1 on the basis of information input from the acquirer g173 (step S101g). The information about the user includes a name and an attribute of the user in the interior of the vehicle g100 (a family relationship, an official position, or the like). Also, when the individual of the user U1 has been specified by the identifier g175, the controller g172 may acquire information about the user from the identification result of the identifier g175.

Next, the controller g172 receives the type of room to be reproduced from the user U1 using the acquirer g173 (step S102g). For example, the controller g172 receives one of rooms for which reproduction data is prepared as the type of room. Then, the controller g172 creates a room request including the acquired information about the user U1, the type of room, and the like and transmits the room request to the management server g300 using the communication device g120 (step S103g).

In the management server g300, the room selector g330D determines whether or not the room ID of the specified room has been registered in the room information g322 with reference to the room information g322 of the storage g320 on the basis of the room request received from the vehicle g100 (step S104g). In the present example, the room ID is not registered in the room information g322 because the specified room is one of the rooms for which reproduction data is prepared. Consequently, the reproduction data acquirer g330A reads the reproduction data of the specified room from the reproduction data DB g321 of the storage g320 on the basis of the room request received from the vehicle g100 (step S105g) and transmits the read reproduction data to the vehicle g100 using the communication device g310 (step S10g6). In vehicle g100, the controller g172 outputs the reproduction data received from management server g300 to the output g171 using the communication device g120. The output g171 reproduces the room environment of the specified room in the interior of the vehicle g100 on the basis of the input reproduction data (step S107g).

Next, another process example will be described with reference to FIG. 152. FIG. 152 is a sequence diagram showing an example of a process of the vehicle system g1. Here, an example in which reproduction of a current state of the specified room is requested from a user U2 will be described.

In vehicle g100, the controller g172 acquires information about a user with respect to the user U2 (step S201g). For example, the controller g172 acquires information about the user from an identification result of the identifier g175.

Next, the controller g172 receives the type of room to be reproduced from the user U2 using the acquirer g173 (step S202g). For example, the controller g172 receives one of the rooms for which a real-time video is reproduced as the type of room. The authenticator g176 determines whether or not there is access right for the management server g300 on the basis of the information about the user acquired in step S201g or the like (step S203g). When there is access right for the management server g300, the controller g172 creates a room request including the information about the user acquired in step S201g, the type of room received in step S202g, and the like and transmits the room request to the management server g300 using the communication device g120 (step S204g).

In the management server g300, the room selector g330D determines whether or not the room ID of the specified room has been registered in the room information g322 with reference to the room information g322 of the storage g320 on the basis of the room request received from the vehicle g100 (step S205g). In the present example, because the specified room is a room where the room facility g200 is installed, the room ID is registered in the room information g322. Consequently, the room selector g330D determines whether or not the user ID included in the room request is included in the usability information corresponding to the room ID of the specified room in the room information g322 (step S206g). When the user ID included in the room request is included in the usability information corresponding to the room ID of the specified room, the reproduction data acquirer g330A requests the room facility g200 installed in the specified room to transmit the video data of the specified room (step S207g).

In the room facility g200, the authenticator g240B determines whether or not there is access right for reproducing the room specified by the occupant (for example, an individual identified in the vehicle g100) (step S208g). When there is access right, the state information acquirer g240C acquires video data from the detector g220 installed in the specified room on the basis of the request received from the management server g300 and acquires information indicating set operation details from the external equipment g230 (step S209g) and is transmitted to the management server g300 using the communication device g210 (step S210g). In the management server g300, the I/F manager g330B generates interface information g322 on the basis of the information indicating the received control state, and stores the generated interface information g322 in the storage g320 (step S211g). The server controller g330 transmits information indicating the received video data or control state, the generated interface information, and the like to the vehicle g100 using the communication device g310 (step S212g). Here, the server controller g330 may transmit information obtained by compositing the illustration image or the like of the external equipment g230 with the video data as described above to the vehicle g100 or transmit the video data in which the external equipment g230 is shown to the vehicle g100.

In the vehicle g100, the environment provider g170 reproduces the room environment of the specified room within the vehicle g100 on the basis of the received video data and the like (step S213g). That is, the environment provider g170 causes an image of the external equipment g230 and an image of a space where the external equipment g230 is present to be output to the interior of the vehicle using the output g171 on the basis of the received video data and the like. Also, the environment provider g170 causes the HMI g132 to display a predetermined operation interface, or causes the predetermined operation interface to be displayed within the vehicle using the output g171, on the basis of the received information indicating the control state and interface information.

Next, when the environment provider g170 has received an operation on a reproduction image or the like of the external equipment displayed within the vehicle from the user U2 (step S214g), the environment provider g170 transmits operation information indicating details of the received operation to the management server g300 using the communication device g120 (step S215g). Here, the environment provider g170 may be configured to determine whether or not the details of the received operation are details of an operation on the external equipment (the available equipment) for which the authenticator g176 determines that there is access right and to transmit operation information to the management server g300 only when it is determined that the details of the operation are details on the operation on the available equipment. When an image of external equipment (unavailable equipment) for which the authenticator g176 determines that there is no access right has not been output to the interior of the vehicle, the acquirer g173 which is an operation interface cannot receive details of an operation on the unavailable equipment. Thus, the environment provider g170 does not transmit operation information about the unavailable equipment to the management server g300.

The operation information indicating the operation details includes the room ID of the specified room, information indicating the external equipment, the operation details, and the like. The management server g300 transmits the received information indicating the operation details to the room facility g200 associated with the room ID included in the received information in the room information g322 (step S216g). In the room facility g200, the authenticator g240B determines whether or not there is access right for each piece of external equipment present in the room specified by the occupant with reference to information indicating the corresponding relationship with the external equipment on the basis of the received information (step S217g). When the received information includes an operation instruction for external equipment for which there is access right, the authenticator g240B outputs information indicating that the authentication has succeeded to the control signal generator g240A. The control signal generator g240A generates a control signal according to the operation instruction included in the received information for the external equipment successfully authenticated by the authenticator g240B and outputs the control signal to the corresponding external equipment g230 (step S218g). In this manner, in the room facility g200, the gateway device g240 can control the external equipment g230 on the basis of the received information indicating the operation details. As described above, the environment provider g170 can remotely operate the external equipment g230 by selectively connecting the operation interface to the external equipment g230.

Next, the control signal generator g240A determines whether or not parallel processing of an associated device is necessary on the basis of the control signal generated in step S218g. The parallel processing of the associated device includes a process in the associated device necessary for controlling the external equipment g230, a process in the associated device operating in cooperation with the control of the external equipment g230, and a process in a higher-order (master) associated device that controls the external equipment g230, and the like. For example, when the associated device of a certain room depends on external equipment g230 of another room, the control signal generator g240A also controls the associated device of the master side in parallel when the external equipment g230 is controlled. When the parallel processing of the associated device is necessary, the control signal generator g240A generates a control signal for the associated device and controls the associated device (step S219g).

Also, when the associated device is not included in the room facility g200, the gateway device g240 transmits a control signal for the associated device to the management server g300 using the communication device g210 (step S220g). The management server g300 transmits the control signal for the associated device to the associated device using the communication device g310 (step S221g). When it is possible to control the associated device, the management server g300 may transmit the fact that it is possible to control the associated device to the room facility g200 (step S222g). In the room facility g200, the control signal generator g240A may further control the external equipment g230 on the basis of information received from the management server g300.

The server controller g330 of the management server g300 may receive state information indicating the state of the external equipment g230 from the room facility g200. In this case, the server controller g330 transmits the received state information to the corresponding vehicle g100. Also, as described above, the server controller g330 may generate reproduction data on the basis of the received state information and transmit the reproduction data to the corresponding vehicle g100.

When the interface information g322 has been generated in step S211g, the management server g300 establishes communication between the external equipment g230 and the environment provider g170 with which operation interfaces are mutually associated in the interface information g322. When the communication between the external equipment g230 and the environment provider g170 is established, the state of the external equipment reproduced within the vehicle g100 is synchronized with the state of the external equipment g230 in the specified room. For example, the communication is established, so that the management server g300 can continuously transmit the video data received from the room facility g200 to the vehicle g100 side. Thereby, the situation of the specified room is reproduced within the vehicle with a time difference substantially in real time.

Next, an example of a room implemented by the vehicle system g1 will be described with reference to FIGS. 153 to 156. FIGS. 153 to 156 are diagrams showing parts of the interior of the vehicle g100. FIGS. 153 to 156 show states of the vehicle g100 viewed from the front or the rear using a perspective method. Inside the vehicle g100, a floor surface g501, a ceiling g502, and a side surface g503 are included. Illustrations of tables and chairs capable of being installed within the vehicle g100 are omitted.

FIG. 153 is a diagram showing an example of a child's room reproduced within the vehicle g100. As shown in FIG. 153, when occupants include the child, the environment provider g170 transmits a room request for the child's room to the management server g300 using the communication device g120 and receives reproduction data of the child's room from the management server g300. The environment provider g170 reproduces images of a character g511 and an item g512 with which the child is happy on at least some of the floor surface g501, the ceiling g502, and the side surface g503 of the vehicle g100 on the basis of the received reproduction data. Thereby, the user can enjoy the time within the vehicle. Also, the atmosphere and items of the room environment may be changed in accordance with a sex, an age, preference, and the like of the child which gets into the vehicle. Also, the environment provider g170 moves or stores the seats of the vehicle g100 to secure a space for the child to play and colors and displays a seat surface (skin) or a surface of the interior of the vehicle on the basis of color information included in the reproduction data so that the atmosphere of the child's room is produced.

FIG. 154 is a diagram showing an example of a cafe-like room reproduced within the vehicle g100. When occupants include a user who returns home from work, the environment provider g170 transmits a room request for requesting the cafe-like room as shown in FIG. 147 to the management server g300 using the communication device g120 and receives the reproduction data of the cafe-like room from the management server g300. The environment provider g170 reproduces images of a cafe-like interior design g521, an interior facility g522, and the like on at least some of the floor surface g501, the ceiling g502, and the side surface g503 of the vehicle g100 on the basis of the received reproduction data. The cafe-like interior design g521 includes, for example, illustrations, photos, and the like of a frame with a nice photo, a blackboard on which a menu is written, and a coffee cup. The cafe-like interior facility g522 includes stylish lighting, an espresso machine, and the like. Thus, the user can enjoy the tea time as if he/she were in a cafe using the movement time to a destination. Also, the environment provider g170 may change the atmosphere and items of the room environment in accordance with a drink, a time period, a season, and the like. Also, the environment provider g170 moves or stores the seats of the vehicle g100 to secure a space or arrange each seat at a position according to the received reproduction data and reproduces the seat and the atmosphere of the cafe by coloring and displaying a seat surface (skin) or a surface of the interior of the vehicle on the basis of color information included in the reproduction data.

FIG. 155 is a diagram showing an example of a work room reproduced within the vehicle g100. As shown in FIG. 155, when occupants include a user who goes to work, the environment provider g170 transmits a room request for requesting a work room to the management server g300 using the communication device g120 and receives reproduction data of the work room from the management server g300. The environment provider g170 reproduces an image of an interior design like equipment installed in an office or an office on at least some of the floor surface g501, the ceiling g502, and the side surface g503 of the vehicle g100 on the basis of the received reproduction data. Examples of the equipment installed in the office include a printer g531, a personal computer screen g532, a keyboard g533, a telephone g534, a whiteboard g535, and the like. These are examples of the external equipment. The interior design like the office can be selected by the user from a plurality of settings according to a type of job and a simple design may be reproduced for desk work, various photos may be displayed in slides so that creative ideas are imagined, or news, received mail details, and the like may be displayed in slides. Thereby, the user can start a part of work while switching a mood to a work mode using the travel time until a destination is reached. Also, the environment provider g170 may display an enlarged view of a touched target when the user touches a photograph, news, email details, or the like reproduced within the vehicle g100 or may transmit information related to a terminal device possessed by the user.

Also, in FIGS. 153 to 155, the environment provider g170 moves or stores the seats of the vehicle g100 to secure the space or arrange each seat at a position according to the received reproduction data and colors and displays a seat surface (skin) or a surface of the interior of the vehicle on the basis of color information included in the reproduction data. For example, in the example of FIG. 155, the seat of the vehicle g100 is moved or stored, or a shape is deformed to reproduce an office chair, and a seat surface (skin) or a surface of the interior of the vehicle is colored and displayed on the basis of color information included in reproduction data for reproducing an office so that the atmosphere of the office is reproduced. By performing such control, facilities provided in the vehicle g100 can be utilized effectively. Also, for example, the occupant can feel a room desired to be reproduced by absorbing a difference between details or a shape of the room to be reproduced and details or a shape of the interior of the vehicle according to the above-described control.

In addition, the environment provider g170 reproduces a living room, a child's room, a wooden room, a bedroom, and the like and therefore the user can enjoy the travel time with a relaxed feeling. Also, the environment provider g170 reproduces a room environment similar to that at home or in a workplace and therefore the user is likely to feel more relaxed.

FIG. 156 is a diagram showing an example of a living room of a user's home reproduced within the vehicle g100. As shown in FIG. 156, the environment provider g170 transmits a room request for requesting the living room of the user's home to the management server g300 using the communication device g120. The management server g300 acquires video data of the living room from the room facility g200 of the specified user and transmits the acquired video data to the environment provider g170. On the basis of the received video data, the environment provider g170 reproduces images of external equipment such as a television g541, a recording device g542, an air conditioner g543, a rice cooker g544, a microwave oven g545, and a security device g546 at the user's home on a side surface g503 of the vehicle g100. The recording device g542 includes images of a recording button g542a and a selection button g542b. The rice cooker g544 includes an image of an operation panel g544a including a start button, operation buttons, and the like. The security device g546 includes an image of the operation panel g546a. When it is detected that the reproduced operation buttons or the like of the external equipment have been operated, the environment provider g170 transmits information indicating the detected operation details to the management server g300 using the communication device g120. The management server g300 transfers the received information to the specified room facility g200. The external equipment g230 of the specified room facility g200 operates on the basis of the information transmitted from the management server g300.

The details will be specifically described below. The management server g300 identifies a control target (goods in the user's home or the like) on the basis of information indicating the operation details received from the environment provider g170 and authentication information of the authenticator g176 and transmits a signal generated by combining a control signal for the control target with the authentication information to the room facility g200. When the authenticator g240B of the gateway device g240 of the room facility g200 checks access right for the external equipment g230 of the control target on the basis of a signal received from the management server g300 and controls the above-described external equipment g230 when it is determined that there is access right. For example, the authenticator g240B determines whether or not there is access right for controlling the above-described external equipment g230 on the basis of authentication information included in the received signal. When the authenticator g240B determines that there is access right for controlling the external equipment g230, the control signal generator g240A converts the received signal into a signal for controlling the external equipment g230, and transmits the converted signal to the external equipment g230 to be controlled. Then, the external equipment g230 is controlled.

Thereby, the user can operate the recording device in the living room at home while moving on the vehicle g100 by operating the recording button g542a. Also, the user can turn on a power supply of the rice cooker at home one hour before going home by operating the operation panel g544a and turn on a power supply of a home security device left behind when he/she was at home by operating the operation panel g546a.

Then, the gateway device g240 transmits state information input from the external equipment g230 to the vehicle g100 via the communication device g210. For example, it is assumed that the vehicle g100 has received state information indicating that the recording device is performing recording. In this case, the environment provider g170 of the vehicle g100 causes an image (including text, an illustration, and the like) indicating that recording is in progress to be superimposed and displayed on the image of the recording device output to the interior of the vehicle g100.

Also, the recording button g542a, the selection button g542b, the operation panel g544a, and the operation panel g546a may be implemented by a terminal device g547 installed within the vehicle g100. For example, the terminal device g547 causes a button corresponding to an operation button or the like of equipment reproduced within the vehicle g100 to be displayed on the basis of the information received from the environment provider g170 and transmits the received operation details to the environment provider g170. Thereby, it is only necessary for the user only to operate the terminal device g547 at hand and the operability is improved.

Also, the vehicle g100 may be used as a part of an actual room like an actual room of a home or the like. FIG. 157 is a view of a state in which a combination room region g700 appears as a result of combining the vehicle g100 and a room g600 viewed from above. FIG. 158 is a view of a state in which the vehicle g100 and the room g600 are separated viewed from above.

In the room g600, for example, a shutter device g601, a bed g602, a refrigerator g603, a bathroom g604, and the like are installed. The shutter device 601 is one of pieces of external equipment g230 installed in the room g600. The vehicle g100 includes, for example, a back door g181 and a sofa g182, a table g183, a television g184 and the like are included therein. On the upper surface of the table g183, a touch panel of the acquirer g173 may be mounted or a personal computer, a tablet terminal, or the like that communicates with the acquirer g173 may be mounted.

In the vehicle g100, when the approach to the room g600 where position information is registered in advance is detected on the basis of a position of its own device measured by the GNSS receiver g134, the environment provider g170 transmits a signal for an instruction for opening the shutter device g601 (hereinafter referred to as a shutter open signal) to the room facility g200 using the communication device g120. The gateway device g240 transmits a control signal to the shutter device g601 and opens the shutter. When the shutter has been completely opened, the gateway device g240 transmits information indicating that the shutter has been opened to the vehicle 100 using the communication device g210. When the vehicle g100 has received information indicating that the shutter has been opened, the automated driving controller g150 causes the vehicle g100 to be moved to a predetermined parking position and causes the vehicle to be stopped. When the vehicle g100 has been parked at a predetermined parking position, a combination room region g700 including the vehicle g100 and the room g600 appears as shown in FIG. 157. Thereby, the user can also use the vehicle g100 as a part of the room g600. Also, when the user goes out on the vehicle g100, the user can move in a state in which a part of the combination room region g700 is transferred.

Also, the present invention is not limited thereto and the shutter opening signal may be transmitted to the shutter device g601 by the user operating the acquirer g173 serving as a remote controller or a touch panel.

Also, the environment provider g170 may cause settings in the room g600 to be reflected within the vehicle g100 and the gateway device g240 may cause settings in the vehicle g100 to be reflected in the room g600. For example, the environment provider g170 may set the same details as settings of a temperature, an operation mode, and the like of the air conditioning device installed in the room g600 in the air conditioning device of the vehicle g100, output a program or video content that is being reproduced by a television installed in the room g600 from the output g171 of the vehicle g100, or output music content that is being reproduced by audio equipment installed in the room g600 from the output g171. Also, in contrast, the gateway device g240 may control the air conditioning device, the television, the audio equipment, or the like on the basis of an air conditioning temperature set in the vehicle g100, video content or the music content that is being reproduced, and the like. Thereby, a seamless environment can be provided in the combination room region g700.

Also, the environment provider g170 may also control an air conditioning facility installed in the room a600 from the time which is a predetermined period of time earlier than a scheduled time when the vehicle g100 arrives at the room g600 so that the set temperature of the room g600 is the same as the temperature within the vehicle g100 when the vehicle g100 has arrived at the room g600. Also, the environment provider g170 may cause content to be reproduced in the vehicle g100 to be synchronized with content to be reproduced in the room g600 so that video content and music content are continuous in the combination room region g700.

According to the above-described embodiment, the automated driving controller g150 configured to execute the automated driving of the vehicle g100 and the environment provider g170 configured to provide a pseudo room environment when the vehicle g100 is traveling or stopped in in the interior of the vehicle g100 are provided, so that it is possible to provide a room environment according to the user's needs.

Also, because the user can remotely control the external equipment g230 installed in an available room while getting into the vehicle g100 and the user can do what to do at home or in a workplace while getting into the vehicle g100, time can be utilized effectively.

For example, the environment provider g170 may adjust a position of an image projected by the projector and a position of an image displayed on the display in accordance with movement of the user or vibrations of the vehicle g100.

For example, the environment provider g170 includes a sensor configured to detect vibrations of the vehicle g100 and acquires information indicating a direction and a magnitude of vibrations of the vehicle g100 (hereinafter referred to as vibration information) on the basis of a detection result of the sensor. The environment provider g170 may adjust a position of an image projected by the projector or a position of an image displayed on the display on the basis of the acquired vibration information. For example, the environment provider g170 may cause the position of the image of the reproduction data to be moved by the magnitude of the vibrations of the vehicle g100 in a direction opposite to a vibration direction of the vehicle g100. Thereby, in the reproduced image, it is possible to cancel the vibrations of the vehicle and contribute to prevention of car sickness.

Also, the environment provider g170 may detect the movement of the user on the basis of the detection result from the camera or the sensor provided in the acquirer g173. When the number of times that an operation of erroneously pressing an operation button of external equipment reproduced within the vehicle g100 is detected is greater than or equal to a threshold value, the environment provider g170 may reproduce the operation button of the external equipment at a position obtained by subtracting an amount of vibration on the basis of the vibration information and the user's movement. Thereby, the operation button can be displayed in a place where the user erroneously presses the operation button.

Also, the environment provider g170 may adjust the position of the image as described above with respect to a part that is reproduced within the vehicle g100. For example, the environment provider g170 may detect the user's field of view using line-of-sight recognition technology on the basis of detection results from the camera and the sensor provided in the acquirer g173 and may perform the above-described image position adjustment with respect to the display within a fixed range including surroundings around the detected field of view. Also, the environment provider g170 may perform the above-described image position adjustment in the video of the external equipment g230 reproduced in the vehicle g100.

Also, the pseudo room environment to be reproduced is not limited to the interior of an actual room. For example, the pseudo room environment may be a room environment where the outdoor scenery of a sea or a mountain spreading out before the user's eyes is expressed on the wall, a room environment where world views of stories such as comics or novels are expressed in a room design or a room interior, or the like. Also, the pseudo room environment to be reproduced may include humans and animals such as children and pets in a living room at home, and a cram school teacher in a cram school classroom.

Also, the environment provider g170 may cause a change in a part of the specified actual room to be reflected within the vehicle g100 and the gateway device g240 may cause a change in the room reproduced within the vehicle g100 to be reflected in the specified actual room. For example, when a whiteboard placed in an actual room is also reproduced within the vehicle g100, information written on the whiteboard in the actual room is read by an electronic method and displayed on the whiteboard of the vehicle g100. In contrast, the information written on the whiteboard of the vehicle g100 may be read by the electronic method and displayed on the whiteboard in the actual room. Also, the environment provider g170 may mirror and display images displayed on the displays of both pieces of external equipment g230 in videos of the external equipment g230 installed in the actual room and the external equipment g230 reproduced in the vehicle g100.

Also, the environment provider g170 and the server controller g330 may create reproduction data in which the layout of the specified actual room is changed in accordance with the interior of the vehicle g100 or may create reproduction data in which some of two or more actual rooms are composited. Thereby, even if a shape and an area of the actual room are different from a shape and an area of the vehicle g100, a similar atmosphere and necessary external equipment can be reproduced.

Also, the environment provider g170 may select a type of room in accordance with the user's action within the vehicle g100 and create a room request on the basis of the selected type of room. For example, when the output g171 of the vehicle g100 reproduces a movie and the user views the movie, the environment provider g170 may select a movie theater in the type of room in accordance with content output by the output g171. Also, when the output g171 of the vehicle g100 reproduces music and the user listens to music, the environment provider g170 selects an opera house as the type of room in accordance with details of content output by the output g171.

Also, the environment provider g170 may select the type of room in accordance with a user who is within the vehicle g100 or a combination of users. For example, the environment provider g170 may specify a type of room that has been selected at the highest frequency on the basis of a previous designation history of users. If the users are a combination of a child and a parent, the child is given priority and a child's room may be specified. If a combination of users is members of a company, a meeting room may be specified.

Also, the environment provider g170 may specify a room according to a destination of the vehicle g100. For example, when the destination is a sea, a room having a room design of a view of the sea may be specified. When the destination is a theme park, a room having a room design of theme park characters may be specified.

The operation interface may be implemented in a type of application programming interface (API) or the like.

Ninth Embodiment

Next, a ninth embodiment will be described. In the ninth embodiment, a vehicle system, an automated driving vehicle, a vehicle control method, and a program to which the vehicle of the first embodiment can be applied will be described. The vehicle system is a system for assisting a desired user to use the vehicle. This vehicle is, for example, an automated driving vehicle that basically does not require a driving operation. Hereinafter, although an automated driving vehicle will be described as being used, a manual driving vehicle may be used.

[Overall Configuration]

FIG. 159 is a configuration diagram of a vehicle system h1 of a ninth embodiment. The vehicle system h1 includes one or more terminal devices h100 which are used by one or more users U, one or more vehicles h200, and a vehicle management device h300. These components can communicate with one another through a network NW. The network NW includes the Internet, a wide area network (WAN), a local area network (LAN), a public line, a provider device, a dedicated channel, a wireless base station, or the like. Meanwhile, the wording "used by users U" may include terminal devices, capable of being used by an unspecified large number of users, such as terminal devices in an Internet cafe being temporarily used by the users U. In addition, the vehicle management device h300 is an example of a "server device."

[Terminal Device]

The terminal device h100 is, for example, a smartphone, a tablet terminal, a personal computer, or the like. In the terminal device h100, an application program, a browser or the like for using the vehicle system h1 is started up, and a vehicle use service or the like to be described below is supported. In the following description, it is assumed that the terminal device h100 is a smartphone, and that an application program (a vehicle control application) is started up. The vehicle control application communicates the vehicle management device h300 in accordance with the user U's operation, and transmits the user U's request to the vehicle management device h300, or performs a push notification based on information received from the vehicle management device h300.

[Vehicle]

The vehicle h200 is, for example, a vehicle having four or more wheels which are capable of being used by a plurality of users U, and may be vehicles other than a motorcycle. FIG. 160 is a configuration diagram of the vehicle h200 of the ninth embodiment. The vehicle h200 includes, for example, an outside monitor h210, a communication device h220, a navigation device h230, a recommended lane decision device h240, an autonomous driving controller h250, a driving force output device h260, a brake device h262, a steering device h264, and an occupant management device h270. In addition, the occupant management device h270 includes, for example, a discriminator h272, a use permitter h273, and a boarding controller h274. The autonomous driving controller h250 and the occupant management device h270 have a processor such as, for example, a CPU that executes a program (software) stored in a storage (not shown) within the vehicle h200. The program may be stored in a storage such as a hard disk drive (HDD) or a flash memory in advance, may be stored in a detachable storage medium such as a DVD or a CD-ROM, or may be installed in the storage by the storage medium being mounted in a drive device (not shown). A portion of the outside monitor h210 and an in-vehicle camera h280 to be described later are an example of an "imaging device." In addition, the communication device h220 is an example of an "in-vehicle communicator." In addition, a combination of the autonomous driving controller h250, the occupant management device h270, an event determination device h282 to be described later, and an information output device h284 is an example of a "provider."

An outside monitor h210, a communication device h220, a navigation device h230, a recommended lane decision device h240, an autonomous driving controller h250, a driving force output device h260, a brake device h262, a steering device h264 have configurations the same as the outside world monitor a210, a communication device a220, a navigation device a230, a recommended lane determination device a240, an automated driving controller a250, a driving force output device a260, a brake device a262, and a steering device a264 of FIG. 26 which are introduced in the second embodiment respectively, and thus the descriptions thereof will be omitted. Further, detailed descriptions of the processes of the automated driving of the ninth embodiment will be emitted while supporting FIG. h3 and related descriptions thereto which are introduced in the first embodiment.

In addition, in the case of the ninth embodiment, a route set by the navigation control device h236 may be designated by the vehicle management device h300. The route in this case includes one or both of a prescribed route for circulating inside an operation area along a route determined in advance and an on-demand route including a route to the terminal device h100 possessed by a user who boards the vehicle h200 and a route to a destination set by the user on board the vehicle. The wording "inside an operation area" may be a range for each municipality, a specific district within a municipality, or a district straddling a plurality of municipalities. Circulation includes, for example, a case of revolving around the same route or a case of revolving around a different route in a time slot. In addition, circulation also includes, for example, going and coming to city A and city B. Hereinafter, an example of the prescribed route will be described using a periodic route for traveling on a route determined periodically. The on-demand route is a route which is generated in the vehicle management device h300 in a case where there is a boarding request from the terminal device h100. In addition, information of arrival target times and points at which a vehicle stops in order to allow a user to board or alight from the vehicle may be associated with each route. In addition, information such as passing through a destination point or a route in a certain time range or departure from and arrival at a certain point in a certain time range may be associated with each route. The navigation control device h236 outputs information of a route decided using any of the foregoing methods to the recommended lane decision device h240.

The autonomous driving controller h250 includes one or more processors such as a CPU or a micro processor (MPU) and various storage devices. The autonomous driving controller h250 causes the vehicle h200 to travel autonomously while avoiding contact with an object of which the position or speed is input from the outside monitor h210 with travel in the recommended lane decided by the recommended lane decision device h240 as a principle. The autonomous driving controller h250 sequentially executes, for example, various types of control. Examples of the control include constant-speed traveling control for traveling in the same traveling lane at a constant speed, following traveling control for following a preceding vehicle, lane change control, merging control, divergence control, emergency stop control, tollbooth control for passing a tollbooth, handover control for terminating autonomous driving and switching to manual driving, and the like. In addition, during execution of the above control, behavior for avoidance may be planned on the basis of the surrounding situation (such as the presence of a nearby vehicle or pedestrian or lane narrowing caused by road construction) of the vehicle h200.

In addition, the autonomous driving controller h250 may perform various types of control relating to the above-described autonomous driving through control performed by the occupant management device h270.

The occupant management device h270 manages a user's boarding and alighting from the vehicle h200. In addition, the occupant management device h270 manages the number of occupants or the seating capacity of the vehicle h200. The discriminator h272 discriminates a user with respect to the vehicle h200. The use permitter h273 performs control for allowing a user discriminated to be a user who can use the vehicle h200 by the discriminator h272 to board the vehicle h200. Specifically, the use permitter h273 allows the user discriminated to be a user who can use the vehicle h200 by the discriminator h272 to occupy and use at least a portion of the vehicle h200. The wording "allowing occupying and using at least a portion" refers to, for example, occupying and using at least one of a plurality of seats in the vehicle interior. In addition, the boarding controller h274 performs control for allowing the user permitted to occupy and use at least a portion of the vehicle h200 by the use permitter h273 to board or alight from the vehicle. The details of functions of the discriminator h272, the use permitter h273, and the boarding controller h274 will be described later.

[Vehicle Management Device h300]

Referring back to FIG. 159, the vehicle management device h300 includes, for example, a communicator h310, a user registrar h320, an acquirer h330, an area indicator h332, a route indicator h340, and a storage h350.

The user registrar h320, the acquirer h330, the area indicator h332, and the route indicator h340 are realized by a processor such as, for example, a CPU executing a program (software) stored in the storage h350. In addition, some or all of these functional units may be realized by hardware such as an LSI, an ASIC, or an FPGA, or may be realized by software and hardware in cooperation. The program may be stored in the storage h350 such as a hard disk drive (HDD) or a flash memory in advance, may be stored in a detachable storage medium such as a DVD or a CD-ROM, or may be installed in the storage h350 by the storage medium being mounted in a drive device (not shown).

The communicator h310 is, for example, a network card for connection to the network NW. The communicator h310 communicates with the terminal device h100 or the vehicle h200 through the network NW.

The user registrar h320 registers a user who uses a vehicle use service provided by the vehicle system h1. The user registrar h320 registers, for example, information relating to a day of the week, a time slot, and a use section for using the vehicle h200 which are input by the terminal device h100. Various types of information registered by the user registrar h320 are stored in the storage h350 as user information h351.

FIG. 161 is a diagram illustrating an example of content of the user information h351. In the user information h351, a password that is authentication information used in the authentication of a user, and a time of use and a use section of the vehicle h200 are associated with a user ID that is identification information of the user. The time of use is, for example, a day of the week and a time slot. The use section is, for example, a section from a boarding point to a destination. The boarding point and the destination are represented by, for example, map coordinates. In addition, the user information h351 may contain information of a contact address (a notification destination) in a case where abnormality occurs in the user.

In addition, after the completion of registration of the user information h351, the user registrar h320 transmits information indicating the completion of registration to the terminal device h100. The information indicating the completion of registration contains, for example, information relating to a user ID or a password. In addition, the information indicating the completion of registration may contain a code such as a bar code or a QR code (registered trademark) for permitting boarding the vehicle h200. Information such as a user ID or a user's destination, for example, is encoded in the code. In addition, the user registrar h320 may transmit the user information h351 to the vehicle h200.

The acquirer h330 acquires a boarding request from the terminal device h100 possessed by a user who desires to board the vehicle h200.

The area indicator h332 specifies an operation area of the vehicle h200. In addition, the area indicator h332 indicates routes varying according to time slots to the vehicle h200 within the operation area. The details of a function of the area indicator h332 will be described later.

The route indicator h340 includes, for example, a periodic route generator h342, an on-demand route generator h344, and a vehicle allocator h346. The periodic route generator h342 generates a periodic route in which the vehicle h200 travels on the basis of the user information h351 and map information h352. The on-demand route generator h344 generates an on-demand route including a route to the position of a user who will board a vehicle and a route to a destination after the user is taken on board the vehicle on the basis of the boarding request obtained by the acquirer h330. The vehicle allocator h346 allocates a plurality of vehicles h200 for traveling inside the operation area. The details of functions of the periodic route generator h342, the on-demand route generator h344, and the vehicle allocator h346 will be described later.

The storage h350 is realized by an HDD, a flash memory, a random access memory (RAM), a read only memory (ROM), or the like. The storage h350 has, for example, the user information h351, the map information h352, route information h353, and other information stored therein.

The map information h352 contains, for example, road information, traffic regulation information, address information (an address or a postal code), facility information, telephone number information, or the like. The road information contains information indicating the type of road such as an expressway, a toll road, a national road, or a prefectural road, or information such as the number of lanes of a road, an area of an emergency parking area, the width of each lane, the gradient of a road, the position (three-dimensional coordinates including longitude, latitude, and altitude) of a road, the curvature of a lane curve, the position of a merging and divergence point of a lane, or a mark provided on a road. The map information h352 may be updated at any time by accessing another device using the communication device h220.

The route information h353 is information relating to a route allocated for each of the vehicles h200. The route information h353 contains one or both of the periodic route or the on-demand route. The details of the route information h353 will be described later.

[Vehicle Use Service Provided by Vehicle System 1]

Next, an example of a vehicle use service provided by the vehicle system h1 of the ninth embodiment will be described. First, a user accesses the vehicle management device h300 using the terminal device h100, and performs user registration for receiving a vehicle use service provided by the vehicle system h1 through the user registrar h320.

The area indicator h332 ascertains which user desires to board a vehicle in which time slot and in which district on the basis of the user information h351 registered in advance, and specifies a district including a boarding point as an operation area on the basis of the ascertained information. The periodic route generator h342 generates the number of vehicles h200 in circulation and a route for each of the vehicles h200 with respect to the operation area specified by the area indicator h332. In this case, the periodic route generator h342 generates routes varying according to time slots in which a vehicle h200 in circulation in the operation area travels within the operation area. In addition, in a case where a plurality of vehicles are in circulation in the operation area, the periodic route generator h342 may generate a route on which each of the vehicles h200 travels along a different route.

The periodic route generator h342 transmits the generated periodic route to the vehicle h200. The vehicle h200 travels on the basis of the periodic route generated by the periodic route generator h342. In this manner, the number of vehicles h200 and a route are decided in accordance with the time slot of a user obtained from the user information h351, and thus it is possible to achieve both suppression of traffic congestion and an improvement in the operation rate of vehicles. In addition, the vehicles h200 are allowed to travel different routes for each time slot or for each of the vehicles h200, and thus it is possible to travel on more roads within the operation area. Therefore, a user can easily find the vehicle h200. In addition, the vehicle h200 is allowed to travel on a periodic route. Thereby, even in a case where a user does not transmit a boarding request immediately before the user boards the vehicle h200, the user can quickly find and use the vehicle h200, and thus it is possible to improve the user's convenience.

In addition, in a case where the user desires to board the vehicle h200, the user may transmit a boarding request from the terminal device h100. FIG. 162 is a diagram illustrating an example of a boarding request screen h400 which is displayed on a display of the terminal device h100. The boarding request screen h400 shows a user information input area h402, a use time slot input area h404 for inputting a use time slot, a boarding/alighting position input area h406 for inputting information of a use section (a boarding position and a destination), and a decision operation area h408 for deciding or canceling set content.

The user inputs user information registered in advance from the boarding request screen h400, and inputs information relating to a time of use and a use section, to select a decision button of the decision operation area h408. The terminal device h100 transmits the boarding request to the vehicle management device h300 through the network NW.

In a case where the boarding request is received from the terminal device h100 through the communicator h310, the on-demand route generator h344 searches for a vehicle traveling near the terminal device h100 at this point in time, that is a vehicle h200 capable of being used by the user, and generates an on-demand route for the vehicle h200 obtained in the search result. A position near the terminal device h100 may be, for example, a position within a predetermined range of the terminal device h100, may be a position relatively closer to the terminal device h100 than to another vehicle, or may be both positions. In addition, the wording "capable of being used" refers to, for example, the number of occupants in the vehicle h200 being less than a predetermined seating capacity.

The route indicator h340 indicates a route to the vehicle h200 on the basis of one or both of the periodic route generated by the periodic route generator h342 and the on-demand route generated on the basis of the boarding request by the on-demand route generator h344. For example, the route indicator h340 compares the degree of priority of the periodic route generated by the periodic route generator h342 with the degree of priority of the on-demand route generated by the on-demand route generator h344, and indicates a route having a high degree of priority to the vehicle h200. The degree of priority of each route may be set in advance on the vehicle management device h300 side, or may be set by an indication from the terminal device h100. In addition, the degree of priority of each route may be set on the basis of the use situation of the vehicle h200 that travels on the periodic route or the on-demand route.

In addition, the on-demand route generator h344 may allocate a traveling period for the on-demand route on the basis of the use situation of the vehicle h200 corresponding to the periodic route. For example, the on-demand route generator h344 determines whether there is spare time in the use situation of the vehicle h200 on the periodic route. The wording "there is spare time" refers to, for example, there not being a user's use schedule for a predetermined time or more. The predetermined time is, for example, a time including a predetermined margin in a time predicted not to influence an operation of a scheduled periodic route. The on-demand route generator h344 transmits the generated on-demand route to the vehicle h200. The vehicle h200 travels on the basis of the on-demand route in spare time of the use situation.

For example, in a case where the periodic route and the on-demand route are generated, the vehicle allocator h346 may indicate routes to at least a given number of vehicles h200 out of a plurality of vehicles h200 determined in advance by adjusting the number of vehicles so as to travel on the periodic route. Thereby, it is possible to travel on the on-demand route while maintaining circulation on the periodic route. Therefore, it is possible to provide a vehicle use service adapted for a user's needs.

In addition, in a case where the boarding request concentrates on a specific point, and vehicles concentrate on a specific route, the vehicle allocator h346 may shift a time to before or after the time of use of the on-demand route in the boarding request, or disperse routes. Thereby, it is possible to optimize a schedule of vehicle allocation, and to make traffic flow within an operation area efficient.

In addition, the vehicle allocator h346 may attempt to allocate the number of available vehicles with respect to demand within the operation area, and output a vehicle allocation request to a vehicle use service of another area or a third party in a case where the allocation is impossible. The vehicle allocator h346 sets a vehicle allocated by the acceptance of the vehicle allocation request as a vehicle within the operation area, and indicates a route to the set vehicle.

In addition, the route indicator h340 transmits a boarding request result to the terminal device h100. The terminal device h100 displays the boarding request result received from the vehicle management device h300.

FIG. 163 is a diagram illustrating an example of a boarding request result screen h410 which is displayed on the terminal device h100. The boarding request result screen h410 shows information indicating whether an available vehicle is present, identification information (a vehicle ID) of an available vehicle h200, and an estimated time of arrival of the vehicle h200 at a boarding point, as the boarding request result. A user can easily ascertain whether or not to board a vehicle at the request of the user with reference to the boarding request result screen h410.

In addition, the route indicator h340 stores the generated route as the route information h353 in the storage h350. FIG. 164 is a diagram illustrating an example of content of the route information h353. In the route information h353, the vehicle ID is associated with a time slot, a district ID that is district information on circulation, a periodic route ID that is identification information on a periodic route, and an on-demand route ID that is identification information on an on-demand route. A route associated with each ID is set in the periodic route ID and the on-demand route ID. The vehicle management device h300 can centrally manage the allocation of the vehicles h200 to each district of the vehicles h200 by managing the route information h353.

FIG. 165 is a diagram illustrating a status in which the vehicles h200 circulates in an operation area. In the example of FIG. 165, it is assumed that two areas h510 and h512 are allocated on a map h500. In addition, it is assumed that four vehicles M-1 to M-4 travel on a periodic route in the area h510, and that two vehicles M-5 and M-6 travel on a periodic route in the area h512.

Here, the vehicle M-1 detects a user U who desires to board a vehicle using the outside monitor h210 during periodic traveling. For example, the occupant management device h270 learns the feature of the user U who desires to board a vehicle from an image captured by the camera of the outside monitor h210 using machine learning such as deep learning, and detects the user U who desires to board a vehicle from the captured image. The machine learning uses an algorithm such as, for example, a convolutional neural network (CNN) or adaptive boosting (AdaBoost).

In addition, the occupant management device h270 may estimate a person's shape using luminance information or color information (R, G, B) on each pixel of an image captured by the camera of the outside monitor h210, and determine that the user U desires to board a vehicle in a case where a shape in which the estimated person raises his or her hand is shown.

The occupant management device h270 controls the autonomous driving controller h250 so that a vehicle stops at a point where the user U who desires to board a vehicle is standing. Next, the discriminator h272 determines whether the user U can board the vehicle M-1.

For example, the discriminator h272 may perform authentication by accepting speech of a user ID and a password based on a voice from outside of a vehicle during boarding, or may perform authentication by inputting the user ID and the password to a terminal provided on the surface of the vehicle or inside the vehicle. The discriminator h272 refers to the user information h351 received from the vehicle management device h300 on the basis of the input user ID and password, to determine that the user can use a vehicle when it matches the user ID and the password included in the user information h351, and determine that the user cannot board the vehicle when it does not match.

In addition, the discriminator h272 may read a code such as a bar code or a QR code drawn on an image displayed on the display of the terminal device h100 using a code reader (not shown) included in the vehicle h200, and determine that the user U's boarding is possible in a case where the read code is a code for permitting boarding. In this case, the discriminator h272 reads information encoded in a code held up to the code reader, decodes the read information, and acquires electronic information. The discriminator h272 determines that the user U's boarding is possible in a case where the information read by the code reader and the information received from the vehicle management device h300 in advance match, and determines that the user U's boarding is impossible in a case where they do not match. Meanwhile, the discriminator h272 may transmit the acquired information to the vehicle management device h300, and acquire a result of determination of whether the user U can board a vehicle from the vehicle management device h300.

In addition, the discriminator h272 may read a user ID and a password from the terminal device h100 using the terminal device h100 and wireless communication such as dedicated short range communications (DSRC) or Felica (registered trademark), and refer to the user information h351, to determine that the user can use a vehicle when they match the user ID and the password included in the user information h351, and determine that the user cannot board the vehicle when they do not match. Meanwhile, the discriminator h272 may transmit the user ID and the password acquired from the terminal device h100 using wireless communication to the vehicle management device h300, and acquire a result of determination of whether the user U can board a vehicle that is a result of performing collation of a face image in the vehicle management device h300 from the vehicle management device h300.

In a case where it is determined that the user U is a user who can use a vehicle, the boarding controller h274 allows the user U to board a vehicle and travel toward a destination included in the user information h351, and controls the autonomous driving controller h250 so as to allow the user U to alight from the vehicle by stopping at the destination.

In addition, the boarding controller h274 performs a fare adjustment process according to a traveling distance or a traveling time of the user U who alights from a vehicle. The fare adjustment process may be performed by a fare adjustment machine (not shown) included in the vehicle h200, or may be performed by credit card payment or the like.

In addition, the boarding controller h274 allows the user U to alight from a vehicle, and then causes the vehicle h200 to continue to travel by returning the vehicle to a periodic route. In addition, for example, in a case where a group of users are allowed to alight from a plurality of vehicles h200 at the same point, the boarding controller h274 causes the vehicles to move toward routes dispersed from this point or respective different periodic routes and continue to travel.

In addition, in a case where it is determined that the user U is a user who cannot board a vehicle, the discriminator h272 outputs information indicating that the user's boarding is impossible to the user U, and continues traveling on a periodic route. Thereby, since only users managed by the user information h351 are allowed to board a vehicle, these users can board the vehicle with ease even in the case of sharing a ride with others, and thus it is possible to provide a user with an environment that is easy to use.

In addition, the discriminator h272 may output information for allowing the user U determined to be a user who cannot board a vehicle to perform authentication through a separate authentication system or to perform user registration. In a case where it is determined that the user can use a vehicle through the separate authentication system, or a case where user registration is completed, the boarding controller h274 controls the autonomous driving controller h250 so that the user U is allowed to board a vehicle and the vehicle h200 is caused to travel to a destination.

In addition, in a case where it is determined that the user U is a user who cannot board a vehicle, the discriminator h272 may output information of whether to board a vehicle with an extra fee instead of outputting the information indicating that the user's boarding is impossible to the user U. In a case where the information indicating boarding a vehicle with an extra fee is accepted from the user U, the boarding controller h274 controls the autonomous driving controller h250 so that the user U are allowed to board a vehicle and the vehicle h200 is caused to travel to a destination. In addition, in a case where the information of whether to board a vehicle with an extra fee is output, the discriminator h272 may add another user not boarding a vehicle to a condition.

Thereby, even a user who is not registered with the user information h351 can board the vehicle h200. In addition, it is possible to effectively utilize the vehicle h200 which is boarded by nobody.

[Process Flow]

FIG. 166 is a flowchart illustrating an example of a flow of processes which are executed by the vehicle management device h300. First, the route indicator h340 decides the number vehicles for each district (for example, an operation area) on the basis of the user information h351 (step S100h). Next, the periodic route generator h342 decides a periodic route of each vehicle on the basis of the map information h352 (step S102h). Next, the periodic route generator h342 transmits the generated periodic route to the vehicle h200 (step S104h).

Next, the route indicator h340 determines whether the boarding request has been accepted from the terminal device h100 (step S106h). In a case where it is determined that the boarding request has been accepted, the on-demand route generator h344 generates an on-demand route with respect to the accepted boarding request (step S108h), and transmits the generated route information to the vehicle h200 that travels along the on-demand route (step S110h). Thereby, the process of the present flowchart is terminated. In this manner, the vehicle management device h300 specifies the vehicle h200 within the operation area, indicates a route to the specified vehicle h200, discriminates a user who can use the vehicle, and allows the user who can use the vehicle to start to occupy and use at least a portion of the vehicle h200. In addition, the vehicle management device h300 repeatedly executes the flowchart shown in FIG. 166 at a predetermined timing, to thereby continuously monitor the occupation and use state of at least a portion of the vehicle h200 and control the number of autonomous vehicles within the operation area on the basis of the occupation and use state.

FIG. 167 is a flowchart illustrating an example of a flow of processes which are executed by the vehicle h200. First, in a case where the route information is acquired by the vehicle management device h300 (step S200h), the occupant management device h270 controls the autonomous driving controller h250 so as to travel on the basis of the route information (step S202h). The route information may be a periodic route or may be an on-demand route.

Next, the outside monitor h210 determines whether a user has been detected (step S204h). In a case where it is determined that the user has been detected, the discriminator h272 performs an authentication process (step S206h), and determines whether the user can use the vehicle (step S208h). In a case where it is determined that the user can use the vehicle, the boarding controller h274 performs control of the user's boarding, and controls the autonomous driving controller h250 so that the vehicle h200 allows the user to board the vehicle and then travels to a destination (step S210h). Next, the boarding controller h274 allows the user to alight from the destination, and then controls the autonomous driving controller h250 so that the vehicle h200 travels on the basis of the route information (step S212h).

In addition, in a case where it is determined that the user is not a user who can use a vehicle, the discriminator h272 outputs information indicating that boarding is impossible (step S214h), and controls the autonomous driving controller h250 so that the vehicle h200 travels on the basis of the route information (step S216h). Thereby, the process of the present flowchart is terminated. Meanwhile, the processes of step S202h and S204h, in a case where traveling along a route of the route information is completed in a state where a user is not detected, the process of the present flowchart is terminated. In addition, after the processes of step S212h and step S216h are terminated, a process such as returning to the process of step S204h may be performed.

As described above, according to the vehicle system h1 of the ninth embodiment, it is possible to provide the mode of use of a vehicle closely related to a district. For example, according to the vehicle system h1 of the ninth embodiment, the number vehicles traveling in an operation area or a traveling route is decided on the basis of the user information h351 registered in advance. Therefore, even in a case where a user does not perform a boarding request immediately before, it is possible to easily find and board an available vehicle h200. Thereby, it is possible to improve a user's convenience. For example, the vehicle system h1 of the ninth embodiment can also use, for example, attending school in the morning and evening, the elderly's shopping or ambulatory in the daytime, and a transportation service such as learning in the night.

[First Modification of Ninth Embodiment]

Next, a first modification of the ninth embodiment will be described. In the first modification of the ninth embodiment, a periodic route on which the vehicle h200 is in circulation in an operation area is provided with a station at which the vehicle h200 stops, a communication device is installed at the station, and an on-demand route is generated by accepting a boarding request from the installed communication device.

FIG. 168 is a configuration diagram of a vehicle system h2 of the first modification of the ninth embodiment. In the vehicle system h2, a station communication device h600 is included, and an acquirer h330A is included in a vehicle management device h300A. Functions of other components are the same as those in the ninth embodiment. Therefore, hereinafter, in the vehicle system h2, a description will be mainly given with a focus on differences from the vehicle system h1 of the ninth embodiment.

The station communication device h600 is installed at a predetermined point of an operation area. FIG. 169 is a configuration diagram of the station communication device h600. The station communication device h600 includes, for example, a communicator h602, an accepter h604, a display controller h606, and a display h608.

The communicator h602 communicates with the vehicle management device h300A through the network NW. The communicator h602 is a communication interface such as, for example, a wireless communication module. For example, the communicator h602 transmits a boarding request accepted by the accepter h604 to the vehicle management device h300A. In addition, the communicator h602 receives a result of the boarding request transmitted by the vehicle management device h300A. The result of the boarding request contains information indicating whether an available vehicle is present, a vehicle ID, and an estimated time of arrival.

The accepter h604 accepts input of a boarding request from a user. The display controller h606 controls the display h608 so as to display an acceptance screen for the boarding request. In addition, the display controller h606 controls the display h608 so as to display the result of the boarding request transmitted by the vehicle management device h300A.

The display h608 is a liquid crystal display (LCD), an organic electro luminescence (EL) display device, or the like. The display h608 displays, for example, an acceptance screen for the boarding request and a result screen for the boarding request. In addition, the display h608 and the accepter h604 may be a touch panel-type display device formed integrally.

FIG. 170 is a diagram illustrating a status in which a user U performs a boarding request from the station communication device h600. In the example of FIG. 170, it is assumed that three station communication devices h600a to h600c are installed in an area h510, and that one the station communication device h600d is installed in an area h512. The user U performs a boarding request from a boarding request screen displayed on the display h608 of the station communication device h600b. The boarding request screen is the same screen as the boarding request screen shown in FIG. 162, but the position of the station communication device h600b is set in advance at a boarding point in a use section.

In a case where input of the boarding request is performed, the communicator h602 transmits the boarding request to the vehicle management device h300A. The acquirer h330A acquires request information transmitted from the station communication device h600. The on-demand route generator h344 of the route indicator h340 decides a vehicle traveling nearest the station communication device h600b at this point in time among the vehicles M-1 to M-4 periodically traveling in the area h510, that is, a vehicle that can be used by a user.

In the example of FIG. 170, the vehicle M-4 is assumed to be a vehicle corresponding to the above condition. The on-demand route generator h344 transmits information relating to the generated on-demand route to the vehicle M-4, and transmits a boarding request result to the station communication device h600b. The display controller h606 controls the display h608 so as to display the boarding request result screen h410 as shown in FIG. 163.

As described above, according to the first modification of the ninth embodiment, in addition to the exhibition of the same effect as that in the ninth embodiment, it is possible to perform a boarding request from the station communication device h600b even in a case where a user does not have the terminal device h100. Thereby, it is possible to further improve a user's convenience.

[Second Modification of Ninth Embodiment]

Next, a second modification of the ninth embodiment will be described. In the second modification of the ninth embodiment, in a case where there is no occupant in the vehicle h200 that periodically travels around an operation area or a case where a user occupying at least a portion of the vehicle h200 has time to spare, a notification service in a monitoring service of a district where the vehicle circulates is provided. The notification service in the monitoring service is, for example, a service for outputting information to the outside and riding a person to a predetermined place in a case where the vehicle h200 monitors the outside world or the inside of the vehicle during traveling and finds the person or the like who is estimated to be sick or injured or estimated to be abnormal. In addition, the monitoring service may be a service for outputting information to the outside in a case where a suspicious person, a lost child, or the like is detected. In the monitoring service, it is preferable to monitor the entirety of an operation area as much as possible, and thus a plurality of vehicles h200 are made travel round through different routes and monitored for each fixed period. Further, in a case where the vehicles h200 are left in a monitoring service, the vehicle system makes the vehicles h200 stand by in a garage or the like.

FIG. 171 is a configuration diagram of a vehicle system h3 of the second modification of the ninth embodiment. In addition, FIG. 172 is a configuration diagram of a vehicle h200B of the second modification of the ninth embodiment. In the vehicle system h3, a vehicle management device h300B includes an acquirer h330B and an event determiner h360. Further, in the vehicle system h3, the storage h350 includes an image data DB h354. Further, in the vehicle system h3, the vehicle h200B includes the in-vehicle camera h280, the event determination device h282, and the information output device h284. Functions of the other components are the same as those in the ninth embodiment. Therefore, hereinafter, in the vehicle system h3, a description will be mainly given with a focus on differences from the vehicle system h1 of the ninth embodiment. The event determiner h360 or the event determination device h282 is an example of an "event determiner".

The in-vehicle camera h280 captures an image of the upper half of the body of an occupant who sits on the seat of the vehicle h200, centering on the occupant's face. The image captured by the in-vehicle camera h280 is output to the event determination device h282.

The event determination device h282 determines an event on the basis of an image captured by the in-vehicle camera h280 or an image captured by a camera of the outside monitor h210. The event includes, for example, an event in which a notification is required to be given to the outside with respect to a surrounding environment of the vehicle h200B or an in-vehicle situation. For example, the event includes an event indicating that there is a suspicious person or a lost child in the vicinity of the vehicle h200B, an abnormality occurs in a person inside or outside the vehicle, a serious incident such as close of a portion of a road occurs, damage to equipment or other criminal events occur, or the like. The occurrence of an abnormality in a person includes, for example, a case where it is determined that a person is falling down, crouching, or walking along with tottering due to illness, injury, or the like.

The event determination device h282 learns characteristics of a person who has an abnormality using machine learning such as deep learning on the basis of an image captured by the camera of the outside monitor h210, and estimates a person who has an abnormality from the captured image. In addition, the event determination device h282 may extract an edge portion of an object on the basis of an image captured by the camera of the outside monitor h210, may compare the shape of an area surrounded by the extracted edge portion with the shape of a person which is set in advance, and may estimate that the object is a person in a case where the degree of consistency between the shapes is equal to or more than a predetermined value (for example, equal to or more than 80%).

In addition, the event determination device h282 may perform image processing such as dimension conversion or compression based on pixel information read out from an image captured by the in-vehicle camera h280 or the camera of the outside monitor h210, and may generate feature data including a result of the image processing and attribute information of the image. The attribute information includes, for example, field angle information of the image, identification information of the camera capturing the image, date information when the image is captured, and position information of the vehicle h200B. In addition, the event determination device h282 collates the generated feature data with a pattern of feature data associated with an event determined in advance and determines an event having the highest degree of similarity to be an event for the vehicle h200B.

In addition, the event determination device h282 may transmit the feature data generated from the camera image to the vehicle management device h300B through the communication device h220 and may acquire event information determined by the event determiner h360 of the vehicle management device h300B. In this case, the acquirer h330B of the vehicle management device h300B acquires the feature data transmitted from the vehicle h200B. The event determiner h360 collates, for example, the feature data acquired by the acquirer h330B with the feature data DB h354 stored in the storage h350, acquires event information associated with feature data having the highest degree of similarity, and transmits the acquired event information to the vehicle h200B.

Here, the feature data DB h354 is a database which is learned beforehand by the event determiner h360. In the feature data DB h354, an event is associated with feature data. During the learning, first, the acquirer h330B causes the storage h350 to at least temporarily store feature data transmitted from a plurality of vehicles. In addition, the event determiner h360 performs a detailed event analysis process on the feature data stored in the storage h350 using machine learning, such as deep learning, a statistic process, or the like, generates the feature data DB h354 in which an event is associated with feature data, and causes the storage h350 to store the feature data DB.

FIG. 173 is a diagram illustrating a process of determining an event. In the example of FIG. 173, a status where it is determined that an abnormality occurs in a person estimated by an image is shown. For example, in a case where the vehicle h200B is traveling in a periodic route L1, the event determination device h282 analyzes an image captured by the camera of the outside monitor h210 to estimate a person in which an abnormality occurs from the captured image. In the example of FIG. 173, the event determination device h282 estimates that objects 700 and 702 are persons.

In addition, the event determination device h282 determines whether or not a person is in an abnormal state on the basis of the direction of the shape or operation of the person. For example, the event determination device h282 determines that the person is in a normal state in a case where the person is standing, and determines that the person is in an abnormal state in a case where the person is crouching or walking along with tottering. In the example of FIG. 173, the event determination device h282 determines that the object 700 is a person in a normal state and determines that the object 702 is in an abnormal state.

In a case where the event determination device h282 determines that the object 702 is a person in an abnormal state, the occupant management device h270 provides a predetermined notification service on the basis of a determined event and user information discriminated by the discriminator h272. For example, the occupant management device h270 controls the autonomous driving controller h250 so that the vehicle is stopped at the position of the person (object 702) as control determined in advance for the event. In addition, the information output device h284 outputs or displays a message for prompting the person to board the vehicle using a voice by a speaker provided outside the vehicle or a terminal provided on the surface of the vehicle. Further, in a case where there is no response of the person even after a predetermined time has elapsed from the output of the message, the information output device h284 transmits a predetermined notification to at least one of, for example, the vehicle management device h300B, the terminal device h100 set in advance, a manager terminal, a terminal in a predetermined institution such as a hospital, and a terminal in a municipal officer of a district through the communication device h220. Here, the predetermined notification is, for example, a notification of information including information indicating that there is a sick person, an injured person, or the like, the position of the person, and a captured image or video.

Further, in a case where the discriminator h272 determines that a person determined to be falling down is a person capable of using the vehicle h200B, the boarding controller h274 permits boarding of the vehicle h200B. Further, in a case where the person determined to be falling down boards the vehicle, the boarding controller h274 inquires a route for transporting the person to a nearby hospital where the person can be treated from the vehicle management device h300. The boarding controller h274 controls the autonomous driving controller h250 so that the vehicle travels on the basis of a route which is a search result received from the vehicle management device h300.

In addition, the event determination device h282 may determine the state of an occupant in the vehicle interior imaged by the in-vehicle camera h280. In a case where it is determined that the state of an occupant is abnormal, the information output device h284 sends a notification for confirming the occupant's state to the occupant using an in-vehicle speaker or a terminal provided within the vehicle. Specifically, the information output device h284 outputs a message for confirming the occupant's state to the occupant through a voice, or performs screen display on the HMI h232. In a case where it is determined that there is no response even after a message is output and then a predetermined time has elapsed, the event determination device h282 determines that abnormality occurs in the occupant. In a case where it is determined that abnormality occurs in the occupant, the information output device h284 transmits, for example, a predetermined notification to at least one of a notification destination or the terminal device h100 associated with the occupant's user information by the discriminator h272, the vehicle management device h300, a manager terminal, a terminal of a predetermined institution such as a hospital, and a terminal of a municipal officer in a district. The predetermined notification referred to here is, for example, a notification of information including information indicating transportation of a sick person, an injured person or the like and an image captured by the in-vehicle camera h280.

As described above, according to the second modification of the ninth embodiment, in addition to the exhibition of the same effect as that in the ninth embodiment and the first modification, it is possible to provide a service of monitoring people around a district using traveling in a state in which there is no occupant. Thereby, for example, it is possible to early find an emergency case or a person who suffered from an accident or the like, and to quickly contact a manager or transport him or her to a hospital. In addition, according to the second modification of the ninth embodiment, it is possible to use the vehicle h200 during patrol based on a monitoring service as a shelter during an emergency. In addition, according to the second modification of the ninth embodiment, an area in which a monitoring camera within an operation area is not installed is included in a patrol route for executing a monitoring service, and thus it is possible to monitor the entirety of the operation area. Meanwhile, the monitoring service of the second modification of the ninth embodiment may be operated, for example, using subsidies of local governing bodies in districts in which circulation is performed, cooperation money from shopping centers in districts, or the like as a source of revenue.

[Third Modification of Ninth Embodiment]

Some or all of the components of the vehicle management device h300 may be mounted in the vehicle h200. In the following description, an embodiment in which some of the components of the vehicle management device h300 are mounted in a vehicle as an autonomous controller is defined as the third modification of the ninth embodiment. FIG. 174 is a configuration diagram of a vehicle h200C of the third modification of the ninth embodiment. The vehicle h200C of the third modification of the ninth embodiment is provided with, for example, an autonomous controller h300C as compared to the configuration of the vehicle h200 of the ninth embodiment. Therefore, hereinafter, a description will be mainly given with a focus on the function of the autonomous controller h300C.

The autonomous controller h300C includes, for example, a user registrar h320, an acquirer h330, an area indicator h332, a route indicator h340, and a storage h350. These components have the same functions as those of the components having the same names in the vehicle management device h300 of the ninth embodiment, and thus a specific description herein will not be given. Meanwhile, the user registrar h320 or the like may perform only registration for a user of a host vehicle, and the user information h351, the map information h352, and the route information h353 may be acquired by download from the vehicle management device h300.

The vehicle h200C communicates with the terminal device h100 of the user U using the communication device h220. In addition, the area indicator h332 of the autonomous controller h300C ascertains, for example, which user desires to board a vehicle in which time slot and in which district on the basis of a signal received from the terminal device h100, the user information h351 or the like, and specifies a district including a boarding point as an operation area on the basis of the ascertained information. In addition, the route indicator h340 of the autonomous controller h300C generates a prescribed route for traveling within the range of the operation area. In addition, the route indicator h340 generates an on-demand route on the basis of the use situation of the operation area included in a signal received by the communication device h220, and selects the generated on-demand route instead of the prescribed route. The autonomous driving controller h250 operates the selected route using autonomous driving.

As described above, according to the third modification of the ninth embodiment, in addition to the exhibition of the same effect as that of the ninth embodiment and the first and second modifications, a portion of the function of the vehicle management device h300 is given to the vehicle h200C, and thus the vehicle h200C can autonomously perform the specification of an operation area, the selection of a route, or the like. In addition, according to the third modification of the ninth embodiment, even in a case where an indication from the vehicle management device h300 is not accepted, the vehicle h200C can operate a more appropriate route on the basis of an indication from the terminal device h100. In each of the first to fourth embodiments, some or all of other embodiments may be combined.

In addition, in a case where the vehicle h200 is a manual driving vehicle, the communicator h310 may communicate with a terminal device of a driver of the vehicle h200 through the network NW. In addition, the above-described vehicle systems h1 and h2 can be used in, for example, a ride-sharing providing service in which one or more vehicles are used together by a plurality of users.

Tenth Embodiment

Each of the above-described first to ninth embodiments may be combined with some or all of the other embodiments. Hereinafter, a service management system in which some of the first to ninth embodiments are combined and integrated will be described.

[Overall Structure]

FIG. 175 is a configuration diagram of a service management system i1 of the tenth embodiment. For example, the service management system i1 includes one or more terminal devices a100 used by one or more service applicants A and one or more terminal devices a150 used by one or more service providers shown in the second embodiment, one or more vehicles i200, a service management device i300, a room facility g200 shown in the eighth embodiment, and a stop communication device h600 shown in the ninth embodiment. These components can communicate with each other via the network NW. The network NW includes the Internet, a WAN, a LAN, a public circuit, a provider device, a dedicated circuit, a wireless base station, and the like. The service provided by the service provider S is provided to the service user U. In FIG. 175, the service applicant A and the service user U are shown to be different persons, but they may be the same person. Also, the term "used by the service applicant A or the service provider S" indicates that a terminal device capable of being used by an unspecified number of persons such as a terminal device of an Internet cafe is temporarily used by the service applicant A or the service provider S. Also, for example, the vehicle i200 of the tenth embodiment is applied to the vehicle d200 shown to the above-described fifth embodiment. Also, the vehicle i200 may be a combination of all or some of the vehicle configurations shown in the first to ninth embodiments. Also, the service management device i300 is an example of a "management server". Also, the compartment management device i270 is an example of an "attribute sharer". The attribute shared by the attribute sharer is, for example, a compartment attribute, a type of interface in the eighth embodiment defined in correspondence therewith, or the like.

[Terminal Device]

Because the terminal devices a100 and a150 have, for example, functions similar to those of the terminal devices a100 and a150 introduced into the second embodiment, detailed description thereof will be omitted here.

[Vehicle]

The vehicle i200 is a vehicle having at least a passenger compartment. FIG. 176 is a configuration diagram of the vehicle i200. The vehicle i200 includes, for example, an external environment monitor i210, a communication device i220, a navigation device i230, a recommended lane determination device i240, an automated driving controller (an example of a controller) i250, a driving force output device i260, a brake device i262, a steering device i264, a compartment management device i270, a display management device i280, and a cargo-passenger compartment management device i290.

For example, because configurations of the external environment monitor i210, the communication device i220, the navigation device i230, the recommended lane determination device i240, the automated driving controller i250, the driving force output device i260, the brake device i262, and the steering device i264 are similar to those of the external environment monitor a210, the communication device a220, the navigation device a230, the recommended lane determination device a240, the automated driving controller a250, the driving force output device a260, the brake device a262, and the steering device a264 of FIG. 26 introduced into the above-described second embodiment, detailed description thereof will be omitted here. The driving force output device i260 includes a driving motor i260a having a function similar to that of the first embodiment. Also, FIG. 3 and associated information introduced into the first embodiment are adopted in a process of processing automated driving in the tenth embodiment and detailed description thereof will be omitted.

Also, the HMI i232 is an example of an "interface". For example, one HMI i232 is arranged for each compartment and holds identification information of a user who uses the compartment. Here, the use of the HMI i232 by the user is preferably configured to be permitted according to authentication as in the first embodiment. The HMI i232 is connected to the compartment management device i270 and the service management device i300 via the communication device i220 and the user acquires information provided from the service provider via the HMI i232 and inputs an operation on the service provider and the vehicle. The interface is configured to provide an input/output of information and control signals between the service provider and the vehicle and each compartment and a part of the input/output is permitted to be operated and acquired via the HMI i232 used by the compartment user.

Also, a combination of the compartment management device i270 and the cargo-passenger compartment management device i290 is an example of a "manager". Also, the vehicle exterior display i282 is an example of an "external display". Also, the vehicle exterior display i282 may be included in the interface. Also, a combination of the vehicle interior camera i273 and the state determination device i274 may be an example of a "usage state detector" or an example of an "external environment detector". In the external environment detector, for example, the imaging device e40 in the sixth embodiment and the external environment monitor f210 in the seventh embodiment may be included in the external environment monitor i210. At this time, the external environment detector may be configured to detect the attribute identified by the attribute identifier e118.

Also, in the case of the tenth embodiment, the route to the destination may be specified by the service management device i300. Also, the route may include information on a stop point and a target arrival time in order to allow the user to get into or out of the vehicle. The navigation control device i236 outputs information of a route determined by any one of the above methods to the recommended lane determination device i240.

The HMI 232i performs the input/output and the like of information such as content in association with service-related information (service details, service execution time, or the like) about a service provided by the service provider S and information about the compartment of the vehicle i200. Also, the HMI i232 may have the configuration of the in-vehicle performance devices e1 and e2 according to the sixth embodiment as an input/output (a passenger compartment interface). In this case, at least a part of the information stored in the storage i285 of the display management device i280 may be stored in the storage e500, and the stored information may be displayed from a display e60 by the display controller e18. Also, the HMI i232 may have the functions of the touch panel c106 and the store guidance device c108 of the fourth embodiment.

The compartment management device i270 includes, for example, a discriminator i271, a getting-into controller i272, a vehicle interior camera i273, a state determination device i274, and an information output device i275. The discriminator i271 discriminates a user for the vehicle i200. Also, the vehicle controller i272 performs control for allowing a user determined to be capable of using the vehicle i200 to get into the vehicle i200. Specifically, the vehicle controller i272 performs compartment management in which the user discriminated to be capable of using the vehicle i200 by the discriminator i271 is allowed to occupy and use at least a part of the vehicle i200. For example, allowing the user to occupy and use at least the part is, for example, occupying and using at least one of a plurality of seats in a vehicle interior. Also, the getting-into controller i272 performs control for allowing a user permitted to occupy and use at least a part of the vehicle h200 by the discriminator i271 to get into or out of the vehicle.

The vehicle interior camera i273, the state determination device i274, and the information output device i275 have functions similar to those of the vehicle interior camera h280, the event determination device h282, and the information output device h284 of the ninth embodiment, respectively.

The display management device i280 includes, for example, a display controller i281, a vehicle exterior display i282, a requester i283, an acquirer i284, and a storage i285. Also, the storage i285 is implemented by an HDD, a flash memory, a RAM, a ROM, or the like. For example, the storage i285 stores display condition data i285a, a content DB i285b, an advertisement information DB i285c, and other information. The display controller i281, the vehicle exterior display i282, the requester i283, and the acquirer i284 have functions similar to those of the display controller f270, the vehicle exterior display f272, the requester f274, and the acquirer f276 of the above-described seventh embodiment, respectively. Also, the display condition data i285a, the content DB i285b, and the advertisement information DB i285c store at least data similar to that of the display condition data 278A, the content DB 278B, and the advertisement information DB 278C of the seventh embodiment.

The cargo-passenger compartment management device i290 includes, for example, an input/output i291, a compartment manager i292, a vehicle dispatch controller i293, a status controller i294, a user information acquirer i295, an order acquirer i296, and a storage i297. The storage i297 is implemented by an HDD, a flash memory, a RAM, a ROM, or the like. For example, the storage i297 stores information similar to that of the storage b172 in the third embodiment. For example, the input/output i291, the vehicle dispatch controller i293, the status controller i294, the user information acquirer i295, and the order acquirer i296 include functions similar to those of the input/output b171, the vehicle dispatch controller b173, the status acquirer b174, the user information acquirer b175, and the order acquirer b176 of the third embodiment. The compartment management device i292 manages, for example, a compartment in a deck d202 of the vehicle d200 in the fifth embodiment. Also, the cargo-passenger compartment management device 290 may be configured integrally with the compartment management device i270.

Also, in the tenth embodiment, the vehicle i200 may use, for example, the first upper device 200A and the traveling device 110 in the first embodiment. In this case, the vehicle i20 has a configuration similar to that shown in FIG. 16 described above.

Also, in the tenth embodiment, for example, the vehicle i200 may perform the external display process as shown in FIGS. 17 and 18 and FIGS. 137 to 144.

Here, an aspect of the vehicle i200 in the tenth embodiment will be described. For example, the communication device i220 receives driving information from the service management device i300. The automated driving controller i250 causes the vehicle to be driven along a predetermined route on the basis of the driving information received by the communication device i200. The compartment management device i270 manages, for example, the compartment of the vehicle i200 in which the service user U receives services from the service provider S. Also, the communication device i220 transmits a control signal for controlling the HMI 232 to the service management device i300 or the terminal device a150 of the service provider S using the access state of the service user U with respect to the vehicle i200 as a trigger. The control signal is, for example, a status signal indicating a status, an access signal for providing access to the vehicle, or the like. Also, in addition to the access state, the communication device i220 may cause a trigger for each detailed status to be generated, for example, when the user is approaching, accessing, or getting into the vehicle. Thereby, the vehicle i200 updates the vehicle status. Also, the service provider S executes processing for the trigger via the API or the like, and updates the service status. Therefore, the service provider S using the vehicle i200 can control the interface provided to the service user U or the like. Also, the interface may be defined (embedded) in advance or may be defined in a reading type as needed, but has a corresponding relationship with the vehicle-side compartment and the user.

Also, the display controller i281 causes the vehicle exterior display i282 to execute a display form specified by the service provider S with respect to various types of control signals. The display controller i281 may set a condition to be displayed on the vehicle exterior display i282 on the basis of the display condition data i285a. Also, the display controller i281 may acquire the content and advertisement to be displayed from the content DB i285b and the advertisement information i285c. The content DB i285b and the advertisement information i285c may be downloaded from an external device and updated by the display controller i281. Also, in the case of displaying on the vehicle exterior display i282, the service provider S may cause a display action specified previously or in real time to be executed using the terminal device a150. Thereby, the control of a service at the service provider side is enabled on the basis of the trigger information of the vehicle i200.

Also, for example, the state determination device i274 detects a usage situation of the compartment of the vehicle i200. The usage situation of the compartment includes additional information of user attributes such as physique, gender, and facial expression of a sitting passenger, attributes and quantities of goods such as luggage and products loaded in the compartment, and the like in addition to the status of a binary determination such as presence/absence of usage and presence/absence of loading. For example, according to a configuration in which a stock status of the above-described goods is detected, the service provider can detect a shortage to execute replenishment using another vehicle or correct a movement path to deliver the goods to another vehicle and cause an action such as replenishment to be executed on the way. Also, the state determination device i274 may detect a situation outside the compartment of the vehicle i200. In this case, the communication device i220 transmits a detection signal indicating the state of an external environment detected by the state determination device i274 to the terminal device a150 of the service provider S. The state determination device i274 determines, for example, that the service user U who plans to use the compartment is present outside the compartment and the approach to the service user U has been detected. For example, the service provider S can present information for meeting to the service user U on the basis of the determined state of the external environment. Alternatively, a detection signal itself detected by the external environment monitor i210 can be provided in a form that can be read by the service provider. Thereby, the service provider S can cause a service trigger event to be generated using a function of the vehicle side. Also, it is possible to correct a service and improve added value by determining a start, an end, or a degree of satisfaction of a service, addition of services, and the like as well as control of displaying on the basis of information acquired using the function of the vehicle side.

Also, the communication device i220 may receive a service signal transmitted from the service provider S. In this case, the information output device i275 includes a compartment control signal generator configured to generate a control signal corresponding to the service signal received by the communication device i220 and transmit the control signal to equipment arranged in the compartment and a driving control signal generator configured to transmit the control signal corresponding to the service signal to the automated driving controller i250 and the like. Thereby, safety can be ensured by separating the control of a cargo-passenger compartment side and the control of a movement side. Also, a control level of the vehicle i200 can be appropriately controlled by service details, and the vehicle i200 and a vehicle operating company can provide the service provider S with a fail-safe function for the operation of the service provider. In other words, the service provider S can perform the service without designing and setting safety by itself.

Also, the compartment management device i270 shares a compartment attribute with the service management device i300 or the service provider S. As the compartment attribute, for example, in addition to whether the compartment is a passenger compartment of only seats or a cargo compartment, a set compartment is used on the basis of capability such as a size, a function, and available power. Accordingly, for example, service attributes and signals capable of being input and output via the HMI i232 described in the second embodiment are defined. The HMI i232 may include the function of the I/F manager g330B described in the eighth embodiment. In this case, the attribute can also be used to use a functional operation of the external facility. In the HMI i232, equipment capable of being implemented is set in correspondence with the compartment attribute. Thereby, according to the attribute, it is possible to discriminate a state in which a service can be provided (parking/stopping or traveling) and permit a service operation according to the discrimination. For example, operations that cannot be executed when the storage capacity is less than or equal to a predetermined value are not displayed on the display screen of the HMI i232 or an operation of a firearm/heat source is minimized during traveling, the generation of electromagnetic waves of a microwave oven is minimized, or control such as limiting the supply of electric power (energy) can be performed. Also, when an interface required by the service provider S can be defined in advance, a necessary operation and a corresponding traveling state are specified in advance according to the attribute. In this case, a service operation for the traveling state can be controlled by the service provider side.

Also, the HMI i232 may communicate with the terminal device a150 and execute an operation of an external facility via the service provider S. Also, the HMI i232 may make a route change to a specific destination provided by the service provider S. Also, the HMI i232 may include an operation information transmitter configured to transmit operation information to the service provider S via the communication device i220.

Also, for example, the automated driving controller i250 performs automated driving on the basis of, for example, an external environment detection sensor or a position information sensor of the external environment monitor i210 or the navigation device i230 or the like. Also, the HMI i232 may permit the service user S to use information or validate the use of information when the automated driving by the vehicle i200 is being executed and the service user is in the vehicle. From another viewpoint, some functions of the interface can be configured to be available only in a discriminated traveling state (for example, a stopped state or an automated driving state). As described above, when a user who is in the vehicle tries to perform a certain operation with the HMI i232, permission/rejection of execution of a restricted function is set. Also, the HMI i232 may provide information to the service user S before or after the service user S gets into or out of the compartment.

Also, the compartment management device i270 and the cargo-passenger compartment management device i290 may acquire traveling device information including version information of the traveling device of the vehicle i220 from the service management device i300 or the like and cause a superstructure having a version matching the acquired traveling device information to be connected by the first connector.

[Service Management Device]

Returning to FIG. 175, for example, the service management device i300 includes a vehicle management device i310, an order reception management device i320, a fellow passenger service management device i330, an event management device i340, a content providing server i350, and a storage device (an example of a storage) i360. Each of these functional parts is implemented, for example, when a processor such as a CPU executes a program (software) stored in the storage device i360. Some or all of these functional parts may be implemented by hardware such as LSI, an ASIC, and an FPGA or may be implemented by cooperation between software and hardware. The program may be pre-stored in the storage device i360 such as an HDD or a flash memory or pre-stored in a removable storage medium such as a DVD or a CD-ROM. The program may be installed in the storage i360 when the storage medium is mounted in a drive device (not shown). A combination of the vehicle management device i310, the order reception management device i320, the fellow passenger service management device i330, the event management device i340, and the content providing server i350 is an example of the "manager". Also, the service management device i300 may have some of the components shown in FIG. 175 (for example, the event management device i340 and the content providing server i350) which are externally provided.

The service management device i300 has the above-described configuration and therefore positions service management as a user-side front end, positions vehicle management as a vehicle-management-side front end, and provides an integrated service in cooperation with the vehicle i200 serving as a passenger vehicle or a vehicle for a specific purpose, the store R, the stop communication device h600, and the room facility g200 shown in FIG. 175, and the like.

For example, the service management device i300 manages service provision including at least one of a pick-up/drop-off service for picking up a user to the destination by means of the vehicle i200, a fellow passenger service for allowing a plurality of users to together get into the vehicle i200, and a content service for causing content to be output to the interior or exterior of the vehicle i200 on the basis of a request from the terminal device a100 or a150. In this case, the service management device i300 performs management so that the user occupies and uses at least a part of the vehicle i200.

For example, the vehicle management device i310 has a function similar to that of the vehicle management device h300 of the ninth embodiment and manages driving of the vehicle i200 for a regular route or on-demand route. The order reception management device i320 receives requests from the terminal devices a100 and a150, the vehicle i200, the room facility g200, and the like connected via the network NW. Also, the order reception management device i320 selects various types of services corresponding to the request from among a plurality of predetermined services on the basis of the received request and allocates the vehicle i200 as necessary.

For example, the fellow passenger service management device i330 has a function similar to that of the service management device a300 or a730 of the second embodiment and performs adjustment of fellow passengers (for example, a service user and a service provider) or the like. For example, the event management device i340 has a function similar to that of the event vehicle dispatch device d100 of the fifth embodiment and manages a venue and a holding date and time of an event of a pick-up/drop-off destination, or a store R of the pick-up/drop-off destination. Also, the event management device i340 manages vehicles dispatched for the event, pick-up/drop-off of users, and the like.

For example, the content providing server i350 has a function similar to that of the content providing server f300 of the seventh embodiment and manages the output of content on the basis of the environment of the vehicle i200. Also, the storage device i360 is implemented by an HDD, a flash memory, a RAM, a ROM, or the like. Also, information or content data about a display form of the vehicle i200 for the service information of the storage device i360, data necessary for various types of processes of the other service management device i300, data such as processing results, and the like are stored.

Also, the service management device i300 has the above-described configuration and therefore, for example, the embodiment as shown in FIGS. 42 to 46 of the above-described second embodiment or the embodiment as shown in FIGS. 100 to 104 of the above-described fifth embodiment is implemented.

Here, an aspect of the service management device i300 according to the tenth embodiment will be described. For example, the service management device i300 identifies the vehicle i200 used by the service provider S by means of a vehicle identifier (an example of an identifier) a730 of the fellow passenger service management device i330. Also, the plan determiner (an example of a vehicle information provider) a740 transmits information about a vehicle corresponding to the identified vehicle i200 to the terminal device a150 of the service provider S. The information to be transmitted includes, for example, user operation information, a status and an attribute of the occupant obtained by occupant detection, and the like. Also, the vehicle identifier a730 may identify the vehicle i200 from vehicles within a specific area. Also, the vehicle identifier a730 may identify the vehicle i200 on the basis of position information provided by the service provider S and getting-into/out position information provided by either the service provider S or the service user U. Also, the vehicle identifier a730 may identify a plurality of vehicles i200 with respect to the service provider S on the basis of the position information of the vehicle i200 and the getting-into/out position information.

Also, the order reception management device i320 includes a service information input configured to input service information of the service provider S. Each of the vehicle management device i310, the order reception management device i320, the fellow passenger service management device i330, the event management device i340, and the content providing server i350 includes an interface controller configured to control information delivery between the vehicle i200 and the terminal device a150 of the service provider S by transmitting a control signal to the vehicle i200 on the basis of service information. Thereby, transmission/reception of a signal can be performed between the vehicle i200 and the service provider S.

Also, for example, the vehicle management device i320 allows the plan determiner a740 and the like to transmit information about a section in which the service user U receives the service of the service provider S while getting into the vehicle i200 to the service provider S. Also, the vehicle management device i320 may include a route updater configured to allow the route or the destination of the vehicle i200 to be updated according to a control signal from the terminal device a150 of the service provider S. Also, the content providing server i350 may further include an external display controller configured to control the vehicle exterior display i282 of the vehicle i200 according to a control signal from the terminal device a150 of the service provider S.

Also, each of the vehicle management device i310, the order reception management device i320, the fellow passenger service management device i330, the event management device i340, and the content providing server i350 includes a service operation controller configured to execute the transmission of information about the vehicle i200 for the service provider S according to a control signal from the vehicle i200.

Also, the vehicle management device i310 may further include a vehicle position manager configured to detect positions of a plurality of vehicles and a service position manager configured to associate service information corresponding to the plurality of vehicles. In this case, the vehicle management device i310, the order reception management device i320, the fellow passenger service management device i330, the event management device i340, and the content providing server i350 provide environment information to the plurality of vehicles, the service user, or the service provider on the basis of position information and service information acquired from the plurality of vehicles. For example, it is possible to provide value-added information with respect to a service of the service user U and the service provider S by sharing a distribution of attributes in a specific position/area, a positional relationship, an available seat situation, a contention area (a free space), and the like as environment information. In particular, the service provider S can execute a value-added service on the basis of the information. Also, each of these components may determine a service execution situation in an area as environment information on the basis of position information acquired from a plurality of vehicles and service attribute information corresponding to the plurality of vehicles. The service execution information in the area is managed by the area manager d186 in the fifth embodiment and the vehicle management device h300 in the ninth embodiment. The service execution situation includes a service usage situation of each user, a service status provided from each service provider, and various types of states discriminated by bundling a plurality of service usage situations and a plurality of service statuses in addition to environment information such as the number of vehicles in which the service is being executed, a vehicle attribute, and a sparse vehicle density. Also, each component of the vehicle management device i310, the order reception management device i320, the fellow passenger service management device i330, the event management device i340, and the content providing server i350 can selectively use content data stored in the storage device i360 in the vehicle on the basis of service information stored in the storage device i360.

Also, in the tenth embodiment, in addition to the above-described service management device i300, details of other embodiments may be appropriately combined to provide an integrated service in which the user and the vehicle are cooperated. According to each of the first to tenth embodiments described above, it is possible to implement more flexible use of vehicles.

Also, the above-described first embodiment can be represented as follows.

(1): There is provided an automated driving vehicle including: a traveling device on which a superstructure is able to be mounted and which does not have any compartment; and a first connector provided on the traveling device and connected to the superstructure mounted on the traveling device so that the superstructure is removable from the traveling device.

(2): In the aspect (1), the traveling device includes a mounting area where the superstructure is able to be mounted, a first wheel, and a second wheel positioned behind the first wheel in a vehicle traveling direction, and the mounting area includes at least a size ranging from a position substantially equal to a position of the first wheel to a position substantially equal to a position of the second wheel in the vehicle traveling direction.

(3): In the aspect (2), the mounting area extends over the entire length of the traveling device in the vehicle traveling direction.

(4): In any one of the aspects (1) to (3), the traveling device has wheels and a maximum thickness of the traveling device from which the wheels are excluded is less than or equal to a diameter of the wheel.

(5): In the any one of the aspects (1) to (4), the traveling device includes an acquirer configured to acquire information about a destination of the automated driving vehicle; a driving plan generator configured to generate a driving plan of the automated driving vehicle on the basis of a destination acquired by the acquirer and map information including road information; and an automated driving controller configured to control traveling of the traveling device on the basis of the driving plan generated by the driving plane generator.

(6): In any one of the aspects (1) to (5), the superstructure includes a seat device in which an occupant is able to sit.

(7): In any one of the aspects (1) to (6), the superstructure includes a room into which an occupant gets.

(8): In any one of the aspects (1) to (7), the superstructure includes a luggage support configured to support luggage.

(9): In any one of the aspect (1) to (8), the traveling device is configured so that a plurality of superstructures are mounted on each other.

(10): In any one of the aspects (1) to (9), the traveling device includes a support configured to support a traveling device of another automated driving vehicle from below when the traveling device of the other automated driving vehicle is mounted from above with respect to the traveling device and is able to travel in a state in which the traveling device of the other automated driving vehicle has been mounted.

(11): In any one of the aspects (1) to (10), the automated driving vehicle further includes a second connector provided on the traveling device and connected to a traveling device of another automated driving vehicle arranged with respect to the traveling device in at least one of a vehicle traveling direction and a vehicle width direction.

(12): According to another aspect of the present invention, there is a provided a plate-like automated driving vehicle on which a superstructure can be mounted and which does not have a compartment.

(13): According to another aspect of the present invention, there is provided an automated driving vehicle including: a power supply interface configured to supply electric power to a superstructure; a first communication interface configured to communicate with the superstructure; and a traveling device mounted on the superstructure and connectable to an upper device to which a plurality of pieces of equipment different from each other are connected via the power supply interface and the first communication interface, wherein the traveling device operates by sharing the power supplied to the superstructure and communication details for the superstructure.

(14): In the aspect (13), the automated driving vehicle further includes a second communication interface configured to transmit information indicating a connection situation of the equipment connected to the upper device to an external device.

(15): In the aspect (13), the upper device includes an external control permitter configured to determine whether or not to allow control of the traveling device via the equipment according to an operation of a user on the equipment on the basis of identification information of the equipment connected to the upper device and control information of the equipment acquired from an external device.

(16): In the aspect (13), the automated driving vehicle further includes a vehicle state sharing permitter configured to allow information sharing of the traveling device for the equipment or a terminal device connected to the equipment the basis of identification information of the equipment connected to the upper device and control information of the equipment capable of being updated on the basis of information acquired from the external device.

(17): In the aspect (13), the traveling device includes a vehicle state sharing permitter configured to allow information sharing of the traveling device for the upper device or a terminal device identified on the basis of identification information of the upper device on the basis of identification information of the upper device and control information of the equipment capable of being updated on the basis of information acquired from an external device.

Also, the above-described second embodiment can be represented as follows.

(1): According to an aspect of the present invention, there is provided a service management device including: an acquirer configured to acquire a fellow passenger request for requesting a service user to get into a moving vehicle together with a service provider; and a plan determiner configured to determine a fellow passenger plan of the service user and the service provider in accordance with the fellow passenger request acquired by the acquirer.

(2): In the above-described aspect (1), the fellow passenger request includes information of a first getting-into section where the service user gets into the vehicle.

(3): In the above-described aspect (2), the service user is a user who does not like to get into the vehicle alone and the plan determiner determines a second getting-into section where the service provider gets into the vehicle so that the first getting-into section is included.

(4): In the above-described aspect (2), the plan determiner refers to information of an area where the service provider is able to get into the vehicle and determines a second getting-into section where the service provider gets into the vehicle so that the service provider gets into the vehicle together with the service user in a range of an overlapping part between the first getting-into section and the area.

(5): In the above-described aspect (1), the plan determiner determines the fellow passenger plan so that the service user gets out of the vehicle at a point where cooperation with a service to be received by the service user after getting out of the vehicle is possible.

(6): In the above-described aspect (5), the plan determiner makes an online reservation necessary for the service after getting out of the vehicle.

(7): In the above-described aspect (1), the plan determiner selects a service provider according to a type of service specified in advance and determines a fellow passenger plan of the service user and the selected service provider.

(8): In the above-described aspect (1), the vehicle is an automated driving vehicle having a wireless communication function and the service management device further includes a communicator configured to communicate with the vehicle; and a route indicator configured to cause the communicator to transmit an indication of a route based on the fellow passenger plan determined by the plan determiner to the vehicle.

(9): There is provided a service providing system including the service management device of the above-described aspect (8) and the vehicle, wherein the service management device transmits service provision schedule time to the vehicle together with the instruction of the route and performs driving control so that the vehicle does not reach a destination before the elapse of the service provision schedule time.

(10): According to another aspect of the present invention, there is provided a service management method including: acquiring, by a computer, a fellow passenger request for requesting a service user to get into a moving vehicle together with a service provider; and determining, by the computer, a fellow passenger plan of the service user and the service provider in accordance with the acquired fellow passenger request.

(11): According to another aspect of the present invention, there is provided a program for causing a computer to: acquire a fellow passenger request for requesting a service user to get into a moving vehicle together with a service provider; and determine a fellow passenger plan of the service user and the service provider in accordance with the acquired fellow passenger request.

(12): According to another aspect of the present invention, there is provided a service management device including: a first acquirer configured to acquire service use request information from a service user who uses a service associated with the use of a vehicle; a second acquirer configured to acquire vehicle information of a pre-registered vehicle; a vehicle identifier configured to identify an available vehicle on the basis of the service use request information and the acquired vehicle information and generate available vehicle information; a third acquirer configured to acquire service provision information related to a service whose order is able to be received by a service provider for providing a service associated with the use of the vehicle; and a plan determiner configured to identify an available service capable of being enjoyed by the service user on the basis of the available vehicle information and the service provision information and provide the service user with information about the identified available service.

(13): In the above-described aspect (12), the service use request information includes information of a first section where the service user occupies at least a part of the vehicle.

(14): In the above-described aspect (13), the service use request information includes attribute information of the service provider desired by the service user.

(15): In the above-described aspect (13), the service management device further includes a plan determiner configured to set a second section where the service provider occupies at least a part of the vehicle on the basis of the available vehicle information and the service provision information and set a third section where the service user and the service provider occupy at least a part of the vehicle on the basis of an overlapping part between the first section and the second section.

(16): In the above-described aspect (13) or (14), the service provision information includes information of an area where a service is able to be provided and the service management device further includes a plan determiner configured to set a third section where the service user and the service provider occupy at least a part of the vehicle in an overlapping range of information of an area where the service is able to be provided.

(17): In the above-described aspect (13), the service provision information includes information of a service provision point outside the vehicle and the service management device further includes a plan determiner configured to update the first section so that the first section ends at the service provision point outside the vehicle in accordance with an instruction from the service user.

(18): In the above-descried aspect (13), the service management device further includes a determiner configured to determine whether or not both the service user and the service provider are using the vehicle, wherein the plan determiner updates the first section when the determiner determines that both the service user and the service provider are using the vehicle.

(19): In the above-described aspect (17), the service management device further includes a communicator configured to transmit reservation information for making a reservation for a certain facility at a service provision point outside the vehicle and receive a reservation result corresponding to the reservation information.

(20): In the above-described aspect (12), the vehicle is an automated driving vehicle having a wireless communication function and the service management device further includes a communicator configured to communicate with the vehicle and a route indicator configured to cause the communicator to transmit information of a use start position and a use end position of the service user and a use start position and a use end position of the service provider to the vehicle.

(21): In the above-described aspect (15) or (16), the service use request information includes information of a desired service use time period of the service user and the plan determiner sets the third section so that a time period in which the service user occupies at least a part of the vehicle matches the service use time period.

(22): In the above-described aspect (21), the service provision information includes information of a desired service provision time period of the service provider and the plan determiner sets the third section so that a time period in which the service provider occupies at least a part of the vehicle matches the service provision time period.

(23): In the above-described aspect (15), the plan determiner sets a plurality of third sections corresponding to a plurality of second sections when the second section has been set in correspondence with to each of a plurality of service providers.

(24): In the above-described aspect (12), the service management device further includes a determiner configured to determine whether or not the service user is using the vehicle at a point in time when the first acquirer has received the service use request information and a plan determiner configured to preferentially allocate the vehicle in use to the user when the determiner determines that the service user is using the vehicle.

(25): According to another aspect of the present invention, there is provided a service management method including: acquiring, by a computer, service use request information from a service user who uses a service associated with the use of a vehicle; acquiring, by the computer, vehicle information of a pre-registered vehicle; identifying, by the computer, an available vehicle on the basis of the service use request information and the acquired vehicle information and generating available vehicle information; acquiring, by the computer, service provision information related to a service whose order is able to be received by a service provider for providing the service associated with the use of the vehicle; identifying, by the computer, an available service capable of being enjoyed by the service user on the basis of the available vehicle information and the service provision information; and providing, by the computer, the service user with information about the identified available service.

(26): According to another aspect of the present invention, there is provided a program for causing a computer to: acquire, service use request information from a service user who uses a service associated with the use of a vehicle; acquire, vehicle information of a pre-registered vehicle; identify an available vehicle on the basis of the service use request information and the acquired vehicle information and generate available vehicle information; acquire service provision information related to a service whose order is able to be received by a service provider for providing a service associated with the use of the vehicle; identify an available service capable of being enjoyed by the service user on the basis of the available vehicle information and the service provision information; and provide the service user with information about the identified available service.

Also, the above-described third embodiment can be represented as follows.

(1): According to an aspect of the present invention, there is provided a pick-up/drop-off management device including a vehicle dispatch reserver configured to create a pick-up/drop-off schedule on the basis of reservation details of a facility and reserve a vehicle; and a vehicle dispatch manager configured to allocate the vehicle reserved by the vehicle dispatch reserver in accordance with the pick-up/drop-off schedule.

(2): In the above-described aspect (1), the vehicle dispatch reserver creates the pick-up/drop-off schedule in time for a specified arrival time using the facility as a destination or a departure place on the basis of the reservation details of the facility.

(3): In the above-described aspect (1), the pick-up/drop-off management device further includes an acquirer configured to acquire a movement situation from the vehicle dispatched by the vehicle dispatch manager; and a status manager configured to notify at least one of a user terminal used by a user making a reservation for the facility or a facility terminal used by a manager of the facility of the movement situation acquired by the acquirer.

(4): In the above-described aspect (3), the status manager notifies the facility terminal of a start of movement for the facility or a target arrival time for the facility after the user gets into the vehicle dispatched by the vehicle dispatch manager.

(5): In the above-described aspect (3), the status manager receives at least one of a change and cancellation of a reservation for vehicle dispatch and a change and cancellation of the reservation for the facility when an arrival time of the vehicle dispatched by the vehicle dispatch manager is delayed.

(6): In the above-described aspect (5), the status manager receives both the cancellation of the vehicle dispatch and the cancellation of the facility when neither the cancellation of the vehicle dispatch nor an extension of a use time of the facility has been received from the user notified of a delay of an arrival time of the vehicle dispatched by the vehicle dispatch manager.

(7): In the above-described aspect (3), the acquirer acquires information indicating the number of persons getting into the vehicle from the vehicle and the status manager notifies the facility terminal of a change in the number of reservation persons when information indicating the number of persons getting into the vehicle acquired by the acquirer is different from the number of reservation persons.

(8): In the above-described aspect (3), the acquirer acquires an order instruction of a service or goods which is provided by the facility from the vehicle and the status manager notifies the facility terminal of the order instruction acquired by the acquirer.

(9): In the above-described aspect (3), the pick-up/drop-off management device further includes a service information acquirer configured to acquire service provision information including point information corresponding to a service provision point, identification information of a service provider, and identification information of a user of the service provider from the service provider; an access point acquirer configured to acquire an access point which is the point information for allowing the user to receive a provided service; and a plan determiner configured to determine a driving plan of the vehicle corresponding to a route between the point information and the access point.

(10): In the above-described aspect (9), the pick-up/drop-off management device further includes a status manager configured to generate the service information and service status information corresponding to the identification information of the user acquired by the acquirer and provide the service provider with the service status information on at least the route of the vehicle.

(11): In the above-described aspect (10), the plan determiner acquires the identification information of the user associated with the service status information, generates the service status information on the basis of the driving plan of the vehicle determined by the plan determiner, and makes the plan.

(12): In the above-described aspect (11), the plan determiner manages a status attribute discriminated from the identification information of the user and the movement situation as the service status information and makes the plan.

(13): In the above-described aspect (10), the plan determiner notifies the facility terminal of information about the arrival time for the facility within the service status information.

(14): There is provided a pick-up/drop-off management method including: reserving a vehicle by creating a pick-up/drop-off schedule on the basis of reservation details of a facility; and dispatching the reserved vehicle in accordance with the pick-up/drop-off schedule.

(15): There is provided a program for causing a computer to: reserve a vehicle by creating a pick-up/drop-off schedule on the basis of reservation details of a facility; and dispatch the reserved vehicle in accordance with the pick-up/drop-off schedule.

Also, the above-described fourth embodiment can be represented as follows.

(1): According to an aspect of the present invention, there is provided a vehicle including: an automated driving controller configured to perform automated driving of the vehicle; an operator configured to receive an operation of an occupant of the vehicle; a route setter configured to generate a movement route of a host vehicle or another vehicle with reference to identification information corresponding to the operator; and a compartment manager configured to allow an operation of the compartment by associating identification information corresponding to the operator with a part of the compartment of the vehicle, wherein the automated driving controller causes movement to be started along the movement route in correspondence with the operation of the occupant.

(2): According to an aspect of the present invention, there is provided a vehicle including: an operator configured to receive an operation of an occupant of a vehicle; a route setter configured to generate a movement route of a host vehicle or another vehicle with reference to identification information corresponding to the operator; a compartment manager configured to allow an operation of the compartment by associating identification information corresponding to the operator with a part of the compartment of the vehicle; a current position acquirer configured to acquire a current position of the vehicle, and a communicator configured to externally transmit the identification information and the current position in accordance with the operation of the occupant.

(3): According to an aspect of the present invention, there is provided a vehicle system including: an operation acquirer configured to acquire operation information of an operator who receives an operation of an occupant provided in a vehicle; a position information acquirer configured to acquire position information of the vehicle; a referrer configured to refer to a corresponding relationship between identification information and a compartment of the vehicle and identification information corresponding to the operator; and a transmitter configured to transmit movement route information to at least one vehicle on the basis of the position information, the operation information, and the identification information.

(4): In the above-described aspect (1), the compartment includes a rack part on which a sample is able to be placed, the route setter is configured to determine at least one point to be visited from a plurality of pieces of facility information corresponding thereto by referring to business operator identification information included in the identification information and the plurality of pieces of facility information, the operator includes a first switch for issuing an instruction for movement to the point to be visited corresponding to the rack part, and the automated driving controller causes the vehicle to be moved to the point to be visited when the first switch has been operated.

(5): In the above-described aspect (4), the operator further includes a second switch for instructing a business operator corresponding to the rack part to deliver goods, and the vehicle system further includes a communication device configured to transmit delivery details to a terminal device managed by the business operator when the second switch has been operated.

(6): In the above-described aspect (5), the compartment includes a rack part on which a sample is able to be placed and the operator includes a communication device configured to transmit position information of the vehicle and business operator identification information included in the identification information to another vehicle separate from the vehicle and execute a request for causing the other vehicle separate from the vehicle to start movement onto a route connecting a position of the vehicle and a position corresponding to the business operator identification information.

(7): In the above-described aspect (1), the vehicle according to the above-described aspect (1) is used as a first vehicle and a second vehicle, the operator of the first vehicle includes a third switch for paging the second vehicle, the second vehicle is paged by operating the third switch, a user, the identification information, and the movement route are transferred from the first vehicle, and the automated driving controller of the second vehicle causes movement to be started on the basis of the transferred movement route.

(8): In the above-described aspect (1), the operator of the first vehicle further includes a fourth switch for instructing a business operator corresponding to the rack part to deliver goods and a communication device configured to transmit delivery details to a terminal device managed by the business operator when the fourth switch has been operated.

Also, the above-described fifth embodiment can be represented as follows.

(1): According to an aspect of the present invention, there is provided an event vehicle dispatch device including: an event notifier configured to notify a plurality of vehicles or an owner of the vehicle of an event which is held in an area where the plurality of vehicles is able to be parked; and an adjuster configured to adjust the number of vehicles corresponding to a vehicle attribute of the vehicle which arrives at the area on the basis of a vehicle attribute of each of the plurality of vehicles.

(2): In the above-described aspect (1), the event vehicle dispatch device further includes an indicator configured to indicate a parking position to each of a plurality of vehicles so that the plurality of vehicles arriving at the area are disposed at a predetermined position within the area.

(3): In the above-described aspect (1) or (2), the event notifier provides a notification of the event to a vehicle present within a predetermined distance from a position of the area or an owner of the vehicle.

(4): In any one of the above-described aspects (1) to (3), the event notifier notifies a number of vehicles capable of being parked in the area of the event.

(5): In any one of the above-described aspects (1) to (4), the vehicle is an automated driving vehicle.

(6): In the above-described aspect (5), the automated driving vehicle includes a traction vehicle for traction of a trailer.

(7): In any one of the above-described aspects (1) to (6), the event notifier notifies a pre-registered user of information about an event which is held in the area and acquires information about whether or not pick-up/drop-off to the area is desired from the user.

(8): In the any one of the above-described aspects (1) to (7), the event allocation device further includes a pick-up/drop-off manager configured to allow a user of the event to be picked up by a vehicle participating in the event between a predetermined point and the area.

(9): According to an aspect of the present invention, there is provided an event vehicle dispatch method including: notifying, by a computer, a plurality of vehicles or an owner of the vehicle of an event which is held in an area where the plurality of vehicles is able to be parked; and adjusting, by the computer, the number of vehicles corresponding to a vehicle attribute of the vehicle which arrives at the area on the basis of a vehicle attribute of each of the plurality of vehicles.

(10): According to an aspect of the present invention, there is provided a program for causing a computer to: notify a plurality of vehicles or owner of the vehicle of an event which is held in an area where the plurality of vehicles is able to be parked; and adjust the number of vehicles corresponding to a vehicle attribute of the vehicle which arrives at the area on the basis of a vehicle attribute of each of the plurality of vehicles.

(11): According to an aspect of the present invention, there is provided a management system including: an identifier configured to identify an area where a plurality of vehicles are able to be parked; and an area manager configured to provide a notification of area information acquired by the identifier and acquire arrival information of a vehicle for the area on the basis of a vehicle attribute of each of the plurality of vehicles.

(12): In the above-described aspect (11), the management system further includes an indicator (160) configured to indicate a parking position to the vehicle so that the vehicle arriving at the area is disposed at a predetermined position within the area.

(13): In the above-described aspect (11), the management system further includes a notifier configured to provide a notification of the area information to a vehicle present within a predetermined distance from a position of the area or an owner of the vehicle.

(14): In the above-described aspect (11), the vehicle includes an automated driving vehicle and the area manger includes a route setter configured to cause the vehicle to arrive at the area in an unmanned manner and a route setting requester configured to notify the vehicle other than the automated driving vehicle of route information for the area.

(15): In the above-described aspect (11), the management system further includes a pick-up/drop-off manager configured to issue route information in which a representative point of the area is used as a point to be visited when a plurality of vehicles are disposed in the area.

(16): In the above-described aspect (13), the notifier provides a notification of dynamic associated information acquired from a vehicle present within the area or a manager of the vehicle.

Also, the above-described sixth embodiment can be represented as follows.

(1) According to an aspect of the present invention, there is provided an in-vehicle performance device for presenting a game played by an occupant in a vehicle, the in-vehicle performance device including: an operation detector configured to detect an operation of the occupant unrelated to driving of the vehicle; a display configured to display an image capable of being visually recognized by the occupant; and a display controller (18) configured to display a response image according to the operation of the occupant on the display, and output a result of the game based on a predetermined rule, on the basis of the operation of the occupant detected by the operation detector.

(2) In the in-vehicle performance device of the aspect (1), the display controller may cause the response image to be superimposed on a physical object of a surrounding environment of the vehicle and cause the display to display the response image superimposed on the physical object.

(3) In the in-vehicle performance device of the aspect (2), the operation of the occupant may be an operation of indicating the physical object of the surrounding environment, the operation detector may detect a direction indicated by the occupant, and the display controller may cause the display to display the response image so that the response image is superimposed on a specific physical object of the indicated direction on the basis of the direction detected by the operation detector.

(4) In the in-vehicle performance device of the aspect (2) or (3), the in-vehicle performance device may further include a score calculator configured to calculate the number of times that the operation detector has detected an operation of indicating a specific physical object as a valid score, and the display controller may cause the display to display an image showing the score calculated by the score calculator at a predetermined timing.

(5) In the in-vehicle performance device of the aspect (4), the specific physical object may be a specific road sign to a destination, the in-vehicle performance device may further include a destination information acquirer configured to acquire destination information indicating the destination, an imager configured to image the surrounding environment and generate a surrounding environment image, and an extractor configured to extract the specific road sign to the destination indicated by the destination information from the surrounding environment image, and the score calculator may calculate the number of times that the operation detector has detected an operation of the occupant indicating a position corresponding to the road sign extracted by the extractor as a valid score.

(6) In the in-vehicle performance device of the aspect (5), the specific physical object may be another vehicle which travels in the vicinity of the vehicle, the extractor may extract the other vehicle from the surrounding environment image, and the score calculator may calculate the number of times that the operation detector has detected the operation of the occupant indicating a position corresponding to the other vehicle extracted by the extractor as a valid score.

(7) In the in-vehicle performance device of the aspect (5) or (6), the specific physical object may be a sign of a store present around the vehicle, the extractor may extract the sign from the surrounding environment image, and the score calculator may calculate the number of times that the operation detector has detected the operation of the occupant indicating a position corresponding to the sign extracted by the extractor as a valid score.

(8) In the in-vehicle performance device of any one of the aspects (4) to (7), the display controller may cause the display to display an image showing a total score calculated by the score calculator.

(9) There is a provided an in-vehicle performance system including a plurality of in-vehicle performance devices according to any one of the aspects (4) to (8), wherein the in-vehicle performance device includes a transmitter configured to transmit information indicating the score calculated by the score calculator to another in-vehicle performance device; and a receiver configured to receive score information indicating the score calculated by the other in-vehicle performance device, and wherein the display controller causes the display to display an image showing the score calculated by the score calculator and an image showing the score of the score information received by the receiver.

(10) In the in-vehicle performance device of the aspect (9), the display controller may compare an image showing the score of the score information received from the in-vehicle performance device mounted on the vehicle belonging to the same team as that of a host device with an image showing the score of the score information received from the in-vehicle performance device mounted on the vehicle belonging to another team and cause the display to display a comparison result.

(11) In the in-vehicle performance device of the aspect (9) or (10), the display controller may cause an image for prompting the occupant to move the vehicle to be displayed on the basis of information indicating behavior of the vehicle equipped with its own device and information indicating behavior of a vehicle equipped with another in-vehicle performance device.

(12) There is provided an in-vehicle performance method including: detecting, by a computer having a display and configured to present a game played by an occupant in a vehicle, an operation of the occupant unrelated to driving of the vehicle; displaying, by the computer, an image capable of being visually recognized by the occupant; and displaying, by the computer, a response image according to the operation of the occupant, and outputting a result of the game based on a predetermined rule, on the basis of the detected operation of the occupant.

(13) There is provided a program for causing a computer having a display and configured to present a game played by an occupant in a vehicle to: detect an operation of the occupant unrelated to driving of the vehicle; display an image capable of being visually recognized by the occupant; and display a response image according to the operation of the occupant, and output a result of the game based on a predetermined rule, on the basis of the detected operation of the occupant.

(14) According to an aspect of the present invention, there is provided an instruction and measurement device including: an operation detector configured to detect an operation of an occupant of a vehicle; a line-of-sight detector configured to detect a viewpoint position of the occupant; a coordinate acquirer configured to acquire a three-dimensional point group of a real space of an instruction direction based on an instruction operation of the occupant on the basis of an instruction operation of the occupant detected by the operation detector and a viewpoint position of the occupant detected by the line-of-sight detector; an object information acquirer configured to acquire information indicating an object associated with the three-dimensional point group acquired by the coordinate acquirer from an interface which supplies information indicating the object present in the real space indicated by the three-dimensional point group; a service provider identifier configured to identify a service provider associated with the object indicated by information acquired by the object information acquirer on the basis of service information indicating the service provider associated with the object; and a history information generator configured to generate history information in which the service provider identified by the service provider identifier and the object indicated by the information acquired by the object information acquirer are associated.

(15) In the instruction and measurement device according to the aspect (14), a period in which the instruction operation has been performed and information indicating the occupant are further associated in the history information.

(16) The instruction and measurement device according to the aspect (14) or (15) further includes an imager configured to image a surrounding environment and generate a surrounding environment image; an attribute identifier configured to identify an attribute of the surrounding environment on the basis of the surrounding environment image captured by the imager, wherein the coordinate acquirer acquires the three-dimensional point group of the real space of the instruction direction based on the instruction operation of the occupant on the basis of the attribute of the surrounding environment identified by the attribute identifier.

(17) The instruction and measurement device according to any one of the aspects (14) to (16) further includes a notifier configured to notify the service provider indicated in the history information that the instruction operation has been performed.

(18) In the instruction and measurement device according to the aspect (17), the notifier notifies the occupant of the history information.

(19) The instruction and measurement device according to any one of the aspects (14) to (18) further includes an imager configured to image a surrounding environment and generate a surrounding environment image, wherein the coordinate acquirer acquires information indicating a three-dimensional point group based on the surrounding environment image captured by the imager from the interface which supplies the three-dimensional point group on the basis of the surrounding environment image.

Also, the above-described seventh embodiment can be represented as follows.

(1): According to an aspect of the present invention, there is provided a vehicle control system including: a vehicle exterior display provided on an exterior part of a vehicle and configured to display content toward an outside of the vehicle; a vehicle environment acquirer configured to acquire an environment of the vehicle; and a display controller configured to control the display of the content on the vehicle exterior display on the basis of the environment of the vehicle acquired by the vehicle environment acquirer.

(2): In the aspect (1), the vehicle environment acquirer derives a degree of attention for the vehicle and the display controller causes second content to be displayed when the degree of attention has exceeded a predetermined value after causing the vehicle exterior display to display first content.

(3): In the aspect (2), the second content includes advertisement information.

(4): In any one of the aspects (1) to (3), the vehicle control system further includes an automated driving controller configured to execute automated driving of the vehicle, wherein the automated driving controller controls a speed of the vehicle in cooperation with a process in which the content is displayed by the display controller.

(5): In any one of the aspects (1) to (4), the display controller controls the display of the content in accordance with a traveling state of the vehicle.

(6): In any one of the aspects (1) to (5), the display controller controls the display of the content in accordance with a state of an occupant of the vehicle acquired by the vehicle environment acquirer.

(7): In any one of the aspects (1) to (6), the vehicle environment acquirer monitors a line of sight of a person around the vehicle and the display controller switches a position of an object included in the content on the basis of a line-of-sight direction of a person around the vehicle acquired by the vehicle environment acquirer.

(8): In any one of the aspects (1) to (7), the vehicle control system further includes a communicator configured to perform communication with a content providing server; and a requester (274) configured to transmit a content request for requesting the content providing server to provide the content by means of the communicator, wherein the display controller causes the vehicle exterior display to display the content acquired from the content providing server according to the request from the requester.

(9): According to another aspect of the present invention, there is provided a vehicle control method including: displaying, by a computer, content by means of a vehicle exterior display provided on an exterior part of a vehicle toward the outside of the vehicle; acquiring, by the computer, an environment of the vehicle; and controlling, by the computer, the display of the content on the vehicle exterior display on the basis of the acquired environment of the vehicle.

(10): According to another aspect of the present invention, there is provided a program for causing a computer to: display content by means of a vehicle exterior display provided on an exterior part of a vehicle toward the outside of the vehicle; acquire an environment of the vehicle; and control the display of the content on the vehicle exterior display on the basis of the acquired environment of the vehicle.

(11): According to another aspect of the present invention, there is provided a vehicle management system including: a content controller configured to control content capable of being displayed on a vehicle exterior display provided on an exterior part of a vehicle and configured to display the content toward the outside of the vehicle; an acquirer configured to acquire environment information of the vehicle from the vehicle; a referrer configured to refer to a corresponding relationship between a user of the vehicle or a driver of the vehicle and the content while the vehicle is traveling, wherein the content controller permits the use of the content on the basis of a reference result of the referrer.

(12): In the aspect (11), the acquirer acquires display content which is being displayed on the vehicle exterior display and a degree of attention for the vehicle and the vehicle management system includes an updater configured to update the corresponding relationship between the user of the vehicle or the driver of the vehicle and the content.

(13): In the aspect (11), the content includes advertisement information.

(14): In the aspect (11), the acquirer includes an instructor configured to acquire information indicating whether or not an automated driving controller of the vehicle is executing automated driving control and information of content displayed on the vehicle exterior display of the vehicle and request the automated driving controller to change a traveling state or a route on the basis of the content acquired by the acquirer when the vehicle is executing the automated driving control.

(15): In the aspect (14), the instructor further requests the change in the traveling state or the route in accordance with environment information of the vehicle acquired by the acquirer.

(16): In the aspect (11), the referrer refers to the corresponding relationship between the content and the user of the vehicle or the driver of the vehicle and the content in accordance with a state of an occupant of the vehicle acquired by the acquirer.

(17): In the aspect (11), the acquirer includes an updater configured to acquire content which is being displayed on the vehicle exterior display and a line of sight of a person around the vehicle associated with a position at which the content is displayed in the vehicle exterior display as environment information of the vehicle and update the corresponding relationship between the user of the vehicle or the driver of the vehicle and the content on the basis of the acquired environment information.

(18): In the aspect (11), the vehicle management system further includes a communicator configured to perform communication with a content providing server; and a requester configured to cause the communicator to transmit a content request for requesting the content providing server to provide the content, and includes an updater configured to update the corresponding relationship between the content acquired from the content providing server and the user of the vehicle or the driver of the vehicle while the vehicle is traveling according to a request from the requester.

Also, the above-described eighth embodiment can be represented as follows.

(1): According to an aspect of the present invention, there is provided a vehicle system including: an automated driving controller configured to execute automated driving of a vehicle; and an environment provider configured to provide an interior of the vehicle with state information indicating a state of external equipment operable using an operation interface in the interior of the vehicle when the vehicle travels or stops, the external equipment being external equipment outside the vehicle.

(2): In (1), the environment provider provides the interior of the vehicle with at least one of information indicating a control state of the external equipment and an external state of the external equipment detected by a detector outside the external equipment.

(3): In (1), the environment provider provides the interior of the vehicle with the operation interface with respect to a remotely operable functional operation among all functional operations provided in the external equipment.

(4): In (3), the environment provider causes operation details received by the operation interface to be synchronized with a control state of the external equipment on the basis of the state information.

(5): In (1), the vehicle system further includes an identifier configured to identify an individual within the vehicle, wherein the environment provider identifies the external equipment capable of being used by the individual identified by the identifier and is connected to the identified external equipment.

(6): In (1), the environment provider includes a projector and causes the state information of the external equipment to be displayed within the vehicle.

(7) In (1), the vehicle system further includes a communicator configured to communicate with the external equipment, wherein the environment provider recognizes an operation on the operation interface performed by a person within the vehicle and controls the communicator so that the communicator transmits a control signal corresponding to the recognized operation to the external equipment.

(8): In (1), the environment provider changes operation details, which are received by the operation interface, on the basis of a traveling state of the vehicle.

(9): In (1), when the external equipment has been added, the environment provider adds the operation interface according to a function of the added external equipment.

(10): In (1), the environment provider determines the operation interface connected to the external equipment on the basis of at least one of a type of the external equipment, access right indicating whether or not use of the external equipment has been permitted, and a state of the external equipment.

(11): According to another aspect of the present invention, there is provided a vehicle system including: an automated driving controller configured to execute automated driving of a vehicle; an environment provider configured to provide an interior of the vehicle with state information indicating a state of external equipment operable using an operation interface in the interior of the vehicle when the vehicle travels or stops, the external equipment being external equipment outside the vehicle; and a management device configured to manage communication between the automated driving controller and the environment provider.

Also, the above-described ninth embodiment can be represented as follows.

(1): According to an aspect of the present invention, there is provided a vehicle system including: an area indicator configured to specify a driving area of an automated driving vehicle; a discriminator configured to discriminate a user for the automated driving vehicle; and a use permitter configured to allow a user discriminated to be capable of using the automated driving vehicle by the discriminator to occupy and use at least a part of the automated driving vehicle.

(2): In the above-described aspect (1), the area indicator indicates a route different in accordance with a time period to the automated driving vehicle within the driving area.

(3): In the above-described aspect (1) or (2), the vehicle system further includes a communicator configured to communicate with a terminal device of a user; and a route indicator configured to indicate a route to the automated driving vehicle on the basis of one or both of a specified route in which the vehicle circularly travels along a predetermined route within the driving area and an on-demand path based on information received by the communicator.

(4): In the above-described aspect (3), the route indicator compares priorities of the specified route and the on-demand route and indicates either the specified route or the on-demand route to the automated driving vehicle.

(5): In the above-described aspect (4), the route indicator allocates a traveling period of the on-demand route on the basis of a use situation of the automated driving vehicle corresponding to the specified route.

(6): In any one of the above-described aspects (1) to (5), the automated driving vehicle is equipped with an in-vehicle communicator configured to communicate with a terminal device of a user and transmit information indicating whether or not a situation is an available situation.

(7): In any one of the above-described aspects (3) to (6), the vehicle system further includes a vehicle allocator configured to allocate a plurality of automated driving vehicles so that the plurality of automated driving vehicles circularly travel within the driving area.

(8): In any one of the above-described aspects (1) to (7), the automated driving vehicle further includes an imager configured to image an interior or an exterior of the vehicle; an in-vehicle communicator configured to transmit feature data of an image captured by the imager to a server device; an event determiner configured to determine an event on the basis of the feature data stored in the server device at least temporarily; and a provider configured to provide a notification on the basis of information of the event determined by the event determiner and information of the user discriminated by the discriminator.

(9): According to an aspect of the present invention, there is provided an automated driving vehicle including: an in-vehicle communicator; an area indicator configured to specify a driving area according to a received signal for the in-vehicle communicator; and an autonomous controller configured to generate a specified route along which the vehicle circularly travels in a range of the driving area, wherein the autonomous controller selects an on-demand route instead of the specified route on the basis of a use situation of the driving area received by the in-vehicle communicator.

(10): According to an aspect of the present invention, there is provided a vehicle control method including: indicating, by a computer, a route to an automated driving vehicle within a driving area; discriminating, by the computer, a user capable of using the automated driving vehicle; allowing, by the computer, a user discriminated to be capable of using the automated driving vehicle to occupy and use at least a part of the automated driving vehicle; and controlling, by the computer, the number of automated driving vehicles within the driving area on the basis of a state in which at least the part of the automated driving vehicle is occupied and used.

(11): According to an aspect of the present invention, there is provided a program for causing a computer to: identify an automated driving vehicle within a driving area; indicate a route to the identified automated driving vehicle; discriminate a user capable of using the automated driving vehicle; allow a user discriminated to be capable of using the automated driving vehicle to start occupation and use of at least a part of the automated driving vehicle; monitor a state in which at least the part of the automated driving vehicle is occupied and used; and control the number of automated driving vehicles within the driving area on the basis of the state in which at least the part of the automated driving vehicle is occupied and used.

Although modes for carrying out the present invention have been described above using embodiments, the present invention is not limited to the embodiments, and various modifications and substitutions can also be made without departing from the scope and spirit of the present invention.

The invention claimed is:

1. A vehicle comprising:
a communicator configured to receive driving information from a management server;
a controller configured to drive the vehicle on the basis of the driving information from the communicator;
a manager configured to manage a compartment of the vehicle in which a service user receives a service from a service provider;
an interface set up in association with service-related information provided by the service provider and the compartment; and
a traveling device that does not have any compartment and a first connector provided on the traveling device and connected to a superstructure so that the superstructure is removable from the traveling device,
wherein the manager acquires traveling device information including version information of the traveling device from the management server and causes the superstructure having a version matching the acquired traveling device information to be connected by the first connector.

2. The vehicle according to claim 1, wherein the communicator transmits a control signal for controlling the interface to the management server or the service provider using an access state of the service user for the vehicle as a trigger.

3. The vehicle according to claim 2,
wherein the interface includes an external display, and
wherein the vehicle further includes a display controller configured to execute a display form specified by the service provider in the external display with respect to the control signal.

4. The vehicle according to claim 3, further comprising a storage configured to store external display content,
wherein the display controller downloads the content from an external device and updates the content stored in the storage.

5. The vehicle according to claim 2, comprising an attribute sharer configured to share an attribute of the compartment with the management server or the service provider,
wherein the interface is set up in correspondence with the attribute.

6. The vehicle according to claim 1, further comprising a usage situation detector configured to detect a usage situation of the compartment of the vehicle,
wherein the communicator transmits a detection signal of the usage situation detector to the service provider.

7. The vehicle according to claim 1, comprising an external environment detector configured to detect the surroundings of the compartment,
wherein the communicator transmits a detection signal of the external environment detector to the service provider.

8. The vehicle according to claim 1,
wherein the communicator receives a service signal transmitted from the service provider, and
wherein the vehicle further comprises:
a compartment control signal generator configured to generate a control signal corresponding to the received service signal and transmit the control signal to equipment arranged in the compartment; and
a driving control signal generator configured to transmit a control signal corresponding to the service signal to the controller.

9. The vehicle according to claim 1, wherein the interface executes an operation on an external facility via the service provider.

10. The vehicle according to claim 1, wherein the interface makes a route change to a specific destination provided by the service provider.

11. The vehicle according to claim 1, wherein the interface further comprises:
a display configured to display content provided by the service provider; and
an operation information transmitter configured to transmit operation information to the service provider via the communicator.

12. The vehicle according to claim 1,
wherein the controller comprises an automated driving controller configured to perform automated driving on the basis of an external environment detection sensor and a position information sensor, and
wherein the interface permits the service user to use information when the automated driving is being executed and the service user is in the vehicle.

13. The vehicle according to claim 1, wherein the interface provides information to the service user before or after the service user gets into the compartment.

* * * * *